United States Patent [19]

Kenik et al.

[11] Patent Number: 5,029,095

[45] **Date of Patent: * Jul. 2, 1991**

[54] APPARATUS AND METHOD FOR PARTS ASSEMBLY

[75] Inventors: Frank W. Kenik, Wadsworth; Ronald J. Jensen, Libertyville, both of Ill.; James J. Bayer, Kenosha, Wis.; David F. Allgeyer; Richard R. McCarthy, both of Antioch, Ill.; Thomas A. Miceli, Wadsworth, Ill.

[73] Assignee: Outboard Marine Corporation, Waukegan, Ill.

[ * ] Notice: The portion of the term of this patent subsequent to Apr. 11, 2006 has been disclaimed.

[21] Appl. No.: 334,912

[22] Filed: Apr. 6, 1989

Related U.S. Application Data

[63] Continuation-in-part of Ser. No. 41,302, Apr. 22, 1987, Pat. No. 4,821,197.

[51] Int. Cl.[5] .......... G06F 15/46

[52] U.S. Cl. .......... 364/468; 29/701; 364/478; 414/273

[58] Field of Search .......... 364/468, 478, 479, 403; 235/375, 385; 29/701-704, 407; 414/273, 274, 289, 331; 209/546, 551

[56] References Cited

U.S. PATENT DOCUMENTS

| | | | |
|---|---|---|---|
| 3,532,184 | 6/1968 | Blake | 186/1 |
| 3,716,697 | 2/1973 | Weir | 235/383 |
| 3,739,339 | 6/1973 | Hillhouse et al. | 186/1 |
| 3,770,941 | 11/1973 | Gechele et al. | 235/383 |
| 3,780,907 | 12/1973 | Colburn et al. | 221/2 |
| 4,133,615 | 1/1979 | Zitelli et al. | 364/161 X |
| 4,237,598 | 12/1980 | Williamson | 364/474.11 |
| 4,332,012 | 5/1982 | Sekine et al. | 364/468 |
| 4,346,453 | 8/1982 | Drapeau et al. | 364/900 |
| 4,419,734 | 12/1983 | Wolfson et al. | 364/567 |
| 4,521,677 | 6/1985 | Sarwin | 235/385 |
| 4,598,459 | 7/1986 | Klink et al. | 29/703 |
| 4,625,396 | 12/1986 | Ahmed et al. | 29/701 |
| 4,646,245 | 2/1987 | Prodel et al. | 364/468 |
| 4,669,047 | 5/1987 | Chucta | 364/478 |
| 4,821,197 | 4/1989 | Kenik et al. | 364/478 X |
| 4,908,800 | 9/1975 | Drapeau | 186/1 R |

OTHER PUBLICATIONS

"Orderpicking Systems to Boost Productivity," Modern Materials Handling, 1985 Warehouse Guidebook, pp. 56-60.

*Primary Examiner*—Joseph Ruggiero
*Attorney, Agent, or Firm*—Welsh & Katz, Ltd.

[57] ABSTRACT

A system for manufacturing multiple component assemblies utilizing semi-automatic computer-assisted material handling. The system comprises a plurality of component selection cells each having an alphanumeric display to display a selected assembly model description and a plurality of component bins wherein each bin has an associated bin numeric display or backlight pushbutton switch for displaying the quantity of components from that bin required for a selected assembly model. Each numeric display pushbutton switch has a means for clearing the display after the required quantity of components has been selected and for generating a control signal in response to a completion of a selected collection of parts for that cell relating to the selected assembly model. A computer controls the alphanumeric, numeric and pushbutton switch displays responsive to data entered by an operator relating to the selected assembly model number and controls the clearing of the alphanumeric displays in response to the control signal. Flow racks are also provided for storage of collected kits of parts with a display associated with each rack including a pushbutton switch for indicating when each kit of parts is stored. The computer clears the flow rack display in response to a predetermined number of kits of parts being stored in the flow rack.

20 Claims, 13 Drawing Sheets

FIG-4-
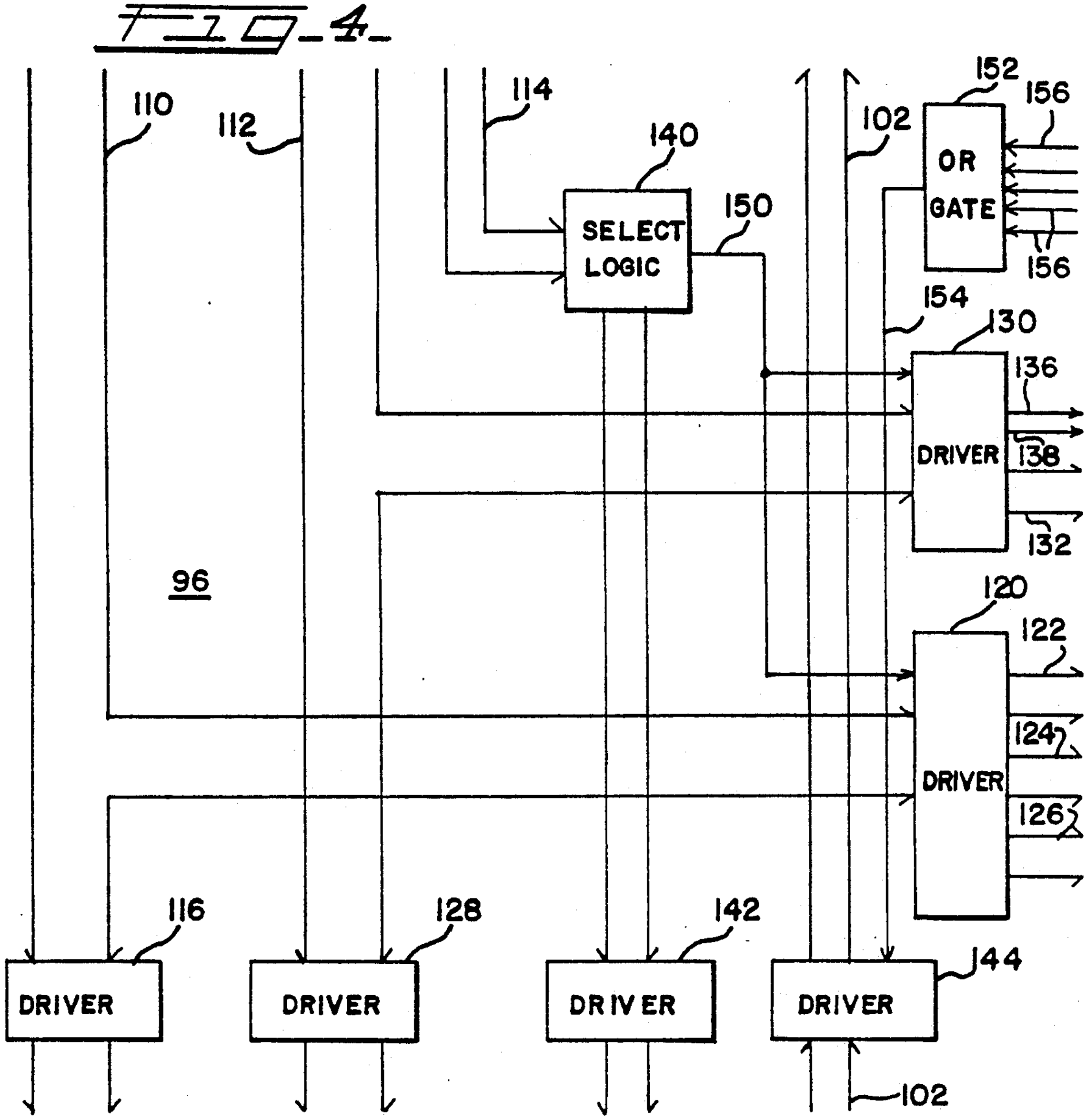
FIG-5C-
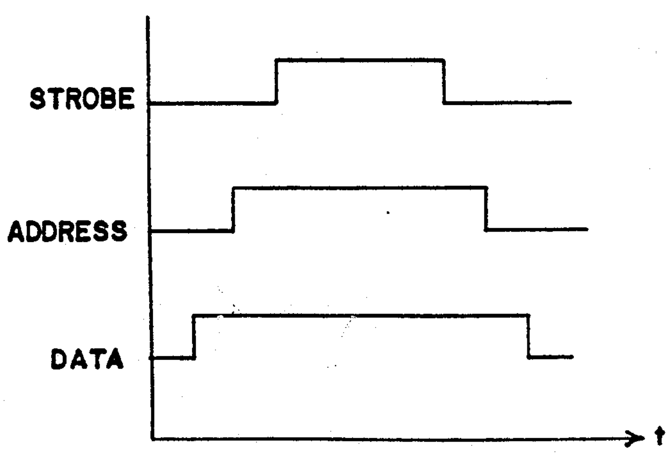

CURRENT SENSOR
ZERO DETECTOR
SELECT LOGIC
BUFFER
DRIVER/LATCH
DRIVER
DRIVER
DRIVER
DRIVER
V
105
122
124
126
132
136
137
138
156
161
163
164
165
166
167
168
169
170
171
172
173
182

APPARATUS AND METHOD FOR PARTS ASSEMBLY

This is a continuation-in-part of application Ser. No. 41,302 filed Apr. 22, 1987 issued as U.S. Pat. No. 4,821,197.

BACKGROUND OF THE INVENTION

This invention relates generally to the field of manufacturing and more particularly to a system for manufacturing multiple component assemblies utilizing computer-assisted semi-automated component kitting.

The modern manufacturing environment is highly competitive and constantly generating a need for new levels of efficiency in order to maintain a competitive advantage as well as to take advantage of market growth and adjust to product change. Thus, in existing component-assembly operations, substantial need exists for methods and apparatus to increase efficiency and reliability in assembly utilizing unskilled labor. In the modern consumer market, it has been found that consumers desire a distinctive product. This requires production of many similar but different products to meet the demand for distinctive products. However, in prior art assembly techniques, components were stored near the assembler and the assembly line work was required to select parts from these stored parts for assembly on the assembly line. Since many of the stored parts for various slightly different products are similar to each other, the assemblers find it difficult to differentiate between various components on a timely basis. Thus, a need exists for an improved method and apparatus for manufacture of multiple component assemblies which reduces the need for the assembler to make the parts selection decision.

It is accordingly an object of this invention to provide a novel system for manufacturing multiple component assemblies utilizing a computer-controlled component kitting system wherein a computer dictates the selection of the correct components and quantities of components by one assembler by means of numeric and pushbutton displays and wherein construction of the assembly is performed by another.

It is another object of the present invention to provide a novel computer controlled manufacturing system utilizing numeric and pushbutton displays which ensures that only complete component kits are selected.

It is yet another object of the invention to provide a novel manufacturing system of multiple component assemblies utilizing a plurality of component selection cells which may be controlled independently or as a hierarchy of interdependent cells by a central computer for collection of components for assembly.

It is yet another object of the invention to provide a novel manufacturing system of multiple component assemblies utilizing a plurality of flow racks for storage of component kits and utilizing computer controlled displays to provide staggered assembly of component kits and flow rack storage.

Briefly, according to one embodiment of the invention, a system for use in assembling multiple component assemblies utilizing semi-automated component kitting is provided. The system includes at least one component selection cell having a plurality of component bins wherein each component bin has an associated numeric display or pushbutton switch display for display of component quantities required for the selected assembly model. Each pushbutton display includes a push activated switch integral with a backlight for illuminating a pushbutton having a predetermined number affixed thereto. Associated with each numeric display is a means for clearing the respective numeric display. Associated with each pushbutton display and numeric display is a means for generating a control signal in response to clearing of all pushbutton displays and all numeric displays of a cell for a selected assembly model. A computer control means is provided for controlling the numeric displays and the pushbutton displays responsive to entry of a selected assembly model number and for entering a schedule of selected assemblies to be successively assembled with the displays for succeeding assemblies activated in response to the control signal.

In one embodiment, the system permits a microcomputer system to control the manufacturing process by controlling the collection of parts to form kits of parts placed in trays which are used by assembly workers to make the desired assemblies. The system provides for indication to the workers of what parts are needed to collect a kit of parts to be used to make an assembly. This is accomplished by storing components in an array of bins with numeric displays or pushbutton displays above each bin to form a component selection cell. The lights indicate what quantity of the components in the bin is needed to build the assembly. The components are collected in a tray (i.e., forming a kit of parts) and delivered to the assembly worker on the assembly line. The assembly worker can then concentrate on assembly of the desired assembly and not concern himself with choosing from several similar but different components to attach to the assembly. The system may utilize a plurality of the component selections cells, each accommodating a worker to collect components to form kits of parts in trays. The trays are then placed on a flow rack for storage. A set of flow racks is provided and each flow rack has an associated numeric or pushbutton display, each including a pushbutton switch, to designate one of the flow racks for use for storage of the kits of parts. The system keeps track of the number of kits of parts stored on the designated flow rack responsive to activation of the pushbutton switch each time a kit of parts is added to the flow rack. The flow rack display is cleared when the flow rack is full and assembly of a different kit of parts to be stored in a different flow rack is initiated by the system. Trays may then be transferred to a central area cell from the flow rack for transfer to the proper location on the assembly line for assembly by assembly line workers.

BRIEF DESCRIPTION OF THE DRAWINGS

The invention, together with further objects and advantages thereof, may be understood by reference to the following description taken in conjunction with the accompanying drawings.

FIG. 4 is a detailed block diagram illustrating a specific embodiment of the cell circuitry shown in FIG. 3.

FIG. 5C is a timing diagram illustrating signal timing for FIG. 5A.

DETAILED DESCRIPTION OF THE PREFERRED EMBODIMENT

Figure 1A:
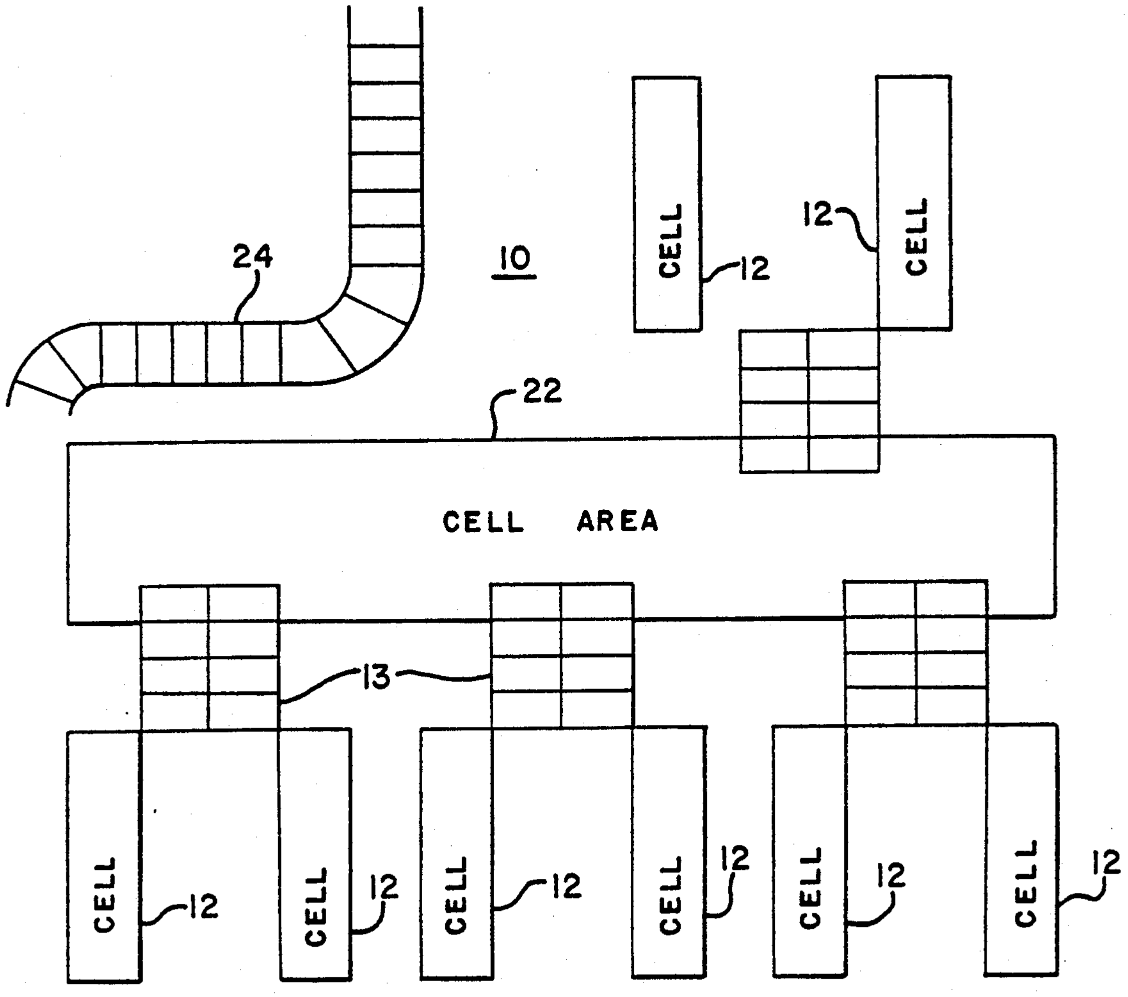
FIG. 1A is a generalized diagram illustrating a specific e of a manufacturing system layout according to the invention.
Figure 1B:
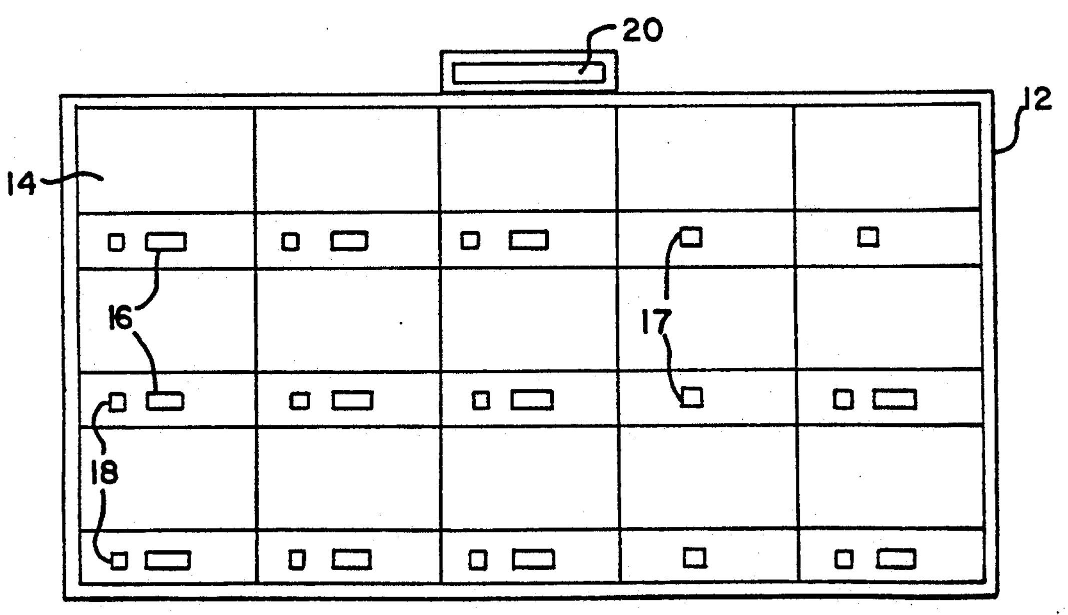
FIG. 1B is an illustration of a specific embodiment of a component selection cell such as shown in FIG. 1A.

FIG. 1A is a generalized diagram illustrating a specific embodiment of a manufacturing system layout 10 for a manufacturing system according to the invention. The manufacturing system layout 10 comprises a plurality of component selection cells 12, as shown. Each component selection cell 12, as illustrated in the specific embodiment of FIG. 1B, includes multiple bins 14 of parts with a quantity display comprising a numeric display 16 or a numbered pushbutton display 17 (i.e., a pushbutton switch with backlighting) for each bin which displays the number of parts which are to be retrieved from that bin. A pushbutton switch 18 is also provided to permit the numeric display 16 to be cleared after the required number of parts have been retrieved from the bin. The pushbutton display 17 may comprise a conventional backlighted pushbutton switch with a number on its first surface and a light behind the pushbutton which may be activated or deactivated by the integral pushbutton switch. The pushbutton display 17 is substantially less expensive than the numeric display 16 and therefore is more economical in situations in which the number of parts which are to be retrieved from a bin does not change even for different kits that may be assembled at that component selection cell. In addition, an alphanumeric display 20 is provided with each cell 12 to display a description (e.g., assembly model number) of the assembly model selected for assembly.

The activation of the numeric displays 16, the pushbutton displays 17, and the alphanumeric displays 20 is controlled by a central computer system 50 (shown in FIGS. 2A and 2B) based on assembly model information entered by an operator. In the illustrated embodiment, each cell 12 has associated with it an operator work bench (not shown) and a set of palletainers (not shown) which hold large components and assembled subassemblies. Further, as shown at one end of each cell 12 is an array of flow racks 13 which provide for storage of completed parts trays (i.e., kits of parts) in a cell area 22. At a separate location, either nearby or remote, a computer system (see FIGS. 2A or 2B) under control of an operator controls the operation of the manufacturing system. An assembly line conveyor system 24 is located near the cell area 22, as shown. In an alternative embodiment, a single cell 12 can supply different parts kits to multiple assembly lines, each of which may be producing a different assembly.

Figure 2A:
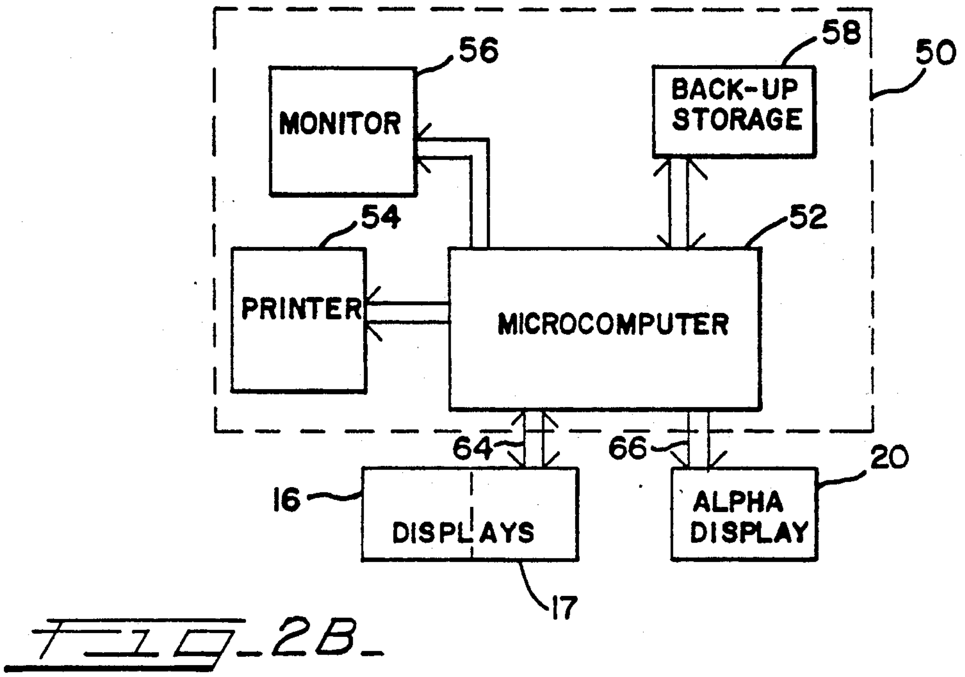
FIG. 2A is a generalized block diagram illustrating a specific embodiment of a computer-assisted component kitting system for use with the manufacturing layout of FIG. 1 according to the invention.

A specific embodiment of the control circuitry for controlling the displays is illustrated in block diagram form in FIG. 2A. As shown, a central microcomputer system 50 is coupled to the numeric displays 16 and pushbutton displays 17 via a bus 64, and is coupled to the alphanumeric displays 20 via a bus 66. The illustrated embodiment of the microcomputer system 50 includes a microcomputer 52 such as a PC-AT marketed by International Business Machines Corp., which may include internal random access memory (not shown, e.g., 640 Kbytes in the illustrated embodiment), internal hard disk storage (not shown, e.g., 30 Mbytes for files) and an internal floppy disk drive (not shown, e.g., 1.2 Mbytes or 360 Kbytes disk drive), as well as a printer 54, a monitor and keyboard 56 and backup storage device 58, configured as shown. The embodiment of FIG. 2A is primarily intended for use in close proximity to the manufacturing floor.

Figure 2B:
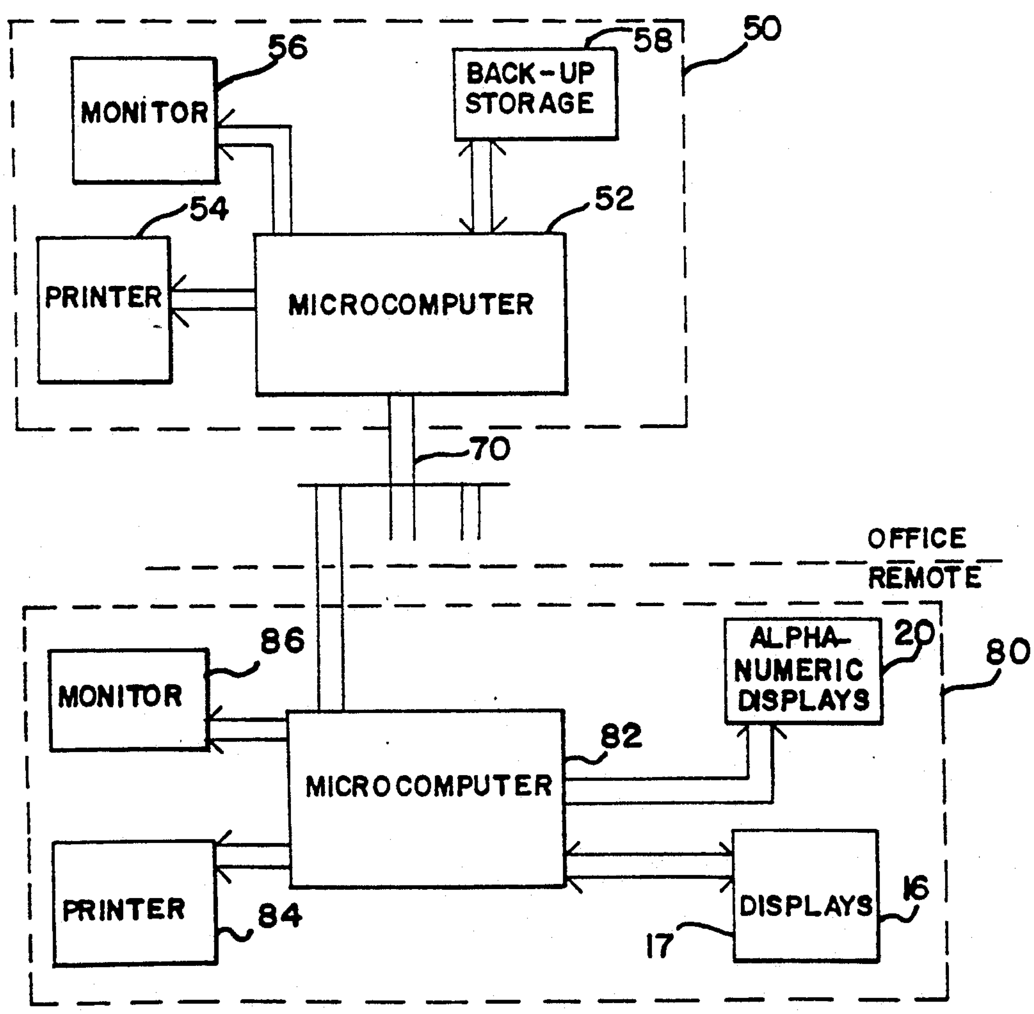
FIG. 2B is a generalized block diagram illustrating an alternative embodiment of a computer-assisted component kitting system for use with the manufacturing layout of FIG. 1.

FIG. 2B illustrates in block diagram form an alternative embodiment of the display control circuitry particularly suitable for a system wherein the central control microcomputer system 50 is located in a remote office removed from the manufacturing floor. In the embodiment of FIG. 2B, a microcomputer system 50 not only includes the printer 54, the monitor 56, and the backup storage 58, but also includes local area network (LAN) hardware and software (e.g., TOKEN RING marketed by International Business Machines Corporation) within the microcomputer 52 which functions as a file server. This system 50 is coupled by the local area network bus 70 to at least one, and optionally several, remotely located computer systems 80, as shown. The illustrated embodiment of the system 80 includes a microcomputer 82 (e.g., an International Business Machines Corp. PC-AT with internal random access memory and internal floppy disk storage) coupled to a conventional printer 84, a conventional monitor 82 and to the alphanumeric displays 20, the numeric displays 16 and the pushbutton displays 17, as shown. Thus, the embodiment of FIG. 2B is a network system which permits control of a plurality of manufacturing operations from a remote location.

In operation, the system permits an operator of the microcomputer system 50 to control the manufacturing process by controlling the collection of parts to form kits of parts placed in trays which are used by assembly workers to make the desired assemblies. The system provides for indication to the workers of what parts are needed to collect a kit of parts to be used to make an assembly. This is accomplished by storing components in an array of bins with a numeric display or pushbutton display above each bin to form a component selection cell 12. The displays 16, 17 indicate what quantity of the components in the bin is needed to build the assembly. The components are collected in a tray (i.e., forming a kit of parts) and delivered to the assembly worker on the assembly line. The assembly worker can then concentrate on assembly of the desired assembly and not concern himself with choosing from several similar but different components to attach to the assembly. In a specific embodiment, the system may utilize a plurality of the component selection cells 12, each accommodating a worker to collect components to form a kit of parts in trays. Trays are transferred to a central area cell 22 for transfer to the proper location on the assembly line 24 for assembly by assembly line workers. Thus a single cell may be used to make kits for a wide variety of assemblies or a plurality of cells arranged independently or in a hierarchy of at least two levels may be utilized.

The operator may enter via the monitor/ keyboard 56, the desired assembly model number and the associated quantity to be built. The system can then provide to the operator the maximum quantity that can be built if the maximum is less than the requested quantity. The operator can then select this maximum quantity or select the desired quantity of a different assembly for the system to schedule. The system also can determine what subassemblies need to have kits of parts prepared and need to be built based on the build quantities determined by the system for final assembly, and based on the number of such subassemblies which have already been built. When a subassembly is prepared and not used in the construction of a final assembly, it is stored off line to be used later, and record kept by the computer 52. Additionally, an operator may enter a schedule of selected assemblies to be successively assembled for an entire day via the monitor/keyboard 36 which the system then processes to continuously direct kit assembly for an entire day of product assembly.

An alphanumeric display 20 is utilized with each component selection cell so that the microcomputer system 52 can display the assembly model description to be built to the cell worker. The numeric display 16 or the pushbutton display 17 over each bin directs the worker to the correct component and the quantity needed for the desired assembly. A switch 18 (e.g., push-button switch) is provided with each numeric display 16 which permits the operator to clear the display and acknowledge that the displayed number of the part has been selected and placed in the tray. This function is also provided by the integral pushbutton switch in each pushbutton display 17. When the last light for a particular assembly model has been turned off, a signal is generated and the central computer then cycles the alphanumeric display 20 and light displays 16, 17 based upon the number of assemblies to be built. In this manner, different assembly models may be mixed so that a kit of parts may be collected for one model, then a kit of parts for a different model, etc.

The system may also stagger the assembly of kits of parts to permit control of the usage of flow racks 13 by using bin displays 16, 17 over each bin and by keeping track of how many assembly kits of parts have been put in a flow rack. Each flow rack of the flow rack array 13 may have a pushbutton switch display 17 or a numeric display 16 associated with it in the same manner as that shown for the parts bin in FIG. 1B. For example, a single 16 pushbutton display circuit 105, such as illustrated in FIG. 5B, may be used to provide the pushbutton displays for a set of flow racks where only one light will be activated at any one time. During assembly of each kit of parts, the display on one flow rack will be activated to designate to the cell worker that the kit is to be put in the designated flow rack. Each time the cell worker puts an assembled kit of parts into the flow rack, he presses the pushbutton switch. If a numeric display 16 is used, the number displayed can be decremented each time the pushbutton is pressed and if a pushbutton switch display 17 is used, the light is reactivated after each depression.

The computer system 50 thus keeps track of the number of kits of parts in the flow rack and once a predetermine limit of kits are in the rack (i.e., when the rack is full), the pushbutton light or numeric display is turned off. The assembly of a new kit of parts is then initiated by activating a new set of bin displays, displaying a new kit designation on display 20, and activating a new flow rack display light. Meanwhile, the kits of parts are removed from the previously filled flow racks for use on the assembly line and once emptied, the system can return the cell to assembly of that kit by reactivating the displays. As a result of this system, one cell worker in one cell can assemble several different kits of parts. One cell worker can also work at several different cells, moving to a new cell when the display lights are cleared due, for example, to a full flow rack.

In an alternative system, the computer system 50 can use only the flow rack display means 16, 17 to control the system so that the bin displays stay on until the flow rack display is cleared by the computer in response to the flow rack being filled.

In addition to controlling the displays which direct worker parts collection, the system also provides for inventory control of components and generation of various reports. Thus, the system provides for updating its memory to decrease the components indicated as being available by the appropriate quantity when the assembly is scheduled, as well as providing for two levels of bill of materials with multiple subassemblies feeding into a final product scheduling. The system provides for scheduling of either subassemblies or end product assemblies, and permits the generation of parts list from existing lists. In addition, the components inventory may be updated at the assembly level, and engineering change of components can be made by changing one part to another with the single entry, thereby permitting a change of all references to that part. If desired, a scheduled assembly can be cancelled before completion, thereby reinstating all the component inventories associated with it. A simulation capability is provided, which permits the operator to perform "what if" inquiries, thereby determining what assemblies can be built, and what additional parts may be needed for a day's production run.

Printed reports may be generated using the microcomputer system 50, including reports such as parts lists and a low stock report, which generates a list of parts which are available in quantities below a predetermined threshold. Also, part inventory reports, cell assignment reports, component shortage reports, and off-site material move reports may be generated. In addition, CRT display reports may be generated, such as inventory status based on part number or bin location, status of collection of a particular kit of parts, or a list kits which may be scheduled.

Additional features provided by the system include a two-level kit structure with the scheduling of the higher level netted by available subassemblies, and then pass to the next lower level. Off-line subassemblies may be tracked, as well as the generation of material move reports as kits are scheduled using off-line subassemblies. Move reports of materials are automatically generated for kits scheduled which have parts which are not stored on line, and inventory maintenance is provided at a subassembly level, which permits updates of all parts in the bins for components of subassemblies.

The operator of the system utilizes the system by selecting a desired function from a master menu. The master menu provides, in the illustrated embodiment, a total of thirteen choices as follows: (1) schedule a kit, (2) bin maintenance, (3) part master maintenance, (4) parts list maintenance, (5) part inventory report, (6) low stock report, (7) cell assignment report, (8) parts list for a kit, (9) display list of kits, (10) display kits currently scheduled, (11) display inventory status, (12) cancel a kit, and (13) end.

Figure 3:
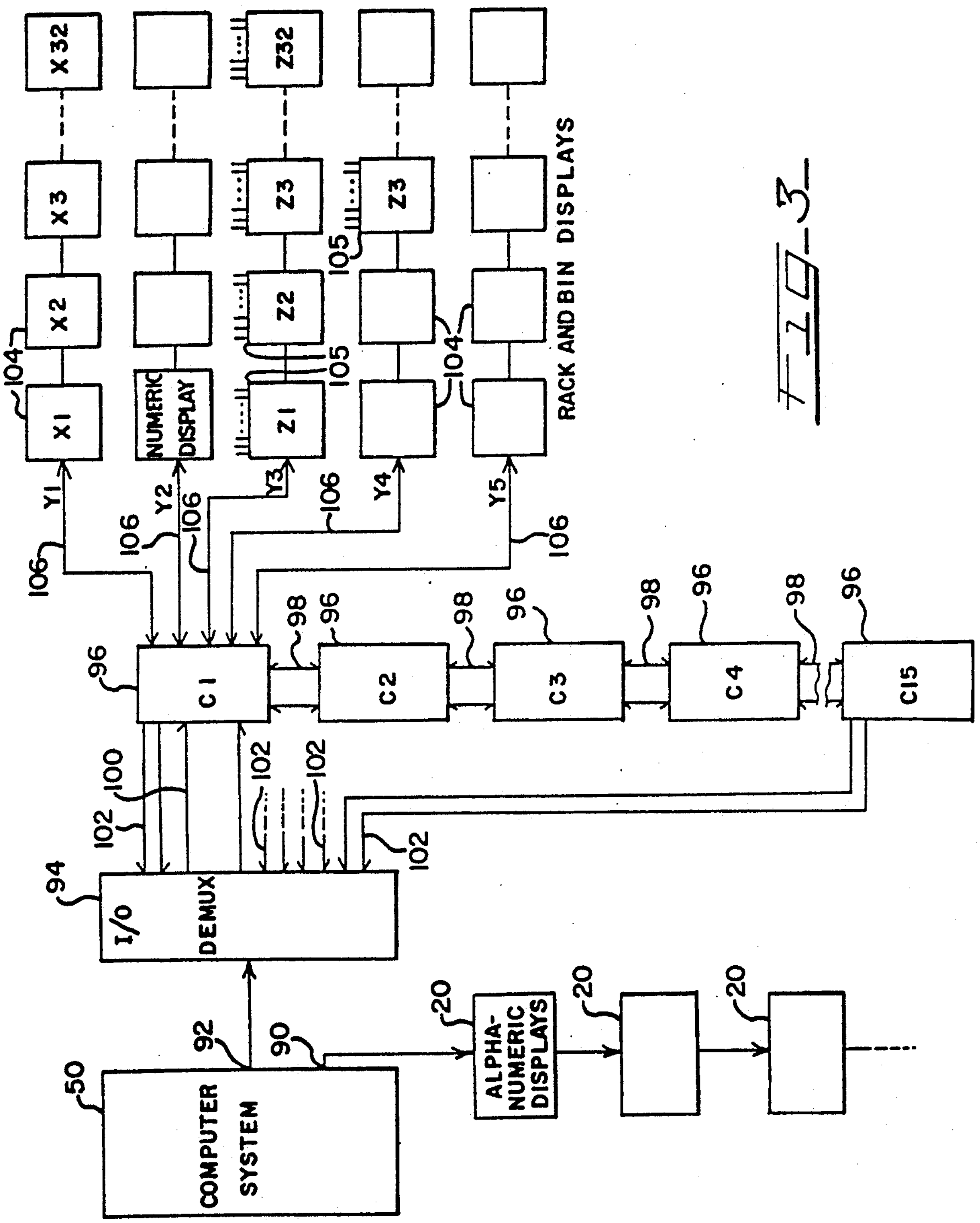
FIG. 3 is a detailed block diagram illustrating a specific embodiment of portions of the component kitting system of FIG. 2A.

Referring now to FIG. 3, there is shown a detailed block diagram illustrating a specific embodiment of a computer assisted materials handling system according to the invention. The system comprises the computer system 50, which is coupled via an RS-232C serial interface 90 to a set of alphanumeric displays 20 (e.g., such as the 23 character alphanumeric display marketed by Vorne Industries, Inc., Model No. 2015S-1-485-485-120-C), configured in serial fashion, as shown. The alphanumeric displays 20 in the illustrated embodiment include internal decoding circuitry to permit serial configuration. In addition, the computer system 50 is coupled via a RS-422 interface 92 to an I/O interface 94, which is a conventional de-multiplexor, which provides a serial to parallel interface (e.g., an Optimux 22 Series de-multiplexor), as shown.

The de-multiplexor 94 provides an interface to the computer system 50 and a set of cell control circuitry modules 96, as shown. Each component selection cell utilizes a cell control circuitry module 96, and the system, as illustrated, is designed to accommodate fifteen cells, as shown. The cell circuitry 96 is configured to couple to each other via a bus 98, as shown, in a series structure, and then cell control circuitry is coupled to the de-multiplexor 94 via the outgoing data and address bus 100 and the incoming display status buses 102, as shown. Each cell control circuitry module 96 is coupled to an array of bin display circuits 104, 105 which are coupled to the cell circuitry 96 in series via a bus 106, as shown. In the illustrated embodiment, the bin displays may include up to 32 display circuits 104, 105 in series and up to 5 sets of such series display circuits, as shown in FIG. 3. This arrangement may also be used for flow rack displays as well. For example, the row Y5 shown in FIG. 3 could be 13 used for the flow rack while rows Y1–Y4 could be used for bin displays.

FIG. 4 shows a detail block diagram illustrating a specific embodiment of the cell control circuitry module 96 of FIG. 3. The cell control circuitry 96 comprises a data bus 110, an address and strobe bus 112, and a cell address bus 114, as shown. Each of these buses are coupled from the previous cell module, or from the de-multiplexor in the case of the first cell control circuitry module 96. The data bus 110 is coupled to a line driver 116 (e.g., a 74LS244 marketed by Texas Instruments, Inc.) and a line driver 120 (e.g., a 746LS241 marketed by Texas Instruments, Inc.), as shown. The line driver 116 couples the data signal to the next cell module, and the driver 120 couples the data to the bin display circuits 104, 105 via the buses 122, 124 and 126.

The address and strobe bus 112 is coupled to a line driver 128, which couples the address and strobe signal to the next cell control circuitry module. The address and strobe bus 112 is also coupled to a line driver 130, which couples the address and strobe information to the bin displays 104, 105 via a bus 132 and via signal lines 136 and 138. The cell address bus 114 is coupled to the select logic 140 and through the select logic 140 to a line driver 142, which couples the cell address signals to the next cell control circuit 96. A line driver 144 couples display status information from a bus 102 to the previous cell control circuitry module via a bus 102, as shown. The select logic 140 couples a select control signal to the drivers 130 and 120 via a select control signal line 150, as shown. In addition, an OR-Gate 152 couples a control signal to the driver 144 via a control signal line 154, in response to the display status lines 156 from the five series sets of bin displays 104, 105 (See FIG. 5A).

Figure 5A:
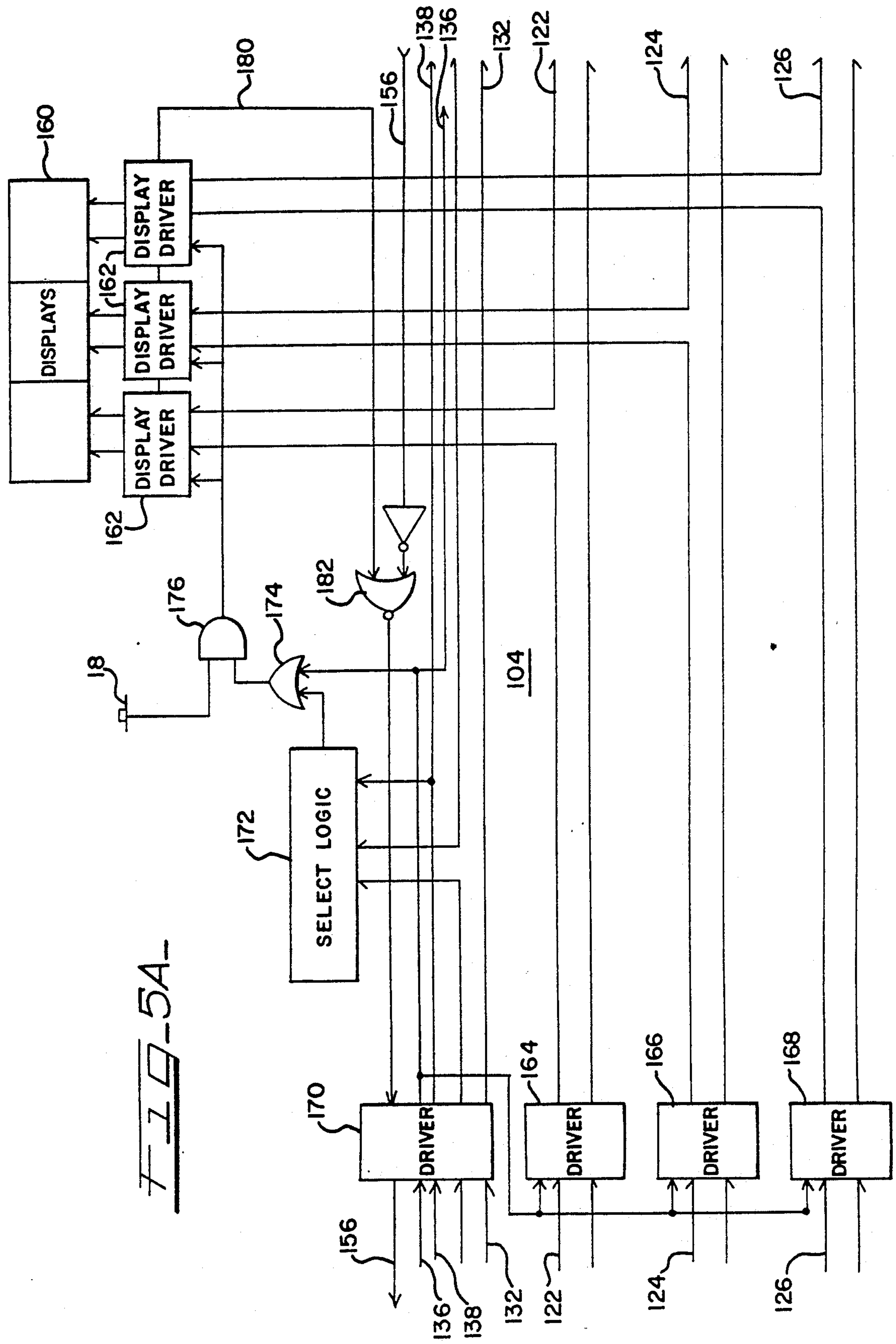
FIG. 5A is a detailed block diagram illustrating a specific embodiment of the display circuitry shown in FIG. 4.
Figure 5B:
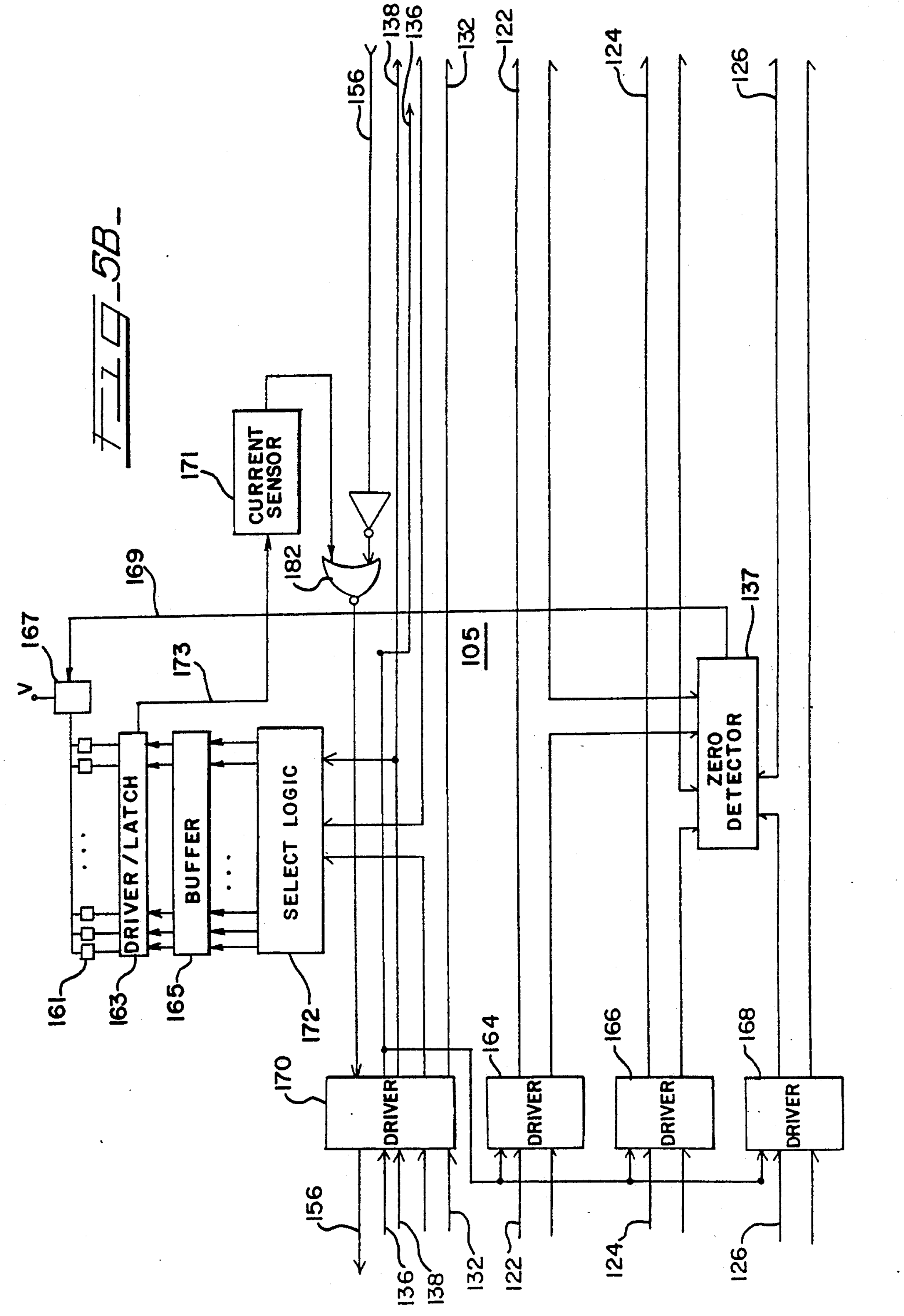
FIG. 5B is a detailed block diagram illustrating a specific embodiment of the pushbutton display circuitry shown in FIG. 4.

Referring now to FIG. 5A, there is shown a detailed block diagram illustrating a specific embodiment of the bin numeric display circuitry 104 of FIG. 3. The bin display circuits 104 are coupled in series with up to 32 devices in series, and comprise a LED display 160 (e.g., a Monsanto 6960) of three digits, which are driven by a set of latch display drivers 162 (e.g., a 9374 latch display driver such as marketed by Texas Instruments Corp.). Coupled into the circuit 104 is data from the data buses 122, 124 and 126 from the previous bin display circuit, or, in the case of the first circuit in the series, from the cell control circuitry module 96. This data is coupled through a set of line drivers 164, 166, 168 (e.g., 74LS241 marketed by Texas Instruments, Inc.), and is coupled respectively to the appropriate display drivers 162, thereby, providing the display data to the display device 160. The data from the drivers 164, 166 and 168 is coupled to the next bin display circuit via the buses 122, 124 and 126, as shown. In addition, address information is coupled into the bin display circuit 104 via the address bus 132 from the cell control circuitry module 96 if the circuit is the first in the bin display control series, and from the previous bin display circuitry if it is not the first in the series. This address information is coupled through a line driver 170 to the display select logic 172, and through to the next bin display circuit via the bus 132. In addition, the two control signal lines 136 and 138 are coupled through the driver 170.

The signal on the line 138 is a strobe signal coupled through the driver 170 to the select logic 172, and continuing to the next bin control circuit via the line 138, as shown. The control signal on line 136 is the data clock signal, which is coupled through the driver 170 to the enable inputs of the data bus drivers 164, 166 and 168, as shown. In addition, the data enable signal is coupled through an OR-Gate 174 and on to the next bin display circuit via the line 136, as shown. The second input of the OR-Gate 174 is a control output from the select logic 172, which is ORed with the data enable signal, the output of which is coupled one of the inputs of an AND-Gate 176. The second of the input of the AND-Gate 176 is the output of the clearing switch 18. Thus when the switch 18 is activated, the displays are cleared, and when the appropriate address activates the select logic, the data on the data lines is clocked in to the display drivers. When the display driver is cleared by the reset button, a signal is generated on the line 180 which is ORed in an OR-Gate 182 with a display status signal coupled from the next bin display on the line 156, as shown. These two signals are ORed by the OR-Gate 182, resulting in a signal which indicates when the display has been cleared on the previous display circuits as well as the instant display circuit, and that signal is coupled through the driver 170, and out through the next circuit in the series via the display status line 156. Thus at the end of the series, the Ored signals provide a signal which indicates when all the displays in that series have been cleared.

FIG. 5B illustrates a detailed block diagram of a specific embodiment of the bin pushbutton display circuitry 105 of FIG. 3 which may also be utilized as flow rack display circuitry. The pushbutton display circuitry 105 may be coupled in series with up to 32 other display devices in series, and comprises a set of 16 conventional backlighted pushbutton switches 161 which are driven by a set of latch/drivers 163, which in the illustrated embodiment are conventional Silicon Controlled Rectifiers (SCRs). Data is coupled into the circuit 105 from the data buses 122, 124 and 126 from the previous bin display circuit, or in the case of the first circuit in the series, from the cell control circuitry module 96. This data is coupled through a set of line drivers 164, 166, 168 (corresponding to those in FIG. 5A) to a zero detector 137, as shown. The data from the drivers 164, 166 and 168 is also coupled to the next bin display circuit via the buses 122, 124, and 126, as shown. Address information is coupled into the bin display circuit 104 via the address bus 132 from the cell control circuitry module 96 if the circuit is the first in the bin display control series, and from the previous bin display circuitry if it is not the first in the series. This address information is coupled through a line driver 170 to the display select logic 172, and through to the next bin display circuit via the bus 132. In addition, the two control signal lines 136, and 138 are coupled through the driver 170.

The signal on the line 138 is a strobe signal which is coupled to the select logic 172 and continuing to the next bin control circuit via the line 138, as shown. The control signal on the line 136 is the data clock signal which is coupled to the enable inputs of the data bus drivers 164, 166 and 168, as shown. The data enable signal is also coupled through to the next bin display circuitry via the line 136.

When an address from the address bus 132 is coupled into the select logic, the appropriate output of the select logic is activated and coupled to a buffer 165. The signal then is applied through the buffer 165 to the appropriate SCR of latch/driver 163 activating the corresponding pushbutton switch lights 161. Each pushbutton switch light 161 is turned off when the pushbutton is pressed during parts kit assembly. The cathode of each SCR is coupled via a conductor 173 to a current sensor 171, as shown. The current sensor detects when all 16 of the pushbutton switch lights 161 have been turned of and generates a signal which is ORed in an OR-gate 182 with a display status signal coupled from the next bin display circuit on the conductor 156. These two signals are ORed by the OR-gate 182 resulting in a signal which indicates when the display has been cleared on the previous bin display circuits as well as all pushbutton lights the instant bin display circuit, and that signal is coupled through the driver 170, and out through the next circuit in the series via the display status line 156. Thus, at the end of the series, the ORed signal provides a signal which indicates when all the displays in that series have been cleared. All the pushbutton switch lights 161 on the display circuit 105 can be cleared simultaneously by providing all zeros on the data buses 122, 124 and 126 while providing the appropriate address on the bus 132. The all zero data is detected by the zero detector 137 which generates a signal which activates a relay 167 via a conductor 169, as shown. This activation opens the relay 167 cutting off the supply voltage to all the pushbutton switch lights 161 simultaneously thereby clearing all of them.

FIG. 5C is a timing diagram illustrating the relationship between the strobe timing signal on the line 138 and the data enable clock on line 136 and the address enable signal, which is on the address bus 132.

Referring now to FIG. 6 and FIGS. 7A–7M, there is shown generalized flow diagrams illustrating the methodology and structural flow for the programs for a specific embodiment of the manufacturing system according to the invention. The systems programs are configured to run under a multi-tasking system such as Double-DOS which runs two programs simultaneously. The two programs are (1) a KIT program which primarily handles batch file maintenance and scheduling and (2) DISPLAY which primarily functions as the real time program that controls the displays. The programs communicate with each other through a file stored in virtual memory.

Figure 6:
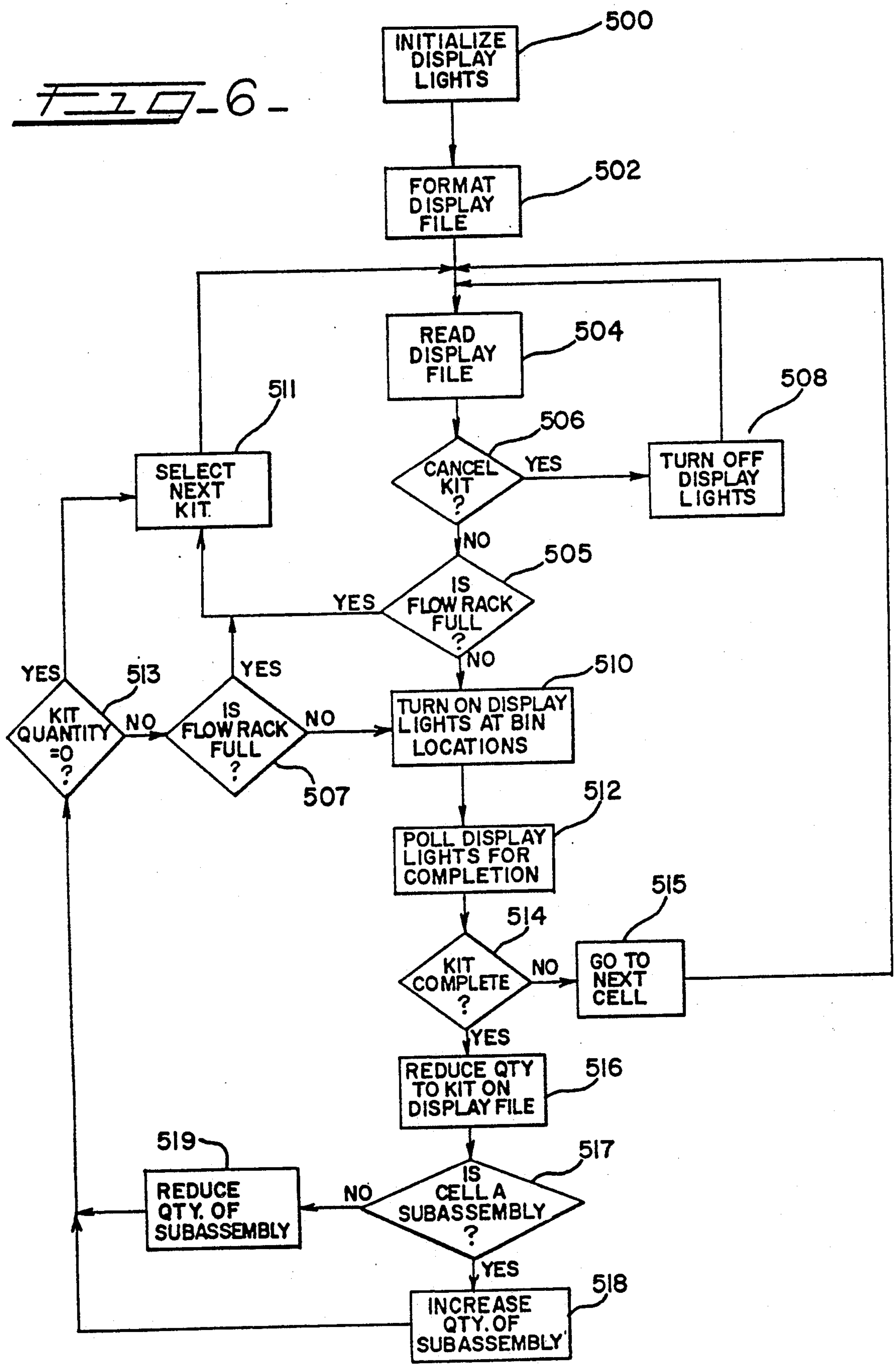
FIG. 6 is a detailed flow diagram illustrating the methodology and structural flow for a DISPLAY program for a specific embodiment of the manufacturing system according to the invention.

FIG. 6 shows a block diagram of the DISPLAY program which begins at block 500 where the display lights are initialized. Program control immediately proceeds to block 502 where the display file is formatted after which program control proceeds to block 504 where the display file information is read into memory. After the display file is read, a logic function is performed as illustrated by block 506 where it is determined whether the parts kitting process should be cancelled or not. If the result is affirmative, program flow branches to block 508 where the display lights are turned off, and then back to block 504, as shown. If the result at block 506 is negative, processing flow is directed to block 505 where a check is made to determine if the flow rack is full. If the result at block 505 is affirmative, processing flow branches to block 511 for selection of the next kit to be assembled, as shown. If the result at block 505 is negative, processing flow is directed to block 510, where the display lights at the appropriate bins are turned on. The display lights are then polled for completion of the parts selection for the desired assembly, and a logical test is performed to determine whether the process has been completed as illustrated by blocks 512 and 514.

If the kitting process has not been completed, processing control branches to block 515 where the system goes to the next cell and repeats the display process by returning to block 504, as shown. If the kitting process has been completed, processing flow proceeds to block 516 where the inventory values within the computer are updated to indicate the reduction in quantities in the parts bins. A test is then performed at block 517 to determine the cell is a subassembly cell and if affirmative the quantity of subassemblies is increased as illustrated by block 518, and process flow then branches to block 513, as shown. If the result is negative at block 517, the quantity of subassemblies is reduced as illustrated by block 519. Processing control then branches back to block 513, where a test is performed to determine whether the kit quantity has reached zero. If the result is negative, processing flow branches to block 507 where a test is performed to determine if the flow rack is full. If the result is negative, processing control branches back to block 510 and if the result is affirmative, processing control branches to block 511, as shown. If the result at block 513 is affirmative, the next kit is selected, as illustrated at block 511, after which program control returns to block 504, as shown.

Figure 7A:
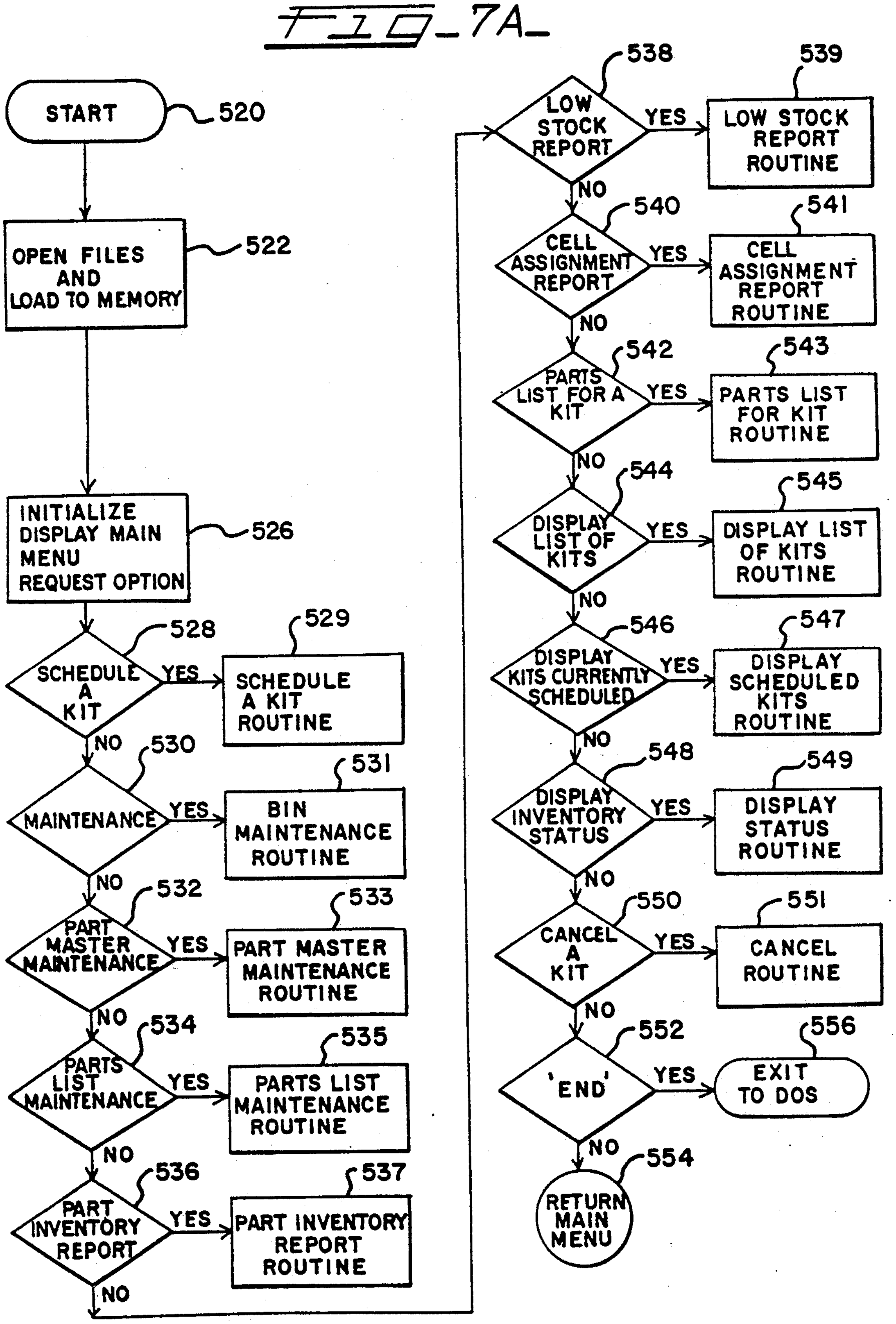
FIG. 7A–7M are detailed flow diagrams illustrating the methodology and structural flow for the KIT program for a specific embodiment of the manufacturing system according to the invention.

FIGS. 7A–7M show generalized flow diagrams illustrating the methodology and structural flow for a specific embodiment of the KIT program and associated subroutines. In FIG. 7A, the KIT program starts at block 520 with processing beginning at block 522, where initialization, opening and loading of files into active memory is performed. After the initialiZation process 522 the main menu is initialized and displayed, as illustrated at block 526, permitting the opera&:or to request a variety of options. As shown, the program then performs a series of tests to determine what selection has been made for the operator from the main menu.

Beginning with block 528, a test is performed to determine whether a scheduling of a kit has been selected, and if the result is affirmative, program flow branches to the schedule subroutine as indicated as block 529. If the result at block 528 is negative, program flow proceeds to block 530 to determine whether a bin maintenance process has been selected, and if affirmative, processing flow branches to the bin maintenance subroutine as indicated by block 531, and if the result if negative, program flow is directed to block 532. At block 532, a test is performed to determine whether a part master maintenance function has been selected and if the result is affirmative, processing flow branches to the part master maintenance subroutine, as indicated at block 533, and if the result is negative, processing flow is directed to block 534. At block 534, a test is performed to determine whether a parts list maintenance has been selected, and if affirmative, processing flow branches to the parts list maintenance subroutine, as illustrated by block 535, and if negative, processing flow is directed to block 536, as shown. At block 536, a test is performed to determine whether a parts inventory report function has been selected, and if affirmative, processing flow branches to the parts inventory report subroutine, as illustrated by block 537, and if the result is negative, processing flow proceeds to block 538.

A test is performed at block 538 to determine whether a low stock report function has been selected and if the result is affirmative, program flow branches to the low stock report subroutine, as indicated at block 539, and if the result is negative, processing flow is directed to block 540. At block 540, a test is performed to determine whether the cell assignment report function has been selected, and if the result is affirmative, processing flow branches to the cell assignment report subroutine, as indicated by block 541, and if the result is negative, processing flow continues directly to block 542. At block 542, a test is performed to determine whether a parts list for a kit has been requested, and if the result is affirmative, processing flow branches to the parts list subroutine, as indicated at block 543, and if the result is negative, processing flow proceeds directly to block 544. At block 544, a test is performed to determine whether a display of a list of kits has been requested, and if the result is affirmative, processing flow branches to the display list subroutine, as illustrated at block 545, and if the result is negative, processing flow is directed to block 546. At block 546, a test is performed to determine whether a display kit currently scheduled has been requested, and if the result is affirmative, processing flow branches to the display kit subroutine, as illustrated by block 547, and if the result is negative, processing flow continues to block 548.

At block 548, a test is performed to determine whether a display of inventory status has been requested, and if the result is affirmative, processing flow branches to the display inventory subroutine, as illustrated by block 549, and if the result is negative, processing flow proceeds to block 550. At block 550, a test is performed to determine whether a cancellation of a kit has been requested, and if the result is affirmative, processing flow branches to the kit cancel subroutine, as illustrated by block 551, and if the result is negative, processing flow is directed to block 552. At block 552, a test is performed to determine whether an end has been requested, and if the result is affirmative, processing flow branches to the disk operating system, as indicated by block 556, and if the result is negative, the processing flow branches back to the main menu of block 526, as illustrated at block 554.

Figure 7B:
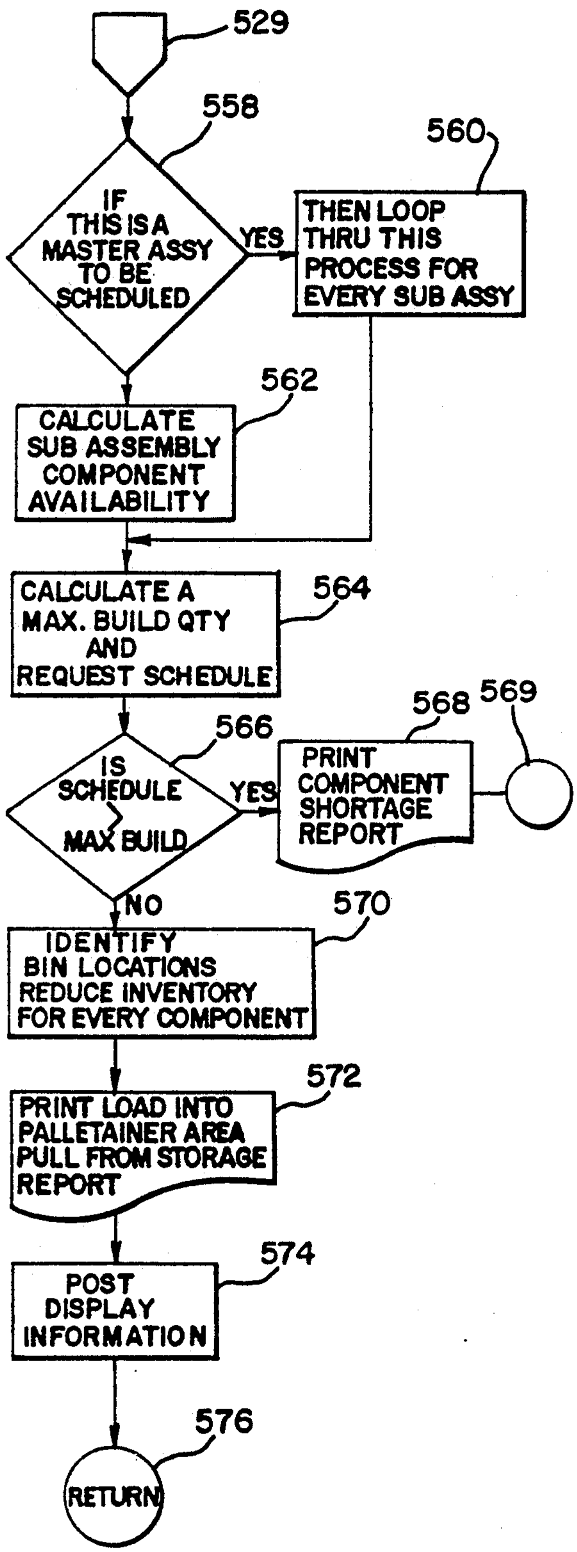

Referring now to FIG. 7B, there is shown a flow diagram illustrating the methodology and structural flow for the schedule subroutine which is entered at 529, as shown. Processing begins with a test to determine whether a master assembly is to be scheduled, as shown at block 558. If the result at block 558 is affirmative, processing flow branches to block 560, where control flags are initialized to set up a process to loop through the subassembly calculations for each subassembly of the master assembly, after which processing flow proceeds to block 564. If the result at block 558 is negative, processing flow proceeds directly to block 562 where subassembly component availability calculation is made to determine parts availability after which a maximum build quantity is calculated and a schedule is requested as illustrated at block 564. Processing flow then continues to block 566, where a test is performed to determine whether the schedule request is greater than the maximum build quantity calculated, and if the result is affirmative, a component shortage report is printed, as illustrated at block 568, after which processing flow returns to the display menu at block 526 of FIG. 7A, as shown at block 569. If the result at block 566 is negative, processing flow proceeds to block 570 where the bin locations are identified and the inventory for each component in each bin is reduced. Processing flow then proceeds to block 572 where a printout of subassemblies loaded on the palletainer is provided based on a storage report, and after which the information is displayed, as illustrated at block 574, after which processing flow returns to the main menu of block 526, as illustrated at block 576.

Figure 7C:
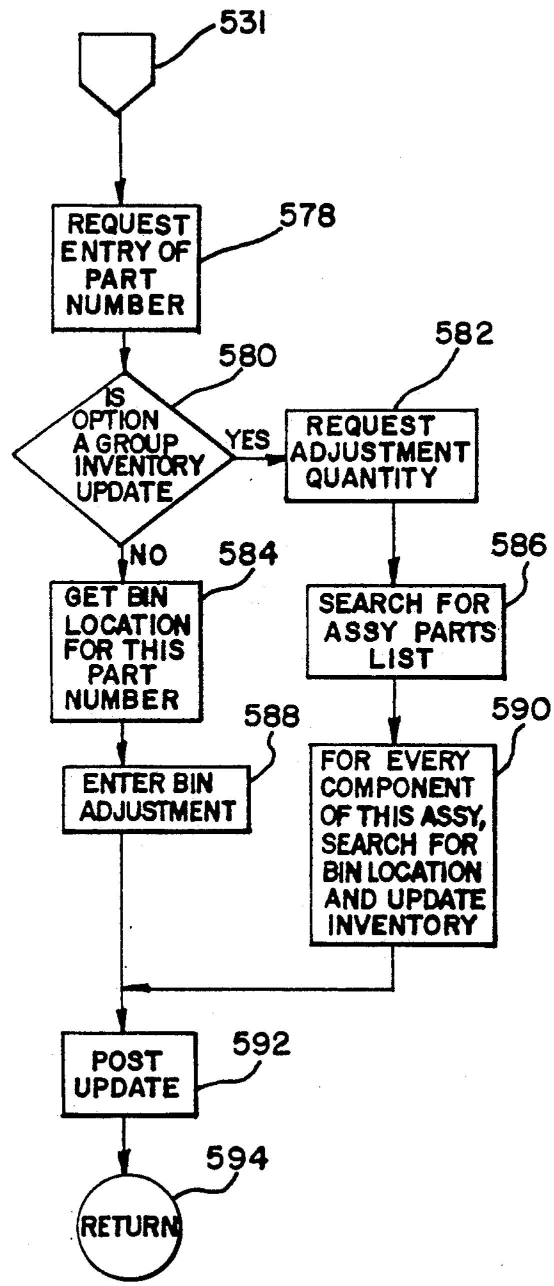

The methodology and structural flow of a specific embodiment of a bin maintenance subroutine is shown in detail in the flow diagram of FIG. 7C, which is entered at block 531 and immediately proceeds to block 578, where entry of a part number is requested after which processing flow proceeds to block 580. At block 580, a logical test is performed to determine if a group inventory update has been requested, and if the result is affirmative, processing flow branches to block 582, where an adjustment quantity is requested from the operator at block 582, subsequently a search for the assembly parts list is performed at block 586 and for every component of the assembly, a search is made for the bin location, followed by an update of the inventory, as illustrated by block 590 after which process flow proceeds to block 592, as shown. If the result at block 580 is negative, processing flow continues to block 584, where the bin location for the part number is identified and then, as indicated at block 588, the adjustment to the bin contents is entered and then the updates are posted, as indicated at block 592. Process control then returns to the main menu of block 526, as illustrated by block 594.

Figure 7D:
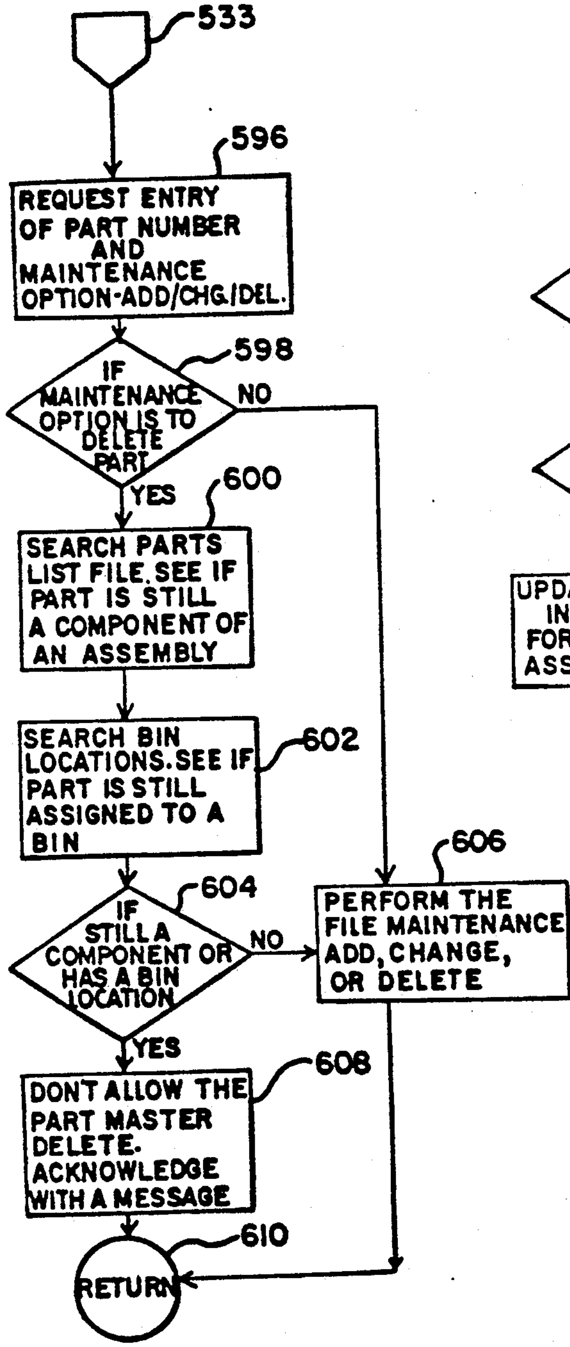

Referring now to FIG. 7D, there is shown a generalized flow diagram illustrating the methodology and structural flow for the parts master maintenance subroutine, which is entered at block 533, as shown. Processing begins at block 596 where a parts number entry is requested, as well as maintenance options (such as add, change or delete), after which a logic test is performed to determine if the maintenance option is to delete a part, as shown at block 598. If the result at block 598 is negative, processing control branches to block 606, as shown, and if the result at block 598 is affirmative, processing flow proceeds to block 600 where the parts list file is searched to determine if the part number entered is still a component of an assembly. Processing flow then continues to block 602 where bin locations a:.e searched to determine if the part is assigned to a bin, after which processing flow proceeds to block 604, where a test is performed to determine if the component or bin location still exists. If the result at block 604 is negative, processing flow branches to block 606, where file maintenance is performed to add, change or delete the part number, after which processing flow continues directly to block 610. If the result at block 604 is affirmative, the deletion from the master part list is inhibited and a acknowledged message is generated as illustrated by block 608, after which processing control returns to the main menu of block 526, as illustrated by block 610.

Figure 7E:
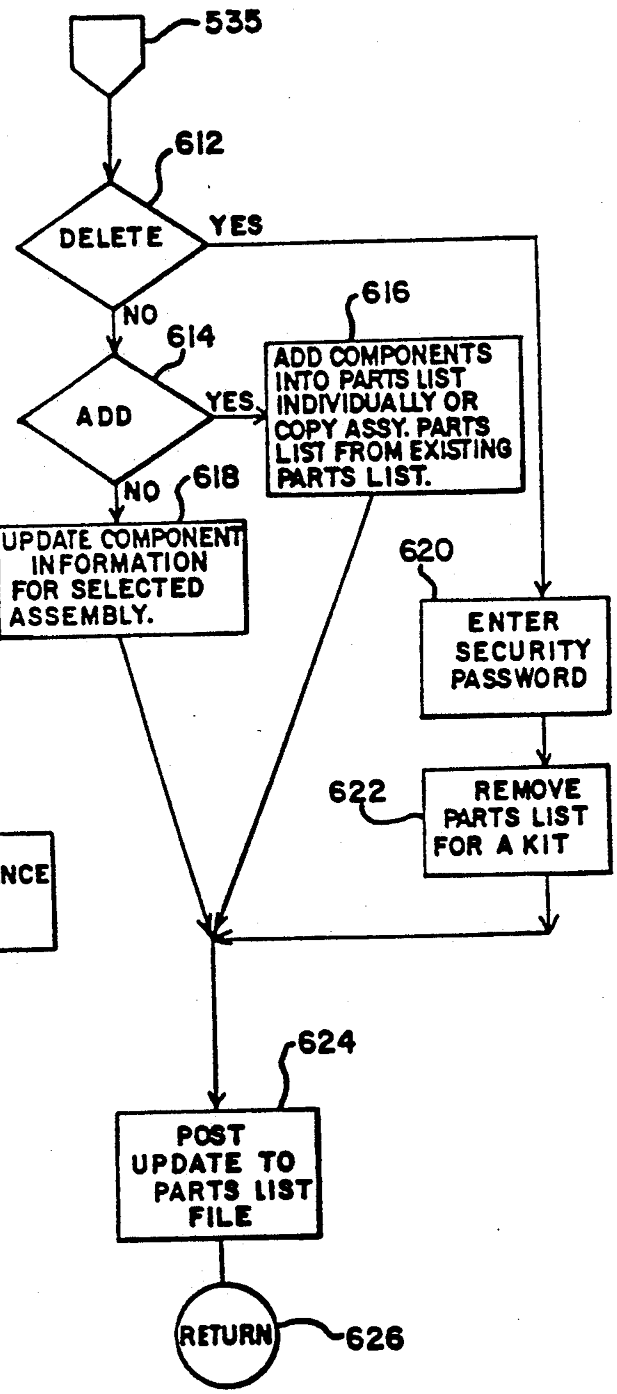

The methodology and structural flow for a specific embodiment of a parts list maintenance subroutine, which performs the parts list maintenance functions, is shown in the flow diagram of FIG. 7E and is entered, as shown, at block 535. Processing begins at block 612, where a test is performed to determine whether a delete has been requested, and if the result is affirmative, processing flow branches to block 620, where a security password is requested, and then to block 622, where the removal of the parts list to be deleted is performed after which processing flow continues to block 624, as shown. If the result at block 612 is negative, processing flow is directed to block 614, where a test is performed to determine whether the function to be performed is an addition, and if the result is affirmative, processing flow branches to block 616, as shown. At block 616, the components to be added to a parts list are added or parts lists from existing lists are copied over, after which processing flow proceeds to block 624, as shown. If the result at block 614 is negative, processing flow continues to block 618, where component information is updated for the selected assembly, and processing flow then proceeds to block 624, at which the updates are posted to the parts list file. Subsequently, processing control returns back to the main menu of block 526, as illustrated by block 626.

Figure 7F:
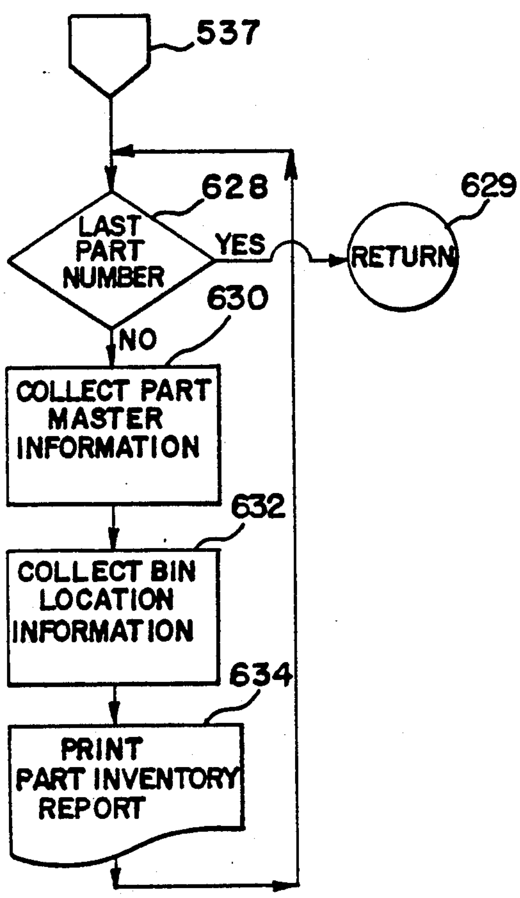

FIG. 7F is a flow diagram illustrating the processing methodology and structural flow for a specific embodiment of the parts inventory report subroutine, which is entered, as shown, at block 537. Processing begins with block 628, where a test is performed to determine whether the last part number report has been printed, and if the result is affirmative, processing flow returns to the main menu of block 526, as illustrated by block 629. If the result at block 628 is negative, processing flow proceeds to block 630 where the master parts information is collected, and then to block 632, where the bin location information is collected. Processing flow then continues to block 634, where the part inventory information report is printed and processing control then branches back to block 628, as shown.

Figure 7G:
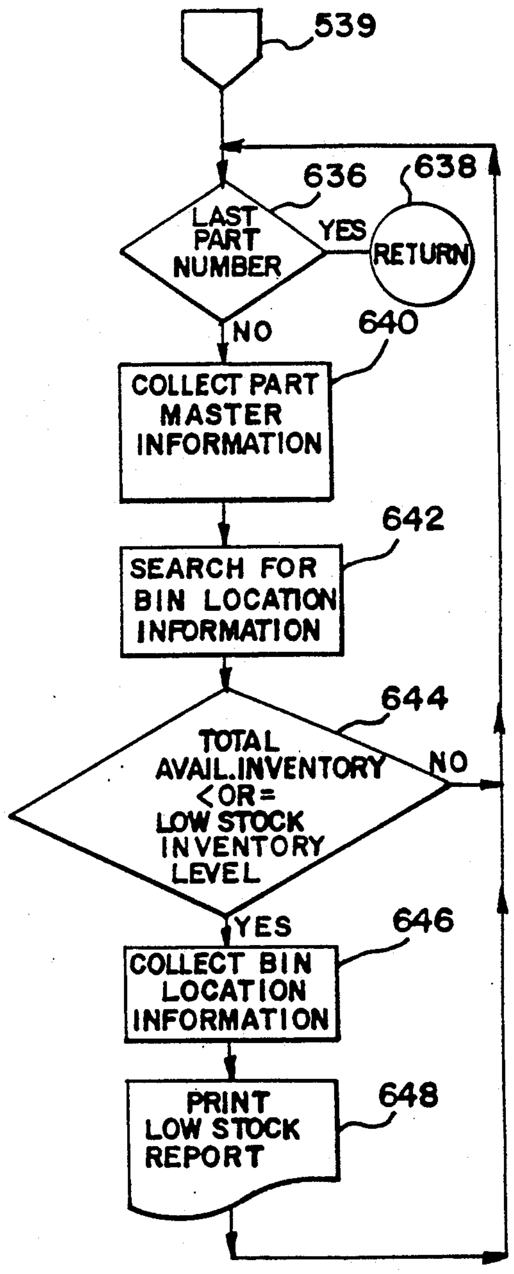

Referring now to FIG. 7G, there is shown a generalized flow diagram illustrating the methodology and structural flow for a specific embodiment of the low-stock report subroutine, which is entered, as shown, at block 539. Processing begins with block 636, where a last part number test is performed to determine if the last part number of the report has been reached, and if the result is affirmative, processing flow returns to the main menu of block 526, as shown at block 638. If the result at block 636 is negative, processing flow proceeds to block 640, where the part master information is collected, and then to block 642, where a search for the bin location information is performed. Processing flow then proceeds to block 644, where a test is performed to determine whether the total available inventory is greater than or equal to the predetermined low stock inventory level. If the result is negative, processing flow branches back to block 636, as shown, and if the result is affirmative, processing flow proceeds to block 646, where bin location information is collected. Processing flow then continues to block 648, where the low-stock report is printed, and after which processing flow branches back to block 636, as shown.

Figure 7H:
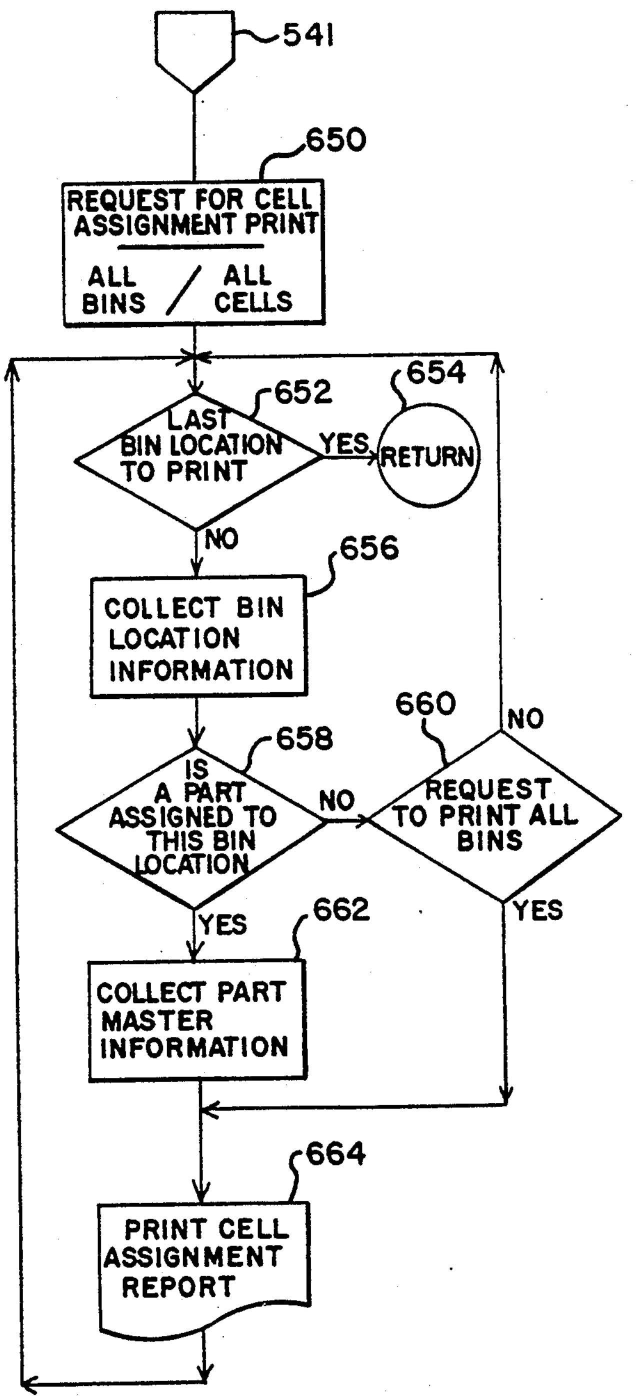

The methodology and structural flow for a specific embodiment of a cell assignment report subroutine is illustrated in the flow diagram of FIG. 7H, which is entered at block 541, as shown. Processing begins at block 650, where a request is made for the cell assignment to be printed, as well as for a selection of printing of a report for all bins or all cells. Processing flow then proceeds to block 652, where a test is performed to determine whether the last bin location to be printed has been reached, and if the result is affirmative, processing control returns to the main menu of block 526, as illustrated at block 654. If the result is negative, the bin location information is collected, as shown at block 656, and then a test is performed to determine whether the part is assigned to a bin location, as illustrated by block 658. If the result is negative, a test is performed to determine whether a request was made to print all bins, as shown at block 660. If the result is affirmative, processing flow proceeds to block 664, as shown, and if the result is negative, processing flow branches back to block 652. If the result at block 658 is affirmative, processing flow continues to block 662, where the master part information is collected, after which processing flow proceeds to block 664, where the cell assignment report is printed, and processing control branches back to block 652, as shown.

Figure 7I:
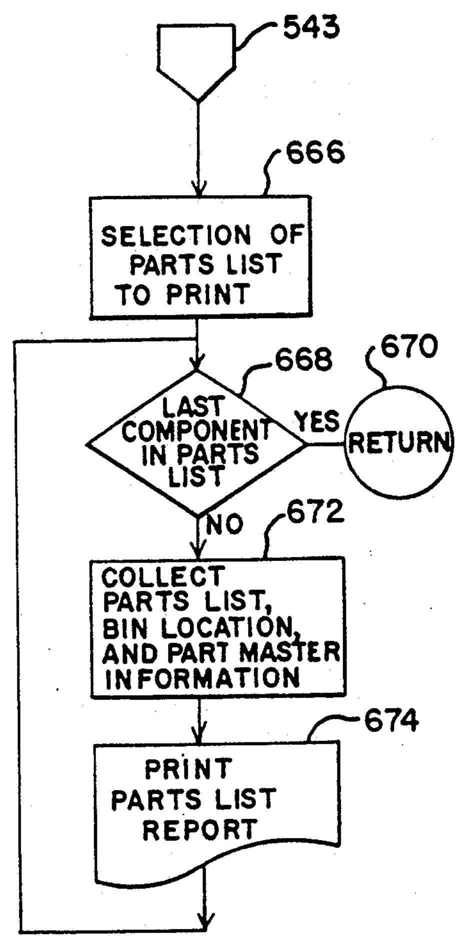

In FIG. 7I, a flow diagram is shown illustrating the processing methodology and structural flow for a specific embodiment of the parts list for a kit subroutine, which is entered, as shown, at block 543. Processing begins at block 666 with the selection of parts lists to be printed, after which a test is performed to determine whether the last component in the parts list has been reached, as shown at block 668. If the result at block 668 is affirmative, processing control branches back to the main menu of block 526, as illustrated by block: 670, and if the result is negative, processing flow continues to block 672. At block 672, the parts list, bin location and master part information is collected, then the parts list report is printed, as shown at block 674, after which processing flow branches back to block 668, as shown.

Figure 7M:
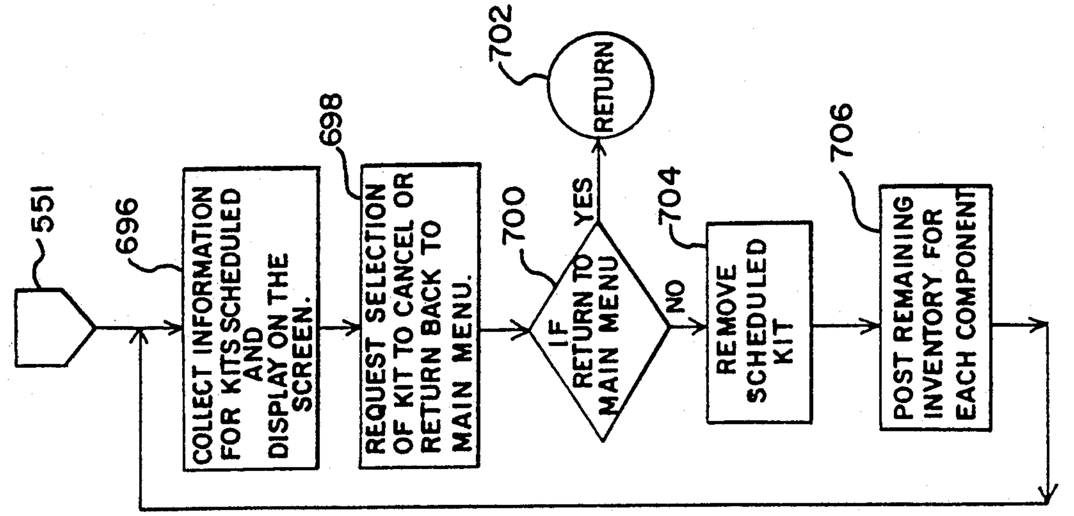
Figure 7L:
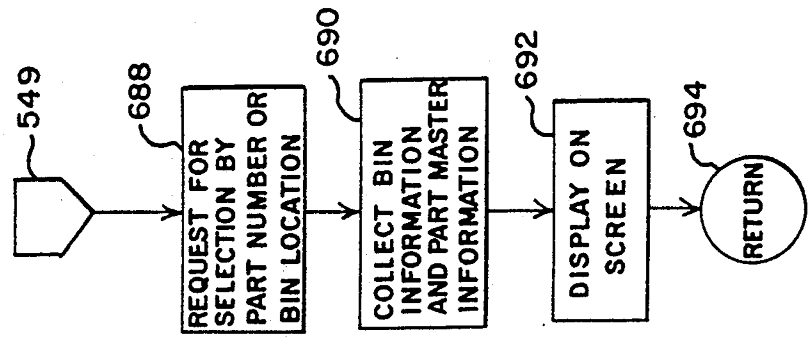
Figure 7J:
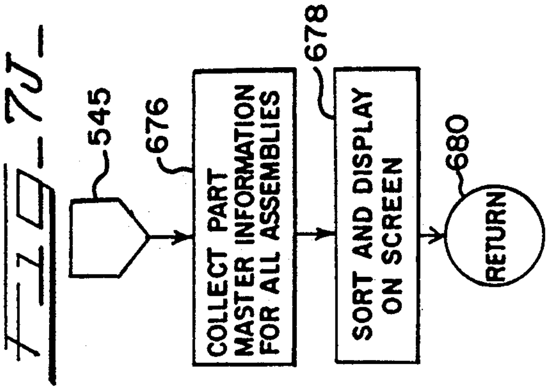

Referring now to FIG. 7J, there is shown a generalized flow diagram illustrating the methodology and structural flow for a specific embodiment of a display list of kits subroutine, which is entered, as shown, at block 545. Processing begins with the collection of part master information for the assemblies, as illustrated by block 676, after which a sort of the collected information is performed and the result is displayed on screen, as illustrated at block 678. Program control then returns to the main menu of block 526, as illustrated at block 680.

Figure 7K:
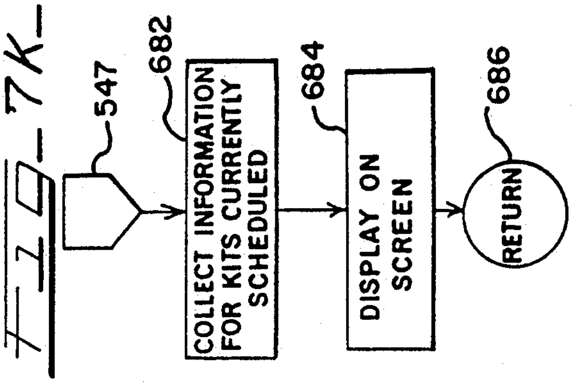

FIG. 7K is a flow diagram illustrating the processing methodology and structural flow for a specific embodiment of a display kit currently scheduled routine, which is entered, as shown, at block 547. Processing begins at block 682, where information for kits currently scheduled is collected, then the results are displayed on screen, as illustrated by block 684, after which program control returns to the main menu of block 526, as shown at block 686.

In FIG. 7L, a flow diagram is shown illustrating the processing methodology and structural flow for a specific embodiment of a display inventory status subroutine, which is entered, as shown at block 549. Processing begins with block 688, where a request is made for selection of a part number or bin location, after which bin information and part master information is collected, as illustrated at block 690. The information is then displayed on screen, as illustrated by block 692, after which processing control returns to the main menu of block 526, as illustrated by block 694.

Referring now to FIG. 7M, there is shown a generalized flow diagram illustrating the methodology and structural flow for a specific embodiment of a cancel kit subroutine, which is entered, as shown, at block 551. Processing begins at block 696, where kits schedule information is collected and displayed on screen, after which a request is made to select a kit to cancel or to return back to the main menu, as illustrated by block 698. Processing flow then proceeds to block 700 where a test is performed to determine whether a selection has been made to return to the main menu, and if the result is affirmative, processing control returns to the main menu of block 526, as illustrated by block 702. If the result at block 700 is negative, processing flow continues to block 704, where the scheduled kit is removed and after which the remaining inventory is posted for each component, as illustrated by block 706. Processing flow then branches back to block 696, as shown.

A specific program listing for use with the illustrated embodiment in which the microcomputer 52 is, for example, a PC-AT such as marketed by International Business Machines Corp., is shown for the DISPLAY program in Appendix B, and for the KIT program in Appendix A which is made up of a series of subprograms. The program shown is a hexadecimal object code listing having relative hexadecimal program address on the left column, followed by a hexadecimal representation of the object code. The program of Appendix A and Appendix B may be loaded and run after first loading an operating system such as MS-DOS marketed by Microsoft, Inc., and Double-DOS marketed by Soft Logic Solutions Corp., together with the International Business Machines Corp. basic compiler run time module.

Specific embodiments of the novel manufacturing system according to the invention have been described for the purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all modifications, variations or equivalents that fall within the true spirit and scope of the basic underlying principles disclosed and claimed herein.

APPENDIX A

```
00000000  4D 5A C7 01 1E 00 26 00  20 00 79 03 FF FF F5 06
00000010  00 02 12 4C 30 00 00 00  1E 00 00 00 01 00 12 00
00000020  00 00 14 00 00 00 16 00  00 00 33 00 00 00 38 00
00000030  00 00 33 01 00 00 4F 01  00 00 B9 01 00 00 E5 01
00000040  00 00 01 02 00 00 9C 02  00 00 D5 02 00 00 45 1D
00000050  00 00 63 1D 00 00 81 1D  00 00 9F 1D 00 00 FD 1D
00000060  00 00 27 1E 00 00 AB 1E  00 00 D5 1E 00 00 15 1F
00000070  00 00 39 1F 00 00 5D 1F  00 00 81 1F 00 00 08 24
00000080  00 00 47 24 00 00 D1 24  00 00 02 2B 00 00 41 2B
00000090  00 00 69 2B 00 00 62 2C  00 00 86 00 DF 02 1B 00
000000A0  67 03 01 02 67 03 06 02  67 03 11 02 67 03 32 02
000000B0  67 03 3D 02 67 03 00 00  00 00 00 00 00 00 00 00
000000C0  00 00 00 00 00 00 00 00  00 00 00 00 00 00 00 00
000000D0  00 00 00 00 00 00 00 00  00 00 00 00 00 00 00 00
000000E0  00 00 00 00 00 00 00 00  00 00 00 00 00 00 00 00
000000F0  00 00 00 00 00 00 00 00  00 00 00 00 00 00 00 00
00000100  00 00 00 00 00 00 00 00  00 00 00 00 00 00 00 00
00000110  00 00 00 00 00 00 00 00  00 00 00 00 00 00 00 00
00000120  00 00 00 00 00 00 00 00  00 00 00 00 00 00 00 00
00000130  00 00 00 00 00 00 00 00  00 00 00 00 00 00 00 00
00000140  00 00 00 00 00 00 00 00  00 00 00 00 00 00 00 00
00000150  00 00 00 00 00 00 00 00  00 00 00 00 00 00 00 00
00000160  00 00 00 00 00 00 00 00  00 00 00 00 00 00 00 00
00000170  00 00 00 00 00 00 00 00  00 00 00 00 00 00 00 00
00000180  00 00 00 00 00 00 00 00  00 00 00 00 00 00 00 00
```

| | | | | | | | | | | | | | | | | |
|---|---|---|---|---|---|---|---|---|---|---|---|---|---|---|---|---|
| 00000190 | 00 | 00 | 00 | 00 | 00 | 00 | 00 | 00 | 00 | 00 | 00 | 00 | 00 | 00 | 00 | 00 |
| 000001A0 | 00 | 00 | 00 | 00 | 00 | 00 | 00 | 00 | 00 | 00 | 00 | 00 | 00 | 00 | 00 | 00 |
| 000001B0 | 00 | 00 | 00 | 00 | 00 | 00 | 00 | 00 | 00 | 00 | 00 | 00 | 00 | 00 | 00 | 00 |
| 000001C0 | 00 | 00 | 00 | 00 | 00 | 00 | 00 | 00 | 00 | 00 | 00 | 00 | 00 | 00 | 00 | 00 |
| 000001D0 | 00 | 00 | 00 | 00 | 00 | 00 | 00 | 00 | 00 | 00 | 00 | 00 | 00 | 00 | 00 | 00 |
| 000001E0 | 00 | 00 | 00 | 00 | 00 | 00 | 00 | 00 | 00 | 00 | 00 | 00 | 00 | 00 | 00 | 00 |
| 000001F0 | 00 | 00 | 00 | 00 | 00 | 00 | 00 | 00 | 00 | 00 | 00 | 00 | 00 | 00 | 00 | 00 |
| 00000200 | 62 | 6D | 44 | 49 | 53 | 50 | 4C | 41 | 59 | 54 | 00 | 00 | C2 | 31 | 40 | 14 |
| 00000210 | 8C | 2D | E9 | 02 | 67 | 03 | 9D | 03 | 40 | 14 | 00 | 00 | 40 | 14 | 40 | 14 |
| 00000220 | A0 | 2D | 0A | 00 | 00 | 00 | 00 | 00 | 00 | 00 | 00 | 00 | FF | FF | 80 | 00 |
| 00000230 | 9A | 00 | 00 | 67 | 03 | 9A | 77 | 00 | DF | 02 | BB | FF | FF | CD | 3E | 32 |
| 00000240 | 33 | DB | CD | 3E | 3C | B8 | 01 | 00 | E9 | 1A | 00 | 8B | 1E | 6E | 2C | 8B |
| 00000250 | D3 | D1 | E3 | D1 | E3 | 81 | C3 | 12 | 2B | 87 | D3 | 8B | CB | BB | A0 | 2D |
| 00000260 | CD | 3F | 61 | 41 | 91 | A3 | 6E | 2C | 83 | 3E | 6E | 2C | 20 | 7E | DC | C7 |
| 00000270 | 06 | 70 | 2C | 00 | 00 | BB | B8 | 2D | BA | 72 | 2C | CD | 3F | 61 | C7 | 06 |
| 00000280 | 76 | 2C | 90 | 01 | C7 | 06 | 78 | 2C | 14 | 05 | 33 | DB | CD | 3E | 15 | C7 |
| 00000290 | 06 | 7A | 2C | 80 | 01 | 8B | 1E | 7A | 2C | CD | 3F | 57 | 8B | D3 | BB | 1A |
| 000002A0 | 00 | CD | 3D | 62 | 42 | 87 | DA | CD | 3F | 57 | BB | 1A | 00 | CD | 3D | 62 |
| 000002B0 | D1 | E3 | D1 | E3 | D1 | E3 | D1 | E3 | D1 | E3 | D1 | E3 | D1 | E3 | D1 | E3 |
| 000002C0 | 03 | DA | CD | 3E | 15 | C7 | 06 | 7C | 2C | 07 | 00 | A1 | 7C | 2C | D1 | E0 |
| 000002D0 | A3 | 7E | 2C | B8 | 03 | 00 | F7 | 2E | 7C | 2C | A3 | 80 | 2C | B8 | 06 | 00 |
| 000002E0 | F7 | 2E | 7C | 2C | A3 | 82 | 2C | B8 | 07 | 00 | F7 | 2E | 7C | 2C | A3 | 84 |
| 000002F0 | 2C | A1 | 7C | 2C | D1 | E0 | D1 | E0 | D1 | E0 | A3 | 86 | 2C | B8 | 0A | 00 |
| 00000300 | F7 | 2E | 7C | 2C | A3 | 88 | 2C | B8 | 0B | 00 | F7 | 2E | 7C | 2C | A3 | 8A |
| 00000310 | 2C | C7 | 06 | 8C | 2C | 03 | 00 | C7 | 06 | 8E | 2C | 04 | 00 | C7 | 06 | 90 |
| 00000320 | 2C | 05 | 00 | C7 | 06 | 92 | 2C | 06 | 00 | B8 | 88 | 2C | 50 | CD | 3E | 83 |
| 00000330 | 9A | 8A | 00 | DF | 02 | 1E | 07 | FC | E8 | 9C | 23 | C7 | 06 | 94 | 2C | 00 |
| 00000340 | C0 | B8 | 94 | 2C | 50 | B8 | 84 | 2C | 50 | CD | 3E | 83 | 9A | 8A | 00 | DF |
| 00000350 | 02 | 1E | 07 | FC | E8 | 80 | 23 | C7 | 06 | 96 | 2C | FF | 00 | C7 | 06 | 70 |
| 00000360 | 2C | 00 | 00 | 33 | C0 | E9 | 5F | 00 | 83 | 3E | 98 | 2C | 00 | 74 | 03 | E9 |
| 00000370 | 09 | 00 | C7 | 06 | 96 | 2C | 00 | 00 | E9 | 2C | 00 | 83 | 3E | 98 | 2C | 08 |
| 00000380 | 74 | 03 | E9 | 09 | 00 | C7 | 06 | 96 | 2C | F0 | 00 | E9 | 19 | 00 | 83 | 3E |
| 00000390 | 98 | 2C | 18 | 74 | 03 | E9 | 09 | 00 | C7 | 06 | 96 | 2C | F7 | 00 | E9 | 06 |
| 000003A0 | 00 | C7 | 06 | 96 | 2C | FF | 00 | B8 | 98 | 2C | 50 | B8 | 96 | 2C | 50 | B8 |
| 000003B0 | 80 | 2C | 50 | CD | 3E | 83 | 9A | 8A | 00 | DF | 02 | 1E | 07 | FC | E8 | 16 |
| 000003C0 | 23 | A1 | 98 | 2C | 05 | 08 | 00 | A3 | 98 | 2C | 83 | 3E | 98 | 2C | 28 | 7E |
| 000003D0 | 97 | C7 | 06 | 9A | 2C | 38 | 00 | B8 | 9A | 2C | 50 | B8 | 7E | 2C | 50 | CD |
| 000003E0 | 3E | 83 | 9A | 8A | 00 | DF | 02 | 1E | 07 | FC | E8 | EA | 22 | C7 | 06 | 9A |
| 000003F0 | 2C | 30 | 00 | B8 | 9A | 2C | 50 | B8 | 7E | 2C | 50 | CD | 3E | 83 | 9A | 8A |
| 00000400 | 00 | DF | 02 | 1E | 07 | FC | E8 | CE | 22 | BB | F4 | 24 | CD | 3F | 34 | C7 |
| 00000410 | 06 | 9C | 2C | 00 | 00 | B8 | 01 | 00 | E9 | 4C | 00 | BB | 9E | 2C | CD | 3F |
| 00000420 | 0F | 8B | D3 | BB | A0 | 2C | CD | 3F | 0F | 8B | CB | BB | A2 | 2C | CD | 3F |
| 00000430 | 0F | 83 | 3E | 9E | 2C | 00 | 7F | 03 | E9 | 36 | 00 | A1 | 9C | 2C | 40 | A3 |
| 00000440 | 9C | 2C | 8B | 3E | 6E | 2C | 8B | C7 | D1 | E7 | 89 | 5E | FA | 8B | 1E | 9E |
| 00000450 | 2C | 89 | 9D | AC | 2B | 8B | 1E | A0 | 2C | 89 | 9D | EC | 2B | 8B | 76 | FA |
| 00000460 | 8B | 1C | 89 | 9D | 2C | 2C | 40 | A3 | 6E | 2C | 83 | 3E | 6E | 2C | 20 | 7E |
| 00000470 | AA | BB | 01 | 00 | CD | 3E | 21 | C7 | 06 | A4 | 2C | 18 | 00 | C7 | 06 | A6 |
| 00000480 | 2C | FF | 00 | E8 | 51 | 22 | B8 | 90 | 2C | 50 | B8 | A4 | 2C | 50 | B8 | A6 |
| 00000490 | 2C | 50 | B8 | 8A | 2C | 50 | CD | 3E | 83 | 9A | 8A | 00 | DF | 02 | 1E | 07 |
| 000004A0 | FC | E8 | 33 | 22 | B8 | 01 | 00 | E9 | 04 | 00 | A1 | 6E | 2C | 40 | A3 | 6E |
| 000004B0 | 2C | 81 | 3E | 6E | 2C | 20 | 03 | 7E | F1 | C7 | 06 | A6 | 2C | F7 | 00 | B8 |
| 000004C0 | 90 | 2C | 50 | B8 | A4 | 2C | 50 | B8 | A6 | 2C | 50 | B8 | 8A | 2C | 50 | CD |
| 000004D0 | 3E | 83 | 9A | 8A | 00 | DF | 02 | 1E | 07 | FC | E8 | FA | 21 | A1 | 9C | 2C |
| 000004E0 | A3 | A8 | 2C | B8 | 01 | 00 | E9 | A8 | 00 | B8 | 01 | 00 | E9 | 28 | 00 | 8B |
| 000004F0 | 1E | AA | 2C | 8B | D3 | D1 | E3 | D1 | E3 | D1 | E3 | D1 | E3 | D1 | E3 | 03 |
| 00000500 | 1E | A0 | 2C | D1 | E3 | D1 | E3 | 81 | C3 | 92 | 16 | 87 | D3 | 8B | CB | BB |
| 00000510 | BE | 2D | CD | 3F | 61 | 41 | 91 | A3 | AA | 2C | 83 | 3E | AA | 2C | 0A | 7E |
| 00000520 | CE | C7 | 06 | AA | 2C | 01 | 00 | CD | 3D | 43 | BF | AC | 2C | CD | 3F | 7D |
| 00000530 | 83 | 3E | A0 | 2C | 08 | BB | 00 | 00 | 74 | 01 | 4B | 83 | 3E | A0 | 2C | 0F |
| 00000540 | BA | 00 | 00 | 74 | 01 | 4A | 23 | D3 | 83 | 3E | A0 | 2C | 16 | BB | 00 | 00 |
| 00000550 | 74 | 01 | 4B | 23 | DA | 83 | 3E | A0 | 2C | 1B | BA | 00 | 00 | 74 | 01 | 4A |
| 00000560 | 23 | D3 | 83 | 3E | A0 | 2C | 20 | BB | 00 | 00 | 74 | 01 | 4B | 23 | DA | 23 |
| 00000570 | DB | 74 | 03 | E9 | 17 | 00 | CD | 3D | 43 | BF | AC | 2C | CD | 3F | 99 | CD |
| 00000580 | 3F | 2D | BF | C4 | 2D | CD | 3F | A1 | 72 | EC | E8 | DB | 1C | A1 | A0 | 2C |
| 00000590 | 40 | A3 | A0 | 2C | A1 | A8 | 2C | 3B | 06 | A0 | 2C | 7C | 03 | E9 | 49 | FF |
| 000005A0 | BB | B8 | 2D | BA | 72 | 2C | CD | 3F | 61 | BB | FF | FF | CD | 3E | 32 | BB |
| 000005B0 | 05 | 00 | CD | 3E | 42 | BB | 01 | 00 | CD | 3E | 42 | 33 | DB | CD | 3E | 44 |
| 000005C0 | CD | 3F | BC | BB | C8 | 2D | CD | 3F | 6E | CD | 3E | 79 | CD | 3F | BC | BB |
| 000005D0 | BE | 2D | CD | 3F | 6E | CD | 3E | 79 | CD | 3F | BC | 8B | D3 | BB | EE | 2D |
| 000005E0 | CD | 3F | 6E | CD | 3E | 79 | CD | 3F | BC | 8B | DA | CD | 3F | 6E | CD | 3E |
| 000005F0 | 79 | CD | 3F | BC | BB | 12 | 2E | CD | 3F | 6E | CD | 3E | 79 | CD | 3F | BC |
| 00000600 | 8B | DA | CD | 3F | 6E | CD | 3E | 79 | CD | 3F | BC | BB | 32 | 2E | CD | 3F |
| 00000610 | 6E | CD | 3E | 79 | CD | 3F | BC | 8B | DA | CD | 3F | 6E | CD | 3E | 79 | CD |
| 00000620 | 3F | BC | BB | 5C | 2E | CD | 3F | 6E | CD | 3E | 79 | BB | 13 | 00 | CD | 3E |
| 00000630 | 42 | BB | 01 | 00 | CD | 3E | 42 | 33 | DB | CD | 3E | 44 | CD | 3F | BC | BB |

```
00000640  8C 2E CD 3F 6E CD 3E 79  CD 3F BC BB A4 2E CD 3F
00000650  6E CD 3E 79 BB 01 00 CD  3E 21 BB C8 2E CD 3E 1F
00000660  BB 01 00 BA CE 2E B9 20  00 CD 3E 1E BB 01 00 CD
00000670  3F B3 BB B0 2C BA 20 00  CD 3F B4 BB 20 00 8B D3
00000680  CD 3D 0E BA B0 2C CD 3F  5B BB 01 00 BA 01 00 CD
00000690  3E 28 BB 01 00 CD 3E 21  CD 3D 24 CD 3D 13 CD 3F
000006A0  78 93 A3 B4 2C BB F4 24  CD 3F 34 A1 9C 2C A3 B6
000006B0  2C B8 01 00 E9 2B 00 BB  B8 2C CD 3F 0F BB BA 2C
000006C0  CD 3F 0F BB BC 2C CD 3F  0F C7 06 70 2C 01 00 A1
000006D0  BE 2C A3 A2 2C C7 06 C0  2C 00 00 E8 C1 14 A1 A0
000006E0  2C 40 A3 A0 2C A1 B6 2C  3B 06 A0 2C 7D C9 C7 06
000006F0  70 2C 00 00 BB 01 00 CD  3E 21 BB C8 2E CD 3E 1F
00000700  BB 01 00 BA CE 2E B9 20  00 CD 3E 1E BB 01 00 BA
00000710  01 00 CD 3E 26 BB 01 00  CD 3F B3 BB B0 2C BA 20
00000720  00 CD 3F B4 BB B0 2C BA  C2 2C CD 3F 61 BB 01 00
00000730  CD 3E 21 BB C2 2C BA BE  2D CD 3D 09 93 A3 A0 2C
00000740  83 3E A0 2C 00 75 03 E9  D5 03 BB 05 00 CD 3E 42
00000750  BB 22 00 CD 3E 42 33 DB  CD 3E 44 CD 3F BC 8B D3
00000760  8B 1E A0 2C CD 3F 69 BB  E0 2E CD 3F 6A CD 3E 79
00000770  92 A3 C6 2C A3 C8 2C B8  01 00 E9 37 00 8B 1E AA
00000780  2C 8B D3 D1 E3 D1 E3 D1  E3 D1 E3 D1 E3 03 1E A0
00000790  2C D1 E3 D1 E3 81 C3 92  16 93 BB BE 2D CD 3F 62
000007A0  75 03 E9 0B 00 92 A3 C6  2C A1 C8 2C 40 A3 C8 2C
000007B0  A1 AA 2C 40 A3 AA 2C 83  3E AA 2C 0A 7E BF B8 01
000007C0  00 E9 EA 02 E8 CF 19 B8  14 00 F7 2E A0 2C 8B 1E
000007D0  AA 2C 8B D3 D1 E3 03 D8  83 C3 EB 87 D3 8B CB BB
000007E0  01 00 CD 3E 26 BB E6 2E  B8 CA 2C CD 3F 62 BA 00
000007F0  00 75 01 4A D1 E1 D1 E1  D1 E1 D1 E1 D1 E1 03 0E
00000800  A0 2C D1 E1 D1 E1 81 C1  92 16 91 CD 3F 62 B9 00
00000810  00 75 01 49 23 CA BB EC  2E CD 3F 62 BA 00 00 75
00000820  01 4A 0B D1 23 D2 74 03  E9 03 00 E9 81 00 8B 3E
00000830  AA 2C D1 E7 D1 E7 D1 E7  D1 E7 D1 E7 03 3E A0 2C
00000840  D1 E7 83 BD 54 28 00 BB  00 00 75 01 4B 83 BD D4
00000850  1B 02 BA 00 00 7E 01 4A  0B D3 23 D2 74 03 E9 43
00000860  02 BB CE 2C CD 3D 18 8B  3E AA 2C D1 E7 D1 E7 D1
00000870  E7 D1 E7 D1 E7 03 3E A0  2C D1 E7 3B 9D D4 1B 75
00000880  03 E9 20 02 BB CE 2C CD  3D 18 8B 3E AA 2C D1 E7
00000890  D1 E7 D1 E7 D1 E7 D1 E7  03 3E A0 2C D1 E7 89 9D
000008A0  D4 1B BB D2 2C CD 3D 18  89 9D 54 28 E9 F5 01 BB
000008B0  07 00 CD 3E 42 BB 21 00  CD 3E 42 33 DB CD 3E 44
000008C0  CD 3F BC 8B 1E AA 2C CD  3F 69 BB E0 2E CD 3F 6A
000008D0  CD 3E 79 E8 C0 18 B8 14  00 F7 2E A0 2C 8B 1E AA
000008E0  2C 8B D3 D1 E3 03 D8 83  C3 EB 87 D3 8B CB BB 01
000008F0  00 CD 3E 26 D1 E1 D1 E1  D1 E1 D1 E1 D1 E1 03 0E
00000900  A0 2C 8B D9 D1 E1 D1 E1  81 C1 92 16 8B D1 8B C3
00000910  BB D6 2C CD 3F 61 97 D1  E7 C7 85 54 23 00 00 C7
00000920  85 D4 25 00 00 93 BB E6  2E CD 3F 62 74 03 E9 D3
00000930  00 E8 99 18 BB CE 2C CD  3D 18 8B 3E AA 2C D1 E7
00000940  D1 E7 D1 E7 D1 E7 D1 E7  03 3E A0 2C D1 E7 89 9D
00000950  D4 1B BB D2 2C CD 3D 18  89 9D 54 28 8B 1E AA 2C
00000960  8B D3 D1 E3 D1 E3 D1 E3  D1 E3 D1 E3 03 1E A0 2C
00000970  8B CB D1 E3 D1 E3 81 C3  12 1E 87 D3 8B C3 BB DA
00000980  2C CD 3F 61 8B D8 B8 14  00 F7 2E A0 2C D1 E3 03
00000990  D8 83 C3 EC 8B D3 BB 01  00 CD 3E 26 BB CE 2C 8B
000009A0  D3 CD 3D 18 8B F9 D1 E7  89 9D 54 23 8B DA CD 3D
000009B0  18 89 9D D4 25 83 3E C8  2C 01 74 03 E9 45 00 B8
000009C0  14 00 F7 2E A0 2C 8B 1E  C6 2C 8B D3 D1 E3 03 D8
000009D0  83 C3 EC 87 D3 8B CB BB  01 00 CD 3E 26 BB CE 2C
000009E0  8B D3 CD 3D 18 8B F9 D1  E7 D1 E7 D1 E7 D1 E7 D1
000009F0  E7 03 3E A0 2C D1 E7 89  9D 54 23 8B DA CD 3D 18
00000A00  89 9D D4 25 8B 1E AA 2C  8B D3 D1 E3 D1 E3 D1 E3
00000A10  D1 E3 D1 E3 03 1E A0 2C  8B CB D1 E3 D1 E3 8B C3
00000A20  81 C3 92 16 93 89 5E FA  BB F2 2E CD 3F 62 74 03
00000A30  E9 71 00 92 BB BE 2D CD  3F 61 8B F9 D1 E7 C7 85
00000A40  D4 1B 00 00 C7 85 54 23.  00 00 C7 85 D4 25 00 00
00000A50  C7 85 54 28 00 00 8B 56  FA 81 C2 12 1E CD 3F 61
00000A60  BA D6 2C CD 3F 5B 8B D3  33 DB 8B CB CD 3D 1B 89
00000A70  56 F8 BA CE 2C CD 3F 5B  8B D9 CD 3D 1B BA D2 2C
00000A80  CD 3F 5B 8B 5E F8 BA CA  2C CD 3F 5B 8B D8 B8 14
00000A90  00 F7 2E A0 2C D1 E3 03  D8 83 C3 EB 8B D3 BB 01
00000AA0  00 CD 3E 28 BB 01 00 CD  3E 21 A1 AA 2C 40 A3 AA
00000AB0  2C 83 3E AA 2C 0A 7F 03  E9 09 FD BB 01 00 CD 3E
00000AC0  21 BB C8 2E CD 3E 1F BB  01 00 BA CE 2E B9 20 00
00000AD0  CD 3E 1E BB 01 00 CD 3F  B3 BB B0 2C BA 20 00 CD
00000AE0  3F B4 BB 01 00 BA 01 00  CD 3E 26 BB B0 2C BA C2
```

```
00000AF0  2C CD 3F 61 BB E6 2E BA  C2 2C 8B 0E A0 2C B8 01
00000B00  00 CD 3F 5C BB C2 2C BA  B0 2C CD 3F 5B BB 01 00
00000B10  BA 01 00 CD 3E 28 BB 01  00 CD 3E 21 E9 D5 FB CD
00000B20  3D 24 CD 3D 13 CD 3F 78  93 A3 DE 2C A1 B4 2C 3B
00000B30  06 DE 2C 75 03 E9 7B 00  BB 01 00 CD 3E 21 BB C8
00000B40  2E CD 3E 1F BB 01 00 BA  F8 2E B9 80 00 CD 3E 1E
00000B50  BB 01 00 CD 3F B3 8B 1E  DE 2C D1 E3 D1 E3 43 43
00000B60  43 43 8B D3 BB B0 2C CD  3F B4 BB D6 2C BA 04 00
00000B70  CD 3F B4 B8 01 00 E9 24  00 BB 01 00 8B 16 6E 2C
00000B80  CD 3E 26 BB 06 2F CD 3D  1C BA D6 2C CD 3F 5B BB
00000B90  01 00 8B 16 6E 2C CD 3E  28 A1 6E 2C 40 A3 6E 2C
00000BA0  83 3E 6E 2C 05 7E D2 BB  01 00 CD 3E 21 A1 DE 2C
00000BB0  A3 B4 2C A1 9C 2C A3 E0  2C B8 01 00 E9 86 0F 8B
00000BC0  3E A0 2C D1 E7 8B 85 AC  2B A3 B8 2C 8B 85 EC 2B
00000BD0  A3 BA 2C 8B 85 2C 2C A3  BC 2C BB 09 00 CD 3E 42
00000BE0  BB 1E 00 CD 3E 42 33 DB  CD 3E 44 CD 3F BC 8B 1E
00000BF0  A0 2C CD 3F 69 BB 0A 2F  CD 3F 6A CD 3E 79 B8 01
00000C00  00 E9 2A 00 8B 1E AA 2C  D1 E3 D1 E3 D1 E3 D1 E3
00000C10  D1 E3 03 1E A0 2C D1 E3  D1 E3 81 C3 92 16 93 BB
00000C20  EC 2E CD 3F 62 75 03 E9  BA 06 A1 AA 2C 40 A3 AA
00000C30  2C 83 3E AA 2C 0A 7E CC  B8 01 00 E9 22 00 8B 3E
00000C40  E2 2C D1 E7 D1 E7 D1 E7  D1 E7 D1 E7 03 3E A0 2C
00000C50  D1 E7 83 BD D4 1B 00 74  03 E9 17 00 A1 E2 2C 40
00000C60  A3 E2 2C 83 3E E2 2C 0A  7E D4 C7 06 AA 2C 01 00
00000C70  E9 7A 0E B8 01 00 E9 2B  00 8B 3E E2 2C 8B DF D1
00000C80  E7 D1 E7 D1 E7 D1 E7 D1  E7 03 3E A0 2C D1 E7 83
00000C90  BD D4 25 00 7F 03 E9 07  00 93 A3 AA 2C E9 41 00
00000CA0  A1 E2 2C 40 A3 E2 2C 83  3E E2 2C 0A 7E CB B8 01
00000CB0  00 E9 20 00 8B 3E AA 2C  8B DF D1 E7 D1 E7 D1 E7
00000CC0  D1 E7 D1 E7 03 3E A0 2C  D1 E7 8B 95 54 23 89 95
00000CD0  D4 25 43 93 A3 AA 2C 83  3E AA 2C 0A 7E D6 E9 60
00000CE0  0E 8B 1E AA 2C D1 E3 D1  E3 D1 E3 D1 E3 D1 E3 03
00000CF0  1E A0 2C D1 E3 D1 E3 81  C3 92 16 93 BB E6 2E CD
00000D00  3F 62 BA 00 00 74 01 4A  BB 12 2F CD 3F 62 B9 00
00000D10  00 74 01 49 23 CA 23 C9  74 03 E9 C7 05 BB 0B 00
00000D20  CD 3E 42 8B D3 BB 15 00  CD 3E 42 33 DB CD 3E 44
00000D30  CD 3F BC 8B CB 8B 1E A0  2C CD 3F 69 BB BE 2D CD
00000D40  3F 6A CD 3E 79 87 DA CD  3E 42 BB 27 00 CD 3E 42
00000D50  8B D9 CD 3E 44 CD 3F BC  8B 1E AA 2C CD 3F 69 8B
00000D60  DA CD 3F 6A CD 3E 79 E8  2C 14 C7 06 E4 2C 00 00
00000D70  83 3E A0 2C 08 BB 00 00  75 01 4B 83 3E A0 2C 0F
00000D80  BA 00 00 75 01 4A 0B D3  83 3E A0 2C 16 BB 00 00
00000D90  75 01 4B 0B DA 83 3E A0  2C 1B BA 00 00 75 01 4A
00000DA0  0B D3 83 3E A0 2C 20 BB  00 00 75 01 4B 0B DA 83
00000DB0  3E BC 2C 04 BA 00 00 7D  01 4A 0B D3 23 D2 74 03
00000DC0  E9 9F 01 C7 06 70 2C 01  00 C7 06 E6 2C 01 00 C7
00000DD0  06 A2 2C 01 00 C7 06 C0  2C 00 00 E8 C1 0D C7 06
00000DE0  70 2C 00 00 E8 E6 13 B8  14 00 F7 2E A0 2C 8B 1E
00000DF0  AA 2C D1 E3 03 D8 83 C3  EC 8B D3 BB 01 00 CD 3E
00000E00  26 B8 13 00 E9 40 00 B8  01 00 E9 2C 00 B8 14 00
00000E10  F7 2E E8 2C 03 06 BE 2C  D1 E0 D1 E0 05 F2 13 93
00000E20  CD 3D 18 B8 05 00 F7 2E  BE 2C 97 03 3E E8 2C D1
00000E30  E7 89 9D DA 2A A1 E8 2C  40 A3 E8 2C 83 3E E8 2C
00000E40  05 7E CA A1 BE 2C 40 A3  BE 2C 83 3E BE 2C 14 7E
00000E50  B6 B8 01 00 E9 14 00 8B  3E BE 2C D1 E7 83 BD 98
00000E60  2B 00 7E 03 E9 11 00 A1  BE 2C 40 A3 BE 2C 83 3E
00000E70  BE 2C 0A 7E E2 E9 EA 00  8B 3E BE 2C D1 E7 8B 9D
00000E80  98 2B CD 3F 57 BF 18 2F  CD 3F 89 8B D3 BB 1A 00
00000E90  CD 3D 03 CD 3F 77 93 A3  EA 2C B8 E8 03 8B DA F7
00000EA0  2E EA 2C 2B D8 93 A3 EC  2C 8B 1E EC 2C CD 3F 57
00000EB0  BF 1C 2F CD 3F 89 8B D3  BB 1A 00 CD 3D 03 CD 3F
00000EC0  77 93 A3 EE 2C B8 64 00  8B DA F7 2E EE 2C 2B D8
00000ED0  93 A3 F0 2C BB 02 00 CD  3E 21 8B D3 BB 20 2F CD
00000EE0  3E 1F 8B DA BA 26 2F B9  40 01 CD 3E 1E B8 05 00
00000EF0  F7 2E EA 2C 03 06 EE 2C  05 FB FF 92 CD 3E 26 CD
00000F00  3F B3 B8 0A 00 F7 2E F0  2C 05 F8 FF 93 CD 3F 57
00000F10  BF 34 2F CD 3F 91 BB 1A  00 CD 3F 71 80 CD 3D 03
00000F20  CD 3F 77 8B D3 BB F2 2C  CD 3F B4 BB 8C 2D CD 3D
00000F30  03 CD 3F 77 8B D3 BB F6  2C CD 3F B4 BB FA 2C BA
00000F40  02 00 CD 3F B4 CD 3D 18  93 A3 E4 2C 83 3E E4 2C
00000F50  00 7C 03 E9 06 00 C7 06  E4 2C 00 00 BB 02 00 CD
00000F60  3E 21 B8 14 00 F7 2E A0  2C 8B 1E AA 2C D1 E3 03
00000F70  D8 83 C3 EB 8B D3 BB 01  00 CD 3E 26 83 3E E4 2C
00000F80  01 BB 00 00 7D 01 4B 83  3E A0 2C 03 BA 00 00 7D
00000F90  01 4A 83 3E E4 2C 07 B9  00 00 7D 01 49 23 CA 0B
```

| | | | | | | | | | | | | | | | | |
|---|---|---|---|---|---|---|---|---|---|---|---|---|---|---|---|---|
| 00000FA0 | CB | 83 | 3E | A0 | 2C | 02 | BB | 00 | 00 | 7E | 01 | 4B | 83 | 3E | A0 | 2C |
| 00000FB0 | 06 | BA | 00 | 00 | 7D | 01 | 4A | 23 | D3 | 83 | 3E | E4 | 2C | 0C | BB | 00 |
| 00000FC0 | 00 | 7D | 01 | 4B | 8B | C3 | 23 | DA | 0B | D9 | 83 | 3E | A0 | 2C | 09 | BA |
| 00000FD0 | 00 | 00 | 75 | 01 | 4A | 83 | 3E | A0 | 2C | 0A | B9 | 00 | 00 | 75 | 01 | 49 |
| 00000FE0 | 0B | CA | 83 | 3E | A0 | 2C | 10 | BA | 00 | 00 | 75 | 01 | 4A | 0B | D1 | 83 |
| 00000FF0 | 3E | A0 | 2C | 11 | B9 | 00 | 00 | 75 | 01 | 49 | 0B | CA | 83 | 3E | A0 | 2C |
| 00001000 | 17 | BA | 00 | 00 | 75 | 01 | 4A | 0B | D1 | 83 | 3E | A0 | 2C | 1C | B9 | 00 |
| 00001010 | 00 | 75 | 01 | 49 | 0B | CA | 83 | 3E | E4 | 2C | 06 | BA | 00 | 00 | 7D | 01 |
| 00001020 | 4A | 23 | D1 | 0B | D3 | 83 | 3E | A0 | 2C | 1C | BB | 00 | 00 | 7E | 01 | 4B |
| 00001030 | 83 | 3E | A0 | 2C | 20 | B9 | 00 | 00 | 7D | 01 | 49 | 23 | CB | 23 | C8 | 0B |
| 00001040 | CA | 83 | 3E | A0 | 2C | 17 | BB | 00 | 00 | 7E | 01 | 4B | 83 | 3E | A0 | 2C |
| 00001050 | 1B | BA | 00 | 00 | 7D | 01 | 4A | 23 | D3 | 0B | D1 | 83 | 3E | A0 | 2C | 11 |
| 00001060 | BB | 00 | 00 | 7E | 01 | 4B | 83 | 3E | A0 | 2C | 15 | B9 | 00 | 00 | 7D | 01 |
| 00001070 | 49 | 23 | CB | 0B | CA | 83 | 3E | A0 | 2C | 0A | BB | 00 | 00 | 7E | 01 | 4B |
| 00001080 | 83 | 3E | A0 | 2C | 0E | BA | 00 | 00 | 7D | 01 | 4A | 23 | D3 | 0B | D1 | 23 |
| 00001090 | D2 | 74 | 03 | E9 | 25 | 00 | 8B | 1E | AA | 2C | D1 | E3 | D1 | E3 | D1 | E3 |
| 000010A0 | D1 | E3 | D1 | E3 | 03 | 1E | A0 | 2C | D1 | E3 | D1 | E3 | 81 | C3 | 92 | 16 |
| 000010B0 | 8B | D3 | BB | E6 | 2E | CD | 3F | 61 | E9 | 52 | 09 | BB | F2 | 2E | B8 | D6 |
| 000010C0 | 2C | CD | 3F | 62 | 75 | 03 | E9 | 4A | 09 | BB | E6 | 2E | BA | CA | 2C | CD |
| 000010D0 | 3F | 5B | B8 | 14 | 00 | F7 | 2E | A0 | 2C | 8B | 1E | AA | 2C | D1 | E3 | 03 |
| 000010E0 | D8 | 83 | C3 | EB | 8B | D3 | BB | 01 | 00 | CD | 3E | 28 | B8 | 01 | 00 | E9 |
| 000010F0 | 3D | 00 | A1 | AA | 2C | 3B | 06 | FE | 2C | 75 | 03 | E9 | 2D | 00 | B8 | 14 |
| 00001100 | 00 | F7 | 2E | A0 | 2C | 8B | 1E | FE | 2C | D1 | E3 | 03 | D8 | 83 | C3 | EB |
| 00001110 | 8B | D3 | BB | 01 | 00 | CD | 3E | 26 | 8B | CB | BB | BE | 2D | 8B | C2 | BA |
| 00001120 | CA | 2C | CD | 3F | 5B | 8B | D9 | 92 | CD | 3E | 28 | A1 | FE | 2C | 40 | A3 |
| 00001130 | FE | 2C | 83 | 3E | FE | 2C | 0A | 7E | B9 | E8 | 91 | 10 | B8 | 14 | 00 | F7 |
| 00001140 | 2E | A0 | 2C | 8B | 1E | AA | 2C | D1 | E3 | 03 | D8 | 83 | C3 | EB | 8B | D3 |
| 00001150 | BB | 01 | 00 | CD | 3E | 26 | B8 | 01 | 00 | E9 | 46 | 00 | B8 | 01 | 00 | E9 |
| 00001160 | 32 | 00 | B8 | 14 | 00 | F7 | 2E | E6 | 2C | 03 | 06 | BE | 2C | D1 | E0 | D1 |
| 00001170 | E0 | 05 | F2 | 13 | 93 | CD | 3D | 18 | 8B | 3E | E6 | 2C | D1 | E7 | D1 | E7 |
| 00001180 | D1 | E7 | D1 | E7 | D1 | E7 | 03 | 3E | BE | 2C | D1 | E7 | 89 | 9D | 94 | 15 |
| 00001190 | A1 | BE | 2C | 40 | A3 | BE | 2C | 83 | 3E | BE | 2C | 14 | 7E | C4 | A1 | E6 |
| 000011A0 | 2C | 40 | A3 | E6 | 2C | 83 | 3E | E6 | 2C | 05 | 7E | B0 | 83 | 3E | BA | 2C |
| 000011B0 | 14 | 7F | 03 | E9 | 70 | 00 | B8 | 14 | 00 | F7 | 2E | A0 | 2C | 8B | 1E | AA |
| 000011C0 | 2C | D1 | E3 | 03 | D8 | 83 | C3 | EC | 8B | D3 | BB | 01 | 00 | CD | 3E | 26 |
| 000011D0 | B8 | 01 | 00 | E9 | 46 | 00 | B8 | 01 | 00 | E9 | 32 | 00 | B8 | 14 | 00 | F7 |
| 000011E0 | 2E | E6 | 2C | 03 | 06 | BE | 2C | D1 | E0 | D1 | E0 | 05 | F2 | 13 | 93 | CD |
| 000011F0 | 3D | 18 | 8B | 3E | E6 | 2C | D1 | E7 | D1 | E7 | D1 | E7 | D1 | E7 | D1 | E7 |
| 00001200 | 03 | 3E | BE | 2C | D1 | E7 | 89 | 9D | BC | 15 | A1 | BE | 2C | 40 | A3 | BE |
| 00001210 | 2C | 83 | 3E | BE | 2C | 0C | 7E | C4 | A1 | E6 | 2C | 40 | A3 | E6 | 2C | 83 |
| 00001220 | 3E | E6 | 2C | 05 | 7E | B0 | A1 | BC | 2C | A3 | 00 | 2D | B8 | 01 | 00 | E9 |
| 00001230 | 4E | 00 | A1 | BA | 2C | A3 | 02 | 2D | A1 | B8 | 2C | E9 | 32 | 00 | 8B | 3E |
| 00001240 | E6 | 2C | D1 | E7 | D1 | E7 | D1 | E7 | D1 | E7 | D1 | E7 | 03 | 3E | BE | 2C |
| 00001250 | D1 | E7 | 83 | BD | 94 | 15 | 00 | 7F | 03 | E9 | 10 | 00 | A1 | BE | 2C | A3 |
| 00001260 | A2 | 2C | 8B | 85 | 94 | 15 | A3 | C0 | 2C | E8 | 33 | 09 | A1 | BE | 2C | 40 |
| 00001270 | A3 | BE | 2C | A1 | 02 | 2D | 3B | 06 | BE | 2C | 7D | C2 | A1 | E6 | 2C | 40 |
| 00001280 | A3 | E6 | 2C | A1 | 00 | 2D | 3B | 06 | E6 | 2C | 7D | A6 | BB | 01 | 00 | CD |
| 00001290 | 3E | 21 | 8B | 1E | A0 | 2C | 8B | D3 | D1 | E3 | D1 | E3 | 81 | C3 | 12 | 2B |
| 000012A0 | 8B | 0E | AA | 2C | D1 | E1 | D1 | E1 | D1 | E1 | D1 | E1 | D1 | E1 | 03 | CA |
| 000012B0 | D1 | E1 | D1 | E1 | 81 | C1 | 12 | 1E | 87 | D9 | 8B | D1 | CD | 3F | 61 | E8 |
| 000012C0 | A6 | 0F | 8B | 1E | AA | 2C | D1 | E3 | D1 | E3 | D1 | E3 | D1 | E3 | D1 | E3 |
| 000012D0 | 03 | 1E | A0 | 2C | D1 | E3 | D1 | E3 | 81 | C3 | 92 | 16 | 8B | D3 | BB | EC |
| 000012E0 | 2E | CD | 3F | 61 | 8B | 1E | AA | 2C | D1 | E3 | D1 | E3 | D1 | E3 | D1 | E3 |
| 000012F0 | D1 | E3 | 03 | 1E | A0 | 2C | D1 | E3 | D1 | E3 | 81 | C3 | 92 | 16 | 93 | BB |
| 00001300 | EC | 2E | CD | 3F | 62 | 74 | 03 | E9 | E3 | 07 | E8 | 89 | 0E | B8 | 14 | 00 |
| 00001310 | F7 | 2E | A0 | 2C | 8B | 1E | AA | 2C | D1 | E3 | 03 | D8 | 83 | C3 | EB | 8B |
| 00001320 | D3 | BB | 01 | 00 | CD | 3E | 26 | BB | F2 | 2E | B8 | D6 | 2C | CD | 3F | 62 |
| 00001330 | 75 | 03 | E9 | DE | 06 | BB | 01 | 00 | CD | 3E | 21 | B8 | 01 | 00 | E9 | 11 |
| 00001340 | 00 | E8 | 55 | 12 | 83 | 3E | 04 | 2D | 00 | 74 | 03 | E9 | 9F | 07 | A1 | 06 |
| 00001350 | 2D | 40 | A3 | 06 | 2D | 83 | 3E | 06 | 2D | 02 | 7E | E5 | C7 | 06 | 70 | 2C |
| 00001360 | 01 | 00 | C7 | 06 | E6 | 2C | 01 | 00 | C7 | 06 | C0 | 2C | 00 | 00 | C7 | 06 |
| 00001370 | A2 | 2C | 01 | 00 | C7 | 06 | BE | 2C | 01 | 00 | E8 | 22 | 08 | C7 | 06 | 70 |
| 00001380 | 2C | 00 | 00 | E8 | 10 | 0E | E8 | 44 | 0E | BB | 0D | 00 | CD | 3E | 42 | 8B |
| 00001390 | D3 | BB | 1D | 00 | CD | 3E | 42 | 33 | DB | CD | 3E | 44 | CD | 3F | BC | 8B |
| 000013A0 | CB | 8B | 1E | A0 | 2C | CD | 3F | 69 | CD | 3E | 79 | 8B | DA | CD | 3E | 42 |
| 000013B0 | BB | 30 | 00 | CD | 3E | 42 | 8B | D9 | CD | 3E | 44 | CD | 3F | BC | 8B | 1E |
| 000013C0 | AA | 2C | CD | 3F | 69 | CD | 3E | 79 | B8 | 14 | 00 | F7 | 2E | A0 | 2C | 8B |
| 000013D0 | 1E | AA | 2C | D1 | E3 | 03 | D8 | 83 | C3 | EB | 8B | D3 | BB | 01 | 00 | CD |
| 000013E0 | 3E | 26 | BB | 08 | 2D | CD | 3D | 19 | BF | 0C | 2D | CD | 3F | 7D | BB | CE |
| 000013F0 | 2C | 8B | D3 | CD | 3D | 18 | 4B | 8B | 3E | AA | 2C | 8B | CF | D1 | E7 | D1 |
| 00001400 | E7 | D1 | E7 | D1 | E7 | D1 | E7 | 03 | 3E | A0 | 2C | D1 | E7 | 89 | 9D | D4 |
| 00001410 | 1B | BB | D2 | 2C | CD | 3D | 18 | 89 | 9D | 54 | 28 | 8B | 9D | D4 | 1B | CD |
| 00001420 | 3D | 1B | CD | 3F | 5B | B8 | 14 | 00 | F7 | 2E | A0 | 2C | D1 | E1 | 03 | C8 |
| 00001430 | 83 | C1 | EB | 8B | D1 | BB | 01 | 00 | CD | 3E | 28 | CD | 3E | 22 | 8B | 9D |
| 00001440 | D4 | 25 | 4B | 89 | 9D | D4 | 25 | C7 | 06 | 10 | 2D | 00 | 00 | 83 | 3E | A0 |
| 00001450 | 2C | 08 | 74 | 03 | E9 | 06 | 00 | C7 | 06 | 10 | 2D | 01 | 00 | 83 | 3E | A0 |
| 00001460 | 2C | 0F | 74 | 03 | E9 | 06 | 00 | C7 | 06 | 10 | 2D | 02 | 00 | 83 | 3E | A0 |

```
00 01470  [illegible] 1C 74 03 E9 06 00 C7   06 10 2D 03 00 83 3E A0
00001480  2C 1B 74 03 E9 06 00 C7   06 10 2D 04 00 83 3E A0
00001490  2C 20 74 03 E9 06 00 C7   06 10 2D 05 00 83 3E 10
000014A0  2D 00 75 03 E9 FB 00 CD   3D 24 CD 3D 13 CD 3F 78
000014B0  93 A3 DE 2C BB 20 2F CD   3E 1F BB 01 00 BA 38 2F
000014C0  B9 80 00 CD 3E 1E BB 01   00 8B 16 10 2D CD 3E 26
000014D0  BB 01 00 CD 3F B3 BB CE   2C BA 04 00 CD 3F B4 8B
000014E0  1E DE 2C D1 E3 D1 E3 87   D3 8B CB BB 12 2D CD 3F
000014F0  B4 8B D1 BB D6 2C CD 3F   B4 A1 B4 2C 3B 06 DE 2C
00001500  75 03 E9 3A 00 B8 01 00   E9 24 00 BB 01 00 8B 16
00001510  6E 2C CD 3E 26 BB 46 2F   CD 3D 1C BA D6 2C CD 3F
00001520  5B BB 01 00 8B 16 6E 2C   CD 3E 28 A1 6E 2C 40 A3
00001530  6E 2C 83 3E 6E 2C 05 7E   D2 A1 DE 2C A3 B4 2C BB
00001540  01 00 8B 16 10 2D CD 3E   26 BB D6 2C CD 3D 19 BF
00001550  0C 2D CD 3F 81 8B D3 BB   1A 00 CD 3D 1C CD 3F 5B
00001560  BB CE 2C CD 3D 19 BF 16   2D CD 3F 7D BB 01 00 8B
00001570  16 10 2D CD 3E 28 8B 16   10 2D 83 C2 05 BB 01 00
00001580  CD 3E 26 BB 16 2D CD 3D   1C BA D6 2C CD 3F 5B 8B
00001590  16 10 2D 83 C2 05 BB 01   00 CD 3E 28 BB 01 00 CD
000015A0  3E 21 83 3E BC 2C 04 7D   03 E9 93 03 83 3E A0 2C
000015B0  08 BB 00 00 75 01 4B 83   3E A0 2C 0F BA 00 00 75
000015C0  01 4A 0B D3 83 3E A0 2C   16 BB 00 00 75 01 4B 0B
000015D0  DA 83 3E A0 2C 1B BA 00   00 75 01 4A 0B D3 83 3E
000015E0  A0 2C 20 BB 00 00 75 01   4B 0B DA 23 DB 74 03 E9
000015F0  A8 01 E8 A1 0B E8 D5 0B   B8 14 00 F7 2E A0 2C 8B
00001600  1E AA 2C D1 E3 03 D8 83   C3 EC 8B D3 BB 01 00 CD
00001610  3E 26 B8 13 00 E9 40 00   B8 01 00 E9 2C 00 B8 14
00001620  00 F7 2E E8 2C 03 06 BE   2C D1 E0 D1 E0 05 F2 13
00001630  93 CD 3D 18 B8 05 00 F7   2E BE 2C 97 03 3E E8 2C
00001640  D1 E7 89 9D DA 2A A1 E8   2C 40 A3 E8 2C 83 3E E8
00001650  2C 05 7E CA A1 BE 2C 40   A3 BE 2C 83 3E BE 2C 14
00001660  7E B6 B8 01 00 E9 14 00   8B 3E BE 2C D1 E7 83 BD
00001670  98 2B 00 7E 03 E9 14 00   A1 BE 2C 40 A3 BE 2C 83
00001680  3E BE 2C 0A 7E E2 CD 3E   22 E9 B3 02 CD 3E 22 8B
00001690  3E BE 2C D1 E7 8B 9D 98   2B CD 3F 57 BF 18 2F CD
000016A0  3F 89 8B D3 BB 1A 00 CD   3D 03 CD 3F 77 93 A3 EA
000016B0  2C B8 E8 03 8B DA F7 2E   EA 2C 2B D8 93 A3 EC 2C
000016C0  8B 1E EC 2C CD 3F 57 BF   1C 2F CD 3F 89 8B D3 BB
000016D0  1A 00 CD 3D 03 CD 3F 77   93 A3 EE 2C B8 64 00 8B
000016E0  DA F7 2E EE 2C 2B D8 93   A3 F0 2C BB 20 2F CD 3E
000016F0  1F BB 02 00 BA 26 2F B9   40 01 CD 3E 1E B8 05 00
00001700  F7 2E EA 2C 03 06 EE 2C   05 FB FF 92 BB 02 00 CD
00001710  3E 26 CD 3F B3 B8 0A 00   F7 2E F0 2C 05 F8 FF 93
00001720  CD 3F 57 BF 34 2F CD 3F   91 BB 1A 00 CD 3F 71 80
00001730  CD 3D 03 CD 3F 77 8B D3   BB F2 2C CD 3F B4 BB 8C
00001740  2D CD 3D 03 CD 3F 77 8B   D3 BB F6 2C CD 3F B4 BB
00001750  FA 2C BA 02 00 CD 3F B4   8B D3 CD 3D 18 0B DB 7F
00001760  03 E9 0F 00 8B DA CD 3D   18 43 CD 3D 1B CD 3F 5B
00001770  E9 0C 00 BB 01 00 CD 3D   1B BA FA 2C CD 3F 5B B8
00001780  05 00 F7 2E EA 2C 03 06   EE 2C 05 FB FF 92 BB 02
00001790  00 CD 3E 28 CD 3E 21 E9   A5 01 E8 F9 09 E8 2D 0A
000017A0  B8 14 00 F7 2E A0 2C 8B   1E AA 2C D1 E3 03 D8 83
000017B0  C3 EC 8B D3 BB 01 00 CD   3E 26 B8 13 00 E9 40 00
000017C0  B8 01 00 E9 2C 00 B8 14   00 F7 2E E8 2C 03 06 BE
000017D0  2C D1 E0 D1 E0 05 F2 13   93 CD 3D 18 B8 05 00 F7
000017E0  2E BE 2C 97 03 3E E8 2C   D1 E7 89 9D DA 2A A1 E8
000017F0  2C 40 A3 E8 2C 83 3E E8   2C 05 7E CA A1 BE 2C 40
00001800  A3 BE 2C 83 3E BE 2C 14   7E B6 CD 3E 22 BB 20 2F
00001810  CD 3E 1F BB 02 00 BA 26   2F B9 40 01 CD 3E 1E B8
00001820  01 00 E9 07 01 8B 3E E6   2C D1 E7 83 BD 98 2B 01
00001830  7D 03 E9 F3 00 8B 3E E6   2C D1 E7 8B 9D 98 2B CD
00001840  3F 57 BF 18 2F CD 3F 89   8B D3 BB 1A 00 CD 3D 03
00001850  CD 3F 77 93 A3 EA 2C B8   E8 03 8B DA F7 2E EA 2C
00001860  2B D8 93 A3 EC 2C 8B 1E   EC 2C CD 3F 57 BF 1C 2F
00001870  CD 3F 89 8B D3 BB 1A 00   CD 3D 03 CD 3F 77 93 A3
00001880  EE 2C B8 64 00 8B DA F7   2E EE 2C 2B D8 93 A3 F0
00001890  2C B8 05 00 F7 2E A0 2C   03 06 EE 2C 05 FB FF 92
000018A0  BB 02 00 CD 3E 26 CD 3F   B3 B8 0A 00 F7 2E F0 2C
000018B0  05 F8 FF 93 CD 3F 57 BF   34 2F CD 3F 91 BB 1A 00
000018C0  CD 3F 71 80 CD 3D 03 CD   3F 77 8B D3 BB F2 2C CD
000018D0  3F B4 BB 8C 2D CD 3D 03   CD 3F 77 8B D3 BB F6 2C
000018E0  CD 3F B4 BB FA 2C BA 02   00 CD 3F B4 8B D3 CD 3D
000018F0  18 4B 0B DB 7C 03 E9 0B   00 33 DB CD 3D 1B CD 3F
00001900  5B E9 0F 00 BB FA 2C 8B   D3 CD 3D 18 4B CD 3D 1B
00001910  CD 3F 5B B8 05 00 F7 2E   A0 2C 03 06 EE 2C 05 FB
```

```
00001920  FF 92 BB 02 00 CD 3E 28  A1 E6 2C 40 A3 E6 2C 83
00001930  3E E6 2C 0A 7F 03 E9 EC  FE BB 02 00 CD 3E 21 8B
00001940  3E AA 2C D1 E7 D1 E7 D1  E7 D1 E7 D1 E7 03 3E A0
00001950  2C D1 E7 83 BD D4 1B 00  74 03 E9 C0 F3 8B 1E AA
00001960  2C D1 E3 D1 E3 D1 E3 D1  E3 D1 E3 03 1E A0 2C D1
00001970  E3 D1 E3 81 C3 92 16 8B  D3 BB BE 2D CD 3F 61 8B
00001980  1E A0 2C D1 E3 D1 E3 81  C3 12 2B 8B D3 BB A0 2D
00001990  CD 3F 61 E8 D2 08 E8 FD  07 E8 31 08 B8 14 00 F7
000019A0  2E A0 2C 8B 1E AA 2C 8B  D3 D1 E3 03 D8 83 C3 EB
000019B0  87 D3 8B CB BB 01 00 CD  3E 26 8B C3 BB BE 2D 89
000019C0  56 FA BA D6 2C CD 3F 5B  BA CA 2C CD 3F 5B 93 8B
000019D0  56 FA CD 3E 28 8B F9 D1  E7 D1 E7 D1 E7 D1 E7 D1
000019E0  E7 03 3E A0 2C D1 E7 C7  85 54 23 00 00 C7 85 54
000019F0  28 00 00 8B 3E AA 2C D1  E7 D1 E7 D1 E7 D1 E7 D1
00001A00  E7 03 3E A0 2C D1 E7 C7  85 D4 25 00 00 CD 3E 22
00001A10  E9 DA 00 BB 13 00 CD 3E  42 BB 16 00 CD 3E 42 33
00001A20  DB CD 3E 44 CD 3F BC 8B  1E A0 2C CD 3F 69 BB E0
00001A30  2E CD 3F 6A CD 3E 79 C7  06 70 2C 01 00 C7 06 E6
00001A40  2C 01 00 C7 06 A2 2C 01  00 C7 06 C0 2C 00 00 E8
00001A50  4D 01 C7 06 70 2C 00 00  8B 1E A0 2C D1 E3 D1 E3
00001A60  81 C3 12 2B 8B D3 BB A0  2D CD 3F 61 E8 F9 07 E8
00001A70  24 07 E8 58 07 8B 1E AA  2C D1 E3 D1 E3 D1 E3 D1
00001A80  E3 D1 E3 03 1E A0 2C 8B  D3 D1 E3 D1 E3 8B CB 81
00001A90  C3 92 16 87 D3 8B C3 BB  BE 2D CD 3F 61 97 D1 E7
00001AA0  C7 85 D4 1B 00 00 C7 85  54 23 00 00 C7 85 D4 25
00001AB0  00 00 C7 85 54 28 00 00  81 C1 12 1E 8B D1 CD 3F
00001AC0  61 BA D6 2C CD 3F 5B BA  CA 2C CD 3F 5B BA 1A 2D
00001AD0  CD 3F 5B B8 14 00 F7 2E  A0 2C 8B 1E AA 2C D1 E3
00001AE0  03 D8 83 C3 EB 8B D3 BB  01 00 CD 3E 28 8B 1E AA
00001AF0  2C D1 E3 D1 E3 D1 E3 D1  E3 D1 E3 03 1E A0 2C D1
00001B00  E3 D1 E3 81 C3 92 16 93  BB BE 2D CD 3F 62 74 03
00001B10  E9 2E 00 E8 83 0A 83 3E  04 2D 01 74 03 E9 21 00
00001B20  C7 06 70 2C 01 00 C7 06  E6 2C 01 00 C7 06 A2 2C
00001B30  01 00 C7 06 C0 2C 00 00  E8 64 00 C7 06 70 2C 00
00001B40  00 A1 A0 2C 40 A3 A0 2C  A1 E0 2C 3B 06 A0 2C 7C
00001B50  03 E9 6B F0 BB 17 00 CD  3E 42 BB 01 00 CD 3E 42
00001B60  33 DB CD 3E 44 CD 3F BC  BB 4A 2F CD 3F 6A CD 3E
00001B70  79 CD 3D 06 BA 1E 2D CD  3F 61 92 BB 72 2F CD 3F
00001B80  62 BA 00 00 75 01 4A BB  78 2F CD 3F 62 B9 00 00
00001B90  75 01 49 0B CA 23 C9 74  03 E9 7D 0B E9 55 EB A1
00001BA0  A2 2C A3 22 2D A1 E6 2C  A3 24 2D BB F9 24 CD 3F
00001BB0  34 A1 A0 2C 48 A3 26 2D  B8 01 00 E9 24 00 B8 01
00001BC0  00 E9 10 00 BB 28 2D CD  3F 0F BB 2A 2D CD 3F 0F
00001BD0  A1 2C 2D 40 A3 2C 2D 83  3E 2C 2D 05 7E E6 A1 2E
00001BE0  2D 40 A3 2E 2D A1 26 2D  3B 06 2E 2D 7D D0 A1 24
00001BF0  2D A3 30 2D B8 01 00 E9  10 00 BB E6 2C CD 3F 0F
00001C00  BB 2A 2D CD 3F 0F A1 2E  2D 40 A3 2E 2D A1 30 2D
00001C10  3B 06 2E 2D 7D E4 A1 A2  2C 03 06 2A 2D 48 48 A3
00001C20  A2 2C 83 3E A0 2C 10 7C  03 E9 0C 00 A1 A0 2C 05
00001C30  F1 FF A3 32 2D E9 09 00  A1 A0 2C 05 E2 FF A3 32
00001C40  2D 83 3E A0 2C 1E 7F 03  E9 06 00 C7 06 32 2D 0F
00001C50  00 A1 32 2D 23 C0 7D 02  F7 D8 A3 32 2D 8B 1E E6
00001C60  2C 43 CD 3F 57 BE 7E 2F  CD 3F 27 CD 3F 77 93 A3
00001C70  34 2D A1 A2 2C 05 E1 FF  A3 A2 2C A1 A2 2C 23 C0
00001C80  7D 02 F7 D8 A3 A2 2C B9  10 00 A1 A2 2C 99 F7 F9
00001C90  92 A3 36 2D C7 06 38 2D  00 00 C7 06 3A 2D 00 00
00001CA0  C7 06 3C 2D 00 00 C7 06  3E 2D 00 00 C7 06 A6 2C
00001CB0  00 00 C7 06 40 2D 08 00  91 A3 42 2D C7 06 44 2D
00001CC0  18 00 C7 06 46 2D 20 00  C7 06 48 2D 28 00 C7 06
00001CD0  4A 2D 30 00 C7 06 4C 2D  38 00 8B 1E C0 2C CD 3F
00001CE0  57 BF 1C 2F CD 3F 89 8B  D3 BB 1A 00 CD 3D 03 CD
00001CF0  3F 77 93 A3 4E 2D B8 64  00 8B DA F7 2E 4E 2D 2B
00001D00  D8 93 A3 50 2D 8B 1E 50  2D CD 3F 57 BF 82 2F CD
00001D10  3F 89 BB 1A 00 CD 3D 03  CD 3F 77 93 A3 50 2D B8
00001D20  0A 00 F7 2E 50 2D 2B D8  93 A3 52 2D 8B 1E 50 2D
00001D30  D1 E3 D1 E3 D1 E3 D1 E3  03 1E 52 2D 93 A3 54 2D
00001D40  A1 4E 2D A3 38 2D 83 3E  A2 2C 0F 7F 03 E9 07 00
00001D50  A1 3A 2D 40 A3 3A 2D B9  02 00 A1 36 2D 99 F7 F9
00001D60  83 FA 01 74 03 E9 09 00  A1 38 2D 05 10 00 A3 38
00001D70  2D 83 3E 36 2D 02 BB 00  00 75 01 4B 83 3E 36 2D
00001D80  03 BA 00 00 75 01 4A 0B  D3 83 3E 36 2D 06 BB 00
00001D90  00 75 01 4B 0B DA 83 3E  36 2D 07 BA 00 00 75 01
00001DA0  4A 0B D3 83 3E 36 2D 0A  BB 00 00 75 01 4B 0B DA
00001DB0  83 3E 36 2D 0B BA 00 00  75 01 4A 0B D3 83 3E 36
00001DC0  2D 0E BB 00 00 75 01 4B  0B DA 83 3E 36 2D 0F BA
00001DD0  00 00 75 01 4A 0B D3 23  D2 75 03 E9 09 00 A1 38
```

```
00001DE0  2D 05 20 00 A3 38 2D 83  3E 36 2D 03 BB 00 00 7E
00001DF0  01 4B 83 3E 36 2D 08 BA  00 00 7D 01 4A 23 D3 83
00001E00  3E 36 2D 0B BB 00 00 7E  01 4B 0B DA 23 DB 75 03
00001E10  E9 09 00 A1 38 2D 05 40  00 A3 38 2D 83 3E 36 2D
00001E20  07 7F 03 E9 09 00 A1 38  2D 05 80 00 A3 38 2D 83
00001E30  3E 70 2C 00 74 03 E9 0F  00 8B 1E 3A 2D 2B 1E 34
00001E40  2D 83 C3 7C 93 A3 3A 2D  B9 02 00 A1 32 2D 99 F7
00001E50  F9 83 FA 01 74 03 E9 09  00 A1 3A 2D 05 80 00 A3
00001E60  3A 2D 83 3E 32 2D 02 BB  00 00 75 01 4B 83 3E 32
00001E70  2D 03 BA 00 00 75 01 4A  0B D3 83 3E 32 2D 06 BB
00001E80  00 00 75 01 4B 0B DA 83  3E 32 2D 07 BA 00 00 75
00001E90  01 4A 0B D3 83 3E 32 2D  0A BB 00 00 75 01 4B 0B
00001EA0  DA 83 3E 32 2D 0B BA 00  00 75 01 4A 0B D3 83 3E
00001EB0  32 2D 0E BB 00 00 75 01  4B 0B DA 83 3E 32 2D 0F
00001EC0  BA 00 00 75 01 4A 0B D3  23 D2 75 03 E9 07 00 A1
00001ED0  3C 2D 40 A3 3C 2D 83 3E  32 2D 03 BB 00 00 7E 01
00001EE0  4B 83 3E 32 2D 08 BA 00  00 7D 01 4A 23 D3 83 3E
00001EF0  32 2D 0B BB 00 00 7E 01  4B 0B DA 23 DB 75 03 E9
00001F00  08 00 A1 3C 2D 40 40 A3  3C 2D 83 3E 32 2D 07 7F
00001F10  03 E9 0A 00 A1 3C 2D 40  40 40 40 A3 3C 2D A1 3C
00001F20  2D 05 10 00 A3 3C 2D A1  3A 2D 40 40 A3 3A 2D B8
00001F30  90 2C 50 B8 42 2D 50 B8  3A 2D 50 B8 8A 2C 50 CD
00001F40  3E 83 9A 8A 00 DF 02 1E  07 FC E8 8A 07 B8 90 2C
00001F50  50 B8 44 2D 50 B8 3C 2D  50 B8 8A 2C 50 CD 3E 83
00001F60  9A 8A 00 DF 02 1E 07 FC  E8 6C 07 B8 90 2C 50 B8
00001F70  A6 2C 50 B8 54 2D 50 B8  8A 2C 50 CD 3E 83 9A 8A
00001F80  00 DF 02 1E 07 FC E8 4E  07 B8 90 2C 50 B8 40 2D
00001F90  50 B8 38 2D 50 B8 8A 2C  50 CD 3E 83 9A 8A 00 DF
00001FA0  02 1E 07 FC A1 78 2C A3  56 2D B8 01 00 E9 04 00
00001FB0  A1 6E 2C 40 A3 6E 2C A1  56 2D 3B 06 6E 2C 7D F0
00001FC0  A1 3A 2D 48 48 A3 3A 2D  83 3E A0 2C 10 BB 00 00
00001FD0  7D 01 4B 83 3E A0 2C 20  BA 00 00 75 01 4A 0B D3
00001FE0  23 D2 75 03 E9 1E 00 B8  90 2C 50 B8 42 2D 50 B8
00001FF0  3A 2D 50 B8 8A 2C 50 CD  3E 83 9A 8A 00 DF 02 1E
00002000  07 FC E9 27 00 C7 06 58  2D 1C 00 C7 06 5A 2D 00
00002010  00 B8 92 2C 50 B8 58 2D  50 B8 5A 2D 50 B8 8A 2C
00002020  50 CD 3E 83 9A 8A 00 DF  02 1E 07 FC 83 3E C0 2C
00002030  00 74 03 E9 1C 00 A1 78  2C A3 5C 2D B8 01 00 E9
00002040  04 00 A1 6E 2C 40 A3 6E  2C A1 5C 2D 3B 06 6E 2C
00002050  7D F0 A1 3A 2D 40 40 A3  3A 2D A1 78 2C A3 5E 2D
00002060  B8 01 00 E9 04 00 A1 6E  2C 40 A3 6E 2C A1 5E 2D
00002070  3B 06 6E 2C 7D F0 83 3E  A0 2C 10 BB 00 00 7D 01
00002080  4B 83 3E A0 2C 20 BA 00  00 75 01 4A 0B D3 23 D2
00002090  75 03 E9 1E 00 B8 90 2C  50 B8 42 2D 50 B8 3A 2D
000020A0  50 B8 8A 2C 50 CD 3E 83  9A 8A 00 DF 02 1E 07 FC
000020B0  E9 27 00 C7 06 58 2D 1C  00 C7 06 5A 2D 01 00 B8
000020C0  92 2C 50 B8 58 2D 50 B8  5A 2D 50 B8 8A 2C 50 CD
000020D0  3E 83 9A 8A 00 DF 02 1E  07 FC E8 FA 05 A1 78 2C
000020E0  A3 60 2D B8 01 00 E9 04  00 A1 6E 2C 40 A3 6E 2C
000020F0  A1 60 2D 3B 06 6E 2C 7D  F0 C7 06 3A 2D FF 00 B8
00002100  90 2C 50 B8 42 2D 50 B8  3A 2D 50 B8 8A 2C 50 CD
00002110  3E 83 9A 8A 00 DF 02 1E  07 FC E8 BA 05 C7 06 3C
00002120  2D F7 00 B8 90 2C 50 B8  44 2D 50 B8 3C 2D 50 B8
00002130  8A 2C 50 CD 3E 83 9A 8A  00 DF 02 1E 07 FC E8 96
00002140  05 C7 06 3C 2D 00 00 B8  90 2C 50 B8 A6 2C 50 B8
00002150  3C 2D 50 B8 8A 2C 50 CD  3E 83 9A 8A 00 DF 02 1E
00002160  07 FC E8 72 05 C7 06 3C  2D F1 00 B8 90 2C 50 B8
00002170  40 2D 50 B8 3C 2D 50 B8  8A 2C 50 CD 3E 83 9A 8A
00002180  00 DF 02 1E 07 FC E8 4E  05 A1 22 2D A3 A2 2C A1
00002190  24 2D A3 E6 2C C3 BB 01  00 CD 3E 21 8B D3 BB 20
000021A0  2F CD 3E 1F BB 86 2F B8  72 2C CD 3F 55 87 D3 B9
000021B0  00 01 CD 3E 1E CD 3F B3  BB D6 2C BA 01 00 CD 3F
000021C0  B4 BB CE 2C BA 02 00 CD  3F B4 E9 61 00 B8 01 00
000021D0  E9 51 00 B8 01 00 E9 3D  00 BB 01 00 CD 3F B3 B8
000021E0  28 00 F7 2E E6 2C 8B 1E  10 2D 8B D3 D1 E3 03 D8
000021F0  83 C3 D9 87 D3 8B CB BB  12 2D CD 3F B4 B8 14 00
00002200  F7 2E E6 2C 03 C1 D1 E0  D1 E0 05 F2 13 93 BA 02
00002210  00 CD 3F B4 41 91 A3 10  2D 83 3E 10 2D 14 7E B9
00002220  A1 E6 2C 40 A3 E6 2C 83  3E E6 2C 05 7E A5 BB 01
00002230  00 CD 3F B3 BB 12 2D BA  E3 00 CD 3F B4 BB 08 2D
00002240  BA 04 00 CD 3F B4 BB 62  2D BA 02 00 CD 3F B4 BB
00002250  D2 2C CD 3F B4 BB DA 2C  BA 14 00 CD 3F B4 BB CA
00002260  2C BA 01 00 CD 3F B4 C3  83 3E A0 2C 08 74 03 E9
00002270  09 00 C7 06 38 2D 01 00  E9 4D 00 83 3E A0 2C 0F
00002280  74 03 E9 09 00 C7 06 38  2D 02 00 E9 3A 00 83 3E
00002290  A0 2C 16 74 03 E9 09 00  C7 06 38 2D 03 00 E9 27
```

```
000022A0  00 83 3E A0 2C 1B 74 03  E9 09 00 C7 06 38 2D 04
000022B0  00 E9 14 00 83 3E A0 2C  20 74 03 E9 09 00 C7 06
000022C0  38 2D 05 00 E9 01 00 C3  BB 02 00 CD 3E 21 8B D3
000022D0  BB 96 2F CD 3E 1F 8B DA  BA 9C 2F 33 C9 CD 3E 1E
000022E0  8B 1E 38 2D CD 3D 10 BA  66 2D CD 3F 61 8B DA CD
000022F0  3F BA 4B 87 D3 8B CB CD  3D 0C 8B D1 CD 3F 61 8B
00002300  D9 B8 A4 2F CD 3F 55 CD  3F 61 BB A0 2D BA 6A 2D
00002310  CD 3F 61 8B 1E A0 2C 8B  CB D1 E3 D1 E3 81 C3 12
00002320  2B 8B C2 BA 03 00 89 5E  FA CD 3D 0B 93 8B D3 BB
00002330  0A 2F CD 3F 62 75 03 E9  5D 00 0B C9 BB 00 00 7E
00002340  01 4B 83 3E AA 2C 00 B8  00 00 7E 01 48 23 C3 23
00002350  C0 75 03 E9 41 00 8B 1E  AA 2C D1 E3 D1 E3 D1 E3
00002360  D1 E3 D1 E3 03 D9 8B FB  D1 E7 8B 9D D4 1B CD 3D
00002370  10 CD 3F 61 8B DA CD 3F  BA 4B 87 D3 8B CB CD 3D
00002380  0C 8B D1 CD 3F 61 91 BB  AA 2F CD 3F 55 93 8B 5E
00002390  FA CD 3F 55 CD 3F 61 83  3E A0 2C 08 BB 00 00 75
000023A0  01 4B 83 3E A0 2C 16 BA  00 00 75 01 4A 0B D3 83
000023B0  3E A0 2C 1B BB 00 00 75  01 4B 83 3E A0 2C 20 B9
000023C0  00 00 75 01 49 0B CB BB  6A 2D 8B C2 BA 01 00 89
000023D0  5E FA CD 3D 0C 93 8B D3  BB B0 2F CD 3F 62 89 56
000023E0  F8 BA 00 00 75 01 4A 23  D1 0B 56 F8 23 D2 75 03
000023F0  E9 27 00 BB 02 00 CD 3F  BE BB 66 2D CD 3F 6A BB
00002400  BC 00 CD 3D 05 CD 3F 6A  8B 5E FA BA 13 00 CD 3D
00002410  0B CD 3F 6E CD 3E 79 E9  80 00 83 3E A0 2C 1B BB
00002420  00 00 74 01 4B 83 3E A0  2C 20 BA 00 00 74 01 4A
00002430  23 D3 83 3E A0 2C 1B BB  00 00 75 01 4B 83 3E A0
00002440  2C 20 B9 00 00 75 01 49  0B CB BB 6A 2D 8B C2 BA
00002450  01 00 89 5E FA CD 3D 0C  93 8B D3 BB 20 2F CD 3F
00002460  62 89 56 F8 BA 00 00 75  01 4A 23 D1 0B 56 F8 23
00002470  D2 75 03 E9 24 00 BB 02  00 CD 3F BE BB 66 2D CD
00002480  3F 6A 8B 5E FA BA 13 00  CD 3D 0B CD 3F 6A BB BE
00002490  00 CD 3D 05 CD 3F 6E CD  3E 79 83 3E A0 2C 1B BB
000024A0  00 00 75 01 4B 83 3E A0  2C 20 BA 00 00 75 01 4A
000024B0  0B D3 BB 6A 2D 8B CA BA  01 00 8B C3 CD 3D 0C 93
000024C0  8B D3 BB B6 2F CD 3F 62  89 56 FA BA 00 00 75 01
000024D0  4A 23 D1 23 D2 75 03 E9  2D 00 BB 02 00 CD 3F BE
000024E0  BB 66 2D CD 3F 6A BB BC  00 CD 3D 05 CD 3F 6A 8B
000024F0  5E FA BA 12 00 CD 3D 0B  CD 3F 6A BB BE 00 CD 3D
00002500  05 CD 3F 6E CD 3E 79 83  3E A0 2C 1B BB 00 00 75
00002510  01 4B 83 3E A0 2C 20 BA  00 00 75 01 4A 0B D3 BB
00002520  6A 2D 8B CA BA 01 00 8B  C3 CD 3D 0C 93 89 5E FA
00002530  BB B6 2F CD 3F 62 89 4E  F8 B9 00 00 74 01 49 23
00002540  4E F8 8B 5E FA 8B C3 CD  3D 0C 93 BB B0 2F CD 3F
00002550  62 89 56 F6 BA 00 00 74  01 4A 23 D1 8B 5E FA 8B
00002560  CA 8B 56 F6 CD 3D 0C 93  BB 20 2F CD 3F 62 BA 00
00002570  00 74 01 4A 23 D1 23 D2  75 03 E9 15 00 BB 02 00
00002580  CD 3F BE BB 66 2D CD 3F  6A BB A0 2D CD 3F 6E CD
00002590  3E 79 BB 02 00 CD 3E 21  C3 B9 10 00 A1 A0 2C 8B
000025A0  D8 99 F7 F9 92 A3 FE 2C  83 FB 0F 7F 03 E9 07 00
000025B0  A1 FE 2C 40 A3 FE 2C 83  3E A0 2C 1E 7F 03 E9 06
000025C0  00 C7 06 FE 2C 10 00 83  3E A0 2C 10 BB 00 00 7D
000025D0  01 4B 83 3E A0 2C 20 BA  00 00 75 01 4A 0B D3 23
000025E0  D2 74 03 E9 27 00 C7 06  58 2D 1C 00 C7 06 5A 2D
000025F0  00 00 B8 92 2C 50 B8 58  2D 50 B8 5A 2D 50 B8 8A
00002600  2C 50 CD 3E 83 9A 8A 00  DF 02 1E 07 FC B8 01 00
00002610  E9 04 00 A1 6E 2D 40 A3  6E 2D 81 3E 6E 2D D0 07
00002620  7E F1 C7 06 5A 2D 01 00  A1 FE 2C 05 2F 00 A3 9A
00002630  2C B8 8E 2C 50 B8 9A 2C  50 B8 04 2D 50 B8 86 2C
00002640  50 CD 3E 83 9A 8A 00 DF  02 1E 07 FC B8 01 00 E9
00002650  04 00 A1 6E 2D 40 A3 6E  2D 81 3E 6E 2D D0 07 7E
00002660  F1 BB 14 00 CD 3E 42 8B  D3 BB 19 00 CD 3E 42 33
00002670  DB CD 3E 44 CD 3F BC 8B  CB 8B 1E A0 2C CD 3F 69
00002680  CD 3E 79 87 DA CD 3E 42  BB 21 00 CD 3E 42 8B D9
00002690  CD 3E 44 CD 3F BC 8B 1E  04 2D CD 3F 6D CD 3E 79
000026A0  83 FA 0F BB 00 00 7E 01  4B 83 FA 20 B9 00 00 74
000026B0  01 49 23 CB 23 C9 75 03  E9 1B 00 B8 92 2C 50 B8
000026C0  58 2D 50 B8 5A 2D 50 B8  8A 2C 50 CD 3E 83 9A 8A
000026D0  00 DF 02 1E 07 FC C3 A1  76 2C A3 70 2D B8 01 00
000026E0  E9 04 00 A1 72 2D 40 A3  72 2D A1 70 2D 3B 06 72
000026F0  2D 7D F0 C3 90 90 90 90  90 90 90 90 90 90 90 90
00002700  90 90 90 90 90 90 90 90  90 90 90 90 90 90 90 90
00002710  90 90 90 90 90 90 90 90  90 90 90 90 90 90 90 90
00002720  BC 2F CD 3F B5 00 CD 3F  90 BB FF FF CD 3E 32 BB
00002730  B8 A1 74 2D A3 A0 2C 0B  B7 01 01 BB 74 2D CD 3F
00002740  24 CD 3F 34 A1 A0 2C A3  C0 75 03 E9 F9 07 BB F4
                                   76 2D B8 01 00 E9 1F 00
```

```
00002750  BB B8 2C CD 3F 0F 8B D3  BB BA 2C CD 3F 0F BB BC
00002760  2C CD 3F 0F 83 3E B8 2C  00 7C AE A1 6E 2C 40 A3
00002770  6E 2C A1 76 2D 3B 06 6E  2C 7D D5 83 3E A0 2C 08
00002780  BB 00 00 75 01 4B 83 3E  A0 2C 0F BA 00 00 75 01
00002790  4A 0B D3 83 3E A0 2C 16  BB 00 00 75 01 4B 0B DA
000027A0  83 3E A0 2C 1B BA 00 00  75 01 4A 0B D3 83 3E A0
000027B0  2C 20 BB 00 00 75 01 4B  0B DA 23 DB 74 03 E9 03
000027C0  00 E9 52 00 BB FF FF CD  3E 32 BB D0 2F CD 3F B5
000027D0  00 CD 3F B7 01 04 BB 1E  2D CD 3F B8 93 BB 72 2F
000027E0  CD 3F 62 BA 00 00 75 01  4A BB 78 2F CD 3F 62 B9
000027F0  00 00 75 01 49 0B CA 23  C9 75 03 E9 18 00 BB 02
00002800  30 CD 3F B5 00 CD 3F B7  01 04 BB 78 2D CD 3F B8
00002810  E8 56 06 E9 03 FF BB FF  FF CD 3E 32 BB 06 30 CD
00002820  3F B5 00 CD 3F B7 01 04  BB 1E 2D CD 3F B8 93 BB
00002830  72 2F CD 3F 62 BA 00 00  75 01 4A BB 78 2F CD 3F
00002840  62 B9 00 00 75 01 49 0B  CA 23 C9 75 03 E9 37 00
00002850  BB 30 30 CD 3F B5 00 CD  3F B7 01 04 BB 1E 2D CD
00002860  3F B8 93 BB 72 2F CD 3F  62 BA 00 00 75 01 4A BB
00002870  78 2F CD 3F 62 B9 00 00  75 01 49 0B CA 23 C9 74
00002880  03 E9 EA 03 E9 66 03 BB  FF FF CD 3E 32 BB 66 30
00002890  CD 3F B5 00 CD 3F B7 01  04 BB 1E 2D CD 3F B8 93
000028A0  BB 72 2F CD 3F 62 BA 00  00 75 01 4A BB 78 2F CD
000028B0  3F 62 B9 00 00 75 01 49  0B CA 23 C9 74 03 E9 50
000028C0  05 BB FF FF CD 3E 32 BB  9E 30 CD 3F B5 00 CD 3F
000028D0  B7 01 01 BB E6 2C CD 3F  B8 83 3E E6 2C 01 BA 00
000028E0  00 7D 01 4A A1 BC 2C 3B  06 E6 2C B9 00 00 7D 01
000028F0  49 0B CA 23 C9 75 CA 83  3E A0 2C 03 BB 00 00 75
00002900  01 4B 83 3E E6 2C 04 BA  00 00 74 01 4A 23 D3 23
00002910  D2 75 03 E9 06 00 C7 06  BA 2C 04 00 83 3E A0 2C
00002920  0A BB 00 00 75 01 4B 83  3E E6 2C 04 BA 00 00 74
00002930  01 4A 23 D3 23 D2 75 03  E9 09 00 C7 06 BA 2C 08
00002940  00 E9 25 00 83 3E A0 2C  0B BB 00 00 75 01 4B 83
00002950  3E E6 2C 04 BA 00 00 74  01 4A 23 D3 23 D2 75 03
00002960  E9 06 00 C7 06 BA 2C 03  00 83 3E A0 2C 11 BB 00
00002970  00 75 01 4B 83 3E A0 2C  14 BA 00 00 75 01 4A 0B
00002980  D3 83 3E E6 2C 04 BB 00  00 74 01 4B 23 DA 23 DB
00002990  75 03 E9 09 00 C7 06 BA  2C 04 00 E9 25 00 83 3E
000029A0  A0 2C 12 BB 00 00 75 01  4B 83 3E E6 2C 04 BA 00
000029B0  00 74 01 4A 23 D3 23 D2  75 03 E9 06 00 C7 06 BA
000029C0  2C 03 00 BB FF FF CD 3E  32 BB AA 30 CD 3F B5 00
000029D0  CD 3F B7 01 04 BB 1E 2D  CD 3F B8 93 BB 72 2F CD
000029E0  3F 62 BA 00 00 75 01 4A  BB 78 2F CD 3F 62 B9 00
000029F0  00 75 01 49 0B CA 23 C9  74 03 E9 C6 00 BB FF FF
00002A00  CD 3E 32 BB D8 30 CD 3F  B5 00 CD 3F B7 01 04 BB
00002A10  1E 2D CD 3F B8 93 BB 72  2F CD 3F 62 BA 00 00 75
00002A20  01 4A BB 78 2F CD 3F 62  B9 00 00 75 01 49 0B CA
00002A30  23 C9 74 03 E9 F4 01 BB  FF FF CD 3E 32 BB 04 31
00002A40  CD 3F B5 00 CD 3F B7 01  01 BB C0 2C CD 3F B8 BB
00002A50  0E 31 CD 3F B5 00 CD 3F  B7 01 01 BB A2 2C CD 3F
00002A60  B8 A1 B8 2C 3B 06 A2 2C  BA 00 00 7E 01 4A A1 BA
00002A70  2C 3B 06 A2 2C B9 00 00  7D 01 49 0B CA 23 C9 75
00002A80  CE E8 1B F1 BB 20 31 CD  3F B5 00 CD 3F B7 01 04
00002A90  BB 1E 2D CD 3F B8 BB FF  FF CD 3E 32 BB 72 2F B8
00002AA0  1E 2D CD 3F 62 BA 00 00  75 01 4A BB 78 2F CD 3F
00002AB0  62 B9 00 00 75 01 49 0B  CA 23 C9 74 03 E9 77 FF
00002AC0  E9 56 FC BB FF FF CD 3E  32 A1 BA 2C A3 7C 2D A1
00002AD0  B8 2C E9 33 00 CD 3D 43  BF AC 2C CD 3F 7D CD 3D
00002AE0  43 BF AC 2C CD 3F 99 CD  3F 2D BF 7E 2F CD 3F A1
00002AF0  72 EC A1 BE 2C 8B D8 05  64 00 A3 C0 2C 93 A3 A2
00002B00  2C E8 9B F0 A1 BE 2C 40  A3 BE 2C A1 7C 2D 3B 06
00002B10  BE 2C 7D C1 CD 3D 43 BF  AC 2C CD 3F 7D CD 3D 43
00002B20  BF AC 2C CD 3F 99 CD 3F  2D BF 7E 2F CD 3F A1 72
00002B30  EC C7 06 C0 2C 00 00 C7  06 A2 2C 01 00 E8 5F F0
00002B40  E9 D6 FB B8 01 00 E9 04  00 A1 A2 2C 40 A3 A2 2C
00002B50  81 3E A2 2C E8 03 7E F1  A1 BA 2C 05 3C 00 A3 7E
00002B60  2D A1 B8 2C 05 3C 00 E9  1A 00 A1 BE 2C 8B D8 05
00002B70  C4 FF A3 A2 2C 81 C3 20  03 93 A3 C0 2C E8 1F F0
00002B80  A1 BE 2C 40 A3 BE 2C A1  7E 2D 3B 06 BE 2C 7D DA
00002B90  B8 01 00 E9 04 00 A1 A2  2C 40 A3 A2 2C 81 3E A2
00002BA0  2C E8 03 7E F1 A1 BA 2C  05 50 00 A3 80 2D A1 B8
00002BB0  2C 05 50 00 E9 27 00 A1  BE 2C 8B D8 05 B0 FF A3
00002BC0  A2 2C 93 A3 C0 2C 3D 64  00 7D 03 E9 09 00 A1 C0
00002BD0  2C 05 9D FF A3 C0 2C E8  C5 EF A1 BE 2C 40 A3 BE
00002BE0  2C A1 80 2D 3B 06 BE 2C  7D CD E9 2C FB E8 A9 F9
```

```
00002BF0  83 3E 04 2D 01 74 03 E9  0F 00 CD 3F BC BB 54 31
00002C00  CD 3F 6E CD 3E 79 E9 0C  00 CD 3F BC BB 5C 31 CD
00002C10  3F 6E CD 3E 79 CD 3D 06  BA 82 2D CD 3F 61 8B DA
00002C20  CD 3F BA 83 FB 01 7C C5  E9 EE FA C7 06 C0 2C 78
00002C30  03 A1 BA 2C A3 86 2D A1  B8 2C E9 22 00 B8 01 00
00002C40  E9 04 00 A1 88 2D 40 A3  88 2D 81 3E 88 2D F4 01
00002C50  7E F1 A1 BE 2C A3 A2 2C  E8 44 EF A1 BE 2C 40 A3
00002C60  BE 2C A1 86 2D 3B 06 BE  2C 7D D2 E9 AB FA BB FF
00002C70  FF CD 3E 32 B8 01 00 E9  47 01 33 C0 E9 25 01 8B
00002C80  1E 9E 2C D1 E3 D1 E3 D1  E3 D1 E3 03 1E 6E 2C 93
00002C90  A3 A0 2C B9 10 00 A1 A0  2C 8B D8 99 F7 F9 92 A3
00002CA0  FE 2C 83 FB 0F 7F 03 E9  07 00 A1 FE 2C 40 A3 FE
00002CB0  2C 83 3E A0 2C 1E 7F 03  E9 06 00 C7 06 FE 2C 10
00002CC0  00 83 3E A0 2C 10 BB 00  00 7D 01 4B 83 3E A0 2C
00002CD0  20 BA 00 00 75 01 4A 0B  D3 23 D2 74 03 E9 42 00
00002CE0  C7 06 58 2D 1C 00 C7 06  5A 2D 00 00 B8 92 2C 50
00002CF0  B8 58 2D 50 B8 5A 2D 50  B8 8A 2C 50 CD 3E 83 9A
00002D00  8A 00 DF 02 1E 07 FC B8  01 00 E9 04 00 A1 6E 2D
00002D10  40 A3 6E 2D 81 3E 6E 2D  96 00 7E F1 C7 06 5A 2D
00002D20  01 00 A1 FE 2C 05 2F 00  A3 9A 2C B8 8E 2C 50 B8
00002D30  9A 2C 50 B8 04 2D 50 B8  86 2C 50 CD 3E 83 9A 8A
00002D40  00 DF 02 1E 07 FC E8 8E  F9 83 3E A0 2C 0F 7F 03
00002D50  E9 1B 00 B8 92 2C 50 B8  58 2D 50 B8 5A 2D 50 B8
00002D60  8A 2C 50 CD 3E 83 9A 8A  00 DF 02 1E 07 FC CD 3F
00002D70  BC B8 28 00 F7 2E 9E 2C  40 93 CD 3F 37 BB 02 30
00002D80  CD 3F 6A BB 64 31 CD 3F  6A 8B 1E A0 2C CD 3F 69
00002D90  BB 0A 2F CD 3F 6A 8B 1E  04 2D CD 3F 69 CD 3E 79
00002DA0  A1 9E 2C 40 A3 9E 2C 83  3E 9E 2C 01 7F 03 E9 CE
00002DB0  FE CD 3F BC BB BE 2D CD  3F 6E CD 3E 79 A1 6E 2C
00002DC0  40 A3 6E 2C 83 3E 6E 2C  10 7F 03 E9 AC FE CD 3F
00002DD0  BC BB BE 2D CD 3F 6E CD  3E 79 BB 6E 31 CD 3F B5
00002DE0  00 CD 3F B7 01 04 BB 1E  2D CD 3F B8 93 BB 72 2F
00002DF0  CD 3F 62 BA 00 00 75 01  4A BB 78 2F CD 3F 62 B9
00002E00  00 00 75 01 49 0B CA 23  C9 74 03 E9 60 FE E9 08
00002E10  F9 BB FF FF CD 3E 32 BB  8C 31 CD 3F B5 00 CD 3F
00002E20  B7 01 01 BB 54 2D CD 3F  B8 83 3E 54 2D 01 7D 03
00002E30  E9 E6 F8 83 3E 54 2D 30  7F D7 BB 9E 31 CD 3F B5
00002E40  00 CD 3F B7 01 01 BB 8A  2D CD 3F B8 B8 92 2C 50
00002E50  B8 54 2D 50 B8 8A 2D 50  B8 8A 2C 50 CD 3E 83 9A
00002E60  8A 00 DF 02 1E 07 FC EB  A8 BB A0 2D B8 78 2D CD
00002E70  3F 55 92 CD 3F 61 83 3E  A0 2C 09 7C 03 E9 09 00
00002E80  C7 06 38 2D 01 00 E9 3F  00 83 3E A0 2C 10 7C 03
00002E90  E9 09 00 C7 06 38 2D 02  00 E9 2C 00 83 3E A0 2C
00002EA0  17 7C 03 E9 09 00 C7 06  38 2D 03 00 E9 19 00 83
00002EB0  3E A0 2C 1B 7C 03 E9 09  00 C7 06 38 2D 04 00 E9
00002EC0  06 00 C7 06 38 2D 05 00  BB 96 2F CD 3E 1F BB 02
00002ED0  00 BA AC 31 33 C9 CD 3E  1E 8B 1E 38 2D CD 3D 10
00002EE0  BA 66 2D CD 3F 61 8B DA  CD 3F BA 4B 87 D3 8B CB
00002EF0  CD 3D 0C 8B D1 CD 3F 61  8B D9 B8 A4 2F CD 3F 55
00002F00  CD 3F 61 BB 02 00 CD 3F  BE BB 66 2D CD 3F 6A BB
00002F10  BC 00 CD 3D 05 CD 3F 6A  BB 78 2D BA 12 00 CD 3D
00002F20  0B CD 3F 6A BB BE 00 CD  3D 05 CD 3F 6E CD 3E 79
00002F30  BB 02 00 CD 3E 21 C3 BB  FF FF CD 3E 32 BB 05 00
00002F40  CD 3E 42 BB 01 00 CD 3E  42 33 DB CD 3E 44 CD 3F
00002F50  BC BB C8 2D CD 3F 6E CD  3E 79 CD 3F BC BB BE 2D
00002F60  CD 3F 6E CD 3E 79 CD 3F  BC 8B D3 BB EE 2D CD 3F
00002F70  6E CD 3E 79 CD 3F BC 8B  DA CD 3F 6E CD 3E 79 CD
00002F80  3F BC BB 12 2E CD 3F 6E  CD 3E 79 CD 3F BC 8B DA
00002F90  CD 3F 6E CD 3E 79 CD 3F  BC BB 32 2E CD 3F 6E CD
00002FA0  3E 79 CD 3F BC 8B DA CD  3F 6E CD 3E 79 CD 3F BC
00002FB0  BB 5C 2E CD 3F 6E CD 3E  79 BB 13 00 CD 3E 42 BB
00002FC0  01 00 CD 3E 42 33 DB CD  3E 44 CD 3F BC BB 8C 2E
00002FD0  CD 3F 6E CD 3E 79 CD 3F  BC BB A4 2E CD 3F 6E CD
00002FE0  3E 79 E9 0F D7 CD 3E 02  00 00 00 00 00 00 00 00
00002FF0  CD 3F FF CB CD 3F FE CB  CD 3F FD CB CD 3F FC CB
00003000  51 F3 A5 59 D1 E1 8E DA  8B 2E C6 13 8B C5 2B C2
00003010  3D 00 10 72 03 B8 00 10  8B D1 81 C2 00 03 72 0C
00003020  B1 04 D3 E0 0B C0 74 28  3B C2 73 24 BA 4A 00 0E
00003030  1F B4 09 CD 21 53 33 C0  50 CB 0D 0A 50 72 6F 67
00003040  72 61 6D 20 74 6F 6F 20  6C 61 72 67 65 0D 0A 24
00003050  5E 5F 1E 17 8B E2 57 56  8B CA 92 83 06 C4 13 07
00003060  FF 2E C4 13 B0 04 BF B0  05 A2 1F 00 C7 06 35 00
00003070  89 00 C7 06 37 00 DF 02  CB CB 5F 5E 5B 56 57 FF
00003080  36 00 00 FF 37 CB 00 00  00 00 00 00 00 00 00 00
```

```
00003090  14 00 A4 2D 20 20 20 20  20 20 20 20 20 20 20 20
000030A0  20 20 20 20 20 20 20 20  02 00 BC 2D 44 3A 01 00
000030B0  C2 2D 20 BD 00 00 20 83  21 00 CC 2D 47 45 54 20
000030C0  44 41 54 41 20 54 4F 20  42 45 20 44 49 53 50 4C
000030D0  41 59 45 44 20 46 4F 52  20 43 45 4C 4C 00 20 00
000030E0  F2 2D 47 45 54 20 44 41  54 41 20 54 4F 20 42 45
000030F0  20 44 49 53 50 4C 41 59  45 44 20 46 4F 52 20 4B
00003100  49 54 1C 00 16 2E 53 45  4C 45 43 54 20 44 41 54
00003110  41 20 54 4F 20 53 45 4E  44 20 46 4F 52 20 43 45
00003120  4C 4C 26 00 36 2E 53 45  4E 44 49 4E 47 20 44 41
00003130  54 41 20 46 4F 52 20 43  45 4C 4C 20 20 20 20 20
00003140  20 20 20 20 20 4B 49 54  20 4E 4F 2E 2B 00 60 2E
00003150  52 45 44 55 43 49 4E 47  20 50 49 43 4B 20 51 54
00003160  59 20 46 4F 52 20 43 45  4C 4C 20 20 20 20 20 20
00003170  20 20 20 20 4B 49 54 20  4E 4F 2E 00 14 00 90 2E
00003180  43 4C 45 41 52 49 4E 47  20 43 45 4C 4C 20 4E 55
00003190  4D 42 45 52 20 00 A8 2E  52 45 54 55 52 4E 20 53
000031A0  49 47 4E 41 4C 20 46 52  4F 4D 20 43 45 4C 4C 20
000031B0  20 20 20 20 20 49 53 3D  01 00 CC 2E 72 9F 0E 00
000031C0  D2 2E 64 3A 66 69 6C 65  6F 70 65 6E 2E 64 61 74
000031D0  02 00 E4 2E 20 20 01 00  EA 2E 2A 09 01 00 F0 2E
000031E0  3F F2 01 00 F6 2E 23 00  09 00 FC 2E 70 68 6F 75
000031F0  72 2E 64 61 74 DC 00 00  20 00 03 00 0E 2F 20 20
00003200  20 00 01 00 16 2F 26 00  00 00 7A 8A 00 00 48 87
00003210  01 00 24 2F 52 BD 09 00  2A 2F 57 41 4C 4C 43 2E
00003220  44 41 54 90 00 00 00 80  09 00 3C 2F 50 48 4F 55
00003230  52 2E 44 41 54 00 00 00  00 00 24 00 4E 2F 53 74
00003240  6F 70 20 74 6F 20 72 75  6E 20 53 79 73 74 65 6D
00003250  20 54 65 73 74 73 2D 3C  59 3E 20 6F 72 20 3C 4E
00003260  3E 3F 01 00 76 2F 59 34  01 00 7C 2F 79 00 00 00
00003270  00 82 00 00 20 84 0B 00  8A 2F 44 49 53 50 4C 41
00003280  59 2E 44 41 54 00 01 00  9A 2F 4F 76 04 00 A0 2F
00003290  43 4F 4D 31 01 00 A8 2F  30 00 01 00 AE 2F 3D 00
000032A0  01 00 B4 2F 4C 2C 01 00  BA 2F 42 C8 0F 00 C0 2F
000032B0  43 65 6C 6C 20 23 20 28  30 3D 45 4E 44 29 3D 00
000032C0  2D 00 D4 2F 44 4F 20 59  4F 55 20 57 49 53 48 20
000032D0  54 4F 20 43 48 45 43 4B  20 4E 41 4D 45 20 44 49
000032E0  53 50 4C 41 59 2D 3C 59  3E 20 4F 52 20 3C 4E 3E
000032F0  3F 00 00 00 06 30 26 00  0A 30 44 4F 20 59 4F 55
00003300  20 57 49 53 48 20 54 4F  20 43 48 45 43 4B 20 49
00003310  4E 50 55 54 2D 3C 59 3E  20 4F 52 20 3C 4E 3E 3F
00003320  31 00 34 30 44 6F 20 79  6F 75 20 77 69 73 68 20
00003330  74 6F 20 73 65 65 20 61  6C 6C 20 69 6E 70 75 74
00003340  73 20 61 74 20 6F 6E 63  65 2D 3C 59 3E 20 6F 72
00003350  20 3C 4E 3E 3F 00 33 00  6A 30 44 6F 20 79 6F 75
00003360  20 77 69 73 68 20 74 6F  20 74 75 72 6E 20 6F 6E
00003370  6C 79 20 6F 6E 65 20 62  69 74 20 6F 6E 2F 6F 66
00003380  66 2D 3C 59 3E 20 6F 72  20 3C 4E 3E 3F 00 08 00
00003390  A2 30 52 4F 57 20 31 2D  35 3D 29 00 AE 30 44 4F
000033A0  20 59 4F 55 20 57 49 53  48 20 54 4F 20 52 55 4E
000033B0  20 43 59 43 4C 45 20 54  45 53 54 2D 3C 59 3E 20
000033C0  4F 52 20 3C 4E 3E 3F 00  28 00 DC 30 44 4F 20 59
000033D0  4F 55 20 57 49 53 48 20  54 4F 20 52 55 4E 20 4C
000033E0  41 4D 50 20 54 45 53 54  2D 3C 59 3E 20 4F 52 20
000033F0  3C 4E 3E 3F 05 00 08 31  44 41 54 41 3D 00 0E 00
00003400  12 31 4C 4F 43 41 54 49  4F 4E 20 31 2D 33 32 3D
00003410  30 00 24 31 44 41 54 41  20 54 52 41 4E 53 4D 49
00003420  54 54 45 44 20 20 2D 20  20 53 65 6E 64 20 6D 6F
00003430  72 65 20 64 61 74 61 20  2D 3C 59 3E 20 4F 52 20
00003440  3C 4E 3E 3F 04 00 58 31  4F 4E 21 21 03 00 60 31
00003450  4F 46 46 00 05 00 68 31  42 69 74 20 23 00 1A 00
00003460  72 31 52 65 2D 44 69 73  70 6C 61 79 3D 3C 59 3E
00003470  20 6F 72 20 45 6E 64 3D  3C 4E 3E 3F 0E 00 90 31
00003480  42 69 74 20 23 20 28 30  3D 45 4E 44 29 3D 0A 00
00003490  A2 31 4F 4E 3D 31 2C 4F  46 46 3D 30 04 00 B0 31
000034A0  63 6F 6D 31 00 00 00 00  00 00 00 00 00 00 00 00
000034B0  F4 24 20 31 2C 37 2C 34  2C 31 2C 36 2C 34 2C 31
000034C0  2C 36 2C 34 2C 31 2C 35  2C 34 2C 31 2C 34 2C 34
000034D0  2C 31 2C 33 2C 33 2C 31  2C 33 2C 33 2C 31 2C 31
000034E0  35 2C 35 00 F5 24 20 31  2C 31 30 2C 34 2C 31 2C
000034F0  31 30 2C 34 2C 31 2C 36  2C 34 2C 31 2C 39 2C 34
00003500  2C 31 2C 34 2C 34 2C 31  2C 34 2C 33 2C 31 2C 32
00003510  30 2C 35 00 F6 24 20 31  2C 31 31 2C 34 2C 31 2C
00003520  31 30 2C 34 2C 31 2C 36  2C 34 2C 31 2C 33 2C 34
```

```
00003530  2C 31 2C 36 2C 34 2C 31  2C 36 2C 33 2C 31 2C 32
00003540  30 2C 35 00 F7 24 20 31  2C 37 2C 34 2C 31 2C 33
00003550  2C 34 2C 31 2C 32 2C 34  2C 31 2C 32 2C 34 2C 31
00003560  2C 31 33 2C 34 00 F8 24  20 31 2C 37 2C 34 2C 31
00003570  2C 31 2C 34 2C 31 2C 31  2C 34 2C 31 2C 37 2C 34
00003580  2C 31 2C 31 32 2C 34 00  F9 24 20 31 2C 31 2C 31
00003590  2C 38 2C 32 2C 31 2C 33  2C 31 2C 30 2C 30 00 FA
000035A0  24 20 31 2C 31 2C 31 2C  37 2C 32 2C 31 2C 33 2C
000035B0  31 2C 30 2C 30 00 FB 24  20 31 2C 31 2C 31 2C 35
000035C0  2C 31 2C 39 2C 32 2C 31  2C 30 2C 30 00 FC 24 20
000035D0  31 2C 31 2C 31 2C 36 2C  31 2C 31 31 2C 32 2C 31
000035E0  2C 30 2C 30 00 FD 24 20  31 2C 31 2C 31 2C 34 2C
000035F0  31 2C 37 2C 32 2C 31 2C  30 2C 30 00 FE 24 20 31
00003600  2C 31 2C 31 2C 34 2C 31  2C 37 2C 30 2C 30 2C 30
00003610  2C 30 00 FF 24 20 31 2C  31 2C 31 2C 34 2C 31 2C
00003620  37 2C 30 2C 30 2C 30 2C  30 00 00 25 20 31 2C 31
00003630  2C 32 2C 31 2C 33 2C 31  2C 34 2C 31 2C 35 2C 31
00003640  00 01 25 20 31 2C 31 2C  32 2C 31 2C 33 2C 31 2C
00003650  34 2C 31 2C 30 2C 30 00  02 25 20 31 2C 31 2C 31
00003660  2C 39 2C 32 2C 31 2C 33  2C 31 2C 30 2C 30 00 03
00003670  25 20 31 2C 31 2C 31 2C  34 2C 31 2C 37 2C 32 2C
00003680  31 2C 30 2C 30 00 04 25  20 31 2C 31 2C 32 2C 31
00003690  2C 33 2C 31 2C 34 2C 31  2C 30 2C 30 00 05 25 20
000036A0  31 2C 31 2C 31 2C 35 2C  31 2C 39 2C 32 2C 31 2C
000036B0  30 2C 30 00 06 25 20 31  2C 31 2C 31 2C 35 2C 31
000036C0  2C 39 2C 30 2C 30 2C 30  2C 30 00 07 25 20 31 2C
000036D0  31 2C 32 2C 31 2C 33 2C  31 2C 34 2C 31 2C 35 2C
000036E0  31 00 08 25 20 31 2C 31  2C 32 2C 31 2C 33 2C 31
000036F0  2C 34 2C 31 2C 30 2C 30  00 09 25 20 31 2C 31 2C
00003700  31 2C 35 2C 31 2C 39 2C  32 2C 31 2C 30 2C 30 00
00003710  0A 25 20 31 2C 31 2C 31  2C 34 2C 31 2C 37 2C 32
00003720  2C 31 2C 30 2C 30 00 0B  25 20 31 2C 31 2C 31 2C
00003730  34 2C 31 2C 37 2C 32 2C  31 2C 30 2C 30 00 0C 25
00003740  20 31 2C 31 2C 31 2C 35  2C 31 2C 39 2C 32 2C 31
00003750  2C 30 2C 30 00 0D 25 20  31 2C 31 2C 31 2C 37 2C
00003760  32 2C 31 2C 30 2C 30 2C  30 2C 30 00 0E 25 20 31
00003770  2C 31 2C 32 2C 31 2C 33  2C 31 2C 34 2C 31 2C 35
00003780  2C 31 00 0F 25 20 31 2C  31 2C 31 2C 38 2C 32 2C
00003790  31 2C 33 2C 31 2C 30 2C  30 00 10 25 20 31 2C 31
000037A0  2C 31 2C 34 2C 31 2C 37  2C 32 2C 31 2C 30 2C 30
000037B0  00 11 25 20 31 2C 31 2C  31 2C 32 2C 31 2C 34 2C
000037C0  32 2C 31 2C 30 2C 30 00  12 25 20 31 2C 31 2C 31
000037D0  2C 33 2C 31 2C 34 2C 32  2C 31 2C 30 2C 30 00 13
000037E0  25 20 31 2C 31 2C 31 2C  39 2C 32 2C 31 2C 33 2C
000037F0  31 2C 30 2C 30 00 14 25  20 31 2C 31 2C 31 2C 38
00003800  2C 32 2C 31 2C 33 2C 31  2C 30 2C 30 00 15 25 20
00003810  31 2C 31 2C 31 2C 32 2C  31 2C 33 2C 32 2C 31 2C
00003820  30 2C 30 00 16 25 20 31  2C 31 2C 31 2C 32 2C 31
00003830  2C 33 2C 32 2C 31 2C 30  2C 30 00 17 25 20 31 2C
00003840  31 2C 31 2C 36 2C 32 2C  31 2C 33 2C 31 2C 30 2C
00003850  30 00 18 25 20 31 2C 31  2C 31 2C 31 33 2C 31 2C
00003860  32 35 2C 32 2C 31 2C 30  2C 30 00 FF FF 01 00 00
00003870  59 1F A0 01 00 1E 51 06  3C 6D 74 03 E9 40 02 B4
00003880  30 CD 21 3C 02 73 03 E9  3A 02 BA 9D 03 8E DA 26
00003890  8B 3E 02 00 26 8B 2E 2C  00 8E C2 57 B0 00 BA 45
000038A0  03 1E 0E 1F B4 3D CD 21  1F 72 03 E9 D8 00 8E C5
000038B0  33 FF B9 05 00 BE 52 03  1E 0E 1F F3 A6 1F 74 13
000038C0  26 8A 05 47 0A C0 75 F8  26 80 3D 00 75 E4 1E 07
000038D0  EB 57 90 1E 07 1E 8E DD  8B F7 81 3C 00 20 1F 74
000038E0  48 BF CA 13 8B D7 1E 8E  DD AC 3C 3B 74 07 3C 00
000038F0  74 03 AA EB F4 1F 8B D8  81 FF CA 13 74 0F 80 7D
00003900  FF 3A 74 09 80 7D FF 5C  74 03 B0 5C AA 56 BE 45
00003910  03 B9 0D 00 90 1E 0E 1F  F3 A4 1F 5E B0 00 B4 3D
00003920  CD 21 73 62 80 FB 3B 74  B8 1E 0E 1F BA 07 03 B4
00003930  09 CD 21 1F C6 06 CA 13  40 BA CA 13 B4 0A CD 21
00003940  1E 0E 1F BA 04 03 B4 09  CD 21 1F B7 00 8A 1E CB
00003950  13 80 BF CB 13 3A 74 0D  80 BF CB 13 5C 74 06 C6
00003960  87 CC 13 5C 43 BA CC 13  8D BF CC 13 BE 45 03 B9
00003970  0D 00 90 1E 0E 1F F3 A4  1F B0 00 B4 3D CD 21 73
00003980  05 EB A6 E9 2F 01 5F 8B  D8 BA B0 13 B9 1A 00 B4
00003990  3F CD 21 72 EE 81 3E B0  13 4D 5A 75 E6 8B 16 B8
000039A0  13 83 C2 1F 81 E2 E0 FF  8B EA B1 04 D3 E2 33 C9
000039B0  B0 00 B4 42 CD 21 72 CB  8B 16 B4 13 4A B1 05 D3
000039C0  E2 2B D5 A1 B2 13 05 0F  00 B1 04 D3 E8 03 D0 89
```

```
000039D0  16 B4 13 2B FA 83 EF 14  8C D6 8B D4 83 C2 11 B1
000039E0  04 D3 EA 03 F2 3B FE 73  03 E9 CE 00 8B EF 1E 8E
000039F0  DF B9 FF FF 33 D2 B4 3F  CD 21 1F 72 86 8B 16 C8
00003A00  13 41 B0 00 B4 42 CD 21  72 12 3B 0E B6 13 74 23
00003A10  BA B0 13 B9 04 00 B4 3F  CD 21 73 03 E9 96 00 8B
00003A20  3E B0 13 A1 B2 13 03 C5  8E C0 26 01 2D FF 0E B6
00003A30  13 75 E3 B4 3E CD 21 73  03 EB 7A 90 01 2E C6 13
00003A40  A1 C6 13 8B 1E C4 13 8E  C0 26 80 7F 03 05 75 5F
00003A50  26 80 7F 04 06 75 58 26  80 7F 05 00 72 51 5B 1E
00003A60  07 8E DD B9 D8 09 33 F6  8B FE FC F3 A5 06 1F 1E
00003A70  B8 E9 02 8E D8 B9 67 03  2B C8 D1 E1 D1 E1 D1 E1
00003A80  B8 77 06 8E C0 33 F6 33  FF F3 A5 1F 8C D1 8C D8
00003A90  2B C8 81 F9 00 10 76 03  B9 00 10 D1 E1 D1 E1 D1
00003AA0  E1 BA E9 02 8E C2 33 F6  8B FE EA 10 00 DF 02 5B
00003AB0  BA BC 02 EB 12 BA E0 02  EB 0D BA A6 02 EB 08 BA
00003AC0  86 02 EB 03 BA 61 02 0E  1F B4 09 CD 21 33 C0 50
00003AD0  CB 0D 0A 4D 75 73 74 20  72 75 6E 20 75 6E 64 65
00003AE0  72 20 44 4F 53 20 32 2E  30 30 20 6F 72 20 6C 61
00003AF0  74 65 72 0D 0A 24 0D 0A  4D 75 73 74 20 6C 69 6E
00003B00  6B 20 77 69 74 68 20 42  41 53 43 4F 4D 32 30 2E
00003B10  4C 49 42 0D 0A 24 0D 0A  50 72 6F 67 72 61 6D 20
00003B20  74 6F 6F 20 6C 61 72 67  65 0D 0A 24 0D 0A 57 72
00003B30  6F 6E 67 20 76 65 72 73  69 6F 6E 20 6F 66 20 72
00003B40  75 6E 74 69 6D 65 20 6D  6F 64 75 6C 65 0D 0A 24
00003B50  0D 0A 45 72 72 6F 72 20  69 6E 20 45 58 45 20 66
00003B60  69 6C 65 0D 0A 24 0D 0A  43 61 6E 6E 6F 74 20 66
00003B70  69 6E 64 20 0D 0A 24 0D  0A 43 61 6E 6E 6F 74 20
00003B80  66 69 6E 64 20 42 41 53  52 55 4E 32 30 2E 45 58
00003B90  45 0D 0A 45 6E 74 65 72  20 6E 65 77 20 70 61 74
00003BA0  68 20 73 70 65 63 69 66  69 63 61 74 69 6F 6E 3A
00003BB0  20 24 0D 0A 24 42 41 53  52 55 4E 32 30 2E 45 58
00003BC0  45 00 50 41 54 48 3D

00000000  4D 5A 27 00 1E 00 0C 00  20 00 01 03 FF FF 63 06
00000010  00 02 DE A4 30 00 00 00  1E 00 00 00 01 00 12 00
00000020  00 00 14 00 00 00 16 00  00 00 33 00 00 00 38 00
00000030  00 00 86 00 8C 02 1B 00  4D 03 01 02 4D 03 06 02
00000040  4D 03 11 02 4D 03 32 02  4D 03 3D 02 4D 03 00 00
00000050  00 00 00 00 00 00 00 00  00 00 00 00 00 00 00 00
00000060  00 00 00 00 00 00 00 00  00 00 00 00 00 00 00 00
00000070  00 00 00 00 00 00 00 00  00 00 00 00 00 00 00 00
00000080  00 00 00 00 00 00 00 00  00 00 00 00 00 00 00 00
00000090  00 00 00 00 00 00 00 00  00 00 00 00 00 00 00 00
000000A0  00 00 00 00 00 00 00 00  00 00 00 00 00 00 00 00
000000B0  00 00 00 00 00 00 00 00  00 00 00 00 00 00 00 00
000000C0  00 00 00 00 00 00 00 00  00 00 00 00 00 00 00 00
000000D0  00 00 00 00 00 00 00 00  00 00 00 00 00 00 00 00
000000E0  00 00 00 00 00 00 00 00  00 00 00 00 00 00 00 00
000000F0  00 00 00 00 00 00 00 00  00 00 00 00 00 00 00 00
00000100  00 00 00 00 00 00 00 00  00 00 00 00 00 00 00 00
00000110  00 00 00 00 00 00 00 00  00 00 00 00 00 00 00 00
00000120  00 00 00 00 00 00 00 00  00 00 00 00 00 00 00 00
00000130  00 00 00 00 00 00 00 00  00 00 00 00 00 00 00 00
00000140  00 00 00 00 00 00 00 00  00 00 00 00 00 00 00 00
00000150  00 00 00 00 00 00 00 00  00 00 00 00 00 00 00 00
00000160  00 00 00 00 00 00 00 00  00 00 00 00 00 00 00 00
00000170  00 00 00 00 00 00 00 00  00 00 00 00 00 00 00 00
00000180  00 00 00 00 00 00 00 00  00 00 00 00 00 00 00 00
00000190  00 00 00 00 00 00 00 00  00 00 00 00 00 00 00 00
000001A0  00 00 00 00 00 00 00 00  00 00 00 00 00 00 00 00
000001B0  00 00 00 00 00 00 00 00  00 00 00 00 00 00 00 00
000001C0  00 00 00 00 00 00 00 00  00 00 00 00 00 00 00 00
000001D0  00 00 00 00 00 00 00 00  00 00 00 00 00 00 00 00
000001E0  00 00 00 00 00 00 00 00  00 00 00 00 00 00 00 00
000001F0  00 00 00 00 00 00 00 00  00 00 00 00 00 00 00 00
00000200  62 6D 4D 41 49 4E 20 20  20 20 00 00 C2 26 40 14
00000210  78 22 96 02 4D 03 83 03  40 14 00 00 40 14 40 14
00000220  90 22 04 00 00 00 00 00  00 00 00 00 FF FF 80 00
00000230  9A 00 00 4D 03 9A 77 00  8C 02 BB FF FF CD 3E 32
00000240  33 DB CD 3E 3C BB 90 22  BA 46 14 CD 3F 61 BB 98
00000250  22 BA 4A 14 CD 3F 61 BB  A2 22 BA 4E 14 CD 3F 61
00000260  BB AC 22 BA 52 14 CD 3F  61 BB B8 22 BA 56 14 CD
00000270  3F 61 BB BE 22 BA 5A 14  CD 3F 61 BB C4 22 BA 5E
00000280  14 CD 3F 61 BB CA 22 BA  62 14 CD 3F 61 BB D2 22
```

```
00000290  BA 66 14 CD 3F 61 BB DA  22 BA 92 21 CD 3F 61 BB
000002A0  E0 22 BA 96 21 CD 3F 61  BB 0D 00 CD 3D 05 BA 9A
000002B0  21 CD 3F 61 C7 06 9E 21  00 00 CD 3E 22 C7 06 A0
000002C0  21 20 00 BB E6 22 BA A2  21 CD 3F 61 BB 18 00 BA
000002D0  20 00 CD 3D 0E BA A6 21  CD 3F 61 CD 3E 22 BB EC
000002E0  22 CD 3E 1F BB 01 00 BA  F2 22 B9 20 00 CD 3E 1E
000002F0  BB 01 00 CD 3D 31 BF 02  23 CD 3F 92 CD 3F 78 93
00000300  A3 AA 21 CD 3E 22 CD 3E  22 BB EC 22 CD 3E 1F BB
00000310  01 00 BA 0A 23 33 C9 CD  3E 1E BB 01 00 CD 3D 31
00000320  CD 3F 78 93 A3 AC 21 CD  3E 22 83 3E AC 21 01 7D
00000330  03 E9 2E 00 BB 1C 23 CD  3E 1F BB 01 00 BA 0A 23
00000340  33 C9 CD 3E 1E BB 01 00  CD 3F B6 CD 3F B7 01 01
00000350  BB AE 21 CD 3F B8 CD 3E  22 A1 AE 21 A3 B0 21 E9
00000360  06 00 C7 06 B0 21 01 00  BB 01 00 CD 3E 21 83 3E
00000370  AA 21 00 75 03 E9 35 01  BB 02 00 CD 3E 21 BB 22
00000380  23 CD 3E 1F BB 02 00 BA  28 23 33 C9 CD 3E 1E BB
00000390  02 00 CD 3D 31 CD 3F 78  93 A3 AC 21 BB 02 00 CD
000003A0  3E 21 83 3E AC 21 01 7D  03 E9 2B 00 BB 3A 23 CD
000003B0  3E 1F BB 02 00 BA 28 23  33 C9 CD 3E 1E BB 02 00
000003C0  CD 3F B6 CD 3F B7 01 04  BB A6 21 CD 3F B8 BB 02
000003D0  00 CD 3E 21 E9 D0 00 BB  FF FF CD 3E 32 CD 3F BC
000003E0  BB 40 23 CD 3F 6A CD 3E  79 BB 04 00 BA FF 7F CD
000003F0  3D 07 BA B2 21 CD 3F 61  BB FF FF CD 3E 32 C7 06
00000400  AE 21 00 00 BB 01 00 CD  3E 21 BB 22 23 CD 3E 1F
00000410  BB 01 00 BA 5E 23 B9 20  00 CD 3E 1E BB 01 00 CD
00000420  3F B3 BB B6 21 BA 04 00  CD 3F B4 BB BA 21 BA 18
00000430  00 CD 3F B4 BB 01 00 CD  3D 31 BF 02 23 CD 3F 92
00000440  8B D3 CD 3F 78 93 A3 BE  21 92 E9 1C 00 BB 01 00
00000450  8B 16 AC 21 CD 3E 26 BB  B2 21 B8 B6 21 CD 3F 62
00000460  75 03 E9 13 00 A1 AC 21  40 A3 AC 21 A1 BE 21 3B
00000470  06 AC 21 7D D8 E9 5F FF  BB BA 21 BA A6 21 CD 3F
00000480  61 BB 01 00 CD 3E 21 BB  6E 23 CD 3E 1F BB 01 00
00000490  BA 74 23 33 C9 CD 3E 1E  BB 01 00 CD 3E 07 BB A6
000004A0  21 CD 3F 6E CD 3E 79 BB  01 00 CD 3E 21 83 3E B0
000004B0  21 01 7E 03 E9 20 00 B8  01 00 E9 04 00 A1 B0 21
000004C0  40 A3 B0 21 83 3E B0 21  18 7E F2 C7 06 B0 21 01
000004D0  00 C7 06 B0 21 01 00 C7  06 C0 21 00 00 BB FF FF
000004E0  CD 3E 32 BB 0A 00 CD 3E  33 33 DB CD 3E 35 C7 06
000004F0  9E 21 00 00 BB 77 23 CD  3F 34 B8 01 00 E9 4D 00
00000500  8B 1E AC 21 D1 E3 D1 E3  81 C3 66 14 CD 3F 10 8B
00000510  1E AC 21 D1 E3 D1 E3 81  C3 66 14 93 BB 86 23 CD
00000520  3F 62 75 03 E9 30 00 A1  9E 21 40 A3 9E 21 CD 3F
00000530  BC BB 8C 23 CD 3F 6A 8B  1E AC 21 D1 E3 D1 E3 81
00000540  C3 66 14 CD 3F 6E CD 3E  79 A1 AC 21 40 A3 AC 21
00000550  83 3E AC 21 18 7E A9 83  3E AA 21 00 7E 03 E9 89
00000560  00 8B 1E 9E 21 CD 3E 42  BB 01 00 CD 3E 42 33 DB
00000570  CD 3E 44 CD 3F BC BB 4F  00 BA 20 00 CD 3D 0E CD
00000580  3F 6A CD 3E 79 8B 1E 9E  21 D1 E3 D1 E3 8B D3 81
00000590  C3 62 14 81 C2 66 14 87  D3 CD 3F 61 8B 1E 9E 21
000005A0  D1 E3 D1 E3 81 C3 66 14  8B D3 BB 92 23 CD 3F 61
000005B0  A1 9E 21 48 A3 9E 21 8B  1E 9E 21 CD 3E 42 BB 02
000005C0  00 CD 3E 42 33 DB CD 3E  44 CD 3F BC 8B 1E 9E 21
000005D0  D1 E3 D1 E3 81 C3 66 14  CD 3F 6A BB 1E 00 BA 20
000005E0  00 CD 3D 0E CD 3F 6A CD  3E 79 A1 B0 21 A3 AC 21
000005F0  BB 05 00 CD 3E 42 BB 44  00 CD 3E 42 33 DB CD 3E
00000600  44 CD 3F BC BB 96 23 CD  3F 6A CD 3E 79 BB 17 00
00000610  CD 3E 33 33 DB CD 3E 35  CD 3F BC BB 10 00 CD 3D
00000620  05 CD 3F 6A CD 3E 79 BB  07 00 CD 3E 33 33 DB CD
00000630  3E 35 BB 07 00 CD 3E 42  BB 44 00 CD 3E 42 33 DB
00000640  CD 3E 44 CD 3F BC BB 18  00 CD 3D 05 CD 3F 6A BB
00000650  A0 23 CD 3F 6A CD 3E 79  BB 08 00 CD 3E 42 BB 44
00000660  00 CD 3E 42 33 DB CD 3E  44 CD 3F BC BB 19 00 CD
00000670  3D 05 CD 3F 6A BB AA 23  CD 3F 6A CD 3E 79 BB 0C
00000680  00 CD 3E 42 BB 42 00 CD  3E 42 33 DB CD 3E 44 CD
00000690  3F BC BB 11 00 CD 3D 05  CD 3F 6A BB C4 00 CD 3D
000006A0  05 CD 3F 6A BB D9 00 CD  3D 05 CD 3F 6A BB B6 23
000006B0  CD 3F 6A CD 3E 79 A1 AC  21 A3 AE 21 8B 1E AC 21
000006C0  CD 3E 42 BB 01 00 CD 3E  42 33 DB CD 3E 44 BB 17
000006D0  00 CD 3E 33 33 DB CD 3E  35 CD 3F BC BB 10 00 CD
000006E0  3D 05 CD 3F 6A CD 3E 79  33 DB CD 3E 33 BB 07 00
000006F0  CD 3E 35 CD 3F BC 8B 1E  AE 21 D1 E3 D1 E3 81 C3
00000700  66 14 CD 3F 6A CD 3E 79  BB 0A 00 CD 3E 33 33 DB
00000710  CD 3E 35 BB 19 00 CD 3E  42 BB 01 00 CD 3E 42 33
00000720  DB CD 3E 44 BB 92 23 BA  B2 21 CD 3F 61 CD 3D 43
```

```
00000730  BF C2 21 CD 3F 7D BB 92  23 B8 B2 21 CD 3F 62 BA
00000740  00 00 75 01 4A CD 3D 43  BF C2 21 CD 3F 99 8B DF
00000750  BF C4 23 CD 3F A1 B9 00  00 73 01 49 23 CA CD 3D
00000760  43 8B FB CD 3F 99 CD 3F  A9 BB 00 00 72 01 4B 23
00000770  D9 23 DB 75 03 E9 0B 00  CD 3D 06 BA B2 21 CD 3F
00000780  61 EB B3 CD 3D 43 BF C2  21 CD 3F 99 CD 3F 2D BF
00000790  C4 23 CD 3F A1 73 03 E9  05 00 E8 72 01 EB 85 BB
000007A0  9A 21 B8 B2 21 CD 3F 62  BA 00 00 74 01 4A BB 92
000007B0  21 CD 3F 62 B9 00 00 74  01 49 23 CA BB 96 21 CD
000007C0  3F 62 BA 00 00 74 01 4A  23 D1 23 D2 74 03 E9 53
000007D0  FF 8B 1E AC 21 CD 3E 42  BB 01 00 CD 3E 42 33 DB
000007E0  CD 3E 44 CD 3F BC BB 8C  23 CD 3F 6A 8B 1E AE 21
000007F0  D1 E3 D1 E3 81 C3 66 14  CD 3F 6E CD 3E 79 BB 9A
00000800  21 B8 B2 21 CD 3F 62 75  03 E9 70 00 BB 92 21 B8
00000810  B2 21 CD 3F 62 75 03 E9  32 00 A1 AC 21 40 A3 AC
00000820  21 A1 9E 21 3B 06 AC 21  7C 03 E9 06 00 C7 06 AC
00000830  21 01 00 BB A6 21 8B 16  AC 21 B9 01 00 CD 3D 0A
00000840  93 BB C8 23 CD 3F 62 74  D1 E9 6A FE A1 AC 21 48
00000850  A3 AC 21 83 3E AC 21 00  74 03 E9 06 00 A1 9E 21
00000860  A3 AC 21 BB A6 21 8B 16  AC 21 B9 01 00 CD 3D 0A
00000870  93 BB C8 23 CD 3F 62 74  D3 E9 3A FE BB FF FF CD
00000880  3E 32 A1 AE 21 A3 AC 21  A1 AE 21 A3 B0 21 CD 3E
00000890  22 BB FF FF CD 3E 32 BB  6E 23 CD 3E 1F BB 01 00
000008A0  BA 0A 23 33 C9 CD 3E 1E  BB 01 00 CD 3E 07 8B 1E
000008B0  AE 21 CD 3F 6D CD 3E 79  CD 3E 22 8B 1E AC 21 CD
000008C0  3F 5E 14 EB 06 EB 06 F1  06 F1 06 F1 06 F7 06 F7
000008D0  06 FD 06 FD 06 FD 06 03  07 03 07 03 07 03 07 98
000008E0  10 EB 06 09 07 BB 1E D7  01 86 1E BB CE 23 CD 3E
000008F0  0E BB D8 23 CD 3E 0E BB  E0 23 CD 3E 0E BB E8 23
00000900  CD 3E 0E BB F0 23 CD 3E  0E BB FA 23 CD 3E 0E BB
00000910  17 00 CD 3E 42 BB 01 00  CD 3E 42 33 DB CD 3E 44
00000920  CD 3F BC BB 4F 00 BA 20  00 CD 3D 0E CD 3F 6E CD
00000930  3E 79 BB 17 00 CD 3E 42  BB 01 00 CD 3E 42 33 DB
00000940  CD 3E 44 CD 3F BC BB 04  24 CD 3F 6A CD 3E 79 BB
00000950  02 00 CD 3E 21 BB EC 22  CD 3E 1F BB 02 00 BA 42
00000960  24 B9 40 01 CD 3E 1E 33  C0 E9 7D 00 33 C0 E9 6A
00000970  00 BB 02 00 CD 3F B3 B8  0A 00 F7 2E C6 21 8B 1E
00000980  C8 21 8B D3 D1 E3 03 D8  CD 3F 57 BF 50 24 CD 3F
00000990  91 BB 1A 00 CD 3F 71 80  CD 3D 03 CD 3F 77 87 D3
000009A0  8B CB BB CA 21 CD 3F B4  BB 78 22 CD 3D 03 CD 3F
000009B0  77 8B D3 BB CE 21 CD 3F  B4 D1 E1 D1 E1 D1 E1 D1
000009C0  E1 D1 E1 03 0E C6 21 D1  E1 D1 E1 81 C1 12 1F 8B
000009D0  D9 BA 02 00 CD 3F B4 A1  C8 21 40 A3 C8 21 83 3E
000009E0  C8 21 04 7E 8C A1 C6 21  40 A3 C6 21 83 3E C6 21
000009F0  1F 7F 03 E9 76 FF BB 04  00 CD 3E 21 BB EC 22 CD
00000A00  3E 1F BB 04 00 BA 54 24  B9 00 01 CD 3E 1E BB 04
00000A10  00 CD 3F B3 BB D2 21 BA  01 00 CD 3F B4 BB D6 21
00000A20  BA 02 00 CD 3F B4 B8 01  00 E9 5A 00 B8 01 00 E9
00000A30  46 00 BB 04 00 CD 3F B3  B8 28 00 F7 2E DA 21 8B
00000A40  1E DC 21 8B D3 D1 E3 03  D8 83 C3 D9 87 D3 8B CB
00000A50  BB CA 21 CD 3F B4 8B 1E  DA 21 D1 E3 D1 E3 D1 E3
00000A60  D1 E3 D1 E3 03 D9 D1 E3  D1 E3 81 C3 66 14 BA 02
00000A70  00 CD 3F B4 A1 DC 21 40  A3 DC 21 83 3E DC 21 14
00000A80  7E B0 A1 DA 21 40 A3 DA  21 83 3E DA 21 05 7E 9C
00000A90  BB 04 00 CD 3F B3 BB CA  21 BA E9 00 CD 3F B4 BB
00000AA0  DE 21 BA 02 00 CD 3F B4  BB E2 21 BA 14 00 CD 3F
00000AB0  B4 BB E6 21 BA 01 00 CD  3F B4 A1 A0 21 A3 EA 21
00000AC0  B8 01 00 E9 8A 07 83 3E  C8 21 01 74 03 E9 09 00
00000AD0  C7 06 EC 21 07 00 E9 2E  00 83 3E C8 21 17 BB 00
00000AE0  00 75 01 4B 83 3E C8 21  1C BA 00 00 75 01 4A 0B
00000AF0  D3 23 D2 75 03 E9 09 00  C7 06 EC 21 04 00 E9 06
00000B00  00 C7 06 EC 21 06 00 33  C0 E9 29 07 BB 8C 23 BA
00000B10  B2 21 CD 3F 61 A1 EC 21  A3 EE 21 33 C0 E9 64 00
00000B20  A1 F0 21 03 06 C8 21 BB  14 00 F7 EB 8B 1E C6 21
00000B30  D1 E3 03 D8 83 C3 ED 8B  D3 BB 04 00 CD 3E 26 BB
00000B40  D6 21 CD 3D 18 93 A3 DC  21 BB DE 21 CD 3D 18 93
00000B50  A3 F2 21 BB C8 23 B8 D2  21 CD 3F 62 BA 00 00 74
00000B60  01 4A 83 3E F2 21 00 BB  00 00 75 01 4B 0B DA 23
00000B70  DB 74 03 E9 0A 00 83 3E  DC 21 03 7D 03 E9 13 00
00000B80  A1 F0 21 40 A3 F0 21 A1  EE 21 3B 06 F0 21 7D 90
00000B90  E9 9E 06 C7 06 F4 21 E7  03 A1 EC 21 A3 F6 21 33
00000BA0  C0 E9 DE 02 A1 F0 21 03  06 C8 21 A3 F8 21 BB 98
00000BB0  1E CD 3F 34 A1 F8 21 A3  FA 21 B8 01 00 E9 16 00
00000BC0  BB FC 21 CD 3F 0F BB FE  21 CD 3F 0F BB 00 22 CD
```

```
00000BD0  3F 0F A1 02 22 40 A3 02  22 A1 FA 21 3B 06 02 22
00000BE0  7D DE A1 00 22 A3 04 22  B8 01 00 E9 81 02 83 3E
00000BF0  F8 21 08 BB 00 00 74 01  4B 83 3E F8 21 0F BA 00
00000C00  00 74 01 4A 23 D3 83 3E  F8 21 16 BB 00 00 74 01
00000C10  4B 23 DA 83 3E F8 21 1B  BA 00 00 74 01 4A 23 D3
00000C20  83 3E F8 21 20 BB 00 00  74 01 4B 23 DA 83 3E 06
00000C30  22 04 BA 00 00 75 01 4A  23 D3 23 D2 74 03 E9 2A
00000C40  02 B8 05 00 F7 2E F0 21  03 06 06 22 92 BB 02 00
00000C50  CD 3E 26 A1 FE 21 A3 08  22 A1 FC 21 E9 FD 01 83
00000C60  3E 0A 22 14 7F 03 E9 0C  00 A1 0A 22 05 EC FF A3
00000C70  DC 21 E9 06 00 A1 0A 22  A3 DC 21 A1 F0 21 03 06
00000C80  C8 21 BB 14 00 F7 EB 05  ED FF 93 CD 3F 57 8B 1E
00000C90  0A 22 CD 3F 71 80 CD 3F  57 BF 66 24 CD 3F 89 BB
00000CA0  1A 00 CD 3D 03 CD 3F 9D  80 8B 1E C6 21 D1 E3 CD
00000CB0  3F 71 81 CD 3F 57 CD 3F  85 81 BB 1A 00 CD 3E 7B
00000CC0  BB 04 00 33 D2 CD 3E 26  8B 1E 06 22 D1 E3 D1 E3
00000CD0  D1 E3 D1 E3 D1 E3 03 1E  DC 21 D1 E3 D1 E3 81 C3
00000CE0  66 14 CD 3D 18 0B DB 75  03 E9 6C 01 83 3E F8 21
00000CF0  08 BB 00 00 74 01 4B 83  3E F8 21 0F BA 00 00 74
00000D00  01 4A 23 D3 83 3E F8 21  16 BB 00 00 74 01 4B 23
00000D10  DA 83 3E F8 21 1B BA 00  00 74 01 4A 23 D3 83 3E
00000D20  F8 21 20 BB 00 00 74 01  4B 23 DA 23 DB 74 03 E9
00000D30  C3 00 BB 9B 1E CD 3F 34  83 3E F8 21 20 74 03 E9
00000D40  06 00 C7 06 0C 22 1B 00  83 3E F8 21 1B 74 03 E9
00000D50  06 00 C7 06 0C 22 16 00  83 3E F8 21 16 74 03 E9
00000D60  06 00 C7 06 0C 22 0F 00  83 3E F8 21 0F 74 03 E9
00000D70  06 00 C7 06 0C 22 08 00  83 3E F8 21 08 74 03 E9
00000D80  06 00 C7 06 0C 22 00 00  A1 F8 21 48 A3 0E 22 B8
00000D90  01 00 E9 54 00 BB 10 22  CD 3F 0F BB 12 22 CD 3F
00000DA0  0F BB 14 22 CD 3F 0F 83  3E 10 22 FF 75 03 E9 34
00000DB0  00 A1 06 22 3B 06 12 22  BB 00 00 75 01 4B A1 0A
00000DC0  22 3B 06 14 22 BA 00 00  75 01 4A 23 D3 A1 0C 22
00000DD0  3B 06 C0 21 BB 00 00 7D  01 4B 23 DA 23 DB 74 03
00000DE0  E9 75 00 EB B0 A1 C0 21  40 A3 C0 21 A1 0E 22 3B
00000DF0  06 C0 21 7D A0 8B 1E 0A  22 D1 E3 D1 E3 81 C3 8E
00000E00  1F CD 3D 18 CD 3F 57 8B  1E 06 22 D1 E3 D1 E3 D1
00000E10  E3 D1 E3 D1 E3 03 1E DC  21 D1 E3 D1 E3 81 C3 66
00000E20  14 CD 3D 18 CD 3F 71 80  CD 3F 57 CD 3F 8D 80 BE
00000E30  1A 00 CD 3D 03 CD 3F 77  93 A3 16 22 83 3E 16 22
00000E40  00 75 03 E9 EB 03 A1 F4  21 3B 06 16 22 7F 03 E9
00000E50  06 00 A1 16 22 A3 F4 21  A1 0A 22 40 A3 0A 22 A1
00000E60  08 22 3B 06 0A 22 7C 03  E9 F4 FD A1 06 22 40 A3
00000E70  06 22 A1 04 22 3B 06 06  22 7C 03 E9 70 FD A1 F0
00000E80  21 40 A3 F0 21 A1 F6 21  3B 06 F0 21 7C 03 E9 13
00000E90  FD 83 3E F4 21 00 75 03  E9 96 03 A1 F4 21 3B 06
00000EA0  F2 21 7D 03 E9 06 00 A1  F2 21 A3 F4 21 A1 C8 21
00000EB0  8B D8 03 06 EC 21 A3 18  22 93 E9 BD 00 B8 14 00
00000EC0  F7 2E F0 21 8B 1E C6 21  D1 E3 03 D8 83 C3 ED 8B
00000ED0  D3 BB 04 00 CD 3E 26 BB  D6 21 8B D3 CD 3D 18 03
00000EE0  1E F4 21 CD 3D 1B CD 3F  5B BB DE 21 8B D3 CD 3D
00000EF0  18 2B 1E F4 21 CD 3D 1B  CD 3F 5B B8 14 00 F7 2E
00000F00  F0 21 8B 1E C6 21 D1 E3  03 D8 83 C3 ED 8B D3 BB
00000F10  04 00 CD 3E 28 BB 05 00  CD 3E 21 BB 22 23 CD 3E
00000F20  1F BB 05 00 BA 6A 24 B9  20 00 CD 3E 1E BB 05 00
00000F30  CD 3F B3 BB B6 21 BA 20  00 CD 3F B4 BB 05 00 BA
00000F40  01 00 CD 3E 26 BB B6 21  BA BA 21 CD 3F 61 BB 8C
00000F50  23 BA BA 21 8B 0E F0 21  B8 01 00 CD 3F 5C BB BA
00000F60  21 BA B6 21 CD 3F 5B BB  05 00 BA 01 00 CD 3E 28
00000F70  BB 05 00 CD 3E 21 A1 F0  21 40 A3 F0 21 A1 18 22
00000F80  3B 06 F0 21 7C 03 E9 34  FF A1 C8 21 8B D8 03 06
00000F90  EC 21 A3 1A 22 93 E9 89  02 BB 98 1E CD 3F 34 A1
00000FA0  F0 21 A3 1C 22 B8 01 00  E9 16 00 BB FC 21 CD 3F
00000FB0  0F BB FE 21 CD 3F 0F BB  00 22 CD 3F 0F A1 02 22
00000FC0  40 A3 02 22 A1 1C 22 3B  06 02 22 7D DE A1 00 22
00000FD0  A3 1E 22 B8 01 00 E9 36  02 83 3E F0 21 08 BB 00
00000FE0  00 74 01 4B 83 3E F0 21  0F BA 00 00 74 01 4A 23
00000FF0  D3 83 3E F0 21 16 BB 00  00 74 01 4B 23 DA 83 3E
00001000  F0 21 1B BA 00 00 74 01  4A 23 D3 83 3E F0 21 20
00001010  BB 00 00 74 01 4B 23 DA  83 3E 06 22 04 BA 00 00
00001020  75 01 4A 23 D3 23 D2 74  03 E9 DF 01 B8 05 00 F7
00001030  2E F0 21 03 06 06 22 05  FB FF A3 F8 21 BB 02 00
00001040  8B 16 F8 21 CD 3E 26 A1  FE 21 A3 20 22 A1 FC 21
00001050  E9 9F 01 83 3E 0A 22 14  7F 03 E9 0C 00 A1 0A 22
00001060  05 EC FF A3 DC 21 E9 06  00 A1 0A 22 A3 DC 21 83
```

```
00001070  3E F0 21 08 BB 00 00 74  01 4B 83 3E F0 21 0F BA
00001080  00 00 74 01 4A 23 D3 83  3E F0 21 16 BB 00 00 74
00001090  01 4B 23 DA 83 3E F0 21  1B BA 00 00 74 01 4A 23
000010A0  D3 83 3E F0 21 20 BB 00  00 74 01 4B 23 DA 23 DB
000010B0  74 03 E9 C3 00 BB 9B 1E  CD 3F 34 83 3E F0 21 20
000010C0  7C 03 E9 06 00 C7 06 0C  22 1B 00 83 3E F0 21 1B
000010D0  7C 03 E9 06 00 C7 06 0C  22 16 00 83 3E F0 21 16
000010E0  7C 03 E9 06 00 C7 06 0C  22 0F 00 83 3E F0 21 0F
000010F0  7C 03 E9 06 00 C7 06 0C  22 08 00 83 3E F0 21 08
00001100  7C 03 E9 06 00 C7 06 0C  22 00 00 A1 F0 21 48 A3
00001110  22 22 B8 01 00 E9 54 00  BB 10 22 CD 3F 0F BB 12
00001120  22 CD 3F 0F BB 14 22 CD  3F 0F 83 3E 10 22 FF 75
00001130  03 E9 34 00 A1 06 22 3B  06 12 22 BB 00 00 75 01
00001140  4B A1 0A 22 3B 06 14 22  BA 00 00 75 01 4A 23 D3
00001150  A1 0C 22 3B 06 C0 21 BB  00 00 7D 01 4B 23 DA 23
00001160  DB 74 03 E9 88 00 EB B0  A1 C0 21 40 A3 C0 21 A1
00001170  22 22 3B 06 C0 21 7D A0  B8 14 00 F7 2E F0 21 05
00001180  ED FF 93 CD 3F 57 8B 1E  0A 22 CD 3F 71 80 CD 3F
00001190  57 BF 66 24 CD 3F 89 BB  1A 00 CD 3D 03 CD 3F 85
000011A0  80 BB 1A 00 CD 3E 7B BB  04 00 33 D2 CD 3E 26 8B
000011B0  1E 0A 22 D1 E3 D1 E3 81  C3 8E 1F 8B 16 06 22 D1
000011C0  E2 D1 E2 D1 E2 D1 E2 D1  E2 03 16 DC 21 D1 E2 D1
000011D0  E2 81 C2 66 14 87 DA CD  3D 18 93 8B DA F7 2E F4
000011E0  21 8B D3 CD 3D 18 2B D8  CD 3D 1B CD 3F 5B A1 0A
000011F0  22 40 A3 0A 22 A1 20 22  3B 06 0A 22 7C 03 E9 52
00001200  FE BB 02 00 8B 16 F8 21  CD 3E 28 A1 06 22 40 A3
00001210  06 22 A1 1E 22 3B 06 06  22 7C 03 E9 BB FD A1 F0
00001220  21 40 A3 F0 21 A1 1A 22  3B 06 F0 21 7C 03 E9 68
00001230  FD A1 C6 21 40 A3 C6 21  83 3E C6 21 09 7F 03 E9
00001240  CA F8 A1 EC 21 03 06 C8  21 A3 C8 21 A1 C8 21 40
00001250  A3 C8 21 A1 EA 21 3B 06  C8 21 7C 03 E9 67 F8 BB
00001260  17 00 CD 3E 42 BB 01 00  CD 3E 42 33 DB CD 3E 44
00001270  CD 3F BC BB 4F 00 BA 20  00 CD 3D 0E CD 3F 6A CD
00001280  3E 79 BB 02 00 CD 3E 21  BB 04 00 CD 3E 21 CD 3D
00001290  43 BF C2 21 CD 3F 7D C3  C7 06 F0 21 08 00 BB 8C
000012A0  23 BA 24 22 CD 3F 61 83  3E F0 21 21 7D 03 E9 65
000012B0  00 B8 01 00 E9 BB 0C 83  3E 28 22 01 74 03 E9 06
000012C0  00 C7 06 C8 21 08 00 83  3E 28 22 02 74 03 E9 06
000012D0  00 C7 06 C8 21 0F 00 83  3E 28 22 03 74 03 E9 06
000012E0  00 C7 06 C8 21 16 00 83  3E 28 22 04 74 03 E9 06
000012F0  00 C7 06 C8 21 1B 00 83  3E 28 22 05 74 03 E9 06
00001300  00 C7 06 C8 21 20 00 BB  C8 23 BA 24 22 CD 3F 61
00001310  A1 C8 21 A3 F0 21 BB 92  23 BA 2A 22 CD 3F 61 BB
00001320  04 00 CD 3E 21 BB EC 22  CD 3E 1F BB 04 00 BA 54
00001330  24 B9 00 01 CD 3E 1E BB  04 00 CD 3F B3 BB D2 21
00001340  BA 01 00 CD 3F B4 BB D6  21 BA 02 00 CD 3F B4 B8
00001350  01 00 E9 5A 00 B8 01 00  E9 46 00 BB 04 00 CD 3F
00001360  B3 B8 28 00 F7 2E DA 21  8B 1E DC 21 8B D3 D1 E3
00001370  03 D8 83 C3 D9 87 D3 8B  CB BB CA 21 CD 3F B4 8B
00001380  1E DA 21 D1 E3 D1 E3 D1  E3 D1 E3 D1 E3 03 D9 D1
00001390  E3 D1 E3 81 C3 66 14 BA  02 00 CD 3F B4 A1 DC 21
000013A0  40 A3 DC 21 83 3E DC 21  14 7E B0 A1 DA 21 40 A3
000013B0  DA 21 83 3E DA 21 05 7E  9C BB 04 00 CD 3F B3 BB
000013C0  CA 21 BA E9 00 CD 3F B4  BB DE 21 BA 02 00 CD 3F
000013D0  B4 BB E2 21 BA 14 00 CD  3F B4 BB E6 21 BA 01 00
000013E0  CD 3F B4 A1 A0 21 A3 2E  22 B6 01 00 E9 54 01 8B
000013F0  1E C8 21 D1 E3 D1 E3 81  C3 66 17 8B D3 BB 8C 23
00001400  CD 3F 61 33 C0 E9 2A 01  B8 0A 00 F7 2E C8 21 03
00001410  06 C6 21 05 F7 FF A3 30  22 8B 1E 30 22 D1 E3 D1
00001420  E3 81 C3 0E 1A 8B D3 BB  8C 23 CD 3F 61 B8 14 00
00001430  F7 2E C8 21 8B 1E C6 21  D1 E3 03 D8 83 C3 ED 8B
00001440  D3 BB 04 00 CD 3E 26 BB  C8 23 B8 D2 21 CD 3F 62
00001450  74 03 E9 D9 00 BB 8C 23  BA B2 21 CD 3F 61 BB DE
00001460  21 8B D3 CD 3D 18 0B DB  75 03 E9 14 00 8B DA CD
00001470  3D 18 CD 3D 10 B8 7C 24  CD 3F 55 BA B2 21 CD 3F
00001480  61 8B 1E C8 21 D1 E3 D1  E3 81 C3 66 17 8B D3 BB
00001490  C8 23 CD 3F 61 8B 1E 30  22 D1 E3 D1 E3 81 C3 0E
000014A0  1A 8B D3 BB E2 21 B8 E6  21 CD 3F 55 8B CB BB D6
000014B0  21 CD 3D 18 CD 3D 10 B8  90 24 CD 3F 55 8B C2 BA
000014C0  05 00 CD 3D 0C 91 CD 3F  55 8B D1 CD 3F 61 B8 14
000014D0  00 F7 2E C8 21 8B 1E C6  21 D1 E3 03 D8 83 C3 EE
000014E0  8B D3 BB 04 00 CD 3E 26  8B 1E 30 22 D1 E3 D1 E3
000014F0  81 C3 0E 1A 93 BB 9A 24  CD 3F 55 8B D3 BB D6 21
00001500  CD 3D 18 CD 3D 10 8B C8  B8 90 24 CD 3F 55 8B C2
```

```
00001510  BA 05 00 CD 3D 0C CD 3F  55 93 BB B2 21 CD 3F 55
00001520  8B D1 CD 3F 61 BB 8C 23  BA B2 21 CD 3F 61 A1 C6
00001530  21 40 A3 C6 21 83 3E C6  21 09 7F 03 E9 C9 FE A1
00001540  C8 21 40 A3 C8 21 A1 2E  22 3B 06 C8 21 7C 03 E9
00001550  9D FE BB 04 00 CD 3E 21  BB 8C 23 B8 24 22 CD 3F
00001560  62 BA 00 00 75 01 4A BB  C8 23 CD 3F 62 B9 00 00
00001570  75 01 49 83 3E 28 22 01  BB 00 00 75 01 4B 23 D9
00001580  0B DA 23 DB 75 03 E9 06  00 BB FF FF CD 3E 32 BB
00001590  C8 23 B8 24 22 CD 3F 62  BA 00 00 75 01 4A 83 3E
000015A0  28 22 01 BB 00 00 75 01  4B 23 DA 23 DB 75 03 E9
000015B0  31 00 CD 3F BC BB A8 24  CD 3F 6A BB 19 00 CD 3F
000015C0  37 BB 92 23 CD 3F 6A 8B  D3 BB B2 24 CD 3F 6A BB
000015D0  2B 00 CD 3F 37 8B DA CD  3F 6A BB BE 24 CD 3F 6E
000015E0  CD 3E 79 BB 8C 23 B8 24  22 CD 3F 62 74 03 E9 38
000015F0  00 CD 3F BC BB A8 24 CD  3F 6A 8B 1E F0 21 CD 3F
00001600  69 BB 19 00 CD 3F 37 BB  92 23 CD 3F 6A 8B D3 BB
00001610  B2 24 CD 3F 6A BB 2B 00  CD 3F 37 8B DA CD 3F 6A
00001620  BB BE 24 CD 3F 6E CD 3E  79 A1 F0 21 A3 C8 21 BB
00001630  8C 23 B8 24 22 CD 3F 62  BA 00 00 75 01 4A 8B 1E
00001640  C8 21 D1 E3 D1 E3 81 C3  66 17 93 BB C8 23 CD 3F
00001650  62 B9 00 00 74 01 49 23  CA 23 C9 74 03 E9 CD 01
00001660  C7 06 32 22 00 00 BB C8  23 B8 24 22 CD 3F 62 74
00001670  03 E9 13 00 CD 3F BC BB  E4 24 CD 3F 6A 8B 1E C8
00001680  21 CD 3F 69 CD 3E 79 BB  C8 23 B8 24 22 CD 3F 62
00001690  BA 00 00 75 01 4A 8B 0E  C8 21 D1 E1 D1 E1 81 C1
000016A0  66 17 91 CD 3F 62 B9 00  00 74 01 49 23 CA 23 C9
000016B0  75 03 E9 0F 00 CD 3F BC  BB 8C 23 CD 3F 6E CD 3E
000016C0  79 E9 9C 08 B8 01 00 E9  39 01 B8 0A 00 F7 2E C8
000016D0  21 03 06 AC 21 D1 E0 D1  E0 05 E6 19 93 CD 3F BA
000016E0  83 FB 03 7D 03 E9 17 01  B8 0A 00 F7 2E C8 21 03
000016F0  06 AC 21 D1 E0 D1 E0 05  E6 19 93 BA 01 00 CD 3D
00001700  0B 93 BB C8 23 CD 3F 62  74 03 E9 0B 00 33 DB CD
00001710  3E 33 BB 07 00 CD 3E 35  CD 3F BC BB 0C 00 CD 3F
00001720  37 BB 92 23 CD 3F 6A BB  EA 24 CD 3F 6A 8B 1E AC
00001730  21 CD 3F 69 8B D3 BB E4  24 CD 3F 6A B8 0A 00 8B
00001740  DA F7 2E C8 21 03 C3 D1  E0 D1 E0 05 E6 19 93 8B
00001750  D3 CD 3F BA 4B 87 D3 CD  3D 0C CD 3F 6E CD 3E 79
00001760  BB 0A 00 CD 3E 33 33 DB  CD 3E 35 A1 32 22 40 A3
00001770  32 22 83 3E C8 21 08 BB  00 00 75 01 4B 83 3E 32
00001780  22 04 BA 00 00 75 01 4A  23 D3 83 3E C8 21 0F BB
00001790  00 00 75 01 4B 83 3E C8  21 16 B9 00 00 75 01 49
000017A0  0B CB 83 3E 32 22 06 BB  00 00 75 01 4B 23 D9 0B
000017B0  DA 83 3E C8 21 1B BA 00  00 75 01 4A 83 3E C8 21
000017C0  20 B9 00 00 75 01 49 0B  CA 83 3E 32 22 03 BA 00
000017D0  00 75 01 4A 23 D1 0B D3  BB C8 23 B8 24 22 CD 3F
000017E0  62 B9 00 00 75 01 49 23  CA 23 C9 75 03 E9 0F 00
000017F0  CD 3F BC BB 8C 23 CD 3F  6E CD 3E 79 E9 61 07 A1
00001800  AC 21 40 A3 AC 21 83 3E  AC 21 0A 7F 03 E9 BA FE
00001810  BB C8 23 B8 24 22 CD 3F  62 74 03 E9 0F 00 CD 3F
00001820  BC BB 8C 23 CD 3F 6E CD  3E 79 E9 33 07 CD 3D 24
00001830  BA 34 22 CD 3F 61 CD 3D  23 BA 38 22 CD 3F 61 BB
00001840  34 22 BA 3C 22 CD 3F 61  BB 3C 22 BA 04 00 B9 02
00001850  00 CD 3D 0A CD 3D 13 BF  F4 24 CD 3F 8A CD 3F 7A
00001860  BF 40 22 CD 3F 7D BB 3C  22 CD 3D 13 CD 3F 7A BF
00001870  44 22 CD 3F 7D C7 06 EC  21 05 00 83 3E F0 21 1C
00001880  7C 03 E9 06 00 C7 06 EC  21 04 00 83 3E F0 21 17
00001890  7C 03 E9 06 00 C7 06 EC  21 03 00 83 3E F0 21 10
000018A0  7C 03 E9 06 00 C7 06 EC  21 02 00 83 3E F0 21 09
000018B0  7C 03 E9 06 00 C7 06 EC  21 01 00 BB 22 23 CD 3E
000018C0  1F BB 01 00 BA FC 24 B9  80 00 CD 3E 1E BB 01 00
000018D0  8B 16 EC 21 CD 3E 26 B8  01 00 E9 3C 00 BB 01 00
000018E0  CD 3F B3 8B 1E C8 21 D1  E3 D1 E3 4B 4B 4B 4B 8B
000018F0  D3 BB 48 22 CD 3F B4 BB  4C 22 BA 04 00 CD 3F B4
00001900  8B 3E C8 21 D1 E7 D1 E7  81 C7 86 18 BB 4C 22 CD
00001910  3D 19 CD 3F 7D A1 C8 21  40 A3 C8 21 83 3E C8 21
00001920  19 7E BA 8B 16 EC 21 83  C2 05 BB 01 00 CD 3E 26
00001930  B8 01 00 E9 3C 00 BB 01  00 CD 3F B3 8B 1E C8 21
00001940  D1 E3 D1 E3 4B 4B 4B 4B  8B D3 BB 48 22 CD 3F B4
00001950  BB 4C 22 BA 04 00 CD 3F  B4 8B 3E C8 21 D1 E7 D1
00001960  E7 81 C7 4A 19 BB 4C 22  CD 3D 19 CD 3F 7D A1 C8
00001970  21 40 A3 C8 21 83 3E C8  21 19 7E BA BB 01 00 CD
00001980  3E 21 B8 01 00 E9 16 00  8B 3E AC 21 D1 E7 D1 E7
00001990  81 C7 EA 18 BE 0A 25 CD  3F 7B A1 AC 21 40 A3 AC
000019A0  21 83 3E AC 21 18 7E E0  BF 1A 19 BE 50 24 CD 3F
```

```
000019B0 7B BF 3A 19 BE 50 24 CD 3F 7B BB 44 22 CD 3D 03
000019C0 CD 3F 77 93 A3 50 22 8B 3E 50 22 D1 E7 D1 E7 81
000019D0 C7 EE 18 BE 40 22 CD 3F 7B 83 3E 50 22 0B BB 00
000019E0 00 75 01 4B 83 3E 50 22 13 BA 00 00 75 01 4A 0B
000019F0 D3 23 D2 75 03 E9 1C 00 8B 36 50 22 D1 E6 D1 E6
00001A00 81 C6 EE 18 BF 50 24 CD 3F 9F 77 03 E9 05 00 87
00001A10 F7 CD 3F 7B BB 0C 00 CD 3E 42 BB 0F 00 CD 3E 42
00001A20 33 DB CD 3E 44 CD 3F BC 8B 1E EC 21 CD 3D 10 B8
00001A30 0E 25 CD 3F 55 CD 3F 6A BB 1E 25 CD 3F 6A BB 66
00001A40 14 CD 3E 0A BB 8A 18 CD 3F 67 CD 3E 79 CD 3F BC
00001A50 BB 46 00 CD 3F 37 BB 92 23 CD 3F 6A CD 3D 24 CD
00001A60 3F 6E CD 3E 79 BB 0F 00 CD 3E 42 BB 01 00 CD 3E
00001A70 42 33 DB CD 3E 44 CD 3F BC BB 2E 25 CD 3F 6A BB
00001A80 D7 00 CD 3D 05 CD 3F 6E CD 3E 79 CD 3F BC BB 38
00001A90 25 CD 3F 6A BB D7 00 CD 3D 05 CD 3F 6E CD 3E 79
00001AA0 CD 3F BC BB 42 25 CD 3F 6A BB D7 00 CD 3D 05 CD
00001AB0 3F 6E CD 3E 79 CD 3F BC BB 4C 25 CD 3F 6A BB D7
00001AC0 00 CD 3D 05 CD 3F 6E CD 3E 79 CD 3F BC BB 56 25
00001AD0 CD 3F 6A BB D7 00 CD 3D 05 CD 3F 6E CD 3E 79 CD
00001AE0 3F BC BB 60 25 CD 3F 6A BB D7 00 CD 3D 05 CD 3F
00001AF0 6E CD 3E 79 CD 3F BC BB 6A 25 CD 3F 6A BB CA 00
00001B00 CD 3D 05 CD 3F 6A CD 3E 79 B8 01 00 E9 25 00 CD
00001B10 3F BC BB CD 00 8B D3 CD 3D 05 CD 3F 6A 8B DA CD
00001B20 3D 05 CD 3F 6A 8B DA CD 3D 05 CD 3F 6A CD 3E 79
00001B30 A1 AC 21 40 A3 AC 21 83 3E AC 21 18 7E D1 BB 11
00001B40 00 CD 3E 42 BB 07 00 CD 3E 42 33 DB CD 3E 44 B8
00001B50 01 00 E9 13 00 CD 3F BC BB C4 00 CD 3D 05 CD 3F
00001B60 6A CD 3E 79 A1 AC 21 40 A3 AC 21 83 3E AC 21 48
00001B70 7E E3 A1 50 22 40 A3 52 22 B8 01 00 E9 44 00 83
00001B80 3E 52 22 18 74 03 E9 06 00 C7 06 52 22 00 00 BB
00001B90 16 00 CD 3E 42 B8 03 00 F7 2E AC 21 40 40 40 93
00001BA0 CD 3E 42 33 DB CD 3E 44 BB 46 14 CD 3F BD 8B 1E
00001BB0 52 22 CD 3F 69 CD 3E 79 A1 52 22 40 A3 52 22 A1
00001BC0 AC 21 40 A3 AC 21 83 3E AC 21 18 7E B2 BB 8C 23
00001BD0 BA 54 22 CD 3F 61 BF 58 22 BE 74 25 CD 3F 7B BE
00001BE0 78 25 CD 3F 6F E9 49 03 A1 50 22 A3 52 22 B8 01
00001BF0 00 E9 1E 03 BF 7C 25 BE 40 22 CD 3F 9F BB 00 00
00001C00 73 01 4B 83 3E AC 21 18 BA 00 00 75 01 4A 23 D3
00001C10 23 D2 74 03 E9 F7 02 A1 52 22 40 A3 52 22 83 3E
00001C20 52 22 17 7F 03 E9 06 00 C7 06 52 22 00 00 BF 5C
00001C30 22 BE 80 25 CD 3F 7B BF 60 22 BE 8A 18 CD 3F 7B
00001C40 83 3E AC 21 18 75 03 E9 12 00 8B 36 52 22 D1 E6
00001C50 D1 E6 81 C6 52 19 BF 60 22 CD 3F 7B 8B 36 52 22
00001C60 D1 E6 D1 E6 8B DE 81 C6 EE 18 BF 84 25 CD 3F 9F
00001C70 BA 00 00 76 01 4A 8B CE BE 60 22 CD 3F A7 B8 00
00001C80 00 76 01 48 23 C2 23 C0 75 03 E9 1E 00 81 C3 8E
00001C90 18 87 F3 8B FB 87 F1 CD 3F 8F 8B F1 CD 3F 8B BF
00001CA0 88 25 CD 3F 91 BF 5C 22 CD 3F 7D 8B 3E AC 21 D1
00001CB0 E7 D1 E7 81 C7 AE 19 BE 5C 22 CD 3F 7B BF 64 22
00001CC0 BE 8C 25 CD 3F 97 BF 78 25 CD 3F 81 CD 3F 77 CD
00001CD0 3E 42 B8 03 00 F7 2E AC 21 05 05 00 93 CD 3E 42
00001CE0 33 DB CD 3E 44 CD 3F BC BB 8C 23 CD 3F 6A CD 3E
00001CF0 79 BF 64 22 BE 8C 25 CD 3F 97 BF 78 25 CD 3F 81
00001D00 CD 3F 77 CD 3E 42 B8 03 00 F7 2E AC 21 05 05 00
00001D10 93 CD 3E 42 33 DB CD 3E 44 BF 90 25 BE 64 22 CD
00001D20 3F 9F BB 00 00 75 01 4B BF 94 25 BE 5C 22 CD 3F
00001D30 7F BF 88 25 CD 3F A1 BA 00 00 73 01 4A 23 D3 23
00001D40 D2 75 03 E9 12 00 CD 3F BC BB C4 00 CD 3D 05 CD
00001D50 3F 6A CD 3E 79 E9 10 01 BF 78 25 BE 64 22 CD 3F
00001D60 9F BB 00 00 75 01 4B BF 98 25 BE 5C 22 CD 3F 9F
00001D70 BA 00 00 76 01 4A 23 D3 23 D2 75 03 E9 12 00 CD
00001D80 3F BC BB DB 00 CD 3D 05 CD 3F 6A CD 3E 79 E9 D7
00001D90 00 BF 0A 25 BE 64 22 CD 3F 9F BB 00 00 75 01 4B
00001DA0 BF 9C 25 BE 5C 22 CD 3F 9F BA 00 00 73 01 4A 23
00001DB0 D3 23 D2 75 03 E9 12 00 CD 3F BC BB CB 00 CD 3D
00001DC0 05 CD 3F 6A CD 3E 79 E9 9E 00 BF 9C 25 BE 64 22
00001DD0 CD 3F 8F BF 90 25 BE 5C 22 CD 3F 71 80 CD 3F 7F
00001DE0 CD 3F A5 80 76 03 E9 7F 00 BF 0A 25 BE 64 22 CD
00001DF0 3F 9F 74 03 E9 12 00 CD 3F BC BB DF 00 CD 3D 05
00001E00 CD 3F 6A CD 3E 79 E9 5F 00 BF 9C 25 BE 64 22 CD
00001E10 3F 8F BF A0 25 CD 3F 71 80 CD 3F 81 BF 5C 22 CD
00001E20 3F A1 BB 00 00 76 01 4B 8B D7 BF A4 25 BE 78 22
00001E30 CD 3F 7F 8B FA CD 3F A1 B9 00 00 73 01 49 0B CB
00001E40 23 C9 75 03 E9 12 00 CD 3F BC BB DB 00 CD 3D 05
```

| | | | | | | | | | | | | | | | | |
|---|---|---|---|---|---|---|---|---|---|---|---|---|---|---|---|---|
| 00001E50 | CD | 3F | 6A | CD | 3E | 79 | E9 | 0F | 00 | CD | 3F | BC | BB | DC | 00 | CD |
| 00001E60 | 3D | 05 | CD | 3F | 6A | CD | 3E | 79 | BB | C8 | 23 | B8 | 54 | 22 | CD | 3F |
| 00001E70 | 62 | 75 | 03 | E9 | 98 | 00 | B9 | 02 | 00 | A1 | AC | 21 | 8B | D8 | 99 | F7 |
| 00001E80 | F9 | 0B | D2 | 74 | 03 | E9 | 1C | 00 | 8B | D3 | BB | 0D | 00 | CD | 3E | 42 |
| 00001E90 | B8 | 03 | 00 | F7 | EA | 40 | 40 | 40 | 93 | CD | 3E | 42 | 33 | DB | CD | 3E |
| 00001EA0 | 44 | E9 | 19 | 00 | BB | 0E | 00 | CD | 3E | 42 | B8 | 03 | 00 | F7 | 2E | AC |
| 00001EB0 | 21 | 40 | 40 | 40 | 93 | CD | 3E | 42 | 33 | DB | CD | 3E | 44 | 8B | 36 | 52 |
| 00001EC0 | 22 | D1 | E6 | D1 | E6 | 8B | DE | 81 | C6 | 8E | 18 | BF | 84 | 25 | CD | 3F |
| 00001ED0 | 9F | BA | 00 | 00 | 73 | 01 | 4A | 81 | C3 | EE | 18 | 87 | F3 | CD | 3F | 9F |
| 00001EE0 | B9 | 00 | 00 | 73 | 01 | 49 | 0B | CA | 8B | F3 | BF | 7C | 25 | CD | 3F | 9F |
| 00001EF0 | BA | 00 | 00 | 73 | 01 | 4A | 0B | D1 | 23 | D2 | 74 | 03 | E9 | 0F | 00 | BB |
| 00001F00 | 62 | 14 | CD | 3F | BD | BB | 5C | 22 | CD | 3F | 67 | CD | 3E | 79 | A1 | AC |
| 00001F10 | 21 | 40 | A3 | AC | 21 | 83 | 3E | AC | 21 | 18 | 7F | 03 | E9 | D5 | FC | BB |
| 00001F20 | C8 | 23 | BA | 54 | 22 | CD | 3F | 61 | BF | 58 | 22 | BE | 64 | 22 | CD | 3F |
| 00001F30 | 7F | BF | 64 | 22 | CD | 3F | 7D | BE | 58 | 22 | CD | 3F | A7 | 72 | 03 | E9 |
| 00001F40 | 10 | 00 | 8B | F7 | BF | 0A | 25 | CD | 3F | 9F | 72 | 03 | E9 | 99 | FC | E9 |
| 00001F50 | 0E | 00 | BF | 0A | 25 | BE | 64 | 22 | CD | 3F | 9F | 77 | 03 | E9 | 88 | FC |
| 00001F60 | BB | 8C | 23 | B8 | 24 | 22 | CD | 3F | 62 | 75 | 03 | E9 | 17 | 00 | A1 | 28 |
| 00001F70 | 22 | 40 | A3 | 28 | 22 | 83 | 3E | 28 | 22 | 05 | 7F | 03 | E9 | 38 | F3 | C7 |
| 00001F80 | 06 | F0 | 21 | 21 | 00 | BB | 18 | 00 | CD | 3E | 42 | BB | 01 | 00 | CD | 3E |
| 00001F90 | 42 | 33 | DB | CD | 3E | 44 | A1 | F0 | 21 | A3 | 68 | 22 | CD | 3F | BC | BB |
| 00001FA0 | A8 | 25 | CD | 3F | 6A | CD | 3E | 79 | CD | 3D | 43 | BF | C2 | 21 | CD | 3F |
| 00001FB0 | 7D | BB | 92 | 23 | BA | B2 | 21 | CD | 3F | 61 | BB | 92 | 23 | BA | 2A | 22 |
| 00001FC0 | CD | 3F | 61 | BB | B2 | 21 | CD | 3F | BA | 0B | DB | 75 | 03 | E9 | 78 | 00 |
| 00001FD0 | BB | B2 | 21 | B8 | 2A | 22 | CD | 3F | 55 | 92 | CD | 3F | 61 | BB | 2A | 22 |
| 00001FE0 | CD | 3F | BA | 83 | FB | 02 | 7D | 03 | E9 | 5D | 00 | BB | 2A | 22 | BA | 02 |
| 00001FF0 | 00 | 8B | CB | CD | 3D | 0B | 8B | D1 | CD | 3F | 61 | BB | FA | 25 | B8 | 2A |
| 00002000 | 22 | CD | 3F | 62 | 75 | 03 | E9 | CE | E4 | BB | 2A | 22 | CD | 3D | 13 | CD |
| 00002010 | 3F | 78 | 93 | A3 | F0 | 21 | 83 | 3E | F0 | 21 | 01 | BB | 00 | 00 | 7D | 01 |
| 00002020 | 4B | 83 | 3E | F0 | 21 | 22 | BA | 00 | 00 | 7E | 01 | 4A | 0B | D3 | 23 | D2 |
| 00002030 | 74 | 03 | E9 | 73 | FF | 83 | 3E | F0 | 21 | 22 | 75 | 03 | E9 | 3E | 05 | BB |
| 00002040 | FF | FF | CD | 3E | 32 | E9 | 56 | F2 | BB | 92 | 23 | BA | B2 | 21 | CD | 3F |
| 00002050 | 61 | CD | 3D | 43 | BF | C2 | 21 | CD | 3F | 99 | CD | 3F | 2D | BF | 00 | 26 |
| 00002060 | CD | 3F | A1 | 76 | 03 | E9 | 0C | 00 | CD | 3D | 06 | BA | B2 | 21 | CD | 3F |
| 00002070 | 61 | E9 | 4F | FF | A1 | F0 | 21 | A3 | 6A | 22 | E8 | 92 | E8 | A1 | 6A | 22 |
| 00002080 | A3 | F0 | 21 | E9 | 18 | F2 | BB | FF | FF | CD | 3E | 32 | BB | 50 | 00 | BA |
| 00002090 | FF | FF | CD | 3E | 04 | CD | 3E | 01 | 90 | 90 | 90 | 90 | 90 | 90 | 90 | 90 |
| 000020A0 | 90 | 90 | 90 | 90 | 90 | 90 | 90 | 90 | 90 | 90 | 90 | 90 | 90 | 90 | 90 | 90 |
| 000020B0 | 90 | 90 | 90 | 90 | 90 | 90 | 90 | 90 | 90 | 90 | 90 | BB | 01 | 00 | CD | 3E |
| 000020C0 | 21 | BB | 22 | 23 | CD | 3E | 1F | BB | 01 | 00 | BA | FC | 24 | B9 | 80 | 00 |
| 000020D0 | CD | 3E | 1E | BB | 01 | 00 | CD | 3F | B3 | BB | 6C | 22 | BA | 04 | 00 | CD |
| 000020E0 | 3F | B4 | B8 | 01 | 00 | E9 | 55 | 00 | BB | 01 | 00 | 8B | 16 | AC | 21 | CD |
| 000020F0 | 3E | 26 | 8B | 3E | AC | 21 | D1 | E7 | D1 | E7 | 81 | C7 | 46 | 18 | BB | 6C |
| 00002100 | 22 | CD | 3D | 19 | CD | 3F | 7D | 8B | 1E | AC | 21 | 8B | D3 | D1 | E3 | D1 |
| 00002110 | E3 | 8B | CB | 81 | C3 | E6 | 17 | 87 | DA | CD | 3D | 10 | B8 | 0E | 25 | CD |
| 00002120 | 3F | 55 | 93 | BB | 04 | 26 | CD | 3F | 55 | 81 | C1 | 46 | 18 | 87 | D9 | CD |
| 00002130 | 3D | 11 | 91 | CD | 3F | 55 | CD | 3F | 61 | A1 | AC | 21 | 40 | A3 | AC | 21 |
| 00002140 | 83 | 3E | AC | 21 | 10 | 7E | A1 | BB | 01 | 00 | CD | 3E | 21 | BB | 0A | 26 |
| 00002150 | BA | FE | 17 | CD | 3F | 61 | BB | 92 | 23 | BA | 02 | 18 | CD | 3F | 61 | C7 |
| 00002160 | 06 | 06 | 22 | 01 | 00 | C7 | 06 | 0A | 22 | 14 | 00 | BB | FF | FF | CD | 3E |
| 00002170 | 32 | BB | 05 | 00 | CD | 3E | 42 | BB | 44 | 00 | CD | 3E | 42 | 33 | DB | CD |
| 00002180 | 3E | 44 | CD | 3F | BC | BB | 96 | 23 | CD | 3F | 6A | CD | 3E | 79 | BB | 17 |
| 00002190 | 00 | CD | 3E | 33 | 33 | DB | CD | 3E | 35 | CD | 3F | BC | BB | 10 | 00 | CD |
| 000021A0 | 3D | 05 | CD | 3F | 6A | CD | 3E | 79 | BB | 07 | 00 | CD | 3E | 33 | 33 | DB |
| 000021B0 | CD | 3E | 35 | BB | 07 | 00 | CD | 3E | 42 | BB | 44 | 00 | CD | 3E | 42 | 33 |
| 000021C0 | DB | CD | 3E | 44 | CD | 3F | BC | BB | 18 | 00 | CD | 3D | 05 | CD | 3F | 6A |
| 000021D0 | BB | A0 | 23 | CD | 3F | 6A | CD | 3E | 79 | BB | 08 | 00 | CD | 3E | 42 | BB |
| 000021E0 | 44 | 00 | CD | 3E | 42 | 33 | DB | CD | 3E | 44 | CD | 3F | BC | BB | 19 | 00 |
| 000021F0 | CD | 3D | 05 | CD | 3F | 6A | BB | AA | 23 | CD | 3F | 6A | CD | 3E | 79 | BB |
| 00002200 | 0C | 00 | CD | 3E | 42 | BB | 42 | 00 | CD | 3E | 42 | 33 | DB | CD | 3E | 44 |
| 00002210 | CD | 3F | BC | BB | 11 | 00 | CD | 3D | 05 | CD | 3F | 6A | BB | C4 | 00 | CD |
| 00002220 | 3D | 05 | CD | 3F | 6A | BB | D9 | 00 | CD | 3D | 05 | CD | 3F | 6A | BB | B6 |
| 00002230 | 23 | CD | 3F | 6A | CD | 3E | 79 | BB | 0E | 25 | BA | B2 | 21 | CD | 3F | 61 |
| 00002240 | C7 | 06 | 70 | 22 | 00 | 00 | 8B | 1E | 06 | 22 | CD | 3E | 42 | 8B | 1E | 0A |
| 00002250 | 22 | CD | 3E | 42 | 33 | DB | CD | 3E | 44 | BB | 0A | 00 | CD | 3E | 33 | 33 |
| 00002260 | DB | CD | 3E | 35 | CD | 3F | BC | BB | 16 | 26 | CD | 3F | 6A | BB | B2 | 21 |
| 00002270 | CD | 3F | 6E | CD | 3E | 79 | A1 | 06 | 22 | 40 | E9 | 51 | 00 | A1 | 70 | 22 |
| 00002280 | 40 | A3 | 70 | 22 | 8B | 1E | 72 | 22 | 2B | 1E | 06 | 22 | D1 | E3 | D1 | E3 |
| 00002290 | 81 | C3 | E6 | 17 | CD | 3F | BA | 0B | DB | 75 | 03 | E9 | 3A | 00 | 8B | 1E |
| 000022A0 | 72 | 22 | CD | 3E | 42 | 8B | 1E | 0A | 22 | CD | 3E | 42 | 33 | DB | CD | 3E |
| 000022B0 | 44 | CD | 3F | BC | 8B | 1E | 72 | 22 | 2B | 1E | 06 | 22 | D1 | E3 | D1 | E3 |
| 000022C0 | 81 | C3 | E6 | 17 | CD | 3F | 6E | CD | 3E | 79 | A1 | 72 | 22 | 40 | A3 | 72 |
| 000022D0 | 22 | 83 | 3E | 72 | 22 | 16 | 7E | A5 | A1 | 70 | 22 | 48 | A3 | 70 | 22 | 8B |
| 000022E0 | 1E | 06 | 22 | 43 | CD | 3E | 42 | 8B | 1E | 0A | 22 | CD | 3E | 42 | 33 | DB |

```
000022F0  CD 3E 44 33 DB CD 3E 33  BB 07 00 CD 3E 35 CD 3F
00002300  BC BB EA 17 CD 3F 6A CD  3E 79 BB 0A 00 CD 3E 33
00002310  33 DB CD 3E 35 8B 1E 70  22 43 43 CD 3E 42 8B 1E
00002320  0A 22 CD 3E 44 CD 3F BC  BB 26 26 CD 3F 6E CD 3E
00002330  79 A1 06 22 40 A3 72 22  CD 3D 06 BA 2A 22 CD 3F
00002340  61 BB 92 23 B8 2A 22 CD  3F 62 74 EC BB 2A 22 CD
00002350  3F BB 0B DB 74 E2 BB DA  22 B8 2A 22 CD 3F 62 BA
00002360  00 00 74 01 4A BB E0 22  CD 3F 62 B9 00 00 74 01
00002370  49 23 CA 23 C9 74 03 E9  22 01 BB DA 22 B8 2A 22
00002380  CD 3F 62 74 03 E9 8D 00  8B 1E 72 22 CD 3E 42 8B
00002390  1E 0A 22 CD 3E 42 33 DB  CD 3E 44 CD 3F BC 8B 1E
000023A0  72 22 2B 1E 06 22 D1 E3  D1 E3 81 C3 E6 17 CD 3F
000023B0  6A CD 3E 79 A1 72 22 48  A3 72 22 8B 1E 06 22 43
000023C0  3B 1E 72 22 7F 03 E9 07  00 A1 70 22 40 A3 72 22
000023D0  8B 1E 72 22 CD 3E 42 8B  1E 0A 22 CD 3E 42 33 DB
000023E0  CD 3E 44 33 DB CD 3E 33  BB 07 00 CD 3E 35 CD 3F
000023F0  BC 8B 1E 72 22 2B 1E 06  22 D1 E3 D1 E3 81 C3 E6
00002400  17 CD 3F 6A CD 3E 79 BB  0A 00 CD 3E 33 33 DB CD
00002410  3E 35 E9 23 FF 8B 1E 72  22 CD 3E 42 8B 1E 0A 22
00002420  CD 3E 42 33 DB CD 3E 44  CD 3F BC 8B 1E 72 22 2B
00002430  1E 06 22 D1 E3 D1 E3 81  C3 E6 17 CD 3F 6A CD 3E
00002440  79 A1 72 22 40 A3 72 22  8B 1E 70 22 43 3B 1E 72
00002450  22 7C 03 E9 07 00 A1 06  22 40 A3 72 22 E9 70 FF
00002460  A1 06 22 E9 29 00 8B 1E  70 22 CD 3E 42 8B 1E 0A
00002470  22 CD 3E 42 33 DB CD 3E  44 CD 3F BC BB 1E 00 BA
00002480  20 00 CD 3D 0E CD 3F 6A  CD 3E 79 A1 70 22 40 A3
00002490  70 22 83 3E 70 22 18 7E  CD E9 9C FE A1 72 22 2B
000024A0  06 06 22 A3 72 22 BB FF  FF CD 3E 32 83 3E 72 22
000024B0  06 75 03 E9 21 E0 CD 3F  BC 8B 1E 72 22 8B D3 CD
000024C0  3D 10 B8 0E 25 CD 3F 55  93 BB 48 26 CD 3F 55 CD
000024D0  3F 6A D1 E2 D1 E2 81 C2  46 18 8B DA CD 3F 6B CD
000024E0  3E 79 BB 5A 26 CD 3F B5  00 CD 3F B7 01 02 8B 1E
000024F0  72 22 D1 E3 D1 E3 81 C3  46 18 CD 3F B8 8B 36 72
00002500  22 D1 E6 D1 E6 81 C6 46  18 CD 3F A7 BB 00 00 73
00002510  01 4B BF 72 26 CD 3F 9F  BA 00 00 76 01 4A 0B D3
00002520  23 D2 75 82 BB 01 00 CD  3E 21 BB 22 23 CD 3E 1F
00002530  BB 01 00 BA FC 24 B9 80  00 CD 3E 1E BB 01 00 8B
00002540  16 72 22 CD 3E 26 BB 01  00 CD 3F B3 BB 6C 22 BA
00002550  04 00 CD 3F B4 8B 1E 72  22 D1 E3 D1 E3 81 C3 46
00002560  18 CD 3D 1C BA 6C 22 CD  3F 5B BB 01 00 8B 16 72
00002570  22 CD 3E 28 E9 6B FB 90  90 90 90 90 90 83 3E 68
00002580  22 21 75 03 E9 FE F9 BB  18 00 CD 3E 42 BB 01 00
00002590  CD 3E 42 33 DB CD 3E 44  CD 3F BC BB 4F 00 BA 20
000025A0  00 CD 3D 0E CD 3F 6A CD  3E 79 BB 18 00 CD 3E 42
000025B0  BB 01 00 CD 3E 42 33 DB  CD 3E 44 CD 3F BC BB 76
000025C0  26 CD 3F 6A CD 3E 79 BB  88 26 BA 84 00 CD 3E 2A
000025D0  BB B7 28 CD 3F 34 CD 3F  C0 8B 1E EC 21 CD 3D 10
000025E0  B8 0E 25 CD 3F 55 CD 3F  6A BB 1E 25 CD 3F 6A BB
000025F0  66 14 CD 3E 0A BB 8A 18  CD 3F 67 CD 3E 79 CD 3F
00002600  C0 BB 46 00 CD 3F 37 BB  92 23 CD 3F 6A CD 3D 24
00002610  CD 3F 6A BB 0A 00 8B D3  CD 3D 05 CD 3F 6A 8B DA
00002620  CD 3D 05 CD 3F 6A 8B DA  CD 3D 05 CD 3F 6E CD 3E
00002630  79 CD 3F C0 BB 92 26 CD  3F 6A CD 3E 79 B8 01 00
00002640  E9 29 00 BB 62 14 CD 3F  C1 8B 1E AC 21 D1 E3 D1
00002650  E3 81 C3 AE 19 CD 3F 67  CD 3E 79 CD 3F C0 BB E4
00002660  24 CD 3F 6A CD 3E 79 A1  AC 21 40 40 A3 AC 21 83
00002670  3E AC 21 18 7E CD CD 3F  C0 BB 8C 23 CD 3F 6E CD
00002680  3E 79 CD 3F C0 BB 9A 24  CD 3F 6A CD 3E 79 B8 02
00002690  00 E9 29 00 BB 62 14 CD  3F C1 8B 1E AC 21 D1 E3
000026A0  D1 E3 81 C3 AE 19 CD 3F  67 CD 3E 79 CD 3F C0 BB
000026B0  E4 24 CD 3F 6A CD 3E 79  A1 AC 21 40 40 A3 AC 21
000026C0  83 3E AC 21 18 7E CD CD  3F C0 BB 8C 23 CD 3F 6E
000026D0  CD 3E 79 CD 3F C0 BB 8C  23 CD 3F 6E CD 3E 79 CD
000026E0  3F C0 BB 1B 00 CD 3D 05  CD 3F 6A BB 9C 26 CD 3F
000026F0  6A BB 01 00 CD 3D 05 CD  3F 6E CD 3E 79 BF 74 22
00002700  BE 74 25 CD 3F 7B BE 78  25 CD 3F 6F E9 D2 02 BB
00002710  B2 21 CD 3F 10 CD 3F C0  BB B2 21 CD 3F 6A BB D7
00002720  00 CD 3D 05 CD 3F 6A CD  3E 79 A1 50 22 A3 52 22
00002730  B8 01 00 E9 78 02 BF 7C  25 BE 40 22 CD 3F 9F BB
00002740  00 00 73 01 4B 83 3E AC  21 18 BA 00 00 75 01 4A
00002750  23 D3 23 D2 74 03 E9 7F  02 A1 52 22 40 A3 52 22
00002760  83 3E 52 22 17 7F 03 E9  06 00 C7 06 52 22 00 00
00002770  BF 5C 22 BE 80 25 CD 3F  7B BF 60 22 BE 8A 18 CD
00002780  3F 7B 83 3E AC 21 18 75  03 E9 12 00 8B 36 52 22
```

```
00002790  D1 E6 D1 E6 81 C6 52 19  BF 60 22 CD 3F 7B 8B 36
000027A0  52 22 D1 E6 D1 E6 8B DE  81 C6 EE 18 BF 84 25 CD
000027B0  3F 9F BA 00 00 76 01 4A  8B CE BE 60 22 CD 3F A7
000027C0  B8 00 00 76 01 48 23 C2  23 C0 75 03 E9 1E 00 81
000027D0  C3 8E 18 87 F3 8B FB 87  F1 CD 3F 8F 8B F1 CD 3F
000027E0  8B BF 88 25 CD 3F 91 BF  5C 22 CD 3F 7D BF 90 25
000027F0  BE 64 22 CD 3F 9F BB 00  00 75 01 4B BF 94 25 BE
00002800  5C 22 CD 3F 7F BF 88 25  CD 3F A1 BA 00 00 73 01
00002810  4A 23 D3 23 D2 75 03 E9  24 00 CD 3F C0 BB C4 00
00002820  8B D3 CD 3D 05 CD 3F 6A  8B DA CD 3D 05 CD 3F 6A
00002830  8B DA CD 3D 05 CD 3F 6A  CD 3E 79 E9 6C 01 BF 78
00002840  25 BE 64 22 CD 3F 9F BB  00 00 75 01 4B BF 98 25
00002850  BE 5C 22 CD 3F 9F BA 00  00 76 01 4A 23 D3 23 D2
00002860  75 03 E9 1F 00 CD 3F C0  BB 8C 23 CD 3F 6A 8B D3
00002870  BB DB 00 CD 3D 05 CD 3F  6A 8B DA CD 3F 6A CD 3E
00002880  79 E9 26 01 BF 0A 25 BE  64 22 CD 3F 9F BB 00 00
00002890  75 01 4B BF 9C 25 BE 5C  22 CD 3F 9F BA 00 00 73
000028A0  01 4A 23 D3 23 D2 75 03  E9 25 00 CD 3F C0 BB CD
000028B0  00 8B D3 CD 3D 05 CD 3F  6A BB CB 00 CD 3D 05 CD
000028C0  3F 6A 8B DA CD 3D 05 CD  3F 6A CD 3E 79 E9 DA 00
000028D0  BF 9C 25 BE 64 22 CD 3F  8F BF 90 25 BE 5C 22 CD
000028E0  3F 71 80 CD 3F 7F CD 3F  A5 80 77 03 E9 0F 00 CD
000028F0  3F C0 BB A2 26 CD 3F 6A  CD 3E 79 E9 AC 00 BF 0A
00002900  25 BE 64 22 CD 3F 9F 74  03 E9 25 00 CD 3F C0 BB
00002910  CD 00 8B D3 CD 3D 05 CD  3F 6A BB DF 00 CD 3D 05
00002920  CD 3F 6A 8B DA CD 3D 05  CD 3F 6A CD 3E 79 E9 79
00002930  00 BF 9C 25 BE 64 22 CD  3F 8F BF A0 25 CD 3F 71
00002940  80 CD 3F 81 BF 5C 22 CD  3F A1 BB 00 00 76 01 4B
00002950  8B D7 BF A4 25 BE 78 22  CD 3F 7F 8B FA CD 3F A1
00002960  B9 00 00 73 01 49 0B CB  23 C9 75 03 E9 1F 00 CD
00002970  3F C0 BB 8C 23 CD 3F 6A  8B D3 BB DB 00 CD 3D 05
00002980  CD 3F 6A 8B DA CD 3F 6A  CD 3E 79 E9 1C 00 CD 3F
00002990  C0 BB 8C 23 CD 3F 6A 8B  D3 BB DC 00 CD 3D 05 CD
000029A0  3F 6A 8B DA CD 3F 6A CD  3E 79 A1 AC 21 40 A3 AC
000029B0  21 83 3E AC 21 18 7F 03  E9 7B FD BF 0A 25 BE 64
000029C0  22 CD 3F 9F 75 03 E9 47  00 CD 3F C0 BB 0D 00 CD
000029D0  3D 05 CD 3F 6A CD 3E 79  BF 74 22 BE 64 22 CD 3F
000029E0  7F BF 64 22 CD 3F 7D BE  74 22 CD 3F A7 72 03 E9
000029F0  10 00 8B F7 BF 0A 25 CD  3F 9F 72 03 E9 10 FD E9
00002A00  0E 00 BF 0A 25 BE 64 22  CD 3F 9F 77 03 E9 FF FC
00002A10  CD 3F C0 BB 1B 00 CD 3D  05 CD 3F 6A BB 9C 26 CD
00002A20  3F 6A 33 DB CD 3D 05 CD  3F 6E CD 3E 79 CD 3F C0
00002A30  BB 92 26 CD 3F 6A CD 3E  79 A1 50 22 40 A3 52 22
00002A40  B8 01 00 E9 2B 00 83 3E  52 22 18 74 03 E9 06 00
00002A50  C7 06 52 22 00 00 BB 46  14 CD 3F C1 8B 1E 52 22
00002A60  CD 3F 69 CD 3E 79 A1 52  22 40 A3 52 22 A1 AC 21
00002A70  40 A3 AC 21 83 3E AC 21  18 7E CB CD 3F C0 BB 8C
00002A80  23 CD 3F 6E CD 3E 79 CD  3F C0 BB 28 00 CD 3F 37
00002A90  BB 92 23 CD 3F 6A BB AA  26 CD 3F 6E CD 3E 79 CD
00002AA0  3F C0 BB 0C 00 CD 3D 05  CD 3F 6E CD 3E 79 A1 68
00002AB0  22 A3 F0 21 E9 CE F4 90  CD 3E 02 00 00 00 00 00
00002AC0  CD 3F FF CB CD 3F FE CB  CD 3F FD CB CD 3F FC CB
00002AD0  51 F3 A5 59 D1 E1 8E DA  8B 2E C6 13 8B C5 2B C2
00002AE0  3D 00 10 72 03 B8 00 10  8B D1 81 C2 00 03 72 0C
00002AF0  B1 04 D3 E0 0B C0 74 28  3B C2 73 24 BA 4A 00 0E
00002B00  1F B4 09 CD 21 53 33 C0  50 CB 0D 0A 50 72 6F 67
00002B10  72 61 6D 20 74 6F 6F 20  6C 61 72 67 65 0D 0A 24
00002B20  5E 5F 1E 17 8B E2 57 56  8B CA 92 83 06 C4 13 07
00002B30  FF 2E C4 13 B0 04 BF B0  05 A2 1F 00 C7 06 35 00
00002B40  89 00 C7 06 37 00 8C 02  CB CB 5F 5E 5B 56 57 FF
00002B50  36 00 00 FF 37 CB 00 00  00 00 00 00 00 00 00 00
00002B60  03 00 94 22 20 23 23 00  06 00 9C 22 23 23 2C 23
00002B70  23 23 06 00 A6 22 20 20  23 23 20 20 07 00 B0 22
00002B80  23 23 2C 23 23 23 20 00  02 00 BC 22 23 23 02 00
00002B90  C2 22 20 23 01 00 C8 22  23 00 04 00 CE 22 23 23
00002BA0  23 25 04 00 D6 22 23 23  2E 23 01 00 DE 22 38 00
00002BB0  01 00 E4 22 32 00 01 00  EA 22 35 00 01 00 F0 22
00002BC0  52 67 0C 00 F6 22 53 45  43 55 52 49 54 59 2E 44
00002BD0  41 54 00 00 00 00 00 00  00 7C 0D 00 0E 23 44 3A
00002BE0  50 52 4F 47 52 41 4D 2E  44 41 54 00 01 00 20 23
00002BF0  49 00 01 00 26 23 72 C6  0D 00 2C 23 64 3A 73 65
00002C00  63 63 6F 64 65 2E 64 64  74 00 01 00 3E 23 69 00
00002C10  1A 00 44 23 59 6F 75 72  20 53 65 63 75 72 69 74
00002C20  79 20 43 6F 64 65 20 50  6C 65 61 73 65 3A 0C 00
```

```
00002C30  62 23 73 65 63 75 72 69  74 79 2E 64 61 74 01 00
00002C40  72 23 4F 09 0D 00 78 23  44 3A 53 45 43 43 4F 44
00002C50  45 2E 44 44 54 00 02 00  8A 23 2D 31 01 00 90 23
00002C60  20 00 00 00 96 23 05 00  9A 23 4D 6F 76 65 20 00
00002C70  05 00 A4 23 20 3D 20 55  70 00 07 00 AE 23 20 3D
00002C80  20 44 6F 77 6E 00 09 00  BA 23 20 3D 20 53 65 6C
00002C90  65 63 74 00 00 00 70 87  01 00 CC 23 2A 00 05 00
00002CA0  D2 23 73 63 68 65 64 00  04 00 DC 23 70 61 72 74
00002CB0  03 00 E4 23 42 69 6E 00  03 00 EC 23 6B 69 74 00
00002CC0  06 00 F4 23 72 65 70 6F  72 74 05 00 FE 23 74 72
00002CD0  69 61 6C 00 39 00 08 24  53 54 41 4E 44 42 59 20
00002CE0  2D 20 43 48 45 43 4B 49  4E 47 20 49 4E 56 45 4E
00002CF0  54 4F 52 59 20 46 4F 52  20 50 4F 53 53 49 42 4C
00002D00  45 20 53 43 48 45 44 55  4C 45 20 55 50 44 41 54
00002D10  45 00 09 00 46 24 57 41  4C 4C 43 2E 44 41 54 00
00002D20  00 00 00 80 0D 00 58 24  44 3A 44 49 53 50 4C 41
00002D30  59 2E 44 41 54 87 00 00  28 85 0E 00 6E 24 64 3A
00002D40  66 69 6C 65 6F 70 65 6E  2E 64 61 74 0F 00 80 24
00002D50  2D 4E 45 45 44 20 53 54  4F 43 4B 20 46 4F 52 00
00002D60  05 00 94 24 20 20 20 20  20 00 09 00 9E 24 20 20
00002D70  20 20 20 20 20 20 20 00  06 00 AC 24 43 65 6C 6C
00002D80  20 23 08 00 B6 24 4B 69  74 20 4E 61 6D 65 22 00
00002D90  C2 24 23 20 74 6F 20 62  75 69 6C 64 20 20 20 23
00002DA0  20 42 65 66 6F 72 65 20  4E 65 78 74 20 44 69 73
00002DB0  70 6C 61 79 02 00 E8 24  20 20 05 00 EE 24 4B 69
00002DC0  74 20 23 00 00 00 00 00  00 00 70 86 09 00 00 25
00002DD0  70 68 6F 75 72 2E 64 61  74 2E 00 00 00 81 0B 00
00002DE0  12 25 53 75 70 65 72 63  65 6C 6C 20 23 7F 0C 00
00002DF0  22 25 20 20 4F 70 65 72  61 74 6F 72 73 3D 05 00
00002E00  32 25 31 34 30 25 20 A6  05 00 3C 25 31 32 30 25
00002E10  20 00 05 00 46 25 31 30  30 25 20 00 05 00 50 25
00002E20  20 38 30 25 20 00 05 00  5A 25 20 36 30 25 20 00
00002E30  05 00 64 25 20 34 30 25  20 00 05 00 6E 25 20 32
00002E40  30 25 20 BD 00 00 80 81  00 00 60 83 CD CC 4C 7E
00002E50  00 00 4C 00 CD CC 4C 7D  00 00 48 87 00 00 70 84
00002E60  00 00 20 83 00 00 20 84  00 00 11 88 00 00 20 85
00002E70  00 00 90 84 00 00 00 83  4E 00 AC 25 54 59 50 45
00002E80  20 27 30 30 27 20 3D 20  4D 41 49 4E 20 4D 45 4E
00002E90  55 20 4F 52 20 43 45 4C  4C 20 23 20 46 4F 52 20
00002EA0  44 49 46 46 45 52 45 4E  54 20 43 45 4C 4C 20 28
00002EB0  33 33 3D 53 55 4D 4D 41  52 59 20 33 34 3D 50 52
00002EC0  49 4E 54 20 47 52 41 50  48 29 02 00 FE 25 30 30
00002ED0  00 00 70 86 02 00 08 26  20 3D 08 00 0E 26 45 4E
00002EE0  44 20 45 44 49 54 0B 00  1A 26 53 65 6C 65 63 74
00002EF0  20 74 68 65 20 00 1D 00  2A 26 4D 6F 76 65 20 74
00002F00  6F 20 69 74 65 6D 20 61  6E 64 20 74 79 70 65 20
00002F10  27 45 4E 54 45 52 27 00  0E 00 4C 26 20 6F 66 20
00002F20  45 6D 70 6C 6F 79 65 65  73 3D 13 00 5E 26 4E 65
00002F30  77 20 23 20 6F 66 20 45  6D 70 6C 6F 79 65 65 73
00002F40  3D 00 00 00 46 87 0E 00  7A 26 50 52 49 4E 54 49
00002F50  4E 47 20 47 52 41 50 48  05 00 8C 26 4C 50 54 31
00002F60  3A E0 06 00 96 26 20 20  20 20 20 20 01 00 A0 26
00002F70  74 00 03 00 A6 26 20 20  20 00 07 00 AE 26 48 20
00002F80  4F 20 55 20 52 00 00 00  00 00 00 00 00 00 00 00
00002F90  98 1E 20 31 2C 31 30 2C  34 2C 31 2C 39 2C 34 2C
00002FA0  31 2C 36 2C 34 2C 31 2C  36 2C 34 2C 31 2C 34 2C
00002FB0  34 2C 31 2C 33 2C 33 2C  31 2C 33 2C 33 2C 31 2C
00002FC0  31 35 2C 35 2C 31 2C 31  32 2C 34 2C 31 2C 31 32
00002FD0  2C 34 2C 31 2C 36 2C 34  00 99 1E 20 31 2C 31 32
00002FE0  2C 34 2C 31 2C 36 2C 34  2C 31 2C 36 2C 33 2C 31
00002FF0  2C 32 30 2C 35 2C 31 2C  31 32 2C 34 2C 31 2C 31
00003000  32 2C 34 2C 31 2C 36 2C  34 2C 31 2C 36 2C 34 2C
00003010  31 2C 36 2C 34 2C 31 2C  36 2C 33 2C 31 2C 32 30
00003020  2C 35 00 9A 1E 20 31 2C  37 2C 34 2C 31 2C 34 2C
00003030  34 2C 31 2C 33 2C 34 2C  31 2C 33 2C 34 2C 31 2C
00003040  32 30 2C 34 2C 31 2C 37  2C 34 2C 31 2C 32 2C 34
00003050  2C 31 2C 32 2C 34 2C 31  2C 37 2C 34 2C 31 2C 32
00003060  30 2C 34 00 9B 1E 20 31  2C 35 2C 39 2C 32 2C 35
00003070  2C 37 2C 33 2C 35 2C 35  2C 34 2C 35 2C 33 2C 35
00003080  2C 35 2C 31 2C 2D 31 2C  2D 31 2C 2D 31 00 9C 1E
00003090  20 31 2C 35 2C 31 30 2C  32 2C 35 2C 38 2C 33 2C
000030A0  35 2C 36 2C 34 2C 35 2C  34 2C 35 2C 35 2C 32 2C
000030B0  2D 31 2C 2D 31 2C 2D 31  00 9D 1E 20 31 2C 31 2C
000030C0  37 2C 32 2C 31 2C 36 2C  35 2C 33 2C 37 2C 36 2C
```

```
000030D0   33 2C 36 2C 2D 31 2C 2D   31 2C 2D 31 00 9E 1E 20
000030E0   31 2C 31 2C 39 2C 32 2C   31 2C 38 2C 34 2C 33 2C
000030F0   39 2C 2D 31 2C 2D 31 2C   2D 31 00 9F 1E 20 31 2C
00003100   31 2C 31 30 2C 34 2C 33   2C 31 30 2C 2D 31 2C 2D
00003110   31 2C 2D 31 00 A0 1E 20   2D 31 2C 2D 31 2C 2D 31
00003120   00 A1 1E 20 2D 31 2C 2D   31 2C 2D 31 00 A2 1E 20
00003130   2D 31 2C 2D 31 2C 2D 31   00 A3 1E 20 31 2C 35 2C
00003140   31 30 2C 32 2C 35 2C 38   2C 33 2C 35 2C 36 2C 34
00003150   2C 35 2C 34 2C 35 2C 35   2C 32 2C 36 2C 35 2C 32
00003160   30 2C 37 2C 35 2C 31 38   2C 38 2C 35 2C 31 36 2C
00003170   39 2C 35 2C 31 34 2C 31   30 2C 35 2C 31 32 2C 2D
00003180   31 2C 2D 31 2C 2D 31 00   A4 1E 20 31 2C 35 2C 39
00003190   2C 32 2C 35 2C 37 2C 33   2C 35 2C 35 2C 34 2C 35
000031A0   2C 33 2C 35 2C 35 2C 31   2C 36 2C 35 2C 31 39 2C
000031B0   37 2C 35 2C 31 37 2C 38   2C 35 2C 31 35 2C 39 2C
000031C0   35 2C 31 33 2C 31 30 2C   35 2C 31 31 2C 2D 31 2C
000031D0   2D 31 2C 2D 31 00 A5 1E   20 31 2C 31 2C 31 35 2C
000031E0   32 2C 31 2C 31 34 2C 33   2C 32 2C 31 35 2C 34 2C
000031F0   32 2C 31 34 2C 35 2C 33   2C 31 35 2C 36 2C 33 2C
00003200   31 34 2C 2D 31 2C 2D 31   2C 2D 31 00 A6 1E 20 31
00003210   2C 31 2C 31 33 2C 32 2C   31 2C 31 32 2C 33 2C 32
00003220   2C 31 33 2C 34 2C 32 2C   31 32 2C 35 2C 33 2C 31
00003230   33 2C 36 2C 33 2C 31 32   2C 2D 31 2C 2D 31 2C 2D
00003240   31 00 A7 1E 20 31 2C 31   2C 31 31 2C 32 2C 32 2C
00003250   31 31 2C 33 2C 33 2C 31   31 2C 2D 31 2C 2D 31 2C
00003260   2D 31 00 A8 1E 20 2D 31   2C 2D 31 2C 2D 31 00 A9
00003270   1E 20 2D 31 2C 2D 31 2C   2D 31 00 AA 1E 20 31 2C
00003280   35 2C 39 2C 32 2C 35 2C   37 2C 33 2C 35 2C 35 2C
00003290   34 2C 35 2C 33 2C 35 2C   35 2C 31 2C 36 2C 35 2C
000032A0   31 39 2C 37 2C 35 2C 31   37 2C 38 2C 35 2C 31 35
000032B0   2C 39 2C 35 2C 31 33 2C   31 30 2C 35 2C 31 31 2C
000032C0   2D 31 2C 2D 31 2C 2D 31   00 AB 1E 20 31 2C 35 2C
000032D0   31 30 2C 32 2C 35 2C 38   2C 33 2C 35 2C 36 2C 34
000032E0   2C 35 2C 34 2C 35 2C 35   2C 32 2C 36 2C 35 2C 32
000032F0   30 2C 37 2C 35 2C 31 38   2C 38 2C 35 2C 31 36 2C
00003300   39 2C 35 2C 31 34 2C 31   30 2C 35 2C 31 32 2C 2D
00003310   31 2C 2D 31 2C 2D 31 00   AC 1E 20 32 2C 31 2C 36
00003320   2C 34 2C 32 2C 36 2C 36   2C 33 2C 36 2C 2D 31 2C
00003330   2D 31 2C 2D 31 00 AD 1E   20 31 2C 31 2C 38 2C 33
00003340   2C 33 2C 38 2C 2D 31 2C   2D 31 2C 2D 31 00 AE 1E
00003350   20 31 2C 31 2C 31 30 2C   32 2C 31 2C 39 2C 35 2C
00003360   33 2C 31 30 2C 36 2C 33   2C 39 2C 2D 31 2C 2D 31
00003370   2C 2D 31 00 AF 1E 20 2D   31 2C 2D 31 2C 2D 31 00
00003380   B0 1E 20 2D 31 2C 2D 31   2C 2D 31 00 B1 1E 20 31
00003390   2C 33 2C 39 2C 32 2C 33   2C 31 30 2C 33 2C 33 2C
000033A0   31 31 2C 34 2C 33 2C 31   32 2C 35 2C 33 2C 31 33
000033B0   2C 2D 31 2C 2D 31 2C 2D   31 00 B2 1E 20 31 2C 33
000033C0   2C 31 2C 32 2C 33 2C 32   2C 33 2C 33 2C 33 2C 2D
000033D0   31 2C 2D 31 2C 2D 31 00   B3 1E 20 31 2C 31 2C 31
000033E0   2C 32 2C 32 2C 31 2C 2D   31 2C 2D 31 2C 2D 31 00
000033F0   B4 1E 20 31 2C 32 2C 32   2C 2D 31 2C 2D 31 2C 2D
00003400   31 00 B5 1E 20 2D 31 2C   2D 31 2C 2D 31 00 B6 1E
00003410   20 31 2C 32 2C 38 2C 32   2C 32 2C 39 2C 33 2C 32
00003420   2C 31 30 2C 34 2C 32 2C   31 31 2C 35 2C 32 2C 31
00003430   32 2C 2D 31 2C 2D 31 2C   2D 31 00 B7 1E 20 31 2C
00003440   32 2C 32 2C 2D 31 2C 2D   31 2C 2D 31 00 B8 1E 20
00003450   31 2C 32 2C 31 2C 2D 31   2C 2D 31 2C 2D 31 00 B9
00003460   1E 20 31 2C 33 2C 31 2C   32 2C 33 2C 32 2C 2D 31
00003470   2C 2D 31 2C 2D 31 00 BA   1E 20 2D 31 2C 2D 31 2C
00003480   2D 31 00 77 23 20 53 63   68 65 64 75 6C 65 20 4B
00003490   69 74 20 66 6F 72 20 61   20 43 65 6C 6C 2C 55 70
000034A0   64 61 74 65 20 42 69 6E   20 49 6E 76 65 6E 74 6F
000034B0   72 79 2C 41 64 64 20 61   20 4E 65 77 20 50 61 72
000034C0   74 20 4D 61 73 74 65 72   2C 43 68 61 6E 67 65 20
000034D0   61 20 50 61 72 74 20 4D   61 73 74 65 72 00 78 23
000034E0   20 44 65 6C 65 74 65 20   61 20 50 61 72 74 20 4D
000034F0   61 73 74 65 72 2C 41 73   73 69 67 6E 2F 52 65 6D
00003500   6F 76 65 20 61 20 50 61   72 74 20 4E 75 6D 62 65
00003510   72 20 61 74 20 61 20 43   65 6C 6C 2F 42 69 6E 20
00003520   4C 6F 63 61 74 69 6F 6E   00 79 23 20 43 68 61 6E
00003530   67 65 20 51 75 61 6E 74   69 74 69 65 73 2F 57 6F
00003540   72 6B 20 53 74 61 74 69   6F 6E 20 69 6E 20 43 65
00003550   6C 6C 2F 42 69 6E 2C 41   64 64 20 61 20 4E 65 77
00003560   20 4B 69 74 00 7A 23 20   45 78 61 6D 69 6E 65 2F
```

```
00003570  43 68 61 6E 67 65 20 61  20 4B 69 74 2C 44 65 6C
00003580  65 74 65 20 61 20 4B 69  74 2C 50 72 69 6E 74 20
00003590  50 61 72 74 20 49 6E 76  65 6E 74 6F 72 79 20 52
000035A0  65 70 6F 72 74 2C 50 72  69 6E 74 20 50 61 72 74
000035B0  20 49 6E 76 65 6E 74 6F  72 79 20 4C 6F 77 20 53
000035C0  74 6F 63 6B 20 52 65 70  6F 72 74 00 7B 23 20 50
000035D0  72 69 6E 74 20 43 65 6C  6C 20 41 73 73 69 67 6E
000035E0  6D 65 6E 74 20 52 65 70  6F 72 74 2C 50 72 69 6E
000035F0  74 20 4B 69 74 20 52 65  70 6F 72 74 2C 44 69 73
00003600  70 6C 61 79 20 50 72 65  73 65 6E 74 20 43 65 6C
00003610  6C 20 4B 69 74 20 50 69  63 6B 69 6E 67 2C 43 61
00003620  6E 63 65 6C 20 50 72 65  73 65 6E 74 20 43 65 6C
00003630  6C 20 4B 69 74 20 50 69  63 6B 69 6E 67 00 7C 23
00003640  20 54 72 69 61 6C 20 53  63 68 65 64 75 6C 69 6E
00003650  67 2C 43 68 61 6E 67 65  20 23 20 6F 66 20 45 6D
00003660  70 6C 6F 79 65 65 73 2F  4C 69 6E 65 2C 43 68 61
00003670  6E 67 65 20 53 65 63 75  72 69 74 79 20 4C 65 76
00003680  65 6C 2C 45 58 49 54 20  54 4F 20 44 4F 53 2C 2D
00003690  31 00 B7 28 20 22 31 34  30 25 20 22 2C 22 31 32
000036A0  30 25 20 22 2C 22 31 30  30 25 20 22 2C 22 20 38
000036B0  30 25 20 22 2C 22 20 36  30 25 20 22 2C 22 20 34
000036C0  30 25 20 22 2C 22 20 32  30 25 20 22 00 FF FF 01
000036D0  59 1F A0 01 00 1E 51 06  3C 6D 74 03 E9 40 02 B4
000036E0  30 CD 21 3C 02 73 03 E9  3A 02 BA 83 03 8E DA 26
000036F0  8B 3E 02 00 26 8B 2E 2C  00 8E C2 57 B0 00 BA 45
00003700  03 1E 0E 1F B4 3D CD 21  1F 72 03 E9 D8 00 8E C5
00003710  33 FF B9 05 00 BE 52 03  1E 0E 1F F3 A6 1F 74 13
00003720  26 8A 05 47 0A C0 75 F8  26 80 3D 00 75 E4 1E 07
00003730  EB 57 90 1E 07 1E 8E DD  8B F7 81 3C 00 20 1F 74
00003740  48 BF CA 13 8B D7 1E 8E  DD AC 3C 3B 74 07 3C 00
00003750  74 03 AA EB F4 1F 8B D8  81 FF CA 13 74 0F 80 7D
00003760  FF 3A 74 09 80 7D FF 5C  74 03 B0 5C AA 56 BE 45
00003770  03 B9 0D 00 90 1E 0E 1F  F3 A4 1F 5E B0 00 B4 3D
00003780  CD 21 73 62 80 FB 3B 74  B8 1E 0E 1F BA 07 03 B4
00003790  09 CD 21 1F C6 06 CA 13  40 BA CA 13 B4 0A CD 21
000037A0  1E 0E 1F BA 04 03 B4 09  CD 21 1F B7 00 8A 1E CB
000037B0  13 80 BF CB 13 3A 74 0D  80 BF CB 13 5C 74 06 C6
000037C0  87 CC 13 5C 43 BA CC 13  8D BF CC 13 BE 45 03 B9
000037D0  0D 00 90 1E 0E 1F F3 A4  1F B0 00 B4 3D CD 21 73
000037E0  05 EB A6 E9 2F 01 5F 8B  D8 BA B0 13 B9 1A 00 B4
000037F0  3F CD 21 72 EE 81 3E B0  13 4D 5A 75 E6 8B 16 B8
00003800  13 83 C2 1F 81 E2 E0 FF  8B EA B1 04 D3 E2 33 C9
00003810  B0 00 B4 42 CD 21 72 CB  8B 16 B4 13 4A B1 05 D3
00003820  E2 2B D5 A1 B2 13 05 0F  00 B1 04 D3 E8 03 D0 89
00003830  16 B4 13 2B FA 83 EF 14  8C D6 8B D4 83 C2 11 B1
00003840  04 D3 EA 03 F2 3B FE 73  03 E9 CE 00 8B EF 1E 8E
00003850  DF B9 FF FF 33 D2 B4 3F  CD 21 1F 72 86 8B 16 C8
00003860  13 41 B0 00 B4 42 CD 21  72 12 3B 0E B6 13 74 23
00003870  BA B0 13 B9 04 00 B4 3F  CD 21 73 03 E9 96 00 8B
00003880  3E B0 13 A1 B2 13 03 C5  8E C0 26 01 2D FF 0E B6
00003890  13 75 E3 B4 3E CD 21 73  03 EB 7A 90 01 2E C6 13
000038A0  A1 C6 13 8B 1E C4 13 8E  C0 26 80 7F 03 05 75 5F
000038B0  26 80 7F 04 06 75 58 26  80 7F 05 00 72 51 5B 1E
000038C0  07 8E DD B9 D8 09 33 F6  8B FE FC F3 A5 06 1F 1E
000038D0  B8 96 02 8E D8 B9 4D 03  2B C8 D1 E1 D1 E1 D1 E1
000038E0  B8 AC 05 8E C0 33 F6 33  FF F3 A5 1F 8C D1 8C D8
000038F0  2B C8 81 F9 00 10 76 03  B9 00 10 D1 E1 D1 E1 D1
00003900  E1 BA 96 02 8E C2 33 F6  8B FE EA 10 00 8C 02 5B
00003910  BA BC 02 EB 12 BA E0 02  EB 0D BA A6 02 EB 08 BA
00003920  86 02 EB 03 BA 61 02 0E  1F B4 09 CD 21 33 C0 50
00003930  CB 0D 0A 4D 75 73 74 20  72 75 6E 20 75 6E 64 65
00003940  72 20 44 4F 53 20 32 2E  30 30 20 6F 72 20 6C 61
00003950  74 65 72 0D 0A 24 0D 0A  4D 75 73 74 20 6C 69 6E
00003960  6B 20 77 69 74 68 20 42  41 53 43 4F 4D 32 30 2E
00003970  4C 49 42 0D 0A 24 0D 0A  50 72 6F 67 72 61 6D 20
00003980  74 6F 6F 20 6C 61 72 67  65 0D 0A 24 0D 0A 57 72
00003990  6F 6E 67 20 76 65 72 73  69 6F 6E 20 6F 66 20 72
000039A0  75 6E 74 69 6D 65 20 6D  6F 64 75 6C 65 0D 0A 24
000039B0  0D 0A 45 72 72 6F 72 20  69 6E 20 45 58 45 20 66
000039C0  69 6C 65 0D 0A 24 0D 0A  43 61 6E 6E 6F 74 20 66
000039D0  69 6E 64 20 0D 0A 24 0D  0A 43 61 6E 6E 6F 74 20
000039E0  66 69 6E 64 20 42 41 53  52 55 4E 32 30 2E 45 58
000039F0  45 0D 0A 45 6E 74 65 72  20 6E 65 77 20 70 61 74
00003A00  68 20 73 70 65 63 69 66  69 63 61 74 69 6F 6E 3A
00003A10  20 24 0D 0A 24 42 41 53  52 55 4E 32 30 2E 45 58
00003A20  45 00 50 41 54 48 3D
```

```
00000000  4D 5A D7 00 0B 00 0C 00  20 00 AD 01 FF FF BA 02
00000010  00 02 3A A5 30 00 00 00  1E 00 00 00 01 00 12 00
00000020  00 00 14 00 00 00 16 00  00 00 33 00 00 00 38 00
00000030  00 00 86 00 AF 00 1B 00  F8 00 01 02 F8 00 06 02
00000040  F8 00 11 02 F8 00 32 02  F8 00 3D 02 F8 00 00 00
00000050  00 00 00 00 00 00 00 00  00 00 00 00 00 00 00 00
00000060  00 00 00 00 00 00 00 00  00 00 00 00 00 00 00 00
00000070  00 00 00 00 00 00 00 00  00 00 00 00 00 00 00 00
00000080  00 00 00 00 00 00 00 00  00 00 00 00 00 00 00 00
00000090  00 00 00 00 00 00 00 00  00 00 00 00 00 00 00 00
000000A0  00 00 00 00 00 00 00 00  00 00 00 00 00 00 00 00
000000B0  00 00 00 00 00 00 00 00  00 00 00 00 00 00 00 00
000000C0  00 00 00 00 00 00 00 00  00 00 00 00 00 00 00 00
000000D0  00 00 00 00 00 00 00 00  00 00 00 00 00 00 00 00
000000E0  00 00 00 00 00 00 00 00  00 00 00 00 00 00 00 00
000000F0  00 00 00 00 00 00 00 00  00 00 00 00 00 00 00 00
00000100  00 00 00 00 00 00 00 00  00 00 00 00 00 00 00 00
00000110  00 00 00 00 00 00 00 00  00 00 00 00 00 00 00 00
00000120  00 00 00 00 00 00 00 00  00 00 00 00 00 00 00 00
00000130  00 00 00 00 00 00 00 00  00 00 00 00 00 00 00 00
00000140  00 00 00 00 00 00 00 00  00 00 00 00 00 00 00 00
00000150  00 00 00 00 00 00 00 00  00 00 00 00 00 00 00 00
00000160  00 00 00 00 00 00 00 00  00 00 00 00 00 00 00 00
00000170  00 00 00 00 00 00 00 00  00 00 00 00 00 00 00 00
00000180  00 00 00 00 00 00 00 00  00 00 00 00 00 00 00 00
00000190  00 00 00 00 00 00 00 00  00 00 00 00 00 00 00 00
000001A0  00 00 00 00 00 00 00 00  00 00 00 00 00 00 00 00
000001B0  00 00 00 00 00 00 00 00  00 00 00 00 00 00 00 00
000001C0  00 00 00 00 00 00 00 00  00 00 00 00 00 00 00 00
000001D0  00 00 00 00 00 00 00 00  00 00 00 00 00 00 00 00
000001E0  00 00 00 00 00 00 00 00  00 00 00 00 00 00 00 00
000001F0  00 00 00 00 00 00 00 00  00 00 00 00 00 00 00 00
00000200  62 6D 53 45 43 55 52 49  54 59 38 09 92 16 40 14
00000210  CC 14 B9 00 F8 00 2E 01  40 14 00 00 40 14 40 14
00000220  D0 14 06 00 00 00 00 00  00 00 00 00 FF FF 81 00
00000230  9A 00 00 F8 00 9A 77 00  AF 00 CD 3E 82 CD 3F 59
00000240  CD 3F 59 BB FF FF CD 3E  32 33 DB CD 3E 3C CD 3F
00000250  59 CD 3F 59 CD 3F 59 CD  3F 59 BB 29 09 CD 3F 34
00000260  CD 3F 59 C7 06 A6 14 00  00 CD 3F 59 B8 01 00 E9
00000270  47 00 CD 3F 59 BB A8 14  CD 3F 10 CD 3F 59 BB D0
00000280  14 B8 A8 14 CD 3F 62 75  03 E9 37 00 CD 3F 59 A1
00000290  AC 14 48 CE 50 CD 3F 01  04 02 18 00 05 46 14 92
000002A0  BB A8 14 CD 3F 61 CD 3F  59 A1 A6 14 40 CE A3 A6
000002B0  14 CD 3F 59 A1 AC 14 40  CE A3 AC 14 83 3E AC 14
000002C0  18 7E AF CD 3F 59 BB 01  00 CD 3E 21 CD 3F 59 BB
000002D0  D6 14 CD 3E 1F BB 01 00  BA DC 14 B9 20 00 CD 3E
000002E0  1E CD 3F 59 BB 01 00 CD  3F B3 BB AE 14 BA 04 00
000002F0  CD 3F B4 BB B2 14 BA 18  00 CD 3F B4 CD 3F 59 BB
00000300  01 00 CD 3D 31 BF EC 14  CD 3F 92 CD 3F AA 76 03
00000310  E9 2A 00 CD 3F 59 BB F4  14 BA AE 14 CD 3F 5B CD
00000320  3F 59 BB 18 00 BA 20 00  CD 3D 0E BA B2 14 CD 3F
00000330  5B CD 3F 59 BB 01 00 BA  01 00 CD 3E 28 CD 3F 59
00000340  BB FF FF CD 3E 32 CD 3F  59 BB 01 00 CD 3E 42 CD
00000350  3E 42 33 DB CD 3E 44 CD  3F 59 CD 3F BC BB FC 14
00000360  CD 3F 6A CD 3E 79 CD 3F  59 33 DB CD 3E 33 BB 07
00000370  00 CD 3E 35 CD 3F 59 CD  3F BC BB 24 15 CD 3F 6A
00000380  CD 3E 79 CD 3F 59 BB 01  00 CD 3E 42 BB 23 00 CD
00000390  3E 42 33 DB CD 3E 44 CD  3F 59 BB 07 00 CD 3E 33
000003A0  33 DB CD 3E 35 CD 3F 59  BB 2C 15 CD 3F B5 00 CD
000003B0  3F B7 01 04 BB A8 14 CD  3F B8 CD 3F 59 BB A8 14
000003C0  8B D3 CD 3F BA 83 FB 01  B9 00 00 7D 01 49 8B DA
000003D0  CD 3F BA 83 FB 04 BA 00  00 7E 01 4A 0B D1 23 D2
000003E0  74 03 E9 58 FF CD 3F 59  BB 24 15 B8 A8 14 CD 3F
000003F0  55 92 CD 3F 61 CD 3F 59  BB A8 14 BA 04 00 8B CB
00000400  CD 3D 0B 8B D1 CD 3F 61  CD 3F 59 BB F4 14 B8 A8
00000410  14 CD 3F 62 75 03 E9 24  FF CD 3F 59 BB 01 00 CD
00000420  3D 31 BF EC 14 CD 3F 92  8B D3 CD 3F 78 93 A3 B6
00000430  14 92 E9 2F 00 CD 3F 59  BB 01 00 8B 16 AC 14 CD
00000440  3E 26 BB B2 14 BA B8 14  CD 3F 61 CD 3F 59 BB AE
00000450  14 B8 A8 14 CD 3F 62 75  03 E9 A1 00 CD 3F 59 A1
00000460  AC 14 40 CE A3 AC 14 A1  B6 14 3B 06 AC 14 7D C5
00000470  CD 3F 59 BB FF FF CD 3E  32 CD 3F 59 CD 3F BC BB
00000480  30 15 CD 3F 6A CD 3E 79  CD 3F 59 BB 2C 15 CD 3F
00000490  B5 02 CD 3F B7 01 04 BB  BC 14 CD 3F B8 CD 3F 59
```

| | | | | | | | | | | | | | | | | |
|---|---|---|---|---|---|---|---|---|---|---|---|---|---|---|---|---|
| 000004A0 | BB | 18 | 00 | BA | 20 | 00 | CD | 3D | 0E | BA | B8 | 14 | CD | 3F | 61 | CD |
| 000004B0 | 3F | 59 | BB | 74 | 15 | B8 | BC | 14 | CD | 3F | 62 | BA | 00 | 00 | 75 | 01 |
| 000004C0 | 4A | BB | 7A | 15 | CD | 3F | 62 | B9 | 00 | 00 | 75 | 01 | 49 | 0B | CA | 23 |
| 000004D0 | C9 | 74 | 03 | E9 | CA | 05 | BB | 80 | 15 | B8 | BC | 14 | CD | 3F | 62 | BA |
| 000004E0 | 00 | 00 | 75 | 01 | 4A | BB | 86 | 15 | CD | 3F | 62 | B9 | 00 | 00 | 75 | 01 |
| 000004F0 | 49 | 0B | CA | 23 | C9 | 74 | 03 | E9 | 03 | 00 | E9 | 73 | FF | CD | 3F | 59 |
| 00000500 | BB | FF | FF | CD | 3E | 32 | CD | 3F | 59 | A1 | A6 | 14 | A3 | C0 | 14 | B8 |
| 00000510 | 01 | 00 | E9 | 83 | 00 | CD | 3F | 59 | CD | 3F | BC | A1 | C2 | 14 | 48 | CE |
| 00000520 | 50 | CD | 3F | 01 | 04 | 02 | 18 | 00 | 05 | 46 | 14 | 93 | CD | 3F | 6A | BB |
| 00000530 | 3C | 00 | CD | 3F | 37 | BB | 2C | 15 | CD | 3F | 6A | CD | 3E | 79 | CD | 3F |
| 00000540 | 59 | A1 | A6 | 14 | 3B | 06 | C2 | 14 | 74 | 03 | E9 | 0F | 00 | CD | 3F | BC |
| 00000550 | BB | 8C | 15 | CD | 3F | 6E | CD | 3E | 79 | E9 | 34 | 00 | BB | B8 | 14 | 8B |
| 00000560 | 16 | C2 | 14 | B9 | 01 | 00 | CD | 3D | 0A | 93 | BB | 8C | 15 | CD | 3F | 62 |
| 00000570 | 74 | 03 | E9 | 0F | 00 | CD | 3F | BC | BB | 92 | 15 | CD | 3F | 6E | CD | 3E |
| 00000580 | 79 | E9 | 0C | 00 | CD | 3F | BC | BB | 9A | 15 | CD | 3F | 6E | CD | 3E | 79 |
| 00000590 | CD | 3F | 59 | A1 | C2 | 14 | 40 | CE | A3 | C2 | 14 | A1 | C0 | 14 | 3B | 06 |
| 000005A0 | C2 | 14 | 7C | 03 | E9 | 6E | FF | CD | 3F | 59 | BB | 17 | 00 | CD | 3E | 42 |
| 000005B0 | BB | 01 | 00 | CD | 3E | 42 | 33 | DB | CD | 3E | 44 | CD | 3F | BC | BB | A0 |
| 000005C0 | 15 | CD | 3F | 6A | BB | A8 | 14 | CD | 3F | 6A | CD | 3E | 79 | CD | 3F | 59 |
| 000005D0 | C7 | 06 | C2 | 14 | 01 | 00 | CD | 3F | 59 | 8B | 1E | C2 | 14 | CD | 3E | 42 |
| 000005E0 | BB | 01 | 00 | CD | 3E | 42 | 33 | DB | CD | 3E | 44 | CD | 3F | 59 | 33 | DB |
| 000005F0 | CD | 3E | 33 | BB | 07 | 00 | CD | 3E | 35 | CD | 3F | 59 | CD | 3F | BC | A1 |
| 00000600 | C2 | 14 | 48 | CE | 50 | CD | 3F | 01 | 04 | 02 | 18 | 00 | 05 | 46 | 14 | 93 |
| 00000610 | CD | 3F | 6A | BB | 3C | 00 | CD | 3F | 37 | BB | 2C | 15 | CD | 3F | 6A | CD |
| 00000620 | 3E | 79 | CD | 3F | 59 | A1 | A6 | 14 | 3B | 06 | C2 | 14 | 74 | 03 | E9 | 0F |
| 00000630 | 00 | CD | 3F | BC | BB | 8C | 15 | CD | 3F | 6E | CD | 3E | 79 | E9 | 34 | 00 |
| 00000640 | BB | B8 | 14 | 8B | 16 | C2 | 14 | B9 | 01 | 00 | CD | 3D | 0A | 93 | BB | 8C |
| 00000650 | 15 | CD | 3F | 62 | 74 | 03 | E9 | 0F | 00 | CD | 3F | BC | BB | 92 | 15 | CD |
| 00000660 | 3F | 6E | CD | 3E | 79 | E9 | 0C | 00 | CD | 3F | BC | BB | B4 | 15 | CD | 3F |
| 00000670 | 6E | CD | 3E | 79 | CD | 3F | 59 | BB | 07 | 00 | CD | 3E | 33 | 33 | DB | CD |
| 00000680 | 3E | 35 | CD | 3F | 59 | CD | 3D | 06 | BA | BC | 14 | CD | 3F | 61 | CD | 3F |
| 00000690 | 59 | BB | BC | 14 | CD | 3F | BA | 0B | DB | 74 | E7 | CD | 3F | 59 | 8B | 1E |
| 000006A0 | C2 | 14 | CD | 3E | 42 | BB | 01 | 00 | CD | 3E | 42 | 33 | DB | CD | 3E | 44 |
| 000006B0 | CD | 3F | 59 | CD | 3F | BC | A1 | C2 | 14 | 48 | CE | 50 | CD | 3F | 01 | 04 |
| 000006C0 | 02 | 18 | 00 | 05 | 46 | 14 | 93 | CD | 3F | 6A | BB | 3C | 00 | CD | 3F | 37 |
| 000006D0 | BB | 2C | 15 | CD | 3F | 6A | CD | 3E | 79 | CD | 3F | 59 | A1 | A6 | 14 | 3B |
| 000006E0 | 06 | C2 | 14 | 74 | 03 | E9 | 0F | 00 | CD | 3F | BC | BB | 8C | 15 | CD | 3F |
| 000006F0 | 6E | CD | 3E | 79 | E9 | 34 | 00 | BB | B8 | 14 | 8B | 16 | C2 | 14 | B9 | 01 |
| 00000700 | 00 | CD | 3D | 0A | 93 | BB | 8C | 15 | CD | 3F | 62 | 74 | 03 | E9 | 0F | 00 |
| 00000710 | CD | 3F | BC | BB | 92 | 15 | CD | 3F | 6E | CD | 3E | 79 | E9 | 0C | 00 | CD |
| 00000720 | 3F | BC | BB | B4 | 15 | CD | 3F | 6E | CD | 3E | 79 | CD | 3F | 59 | BB | BC |
| 00000730 | 15 | B8 | BC | 14 | CD | 3F | 62 | 75 | 03 | E9 | 1F | 00 | BB | C2 | 15 | B8 |
| 00000740 | BC | 14 | CD | 3F | 62 | 75 | 03 | E9 | 37 | 00 | BB | BC | 14 | CD | 3F | BB |
| 00000750 | 83 | FB | 0D | 75 | 03 | E9 | 4D | 00 | E9 | 7B | FE | CD | 3F | 59 | A1 | C2 |
| 00000760 | 14 | 40 | CE | A3 | C2 | 14 | CD | 3F | 59 | A1 | A6 | 14 | 3B | 06 | C2 | 14 |
| 00000770 | 7C | 03 | E9 | 06 | 00 | C7 | 06 | C2 | 14 | 01 | 00 | CD | 3F | 59 | E9 | 55 |
| 00000780 | FE | CD | 3F | 59 | A1 | C2 | 14 | 48 | CE | A3 | C2 | 14 | CD | 3F | 59 | 83 |
| 00000790 | 3E | C2 | 14 | 01 | 7C | 03 | E9 | 06 | 00 | A1 | A6 | 14 | A3 | C2 | 14 | CD |
| 000007A0 | 3F | 59 | E9 | 31 | FE | CD | 3F | 59 | A1 | A6 | 14 | 3B | 06 | C2 | 14 | 75 |
| 000007B0 | 03 | E9 | 46 | 00 | CD | 3F | 59 | BB | B8 | 14 | 8B | 16 | C2 | 14 | B9 | 01 |
| 000007C0 | 00 | 8B | C3 | CD | 3D | 0A | 93 | 89 | 5E | FA | BB | 8C | 15 | CD | 3F | 62 |
| 000007D0 | 74 | 03 | E9 | 0F | 00 | 87 | CA | 92 | BB | C8 | 15 | 8B | 56 | FA | CD | 3F |
| 000007E0 | 5C | E9 | 10 | 00 | BB | 8C | 15 | BA | B8 | 14 | 8B | 0E | C2 | 14 | B8 | 01 |
| 000007F0 | 00 | CD | 3F | 5C | CD | 3F | 59 | E9 | DC | FD | CD | 3F | 59 | BB | 18 | 00 |
| 00000800 | CD | 3E | 42 | 8B | D3 | BB | 01 | 00 | CD | 3E | 42 | 8B | CB | 33 | DB | CD |
| 00000810 | 3E | 44 | CD | 3F | BC | 8B | C3 | BB | 46 | 00 | 89 | 56 | FA | BA | 20 | 00 |
| 00000820 | CD | 3D | 0E | CD | 3F | 6A | CD | 3E | 79 | 8B | 5E | FA | CD | 3E | 42 | 8B |
| 00000830 | D9 | CD | 3E | 42 | 93 | CD | 3E | 44 | CD | 3F | 59 | CD | 3F | BC | BB | CE |
| 00000840 | 15 | CD | 3F | 6A | CD | 3E | 79 | CD | 3F | 59 | BB | 2C | 15 | CD | 3F | B5 |
| 00000850 | 03 | CD | 3F | B7 | 01 | 04 | BB | BC | 14 | CD | 3F | B8 | CD | 3F | 59 | BB |
| 00000860 | 80 | 15 | B8 | BC | 14 | CD | 3F | 62 | BA | 00 | 00 | 75 | 01 | 4A | BB | 86 |
| 00000870 | 15 | CD | 3F | 62 | B9 | 00 | 00 | 75 | 01 | 49 | 0B | CA | 23 | C9 | 74 | 03 |
| 00000880 | E9 | F8 | 01 | BB | 74 | 15 | B8 | BC | 14 | CD | 3F | 62 | BA | 00 | 00 | 75 |
| 00000890 | 01 | 4A | BB | 7A | 15 | CD | 3F | 62 | B9 | 00 | 00 | 75 | 01 | 49 | 0B | CA |
| 000008A0 | 23 | C9 | 74 | 03 | E9 | 03 | 00 | E9 | 50 | FF | CD | 3F | 59 | BB | 18 | 00 |
| 000008B0 | CD | 3E | 42 | 8B | D3 | BB | 01 | 00 | CD | 3E | 42 | 8B | CB | 33 | DB | CD |
| 000008C0 | 3E | 44 | CD | 3F | BC | 8B | C3 | BB | 46 | 00 | 89 | 56 | FA | BA | 20 | 00 |
| 000008D0 | CD | 3D | 0E | CD | 3F | 6A | CD | 3E | 79 | 8B | 5E | FA | CD | 3E | 42 | 8B |
| 000008E0 | D9 | CD | 3E | 42 | 93 | CD | 3E | 44 | CD | 3F | 59 | CD | 3F | BC | BB | FE |
| 000008F0 | 15 | CD | 3F | 6A | CD | 3E | 79 | CD | 3F | 59 | BB | 2C | 15 | CD | 3F | B5 |
| 00000900 | 03 | CD | 3F | B7 | 01 | 04 | BB | BC | 14 | CD | 3F | B8 | CD | 3F | 59 | BB |
| 00000910 | 80 | 15 | B8 | BC | 14 | CD | 3F | 62 | BA | 00 | 00 | 75 | 01 | 4A | BB | 86 |
| 00000920 | 15 | CD | 3F | 62 | B9 | 00 | 00 | 75 | 01 | 49 | 0B | CA | 23 | C9 | 74 | 03 |
| 00000930 | E9 | 27 | 00 | BB | 74 | 15 | B8 | BC | 14 | CD | 3F | 62 | BA | 00 | 00 | 75 |

```
00000940  01 4A BB 7A 15 CD 3F 62  B9 00 00 75 01 49 0B CA
00000950  23 C9 74 03 E9 49 01 E9  50 FF CD 3F 59 BB FF FF
00000960  CD 3E 32 CD 3F 59 BB 02  00 CD 3E 21 CD 3F 59 BB
00000970  30 16 CD 3E 1F BB 02 00  BA 36 16 B9 20 00 CD 3E
00000980  1E CD 3F 59 BB 02 00 CD  3F B3 BB C4 14 BA 20 00
00000990  CD 3F B4 CD 3F 59 BB 01  00 CD 3F B3 BB AE 14 BA
000009A0  20 00 CD 3F B4 CD 3F 59  C7 06 C8 14 00 00 CD 3F
000009B0  59 BB 01 00 CD 3D 31 BF  EC 14 CD 3F 92 8B D3 CD
000009C0  3F 78 93 A3 CA 14 92 E9  54 00 CD 3F 59 A1 AC 14
000009D0  3B 06 C2 14 75 03 E9 3D  00 CD 3F 59 BB 01 00 8B
000009E0  16 C2 14 CD 3E 26 CD 3F  59 A1 C8 14 40 CE A3 C8
000009F0  14 CD 3F 59 BB AE 14 BA  B8 14 CD 3F 61 CD 3F 59
00000A00  BB AE 14 BA C4 14 CD 3F  5B CD 3F 59 BB 02 00 8B
00000A10  16 C8 14 CD 3E 28 CD 3F  59 A1 C2 14 40 CE A3 C2
00000A20  14 A1 CA 14 3B 06 C2 14  7D A0 CD 3F 59 CD 3E 22
00000A30  CD 3F 59 BB DC 14 CD 3E  24 CD 3F 59 BB 36 16 BA
00000A40  DC 14 CD 3E 23 CD 3F 59  BB D6 14 CD 3E 1F BB 01
00000A50  00 BA DC 14 B9 20 00 CD  3E 1E CD 3F 59 BB 01 00
00000A60  CD 3F B3 BB AE 14 BA 04  00 CD 3F B4 BB B2 14 BA
00000A70  18 00 CD 3F B4 CD 3F 59  E9 25 00 CD 3F 59 BB A8
00000A80  14 BA AE 14 CD 3F 5B CD  3F 59 BB B8 14 BA B2 14
00000A90  CD 3F 5B CD 3F 59 BB 01  00 8B 16 AC 14 CD 3E 28
00000AA0  CD 3F 59 BB FF FF CD 3E  32 CD 3F 59 CD 3F BC BB
00000AB0  44 16 CD 3F 6A CD 3E 79  CD 3F 59 BB 2C 15 CD 3F
00000AC0  B5 03 CD 3F B7 01 04 BB  BC 14 CD 3F B8 CD 3F 59
00000AD0  BB 80 15 B8 BC 14 CD 3F  62 BA 00 00 75 01 4A BB
00000AE0  86 15 CD 3F 62 B9 00 00  75 01 49 0B CA 23 C9 74
00000AF0  03 E9 49 F8 BB 74 15 B8  BC 14 CD 3F 62 BA 00 00
00000B00  75 01 4A BB 7A 15 CD 3F  62 B9 00 00 75 01 49 0B
00000B10  CA 23 C9 74 03 E9 02 00  EB 86 CD 3F 59 BB FF FF
00000B20  CD 3E 32 CD 3F 59 CD 3E  01 CD 3F 59 90 CD 3F 59
00000B30  90 CD 3F 59 90 CD 3E 02  3D 00 01 00 40 00 02 00
00000B40  4E 00 22 01 51 00 45 01  54 00 90 01 57 00 91 01
00000B50  29 09 7F E4 60 00 9A 01  69 00 A4 01 72 00 AE 01
00000B60  7B 00 B8 01 C3 00 F4 01  8C 00 C2 01 A6 00 C7 01
00000B70  B1 00 CC 01 CC 00 F5 01  E1 00 F6 01 FC 00 F7 01
00000B80  3D 01 FE 01 13 01 F8 01  1F 01 F9 01 31 01 FA 01
00000B90  46 01 FF 01 57 01 00 02  66 01 01 02 74 01 02 02
00000BA0  83 01 03 02 97 01 04 02  A5 01 08 02 BA 01 09 02
00000BB0  E5 01 0A 02 F5 01 0B 02  08 02 0C 02 19 02 12 02
00000BC0  35 02 13 02 4B 02 14 02  FD 02 1C 02 5C 02 15 02
00000BD0  70 02 16 02 79 02 17 02  88 02 18 02 9D 02 1A 02
00000BE0  AF 02 1B 02 A0 08 88 13  06 03 26 02 15 03 27 02
00000BF0  3E 03 28 02 90 03 29 02  A7 03 30 02 CD 03 58 02
00000C00  D6 03 62 02 EB 03 63 02  F9 03 64 02 22 04 65 02
00000C10  74 04 66 02 82 04 6C 02  8E 04 6D 02 9B 04 6E 02
00000C20  B0 04 6F 02 D9 04 70 02  2B 05 76 02 5B 05 80 02
00000C30  81 05 8A 02 A5 05 BC 02  66 05 81 02 7B 05 82 02
00000C40  8C 05 8B 02 9F 05 8C 02  FA 05 20 03 B4 05 BD 02
00000C50  F4 05 BE 02 38 06 21 03  47 06 22 03 5C 06 23 03
00000C60  7B 06 84 03 AA 06 2A 03  E8 06 2B 03 F7 06 2C 03
00000C70  0C 07 2D 03 5A 07 52 03  63 07 53 03 6C 07 54 03
00000C80  81 07 55 03 93 07 56 03  A5 07 57 03 AE 07 58 03
00000C90  CA 07 59 03 16 08 66 03  D9 07 5A 03 E6 07 5C 03
00000CA0  F1 07 5D 03 FD 07 5E 03  09 08 5F 03 2A 08 70 03
00000CB0  30 08 71 03 39 08 72 03  45 08 7A 03 5A 08 7B 03
00000CC0  75 08 7F 03 87 08 85 03  93 08 86 03 A9 08 89 13
00000CD0  B8 08 8A 13 CD 08 8B 13  1A 09 92 13 23 09 94 13
00000CE0  2D 09 97 E5 31 09 99 E5  00 00 00 00 00 00 00 00
00000CF0  CD 3F FF CB CD 3F FE CB  CD 3F FD CB CD 3F FC CB
00000D00  51 F3 A5 59 D1 E1 8E DA  8B 2E C6 13 8B C5 2B C2
00000D10  3D 00 10 72 03 B8 00 10  8B D1 81 C2 00 03 72 0C
00000D20  B1 04 D3 E0 0B C0 74 28  3B C2 73 24 BA 4A 00 0E
00000D30  1F B4 09 CD 21 53 33 C0  50 CB 0D 0A 50 72 6F 67
00000D40  72 61 6D 20 74 6F 6F 20  6C 61 72 67 65 0D 0A 24
00000D50  5E 5F 1E 17 8B E2 57 56  8B CA 92 83 06 C4 13 07
00000D60  FF 2E C4 13 B0 04 BF B0  05 A2 1F 00 C7 06 35 00
00000D70  89 00 C7 06 37 00 AF 00  CB CB 5F 5E 5B 56 57 FF
00000D80  36 00 00 FF 37 CB 00 00  00 00 00 00 00 00 00 00
00000D90  02 00 D4 14 2D 31 01 00  DA 14 72 5C 0C 00 E0 14
00000DA0  53 45 43 55 52 49 54 59  2E 44 41 54 00 00 00 00
00000DB0  00 00 00 7C 04 00 F8 14  30 34 32 35 24 00 00 15
00000DC0  53 65 63 75 72 69 74 79  20 43 6F 64 65 20 74 6F
00000DD0  20 61 64 64 2F 72 65 6D  6F 76 65 2F 63 68 61 6E
```

| | | | | | | | | | | | | | | | | |
|---|---|---|---|---|---|---|---|---|---|---|---|---|---|---|---|---|
| 00000DE0 | 67 | 65 | 3D | 20 | 04 | 00 | 28 | 15 | 20 | 20 | 20 | 20 | 00 | 00 | 30 | 15 |
| 00000DF0 | 3F | 00 | 34 | 15 | 54 | 68 | 69 | 73 | 20 | 43 | 6F | 64 | 65 | 20 | 69 | 73 |
| 00000E00 | 20 | 6E | 6F | 74 | 20 | 69 | 6E | 20 | 66 | 69 | 6C | 65 | 20 | 2D | 20 | 44 |
| 00000E10 | 6F | 20 | 79 | 6F | 75 | 20 | 77 | 69 | 73 | 68 | 20 | 74 | 6F | 20 | 65 | 6E |
| 00000E20 | 74 | 65 | 72 | 20 | 69 | 74 | 20 | 2D | 3C | 59 | 3E | 20 | 6F | 72 | 20 | 3C |
| 00000E30 | 4E | 3E | 3F | 00 | 01 | 00 | 78 | 15 | 4E | 5E | 01 | 00 | 7E | 15 | 6E | 00 |
| 00000E40 | 01 | 00 | 84 | 15 | 59 | 70 | 01 | 00 | 8A | 15 | 79 | 00 | 01 | 00 | 90 | 15 |
| 00000E50 | 20 | 00 | 03 | 00 | 96 | 15 | 59 | 45 | 53 | 00 | 02 | 00 | 9E | 15 | 4E | 4F |
| 00000E60 | 10 | 00 | A4 | 15 | 53 | 65 | 63 | 75 | 72 | 69 | 74 | 79 | 20 | 43 | 6F | 64 |
| 00000E70 | 65 | 20 | 23 | 20 | 03 | 00 | B8 | 15 | 4E | 4F | 20 | 00 | 01 | 00 | C0 | 15 |
| 00000E80 | 32 | 00 | 01 | 00 | C6 | 15 | 38 | 02 | 01 | 00 | CC | 15 | 2A | 00 | 2C | 00 |
| 00000E90 | D2 | 15 | 44 | 6F | 20 | 79 | 6F | 75 | 20 | 77 | 69 | 73 | 68 | 20 | 74 | 6F |
| 00000EA0 | 20 | 45 | 6E | 74 | 65 | 72 | 20 | 54 | 68 | 69 | 73 | 20 | 43 | 6F | 64 | 65 |
| 00000EB0 | 20 | 23 | 2D | 3C | 59 | 3E | 20 | 6F | 72 | 20 | 3C | 4E | 3E | 3F | 2D | 00 |
| 00000EC0 | 02 | 16 | 44 | 6F | 20 | 79 | 6F | 75 | 20 | 77 | 69 | 73 | 68 | 20 | 74 | 6F |
| 00000ED0 | 20 | 52 | 65 | 6D | 6F | 76 | 65 | 20 | 54 | 68 | 69 | 73 | 20 | 43 | 6F | 64 |
| 00000EE0 | 65 | 20 | 23 | 2D | 3C | 59 | 3E | 20 | 6F | 72 | 20 | 3C | 4E | 3E | 3F | 00 |
| 00000EF0 | 01 | 00 | 34 | 16 | 52 | 2C | 0A | 00 | 3A | 16 | 57 | 4F | 52 | 4B | 53 | 53 |
| 00000F00 | 2E | 44 | 41 | 54 | 45 | 00 | 48 | 16 | 44 | 6F | 20 | 79 | 6F | 75 | 20 | 77 |
| 00000F10 | 69 | 73 | 68 | 20 | 74 | 6F | 20 | 63 | 6F | 6E | 74 | 69 | 6E | 75 | 65 | 20 |
| 00000F20 | 65 | 6E | 74 | 65 | 72 | 69 | 6E | 67 | 2F | 63 | 68 | 61 | 6E | 67 | 69 | 6E |
| 00000F30 | 67 | 2F | 72 | 65 | 6D | 6F | 76 | 69 | 6E | 67 | 20 | 43 | 6F | 64 | 65 | 20 |
| 00000F40 | 23 | 2D | 3C | 59 | 3E | 20 | 6F | 72 | 20 | 3C | 4E | 3E | 3F | 00 | 00 | 00 |
| 00000F50 | 2C | 09 | 20 | 53 | 63 | 68 | 65 | 64 | 75 | 6C | 65 | 20 | 4B | 69 | 74 | 20 |
| 00000F60 | 66 | 6F | 72 | 20 | 61 | 20 | 43 | 65 | 6C | 6C | 2C | 55 | 70 | 64 | 61 | 74 |
| 00000F70 | 65 | 20 | 42 | 69 | 6E | 20 | 49 | 6E | 76 | 65 | 6E | 74 | 6F | 72 | 79 | 2C |
| 00000F80 | 41 | 64 | 64 | 20 | 61 | 20 | 4E | 65 | 77 | 20 | 50 | 61 | 72 | 74 | 20 | 4D |
| 00000F90 | 61 | 73 | 74 | 65 | 72 | 2C | 43 | 68 | 61 | 6E | 67 | 65 | 20 | 61 | 20 | 50 |
| 00000FA0 | 61 | 72 | 74 | 20 | 4D | 61 | 73 | 74 | 65 | 72 | 2C | 44 | 65 | 6C | 65 | 74 |
| 00000FB0 | 65 | 20 | 61 | 20 | 50 | 61 | 72 | 74 | 20 | 4D | 61 | 73 | 74 | 65 | 72 | 2C |
| 00000FC0 | 41 | 73 | 73 | 69 | 67 | 6E | 2F | 52 | 65 | 6D | 6F | 76 | 65 | 20 | 61 | 20 |
| 00000FD0 | 50 | 61 | 72 | 74 | 20 | 4E | 75 | 6D | 62 | 65 | 72 | 20 | 61 | 74 | 20 | 61 |
| 00000FE0 | 20 | 43 | 65 | 6C | 6C | 2F | 42 | 69 | 6E | 20 | 4C | 6F | 63 | 61 | 74 | 69 |
| 00000FF0 | 6F | 6E | 2C | 43 | 68 | 61 | 6E | 67 | 65 | 20 | 51 | 75 | 61 | 6E | 74 | 69 |
| 00001000 | 74 | 69 | 65 | 73 | 2F | 57 | 6F | 72 | 6B | 20 | 53 | 74 | 61 | 74 | 69 | 6F |
| 00001010 | 6E | 20 | 69 | 6E | 20 | 43 | 65 | 6C | 6C | 2F | 42 | 69 | 6E | 2C | 41 | 64 |
| 00001020 | 64 | 20 | 61 | 20 | 4E | 65 | 77 | 20 | 4B | 69 | 74 | 00 | 30 | 09 | 20 | 45 |
| 00001030 | 78 | 61 | 6D | 69 | 6E | 65 | 2F | 43 | 68 | 61 | 6E | 67 | 65 | 20 | 61 | 20 |
| 00001040 | 4B | 69 | 74 | 2C | 44 | 65 | 6C | 65 | 74 | 65 | 20 | 61 | 20 | 4B | 69 | 74 |
| 00001050 | 2C | 50 | 72 | 69 | 6E | 74 | 20 | 50 | 61 | 72 | 74 | 20 | 49 | 6E | 76 | 65 |
| 00001060 | 6E | 74 | 6F | 72 | 79 | 20 | 52 | 65 | 70 | 6F | 72 | 74 | 2C | 50 | 72 | 69 |
| 00001070 | 6E | 74 | 20 | 50 | 61 | 72 | 74 | 20 | 49 | 6E | 76 | 65 | 6E | 74 | 6F | 72 |
| 00001080 | 79 | 20 | 4C | 6F | 77 | 20 | 53 | 74 | 6F | 63 | 6B | 20 | 52 | 65 | 70 | 6F |
| 00001090 | 72 | 74 | 2C | 50 | 72 | 69 | 6E | 74 | 20 | 43 | 65 | 6C | 6C | 20 | 41 | 73 |
| 000010A0 | 73 | 69 | 67 | 6E | 6D | 65 | 6E | 74 | 20 | 52 | 65 | 70 | 6F | 72 | 74 | 2C |
| 000010B0 | 50 | 72 | 69 | 6E | 74 | 20 | 4B | 69 | 74 | 20 | 52 | 65 | 70 | 6F | 72 | 74 |
| 000010C0 | 2C | 44 | 69 | 73 | 70 | 6C | 61 | 79 | 20 | 50 | 72 | 65 | 73 | 65 | 6E | 74 |
| 000010D0 | 20 | 43 | 65 | 6C | 6C | 20 | 4B | 69 | 74 | 20 | 50 | 69 | 63 | 6B | 69 | 6E |
| 000010E0 | 67 | 2C | 43 | 61 | 6E | 63 | 65 | 6C | 20 | 50 | 72 | 65 | 73 | 65 | 6E | 74 |
| 000010F0 | 20 | 43 | 65 | 6C | 6C | 20 | 4B | 69 | 74 | 20 | 50 | 69 | 63 | 6B | 69 | 6E |
| 00001100 | 67 | 00 | 34 | 09 | 20 | 54 | 72 | 69 | 61 | 6C | 20 | 53 | 63 | 68 | 65 | 64 |
| 00001110 | 75 | 6C | 69 | 6E | 67 | 2C | 43 | 68 | 61 | 6E | 67 | 65 | 20 | 23 | 20 | 6F |
| 00001120 | 66 | 20 | 45 | 6D | 70 | 6C | 6F | 79 | 65 | 65 | 73 | 2F | 4C | 69 | 6E | 65 |
| 00001130 | 2C | 43 | 68 | 61 | 6E | 67 | 65 | 20 | 53 | 65 | 63 | 75 | 72 | 69 | 74 | 79 |
| 00001140 | 20 | 4C | 65 | 76 | 65 | 6C | 2C | 45 | 58 | 49 | 54 | 20 | 54 | 4F | 20 | 44 |
| 00001150 | 4F | 53 | 2C | 45 | 6E | 64 | 20 | 45 | 64 | 69 | 74 | 69 | 6E | 67 | 20 | 53 |
| 00001160 | 65 | 63 | 75 | 72 | 69 | 74 | 79 | 20 | 43 | 6F | 64 | 65 | 73 | 2C | 2D | 31 |
| 00001170 | 00 | FF | FF | 01 | 00 | 00 | 00 | 00 | 00 | 00 | 00 | 00 | 00 | 00 | 00 | 00 |
| 00001180 | 59 | 1F | A0 | 01 | 00 | 1E | 51 | 06 | 3C | 6D | 74 | 03 | E9 | 40 | 02 | B4 |
| 00001190 | 30 | CD | 21 | 3C | 02 | 73 | 03 | E9 | 3A | 02 | BA | 2E | 01 | 8E | DA | 26 |
| 000011A0 | 8B | 3E | 02 | 00 | 26 | 8B | 2E | 2C | 00 | 8E | C2 | 57 | B0 | 00 | BA | 45 |
| 000011B0 | 03 | 1E | 0E | 1F | B4 | 3D | CD | 21 | 1F | 72 | 03 | E9 | D8 | 00 | 8E | C5 |
| 000011C0 | 33 | FF | B9 | 05 | 00 | BE | 52 | 03 | 1E | 0E | 1F | F3 | A6 | 1F | 74 | 13 |
| 000011D0 | 26 | 8A | 05 | 47 | 0A | C0 | 75 | F8 | 26 | 80 | 3D | 00 | 75 | E4 | 1E | 07 |
| 000011E0 | EB | 57 | 90 | 1E | 07 | 1E | 8E | DD | 8B | F7 | 81 | 3C | 00 | 20 | 1F | 74 |
| 000011F0 | 48 | BF | CA | 13 | 8B | D7 | 1E | 8E | DD | AC | 3C | 3B | 74 | 07 | 3C | 00 |
| 00001200 | 74 | 03 | AA | EB | F4 | 1F | 8B | D8 | 81 | FF | CA | 13 | 74 | 0F | 80 | 7D |
| 00001210 | FF | 3A | 74 | 09 | 80 | 7D | FF | 5C | 74 | 03 | B0 | 5C | AA | 56 | BE | 45 |
| 00001220 | 03 | B9 | 0D | 00 | 90 | 1E | 0E | 1F | F3 | A4 | 1F | 5E | B0 | 00 | B4 | 3D |
| 00001230 | CD | 21 | 73 | 62 | 80 | FB | 3B | 74 | B8 | 1E | 0E | 1F | BA | 07 | 03 | B4 |
| 00001240 | 09 | CD | 21 | 1F | C6 | 06 | CA | 13 | 40 | BA | CA | 13 | B4 | 0A | CD | 21 |
| 00001250 | 1E | 0E | 1F | BA | 04 | 03 | B4 | 09 | CD | 21 | 1F | B7 | 00 | 8A | 1E | CB |
| 00001260 | 13 | 80 | BF | CB | 13 | 3A | 74 | 0D | 80 | BF | CB | 13 | 5C | 74 | 06 | C6 |
| 00001270 | 87 | CC | 13 | 5C | 43 | BA | CC | 13 | 8D | BF | CC | 13 | BE | 45 | 03 | B9 |

```
00001280  0D 00 90 1E 0E 1F F3 A4  1F B0 00 B4 3D CD 21 73
00001290  05 EB A6 E9 2F 01 5F 8B  D8 BA B0 13 B9 1A 00 B4
000012A0  3F CD 21 72 EE 81 3E B0  13 4D 5A 75 E6 8B 16 B8
000012B0  13 83 C2 1F 81 E2 E0 FF  8B EA B1 04 D3 E2 33 C9
000012C0  B0 00 B4 42 CD 21 72 CB  8B 16 B4 13 4A B1 05 D3
000012D0  E2 2B D5 A1 B2 13 05 0F  00 B1 04 D3 E8 03 D0 89
000012E0  16 B4 13 2B FA 83 EF 14  8C D6 8B D4 83 C2 11 B1
000012F0  04 D3 EA 03 F2 3B FE 73  03 E9 CE 00 8B EF 1E 8E
00001300  DF B9 FF FF 33 D2 B4 3F  CD 21 1F 72 86 8B 16 C8
00001310  13 41 B0 00 B4 42 CD 21  72 12 3B 0E B6 13 74 23
00001320  BA B0 13 B9 04 00 B4 3F  CD 21 73 03 E9 96 00 8B
00001330  3E B0 13 A1 B2 13 03 C5  8E C0 26 01 2D FF 0E B6
00001340  13 75 E3 B4 3E CD 21 73  03 EB 7A 90 01 2E C6 13
00001350  A1 C6 13 8B 1E C4 13 8E  C0 26 80 7F 03 05 75 5F
00001360  26 80 7F 04 06 75 58 26  80 7F 05 00 72 51 5B 1E
00001370  07 8E DD B9 D8 09 33 F6  8B FE FC F3 A5 06 1F 1E
00001380  B8 B9 00 8E D8 B9 F8 00  2B C8 D1 E1 D1 E1 D1 E1
00001390  B8 7B 02 8E C0 33 F6 33  FF F3 A5 1F 8C D1 8C D8
000013A0  2B C8 81 F9 00 10 76 03  B9 00 10 D1 E1 D1 E1 D1
000013B0  E1 BA B9 00 8E C2 33 F6  8B FE EA 10 00 AF 00 5B
000013C0  BA BC 02 EB 12 BA E0 02  EB 0D BA A6 02 EB 08 BA
000013D0  86 02 EB 03 BA 61 02 0E  1F B4 09 CD 21 33 C0 50
000013E0  CB 0D 0A 4D 75 73 74 20  72 75 6E 20 75 6E 64 65
000013F0  72 20 44 4F 53 20 32 2E  30 30 20 6F 72 20 6C 61
00001400  74 65 72 0D 0A 24 0D 0A  4D 75 73 74 20 6C 69 6E
00001410  6B 20 77 69 74 68 20 42  41 53 43 4F 4D 32 30 2E
00001420  4C 49 42 0D 0A 24 0D 0A  50 72 6F 67 72 61 6D 20
00001430  74 6F 6F 20 6C 61 72 67  65 0D 0A 24 0D 0A 57 72
00001440  6F 6E 67 20 76 65 72 73  69 6F 6E 20 6F 66 20 72
00001450  75 6E 74 69 6D 65 20 6D  6F 64 75 6C 65 0D 0A 24
00001460  0D 0A 45 72 72 6F 72 20  69 6E 20 45 58 45 20 66
00001470  69 6C 65 0D 0A 24 0D 0A  43 61 6E 6E 6F 74 20 66
00001480  69 6E 64 20 0D 0A 24 0D  0A 43 61 6E 6E 6F 74 20
00001490  66 69 6E 64 20 42 41 53  52 55 4E 32 30 2E 45 58
000014A0  45 0D 0A 45 6E 74 65 72  20 6E 65 77 20 70 61 74
000014B0  68 20 73 70 65 63 69 66  69 63 61 74 69 6F 6E 3A
000014C0  20 24 0D 0A 24 42 41 53  52 55 4E 32 30 2E 45 58
000014D0  45 00 50 41 54 48 3D
00000000  4D 5A F7 01 16 00 0C 00  20 00 C1 02 FF FF 40 05
00000010  00 02 A5 63 30 00 00 00  1E 00 00 00 01 00 12 00
00000020  00 00 14 00 00 00 16 00  00 00 33 00 00 00 38 00
00000030  00 00 86 00 F3 01 1B 00  6A 02 01 02 6A 02 06 02
00000040  6A 02 11 02 6A 02 32 02  6A 02 3D 02 6A 02 00 00
00000050  00 00 00 00 00 00 00 00  00 00 00 00 00 00 00 00
00000060  00 00 00 00 00 00 00 00  00 00 00 00 00 00 00 00
00000070  00 00 00 00 00 00 00 00  00 00 00 00 00 00 00 00
00000080  00 00 00 00 00 00 00 00  00 00 00 00 00 00 00 00
00000090  00 00 00 00 00 00 00 00  00 00 00 00 00 00 00 00
000000A0  00 00 00 00 00 00 00 00  00 00 00 00 00 00 00 00
000000B0  00 00 00 00 00 00 00 00  00 00 00 00 00 00 00 00
000000C0  00 00 00 00 00 00 00 00  00 00 00 00 00 00 00 00
000000D0  00 00 00 00 00 00 00 00  00 00 00 00 00 00 00 00
000000E0  00 00 00 00 00 00 00 00  00 00 00 00 00 00 00 00
000000F0  00 00 00 00 00 00 00 00  00 00 00 00 00 00 00 00
00000100  00 00 00 00 00 00 00 00  00 00 00 00 00 00 00 00
00000110  00 00 00 00 00 00 00 00  00 00 00 00 00 00 00 00
00000120  00 00 00 00 00 00 00 00  00 00 00 00 00 00 00 00
00000130  00 00 00 00 00 00 00 00  00 00 00 00 00 00 00 00
00000140  00 00 00 00 00 00 00 00  00 00 00 00 00 00 00 00
00000150  00 00 00 00 00 00 00 00  00 00 00 00 00 00 00 00
00000160  00 00 00 00 00 00 00 00  00 00 00 00 00 00 00 00
00000170  00 00 00 00 00 00 00 00  00 00 00 00 00 00 00 00
00000180  00 00 00 00 00 00 00 00  00 00 00 00 00 00 00 00
00000190  00 00 00 00 00 00 00 00  00 00 00 00 00 00 00 00
000001A0  00 00 00 00 00 00 00 00  00 00 00 00 00 00 00 00
000001B0  00 00 00 00 00 00 00 00  00 00 00 00 00 00 00 00
000001C0  00 00 00 00 00 00 00 00  00 00 00 00 00 00 00 00
000001D0  00 00 00 00 00 00 00 00  00 00 00 00 00 00 00 00
000001E0  00 00 00 00 00 00 00 00  00 00 00 00 00 00 00 00
000001F0  00 00 00 00 00 00 00 00  00 00 00 00 00 00 00 00
00000200  62 6D 50 41 52 54 20 20  20 20 00 00 22 29 40 14
00000210  1A 23 FD 01 6A 02 A0 02  40 14 00 00 40 14 40 14
00000220  30 23 08 00 00 00 00 00  00 00 00 00 FF FF 80 00
00000230  9A 00 00 6A 02 9A 77 00  F3 01 33 DB CD 3E 3C BB
```

```
00000240  FF FF CD 3E 32 CD 3E 22  BB 30 23 CD 3E 1F BB 01
00000250  00 BA 36 23 33 C9 CD 3E  1E BB 01 00 CD 3F B6 CD
00000260  3F B7 01 01 BB 7E 22 CD  3F B8 CD 3E 22 C7 06 80
00000270  22 1E 00 BB 48 23 BA 82  22 CD 3F 61 BB 4E 23 BA
00000280  86 22 CD 3F 61 BB 0D 00  CD 3D 05 BA 8A 22 CD 3F
00000290  61 BB 11 00 CD 3D 05 8B  D3 BB C4 00 CD 3D 05 92
000002A0  CD 3F 55 8B D3 BB D9 00  CD 3D 05 92 CD 3F 55 BA
000002B0  8E 22 CD 3F 61 8B 1E 7E  22 4B 4B CD 3F 5E 03 82
000002C0  18 D4 00 7A 12 BB FF FF  CD 3E 32 CD 3E 22 BB 54
000002D0  23 CD 3E 0E BB FF FF CD  3E 32 CD 3F BC BB 5C 23
000002E0  CD 3F 6E CD 3E 79 BB 05  00 CD 3E 42 BB 32 00 CD
000002F0  3E 42 33 DB CD 3E 44 CD  3F BC BB 8E 22 CD 3F 6A
00000300  BB 68 23 CD 3F 6A CD 3E  79 BB 01 00 CD 3E 42 BB
00000310  08 00 CD 3E 42 33 DB CD  3E 44 33 DB CD 3E 33 BB
00000320  07 00 CD 3E 35 CD 3F BC  BB 74 23 CD 3F 6A CD 3E
00000330  79 BB 01 00 CD 3E 42 BB  08 00 CD 3E 42 33 DB CD
00000340  3E 44 BB 07 00 CD 3E 33  33 DB CD 3E 35 BB 80 23
00000350  CD 3F B5 02 BB 92 22 CD  3F 5A BB 92 22 CD 3F BA
00000360  83 FB 08 7E 03 E9 6C FF  BB FF FF CD 3E 32 BB 01
00000370  00 CD 3E 21 BB 84 23 CD  3E 1F BB 01 00 BA 8A 23
00000380  B9 30 00 CD 3E 1E BB 01  00 CD 3F B3 BB 96 22 BA
00000390  02 00 CD 3F B4 BB 9A 22  CD 3F B4 BB 9E 22 BA 08
000003A0  00 CD 3F B4 BB A2 22 BA  1E 00 CD 3F B4 BB A6 22
000003B0  BA 03 00 CD 3F B4 BB 01  00 BA 01 00 CD 3E 26 BB
000003C0  9A 22 CD 3D 18 93 A3 AA  22 BB 01 00 8B 16 AA 22
000003D0  CD 3E 26 BB 9A 22 CD 3D  18 93 A3 AC 22 BB 98 23
000003E0  B8 9E 22 CD 3F 55 BA AE  22 CD 3F 61 BB AE 22 BA
000003F0  98 23 8B CB CD 3D 09 4B  87 D9 8B D1 8B C3 CD 3D
00000400  0B 92 CD 3F 61 BB 92 22  B8 AE 22 CD 3F 62 74 03
00000410  E9 1B 00 BB A2 22 BA B2  22 CD 3F 61 BB A6 22 BA
00000420  B6 22 CD 3F 61 BB 01 00  CD 3E 21 E9 46 00 83 3E
00000430  AC 22 00 BB 00 00 75 01  4B 8B D3 BB 92 22 B8 AE
00000440  22 CD 3F 62 B9 00 00 76  01 49 0B CA 23 C9 74 03
00000450  E9 09 00 A1 AC 22 A3 AA  22 E9 6D FF BB 01 00 CD
00000460  3E 21 BB 9E 23 B8 92 22  CD 3F 55 BA BA 22 CD 3F
00000470  61 E9 F2 0F BB FF FF CD  3E 32 CD 3F BC BB CC 23
00000480  CD 3F 6A BB 92 22 CD 3F  6E CD 3E 79 CD 3F BC BB
00000490  D8 23 CD 3F 6E CD 3E 79  CD 3F BC BB DE 23 CD 3F
000004A0  6A BB B2 22 CD 3F 6E CD  3E 79 CD 3F BC BB D8 23
000004B0  CD 3F 6E CD 3E 79 CD 3F  BC BB F0 23 CD 3F 6A BB
000004C0  B6 22 CD 3F 6E CD 3E 79  BB 07 00 CD 3E 42 BB 01
000004D0  00 CD 3E 42 33 DB CD 3E  44 CD 3F BC BB 06 24 CD
000004E0  3F 6A CD 3E 79 BB 05 00  CD 3E 42 BB 44 00 CD 3E
000004F0  42 33 DB CD 3E 44 CD 3F  BC BB 10 24 CD 3F 6A CD
00000500  3E 79 BB 17 00 CD 3E 33  33 DB CD 3E 35 CD 3F BC
00000510  BB 10 00 CD 3D 05 CD 3F  6A CD 3E 79 BB 07 00 CD
00000520  3E 33 33 DB CD 3E 35 BB  07 00 CD 3E 42 BB 44 00
00000530  CD 3E 42 33 DB CD 3E 44  CD 3F BC BB 18 00 CD 3D
00000540  05 CD 3F 6A BB 1A 24 CD  3F 6A CD 3E 79 BB 08 00
00000550  CD 3E 42 BB 44 00 CD 3E  42 33 DB CD 3E 44 CD 3F
00000560  BC BB 19 00 CD 3D 05 CD  3F 6A BB 24 24 CD 3F 6A
00000570  CD 3E 79 BB 0C 00 CD 3E  42 BB 42 00 CD 3E 42 33
00000580  DB CD 3E 44 CD 3F BC BB  11 00 CD 3D 05 CD 3F 6A
00000590  BB C4 00 CD 3D 05 CD 3F  6A BB D9 00 CD 3D 05 CD
000005A0  3F 6A BB 30 24 CD 3F 6A  CD 3E 79 C7 06 BE 22 01
000005B0  00 83 3E BE 22 01 74 03  E9 11 00 BB 01 00 CD 3E
000005C0  42 CD 3E 42 33 DB CD 3E  44 E9 4D 00 83 3E BE 22
000005D0  02 74 03 E9 14 00 BB 03  00 CD 3E 42 BB 01 00 CD
000005E0  3E 42 33 DB CD 3E 44 E9  2F 00 83 3E BE 22 03 74
000005F0  03 E9 14 00 BB 05 00 CD  3E 42 BB 01 00 CD 3E 42
00000600  33 DB CD 3E 44 E9 11 00  BB 07 00 CD 3E 42 BB 01
00000610  00 CD 3E 42 33 DB CD 3E  44 CD 3F BC BB 10 00 CD
00000620  3D 05 CD 3F 6A CD 3E 79  CD 3D 06 BA BA 22 CD 3F
00000630  61 BB BA 22 CD 3F BA 0B  DB 74 ED 83 3E BE 22 01
00000640  74 03 E9 11 00 BB 01 00  CD 3E 42 CD 3E 42 33 DB
00000650  CD 3E 44 E9 4D 00 83 3E  BE 22 02 74 03 E9 14 00
00000660  BB 03 00 CD 3E 42 BB 01  00 CD 3E 42 33 DB CD 3E
00000670  44 E9 2F 00 83 3E BE 22  03 74 03 E9 14 00 BB 05
00000680  00 CD 3E 42 BB 01 00 CD  3E 42 33 DB CD 3E 44 E9
00000690  11 00 BB 07 00 CD 3E 42  BB 01 00 CD 3E 42 33 DB
000006A0  CD 3E 44 CD 3F BC BB D8  23 CD 3F 6A CD 3E 79 BB
000006B0  8A 22 B8 BA 22 CD 3F 62  75 03 E9 53 00 BB 86 22
000006C0  B8 BA 22 CD 3F 62 75 03  E9 11 00 BB 82 22 B8 BA
000006D0  22 CD 3F 62 75 03 E9 1D  00 E9 D5 FE A1 BE 22 40
```

```
000014F0  CD 3E 35 BB 80 23 CD 3F  B5 02 BB 92 22 CD 3F 5A
00001500  BB 92 22 CD 3F BA 83 FB  08 7E 03 E9 6C FF BB FF
00001510  FF CD 3E 32 BB 01 00 CD  3E 21 BB 84 23 CD 3E 1F
00001520  BB 01 00 BA 8A 23 B9 30  00 CD 3E 1E BB 01 00 CD
00001530  3F B3 BB 96 22 BA D2 00  CD 3F B4 BB 9A 22 CD 3F
00001540  B4 BB 9E 22 BA 08 00 CD  3F B4 BB A2 22 BA 1E 00
00001550  CD 3F B4 BB A6 22 BA 03  00 CD 3F B4 BB 01 00 BA
00001560  01 00 CD 3E 26 BB 9A 22  CD 3D 18 93 A3 AA 22 BB
00001570  01 00 8B 16 AA 22 CD 3E  26 BB 9A 22 CD 3D 18 93
00001580  A3 AC 22 BB 98 23 B8 9E  22 CD 3F 55 BA AE 22 CD
00001590  3F 61 BB AE 22 BA 98 23  8B CB CD 3D 09 4B 87 D9
000015A0  8B D1 8B C3 CD 3D 0B 92  CD 3F 61 BB 92 22 B8 AE
000015B0  22 CD 3F 62 74 03 E9 0C  00 BB A2 22 BA B2 22 CD
000015C0  3F 61 E9 57 00 83 3E AC  22 00 BB 00 00 75 01 4B
000015D0  8B D3 BB 92 22 B8 AE 22  CD 3F 62 B9 00 00 76 01
000015E0  49 0B CA 23 C9 74 03 E9  09 00 A1 AC 22 A3 AA 22
000015F0  E9 7C FF BB 01 00 CD 3E  21 BB 9A 26 B8 92 22 CD
00001600  3F 55 BA BA 22 CD 3F 61  E8 17 0A BB 94 26 B8 BA
00001610  22 CD 3F 62 75 03 E9 61  FE E9 63 04 BB 01 00 CD
00001620  3E 21 CD 3F BC BB C6 26  CD 3F 6E CD 3E 79 C7 06
00001630  F8 22 01 00 BB 01 00 CD  3E 21 BB D2 24 CD 3E 1F
00001640  BB 01 00 BA D8 24 B9 00  01 CD 3E 1E BB 01 00 CD
00001650  3F B3 BB C4 22 BA 02 00  CD 3F B4 BB C8 22 CD 3F
00001660  B4 BB CC 22 8B CA BA 0E  00 CD 3F B4 BB D0 22 BA
00001670  1E 00 CD 3F B4 8B D1 BB  D4 22 CD 3F B4 33 C0 E9
00001680  51 00 33 C0 E9 3E 00 BB  01 00 CD 3F B3 8B 1E BE
00001690  22 8B D3 D1 E3 D1 E3 8B  0E D8 22 8B C1 D1 E1 03
000016A0  CB 83 C1 38 87 D1 BB DA  22 CD 3F B4 BB 32 00 F7
000016B0  EB 03 C1 D1 E0 D1 E0 05  EE 20 93 BA 02 00 CD 3F
000016C0  B4 A1 D8 22 40 A3 D8 22  83 3E D8 22 01 7E B8 A1
000016D0  BE 22 40 A3 BE 22 83 3E  BE 22 31 7E A5 33 C0 E9
000016E0  4C 00 A1 BE 22 03 06 F8  22 92 BB 01 00 CD 3E 26
000016F0  BB 01 00 CD 3D 2F 83 FB  FF 75 03 E9 87 00 B8 01
00001700  00 E9 1C 00 8B 1E FA 22  D1 E3 D1 E3 81 C3 EA 20
00001710  CD 3D 18 3B 1E AA 22 75  03 E9 0E 00 A1 FA 22 40
00001720  A3 FA 22 83 3E FA 22 32  7E DA A1 BE 22 40 A3 BE
00001730  22 83 3E BE 22 04 7E AA  A1 F8 22 05 08 00 A3 F8
00001740  22 EB 9A BB FF FF CD 3E  32 CD 3E 2B CD 3F BC BB
00001750  F4 26 CD 3F 6A BB CC 22  CD 3F 6E CD 3E 79 CD 3F
00001760  BC BB 20 27 CD 3F 6A BB  D0 22 CD 3F 6E CD 3E 79
00001770  BB 01 00 CD 3E 21 BB 28  27 BA BA 22 CD 3F 61 E8
00001780  A6 08 E9 EC 02 BB 01 00  CD 3E 21 BB D2 24 CD 3E
00001790  1F BB 01 00 BA 5C 27 B9  40 01 CD 3E 1E 33 C0 E9
000017A0  7D 00 33 C0 E9 6A 00 BB  01 00 CD 3F B3 B8 0A 00
000017B0  F7 2E BE 22 8B 1E D8 22  8B D3 D1 E3 03 D8 CD 3F
000017C0  57 BF F2 24 CD 3F 91 BB  1A 00 CD 3F 71 80 CD 3D
000017D0  03 CD 3F 77 87 D3 8B CB  BB DA 22 CD 3F B4 BB 1A
000017E0  23 CD 3D 03 CD 3F 77 8B  D3 BB FC 22 CD 3F B4 D1
000017F0  E1 D1 E1 D1 E1 D1 E1 D1  E1 03 0E BE 22 D1 E1 D1
00001800  E1 D1 C1 6E 1E 8B D9 BA  02 00 CD 3F B4 A1 D8 22
00001810  40 A3 D8 22 83 3E D8 22  04 7E 8C A1 BE 22 40 A3
00001820  BE 22 83 3E BE 22 1F 7F  03 E9 76 FF A1 80 22 A3
00001830  00 23 B8 01 00 E9 EB 00  BB 1C 1F CD 3F 34 A1 02
00001840  23 A3 04 23 B8 01 00 E9  16 00 BB 06 23 CD 3F 0F
00001850  BB 08 23 CD 3F 0F BB 0A  23 CD 3F 0F A1 0C 23 40
00001860  A3 0C 23 A1 04 23 3B 06  0C 23 7D DE A1 0A 23 A3
00001870  0E 23 B8 01 00 E9 98 00  B8 05 00 F7 2E 02 23 03
00001880  06 0C 23 05 FB FF 92 BB  01 00 CD 3E 26 A1 08 23
00001890  A3 10 23 A1 06 23 E9 67  00 8B 1E 12 23 D1 E3 D1
000018A0  E3 81 C3 6A 1E CD 3D 18  3B 1E AA 22 74 03 E9 4B
000018B0  00 BB 01 00 CD 3E 21 BB  FF FF CD 3E 32 CD 3E 2B
000018C0  CD 3F BC BB 6A 27 CD 3F  6A 8B 1E 02 23 CD 3F 69
000018D0  BB 8E 27 CD 3F 6A 8B 1E  0C 23 CD 3F 69 BB A0 27
000018E0  CD 3F 6A 8B 1E 12 23 CD  3F 6D CD 3E 79 BB A8 27
000018F0  BA BA 22 CD 3F 61 E8 2F  07 E9 75 01 A1 12 23 40
00001900  A3 12 23 A1 10 23 3B 06  12 23 7D 8D A1 0C 23 40
00001910  A3 0C 23 A1 0E 23 3B 06  0C 23 7C 03 E9 59 FF A1
00001920  02 23 40 A3 02 23 A1 00  23 3B 06 02 23 7C 03 E9
00001930  06 FF BB 01 00 CD 3E 21  BB FF FF CD 3E 32 BB DC
00001940  27 BA BA 22 CD 3F 61 E8  DE 06 BB 64 24 B8 BA 22
00001950  CD 3F 62 75 03 E9 27 01  BB 84 23 CD 3E 1F BB 01
00001960  00 BA 8A 23 B9 30 00 CD  3E 1E BB 01 00 CD 3F B3
00001970  BB 96 22 BA 02 00 CD 3F  B4 BB 9A 22 CD 3F B4 BB
00001980  9E 22 BA 08 00 CD 3F B4  BB A2 22 BA 1E 00 CD 3F
```

| | | | | | | | | | | | | | | | | |
|---|---|---|---|---|---|---|---|---|---|---|---|---|---|---|---|---|
| 000006E0 | A3 | BE | 22 | 83 | 3E | BE | 22 | 05 | 74 | 03 | E9 | 06 | 00 | C7 | 06 | BE |
| 000006F0 | 22 | 01 | 00 | E9 | BB | FE | A1 | BE | 22 | 48 | A3 | BE | 22 | 83 | 3E | BE |
| 00000700 | 22 | 00 | 74 | 03 | E9 | 06 | 00 | C7 | 06 | BE | 22 | 04 | 00 | E9 | A1 | FE |
| 00000710 | 8B | 1E | BE | 22 | CD | 3F | 5E | 04 | 20 | 05 | CF | 0E | 96 | 10 | 5D | 12 |
| 00000720 | BB | FF | FF | CD | 3E | 32 | CD | 3F | BC | BB | 5C | 23 | CD | 3F | 6E | CD |
| 00000730 | 3E | 79 | BB | 05 | 00 | CD | 3E | 42 | BB | 32 | 00 | CD | 3E | 42 | 33 | DB |
| 00000740 | CD | 3E | 44 | CD | 3F | BC | BB | 8E | 22 | CD | 3F | 6A | BB | 68 | 23 | CD |
| 00000750 | 3F | 6A | CD | 3E | 79 | BB | 01 | 00 | CD | 3E | 42 | BB | 09 | 00 | CD | 3E |
| 00000760 | 42 | 33 | DB | CD | 3E | 44 | 33 | DB | CD | 3E | 33 | BB | 07 | 00 | CD | 3E |
| 00000770 | 35 | BB | 01 | 00 | CD | 3E | 42 | BB | 09 | 00 | CD | 3E | 42 | 33 | DB | CD |
| 00000780 | 3E | 44 | BB | 07 | 00 | CD | 3E | 33 | 33 | DB | CD | 3E | 35 | BB | 80 | 23 |
| 00000790 | CD | 3F | B5 | 02 | BB | 92 | 22 | CD | 3F | 5A | BB | 92 | 22 | CD | 3F | BA |
| 000007A0 | 83 | FB | 08 | 7E | 03 | E9 | 78 | FF | BB | 05 | 00 | CD | 3E | 42 | BB | 32 |
| 000007B0 | 00 | CD | 3E | 42 | 33 | DB | CD | 3E | 44 | CD | 3F | BC | BB | 14 | 00 | CD |
| 000007C0 | 3D | 0D | CD | 3F | 6A | CD | 3E | 79 | BB | 01 | 00 | CD | 3E | 42 | BB | 09 |
| 000007D0 | 00 | CD | 3E | 42 | 33 | DB | CD | 3E | 44 | CD | 3F | BC | BB | 92 | 22 | CD |
| 000007E0 | 3F | 6A | BB | 74 | 23 | CD | 3F | 6A | CD | 3E | 79 | CD | 3F | BC | BB | D8 |
| 000007F0 | 23 | CD | 3F | 6E | CD | 3E | 79 | CD | 3F | BC | BB | D8 | 23 | CD | 3F | 6E |
| 00000800 | CD | 3E | 79 | BB | 3E | 24 | BA | BA | 22 | CD | 3F | 61 | E8 | 19 | 18 | BB |
| 00000810 | 64 | 24 | B8 | BA | 22 | CD | 3F | 62 | 75 | 03 | E9 | A6 | 08 | A1 | AA | 22 |
| 00000820 | A3 | C0 | 22 | BB | FF | FF | CD | 3E | 32 | BB | 01 | 00 | CD | 3E | 21 | BB |
| 00000830 | 84 | 23 | CD | 3E | 1F | BB | 01 | 00 | BA | 8A | 23 | B9 | 30 | 00 | CD | 3E |
| 00000840 | 1E | BB | 01 | 00 | CD | 3F | B3 | BB | 96 | 22 | BA | 02 | 00 | CD | 3F | B4 |
| 00000850 | BB | 9A | 22 | CD | 3F | B4 | BB | 9E | 22 | BA | 08 | 00 | CD | 3F | B4 | BB |
| 00000860 | 01 | 00 | BA | 01 | 00 | CD | 3E | 26 | BB | 9A | 22 | CD | 3D | 18 | 93 | A3 |
| 00000870 | AA | 22 | BB | 01 | 00 | 8B | 16 | AA | 22 | CD | 3E | 26 | BB | 9A | 22 | CD |
| 00000880 | 3D | 18 | 93 | A3 | AC | 22 | BB | 98 | 23 | B8 | 9E | 22 | CD | 3F | 55 | BA |
| 00000890 | AE | 22 | CD | 3F | 61 | BB | AE | 22 | BA | 98 | 23 | 8B | CB | CD | 3D | 09 |
| 000008A0 | 4B | 87 | D9 | 8B | D1 | 8B | C3 | CD | 3D | 0B | 92 | CD | 3F | 61 | BB | 92 |
| 000008B0 | 22 | B8 | AE | 22 | CD | 3F | 62 | 74 | 03 | E9 | 15 | 00 | BB | 6A | 24 | B8 |
| 000008C0 | 92 | 22 | CD | 3F | 55 | BA | BA | 22 | CD | 3F | 61 | E8 | 54 | 17 | E9 | A6 |
| 000008D0 | 0B | 83 | 3E | AC | 22 | 00 | BB | 00 | 00 | 75 | 01 | 4B | 8B | D3 | BB | 92 |
| 000008E0 | 22 | B8 | AE | 22 | CD | 3F | 62 | B9 | 00 | 00 | 76 | 01 | 49 | 0B | CA | 23 |
| 000008F0 | C9 | 74 | 03 | E9 | 09 | 00 | A1 | AC | 22 | A3 | AA | 22 | E9 | 73 | FF | BB |
| 00000900 | 0A. | 00 | CD | 3E | 42 | BB | 01 | 00 | CD | 3E | 42 | 33 | DB | CD | 3E | 44 |
| 00000910 | BB | 8C | 24 | BA | BA | 22 | CD | 3F | 61 | E8 | 0C | 17 | BB | 64 | 24 | B8 |
| 00000920 | BA | 22 | CD | 3F | 62 | 75 | 03 | E9 | 09 | 00 | A1 | C0 | 22 | A3 | AA | 22 |
| 00000930 | E9 | 6D | 05 | BB | FF | FF | CD | 3E | 32 | CD | 3F | BC | BB | C0 | 24 | CD |
| 00000940 | 3F | 6E | CD | 3E | 79 | A1 | AA | 22 | A3 | C2 | 22 | BB | 01 | 00 | CD | 3E |
| 00000950 | 21 | BB | D2 | 24 | CD | 3E | 1F | BB | 01 | 00 | BA | D8 | 24 | B9 | 00 | 01 |
| 00000960 | CD | 3E | 1E | BB | 01 | 00 | CD | 3F | B3 | BB | C4 | 22 | BA | 02 | 00 | CD |
| 00000970 | 3F | B4 | BB | C8 | 22 | CD | 3F | B4 | BB | CC | 22 | 8B | CA | BA | 0E | 00 |
| 00000980 | CD | 3F | B4 | BB | D0 | 22 | BA | 1E | 00 | CD | 3F | B4 | 8B | D1 | BB | D4 |
| 00000990 | 22 | CD | 3F | B4 | 33 | C0 | E9 | 51 | 00 | 33 | C0 | E9 | 3E | 00 | BB | 01 |
| 000009A0 | 00 | CD | 3F | B3 | 8B | 1E | BE | 22 | 8B | D3 | D1 | E3 | D1 | E3 | 8B | 0E |
| 000009B0 | D8 | 22 | 8B | C1 | D1 | E1 | 03 | CB | 83 | C1 | 38 | 87 | D1 | BB | DA | 22 |
| 000009C0 | CD | 3F | B4 | BB | 32 | 00 | F7 | EB | 03 | C1 | D1 | E0 | D1 | E0 | 05 | EE |
| 000009D0 | 20 | 93 | BA | 02 | 00 | CD | 3F | B4 | A1 | D8 | 22 | 40 | A3 | D8 | 22 | 83 |
| 000009E0 | 3E | D8 | 22 | 01 | 7E | B8 | A1 | BE | 22 | 40 | A3 | BE | 22 | 83 | 3E | BE |
| 000009F0 | 22 | 31 | 7E | A5 | BB | 01 | 00 | CD | 3D | 31 | BF | E4 | 24 | CD | 3F | 92 |
| 00000A00 | 8B | D3 | CD | 3F | 78 | 93 | A3 | DE | 22 | 92 | E9 | 7E | 04 | C7 | 06 | D8 |
| 00000A10 | 22 | 00 | 00 | BB | D8 | 23 | BA | E0 | 22 | CD | 3F | 61 | 33 | C0 | E9 | A9 |
| 00000A20 | 00 | A1 | E4 | 22 | 03 | 06 | AA | 22 | 92 | BB | 01 | 00 | CD | 3E | 26 | B8 |
| 00000A30 | 01 | 00 | E9 | 84 | 00 | 8B | 1E | BE | 22 | D1 | E3 | D1 | E3 | 81 | C3 | B2 |
| 00000A40 | 21 | CD | 3D | 18 | 3B | 1E | C0 | 22 | 74 | 03 | E9 | 0C | 00 | BB | EC | 24 |
| 00000A50 | BA | E0 | 22 | CD | 3F | 61 | E9 | 16 | 00 | 8B | 1E | BE | 22 | D1 | E3 | D1 |
| 00000A60 | E3 | 81 | C3 | B2 | 21 | CD | 3D | 18 | 0B | DB | 75 | 03 | E9 | 68 | 00 | 8B |
| 00000A70 | 1E | BE | 22 | 8B | D3 | D1 | E3 | D1 | E3 | 81 | C3 | EA | 20 | CD | 3D | 18 |
| 00000A80 | B8 | 32 | 00 | 8B | CA | F7 | 2E | E4 | 22 | 03 | C1 | 97 | D1 | E7 | 89 | 9D |
| 00000A90 | 44 | 14 | 8B | 1E | BE | 22 | 8B | D3 | D1 | E3 | D1 | E3 | 81 | C3 | B2 | 21 |
| 00000AA0 | CD | 3D | 18 | B8 | 32 | 00 | 8B | CA | F7 | 2E | E4 | 22 | 03 | C1 | 97 | D1 |
| 00000AB0 | E7 | 89 | 9D | 38 | 16 | A1 | BE | 22 | 40 | A3 | BE | 22 | 83 | 3E | BE | 22 |
| 00000AC0 | 32 | 7F | 03 | E9 | 6F | FF | A1 | E4 | 22 | 40 | A3 | E4 | 22 | 83 | 3E | E4 |
| 00000AD0 | 22 | 04 | 7F | 03 | E9 | 4A | FF | BB | EC | 24 | B8 | E0 | 22 | CD | 3F | 62 |
| 00000AE0 | 74 | 03 | E9 | A0 | 03 | 33 | C0 | E9 | 6F | 00 | A1 | E4 | 22 | 03 | 06 | AA |
| 00000AF0 | 22 | 05 | 05 | 00 | 92 | BB | 01 | 00 | CD | 3E | 26 | B8 | 01 | 00 | E9 | 4A |
| 00000B00 | 00 | 8B | 1E | BE | 22 | 8B | D3 | D1 | E3 | D1 | E3 | 81 | C3 | EA | 20 | CD |
| 00000B10 | 3D | 18 | B8 | 64 | 00 | 8B | CA | F7 | 2E | E4 | 22 | 03 | C1 | 97 | D1 | E7 |
| 00000B20 | 89 | 9D | 2C | 18 | 8B | 1E | BE | 22 | 8B | D3 | D1 | E3 | D1 | E3 | 81 | C3 |
| 00000B30 | B2 | 21 | CD | 3D | 18 | B8 | 64 | 00 | 8B | CA | F7 | 2E | E4 | 22 | 03 | C1 |
| 00000B40 | 97 | D1 | E7 | 89 | 9D | 90 | 18 | A1 | BE | 22 | 40 | A3 | BE | 22 | 83 | 3E |
| 00000B50 | BE | 22 | 32 | 7E | AC | A1 | E4 | 22 | 40 | A3 | E4 | 22 | 83 | 3E | E4 | 22 |
| 00000B60 | 02 | 7E | 87 | BB | 02 | 00 | CD | 3E | 21 | BB | 84 | 23 | CD | 3E | 1F | BB |
| 00000B70 | 02 | 00 | BA | 8A | 23 | B9 | 30 | 00 | CD | 3E | 1E | BB | 02 | 00 | CD | 3F |

```
00000B80  B3 BB 96 22 BA 04 00 CD  3F B4 BB 9E 22 BA 08 00
00000B90  CD 3F B4 C7 06 E6 22 00  00 B8 01 00 E9 70 00 8B
00000BA0  1E E8 22 D1 E3 D1 E3 81  C3 82 1A 8B D3 BB 98 23
00000BB0  CD 3F 61 8B 3E E8 22 D1  E7 83 BD 44 14 00 75 03
00000BC0  E9 48 00 A1 E6 22 40 A3  E6 22 8B 3E E8 22 D1 E7
00000BD0  BB 02 00 8B 95 44 14 CD  3E 26 8B 1E E8 22 D1 E3
00000BE0  D1 E3 81 C3 82 1A 8B D3  BB 9E 22 CD 3F 61 8B 1E
00000BF0  E8 22 D1 E3 D1 E3 81 C3  82 1A 93 BB 74 23 CD 3F
00000C00  55 BA 08 00 CD 3D 0B 92  CD 3F 61 A1 E8 22 40 A3
00000C10  E8 22 81 3E E8 22 FA 00  7E 85 BB 02 00 CD 3E 21
00000C20  A1 E6 22 A3 EA 22 8B 1E  EA 22 CD 3F 57 BF F2 24
00000C30  CD 3F 91 BB 1A 00 CD 3D  03 CD 3F 77 93 A3 EA 22
00000C40  83 3E EA 22 00 75 03 E9  09 01 C7 06 EC 22 01 00
00000C50  A1 E6 22 2B 06 EA 22 A3  EE 22 A1 EC 22 A3 F0 22
00000C60  A1 EA 22 03 06 F0 22 A3  F2 22 8B 1E F0 22 8B D3
00000C70  D1 E3 D1 E3 81 C3 82 1A  8B 0E F2 22 8B C1 D1 E1
00000C80  D1 E1 81 C1 82 1A 87 D9  91 CD 3F 62 89 5E FA BB
00000C90  00 00 76 01 4B 89 5E F8  8B 5E FA CD 3F 62 BB 00
00000CA0  00 75 01 4B 8B FA D1 E7  8B 95 2C 18 8B F1 D1 E6
00000CB0  3B 94 2C 18 B9 00 00 7E  01 49 23 CB 0B 4E F8 23
00000CC0  C9 74 03 E9 03 00 E9 74  00 8B 36 F2 22 D1 E6 D1
00000CD0  E6 81 C6 82 1A 8B 3E F0  22 D1 E7 D1 E7 81 C7 82
00000CE0  1A CD 3F 14 8B 36 F2 22  D1 E6 81 C6 44 14 8B 3E
00000CF0  F0 22 D1 E7 81 C7 44 14  CD 3F 13 8B 36 F2 22 D1
00000D00  E6 81 C6 38 16 8B 3E F0  22 D1 E7 81 C7 38 16 CD
00000D10  3F 13 8B 36 F2 22 D1 E6  81 C6 2C 18 8B 3E F0 22
00000D20  D1 E7 81 C7 2C 18 CD 3F  13 A1 F0 22 2B 06 EA 22
00000D30  A3 F0 22 83 3E F0 22 01  7C 03 E9 23 FF A1 EC 22
00000D40  40 A3 EC 22 A1 EE 22 3B  06 EC 22 7D 03 E9 D6 FE
00000D50  E9 07 FF 33 C0 E9 84 00  A1 E4 22 03 06 AA 22 92
00000D60  BB 01 00 CD 3E 26 B8 01  00 E9 54 00 8B 1E BE 22
00000D70  8B D3 D1 E3 D1 E3 81 C3  EA 20 B8 32 00 8B CA F7
00000D80  2E E4 22 03 C1 97 D1 E7  8B D3 8B 9D 44 14 CD 3D
00000D90  1B CD 3F 5B 8B 1E BE 22  8B D3 D1 E3 D1 E3 81 C3
00000DA0  B2 21 B8 32 00 8B CA F7  2E E4 22 03 C1 97 D1 E7
00000DB0  8B D3 8B 9D 38 16 CD 3D  1B CD 3F 5B A1 BE 22 40
00000DC0  A3 BE 22 83 3E BE 22 32  7E A2 A1 E4 22 03 06 AA
00000DD0  22 92 BB 01 00 CD 3E 28  A1 E4 22 40 A3 E4 22 83
00000DE0  3E E4 22 04 7F 03 E9 6F  FF 33 C0 E9 8A 00 A1 E4
00000DF0  22 03 06 AA 22 05 05 00  92 BB 01 00 CD 3E 26 B8
00000E00  01 00 E9 54 00 8B 1E BE  22 8B D3 D1 E3 D1 E3 81
00000E10  C3 EA 20 B8 64 00 8B CA  F7 2E E4 22 03 C1 97 D1
00000E20  E7 8B D3 8B 9D 2C 18 CD  3D 1B CD 3F 5B 8B 1E BE
00000E30  22 8B D3 D1 E3 D1 E3 81  C3 B2 21 B8 64 00 8B CA
00000E40  F7 2E E4 22 03 C1 97 D1  E7 8B D3 8B 9D 90 18 CD
00000E50  3D 1B CD 3F 5B A1 BE 22  40 A3 BE 22 83 3E BE 22
00000E60  32 7E A2 A1 E4 22 03 06  AA 22 05 05 00 92 BB 01
00000E70  00 CD 3E 28 A1 E4 22 40  A3 E4 22 83 3E E4 22 02
00000E80  7F 03 E9 69 FF A1 AA 22  05 08 00 A3 AA 22 A1 DE
00000E90  22 3B 06 AA 22 7C 03 E9  73 FB A1 C0 22 A3 AA 22
00000EA0  BB FF FF CD 3E 32 CD 3F  BC BB C0 24 CD 3F 6E CD
00000EB0  3E 79 BB 01 00 CD 3E 21  BB 84 23 CD 3E 1F BB 01
00000EC0  00 BA 8A 23 B9 30 00 CD  3E 1E BB 01 00 CD 3F B3
00000ED0  BB 96 22 BA 02 00 CD 3F  B4 BB 9A 22 CD 3F B4 BB
00000EE0  9E 22 BA 08 00 CD 3F B4  BB A2 22 BA 1E 00 CD 3F
00000EF0  B4 BB A6 22 BA 03 00 CD  3F B4 BB 01 00 8B 16 AA
00000F00  22 CD 3E 26 BB 96 22 CD  3D 18 93 A3 F4 22 BB 9A
00000F10  22 CD 3D 18 93 A3 AC 22  BB 01 00 8B 16 F4 22 CD
00000F20  3E 26 8B 1E AC 22 CD 3D  1B BA 9A 22 CD 3F 5B BB
00000F30  01 00 8B 16 F4 22 CD 3E  28 83 3E AC 22 00 7F 03
00000F40  E9 21 00 BB 01 00 8B 16  AC 22 CD 3E 26 8B 1E F4
00000F50  22 CD 3D 1B BA 96 22 CD  3F 5B BB 01 00 8B 16 AC
00000F60  22 CD 3E 28 A1 AA 22 A3  F6 22 BB 01 00 BA 01 00
00000F70  CD 3E 26 BB 9A 22 CD 3D  18 93 A3 AA 22 BB 01 00
00000F80  8B 16 AA 22 CD 3E 26 BB  96 22 CD 3D 18 93 A3 F4
00000F90  22 BB 9A 22 CD 3D 18 93  A3 AC 22 BB 98 23 B8 9E
00000FA0  22 CD 3F 55 BA AE 22 CD  3F 61 BB AE 22 BA 98 23
00000FB0  8B CB CD 3D 09 4B 87 D9  8B D1 8B C3 CD 3D 0B 92
00000FC0  CD 3F 61 BB 92 22 B8 AE  22 CD 3F 62 74 03 E9 12
00000FD0  00 BB F6 24 B8 92 22 CD  3F 55 BA BA 22 CD 3F 61
00000FE0  E9 2B 10 BB 92 22 B8 AE  22 CD 3F 62 BA 00 00 73
00000FF0  01 4A 83 3E AC 22 00 BB  00 00 7E 01 4B 23 DA 23
00001000  DB 75 03 E9 09 00 A1 AC  22 A3 AA 22 E9 6E FF BB
00001010  92 22 B8 AE 22 CD 3F 62  BA 00 00 73 01 4A 83 3E
00001020  AC 22 00 BB 00 00 75 01  4B 23 DA 23 DB 75 03 E9
00001030  0C 00 A1 AA 22 A3 F4 22  C7 06 AA 22 00 00 8B 1E
00001040  F4 22 CD 3D 1B BA 96 22  CD 3F 5B 8B 1E [illegible] 22 CD
```

```
00001050  3D 1B BA 9A 22 CD 3F 5B  BB 92 22 BA 9E 22 CD 3F
00001060  5B BB B2 22 BA A2 22 CD  3F 5B BB 01 00 8B 16 F6
00001070  22 CD 3E 28 BB 01 00 8B  16 F4 22 CD 3E 26 8B 1E
00001080  F6 22 CD 3D 1B BA 9A 22  CD 3F 5B BB 01 00 8B 16
00001090  F4 22 CD 3E 28 83 3E AA  22 00 7F 03 E9 E5 01 BB
000010A0  01 00 8B 16 AA 22 CD 3E  26 8B 1E F6 22 CD 3D 1B
000010B0  BA 96 22 CD 3F 5B BB 01  00 8B 16 AA 22 CD 3E 28
000010C0  E9 C1 01 BB 30 25 BA BA  22 CD 3F 61 E9 97 03 BB
000010D0  FF FF CD 3E 32 CD 3F BC  BB 5C 23 CD 3F 6A BB 92
000010E0  22 CD 3F 6E CD 3E 79 CD  3F BC BB D8 23 CD 3F 6E
000010F0  CD 3E 79 CD 3F BC BB 6A  25 CD 3F 6E CD 3E 79 BB
00001100  05 00 CD 3E 42 BB 01 00  CD 3E 42 33 DB CD 3E 44
00001110  CD 3F BC BB 7A 25 CD 3F  6A BB B6 22 CD 3F 6E CD
00001120  3E 79 BB 05 00 CD 3E 42  BB 32 00 CD 3E 42 33 DB
00001130  CD 3E 44 CD 3F BC BB 8E  22 CD 3F 6A BB 68 23 CD
00001140  3F 6A CD 3E 79 BB 03 00  CD 3E 42 BB 0E 00 CD 3E
00001150  42 33 DB CD 3E 44 33 DB  CD 3E 33 BB 07 00 CD 3E
00001160  35 CD 3F BC BB 1E 00 CD  3D 0D CD 3F 6A CD 3E 79
00001170  BB 07 00 CD 3E 33 33 DB  CD 3E 35 BB 03 00 CD 3E
00001180  42 BB 0E 00 CD 3E 42 33  DB CD 3E 44 BB 80 23 CD
00001190  3F B5 02 BB B2 22 CD 3F  5A BB B2 22 CD 3F BA 83
000011A0  FB 1E 7E 03 E9 28 FF BB  05 00 CD 3E 42 BB 32 00
000011B0  CD 3E 42 33 DB CD 3E 44  CD 3F BC BB 14 00 CD 3D
000011C0  0D CD 3F 6A CD 3E 79 BB  03 00 CD 3E 42 BB 0E 00
000011D0  CD 3E 42 33 DB CD 3E 44  CD 3F BC BB B2 22 CD 3F
000011E0  6A BB 1E 00 CD 3D 0D CD  3F 6A CD 3E 79 CD 3F BC
000011F0  BB D8 23 CD 3F 6E CD 3E  79 CD 3F BC BB D8 23 CD
00001200  3F 6E CD 3E 79 BB 8E 25  BA BA 22 CD 3F 61 E8 17
00001210  0E BB 64 24 B8 BA 22 CD  3F 62 75 03 E9 B0 FE BB
00001220  01 00 CD 3E 21 BB 84 23  CD 3E 1F BB 01 00 BA 8A
00001230  23 B9 30 00 CD 3E 1E BB  01 00 CD 3F B3 BB 96 22
00001240  BA 02 00 CD 3F B4 BB 9A  22 CD 3F B4 BB 9E 22 BA
00001250  08 00 CD 3F B4 BB A2 22  BA 1E 00 CD 3F B4 BB A6
00001260  22 BA 03 00 CD 3F B4 BB  01 00 8B 16 AA 22 CD 3E
00001270  26 BB B2 22 BA A2 22 CD  3F 5B BB 01 00 8B 16 AA
00001280  22 CD 3E 28 BB 01 00 CD  3E 21 BB B8 25 BA BA 22
00001290  CD 3F 61 E9 D0 01 BB FF  FF CD 3E 32 CD 3F BC BB
000012A0  CC 23 CD 3F 6A BB 92 22  CD 3F 6E CD 3E 79 CD 3F
000012B0  BC BB D8 23 CD 3F 6E CD  3E 79 CD 3F BC BB DE 23
000012C0  CD 3F 6A BB B2 22 CD 3F  6E CD 3E 79 BB 05 00 CD
000012D0  3E 42 BB 01 00 CD 3E 42  33 DB CD 3E 44 CD 3F BC
000012E0  BB F2 25 CD 3F 6E CD 3E  79 BB 05 00 CD 3E 42 BB
000012F0  32 00 CD 3E 42 33 DB CD  3E 44 CD 3F BC BB 8E 22
00001300  CD 3F 6A BB 68 23 CD 3F  6A CD 3E 79 BB 05 00 CD
00001310  3E 42 BB 12 00 CD 3E 42  33 DB CD 3E 44 33 DB CD
00001320  3E 33 BB 07 00 CD 3E 35  CD 3F BC BB 03 00 CD 3D
00001330  0D CD 3F 6A CD 3E 79 BB  07 00 CD 3E 33 33 DB CD
00001340  3E 35 BB 05 00 CD 3E 42  BB 12 00 CD 3E 42 33 DB
00001350  CD 3E 44 BB 80 23 CD 3F  B5 02 BB B6 22 CD 3F 5A
00001360  BB B6 22 CD 3F BA 83 FB  03 7E 03 E9 28 FF BB 05
00001370  00 CD 3E 42 BB 32 00 CD  3E 42 33 DB CD 3E 44 CD
00001380  3F BC BB 14 00 CD 3D 0D  CD 3F 6A CD 3E 79 BB 05
00001390  00 CD 3E 42 BB 12 00 CD  3E 42 33 DB CD 3E 44 CD
000013A0  3F BC BB B6 22 CD 3F 6A  BB 1E 00 CD 3D 0D CD 3F
000013B0  6A CD 3E 79 CD 3F BC BB  D8 23 CD 3F 6E CD 3E 79
000013C0  CD 3F BC BB D8 23 CD 3F  6E CD 3E 79 BB 06 26 BA
000013D0  BA 22 CD 3F 61 E8 50 0C  BB 64 24 B8 BA 22 CD 3F
000013E0  62 75 03 E9 B0 FE BB 01  00 CD 3E 21 BB 84 23 CD
000013F0  3E 1F BB 01 00 BA 8A 23  B9 30 00 CD 3E 1E BB 01
00001400  00 CD 3F B3 BB 96 22 BA  02 00 CD 3F B4 BB 9A 22
00001410  CD 3F B4 BB 9E 22 BA 08  00 CD 3F B4 BB A2 22 BA
00001420  1E 00 CD 3F B4 BB A6 22  BA 03 00 CD 3F B4 BB 01
00001430  00 8B 16 AA 22 CD 3E 26  BB B6 22 BA A6 22 CD 3F
00001440  5B BB 01 00 8B 16 AA 22  CD 3E 28 BB 01 00 CD 3E
00001450  21 BB 2C 26 BA BA 22 CD  3F 61 E9 09 00 BB 6E 26
00001460  BA BA 22 CD 3F 61 E8 B9  0B BB 94 26 B8 BA 22 CD
00001470  3F 62 75 03 E9 5D EE E9  4B EE BB FF FF CD 3E 32
00001480  CD 3F BC BB 5C 23 CD 3F  6E CD 3E 79 BB 05 00 CD
00001490  3E 42 BB 32 00 CD 3E 42  33 DB CD 3E 44 CD 3F BC
000014A0  BB 8E 22 CD 3F 6A BB 68  23 CD 3F 6A CD 3E 79 BB
000014B0  01 00 CD 3E 42 BB 08 00  CD 3E 42 33 DB CD 3E 44
000014C0  33 DB CD 3E 33 BB 07 00  CD 3E 35 CD 3F BC BB 74
000014D0  23 CD 3F 6A CD 3E 79 BB  01 00 CD 3E 42 BB 08 00
000014E0  CD 3E 42 33 DB CD 3E 44  BB 07 00 CD 3E 33 33 DB
```

```
00001990  B4 BB 01 00 8B 16 AA 22  CD 3E 26 BB 96 22 CD 3D
000019A0  18 93 A3 F4 22 BB 9A 22  CD 3D 18 93 A3 AC 22 BB
000019B0  01 00 8B 16 F4 22 CD 3E  26 8B 1E AC 22 CD 3D 1B
000019C0  BA 9A 22 CD 3F 5B BB 01  00 8B 16 F4 22 CD 3E 28
000019D0  83 3E AC 22 00 7F 03 E9  21 00 BB 01 00 8B 16 AC
000019E0  22 CD 3E 26 8B 1E F4 22  CD 3D 1B BA 96 22 CD 3F
000019F0  5B BB 01 00 8B 16 AC 22  CD 3E 28 BB 01 00 BA 01
00001A00  00 CD 3E 26 BB 96 22 CD  3D 18 93 A3 C2 22 8B 1E
00001A10  AA 22 CD 3D 1B BA 96 22  CD 3F 5B BB 01 00 BA 01
00001A20  00 CD 3E 28 33 DB CD 3D  1B BA 96 22 CD 3F 5B 8B
00001A30  1E C2 22 CD 3D 1B BA 9A  22 CD 3F 5B BB EC 24 BA
00001A40  9E 22 CD 3F 5B BB D8 23  BA A2 22 CD 3F 5B BB 01
00001A50  00 8B 16 AA 22 CD 3E 28  BB 92 22 B8 5C 23 CD 3F
00001A60  55 93 BB 12 28 CD 3F 55  BA BA 22 CD 3F 61 E8 B1
00001A70  05 BB 94 26 B8 BA 22 CD  3F 62 75 03 E9 FB F9 E9
00001A80  43 E8 BB FF FF CD 3E 32  CD 3F BC BB 5C 23 CD 3F
00001A90  6E CD 3E 79 BB 05 00 CD  3E 42 BB 32 00 CD 3E 42
00001AA0  33 DB CD 3E 44 CD 3F BC  BB 8E 22 CD 3F 6A BB 68
00001AB0  23 CD 3F 6A CD 3E 79 BB  01 00 CD 3E 42 BB 08 00
00001AC0  CD 3E 42 33 DB CD 3E 44  33 DB CD 3E 33 BB 07 00
00001AD0  CD 3E 35 CD 3F BC BB 74  23 CD 3F 6A CD 3E 79 BB
00001AE0  01 00 CD 3E 42 BB 08 00  CD 3E 42 33 DB CD 3E 44
00001AF0  BB 07 00 CD 3E 33 33 DB  CD 3E 35 BB 80 23 CD 3F
00001B00  B5 02 BB 92 22 CD 3F 5A  BB 92 22 CD 3F BA 83 FB
00001B10  08 7E 03 E9 6C FF BB FF  FF CD 3E 32 CD 3F BC BB
00001B20  5C 23 CD 3F 6A BB 92 22  CD 3F 6E CD 3E 79 CD 3F
00001B30  BC BB D8 23 CD 3F 6E CD  3E 79 CD 3F BC BB 6A 25
00001B40  CD 3F 6E CD 3E 79 BB 05  00 CD 3E 42 BB 32 00 CD
00001B50  3E 42 33 DB CD 3E 44 CD  3F BC BB 8E 22 CD 3F 6A
00001B60  BB 68 23 CD 3F 6A CD 3E  79 BB 03 00 CD 3E 42 BB
00001B70  0E 00 CD 3E 42 33 DB CD  3E 44 33 DB CD 3E 33 BB
00001B80  07 00 CD 3E 35 CD 3F BC  BB 1E 00 CD 3D 0D CD 3F
00001B90  6A CD 3E 79 BB 07 00 CD  3E 33 33 DB CD 3E 35 BB
00001BA0  03 00 CD 3E 42 BB 0E 00  CD 3E 42 33 DB CD 3E 44
00001BB0  BB 80 23 CD 3F B5 02 BB  B2 22 CD 3F 5A BB B2 22
00001BC0  CD 3F BA 83 FB 1E 7E 03  E9 4B FF BB FF FF CD 3E
00001BD0  32 CD 3F BC BB 5C 23 CD  3F 6A BB 92 22 CD 3F 6E
00001BE0  CD 3E 79 CD 3F BC BB D8  23 CD 3F 6E CD 3E 79 CD
00001BF0  3F BC BB 3A 28 CD 3F 6A  BB B2 22 CD 3F 6E CD 3E
00001C00  79 CD 3F BC BB D8 23 CD  3F 6E CD 3E 79 CD 3F BC
00001C10  BB 4C 28 CD 3F 6E CD 3E  79 BB 05 00 CD 3E 42 BB
00001C20  32 00 CD 3E 42 33 DB CD  3E 44 CD 3F BC BB 8E 22
00001C30  CD 3F 6A BB 68 23 CD 3F  6A CD 3E 79 BB 05 00 CD
00001C40  3E 42 BB 12 00 CD 3E 42  33 DB CD 3E 44 33 DB CD
00001C50  3E 33 BB 07 00 CD 3E 35  CD 3F BC BB 03 00 CD 3D
00001C60  0D CD 3F 6A CD 3E 79 BB  07 00 CD 3E 33 33 DB CD
00001C70  3E 35 BB 05 00 CD 3E 42  BB 12 00 CD 3E 42 33 DB
00001C80  CD 3E 44 BB 80 23 CD 3F  B5 02 BB B6 22 CD 3F 5A
00001C90  BB B6 22 CD 3F BA 83 FB  03 7E 03 E9 2D FF BB 05
00001CA0  00 CD 3E 42 BB 32 00 CD  3E 42 33 DB CD 3E 44 CD
00001CB0  3F BC BB 14 00 CD 3D 0D  CD 3F 6A CD 3E 79 BB 05
00001CC0  00 CD 3E 42 BB 12 00 CD  3E 42 33 DB CD 3E 44 CD
00001CD0  3F BC BB B6 22 CD 3F 6A  BB 1E 00 CD 3D 0D CD 3F
00001CE0  6E CD 3E 79 BB 60 28 BA  BA 22 CD 3F 61 BB 0A 00
00001CF0  CD 3E 42 CD 3E 42 33 DB  CD 3E 44 E8 2A 03 BB 94
00001D00  26 B8 BA 22 CD 3F 62 75  03 E9 26 00 BB 76 28 BA
00001D10  BA 22 CD 3F 61 E8 0A 03  BB 94 26 B8 BA 22 CD 3F
00001D20  62 75 03 E9 5C FD BB 9A  28 BA BA 22 CD 3F 61 E9
00001D30  DC 02 BB 01 00 CD 3E 21  BB 84 23 CD 3E 1F BB 01
00001D40  00 BA 8A 23 B9 30 00 CD  3E 1E BB 01 00 CD 3F B3
00001D50  BB 96 22 BA 02 00 CD 3F  B4 BB 9A 22 CD 3F B4 BB
00001D60  9E 22 BA 08 00 CD 3F B4  BB A2 22 BA 1E 00 CD 3F
00001D70  B4 BB A6 22 BA 03 00 CD  3F B4 BB 01 00 CD 3D 31
00001D80  CD 3F AA 76 03 E9 67 00  33 DB CD 3D 1B BA 96 22
00001D90  CD 3F 5B BB 02 00 CD 3D  1B BA 9A 22 CD 3F 5B BB
00001DA0  4E 23 BA 9E 22 CD 3F 5B  BB 01 00 BA 01 00 CD 3E
00001DB0  28 BB 01 00 CD 3D 1B BA  96 22 CD 3F 5B 33 DB CD
00001DC0  3D 1B BA 9A 22 CD 3F 5B  BB 92 22 BA 9E 22 CD 3F
00001DD0  5B BB B2 22 BA A2 22 CD  3F 5B BB B6 22 BA A6 22
00001DE0  CD 3F 5B BB 01 00 BA 02  00 CD 3E 28 E9 10 02 BB
00001DF0  FF FF CD 3E 32 CD 3F BC  BB C0 24 CD 3F 6E CD 3E
00001E00  79 C7 06 14 23 00 00 BB  01 00 BA 01 00 CD 3E 26
00001E10  BB 96 22 CD 3D 18 93 A3  C2 22 BB 9A 22 CD 3D 18
00001E20  93 A3 AA 22 BB 9E 22 CD  3D 13 CD 3F 78 93 A3 C0
```

```
00001E30  22 83 3E C2 22 00 7F 03  E9 14 00 BB 01 00 8B 16
00001E40  C2 22 CD 3E 26 BB 9A 22  CD 3D 18 93 A3 14 23 BB
00001E50  01 00 8B 16 AA 22 CD 3E  26 BB 96 22 CD 3D 18 93
00001E60  A3 F4 22 BB 9A 22 CD 3D  18 93 A3 AC 22 BB 98 23
00001E70  B8 9E 22 CD 3F 55 BA AE  22 CD 3F 61 BB AE 22 BA
00001E80  98 23 8B CB CD 3D 09 4B  87 D9 8B D1 8B C3 CD 3D
00001E90  0B 92 CD 3F 61 BB 92 22  B8 AE 22 CD 3F 62 74 03
00001EA0  E9 12 00 BB F6 24 B8 92  22 CD 3F 55 BA BA 22 CD
00001EB0  3F 61 E9 59 01 BB 92 22  B8 AE 22 CD 3F 62 BA 00
00001EC0  00 73 01 4A 83 3E AC 22  00 BB 00 00 7E 01 4B 23
00001ED0  DA 23 DB 75 03 E9 09 00  A1 AC 22 A3 AA 22 E9 6E
00001EE0  FF BB 92 22 B8 AE 22 CD  3F 62 BA 00 00 73 01 4A
00001EF0  83 3E AC 22 00 BB 00 00  75 01 4B 23 DA 23 DB 75
00001F00  03 E9 0C 00 A1 AA 22 A3  F4 22 C7 06 AA 22 00 00
00001F10  83 3E C2 22 00 7F 03 E9  09 00 A1 C2 22 A3 F6 22
00001F20  E9 07 00 A1 C0 22 40 A3  F6 22 8B 1E F4 22 CD 3D
00001F30  1B BA 96 22 CD 3F 5B 8B  1E AA 22 CD 3D 1B BA 9A
00001F40  22 CD 3F 5B BB 92 22 BA  9E 22 CD 3F 5B BB B2 22
00001F50  BA A2 22 CD 3F 5B BB B6  22 BA A6 22 CD 3F 5B BB
00001F60  01 00 8B 16 F6 22 CD 3E  28 BB 01 00 8B 16 F4 22
00001F70  CD 3E 26 8B 1E F6 22 CD  3D 1B BA 9A 22 CD 3F 5B
00001F80  BB 01 00 8B 16 F4 22 CD  3E 28 83 3E AA 22 00 7F
00001F90  03 E9 21 00 BB 01 00 8B  16 AA 22 CD 3E 26 8B 1E
00001FA0  F6 22 CD 3D 1B BA 96 22  CD 3F 5B BB 01 00 8B 16
00001FB0  AA 22 CD 3E 28 BB 01 00  BA 01 00 CD 3E 26 A1 C0
00001FC0  22 3B 06 F6 22 7C 03 E9  1F 00 A1 F6 22 A3 C0 22
00001FD0  8B 1E C0 22 CD 3D 10 BA  9E 22 CD 3F 5B BB 01 00
00001FE0  BA 01 00 CD 3E 28 E9 16  00 8B 1E 14 23 CD 3D 1B
00001FF0  BA 96 22 CD 3F 5B BB 01  00 BA 01 00 CD 3E 28 BB
00002000  01 00 CD 3E 21 BB C0 28  BA BA 22 CD 3F 61 E8 11
00002010  00 BB 94 26 B8 BA 22 CD  3F 62 75 03 E9 63 FA E9
00002020  A3 E2 BB FF FF CD 3E 32  BB FC 28 B8 BA 22 CD 3F
00002030  55 BA 16 23 CD 3F 61 CD  3D 25 93 A3 0C 23 33 DB
00002040  CD 3D 21 93 A3 12 23 CD  3F BC BB 16 23 CD 3F 6A
00002050  CD 3E 79 BB 80 23 CD 3F  B5 03 CD 3F B7 01 04 BB
00002060  BA 22 CD 3F B8 BB 0A 29  B8 BA 22 CD 3F 62 74 03
00002070  E9 07 00 92 BB 94 26 CD  3F 61 BB 10 29 B8 BA 22
00002080  CD 3F 62 74 03 E9 07 00  92 BB 64 24 CD 3F 61 BB
00002090  94 26 B8 BA 22 CD 3F 62  BA 00 00 75 01 4A BB 64
000020A0  24 CD 3F 62 B9 00 00 75  01 49 0B CA 23 C9 74 03
000020B0  E9 40 00 8B 1E 0C 23 CD  3E 42 8B 1E 12 23 CD 3E
000020C0  42 33 DB CD 3E 44 CD 3E  2B CD 3F BC BB BA 22 CD
000020D0  3F BA 43 43 CD 3D 0D CD  3F 6A CD 3E 79 8B 1E 0C
000020E0  23 CD 3E 42 8B 1E 12 23  CD 3E 42 33 DB CD 3E 44
000020F0  E9 60 FF 8B 1E 0C 23 CD  3E 42 8B 1E 12 23 CD 3E
00002100  42 33 DB CD 3E 44 CD 3F  BC BB 16 23 CD 3F BA 43
00002110  43 43 CD 3D 0D CD 3F 6A  CD 3E 79 C3 90 90 90 CD
00002120  3E 02 00 00 00 00 00 00  00 00 00 00 00 00 00 00
00002130  CD 3F FF CB CD 3F FE CB  CD 3F FD CB CD 3F FC CB
00002140  51 F3 A5 59 D1 E1 8E DA  8B 2E C6 13 8B C5 2B C2
00002150  3D 00 10 72 03 B8 00 10  8B D1 81 C2 00 03 72 0C
00002160  B1 04 D3 E0 0B C0 74 28  3B C2 73 24 BA 4A 00 0E
00002170  1F B4 09 CD 21 53 33 C0  50 CB 0D 0A 50 72 6F 67
00002180  72 61 6D 20 74 6F 6F 20  6C 61 72 67 65 0D 0A 24
00002190  5E 5F 1E 17 8B E2 57 56  8B CA 92 83 06 C4 13 07
000021A0  FF 2E C4 13 B0 04 BF B0  05 A2 1F 00 C7 06 35 00
000021B0  89 00 C7 06 37 00 F3 01  CB CB 5F 5E 5B 56 57 FF
000021C0  36 00 00 FF 37 CB 00 00  00 00 00 00 00 00 00 00
000021D0  01 00 34 23 69 88 0D 00  3A 23 64 3A 70 72 6F 67
000021E0  72 61 6D 2E 64 61 74 00  01 00 4C 23 38 00 01 00
000021F0  52 23 32 00 04 00 58 23  4D 41 49 4E 07 00 60 23
00002200  50 61 72 74 20 23 20 00  08 00 6C 23 20 3D 20 45
00002210  6E 74 65 72 08 00 78 23  20 20 20 20 20 20 20 20
00002220  00 00 84 23 01 00 88 23  72 40 09 00 8E 23 42 50
00002230  41 52 54 2E 44 41 54 80  02 00 9C 23 20 20 2A 00
00002240  A2 23 20 64 6F 65 73 20  6E 6F 74 20 65 78 69 73
00002250  74 2E 44 6F 20 79 6F 75  20 77 69 73 68 20 74 6F
00002260  20 74 72 79 20 61 6E 6F  74 68 65 72 08 00 D0 23
00002270  20 50 61 72 74 20 23 20  01 00 DC 23 20 00 0E 00
00002280  E2 23 20 44 65 73 63 72  69 70 74 69 6F 6E 3A 20
00002290  11 00 F4 23 20 53 74 6F  63 6B 20 4C 6F 63 61 74
000022A0  69 6F 6E 3A 20 00 05 00  0A 24 20 45 58 49 54 00
000022B0  05 00 14 24 4D 6F 76 65  20 00 05 00 1E 24 20 3D
000022C0  20 55 70 00 07 00 28 24  20 3D 20 44 6F 77 6E 00
```

| | | | | | | | | | | | | | | | | |
|---|---|---|---|---|---|---|---|---|---|---|---|---|---|---|---|---|
| 000022D0 | 09 | 00 | 34 | 24 | 20 | 3D | 20 | 53 | 65 | 6C | 65 | 63 | 74 | 00 | 21 | 00 |
| 000022E0 | 42 | 24 | 49 | 73 | 20 | 74 | 68 | 65 | 20 | 70 | 61 | 72 | 74 | 20 | 6E | 75 |
| 000022F0 | 6D | 62 | 65 | 72 | 20 | 63 | 68 | 61 | 6E | 67 | 65 | 20 | 63 | 6F | 72 | 72 |
| 00002300 | 65 | 63 | 74 | 00 | 01 | 00 | 68 | 24 | 4E | 02 | 1E | 00 | 6E | 24 | 20 | 50 |
| 00002310 | 41 | 52 | 54 | 20 | 41 | 4C | 52 | 45 | 41 | 44 | 59 | 20 | 45 | 58 | 49 | 53 |
| 00002320 | 54 | 53 | 2E | 20 | 43 | 6F | 6E | 74 | 69 | 6E | 75 | 65 | 30 | 00 | 90 | 24 |
| 00002330 | 44 | 6F | 20 | 79 | 6F | 75 | 20 | 77 | 69 | 73 | 68 | 20 | 74 | 6F | 20 | 63 |
| 00002340 | 68 | 61 | 6E | 67 | 65 | 20 | 61 | 6C | 6C | 20 | 6B | 69 | 74 | 73 | 20 | 75 |
| 00002350 | 73 | 69 | 6E | 67 | 20 | 74 | 68 | 69 | 73 | 20 | 70 | 61 | 72 | 74 | 20 | 23 |
| 00002360 | 0E | 00 | C4 | 24 | 50 | 4C | 45 | 41 | 53 | 45 | 20 | 53 | 54 | 41 | 4E | 44 |
| 00002370 | 42 | 59 | 01 | 00 | D6 | 24 | 52 | 1C | 08 | 00 | DC | 24 | 4B | 49 | 54 | 41 |
| 00002380 | 2E | 44 | 41 | 54 | 00 | 00 | 00 | 00 | 00 | 00 | 00 | 79 | 01 | 00 | F0 | 24 |
| 00002390 | 2A | 00 | 00 | 00 | 00 | 80 | 36 | 00 | FA | 24 | 20 | 50 | 61 | 72 | 74 | 20 |
| 000023A0 | 61 | 6C | 72 | 65 | 61 | 64 | 79 | 20 | 65 | 78 | 69 | 73 | 74 | 73 | 2E | 20 |
| 000023B0 | 41 | 72 | 65 | 20 | 74 | 68 | 65 | 72 | 65 | 20 | 61 | 6E | 79 | 20 | 6F | 74 |
| 000023C0 | 68 | 65 | 72 | 20 | 70 | 61 | 72 | 74 | 73 | 20 | 74 | 6F | 20 | 61 | 64 | 64 |
| 000023D0 | 36 | 00 | 34 | 25 | 50 | 61 | 72 | 74 | 20 | 6E | 75 | 6D | 62 | 65 | 72 | 20 |
| 000023E0 | 6E | 6F | 74 | 20 | 63 | 68 | 61 | 6E | 67 | 65 | 64 | 2E | 41 | 72 | 65 | 20 |
| 000023F0 | 74 | 68 | 65 | 72 | 65 | 20 | 61 | 6E | 79 | 20 | 6F | 74 | 68 | 65 | 72 | 73 |
| 00002400 | 20 | 74 | 6F | 20 | 63 | 68 | 61 | 6E | 67 | 65 | 0C | 00 | 6E | 25 | 44 | 65 |
| 00002410 | 73 | 63 | 72 | 69 | 70 | 74 | 69 | 6F | 6E | 3A | 10 | 00 | 7E | 25 | 53 | 74 |
| 00002420 | 6F | 63 | 6B | 20 | 4C | 6F | 63 | 61 | 74 | 69 | 6F | 6E | 3A | 20 | 26 | 00 |
| 00002430 | 92 | 25 | 49 | 73 | 20 | 74 | 68 | 65 | 20 | 70 | 61 | 72 | 74 | 20 | 64 | 65 |
| 00002440 | 73 | 63 | 72 | 69 | 70 | 74 | 69 | 6F | 6E | 20 | 63 | 68 | 61 | 6E | 67 | 65 |
| 00002450 | 20 | 43 | 6F | 72 | 72 | 65 | 63 | 74 | 36 | 00 | BC | 25 | 50 | 61 | 72 | 74 |
| 00002460 | 20 | 63 | 68 | 61 | 6E | 67 | 65 | 20 | 73 | 75 | 63 | 63 | 65 | 73 | 73 | 66 |
| 00002470 | 75 | 6C | 2E | 20 | 41 | 72 | 65 | 20 | 74 | 68 | 65 | 72 | 65 | 20 | 61 | 6E |
| 00002480 | 79 | 20 | 6F | 74 | 68 | 65 | 72 | 73 | 20 | 74 | 6F | 20 | 63 | 68 | 61 | 6E |
| 00002490 | 67 | 65 | 10 | 00 | F6 | 25 | 20 | 53 | 74 | 6F | 63 | 6B | 20 | 4C | 6F | 63 |
| 000024A0 | 61 | 74 | 69 | 6F | 6E | 3A | 22 | 00 | 0A | 26 | 49 | 73 | 20 | 74 | 68 | 65 |
| 000024B0 | 20 | 50 | 61 | 72 | 74 | 20 | 53 | 74 | 6F | 63 | 6B | 20 | 4C | 6F | 63 | 61 |
| 000024C0 | 74 | 69 | 6F | 6E | 20 | 43 | 6F | 72 | 72 | 65 | 63 | 74 | 3E | 00 | 30 | 26 |
| 000024D0 | 50 | 61 | 72 | 74 | 20 | 53 | 74 | 6F | 63 | 6B | 20 | 4C | 6F | 63 | 61 | 74 |
| 000024E0 | 69 | 6F | 6E | 20 | 73 | 75 | 63 | 63 | 65 | 73 | 73 | 66 | 75 | 6C | 2E | 20 |
| 000024F0 | 41 | 72 | 65 | 20 | 74 | 68 | 65 | 72 | 65 | 20 | 61 | 6E | 79 | 20 | 6F | 74 |
| 00002500 | 68 | 65 | 72 | 73 | 20 | 74 | 6F | 20 | 63 | 68 | 61 | 6E | 67 | 65 | 22 | 00 |
| 00002510 | 72 | 26 | 41 | 72 | 65 | 20 | 74 | 68 | 65 | 72 | 65 | 20 | 61 | 6E | 79 | 20 |
| 00002520 | 6D | 6F | 72 | 65 | 20 | 70 | 61 | 72 | 74 | 73 | 20 | 74 | 6F | 20 | 63 | 68 |
| 00002530 | 61 | 6E | 67 | 65 | 01 | 00 | 98 | 26 | 59 | 00 | 28 | 00 | 9E | 26 | 20 | 64 |
| 00002540 | 6F | 65 | 73 | 20 | 6E | 6F | 74 | 20 | 65 | 78 | 69 | 73 | 74 | 2E | 20 | 44 |
| 00002550 | 6F | 20 | 79 | 6F | 75 | 20 | 77 | 69 | 73 | 68 | 20 | 74 | 6F | 20 | 63 | 6F |
| 00002560 | 6E | 74 | 69 | 6E | 75 | 65 | 2A | 00 | CA | 26 | 50 | 6C | 65 | 61 | 73 | 65 |
| 00002570 | 20 | 53 | 74 | 61 | 6E | 64 | 62 | 79 | 20 | 2D | 20 | 53 | 65 | 61 | 72 | 63 |
| 00002580 | 68 | 69 | 6E | 67 | 20 | 66 | 6F | 72 | 20 | 55 | 73 | 65 | 20 | 6F | 66 | 20 |
| 00002590 | 50 | 61 | 72 | 74 | 27 | 00 | F8 | 26 | 54 | 48 | 49 | 53 | 20 | 50 | 41 | 52 |
| 000025A0 | 54 | 20 | 49 | 53 | 20 | 41 | 53 | 53 | 49 | 47 | 4E | 45 | 44 | 20 | 54 | 4F |
| 000025B0 | 20 | 41 | 20 | 4B | 49 | 54 | 20 | 2D | 20 | 4B | 69 | 74 | 20 | 23 | 20 | 00 |
| 000025C0 | 03 | 00 | 24 | 27 | 20 | 20 | 20 | 00 | 2F | 00 | 2C | 27 | 4D | 75 | 73 | 74 |
| 000025D0 | 20 | 72 | 65 | 6D | 6F | 76 | 65 | 20 | 66 | 72 | 6F | 6D | 20 | 4B | 69 | 74 |
| 000025E0 | 20 | 66 | 69 | 72 | 73 | 74 | 2E | 20 | 53 | 65 | 6C | 65 | 63 | 74 | 20 | 61 |
| 000025F0 | 6E | 6F | 74 | 68 | 65 | 72 | 20 | 70 | 61 | 72 | 74 | 00 | 09 | 00 | 60 | 27 |
| 00002600 | 57 | 41 | 4C | 4C | 43 | 2E | 44 | 41 | 54 | D0 | 1F | 00 | 6E | 27 | 54 | 48 |
| 00002610 | 49 | 53 | 20 | 50 | 41 | 52 | 54 | 20 | 49 | 53 | 20 | 41 | 53 | 53 | 49 | 47 |
| 00002620 | 4E | 45 | 44 | 20 | 54 | 4F | 20 | 43 | 45 | 4C | 4C | 20 | 23 | EB | 0E | 00 |
| 00002630 | 92 | 27 | 20 | 2D | 50 | 4F | 53 | 49 | 54 | 49 | 4F | 4E | 20 | 23 | 20 | 59 |
| 00002640 | 03 | 00 | A4 | 27 | 20 | 2D | 58 | 00 | 2F | 00 | AC | 27 | 4D | 75 | 73 | 74 |
| 00002650 | 20 | 72 | 65 | 6D | 6F | 76 | 65 | 20 | 66 | 72 | 6F | 6D | 20 | 42 | 69 | 6E |
| 00002660 | 20 | 66 | 69 | 72 | 73 | 74 | 2E | 20 | 53 | 65 | 6C | 65 | 63 | 74 | 20 | 61 |
| 00002670 | 6E | 6F | 74 | 68 | 65 | 72 | 20 | 70 | 61 | 72 | 74 | 00 | 31 | 00 | E0 | 27 |
| 00002680 | 41 | 52 | 45 | 20 | 59 | 4F | 55 | 20 | 53 | 55 | 52 | 45 | 20 | 54 | 48 | 41 |
| 00002690 | 54 | 20 | 59 | 4F | 55 | 20 | 57 | 41 | 4E | 54 | 20 | 54 | 4F | 20 | 44 | 45 |
| 000026A0 | 4C | 45 | 54 | 45 | 20 | 54 | 48 | 49 | 53 | 20 | 50 | 41 | 52 | 54 | 21 | 21 |
| 000026B0 | 21 | 00 | 24 | 00 | 16 | 28 | 20 | 64 | 65 | 6C | 65 | 74 | 65 | 64 | 2E | 20 |
| 000026C0 | 41 | 72 | 65 | 20 | 74 | 68 | 65 | 72 | 65 | 20 | 6F | 74 | 68 | 65 | 72 | 73 |
| 000026D0 | 20 | 74 | 6F | 20 | 64 | 65 | 6C | 65 | 74 | 65 | 0D | 00 | 3E | 28 | 44 | 65 |
| 000026E0 | 73 | 63 | 72 | 69 | 70 | 74 | 69 | 6F | 6E | 3A | 20 | 00 | 0F | 00 | 50 | 28 |
| 000026F0 | 53 | 74 | 6F | 63 | 6B | 20 | 4C | 6F | 63 | 61 | 74 | 69 | 6F | 6E | 3A | 00 |
| 00002700 | 11 | 00 | 64 | 28 | 54 | 4F | 20 | 43 | 4F | 4E | 54 | 49 | 4E | 55 | 45 | 20 |
| 00002710 | 45 | 4E | 54 | 45 | 52 | 00 | 20 | 00 | 7A | 28 | 44 | 6F | 20 | 79 | 6F | 75 |
| 00002720 | 20 | 77 | 69 | 73 | 68 | 20 | 74 | 6F | 20 | 61 | 64 | 64 | 20 | 61 | 20 | 70 |
| 00002730 | 61 | 72 | 74 | 20 | 6D | 61 | 73 | 74 | 65 | 72 | 22 | 00 | 9E | 28 | 41 | 72 |
| 00002740 | 65 | 20 | 74 | 68 | 65 | 72 | 65 | 20 | 61 | 6E | 79 | 20 | 6D | 6F | 72 | 65 |
| 00002750 | 20 | 70 | 61 | 72 | 74 | 20 | 23 | 27 | 73 | 20 | 74 | 6F | 20 | 61 | 64 | 64 |
| 00002760 | 37 | 00 | C4 | 28 | 53 | 75 | 63 | 63 | 65 | 73 | 73 | 66 | 75 | 6C | 20 | 70 |

```
00002770  61 72 74 20 61 64 64 2E  20 41 72 65 20 74 68 65
00002780  72 65 20 61 6E 79 20 6D  6F 72 65 20 70 61 72 74
00002790  20 23 27 73 20 74 6F 20  61 64 64 00 09 00 00 29
000027A0  2D 20 59 20 6F 72 20 4E  20 00 01 00 0E 29 79 00
000027B0  01 00 14 29 6E 00 00 00  00 00 00 00 00 00 00 00
000027C0  1C 1F 20 31 2C 31 30 2C  34 2C 31 2C 39 2C 34 2C
000027D0  31 2C 36 2C 34 2C 31 2C  36 2C 34 2C 31 2C 34 2C
000027E0  34 2C 31 2C 33 2C 33 2C  31 2C 33 2C 33 2C 31 2C
000027F0  31 35 2C 35 2C 31 2C 31  32 2C 34 2C 31 2C 31 32
00002800  2C 34 2C 31 2C 36 2C 34  00 1D 1F 20 31 2C 31 32
00002810  2C 34 2C 31 2C 36 2C 34  2C 31 2C 36 2C 33 2C 31
00002820  2C 32 30 2C 35 2C 31 2C  31 32 2C 34 2C 31 2C 31
00002830  32 2C 34 2C 31 2C 36 2C  34 2C 31 2C 36 2C 34 2C
00002840  31 2C 36 2C 34 2C 31 2C  36 2C 33 2C 31 2C 32 30
00002850  2C 35 00 1E 1F 20 31 2C  37 2C 34 2C 31 2C 34 2C
00002860  34 2C 31 2C 33 2C 34 2C  31 2C 33 2C 34 2C 31 2C
00002870  32 30 2C 34 2C 31 2C 37  2C 34 2C 31 2C 32 2C 34
00002880  2C 31 2C 32 2C 34 2C 31  2C 37 2C 34 2C 31 2C 32
00002890  30 2C 34 00 FF FF 01 00  00 00 00 00 00 00 00 00
000028A0  59 1F A0 01 00 1E 51 06  3C 6D 74 03 E9 40 02 B4
000028B0  30 CD 21 3C 02 73 03 E9  3A 02 BA A0 02 8E DA 26
000028C0  8B 3E 02 00 26 8B 2E 2C  00 8E C2 57 B0 00 BA 45
000028D0  03 1E 0E 1F B4 3D CD 21  1F 72 03 E9 D8 00 8E C5
000028E0  33 FF B9 05 00 BE 52 03  1E 0E 1F F3 A6 1F 74 13
000028F0  26 8A 05 47 0A C0 75 F8  26 80 3D 00 75 E4 1E 07
00002900  EB 57 90 1E 07 1E 8E DD  8B F7 81 3C 00 20 1F 74
00002910  48 BF CA 13 8B D7 1E 8E  DD AC 3C 3B 74 07 3C 00
00002920  74 03 AA EB F4 1F 8B D8  81 FF CA 13 74 0F 80 7D
00002930  FF 3A 74 09 80 7D FF 5C  74 03 B0 5C AA 56 BE 45
00002940  03 B9 0D 00 90 1E 0E 1F  F3 A4 1F 5E B0 00 B4 3D
00002950  CD 21 73 62 80 FB 3B 74  B8 1E 0E 1F BA 07 03 B4
00002960  09 CD 21 1F C6 06 CA 13  40 BA CA 13 B4 0A CD 21
00002970  1E 0E 1F BA 04 03 B4 09  CD 21 1F B7 00 8A 1E CB
00002980  13 80 BF CB 13 3A 74 0D  80 BF CB 13 5C 74 06 C6
00002990  87 CC 13 5C 43 BA CC 13  8D BF CC 13 BE 45 03 B9
000029A0  0D 00 90 1E 0E 1F F3 A4  1F B0 00 B4 3D CD 21 73
000029B0  05 EB A6 E9 2F 01 5F 8B  D8 BA B0 13 B9 1A 00 B4
000029C0  3F CD 21 72 EE 81 3E B0  13 4D 5A 75 E6 8B 16 B8
000029D0  13 83 C2 1F 81 E2 E0 FF  8B EA B1 04 D3 E2 33 C9
000029E0  B0 00 B4 42 CD 21 72 CB  8B 16 B4 13 4A B1 05 D3
000029F0  E2 2B D5 A1 B2 13 05 0F  00 B1 04 D3 E8 03 D0 89
00002A00  16 B4 13 2B FA 83 EF 14  8C D6 8B D4 83 C2 11 B1
00002A10  04 D3 EA 03 F2 3B FE 73  03 E9 CE 00 8B EF 1E 8E
00002A20  DF B9 FF FF 33 D2 B4 3F  CD 21 1F 72 86 8B 16 C8
00002A30  13 41 B0 00 B4 42 CD 21  72 12 3B 0E B6 13 74 23
00002A40  BA B0 13 B9 04 00 B4 3F  CD 21 73 03 E9 96 00 8B
00002A50  3E B0 13 A1 B2 13 03 C5  8E C0 26 01 2D FF 0E B6
00002A60  13 75 E3 B4 3E CD 21 73  03 EB 7A 90 01 2E C6 13
00002A70  A1 C6 13 8B 1E C4 13 8E  C0 26 80 7F 03 05 75 5F
00002A80  26 80 7F 04 06 75 58 26  80 7F 05 00 72 51 5B 1E
00002A90  07 8E DD B9 D8 09 33 F6  8B FE FC F3 A5 06 1F 1E
00002AA0  B8 FD 01 8E D8 B9 6A 02  2B C8 D1 E1 D1 E1 D1 E1
00002AB0  B8 D3 04 8E C0 33 F6 33  FF F3 A5 1F 8C D1 8C D8
00002AC0  2B C8 81 F9 00 10 76 03  B9 00 10 D1 E1 D1 E1 D1
00002AD0  E1 BA FD 01 8E C2 33 F6  8B FE EA 10 00 F3 01 5B
00002AE0  BA BC 02 EB 12 BA E0 02  EB 0D BA A6 02 EB 08 BA
00002AF0  86 02 EB 03 BA 61 02 0E  1F B4 09 CD 21 33 C0 50
00002B00  CB 0D 0A 4D 75 73 74 20  72 75 6E 20 75 6E 64 65
00002B10  72 20 44 4F 53 20 32 2E  30 30 20 6F 72 20 6C 61
00002B20  74 65 72 0D 0A 24 0D 0A  4D 75 73 74 20 6C 69 6E
00002B30  6B 20 77 69 74 68 20 42  41 53 43 4F 4D 32 30 2E
00002B40  4C 49 42 0D 0A 24 0D 0A  50 72 6F 67 72 61 6D 20
00002B50  74 6F 6F 20 6C 61 72 67  65 0D 0A 24 0D 0A 57 72
00002B60  6F 6E 67 20 76 65 72 73  69 6F 6E 20 6F 66 20 72
00002B70  75 6E 74 69 6D 65 20 6D  6F 64 75 6C 65 0D 0A 24
00002B80  0D 0A 45 72 72 6F 72 20  69 6E 20 45 58 45 20 66
00002B90  69 6C 65 0D 0A 24 0D 0A  43 61 6E 6E 6F 74 20 66
00002BA0  69 6E 64 20 0D 0A 24 0D  0A 43 61 6E 6E 6F 74 20
00002BB0  66 69 6E 64 20 42 41 53  52 55 4E 32 30 2E 45 58
00002BC0  45 0D 0A 45 6E 74 65 72  20 6E 65 77 20 70 61 74
00002BD0  68 20 73 70 65 63 69 66  69 63 61 74 69 6F 6E 3A
00002BE0  20 24 0D 0A 24 42 41 53  52 55 4E 32 30 2E 45 58
00002BF0  45 00 50 41 54 48 3D
```

```
00000000  4D 5A B7 01 18 00 0C 00  20 00 28 02 FF FF E3 04
00000010  00 02 3B 4D 30 00 00 00  1E 00 00 00 01 00 12 00
00000020  00 00 14 00 00 00 16 00  00 00 33 00 00 00 38 00
00000030  00 00 86 00 0E 02 1B 00  A6 02 01 02 A6 02 06 02
00000040  A6 02 11 02 A6 02 32 02  A6 02 3D 02 A6 02 00 00
00000050  00 00 00 00 00 00 00 00  00 00 00 00 00 00 00 00
00000060  00 00 00 00 00 00 00 00  00 00 00 00 00 00 00 00
00000070  00 00 00 00 00 00 00 00  00 00 00 00 00 00 00 00
00000080  00 00 00 00 00 00 00 00  00 00 00 00 00 00 00 00
00000090  00 00 00 00 00 00 00 00  00 00 00 00 00 00 00 00
000000A0  00 00 00 00 00 00 00 00  00 00 00 00 00 00 00 00
000000B0  00 00 00 00 00 00 00 00  00 00 00 00 00 00 00 00
000000C0  00 00 00 00 00 00 00 00  00 00 00 00 00 00 00 00
000000D0  00 00 00 00 00 00 00 00  00 00 00 00 00 00 00 00
000000E0  00 00 00 00 00 00 00 00  00 00 00 00 00 00 00 00
000000F0  00 00 00 00 00 00 00 00  00 00 00 00 00 00 00 00
00000100  00 00 00 00 00 00 00 00  00 00 00 00 00 00 00 00
00000110  00 00 00 00 00 00 00 00  00 00 00 00 00 00 00 00
00000120  00 00 00 00 00 00 00 00  00 00 00 00 00 00 00 00
00000130  00 00 00 00 00 00 00 00  00 00 00 00 00 00 00 00
00000140  00 00 00 00 00 00 00 00  00 00 00 00 00 00 00 00
00000150  00 00 00 00 00 00 00 00  00 00 00 00 00 00 00 00
00000160  00 00 00 00 00 00 00 00  00 00 00 00 00 00 00 00
00000170  00 00 00 00 00 00 00 00  00 00 00 00 00 00 00 00
00000180  00 00 00 00 00 00 00 00  00 00 00 00 00 00 00 00
00000190  00 00 00 00 00 00 00 00  00 00 00 00 00 00 00 00
000001A0  00 00 00 00 00 00 00 00  00 00 00 00 00 00 00 00
000001B0  00 00 00 00 00 00 00 00  00 00 00 00 00 00 00 00
000001C0  00 00 00 00 00 00 00 00  00 00 00 00 00 00 00 00
000001D0  00 00 00 00 00 00 00 00  00 00 00 00 00 00 00 00
000001E0  00 00 00 00 00 00 00 00  00 00 00 00 00 00 00 00
000001F0  00 00 00 00 00 00 00 00  00 00 00 00 00 00 00 00
00000200  62 6D 42 49 4E 20 20 20  20 20 00 00 72 1B 40 14
00000210  7C 17 18 02 A6 02 DC 02  40 14 00 00 40 14 40 14
00000220  90 17 04 00 00 00 00 00  00 00 00 00 FF FF 80 00
00000230  9A 00 00 A6 02 9A 77 00  0E 02 BB FF FF CD 3E 32
00000240  33 DB CD 3E 3C BB 90 17  BA 46 14 CD 3F 61 BB 98
00000250  17 BA 4A 14 CD 3F 61 BB  A2 17 BA 4E 14 CD 3F 61
00000260  BB A8 17 BA 52 14 CD 3F  61 BB AE 17 BA E0 16 CD
00000270  3F 61 BB B4 17 BA E4 16  CD 3F 61 BB BA 17 BA E8
00000280  16 CD 3F 61 BB C0 17 BA  EC 16 CD 3F 61 BB 0D 00
00000290  CD 3D 05 BA F0 16 CD 3F  61 BB 11 00 CD 3D 05 8B
000002A0  D3 BB C4 00 CD 3D 05 92  CD 3F 5F 8B D3 BB D9 00
000002B0  CD 3D 05 92 CD 3F 55 BA  F4 16 CD 3F 61 CD 3E 22
000002C0  C7 06 F8 16 20 00 BB C6  17 BA FA 16 CD 3F 61 BB
000002D0  CC 17 CD 3E 1F BB 01 00  BA D2 17 33 C9 CD 3E 1E
000002E0  BB 01 00 CD 3F B6 CD 3F  B7 01 01 BB FE 16 CD 3F
000002F0  B8 CD 3E 22 BB 01 00 CD  3E 21 BB E4 17 CD 3E 1F
00000300  BB 01 00 BA EA 17 B9 30  00 CD 3E 1E BB 01 00 CD
00000310  3F B3 BB 00 17 BA 02 00  CD 3F B4 BB 04 17 CD 3F
00000320  B4 BB 08 17 BA 08 00 CD  3F B4 BB 0C 17 BA 1E 00
00000330  CD 3F B4 BB 02 00 CD 3E  21 BB E4 17 CD 3E 1F BB
00000340  02 00 BA F8 17 B9 40 01  CD 3E 1E 33 C0 E9 7D 00
00000350  33 C0 E9 6A 00 BB 02 00  CD 3F B3 B8 0A 00 F7 2E
00000360  10 17 8B 1E 12 17 8B D3  D1 E3 03 D8 CD 3F 57 BF
00000370  06 18 CD 3F 91 BB 1A 00  CD 3F 71 80 CD 3D 03 CD
00000380  3F 77 87 D3 8B CB BB 14  17 CD 3F B4 BB 7C 17 CD
00000390  3D 03 CD 3F 77 8B D3 BB  18 17 CD 3F B4 D1 E1 D1
000003A0  E1 D1 E1 D1 E1 D1 E1 03  0E 10 17 D1 E1 D1 E1 81
000003B0  C1 60 14 8B D9 BA 02 00  CD 3F B4 A1 12 17 40 A3
000003C0  12 17 83 3E 12 17 04 7E  8C A1 10 17 40 A3 10 17
000003D0  83 3E 10 17 1F 7F 03 E9  76 FF BB 03 00 CD 3E 21
000003E0  83 3E FE 16 06 75 03 E9  29 00 E9 5B 13 BB 0A 18
000003F0  BA 1C 17 CD 3F 61 E8 97  1D BB 32 18 B8 1C 17 CD
00000400  3F 62 74 DC BB FF FF CD  3E 32 CD 3E 22 BB 38 18
00000410  CD 3E 0E E8 5D 08 C7 06  56 14 00 00 C7 06 58 14
00000420  00 00 C7 06 5A 14 00 00  C7 06 5C 14 00 00 C7 06
00000430  5E 14 00 00 BB 16 00 CD  3E 42 BB 01 00 CD 3E 42
00000440  33 DB CD 3E 44 CD 3F BC  BB 4F 00 CD 3D 0D CD 3F
00000450  6A CD 3E 79 BB 16 00 CD  3E 42 BB 01 00 CD 3E 42
00000460  33 DB CD 3E 44 CD 3F BC  BB 40 18 CD 3F 6A CD 3E
00000470  79 BB 16 00 CD 3E 42 BB  28 00 CD 3E 42 33 DB CD
00000480  3E 44 CD 3F BC BB F4 16  CD 3F 6A BB 5A 18 CD 3F
00000490  6A CD 3E 79 BB 16 00 CD  3E 42 CD 3E 42 33 DB CD
```

```
000004A0  3E 44 33 DB CD 3E 33 BB  07 00 CD 3E 35 CD 3F BC
000004B0  BB 66 18 CD 3F 6A CD 3E  79 BB 16 00 CD 3E 42 CD
000004C0  3E 42 33 DB CD 3E 44 BB  07 00 CD 3E 33 33 DB CD
000004D0  3E 35 BB 72 18 CD 3F B5  02 BB 20 17 CD 3F 5A C7
000004E0  06 24 17 00 00 BB 16 00  CD 3E 42 BB 28 00 CD 3E
000004F0  42 33 DB CD 3E 44 CD 3F  BC BB 14 00 CD 3D 0D CD
00000500  3F 6E CD 3E 79 BB 20 17  8B D3 CD 3F BA 83 FB 08
00000510  7F 03 E9 12 00 8B DA BA  08 00 8B CB CD 3D 0B 8B
00000520  D1 CD 3F 61 E9 1D 00 BB  20 17 8B D3 CD 3F BA 83
00000530  EB 08 F7 DB 8B CA BA 20  00 CD 3D 0E 91 CD 3F 55
00000540  92 CD 3F 61 BB 20 17 BA  01 00 CD 3D 0B 93 BB 76
00000550  18 CD 3F 62 75 03 E9 A3  00 BB 01 00 BA 01 00 CD
00000560  3E 26 BB 04 17 CD 3D 18  93 A3 24 17 BB 01 00 8B
00000570  16 24 17 CD 3E 26 BB 04  17 CD 3D 18 93 A3 26 17
00000580  BB 08 17 BA 28 17 CD 3F  61 BB 20 17 B8 28 17 CD
00000590  3F 62 74 03 E9 03 00 E9  8C 00 83 3E 26 17 00 BB
000005A0  00 00 75 01 4B 8B D3 BB  20 17 B8 28 17 CD 3F 62
000005B0  B9 00 00 76 01 49 0B CA  23 C9 74 03 E9 08 00 A1
000005C0  26 17 A3 24 17 EB A5 CD  3E 2B BB 16 00 CD 3E 42
000005D0  BB 01 00 CD 3E 42 33 DB  CD 3E 44 CD 3F BC BB 7C
000005E0  18 CD 3F 6A CD 3E 79 BB  84 18 B8 20 17 CD 3F 55
000005F0  BA 1C 17 CD 3F 61 E8 9D  1B E9 20 FE C7 06 2C 17
00000600  00 00 C7 06 56 14 00 00  C7 06 58 14 00 00 C7 06
00000610  5A 14 00 00 C7 06 5C 14  00 00 C7 06 5E 14 00 00
00000620  C7 06 24 17 00 00 83 3E  24 17 00 75 03 E9 D6 01
00000630  BB 17 00 CD 3E 42 BB 3A  00 CD 3E 42 33 DB CD 3E
00000640  44 BB A4 18 CD 3F B5 00  CD 3F B7 01 01 BB 5E 14
00000650  CD 3F B8 BB 17 00 CD 3E  42 BB 3A 00 CD 3E 42 33
00000660  DB CD 3E 44 CD 3F BC BB  BA 18 CD 3F 6A 8B 1E 5E
00000670  14 CD 3F 69 BB CA 18 CD  3F 6A CD 3E 79 83 3E 5E
00000680  14 01 BB 00 00 7D 01 4B  83 3E 5E 14 09 BA 00 00
00000690  7E 01 4A 0B D3 23 D2 75  97 BB 17 00 CD 3E 42 BB
000006A0  01 00 CD 3E 42 33 DB CD  3E 44 CD 3F BC BB D4 18
000006B0  CD 3F 6A CD 3E 79 BB B0  20 CD 3F 34 A1 2E 17 A3
000006C0  30 17 B8 01 00 E9 16 00  BB 32 17 CD 3F 0F BB 34
000006D0  17 CD 3F 0F BB 36 17 CD  3F 0F A1 38 17 40 A3 38
000006E0  17 A1 30 17 3B 06 38 17  7D DE A1 36 17 A3 3A 17
000006F0  B8 01 00 E9 8F 00 B8 05  00 F7 2E 2E 17 03 06 3C
00000700  17 05 FB FF 92 BB 02 00  CD 3E 26 A1 34 17 A3 3E
00000710  17 A1 32 17 E9 5E 00 A1  40 17 3B 06 3C 17 BB 00
00000720  00 75 01 4B A1 42 17 3B  06 44 17 BA 00 00 75 01
00000730  4A 23 D3 23 D2 74 03 E9  37 00 8B 1E 44 17 D1 E3
00000740  D1 E3 8B D3 81 C3 5C 14  CD 3D 18 3B 1E 24 17 B9
00000750  00 00 75 01 49 81 C2 5C  16 8B DA CD 3D 18 3B 1E
00000760  5E 14 BA 00 00 75 01 4A  23 D1 23 D2 74 03 E9 26
00000770  00 A1 44 17 40 A3 44 17  A1 3E 17 3B 06 44 17 7D
00000780  96 A1 3C 17 40 A3 3C 17  A1 3A 17 3B 06 3C 17 7C
00000790  03 E9 62 FF E9 6F 00 BB  16 00 CD 3E 42 BB 01 00
000007A0  CD 3E 42 33 DB CD 3E 44  CD 3F BC BB 4F 00 CD 3D
000007B0  0D CD 3F 6A CD 3E 79 BB  16 00 CD 3E 42 BB 01 00
000007C0  CD 3E 42 33 DB CD 3E 44  CD 3E 2B CD 3F BC BB 20
000007D0  17 CD 3F 6A BB F6 18 CD  3F 6A 8B 1E 44 17 CD 3F
000007E0  69 BB 0E 19 CD 3F 6A 8B  1E 3C 17 CD 3F 69 BB 16
000007F0  19 CD 3F 6A CD 3E 79 BB  1E 19 BA 1C 17 CD 3F 61
00000800  E8 93 19 E9 16 FC A1 24  17 A3 56 14 B8 03 00 F7
00000810  2E 40 17 40 40 93 CD 3E  42 8B 1E 42 17 D1 E3 CD
00000820  3E 44 83 3E 56 14 00 7F  03 E9 12 00 CD 3F BC BB
00000830  B2 00 CD 3D 05 CD 3F 6A  CD 3E 79 E9 0C 00 CD 3F
00000840  BC BB 2A 19 CD 3F 6A CD  3E 79 83 3E 56 14 00 7E
00000850  03 E9 60 00 BB 16 00 CD  3E 42 BB 01 00 CD 3E 42
00000860  33 DB CD 3E 44 CD 3F BC  BB 4F 00 CD 3D 0D CD 3F
00000870  6A CD 3E 79 BB 17 00 CD  3E 42 BB 01 00 CD 3E 42
00000880  33 DB CD 3E 44 CD 3F BC  BB 4F 00 CD 3D 0D CD 3F
00000890  6A CD 3E 79 BB 16 00 CD  3E 42 BB 01 00 CD 3E 42
000008A0  33 DB CD 3E 44 CD 3F BC  BB 30 19 CD 3F 6A CD 3E
000008B0  79 E9 AA 00 BB 16 00 CD  3E 42 BB 01 00 CD 3E 42
000008C0  33 DB CD 3E 44 CD 3F BC  BB 3E 19 CD 3F 6A BB 08
000008D0  17 CD 3F 6A BB 16 19 CD  3F 6A BB 0C 17 CD 3F 6E
000008E0  CD 3E 79 BB 17 00 CD 3E  42 BB 03 00 CD 3E 42 33
000008F0  DB CD 3E 44 CD 3F BC BB  4A 19 CD 3F 6A CD 3E 79
00000900  BB 17 00 CD 3E 42 BB 13  00 CD 3E 42 33 DB CD 3E
00000910  44 CD 3F BC BB 62 19 CD  3F 6A CD 3E 79 BB 17 00
00000920  CD 3E 42 BB 27 00 CD 3E  42 33 DB CD 3E 44 CD 3F
00000930  BC BB 7A 19 CD 3F 6A CD  3E 79 BB 17 00 CD 3E 42
```

| | | | | | | | | | | | | | | | | |
|---|---|---|---|---|---|---|---|---|---|---|---|---|---|---|---|---|
| 00000940 | BB | 3A | 00 | CD | 3E | 42 | 33 | DB | CD | 3E | 44 | CD | 3F | BC | BB | BA |
| 00000950 | 18 | CD | 3F | 6A | 8B | 1E | 5E | 14 | CD | 3F | 69 | CD | 3E | 79 | BB | 07 |
| 00000960 | 00 | CD | 3E | 33 | 33 | DB | CD | 3E | 35 | 83 | 3E | 56 | 14 | 00 | 75 | 03 |
| 00000970 | E9 | E0 | 01 | C7 | 06 | 58 | 14 | 00 | 00 | C7 | 06 | 5A | 14 | 00 | 00 | 83 |
| 00000980 | 3E | 2E | 17 | 08 | BB | 00 | 00 | 74 | 01 | 4B | 83 | 3E | 2E | 17 | 0F | BA |
| 00000990 | 00 | 00 | 74 | 01 | 4A | 23 | D3 | 83 | 3E | 2E | 17 | 16 | BB | 00 | 00 | 74 |
| 000009A0 | 01 | 4B | 23 | DA | 83 | 3E | 2E | 17 | 1B | BA | 00 | 00 | 74 | 01 | 4A | 23 |
| 000009B0 | D3 | 83 | 3E | 2E | 17 | 20 | BB | 00 | 00 | 74 | 01 | 4B | 23 | DA | 83 | 3E |
| 000009C0 | 40 | 17 | 04 | BA | 00 | 00 | 75 | 01 | 4A | 23 | D3 | 23 | D2 | 74 | 03 | E9 |
| 000009D0 | 10 | 01 | BB | 17 | 00 | CD | 3E | 42 | BB | 0C | 00 | CD | 3E | 42 | 33 | DB |
| 000009E0 | CD | 3E | 44 | CD | 3F | BC | BB | 92 | 19 | CD | 3F | 6A | CD | 3E | 79 | BB |
| 000009F0 | 17 | 00 | CD | 3E | 42 | BB | 0C | 00 | CD | 3E | 42 | 33 | DB | CD | 3E | 44 |
| 00000A00 | BB | 72 | 18 | CD | 3F | B5 | 00 | CD | 3F | B7 | 01 | 01 | BB | 58 | 14 | CD |
| 00000A10 | 3F | B8 | 83 | 3E | 58 | 14 | 00 | 7D | 03 | E9 | 12 | FF | BB | 17 | 00 | CD |
| 00000A20 | 3E | 42 | BB | 0C | 00 | CD | 3E | 42 | 33 | DB | CD | 3E | 44 | CD | 3F | BC |
| 00000A30 | BB | 92 | 19 | CD | 3F | 6A | CD | 3E | 79 | BB | 17 | 00 | CD | 3E | 42 | BB |
| 00000A40 | 0C | 00 | CD | 3E | 42 | 33 | DB | CD | 3E | 44 | BB | 4A | 14 | CD | 3F | BD |
| 00000A50 | 8B | 1E | 58 | 14 | CD | 3F | 6D | CD | 3E | 79 | BB | 17 | 00 | CD | 3E | 42 |
| 00000A60 | BB | 1F | 00 | CD | 3E | 42 | 33 | DB | CD | 3E | 44 | CD | 3F | BC | BB | 92 |
| 00000A70 | 19 | CD | 3F | 6A | CD | 3E | 79 | BB | 17 | 00 | CD | 3E | 42 | BB | 1F | 00 |
| 00000A80 | CD | 3E | 42 | 33 | DB | CD | 3E | 44 | BB | 72 | 18 | CD | 3F | B5 | 00 | CD |
| 00000A90 | 3F | B7 | 01 | 01 | BB | 5A | 14 | CD | 3F | B8 | 83 | 3E | 5A | 14 | 00 | 7C |
| 00000AA0 | B9 | BB | 17 | 00 | CD | 3E | 42 | BB | 1F | 00 | CD | 3E | 42 | 33 | DB | CD |
| 00000AB0 | 3E | 44 | CD | 3F | BC | BB | 92 | 19 | CD | 3F | 6A | CD | 3E | 79 | BB | 17 |
| 00000AC0 | 00 | CD | 3E | 42 | BB | 1F | 00 | CD | 3E | 42 | 33 | DB | CD | 3E | 44 | BB |
| 00000AD0 | 4A | 14 | CD | 3F | BD | 8B | 1E | 5A | 14 | CD | 3F | 6D | CD | 3E | 79 | E8 |
| 00000AE0 | 95 | 11 | 83 | 3E | 5C | 14 | 00 | 75 | 03 | E9 | 67 | 00 | B8 | 03 | 00 | F7 |
| 00000AF0 | 2E | 40 | 17 | 4u | 40 | 93 | CD | 3E | 42 | 8B | 1E | 42 | 17 | D1 | E3 | CD |
| 00000B00 | 3E | 42 | 33 | DB | CD | 3E | 44 | BB | 07 | 00 | CD | 3E | 33 | 33 | DB | CD |
| 00000B10 | 3E | 35 | A1 | 5A | 14 | 3B | 06 | 58 | 14 | 7C | 03 | E9 | 0F | 00 | CD | 3F |
| 00000B20 | BC | BB | 9E | 19 | CD | 3F | 6A | CD | 3E | 79 | E9 | 26 | 00 | BB | 17 | 00 |
| 00000B30 | CD | 3E | 33 | 33 | DB | CD | 3E | 35 | BB | 52 | 14 | CD | 3F | BD | 8B | 1E |
| 00000B40 | 5E | 14 | CD | 3F | 69 | CD | 3E | 79 | BB | 07 | 00 | CD | 3E | 33 | 33 | DB |
| 00000B50 | CD | 3E | 35 | B8 | 05 | 00 | F7 | 2E | 2E | 17 | 03 | 06 | 40 | 17 | 05 | FB |
| 00000B60 | FF | 92 | BB | 02 | 00 | CD | 3E | 26 | 8B | 1E | 42 | 17 | D1 | E3 | D1 | E3 |
| 00000B70 | 81 | C3 | 5C | 14 | 8B | D3 | 8B | 1E | 56 | 14 | CD | 3D | 1B | CD | 3F | 5B |
| 00000B80 | 8B | 1E | 42 | 17 | D1 | E3 | D1 | E3 | 81 | C3 | DC | 14 | 8B | D3 | 8B | 1E |
| 00000B90 | 58 | 14 | CD | 3D | 1B | CD | 3F | 5B | 8B | 1E | 42 | 17 | D1 | E3 | D1 | E3 |
| 00000BA0 | 81 | C3 | 5C | 15 | 8B | D3 | 8B | 1E | 5A | 14 | CD | 3D | 1B | CD | 3F | 5B |
| 00000BB0 | 8B | 1E | 42 | 17 | D1 | E3 | D1 | E3 | 81 | C3 | DC | 15 | 8B | D3 | 8B | 1E |
| 00000BC0 | 5C | 14 | CD | 3D | 1B | CD | 3F | 5B | 8B | 1E | 42 | 17 | D1 | E3 | D1 | E3 |
| 00000BD0 | 81 | C3 | 5C | 16 | 8B | D3 | 8B | 1E | 5E | 14 | CD | 3D | 1B | CD | 3F | 5B |
| 00000BE0 | B8 | 05 | 00 | F7 | 2E | 2E | 17 | 03 | 06 | 40 | 17 | 05 | FB | FF | 92 | BB |
| 00000BF0 | 02 | 00 | CD | 3E | 28 | E8 | E9 | 11 | BB | 07 | 00 | CD | 3E | 33 | 33 | DB |
| 00000C00 | CD | 3E | 35 | 8B | 1E | 2E | 17 | CD | 3D | 10 | B8 | A4 | 19 | CD | 3F | 55 |
| 00000C10 | BA | 1C | 17 | CD | 3F | 61 | BB | 15 | 00 | CD | 3E | 42 | BB | 01 | 00 | CD |
| 00000C20 | 3E | 42 | 33 | DB | CD | 3E | 44 | E8 | 6C | 15 | BB | D4 | 19 | B8 | 1C | 17 |
| 00000C30 | CD | 3F | 62 | 75 | 03 | E9 | B5 | F7 | BB | 15 | 00 | CD | 3E | 42 | BB | 01 |
| 00000C40 | 00 | CD | 3E | 42 | 33 | DB | CD | 3E | 44 | CD | 3F | BC | BB | DA | 19 | CD |
| 00000C50 | 3F | 6A | BB | 18 | 00 | CD | 3D | 05 | CD | 3F | 6A | BB | E4 | 19 | CD | 3F |
| 00000C60 | 6A | BB | 0C | 00 | CD | 3D | 0D | CD | 3F | 6A | CD | 3E | 79 | E8 | DF | 05 |
| 00000C70 | E9 | A9 | F7 | BB | FF | FF | CD | 3E | 32 | BB | 01 | 00 | CD | 3E | 42 | CD |
| 00000C80 | 3E | 42 | 33 | DB | CD | 3E | 44 | CD | 3F | BC | BB | 12 | 1A | CD | 3F | 6E |
| 00000C90 | CD | 3E | 79 | BB | 01 | 00 | CD | 3E | 42 | BB | 14 | 00 | CD | 3E | 42 | 33 |
| 00000CA0 | DB | CD | 3E | 44 | 33 | DB | CD | 3E | 33 | BB | 07 | 00 | CD | 3E | 35 | CD |
| 00000CB0 | 3F | BC | BB | FA | 16 | B8 | 1E | 1A | CD | 3F | 55 | CD | 3F | 6A | CD | 3E |
| 00000CC0 | 79 | BB | 01 | 00 | CD | 3E | 42 | BB | 08 | 00 | CD | 3E | 42 | 33 | DB | CD |
| 00000CD0 | 3E | 44 | BB | 07 | 00 | CD | 3E | 33 | 33 | DB | CD | 3E | 35 | BB | 72 | 18 |
| 00000CE0 | CD | 3F | B5 | 00 | CD | 3F | B7 | 01 | 01 | BB | 2E | 17 | CD | 3F | B8 | 83 |
| 00000CF0 | 3E | 2E | 17 | 01 | BB | 00 | 00 | 7D | 01 | 4B | A1 | F8 | 16 | 3B | 06 | 2E |
| 00000D00 | 17 | BA | 00 | 00 | 7D | 01 | 4A | 0B | D3 | 23 | D2 | 75 | 86 | BB | 01 | 00 |
| 00000D10 | CD | 3E | 42 | BB | 08 | 00 | CD | 3E | 42 | 33 | DB | CD | 3E | 44 | CD | 3F |
| 00000D20 | BC | BB | 3C | 00 | CD | 3D | 0D | CD | 3F | 6A | CD | 3E | 79 | BB | 02 | 00 |
| 00000D30 | CD | 3E | 42 | BB | 01 | 00 | CD | 3E | 42 | 33 | DB | CD | 3E | 44 | BB | B0 |
| 00000D40 | 20 | CD | 3F | 34 | A1 | 2E | 17 | A3 | 46 | 17 | B8 | 01 | 00 | E9 | 16 | 00 |
| 00000D50 | BB | 32 | 17 | CD | 3F | 0F | BB | 34 | 17 | CD | 3F | 0F | BB | 36 | 17 | CD |
| 00000D60 | 3F | 0F | A1 | 38 | 17 | 40 | A3 | 38 | 17 | A1 | 46 | 17 | 3B | 06 | 38 | 17 |
| 00000D70 | 7D | DE | A1 | 34 | 17 | A3 | 48 | 17 | B8 | 01 | 00 | E9 | 33 | 00 | 83 | 3E |
| 00000D80 | 10 | 17 | 09 | 7F | 03 | E9 | 19 | 00 | BB | 4E | 14 | CD | 3F | BD | B9 | 0A |
| 00000D90 | 00 | A1 | 10 | 17 | 99 | F7 | F9 | 93 | CD | 3F | 69 | CD | 3E | 79 | E9 | 0C |
| 00000DA0 | 00 | CD | 3F | BC | BB | 34 | 1A | CD | 3F | 6A | CD | 3E | 79 | A1 | 10 | 17 |
| 00000DB0 | 40 | A3 | 10 | 17 | A1 | 48 | 17 | 3B | 06 | 10 | 17 | 7D | C1 | CD | 3F | BC |
| 00000DC0 | BB | 2A | 19 | CD | 3F | 6E | CD | 3E | 79 | A1 | 34 | 17 | A3 | 4A | 17 | B8 |
| 00000DD0 | 01 | 00 | E9 | 1B | 00 | BB | 4E | 14 | CD | 3F | BD | B9 | 0A | 00 | A1 | 10 |

```
00000DE0  17 99 F7 F9 8B DA CD 3F  69 CD 3E 79 A1 10 17 40
00000DF0  A3 10 17 A1 4A 17 3B 06  10 17 7D D9 CD 3F BC BB
00000E00  2A 19 CD 3F 6E CD 3E 79  BB DA 00 CD 3D 05 8B D3
00000E10  BB C4 00 CD 3D 05 92 CD  3F 55 BA 1C 17 CD 3F 61
00000E20  A1 34 17 48 A3 4C 17 B8  01 00 E9 1F 00 BB C2 00
00000E30  CD 3D 05 B8 1C 17 CD 3F  55 8B D3 BB C4 00 CD 3D
00000E40  05 92 CD 3F 55 CD 3F 61  A1 4E 17 40 A3 4E 17 A1
00000E50  4C 17 3B 06 4E 17 7D D5  BB BF 00 CD 3D 05 B8 1C
00000E60  17 CD 3F 55 92 CD 3F 61  CD 3F BC BB 1C 17 CD 3F
00000E70  6E CD 3E 79 BB C3 00 CD  3D 05 8B D3 BB C4 00 CD
00000E80  3D 05 92 CD 3F 55 BA 1C  17 CD 3F 61 A1 34 17 48
00000E90  A3 50 17 B8 01 00 E9 1F  00 BB C5 00 CD 3D 05 B8
00000EA0  1C 17 CD 3F 55 8B D3 BB  C4 00 CD 3D 05 92 CD 3F
00000EB0  55 CD 3F 61 A1 4E 17 40  A3 4E 17 A1 50 17 3B 06
00000EC0  4E 17 7D D5 BB B4 00 CD  3D 05 B8 1C 17 CD 3F 55
00000ED0  92 CD 3F 61 A1 36 17 A3  52 17 B8 01 00 E9 8B 00
00000EE0  B8 01 00 E9 6B 00 B8 03  00 F7 2E 40 17 03 06 10
00000EF0  17 40 93 CD 3E 42 BB 01  00 CD 3E 42 33 DB CD 3E
00000F00  44 CD 3F BC BB B3 00 CD  3D 05 CD 3F 6A CD 3E 79
00000F10  A1 34 17 A3 54 17 B8 01  00 E9 19 00 CD 3F BC BB
00000F20  2A 19 CD 3F 6A BB B3 00  CD 3D 05 CD 3F 6A CD 3E
00000F30  79 A1 42 17 40 A3 42 17  A1 54 17 3B 06 42 17 7D
00000F40  DB CD 3F BC BB 2A 19 CD  3F 6E CD 3E 79 A1 10 17
00000F50  40 A3 10 17 83 3E 10 17  02 7E 8B CD 3F BC BB 1C
00000F60  17 CD 3F 6E CD 3E 79 A1  40 17 40 A3 40 17 A1 52
00000F70  17 3B 06 40 17 7C 03 E9  66 FF BB C0 00 CD 3D 05
00000F80  8B D3 BB C4 00 CD 3D 05  92 CD 3F 55 BA 1C 17 CD
00000F90  3F 61 A1 34 17 48 A3 56  17 B8 01 00 E9 1F 00 BB
00000FA0  C1 00 CD 3D 05 B8 1C 17  CD 3F 55 8B D3 BB C4 00
00000FB0  CD 3D 05 92 CD 3F 55 CD  3F 61 A1 4E 17 40 A3 4E
00000FC0  17 A1 56 17 3B 06 4E 17  7D D5 BB D9 00 CD 3D 05
00000FD0  B8 1C 17 CD 3F 55 92 CD  3F 61 B8 03 00 F7 2E 36
00000FE0  17 40 40 40 40 93 CD 3E  42 BB 01 00 CD 3E 42 33
00000FF0  DB CD 3E 44 CD 3F BC BB  1C 17 CD 3F 6A CD 3E 79
00001000  83 3E 32 17 01 7F 03 E9  3D 00 B8 02 00 E9 2D 00
00001010  8B 1E 10 17 CD 3E 42 BB  01 00 CD 3E 42 33 DB CD
00001020  3E 44 CD 3F BC 8B 1E 32  17 D1 E3 4B 4B BA 20 00
00001030  CD 3D 0E CD 3F 6A CD 3E  79 A1 10 17 40 A3 10 17
00001040  83 3E 10 17 13 7E C9 A1  36 17 A3 58 17 B8 01 00
00001050  E9 31 00 B8 03 00 F7 2E  40 17 40 40 93 CD 3E 42
00001060  8B 1E 34 17 D1 E3 43 43  CD 3E 42 33 DB CD 3E 44
00001070  BB 46 14 CD 3F BD 8B 1E  40 17 CD 3F 69 CD 3E 79
00001080  A1 40 17 40 A3 40 17 A1  58 17 3B 06 40 17 7D C3
00001090  A1 32 17 A3 42 17 C7 06  40 17 01 00 A1 36 17 A3
000010A0  5A 17 B8 01 00 E9 2C 01  B8 05 00 F7 2E 2E 17 03
000010B0  06 10 17 05 FB FF 92 BB  02 00 CD 3E 26 A1 34 17
000010C0  A3 5C 17 A1 32 17 E9 F8  00 B8 01 00 E9 2B 00 8B
000010D0  1E 5E 17 8B D3 D1 E3 D1  E3 D1 E3 D1 E3 D1 E3 03
000010E0  1E 12 17 D1 E3 D1 E3 81  C3 DC 13 CD 3D 18 8B FA
000010F0  D1 E7 89 9D 54 14 A1 5E  17 40 A3 5E 17 83 3E 5E
00001100  17 05 7E CB 83 3E 56 14  00 7F 03 E9 AF 00 B8 03
00001110  00 F7 2E 10 17 40 40 93  CD 3E 42 8B 1E 12 17 D1
00001120  E3 CD 3E 42 33 DB CD 3E  44 33 DB CD 3E 33 BB 07
00001130  00 CD 3E 35 A1 5A 14 3B  06 58 14 BB 00 00 7D 01
00001140  4B 83 3E 2E 17 08 BA 00  00 74 01 4A 83 3E 2E 17
00001150  0F B9 00 00 74 01 49 23  CA 83 3E 2E 17 16 BA 00
00001160  00 74 01 4A 23 D1 83 3E  2E 17 1B B9 00 00 74 01
00001170  49 23 CA 83 3E 2E 17 20  BA 00 00 74 01 4A 23 D1
00001180  83 3E 10 17 04 B9 00 00  75 01 49 23 CA 0B CB 23
00001190  C9 74 03 E9 0C 00 BB 18  00 CD 3E 33 BB 07 00 CD
000011A0  3E 35 BB 52 14 CD 3F BD  8B 1E 5E 14 CD 3F 69 CD
000011B0  3E 79 BB 07 00 CD 3E 33  33 DB CD 3E 35 A1 12 17
000011C0  40 A3 12 17 A1 5C 17 3B  06 12 17 7C 03 E9 F9 FE
000011D0  A1 10 17 40 A3 10 17 A1  5A 17 3B 06 10 17 7C 03
000011E0  E9 C5 FE BB 01 00 CD 3E  42 BB 07 00 CD 3E 42 33
000011F0  DB CD 3E 44 CD 3F BC 8B  1E 2E 17 CD 3F 69 CD 3E
00001200  79 BB 15 00 CD 3E 42 BB  01 00 CD 3E 42 33 DB CD
00001210  3E 44 CD 3F BC BB DA 19  CD 3F 6A CD 3E 79 BB 17
00001220  00 CD 3E 33 33 DB CD 3E  35 CD 3F BC BB 18 00 CD
00001230  3D 05 CD 3F 6A CD 3E 79  BB 07 00 CD 3E 33 33 DB
00001240  CD 3E 35 CD 3F BC BB 3A  1A CD 3F 6A CD 3E 79 BB
00001250  16 00 CD 3E 42 BB 01 00  CD 3E 42 33 DB CD 3E 44
00001260  CD 3F BC BB 4F 00 CD 3D  0D CD 3F 6A CD 3E 79 BB
00001270  17 00 CD 3E 42 BB 01 00  CD 3E 42 33 DB CD 3E 44
```

```
00001280  CD 3F BC BB 4F 00 CD 3D  0D CD 3F 6A CD 3E 79 B8
00001290  05 00 F7 2E 2E 17 03 06  40 17 05 FB FF 92 BB 02
000012A0  00 CD 3E 26 B8 01 00 E9  2B 00 8B 1E 5E 17 8B D3
000012B0  D1 E3 D1 E3 D1 E3 D1 E3  D1 E3 03 1E 42 17 D1 E3
000012C0  D1 E3 81 C3 DC 13 CD 3D  18 8B FA D1 E7 89 9D 54
000012D0  14 A1 5E 17 40 A3 5E 17  83 3E 5E 17 05 7E CB 83
000012E0  3E 56 14 00 7E 03 E9 20  00 BB 16 00 CD 3E 42 BB
000012F0  01 00 CD 3E 42 33 DB CD  3E 44 CD 3F BC BB 30 19
00001300  CD 3F 6A CD 3E 79 E9 B9  00 BB 01 00 8B 16 56 14
00001310  CD 3E 26 BB 16 00 CD 3E  42 BB 01 00 CD 3E 42 33
00001320  DB CD 3E 44 CD 3F BC BB  3E 19 CD 3F 6A BB 08 17
00001330  CD 3F 6A BB 16 19 CD 3F  6A BB 0C 17 CD 3F 6E CD
00001340  3E 79 CD 3F BC BB 64 1A  CD 3F 6A BB 4A 14 CD 3E
00001350  0A 8B 1E 58 14 CD 3F 69  CD 3E 79 CD 3F BC BB 74
00001360  1A CD 3F 6A BB 4A 14 CD  3E 0A 8B 1E 5A 14 CD 3F
00001370  69 CD 3E 79 BB 17 00 CD  3E 42 BB 27 00 CD 3E 42
00001380  33 DB CD 3E 44 CD 3F BC  BB 86 1A CD 3F 6A 8B 1E
00001390  5C 14 23 DB 7D 02 F7 DB  CD 3F 69 CD 3E 79 BB 17
000013A0  00 CD 3E 42 BB 3A 00 CD  3E 42 33 DB CD 3E 44 CD
000013B0  3F BC BB BA 18 CD 3F 6A  8B 1E 5E 14 CD 3F 69 CD
000013C0  3E 79 B8 03 00 F7 2E 40  17 40 40 40 93 CD 3E 42
000013D0  8B 1E 42 17 D1 E3 CD 3E  42 33 DB CD 3E 44 BB 17
000013E0  00 CD 3E 33 33 DB CD 3E  35 CD 3F BC BB 18 00 CD
000013F0  3D 05 CD 3F 6A CD 3E 79  BB 07 00 CD 3E 33 33 DB
00001400  CD 3E 35 BB 02 00 CD 3E  42 8B 1E 42 17 D1 E3 CD
00001410  3E 44 83 3E 42 17 0A 7D  03 E9 2C 00 33 DB CD 3E
00001420  33 BB 07 00 CD 3E 35 BB  52 14 CD 3F BD B9 0A 00
00001430  A1 42 17 99 F7 F9 93 CD  3F 69 CD 3E 79 BB 07 00
00001440  CD 3E 33 33 DB CD 3E 35  33 DB CD 3E 33 BB 07 00
00001450  CD 3E 35 BB 03 00 CD 3E  42 8B 1E 42 17 D1 E3 CD
00001460  3E 42 33 DB CD 3E 44 BB  52 14 CD 3F BD B9 0A 00
00001470  A1 42 17 99 F7 F9 8B DA  CD 3F 69 CD 3E 79 B8 03
00001480  00 F7 2E 40 17 40 40 93  CD 3E 42 8B 1E 34 17 D1
00001490  E3 43 43 43 43 CD 3E 42  33 DB CD 3E 44 BB 52 14
000014A0  CD 3F BD 8B 1E 40 17 CD  3F 69 CD 3E 79 BB 07 00
000014B0  CD 3E 33 33 DB CD 3E 35  CD 3D 06 BA 1C 17 CD 3F
000014C0  61 BB 1C 17 CD 3F BA 0B  DB 74 ED BB 96 1A B8 1C
000014D0  17 CD 3F 62 BA 00 00 74  01 4A BB E0 16 CD 3F 62
000014E0  B9 00 00 74 01 49 23 CA  BB E4 16 CD 3F 62 BA 00
000014F0  00 74 01 4A 23 D1 BB E8  16 CD 3F 62 B9 00 00 74
00001500  01 49 23 CA BB EC 16 CD  3F 62 BA 00 00 74 01 4A
00001510  23 D1 BB F0 16 CD 3F 62  B9 00 00 74 01 49 23 CA
00001520  23 C9 75 94 B8 03 00 F7  2E 40 17 40 40 40 93 CD
00001530  3E 42 8B 1E 42 17 D1 E3  CD 3E 42 33 DB CD 3E 44
00001540  CD 3F BC BB 2A 19 CD 3F  6A CD 3E 79 BB 03 00 CD
00001550  3E 42 8B 1E 42 17 D1 E3  4B CD 3E 42 33 DB CD 3E
00001560  44 BB 4E 14 CD 3F BD B9  0A 00 A1 42 17 99 F7 F9
00001570  8B DA CD 3F 69 CD 3E 79  83 3E 42 17 0A 7D 03 E9
00001580  2B 00 BB 02 00 CD 3E 42  8B 1E 42 17 D1 E3 4B CD
00001590  3E 42 33 DB CD 3E 44 BB  4E 14 CD 3F BD B9 0A 00
000015A0  A1 42 17 99 F7 F9 93 CD  3F 69 CD 3E 79 B8 03 00
000015B0  F7 2E 40 17 40 40 93 CD  3E 42 8B 1E 34 17 D1 E3
000015C0  43 43 CD 3E 42 33 DB CD  3E 44 BB 46 14 CD 3F BD
000015D0  8B 1E 40 17 CD 3F 69 CD  3E 79 BB 96 1A B8 1C 17
000015E0  CD 3F 62 75 03 E9 05 EE  BB F0 16 B8 1C 17 CD 3F
000015F0  62 75 03 E9 06 01 BB EC  16 B8 1C 17 CD 3F 62 75
00001600  03 E9 A6 00 BB E8 16 B8  1C 17 CD 3F 62 75 03 E9
00001610  46 00 BB E4 16 B8 1C 17  CD 3F 62 75 03 E9 1A 00
00001620  A1 40 17 48 A3 40 17 83  3E 40 17 00 7E 03 E9 1E
00001630  FC A1 36 17 A3 40 17 E9  15 FC A1 40 17 40 A3 40
00001640  17 8B 1E 36 17 43 3B 1E  40 17 7E 03 E9 00 FC C7
00001650  06 40 17 01 00 E9 F7 FB  A1 42 17 48 A3 42 17 BB
00001660  B0 20 CD 3F 34 A1 2E 17  A3 60 17 B8 01 00 E9 16
00001670  00 BB 32 17 CD 3F 0F BB  34 17 CD 3F 0F BB 36 17
00001680  CD 3F 0F A1 38 17 40 A3  38 17 A1 60 17 3B 06 38
00001690  17 7D DE 8B 1E 32 17 4B  3B 1E 42 17 7D 03 E9 AE
000016A0  FB A1 34 17 A3 42 17 E9  A5 FB A1 42 17 40 A3 42
000016B0  17 BB B0 20 CD 3F 34 A1  2E 17 A3 62 17 B8 01 00
000016C0  E9 16 00 BB 32 17 CD 3F  0F BB 34 17 CD 3F 0F BB
000016D0  36 17 CD 3F 0F A1 38 17  40 A3 38 17 A1 62 17 3B
000016E0  06 38 17 7D DE 8B 1E 34  17 43 3B 1E 42 17 7E 03
000016F0  E9 5C FB A1 32 17 A3 42  17 E9 53 FB B8 03 00 F7
00001700  2E 40 17 40 40 40 93 CD  3E 42 8B 1E 42 17 D1 E3
00001710  CD 3E 42 33 DB CD 3E 44  CD 3F BC BB 18 00 CD 3D
```

```
00001720  05 CD 3F 6A CD 3E 79 BB  15 00 CD 3E 42 BB 01 00
00001730  CD 3E 42 33 DB CD 3E 44  CD 3F BC BB 32 00 CD 3D
00001740  0D CD 3F 6E CD 3E 79 C3  E8 28 F5 83 3E 56 14 00
00001750  75 03 E9 D2 01 C7 06 10  17 01 00 BB 18 00 CD 3E
00001760  42 BB 28 00 CD 3E 42 33  DB CD 3E 44 CD 3F BC BB
00001770  1A 00 CD 3D 05 CD 3F 6A  BB 9C 1A CD 3F 6A BB 11
00001780  00 CD 3D 05 CD 3F 6A BB  C4 00 CD 3D 05 CD 3F 6A
00001790  BB AA 1A CD 3F 6A BB F4  16 CD 3F 6A BB B8 1A CD
000017A0  3F 6A CD 3E 79 BB 17 00  CD 3E 42 BB 03 00 CD 3E
000017B0  42 33 DB CD 3E 44 CD 3F  BC BB C6 1A CD 3F 6A CD
000017C0  3E 79 BB 17 00 CD 3E 42  BB 15 00 CD 3E 42 33 DB
000017D0  CD 3E 44 CD 3F BC BB D2  1A CD 3F 6A CD 3E 79 BB
000017E0  17 00 CD 3E 42 BB 27 00  CD 3E 42 33 DB CD 3E 44
000017F0  CD 3F BC BB E0 1A CD 3F  6A CD 3E 79 33 DB CD 3E
00001800  33 BB 07 00 CD 3E 35 8B  1E 10 17 CD 3F 5E 03 15
00001810  16 35 16 55 16 BB 17 00  CD 3E 42 BB 03 00 CD 3E
00001820  42 33 DB CD 3E 44 CD 3F  BC BB C6 1A CD 3F 6A CD
00001830  3E 79 E9 40 00 BB 17 00  CD 3E 42 BB 15 00 CD 3E
00001840  42 33 DB CD 3E 44 CD 3F  BC BB D2 1A CD 3F 6A CD
00001850  3E 79 E9 20 00 BB 17 00  CD 3E 42 BB 27 00 CD 3E
00001860  42 33 DB CD 3E 44 CD 3F  BC BB E0 1A CD 3F 6A CD
00001870  3E 79 E9 00 00 BB 07 00  CD 3E 33 33 DB CD 3E 35
00001880  CD 3D 06 BA 1C 17 CD 3F  61 BB 1C 17 CD 3F BA 0B
00001890  DB 74 ED BB F0 16 B8 1C  17 CD 3F 62 75 03 E9 58
000018A0  00 BB E8 16 B8 1C 17 CD  3F 62 74 03 E9 0A 00 A1
000018B0  10 17 48 A3 10 17 E9 1A  00 BB EC 16 B8 1C 17 CD
000018C0  3F 62 74 03 E9 0A 00 A1  10 17 40 A3 10 17 E9 02
000018D0  00 EB AD 83 3E 10 17 00  74 03 E9 09 00 C7 06 10
000018E0  17 03 00 E9 10 00 83 3E  10 17 04 74 03 E9 06 00
000018F0  C7 06 10 17 01 00 E9 62  FE BB 18 00 CD 3E 42 BB
00001900  28 00 CD 3E 42 33 DB CD  3E 44 CD 3F BC BB 27 00
00001910  CD 3D 0D CD 3F 6A CD 3E  79 8B 1E 10 17 CD 3F 5D
00001920  03 3A 18 89 19 27 1B BB  17 00 CD 3E 42 BB 03 00
00001930  CD 3E 42 33 DB CD 3E 44  CD 3F BC BB C6 1A CD 3F
00001940  6A CD 3E 79 BB 17 00 CD  3E 42 BB 15 00 CD 3E 42
00001950  33 DB CD 3E 44 CD 3F BC  BB D2 1A CD 3F 6A CD 3E
00001960  79 BB 17 00 CD 3E 42 BB  27 00 CD 3E 42 33 DB CD
00001970  3E 44 CD 3F BC BB E0 1A  CD 3F 6A CD 3E 79 E8 C3
00001980  03 BB 15 00 CD 3E 42 BB  01 00 CD 3E 42 33 DB CD
00001990  3E 44 CD 3F BC BB 4F 00  CD 3D 0D CD 3F 6A CD 3E
000019A0  79 BB 15 00 CD 3E 42 BB  01 00 CD 3E 42 33 DB CD
000019B0  3E 44 8B 1E 2E 17 CD 3D  10 B8 F2 1A CD 3F 55 93
000019C0  BB 2A 19 CD 3F 55 BA 1C  17 CD 3F 61 E8 C7 07 BB
000019D0  D4 19 B8 1C 17 CD 3F 62  75 03 E9 10 EA BB 15 00
000019E0  CD 3E 42 BB 01 00 CD 3E  42 33 DB CD 3E 44 CD 3F
000019F0  BC BB DA 19 CD 3F 6A CD  3E 79 BB 17 00 CD 3E 33
00001A00  33 DB CD 3E 35 CD 3F BC  BB 18 00 CD 3D 05 CD 3F
00001A10  6A CD 3E 79 BB 07 00 CD  3E 33 33 DB CD 3E 35 CD
00001A20  3F BC BB 24 1B CD 3F 6A  BB 32 00 CD 3D 0D CD 3F
00001A30  6E CD 3E 79 E8 18 F8 E9  11 FD 83 3E 56 14 00 75
00001A40  03 E9 FF 02 C7 06 58 14  00 00 83 3E 2E 17 08 BB
00001A50  00 00 74 01 4B 83 3E 2E  17 0F BA 00 00 74 01 4A
00001A60  23 D3 83 3E 2E 17 16 BB  00 00 74 01 4B 23 DA 83
00001A70  3E 2E 17 1B BA 00 00 74  01 4A 23 D3 83 3E 2E 17
00001A80  20 BB 00 00 74 01 4B 23  DA 83 3E 40 17 04 BA 00
00001A90  00 75 01 4A 23 D3 23 D2  74 03 E9 4A 00 BB 17 00
00001AA0  CD 3E 42 BB 0C 00 CD 3E  42 33 DB CD 3E 44 CD 3F
00001AB0  BC BB 92 19 CD 3F 6A CD  3E 79 BB 17 00 CD 3E 42
00001AC0  BB 0C 00 CD 3E 42 33 DB  CD 3E 44 BB 72 18 CD 3F
00001AD0  B5 00 CD 3F B7 01 01 BB  58 14 CD 3F B8 83 3E 58
00001AE0  14 00 7D 03 E9 53 FF BB  17 00 CD 3E 42 BB 0C 00
00001AF0  CD 3E 42 33 DB CD 3E 44  CD 3F BC BB 92 19 CD 3F
00001B00  6A CD 3E 79 BB 17 00 CD  3E 42 BB 0C 00 CD 3E 42
00001B10  33 DB CD 3E 44 BB 4A 14  CD 3F BD 8B 1E 58 14 CD
00001B20  3F 6D CD 3E 79 83 3E 56  14 00 75 03 E9 4E 00 B8
00001B30  03 00 F7 2E 40 17 40 40  93 CD 3E 42 8B 1E 42 17
00001B40  D1 E3 CD 3E 42 33 DB CD  3E 44 33 DB CD 3E 33 BB
00001B50  07 00 CD 3E 35 A1 5A 14  3B 06 58 14 7D 03 E9 0C
00001B60  00 BB 18 00 CD 3E 33 BB  07 00 CD 3E 35 BB 52 14
00001B70  CD 3F BD 8B 1E 5E 14 CD  3F 69 CD 3E 79 BB 07 00
00001B80  CD 3E 33 33 DB CD 3E 35  C3 83 3E 56 14 00 75 03
00001B90  E9 B0 01 C7 06 5A 14 00  00 83 3E 2E 17 08 BB 00
00001BA0  00 74 01 4B 83 3E 2E 17  0F BA 00 00 74 01 4A 23
00001BB0  D3 83 3E 2E 17 16 BB 00  00 74 01 4B 23 DA 83 3E
```

| | | | | | | | | | | | | | | | | |
|---|---|---|---|---|---|---|---|---|---|---|---|---|---|---|---|---|
| 00001BC0 | 2E | 17 | 1B | BA | 00 | 00 | 74 | 01 | 4A | 23 | D3 | 83 | 3E | 2E | 17 | 20 |
| 00001BD0 | BB | 00 | 00 | 74 | 01 | 4B | 23 | DA | 83 | 3E | 40 | 17 | 04 | BA | 00 | 00 |
| 00001BE0 | 75 | 01 | 4A | 23 | D3 | 23 | D2 | 74 | 03 | E9 | 4A | 00 | BB | 17 | 00 | CD |
| 00001BF0 | 3E | 42 | BB | 1F | 00 | CD | 3E | 42 | 33 | DB | CD | 3E | 44 | CD | 3F | BC |
| 00001C00 | BB | 92 | 19 | CD | 3F | 6A | CD | 3E | 79 | BB | 17 | 00 | CD | 3E | 42 | BB |
| 00001C10 | 1F | 00 | CD | 3E | 42 | 33 | DB | CD | 3E | 44 | BB | 72 | 18 | CD | 3F | B5 |
| 00001C20 | 00 | CD | 3F | B7 | 01 | 01 | BB | 5A | 14 | CD | 3F | B8 | 83 | 3E | 5A | 14 |
| 00001C30 | 00 | 7D | 03 | E9 | 53 | FF | BB | 17 | 00 | CD | 3E | 42 | BB | 1F | 00 | CD |
| 00001C40 | 3E | 42 | 33 | DB | CD | 3E | 44 | CD | 3F | BC | BB | 92 | 19 | CD | 3F | 6A |
| 00001C50 | CD | 3E | 79 | BB | 17 | 00 | CD | 3E | 42 | BB | 1F | 00 | CD | 3E | 42 | 33 |
| 00001C60 | DB | CD | 3E | 44 | BB | 4A | 14 | CD | 3F | BD | 8B | 1E | 5A | 14 | CD | 3F |
| 00001C70 | 6D | CD | 3E | 79 | E9 | AE | FE | BB | 17 | 00 | CD | 3E | 42 | BB | 33 | 00 |
| 00001C80 | CD | 3E | 42 | 33 | DB | CD | 3E | 44 | CD | 3F | BC | BB | 3C | 1B | CD | 3F |
| 00001C90 | 6A | CD | 3E | 79 | BB | 17 | 00 | CD | 3E | 42 | BB | 33 | 00 | CD | 3E | 42 |
| 00001CA0 | 33 | DB | CD | 3E | 44 | BB | 72 | 18 | CD | 3F | B5 | 00 | CD | 3F | B7 | 01 |
| 00001CB0 | 01 | BB | 2C | 17 | CD | 3F | B8 | 83 | 3E | 2C | 17 | 01 | BB | 00 | 00 | 7D |
| 00001CC0 | 01 | 4B | A1 | 5A | 14 | 3B | 06 | 2C | 17 | BA | 00 | 00 | 7E | 01 | 4A | 0B |
| 00001CD0 | D3 | 81 | 3E | 2C | 17 | 30 | 75 | BB | 00 | 00 | 7E | 01 | 4B | 0B | DA | 23 |
| 00001CE0 | DB | 75 | 94 | A1 | 2C | 17 | A3 | 5C | 14 | BB | 17 | 00 | CD | 3E | 42 | BB |
| 00001CF0 | 33 | 00 | CD | 3E | 42 | 33 | DB | CD | 3E | 44 | CD | 3F | BC | BB | 46 | 1B |
| 00001D00 | CD | 3F | 6A | CD | 3E | 79 | BB | 17 | 00 | CD | 3E | 42 | BB | 33 | 00 | CD |
| 00001D10 | 3E | 42 | 33 | DB | CD | 3E | 44 | CD | 3F | BC | 8B | 1E | 2C | 17 | CD | 3F |
| 00001D20 | 69 | CD | 3E | 79 | E9 | FE | FD | 83 | 3E | 56 | 14 | 00 | 74 | 03 | E9 | 46 |
| 00001D30 | FF | C7 | 06 | 58 | 14 | 00 | 00 | C7 | 06 | 5A | 14 | 00 | 00 | C7 | 06 | 5C |
| 00001D40 | 14 | 00 | 00 | C3 | B8 | 05 | 00 | F7 | 2E | 2E | 17 | 03 | 06 | 40 | 17 | 05 |
| 00001D50 | FB | FF | A3 | 10 | 17 | BB | 02 | 00 | 8B | 16 | 10 | 17 | CD | 3E | 26 | 8B |
| 00001D60 | 1E | 42 | 17 | D1 | E3 | D1 | E3 | 81 | C3 | 5C | 14 | 8B | D3 | 8B | 1E | 56 |
| 00001D70 | 14 | CD | 3D | 1B | CD | 3F | 5B | 8B | 1E | 42 | 17 | D1 | E3 | D1 | E3 | 81 |
| 00001D80 | C3 | DC | 14 | 8B | D3 | 8B | 1E | 58 | 14 | CD | 3D | 1B | CD | 3F | 5B | 8B |
| 00001D90 | 1E | 42 | 17 | D1 | E3 | D1 | E3 | 81 | C3 | 5C | 15 | 8B | D3 | 8B | 1E | 5A |
| 00001DA0 | 14 | CD | 3D | 1B | CD | 3F | 5B | 8B | 1E | 42 | 17 | D1 | E3 | D1 | E3 | 81 |
| 00001DB0 | C3 | DC | 15 | 8B | D3 | 8B | 1E | 5C | 14 | CD | 3D | 1B | CD | 3F | 5B | 8B |
| 00001DC0 | 1E | 42 | 17 | D1 | E3 | D1 | E3 | 81 | C3 | 5C | 16 | 8B | D3 | 8B | 1E | 5E |
| 00001DD0 | 14 | CD | 3D | 1B | CD | 3F | 5B | BB | 02 | 00 | 8B | 16 | 10 | 17 | CD | 3E |
| 00001DE0 | 28 | 83 | 3E | 2E | 17 | 06 | BB | 00 | 00 | 75 | 01 | 4B | 83 | 3E | 2E | 17 |
| 00001DF0 | 07 | BA | 00 | 00 | 75 | 01 | 4A | 0B | D3 | 83 | 3E | 2E | 17 | 0E | BB | 00 |
| 00001E00 | 00 | 75 | 01 | 4B | 0B | DA | 83 | 3E | 2E | 17 | 15 | BA | 00 | 00 | 75 | 01 |
| 00001E10 | 4A | 0B | D3 | 83 | 3E | 2E | 17 | 08 | BB | 00 | 00 | 74 | 01 | 4B | 83 | 3E |
| 00001E20 | 2E | 17 | 0F | B9 | 00 | 00 | 74 | 01 | 49 | 23 | CB | 83 | 3E | 2E | 17 | 16 |
| 00001E30 | BB | 00 | 00 | 74 | 01 | 4B | 23 | D9 | 83 | 3E | 2E | 17 | 1B | B9 | 00 | 00 |
| 00001E40 | 74 | 01 | 49 | 23 | CB | 83 | 3E | 2E | 17 | 20 | BB | 00 | 00 | 74 | 01 | 4B |
| 00001E50 | 23 | D9 | 83 | 3E | 40 | 17 | 04 | B9 | 00 | 00 | 74 | 01 | 49 | 23 | CB | 0B |
| 00001E60 | CA | 23 | C9 | 74 | 03 | E9 | 27 | 03 | BB | B3 | 20 | CD | 3F | 34 | 83 | 3E |
| 00001E70 | 2E | 17 | 08 | BB | 00 | 00 | 75 | 01 | 4B | 83 | 3E | 2E | 17 | 0F | BA | 00 |
| 00001E80 | 00 | 75 | 01 | 4A | 0B | D3 | 83 | 3E | 2E | 17 | 16 | BB | 00 | 00 | 75 | 01 |
| 00001E90 | 4B | 0B | DA | 83 | 3E | 2E | 17 | 1B | BA | 00 | 00 | 75 | 01 | 4A | 0B | D3 |
| 00001EA0 | 83 | 3E | 2E | 17 | 20 | BB | 00 | 00 | 75 | 01 | 4B | 0B | DA | 23 | DB | 74 |
| 00001EB0 | 03 | E9 | 16 | 01 | 83 | 3E | 2E | 17 | 20 | 7C | 03 | E9 | 06 | 00 | C7 | 06 |
| 00001EC0 | 64 | 17 | 20 | 00 | 83 | 3E | 2E | 17 | 1B | 7C | 03 | E9 | 06 | 00 | C7 | 06 |
| 00001ED0 | 64 | 17 | 1B | 00 | 83 | 3E | 2E | 17 | 16 | 7C | 03 | E9 | 06 | 00 | C7 | 06 |
| 00001EE0 | 64 | 17 | 16 | 00 | 83 | 3E | 2E | 17 | 0F | 7C | 03 | E9 | 06 | 00 | C7 | 06 |
| 00001EF0 | 64 | 17 | 0F | 00 | 83 | 3E | 2E | 17 | 08 | 7C | 03 | E9 | 06 | 00 | C7 | 06 |
| 00001F00 | 64 | 17 | 08 | 00 | 83 | 3E | 2E | 17 | 01 | 75 | 03 | E9 | 36 | 00 | A1 | 2E |
| 00001F10 | 17 | 48 | A3 | 66 | 17 | B8 | 01 | 00 | E9 | 1D | 00 | BB | 4E | 17 | CD | 3F |
| 00001F20 | 0F | BB | 68 | 17 | CD | 3F | 0F | BB | 6A | 17 | CD | 3F | 0F | 83 | 3E | 4E |
| 00001F30 | 17 | FF | 75 | E7 | A1 | 10 | 17 | 40 | A3 | 10 | 17 | A1 | 66 | 17 | 3B | 06 |
| 00001F40 | 10 | 17 | 7D | D7 | BB | 4E | 17 | CD | 3F | 0F | BB | 68 | 17 | CD | 3F | 0F |
| 00001F50 | BB | 6A | 17 | CD | 3F | 0F | 83 | 3E | 4E | 17 | FF | 75 | 03 | E9 | 2F | 02 |
| 00001F60 | A1 | 4E | 17 | 3B | 06 | 42 | 17 | 75 | DB | A1 | 6A | 17 | A3 | 6C | 17 | B8 |
| 00001F70 | 05 | 00 | F7 | 2E | 64 | 17 | 03 | 06 | 68 | 17 | 05 | FB | FF | A3 | 10 | 17 |
| 00001F80 | C7 | 06 | 5C | 14 | 00 | 00 | 83 | 3E | 64 | 17 | 08 | 74 | 03 | E9 | 09 | 00 |
| 00001F90 | C7 | 06 | 5E | 14 | 08 | 00 | E9 | 2E | 00 | 83 | 3E | 64 | 17 | 1B | BB | 00 |
| 00001FA0 | 00 | 75 | 01 | 4B | 83 | 3E | 64 | 17 | 20 | BA | 00 | 00 | 75 | 01 | 4A | 0B |
| 00001FB0 | D3 | 23 | D2 | 75 | 03 | E9 | 09 | 00 | C7 | 06 | 5E | 14 | 05 | 00 | E9 | 06 |
| 00001FC0 | 00 | C7 | 06 | 5E | 14 | 07 | 00 | E9 | 39 | 01 | C7 | 06 | 6E | 17 | 01 | 00 |
| 00001FD0 | 83 | 3E | 2E | 17 | 08 | 74 | 03 | E9 | 09 | 00 | C7 | 06 | 70 | 17 | 00 | 00 |
| 00001FE0 | E9 | 3F | 00 | 83 | 3E | 2E | 17 | 0F | 74 | 03 | E9 | 09 | 00 | C7 | 06 | 70 |
| 00001FF0 | 17 | 08 | 00 | E9 | 2C | 00 | 83 | 3E | 2E | 17 | 16 | 74 | 03 | E9 | 09 | 00 |
| 00002000 | C7 | 06 | 70 | 17 | 0F | 00 | E9 | 19 | 00 | 83 | 3E | 2E | 17 | 1B | 74 | 03 |
| 00002010 | E9 | 09 | 00 | C7 | 06 | 70 | 17 | 16 | 00 | E9 | 06 | 00 | C7 | 06 | 70 | 17 |
| 00002020 | 1B | 00 | BB | 4E | 17 | CD | 3F | 0F | BB | 68 | 17 | CD | 3F | 0F | BB | 6A |
| 00002030 | 17 | CD | 3F | 0F | A1 | 40 | 17 | 3B | 06 | 68 | 17 | BB | 00 | 00 | 75 | 01 |
| 00002040 | 4B | A1 | 42 | 17 | 3B | 06 | 6A | 17 | BA | 00 | 00 | 75 | 01 | 4A | 23 | D3 |
| 00002050 | A1 | 70 | 17 | 3B | 06 | 6E | 17 | BB | 00 | 00 | 7D | 01 | 4B | 23 | DA | 23 |

```
00002060  DB 74 03 E9 1C 00 83 3E  4E 17 FF 75 B5 A1 6E 17
00002070  40 A3 6E 17 A1 2E 17 3B  06 6E 17 75 03 E9 0F 01
00002080  EB A0 B8 05 00 F7 2E 6E  17 48 A3 10 17 A1 4E 17
00002090  A3 6C 17 C7 06 58 14 00  00 C7 06 5A 14 00 00 C7
000020A0  06 5C 14 00 00 83 3E 6E  17 09 7C 03 E9 09 00 A1
000020B0  6E 17 A3 5E 14 E9 4B 00  83 3E 6E 17 10 7C 03 E9
000020C0  0C 00 A1 6E 17 05 F8 FF  A3 5E 14 E9 35 00 83 3E
000020D0  6E 17 17 7C 03 E9 0C 00  A1 6E 17 05 F1 FF A3 5E
000020E0  14 E9 1F 00 83 3E 6E 17  1C 7C 03 E9 0C 00 A1 6E
000020F0  17 05 EA FF A3 5E 14 E9  09 00 A1 6E 17 05 E5 FF
00002100  A3 5E 14 BB 02 00 8B 16  10 17 CD 3E 26 8B 1E 6C
00002110  17 D1 E3 D1 E3 81 C3 5C  14 8B D3 8B 1E 56 14 CD
00002120  3D 1B CD 3F 5B 8B 1E 6C  17 D1 E3 D1 E3 81 C3 DC
00002130  14 8B D3 8B 1E 58 14 CD  3D 1B CD 3F 5B 8B 1E 6C
00002140  17 D1 E3 D1 E3 81 C3 5C  15 8B D3 8B 1E 5A 14 CD
00002150  3D 1B CD 3F 5B 8B 1E 6C  17 D1 E3 D1 E3 81 C3 DC
00002160  15 8B D3 8B 1E 5C 14 CD  3D 1B CD 3F 5B 8B 1E 6C
00002170  17 D1 E3 D1 E3 81 C3 5C  16 8B D3 8B 1E 5E 14 CD
00002180  3D 1B CD 3F 5B BB 02 00  8B 16 10 17 CD 3E 28 C3
00002190  BB FF FF CD 3E 32 BB 4E  1B B8 1C 17 CD 3F 55 BA
000021A0  72 17 CD 3F 61 33 DB CD  3D 21 93 A3 76 17 CD 3F
000021B0  BC BB 72 17 CD 3F 6A CD  3E 79 33 DB CD 3D 21 93
000021C0  A3 78 17 CD 3D 25 93 A3  7A 17 BB 72 18 CD 3F B5
000021D0  03 CD 3F B7 01 04 BB 1C  17 CD 3F B8 BB 32 18 B8
000021E0  1C 17 CD 3F 62 BA 00 00  75 01 4A BB D4 19 CD 3F
000021F0  62 B9 00 00 75 01 49 0B  CA 23 C9 74 03 E9 71 00
00002200  BB 5C 1B B8 1C 17 CD 3F  62 74 03 E9 0A 00 92 BB
00002210  32 18 CD 3F 61 E9 59 00  BB 62 1B B8 1C 17 CD 3F
00002220  62 74 03 E9 0A 00 92 BB  D4 19 CD 3F 61 E9 41 00
00002230  8B 1E 7A 17 CD 3E 42 8B  1E 78 17 CD 3E 42 33 DB
00002240  CD 3E 44 CD 3E 2B CD 3F  BC BB 1C 17 CD 3F BA BA
00002250  20 00 CD 3D 0E CD 3F 6A  CD 3E 79 8B 1E 7A 17 CD
00002260  3E 42 8B 1E 78 17 CD 3E  42 33 DB CD 3E 44 E9 59
00002270  FF 8B 1E 7A 17 CD 3E 42  8B 1E 76 17 CD 3E 42 33
00002280  DB CD 3E 44 CD 3F BC 8B  1E 78 17 2B 1E 76 17 43
00002290  BA 20 00 CD 3D 0E CD 3F  6A CD 3E 79 8B 1E 7A 17
000022A0  CD 3E 42 8B 1E 76 17 CD  3E 42 33 DB CD 3E 44 C3
000022B0  90 90 90 90 90 90 90 90  90 90 90 90 90 90 90 90
000022C0  90 90 90 90 90 90 90 90  90 90 90 90 90 90 90 90
000022D0  90 90 90 CD 3E 02 00 00  00 00 00 00 00 00 00 00
000022E0  CD 3F FF CB CD 3F FE CB  CD 3F FD CB CD 3F FC CB
000022F0  51 F3 A5 59 D1 E1 8E DA  8B 2E C6 13 8B C5 2B C2
00002300  3D 00 10 72 03 B8 00 10  8B D1 81 C2 00 03 72 0C
00002310  B1 04 D3 E0 0B C0 74 28  3B C2 73 24 BA 4A 00 0E
00002320  1F B4 09 CD 21 53 33 C0  50 CB 0D 0A 50 72 6F 67
00002330  72 61 6D 20 74 6F 6F 20  6C 61 72 67 65 0D 0A 24
00002340  5E 5F 1E 17 8B E2 57 56  8B CA 92 83 06 C4 13 07
00002350  FF 2E C4 13 B0 04 BF B0  05 A2 1F 00 C7 06 35 00
00002360  89 00 C7 06 37 00 0E 02  CB CB 5F 5E 5B 56 57 FF
00002370  36 00 00 FF 37 CB 00 00  00 00 00 00 00 00 00 00
00002380  03 00 94 17 20 23 23 00  06 00 9C 17 23 23 2C 23
00002390  23 23 02 00 A6 17 20 23  01 00 AC 17 23 00 01 00
000023A0  B2 17 38 00 01 00 B8 17  32 00 01 00 BE 17 34 00
000023B0  01 00 C4 17 36 00 02 00  CA 17 33 32 01 00 D0 17
000023C0  49 4F 0D 00 D6 17 44 3A  50 52 4F 47 52 41 4D 2E
000023D0  44 41 54 00 01 00 E8 17  52 81 09 00 EE 17 42 50
000023E0  41 52 54 2E 44 41 54 1E  09 00 FC 17 57 41 4C 4C
000023F0  43 2E 44 41 54 D6 00 00  00 80 23 00 0E 18 41 72
00002400  65 20 74 68 65 72 65 20  61 6E 79 20 6D 6F 72 65
00002410  20 63 65 6C 6C 73 20 74  6F 20 77 6F 72 6B 20 6F
00002420  6E 00 01 00 36 18 59 00  04 00 3C 18 4D 41 49 4E
00002430  15 00 44 18 50 61 72 74  20 23 20 28 30 3D 45 6D
00002440  70 74 79 20 42 69 6E 29  20 00 08 00 5E 18 20 3D
00002450  20 45 6E 74 65 72 08 00  6A 18 20 20 20 20 20 20
00002460  20 20 00 00 76 18 01 00  7A 18 30 00 03 00 80 18
00002470  20 20 20 00 1B 00 88 18  20 44 4F 45 53 20 4E 4F
00002480  54 20 45 58 49 53 54 21  20 2D 20 43 4F 4E 54 49
00002490  4E 55 45 00 11 00 A8 18  57 6F 72 6B 63 65 6E 74
000024A0  65 72 20 23 20 31 2D 39  3D 00 0C 00 BE 18 57 6F
000024B0  72 6B 63 65 6E 74 65 72  20 23 06 00 CE 18 20 20
000024C0  20 20 20 20 1E 00 D8 18  20 20 20 20 20 20 20 20
000024D0  20 20 20 20 20 20 20 20  20 20 20 20 20 20 20 20
000024E0  20 20 20 20 20 20 14 00  FA 18 20 41 4C 52 45 41
```

000024F0 44 59 20 45 58 49 53 54 53 20 41 54 20 58 03 00
00002500 12 19 20 2D 59 5F 03 00 1A 19 20 2D 20 00 08 00
00002510 22 19 43 4F 4E 54 49 4E 55 45 01 00 2E 19 20 00
00002520 09 00 34 19 42 49 4E 20 45 4D 50 54 59 00 07 00
00002530 42 19 50 61 72 74 20 23 20 00 13 00 4E 19 51 75
00002540 61 6E 74 69 74 79 20 20 20 20 20 20 20 20 20 20
00002550 20 00 13 00 66 19 4C 6F 77 20 53 74 6F 63 6B 20
00002560 20 20 20 20 20 20 20 20 20 00 13 00 7E 19 48 69
00002570 67 68 20 53 74 6F 63 6B 20 20 20 20 20 20 20 20
00002580 20 00 07 00 96 19 20 20 20 20 20 20 20 00 01 00
00002590 A2 19 2A 00 2C 00 A8 19 41 72 65 20 74 68 65 72
000025A0 65 20 61 6E 79 20 6D 6F 72 65 20 62 69 6E 73 20
000025B0 74 6F 20 61 73 73 69 67 6E 20 66 6F 72 20 63 65
000025C0 6C 6C 20 23 01 00 D8 19 4E 00 05 00 DE 19 4D 4F
000025D0 56 45 20 03 2A 00 E8 19 20 54 4F 20 54 48 45 20
000025E0 42 49 4E 20 59 4F 55 20 57 49 53 48 20 28 48 6F
000025F0 6D 65 20 6F 72 20 37 20 6B 65 79 3D 41 62 6F 72
00002600 74 29 07 00 16 1A 43 65 6C 6C 20 23 20 00 12 00
00002610 22 1A 45 4E 54 45 52 20 43 45 4C 4C 20 23 20 31
00002620 20 54 4F 20 02 00 38 1A 20 20 26 00 3E 1A 20 54
00002630 4F 20 42 49 4E 20 59 4F 55 20 57 49 53 48 20 28
00002640 48 6F 6D 65 20 6F 72 20 37 20 6B 65 79 3D 41 62
00002650 6F 72 74 29 0B 00 68 1A 20 2D 51 75 61 6E 74 69
00002660 74 79 3D 00 0D 00 78 1A 20 20 20 4C 6F 77 20 53
00002670 74 6F 63 6B 3D 00 0C 00 8A 1A 48 69 67 68 20 53
00002680 74 6F 63 6B 20 20 01 00 9A 1A 37 00 0A 00 A0 1A
00002690 20 3D 20 52 69 67 68 74 20 20 09 00 AE 1A 20 3D
000026A0 20 4C 65 66 74 20 20 A2 09 00 BC 1A 20 3D 20 53
000026B0 65 6C 65 63 74 00 08 00 CA 1A 51 75 61 6E 74 69
000026C0 74 79 09 00 D6 1A 4C 6F 77 20 53 74 6F 63 6B 00
000026D0 0E 00 E4 1A 48 69 67 68 20 53 74 6F 63 6B 20 20
000026E0 20 20 2E 00 F6 1A 41 72 65 20 74 68 65 72 65 20
000026F0 61 6E 79 20 6D 6F 72 65 20 71 75 61 6E 74 69 74
00002700 79 20 63 68 61 6E 67 65 73 20 66 6F 72 20 63 65
00002710 6C 6C 20 23 14 00 28 1B 20 54 4F 20 54 48 45 20
00002720 42 49 4E 20 59 4F 55 20 57 49 53 48 05 00 40 1B
00002730 20 20 20 20 20 00 04 00 4A 1B 20 20 20 20 09 00
00002740 52 1B 2D 20 59 20 6F 72 20 4E 20 00 01 00 60 1B
00002750 79 00 01 00 66 1B 6E 00 00 00 00 00 00 00 00 00
00002760 B0 20 20 31 2C 31 30 2C 34 2C 31 2C 39 2C 34 2C
00002770 31 2C 36 2C 34 2C 31 2C 36 2C 34 2C 31 2C 34 2C
00002780 34 2C 31 2C 33 2C 33 2C 31 2C 33 2C 33 2C 31 2C
00002790 31 35 2C 35 2C 31 2C 31 32 2C 34 2C 31 2C 31 32
000027A0 2C 34 2C 31 2C 36 2C 34 00 B1 20 20 31 2C 31 32
000027B0 2C 34 2C 31 2C 36 2C 34 2C 31 2C 36 2C 33 2C 31
000027C0 2C 32 30 2C 35 2C 31 2C 31 32 2C 34 2C 31 2C 31
000027D0 32 2C 34 2C 31 2C 36 2C 34 2C 31 2C 36 2C 34 2C
000027E0 31 2C 36 2C 34 2C 31 2C 36 2C 33 2C 31 2C 32 30
000027F0 2C 35 00 B2 20 20 31 2C 37 2C 34 2C 31 2C 34 2C
00002800 34 2C 31 2C 33 2C 34 2C 31 2C 33 2C 34 2C 31 2C
00002810 32 30 2C 34 2C 31 2C 37 2C 34 2C 31 2C 32 2C 34
00002820 2C 31 2C 32 2C 34 2C 31 2C 37 2C 34 2C 31 2C 32
00002830 30 2C 34 00 B3 20 20 31 2C 35 2C 39 2C 32 2C 35
00002840 2C 37 2C 33 2C 35 2C 35 2C 34 2C 35 2C 33 2C 35
00002850 2C 35 2C 31 2C 2D 31 2C 2D 31 2C 2D 31 00 B4 20
00002860 20 31 2C 35 2C 31 30 2C 32 2C 35 2C 38 2C 33 2C
00002870 35 2C 36 2C 34 2C 35 2C 34 2C 35 2C 35 2C 32 2C
00002880 2D 31 2C 2D 31 2C 2D 31 00 B5 20 20 31 2C 31 2C
00002890 37 2C 32 2C 31 2C 36 2C 35 2C 33 2C 37 2C 36 2C
000028A0 33 2C 36 2C 2D 31 2C 2D 31 2C 2D 31 00 B6 20 20
000028B0 31 2C 31 2C 39 2C 32 2C 31 2C 38 2C 34 2C 33 2C
000028C0 39 2C 2D 31 2C 2D 31 2C 2D 31 00 B7 20 20 31 2C
000028D0 31 2C 31 30 2C 34 2C 33 2C 31 30 2C 2D 31 2C 2D
000028E0 31 2C 2D 31 00 B8 20 20 2D 31 2C 2D 31 2C 2D 31
000028F0 00 B9 20 20 2D 31 2C 2D 31 2C 2D 31 00 BA 20 20
00002900 2D 31 2C 2D 31 2C 2D 31 00 BB 20 20 31 2C 35 2C
00002910 31 30 2C 32 2C 35 2C 38 2C 33 2C 35 2C 36 2C 34
00002920 2C 35 2C 34 2C 35 2C 35 2C 32 2C 36 2C 35 2C 32
00002930 30 2C 37 2C 35 2C 31 38 2C 38 2C 35 2C 31 36 2C
00002940 39 2C 35 2C 31 34 2C 31 30 2C 35 2C 31 32 2C 2D
00002950 31 2C 2D 31 2C 2D 31 00 BC 20 20 31 2C 35 2C 39
00002960 2C 32 2C 35 2C 37 2C 33 2C 35 2C 35 2C 34 2C 35
00002970 2C 33 2C 35 2C 35 2C 31 2C 36 2C 35 2C 31 39 2C
00002980 37 2C 35 2C 31 37 2C 38 2C 35 2C 31 35 2C 39 2C

```
00002990  35 2C 31 33 2C 31 30 2C  35 2C 31 31 2C 2D 31 2C
000029A0  2D 31 2C 2D 31 00 BD 20  20 31 2C 31 2C 31 35 2C
000029B0  32 2C 31 2C 31 34 2C 33  2C 32 2C 31 35 2C 34 2C
000029C0  32 2C 31 34 2C 35 2C 33  2C 31 35 2C 36 2C 33 2C
000029D0  31 34 2C 2D 31 2C 2D 31  2C 2D 31 00 BE 20 20 31
000029E0  2C 31 2C 31 33 2C 32 2C  31 2C 31 32 2C 33 2C 32
000029F0  2C 31 33 2C 34 2C 32 2C  31 32 2C 35 2C 33 2C 31
00002A00  33 2C 36 2C 33 2C 31 32  2C 2D 31 2C 2D 31 2C 2D
00002A10  31 00 BF 20 20 31 2C 31  2C 31 31 2C 32 2C 32 2C
00002A20  31 31 2C 33 2C 33 2C 31  31 2C 2D 31 2C 2D 31 2C
00002A30  2D 31 00 C0 20 20 2D 31  2C 2D 31 2C 2D 31 00 C1
00002A40  20 20 2D 31 2C 2D 31 2C  2D 31 00 C2 20 20 31 2C
00002A50  35 2C 39 2C 32 2C 35 2C  37 2C 33 2C 35 2C 35 2C
00002A60  34 2C 35 2C 33 2C 35 2C  35 2C 31 2C 36 2C 35 2C
00002A70  31 39 2C 37 2C 35 2C 31  37 2C 38 2C 35 2C 31 35
00002A80  2C 39 2C 35 2C 31 33 2C  31 30 2C 35 2C 31 31 2C
00002A90  2D 31 2C 2D 31 2C 2D 31  00 C3 20 20 31 2C 35 2C
00002AA0  31 30 2C 32 2C 35 2C 38  2C 33 2C 35 2C 36 2C 34
00002AB0  2C 35 2C 34 2C 35 2C 35  2C 32 2C 36 2C 35 2C 32
00002AC0  30 2C 37 2C 35 2C 31 38  2C 38 2C 35 2C 31 36 2C
00002AD0  39 2C 35 2C 31 34 2C 31  30 2C 35 2C 31 32 2C 2D
00002AE0  31 2C 2D 31 2C 2D 31 00  C4 20 20 32 2C 31 2C 36
00002AF0  2C 34 2C 32 2C 36 2C 36  2C 33 2C 36 2C 2D 31 2C
00002B00  2D 31 2C 2D 31 00 C5 20  20 31 2C 31 2C 38 2C 33
00002B10  2C 33 2C 38 2C 2D 31 2C  2D 31 2C 2D 31 00 C6 20
00002B20  20 31 2C 31 2C 31 30 2C  32 2C 31 2C 39 2C 35 2C
00002B30  33 2C 31 30 2C 36 2C 33  2C 39 2C 2D 31 2C 2D 31
00002B40  2C 2D 31 00 C7 20 20 2D  31 2C 2D 31 2C 2D 31 00
00002B50  C8 20 20 2D 31 2C 2D 31  2C 2D 31 00 C9 20 20 31
00002B60  2C 33 2C 39 2C 32 2C 33  2C 31 30 2C 33 2C 33 2C
00002B70  31 31 2C 34 2C 33 2C 31  32 2C 35 2C 33 2C 31 33
00002B80  2C 2D 31 2C 2D 31 2C 2D  31 00 CA 20 20 31 2C 33
00002B90  2C 31 2C 32 2C 33 2C 32  2C 33 2C 33 2C 33 2C 2D
00002BA0  31 2C 2D 31 2C 2D 31 00  CB 20 20 31 2C 31 2C 31
00002BB0  2C 32 2C 32 2C 31 2C 2D  31 2C 2D 31 2C 2D 31 00
00002BC0  CC 20 20 31 2C 32 2C 32  2C 2D 31 2C 2D 31 2C 2D
00002BD0  31 00 CD 20 20 2D 31 2C  2D 31 2C 2D 31 00 CE 20
00002BE0  20 31 2C 32 2C 38 2C 32  2C 32 2C 39 2C 33 2C 32
00002BF0  2C 31 30 2C 34 2C 32 2C  31 31 2C 35 2C 32 2C 31
00002C00  32 2C 2D 31 2C 2D 31 2C  2D 31 00 CF 20 20 31 2C
00002C10  32 2C 32 2C 2D 31 2C 2D  31 2C 2D 31 00 D0 20 20
00002C20  31 2C 32 2C 31 2C 2D 31  2C 2D 31 2C 2D 31 00 D1
00002C30  20 20 31 2C 33 2C 31 2C  32 2C 33 2C 32 2C 2D 31
00002C40  2C 2D 31 2C 2D 31 00 D2  20 20 2D 31 2C 2D 31 2C
00002C50  2D 31 00 FF FF 01 00 00  00 00 00 00 00 00 00 00
00002C60  59 1F A0 01 00 1E 51 06  3C 6D 74 03 E9 40 02 B4
00002C70  30 CD 21 3C 02 73 03 E9  3A 02 BA DC 02 8E DA 26
00002C80  8B 3E 02 00 26 8B 2E 2C  00 8E C2 57 B0 00 BA 45
00002C90  03 1E 0E 1F B4 3D CD 21  1F 72 03 E9 D8 00 8E C5
00002CA0  33 FF B9 05 00 BE 52 03  1E 0E 1F F3 A6 1F 74 13
00002CB0  26 8A 05 47 0A C0 75 F8  26 80 3D 00 75 E4 1E 07
00002CC0  EB 57 90 1E 07 1E 8E DD  8B F7 81 3C 00 20 1F 74
00002CD0  48 BF CA 13 8B D7 1E 8E  DD AC 3C 3B 74 07 3C 00
00002CE0  74 03 AA EB F4 1F 8B D8  81 FF CA 13 74 0F 80 7D
00002CF0  FF 3A 74 09 80 7D FF 5C  74 03 B0 5C AA 56 BE 45
00002D00  03 B9 0D 00 90 1E 0E 1F  F3 A4 1F 5E B0 00 B4 3D
00002D10  CD 21 73 62 80 FB 3B 74  B8 1E 0E 1F BA 07 03 B4
00002D20  09 CD 21 1F C6 06 CA 13  40 BA CA 13 B4 0A CD 21
00002D30  1E 0E 1F BA 04 03 B4 09  CD 21 1F B7 00 8A 1E CB
00002D40  13 80 BF CB 13 3A 74 0D  80 BF CB 13 5C 74 06 C6
00002D50  87 CC 13 5C 43 BA CC 13  8D BF CC 13 BE 45 03 B9
00002D60  0D 00 90 1E 0E 1F F3 A4  1F B0 00 B4 3D CD 21 73
00002D70  05 EB A6 E9 2F 01 5F 8B  D8 BA B0 13 B9 1A 00 B4
00002D80  3F CD 21 72 EE 81 3E B0  13 4D 5A 75 E6 8B 16 B8
00002D90  13 83 C2 1F 81 E2 E0 FF  8B EA B1 04 D3 E2 33 C9
00002DA0  B0 00 B4 42 CD 21 72 CB  8B 16 B4 13 4A B1 05 D3
00002DB0  E2 2B D5 A1 B2 13 05 0F  00 B1 04 D3 E8 03 D0 89
00002DC0  16 B4 13 2B FA 83 EF 14  8C D6 8B D4 83 C2 11 B1
00002DD0  04 D3 EA 03 F2 3B FE 73  03 E9 CE 00 8B EF 1E 8E
00002DE0  DF B9 FF FF 33 D2 B4 3F  CD 21 1F 72 86 8B 16 C8
00002DF0  13 41 B0 00 B4 42 CD 21  72 12 3B 0E B6 13 74 23
00002E00  BA B0 13 B9 04 00 B4 3F  CD 21 73 03 E9 96 00 8B
00002E10  3E B0 13 A1 B2 13 03 C5  8E C0 26 01 2D FF 0E B6
00002E20  13 75 E3 B4 3E CD 21 73  03 EB 7A 90 01 2E C6 13
```

```
00002E30  A1 C6 13 8B 1E C4 13 8E  C0 26 80 7F 03 05 75 5F
00002E40  26 80 7F 04 06 75 58 26  80 7F 05 00 72 51 5B 1E
00002E50  07 8E DD B9 D8 09 33 F6  8B FE FC F3 A5 06 1F 1E
00002E60  B8 18 02 8E D8 B9 A6 02  2B C8 D1 E1 D1 E1 D1 E1
00002E70  B8 55 04 8E C0 33 F6 33  FF F3 A5 1F 8C D1 8C D8
00002E80  2B C8 81 F9 00 10 76 03  B9 00 10 D1 E1 D1 E1 D1
00002E90  E1 BA 18 02 8E C2 33 F6  8B FE EA 10 00 0E 02 5B
00002EA0  BA BC 02 EB 12 BA E0 02  EB 0D BA A6 02 EB 08 BA
00002EB0  86 02 EB 03 BA 61 02 0E  1F B4 09 CD 21 33 C0 50
00002EC0  CB 0D 0A 4D 75 73 74 20  72 75 6E 20 75 6E 64 65
00002ED0  72 20 44 4F 53 20 32 2E  30 30 20 6F 72 20 6C 61
00002EE0  74 65 72 0D 0A 24 0D 0A  4D 75 73 74 20 6C 69 6E
00002EF0  6B 20 77 69 74 68 20 42  41 53 43 4F 4D 32 30 2E
00002F00  4C 49 42 0D 0A 24 0D 0A  50 72 6F 67 72 61 6D 20
00002F10  74 6F 6F 20 6C 61 72 67  65 0D 0A 24 0D 0A 57 72
00002F20  6F 6E 67 20 76 65 72 73  69 6F 6E 20 6F 66 20 72
00002F30  75 6E 74 69 6D 65 20 6D  6F 64 75 6C 65 0D 0A 24
00002F40  0D 0A 45 72 72 6F 72 20  69 6E 20 45 58 45 20 66
00002F50  69 6C 65 0D 0A 24 0D 0A  43 61 6E 6E 6F 74 20 66
00002F60  69 6E 64 20 0D 0A 24 0D  0A 43 61 6E 6E 6F 74 20
00002F70  66 69 6E 64 20 42 41 53  52 55 4E 32 30 2E 45 58
00002F80  45 0D 0A 45 6E 74 65 72  20 6E 65 77 20 70 61 74
00002F90  68 20 73 70 65 63 69 66  69 63 61 74 69 6F 6E 3A
00002FA0  20 24 0D 0A 24 42 41 53  52 55 4E 32 30 2E 45 58
00002FB0  45 00 50 41 54 48 3D
00000000  4D 5A 27 01 33 00 0C 00  20 00 E1 02 FF FF F3 08
00000010  00 02 29 AD 30 00 00 00  1E 00 00 00 01 00 12 00
00000020  00 00 14 00 00 00 16 00  00 00 33 00 00 00 38 00
00000030  00 00 86 00 93 05 1B 00  FD 05 01 02 FD 05 06 02
00000040  FD 05 11 02 FD 05 32 02  FD 05 3D 02 FD 05 00 00
00000050  00 00 00 00 00 00 00 00  00 00 00 00 00 00 00 00
00000060  00 00 00 00 00 00 00 00  00 00 00 00 00 00 00 00
00000070  00 00 00 00 00 00 00 00  00 00 00 00 00 00 00 00
00000080  00 00 00 00 00 00 00 00  00 00 00 00 00 00 00 00
00000090  00 00 00 00 00 00 00 00  00 00 00 00 00 00 00 00
000000A0  00 00 00 00 00 00 00 00  00 00 00 00 00 00 00 00
000000B0  00 00 00 00 00 00 00 00  00 00 00 00 00 00 00 00
000000C0  00 00 00 00 00 00 00 00  00 00 00 00 00 00 00 00
000000D0  00 00 00 00 00 00 00 00  00 00 00 00 00 00 00 00
000000E0  00 00 00 00 00 00 00 00  00 00 00 00 00 00 00 00
000000F0  00 00 00 00 00 00 00 00  00 00 00 00 00 00 00 00
00000100  00 00 00 00 00 00 00 00  00 00 00 00 00 00 00 00
00000110  00 00 00 00 00 00 00 00  00 00 00 00 00 00 00 00
00000120  00 00 00 00 00 00 00 00  00 00 00 00 00 00 00 00
00000130  00 00 00 00 00 00 00 00  00 00 00 00 00 00 00 00
00000140  00 00 00 00 00 00 00 00  00 00 00 00 00 00 00 00
00000150  00 00 00 00 00 00 00 00  00 00 00 00 00 00 00 00
00000160  00 00 00 00 00 00 00 00  00 00 00 00 00 00 00 00
00000170  00 00 00 00 00 00 00 00  00 00 00 00 00 00 00 00
00000180  00 00 00 00 00 00 00 00  00 00 00 00 00 00 00 00
00000190  00 00 00 00 00 00 00 00  00 00 00 00 00 00 00 00
000001A0  00 00 00 00 00 00 00 00  00 00 00 00 00 00 00 00
000001B0  00 00 00 00 00 00 00 00  00 00 00 00 00 00 00 00
000001C0  00 00 00 00 00 00 00 00  00 00 00 00 00 00 00 00
000001D0  00 00 00 00 00 00 00 00  00 00 00 00 00 00 00 00
000001E0  00 00 00 00 00 00 00 00  00 00 00 00 00 00 00 00
000001F0  00 00 00 00 00 00 00 00  00 00 00 00 00 00 00 00
00000200  62 6D 4B 49 54 20 20 20  20 20 00 00 F2 2B 40 14
00000210  EA 25 9D 05 FD 05 33 06  40 14 00 00 40 14 40 14
00000220  00 26 12 00 00 00 00 00  00 00 00 00 FF FF 80 00
00000230  9A 00 00 FD 05 9A 77 00  93 05 BB FF FF CD 3E 32
00000240  33 DB CD 3E 3C BB 00 26  BA 46 14 CD 3F 61 BB 0A
00000250  26 BA 4A 14 CD 3F 61 BB  10 26 BA 4E 14 CD 3F 61
00000260  BB 1E 26 BA FA 24 CD 3F  61 BB 24 26 BA FE 24 CD
00000270  3F 61 BB 2A 26 BA 02 25  CD 3F 61 BB 30 26 BA 06
00000280  25 CD 3F 61 BB 0D 00 CD  3D 05 BA 0A 25 CD 3F 61
00000290  BB 11 00 CD 3D 05 8B D3  BB C4 00 CD 3D 05 92 CD
000002A0  3F 55 8B D3 BB D9 00 CD  3D 05 92 CD 3F 55 BA 0E
000002B0  25 CD 3F 61 CD 3E 22 C7  06 12 25 20 00 C7 06 14
000002C0  25 05 00 BB 36 26 BA 16  25 CD 3F 61 BB 3C 26 BA
000002D0  1A 25 CD 3F 61 BB 42 26  CD 3E 1F BB 01 00 BA 48
000002E0  26 33 C9 CD 3E 1E BB 01  00 CD 3F B6 CD 3F B7 01
000002F0  01 BB 1E 25 CD 3F B8 CD  3E 22 BB 01 00 CD 3E 21
00000300  BB 5A 26 CD 3E 1F BB 01  00 BA 60 26 B9 30 00 CD
```

| | | | | | | | | | | | | | | | | |
|---|---|---|---|---|---|---|---|---|---|---|---|---|---|---|---|---|
| 00000310 | 3E | 1E | BB | 01 | 00 | CD | 3F | B3 | BB | 20 | 25 | BA | 02 | 00 | CD | 3F |
| 00000320 | B4 | BB | 24 | 25 | CD | 3F | B4 | BB | 28 | 25 | BA | 08 | 00 | CD | 3F | B4 |
| 00000330 | BB | 2C | 25 | BA | 1E | 00 | CD | 3F | B4 | BB | 03 | 00 | CD | 3E | 21 | BB |
| 00000340 | 5A | 26 | CD | 3E | 1F | BB | 03 | 00 | BA | 6E | 26 | B9 | 00 | 01 | CD | 3E |
| 00000350 | 1E | BB | 03 | 00 | CD | 3F | B3 | BB | 30 | 25 | BA | 02 | 00 | CD | 3F | B4 |
| 00000360 | BB | 34 | 25 | CD | 3F | B4 | BB | 38 | 25 | 8B | CA | BA | 0E | 00 | CD | 3F |
| 00000370 | B4 | BB | 3C | 25 | BA | 1E | 00 | CD | 3F | B4 | 8B | D1 | BB | 40 | 25 | CD |
| 00000380 | 3F | B4 | BB | 44 | 25 | BA | 04 | 00 | CD | 3F | B4 | 33 | C0 | E9 | 51 | 00 |
| 00000390 | 33 | C0 | E9 | 3E | 00 | BB | 03 | 00 | CD | 3F | B3 | 8B | 1E | 48 | 25 | 8B |
| 000003A0 | D3 | D1 | E3 | D1 | E3 | 8B | 0E | 4A | 25 | 8B | C1 | D1 | E1 | 03 | CB | 83 |
| 000003B0 | C1 | 38 | 87 | D1 | BB | 4C | 25 | CD | 3F | B4 | BB | 32 | 00 | F7 | EB | 03 |
| 000003C0 | C1 | D1 | E0 | D1 | E0 | 05 | 6A | 23 | 93 | BA | 02 | 00 | CD | 3F | B4 | A1 |
| 000003D0 | 4A | 25 | 40 | A3 | 4A | 25 | 83 | 3E | 4A | 25 | 01 | 7E | B8 | A1 | 48 | 25 |
| 000003E0 | 40 | A3 | 48 | 25 | 83 | 3E | 48 | 25 | 31 | 7E | A5 | 8B | 1E | 1E | 25 | 83 |
| 000003F0 | C3 | F9 | CD | 3F | 5E | 03 | 29 | 3E | 78 | 16 | 5A | 38 | BB | FF | FF | CD |
| 00000400 | 3E | 32 | CD | 3E | 22 | BB | 7A | 26 | CD | 3E | 0E | 83 | 3E | 50 | 25 | 00 |
| 00000410 | 75 | 03 | E9 | 1E | 0D | 8B | 1E | 52 | 25 | 43 | 43 | 3B | 1E | 50 | 25 | 75 |
| 00000420 | 03 | E9 | D4 | 0E | 8B | 1E | 52 | 25 | 43 | 43 | 43 | 43 | 3B | 1E | 50 | 25 |
| 00000430 | 75 | 03 | E9 | 71 | 29 | 8B | 1E | 52 | 25 | 43 | 3B | 1E | 50 | 25 | 75 | 03 |
| 00000440 | E9 | 74 | 06 | 8B | 1E | 52 | 25 | 43 | 43 | 43 | 3B | 1E | 50 | 25 | 75 | 03 |
| 00000450 | E9 | 5B | 51 | B8 | 05 | 00 | E9 | 2C | 00 | 83 | 3E | 4A | 25 | 06 | 75 | 03 |
| 00000460 | E9 | 1E | 00 | 8B | 1E | 4A | 25 | CD | 3E | 42 | BB | 42 | 00 | CD | 3E | 42 |
| 00000470 | 33 | DB | CD | 3E | 44 | CD | 3F | BC | BB | 82 | 26 | CD | 3F | 6A | CD | 3E |
| 00000480 | 79 | A1 | 4A | 25 | 40 | A3 | 4A | 25 | 83 | 3E | 4A | 25 | 0C | 7E | CA | 83 |
| 00000490 | 3E | 54 | 25 | 01 | 75 | 03 | E9 | 3F | 10 | 83 | 3E | 54 | 25 | 00 | 75 | 03 |
| 000004A0 | E9 | 03 | 00 | E9 | C2 | 11 | B8 | 05 | 00 | E9 | 2C | 00 | 83 | 3E | 4A | 25 |
| 000004B0 | 06 | 75 | 03 | E9 | 1E | 00 | 8B | 1E | 4A | 25 | CD | 3E | 42 | BB | 42 | 00 |
| 000004C0 | CD | 3E | 42 | 33 | DB | CD | 3E | 44 | CD | 3F | BC | BB | 82 | 26 | CD | 3F |
| 000004D0 | 6A | CD | 3E | 79 | A1 | 4A | 25 | 40 | A3 | 4A | 25 | 83 | 3E | 4A | 25 | 0C |
| 000004E0 | 7E | CA | A1 | 50 | 25 | 03 | 06 | 56 | 25 | 97 | D1 | E7 | C7 | 85 | 50 | 14 |
| 000004F0 | 00 | 00 | 8B | 1E | 50 | 25 | 83 | C3 | 06 | CD | 3E | 42 | BB | 01 | 00 | CD |
| 00000500 | 3E | 42 | 33 | DB | CD | 3E | 44 | CD | 3F | BC | BB | 3C | 00 | CD | 3D | 0D |
| 00000510 | CD | 3F | 6A | BB | 0E | 25 | CD | 3F | 6A | BB | 92 | 26 | CD | 3F | 6A | CD |
| 00000520 | 3E | 79 | 8B | 1E | 50 | 25 | 83 | C3 | 06 | CD | 3E | 42 | BB | 01 | 00 | CD |
| 00000530 | 3E | 42 | 33 | DB | CD | 3E | 44 | 33 | DB | CD | 3E | 33 | BB | 07 | 00 | CD |
| 00000540 | 3E | 35 | CD | 3F | BC | BB | 9E | 26 | CD | 3F | 6A | CD | 3E | 79 | BB | 07 |
| 00000550 | 00 | CD | 3E | 33 | 33 | DB | CD | 3E | 35 | 8B | 1E | 50 | 25 | 83 | C3 | 06 |
| 00000560 | CD | 3E | 42 | BB | 01 | 00 | CD | 3E | 42 | 33 | DB | CD | 3E | 44 | BB | AA |
| 00000570 | 26 | CD | 3F | B5 | 02 | BB | 58 | 25 | CD | 3F | 5A | BB | 58 | 25 | CD | 3F |
| 00000580 | BA | 83 | FB | 08 | 7E | 03 | E9 | 69 | FF | BB | 01 | 00 | BA | 01 | 00 | CD |
| 00000590 | 3E | 26 | BB | 24 | 25 | CD | 3D | 18 | 93 | A3 | 5C | 25 | BB | 01 | 00 | 8B |
| 000005A0 | 16 | 5C | 25 | CD | 3E | 26 | BB | 24 | 25 | CD | 3D | 18 | 93 | A3 | 5E | 25 |
| 000005B0 | BB | AE | 26 | B8 | 28 | 25 | CD | 3F | 55 | BA | 60 | 25 | CD | 3F | 61 | BB |
| 000005C0 | 60 | 25 | BA | AE | 26 | 8B | CB | CD | 3D | 09 | 4B | 87 | D9 | 8B | D1 | 8B |
| 000005D0 | C3 | CD | 3D | 0B | 92 | CD | 3F | 61 | BB | 58 | 25 | B8 | 60 | 25 | CD | 3F |
| 000005E0 | 62 | 74 | 03 | E9 | 0C | 00 | BB | 2C | 25 | BA | 64 | 25 | CD | 3F | 61 | E9 |
| 000005F0 | C7 | 00 | 83 | 3E | 5E | 25 | 00 | BB | 00 | 00 | 75 | 01 | 4B | 8B | D3 | BB |
| 00000600 | 58 | 25 | B8 | 60 | 25 | CD | 3F | 62 | B9 | 00 | 00 | 76 | 01 | 49 | 0B | CA |
| 00000610 | 23 | C9 | 74 | 03 | E9 | 09 | 00 | A1 | 5E | 25 | A3 | 5C | 25 | E9 | 7C | FF |
| 00000620 | CD | 3E | 2B | BB | 18 | 00 | CD | 3E | 42 | BB | 01 | 00 | CD | 3E | 42 | 33 |
| 00000630 | DB | CD | 3E | 44 | CD | 3F | BC | BB | AE | 26 | CD | 3F | 6A | CD | 3E | 79 |
| 00000640 | BB | B4 | 26 | B8 | 58 | 25 | CD | 3F | 55 | BA | 68 | 25 | CD | 3F | 61 | E8 |
| 00000650 | B4 | 53 | 8B | 1E | 50 | 25 | 83 | C3 | 06 | CD | 3E | 42 | BB | 01 | 00 | CD |
| 00000660 | 3E | 42 | 33 | DB | CD | 3E | 44 | 33 | DB | CD | 3E | 33 | BB | 07 | 00 | CD |
| 00000670 | 3E | 35 | CD | 3F | BC | BB | 9E | 26 | CD | 3F | 6A | CD | 3E | 79 | BB | 07 |
| 00000680 | 00 | CD | 3E | 33 | 33 | DB | CD | 3E | 35 | 8B | 1E | 50 | 25 | 83 | C3 | 06 |
| 00000690 | CD | 3E | 42 | BB | 01 | 00 | CD | 3E | 42 | 33 | DB | CD | 3E | 44 | BB | AA |
| 000006A0 | 26 | CD | 3F | B5 | 02 | BB | 58 | 25 | CD | 3F | 5A | BB | 58 | 25 | CD | 3F |
| 000006B0 | BA | 83 | FB | 08 | 7F | 9C | E9 | D0 | FE | 8B | 1E | 50 | 25 | 83 | C3 | 06 |
| 000006C0 | CD | 3E | 42 | BB | 01 | 00 | CD | 3E | 42 | 33 | DB | CD | 3E | 44 | CD | 3F |
| 000006D0 | BC | BB | 28 | 25 | CD | 3F | 6A | BB | D4 | 26 | CD | 3F | 6A | BB | 2C | 25 |
| 000006E0 | CD | 3F | 6E | CD | 3E | 79 | 8B | 3E | 50 | 25 | D1 | E7 | 8B | 85 | 5A | 14 |
| 000006F0 | A3 | 6C | 25 | 8B | 1E | 50 | 25 | 83 | C3 | 06 | CD | 3E | 42 | BB | 39 | 00 |
| 00000700 | CD | 3E | 42 | 33 | DB | CD | 3E | 44 | CD | 3F | BC | BB | AE | 26 | CD | 3F |
| 00000710 | 6A | CD | 3E | 79 | 8B | 1E | 50 | 25 | 83 | C3 | 06 | CD | 3E | 42 | BB | 39 |
| 00000720 | 00 | CD | 3E | 42 | 33 | DB | CD | 3E | 44 | BB | AA | 26 | CD | 3F | B5 | 00 |
| 00000730 | CD | 3F | B7 | 01 | 01 | BB | 6E | 25 | CD | 3F | B8 | 83 | 3E | 6E | 25 | 01 |
| 00000740 | BB | 00 | 00 | 7D | 01 | 4B | 83 | 3E | 6E | 25 | 08 | BA | 00 | 00 | 7E | 01 |
| 00000750 | 4A | 0B | D3 | 23 | D2 | 75 | 8F | B8 | 01 | 00 | E9 | 4B | 00 | 8B | 3E | 70 |
| 00000760 | 25 | 8B | DF | D1 | E7 | 8B | 95 | 50 | 14 | 3B | 16 | 6C | 25 | B9 | 00 | 00 |
| 00000770 | 75 | 01 | 49 | 8B | 16 | 50 | 25 | 8B | C2 | 83 | C2 | 05 | 3B | DA | 89 | 4E |
| 00000780 | FA | B9 | 00 | 00 | 74 | 01 | 49 | 23 | 4E | FA | 97 | D1 | E7 | 8B | 9D | 42 |
| 00000790 | 18 | 3B | 1E | 6E | 25 | BA | 00 | 00 | 75 | 01 | 4A | 23 | D1 | 23 | D2 | 74 |
| 000007A0 | 03 | E9 | 42 | FF | A1 | 70 | 25 | 40 | A3 | 70 | 25 | 81 | 3E | 70 | 25 | FA |

```
000007B0  00 7E AA 8B 1E 50 25 83  C3 06 CD 3E 42 BB 39 00
000007C0  CD 3E 44 B8 01 00 E9 2F  00 8B 3E 48 25 D1 E7 8B
000007D0  9D 50 14 3B 1E 5C 25 BA  00 00 75 01 4A 8B 9D 38
000007E0  18 3B 1E 6E 25 B9 00 00  75 01 49 23 CA 23 C9 74
000007F0  03 E9 FE FC A1 48 25 40  A3 48 25 81 3E 48 25 FA
00000800  00 7E C6 8B 1E 50 25 83  C3 06 CD 3E 42 BB 39 00
00000810  CD 3E 42 33 DB CD 3E 44  CD 3F BC BB DA 26 CD 3F
00000820  6A CD 3E 79 8B 1E 50 25  83 C3 06 CD 3E 42 BB 39
00000830  00 CD 3E 42 33 DB CD 3E  44 CD 3F BC 8B 1E 6E 25
00000840  CD 3F 69 CD 3E 79 8B 1E  50 25 83 C3 06 CD 3E 42
00000850  BB 2C 00 CD 3E 42 33 DB  CD 3E 44 33 DB CD 3E 33
00000860  BB 07 00 CD 3E 35 CD 3F  BC BB 9E 26 CD 3F 6A CD
00000870  3E 79 BB 07 00 CD 3E 33  33 DB CD 3E 35 8B 1E 50
00000880  25 83 C3 06 CD 3E 42 BB  2C 00 CD 3E 42 33 DB CD
00000890  3E 44 BB AA 26 CD 3F B5  00 CD 3F B7 01 01 BB 72
000008A0  25 CD 3F B8 83 3E 72 25  00 7C 9B 8B 1E 50 25 83
000008B0  C3 06 CD 3E 42 BB 2C 00  CD 3E 42 33 DB CD 3E 44
000008C0  CD 3F BC BB 0A 00 CD 3D  0D CD 3F 6A CD 3E 79 8B
000008D0  1E 50 25 83 C3 06 CD 3E  42 BB 2B 00 CD 3E 42 33
000008E0  DB CD 3E 44 BB 46 14 CD  3F BD 8B 1E 72 25 CD 3F
000008F0  69 CD 3E 79 8B 1E 50 25  83 C3 06 CD 3E 42 BB 3C
00000900  00 CD 3E 42 33 DB CD 3E  44 BB 11 00 CD 3D 05 93
00000910  BB E8 26 CD 3F 55 BA 68  25 CD 3F 61 E8 E7 50 BB
00000920  F2 26 B8 68 25 CD 3F 62  75 03 E9 2A 00 8B 1E 50
00000930  25 83 C3 06 CD 3E 42 BB  01 00 CD 3E 42 33 DB CD
00000940  3E 44 CD 3F BC BB 4F 00  BA 20 00 CD 3D 0E CD 3F
00000950  6A CD 3E 79 E9 9B FB C7  06 74 25 01 00 A1 56 25
00000960  03 06 50 25 97 D1 E7 8B  1E 6E 25 89 9D 38 18 A1
00000970  56 25 03 06 50 25 D1 E0  D1 E0 05 7E 1F 92 BB 58
00000980  25 CD 3F 61 A1 50 25 03  06 56 25 97 D1 E7 8B 1E
00000990  5C 25 89 9D 50 14 A1 50  25 03 06 56 25 97 D1 E7
000009A0  8B 1E 72 25 89 9D 44 16  C7 06 54 25 00 00 BB 05
000009B0  00 CD 3E 42 BB 44 00 CD  3E 42 33 DB CD 3E 44 CD
000009C0  3F BC BB F8 26 CD 3F 6A  CD 3E 79 BB 17 00 CD 3E
000009D0  33 33 DB CD 3E 35 CD 3F  BC BB 5F 00 CD 3D 05 CD
000009E0  3F 6A CD 3E 79 BB 07 00  CD 3E 33 33 DB CD 3E 35
000009F0  BB 07 00 CD 3E 42 BB 44  00 CD 3E 42 33 DB CD 3E
00000A00  44 CD 3F BC BB 18 00 CD  3D 05 CD 3F 6A BB 02 27
00000A10  CD 3F 6A CD 3E 79 BB 08  00 CD 3E 42 BB 44 00 CD
00000A20  3E 42 33 DB CD 3E 44 CD  3F BC BB 19 00 CD 3D 05
00000A30  CD 3F 6A BB 0C 27 CD 3F  6A CD 3E 79 BB 09 00 CD
00000A40  3E 42 BB 44 00 CD 3E 42  33 DB CD 3E 44 CD 3F BC
00000A50  BB 1A 00 CD 3D 05 CD 3F  6A BB 18 27 CD 3F 6A CD
00000A60  3E 79 BB 0A 00 CD 3E 42  BB 43 00 CD 3E 42 33 DB
00000A70  CD 3E 44 CD 3F BC BB 11  00 CD 3D 05 CD 3F 6A BB
00000A80  C4 00 CD 3D 05 CD 3F 6A  BB 24 27 CD 3F 6A CD 3E
00000A90  79 BB 0C 00 CD 3E 42 BB  42 00 CD 3E 42 33 DB CD
00000AA0  3E 44 CD 3F BC BB 0E 25  CD 3F 6A BB 30 27 CD 3F
00000AB0  6A CD 3E 79 E9 A3 2E C7  06 74 25 01 00 B8 05 00
00000AC0  E9 2C 00 83 3E 4A 25 06  75 03 E9 1E 00 8B 1E 4A
00000AD0  25 CD 3E 42 BF 42 00 CD  3E 42 33 DB CD 3E 44 CD
00000AE0  3F BC BB 82 26 CD 3F 6A  CD 3E 79 A1 4A 25 40 A3
00000AF0  4A 25 83 3E 4A 25 0C 7E  CA C7 06 50 25 00 00 C7
00000B00  06 76 25 01 00 BB 06 00  CD 3E 42 BB 01 00 CD 3E
00000B10  42 33 DB CD 3E 44 CD 3F  BC BB 4F 00 CD 3D 0D CD
00000B20  3F 6A CD 3E 79 8B 1E 50  25 83 C3 06 CD 3E 42 BB
00000B30  01 00 CD 3E 42 33 DB CD  3E 44 CD 3F BC BB 3C 00
00000B40  CD 3D 0D CD 3F 6A BB 0E  25 CD 3F 6A BB 92 26 CD
00000B50  3F 6A CD 3E 79 8B 1E 50  25 83 C3 06 CD 3E 42 BB
00000B60  01 00 CD 3E 42 33 DB CD  3E 44 33 DB CD 3E 33 BB
00000B70  07 00 CD 3E 35 CD 3F BC  BB 9E 26 CD 3F 6A CD 3E
00000B80  79 BB 07 00 CD 3E 33 33  DB CD 3E 35 8B 1E 50 25
00000B90  83 C3 06 CD 3E 42 BB 01  00 CD 3E 42 33 DB CD 3E
00000BA0  44 BB AA 26 CD 3F B5 02  BB 58 25 CD 3F 5A BB 58
00000BB0  25 CD 3F BA 83 FB 08 7E  03 E9 69 FF BB 01 00 BA
00000BC0  01 00 CD 3E 26 BB 24 25  CD 3D 18 93 A3 5C 25 BB
00000BD0  01 00 8B 16 5C 25 CD 3E  26 BB 24 25 CD 3D 18 93
00000BE0  A3 5E 25 BB AE 26 B8 28  25 CD 3F 55 BA 60 25 CD
00000BF0  3F 61 BB 60 25 BA AE 26  8B CB CD 3D 09 4B 87 D9
00000C00  8B D1 8B C3 CD 3D 0B 92  CD 3F 61 BB 58 25 B8 60
00000C10  25 CD 3F 62 74 03 E9 0C  00 BB 2C 25 BA 64 25 CD
00000C20  3F 61 E9 BF 00 83 3E 5E  25 00 BB 00 00 75 01 4B
00000C30  8B D3 BB 58 25 B8 60 25  CD 3F 62 B9 00 00 76 01
00000C40  49 0B CA 23 C9 74 03 E9  09 00 A1 5E 25 A3 5C 25
00000C50  E9 7C FF CD 3E 2B BB 18  00 CD 3E 42 BB 01 00 CD
```

| | | | | | | | | | | | | | | | | |
|---|---|---|---|---|---|---|---|---|---|---|---|---|---|---|---|---|
| 00000C60 | 3E | 42 | 33 | DB | CD | 3E | 44 | CD | 3F | BC | BB | AE | 26 | CD | 3F | 6A |
| 00000C70 | CD | 3E | 79 | BB | B4 | 26 | B8 | 58 | 25 | CD | 3F | 55 | BA | 68 | 25 | CD |
| 00000C80 | 3F | 61 | E8 | 81 | 4D | BB | 06 | 00 | CD | 3E | 42 | BB | 01 | 00 | CD | 3E |
| 00000C90 | 42 | 33 | DB | CD | 3E | 44 | 33 | DB | CD | 3E | 33 | BB | 07 | 00 | CD | 3E |
| 00000CA0 | 35 | CD | 3F | BC | BB | 9E | 26 | CD | 3F | 6A | CD | 3E | 79 | BB | 07 | 00 |
| 00000CB0 | CD | 3E | 33 | 33 | DB | CD | 3E | 35 | BB | 06 | 00 | CD | 3E | 42 | BB | 01 |
| 00000CC0 | 00 | CD | 3E | 42 | 33 | DB | CD | 3E | 44 | BB | AA | 26 | CD | 3F | B5 | 02 |
| 00000CD0 | BB | 58 | 25 | CD | 3F | 5A | BB | 58 | 25 | CD | 3F | BA | 83 | FB | 08 | 7F |
| 00000CE0 | A4 | E9 | D8 | FE | 8B | 1E | 50 | 25 | 83 | C3 | 06 | CD | 3E | 42 | BB | 01 |
| 00000CF0 | 00 | CD | 3E | 42 | 33 | DB | CD | 3E | 44 | CD | 3F | BC | BB | 28 | 25 | CD |
| 00000D00 | 3F | 6A | BB | D4 | 26 | CD | 3F | 6A | BB | 2C | 25 | CD | 3F | 6E | CD | 3E |
| 00000D10 | 79 | 8B | 3E | 50 | 25 | D1 | E7 | 8B | 85 | 5A | 14 | A3 | 6C | 25 | 8B | 1E |
| 00000D20 | 50 | 25 | 83 | C3 | 06 | CD | 3E | 42 | BB | 39 | 00 | CD | 3E | 42 | 33 | DB |
| 00000D30 | CD | 3E | 44 | CD | 3F | BC | BB | AE | 26 | CD | 3F | 6A | CD | 3E | 79 | 8B |
| 00000D40 | 1E | 50 | 25 | 83 | C3 | 06 | CD | 3E | 42 | BB | 39 | 00 | CD | 3E | 42 | 33 |
| 00000D50 | DB | CD | 3E | 44 | BB | AA | 26 | CD | 3F | B5 | 00 | CD | 3F | B7 | 01 | 01 |
| 00000D60 | BB | 6E | 25 | CD | 3F | B8 | 83 | 3E | 6E | 25 | 01 | BB | 00 | 00 | 7D | 01 |
| 00000D70 | 4B | 83 | 3E | 6E | 25 | 08 | BA | 00 | 00 | 7E | 01 | 4A | 0B | D3 | 23 | D2 |
| 00000D80 | 75 | 8F | BB | 06 | 00 | CD | 3E | 42 | BB | 39 | 00 | CD | 3E | 42 | 33 | DB |
| 00000D90 | CD | 3E | 44 | B8 | 01 | 00 | E9 | 2F | 00 | 8B | 3E | 48 | 25 | D1 | E7 | 8B |
| 00000DA0 | 9D | 50 | 14 | 3B | 1E | 5C | 25 | BA | 00 | 00 | 75 | 01 | 4A | 8B | 9D | 38 |
| 00000DB0 | 18 | 3B | 1E | 6E | 25 | B9 | 00 | 00 | 75 | 01 | 49 | 23 | CA | 23 | C9 | 74 |
| 00000DC0 | 03 | E9 | 61 | FD | A1 | 48 | 25 | 40 | A3 | 48 | 25 | 81 | 3E | 48 | 25 | FA |
| 00000DD0 | 00 | 7E | C6 | 8B | 1E | 50 | 25 | 83 | C3 | 06 | CD | 3E | 42 | BB | 39 | 00 |
| 00000DE0 | CD | 3E | 42 | 33 | DB | CD | 3E | 44 | CD | 3F | BC | 8B | 1E | 6E | 25 | CD |
| 00000DF0 | 3F | 69 | CD | 3E | 79 | BB | 06 | 00 | CD | 3E | 42 | BB | 2C | 00 | CD | 3E |
| 00000E00 | 42 | 33 | DB | CD | 3E | 44 | 33 | DB | CD | 3E | 33 | BB | 07 | 00 | CD | 3E |
| 00000E10 | 35 | CD | 3F | BC | BB | 9E | 26 | CD | 3F | 6A | CD | 3E | 79 | BB | 06 | 00 |
| 00000E20 | CD | 3E | 42 | BB | 2C | 00 | CD | 3E | 42 | 33 | DB | CD | 3E | 44 | BB | 07 |
| 00000E30 | 00 | CD | 3E | 33 | 33 | DB | CD | 3E | 35 | BB | AA | 26 | CD | 3F | B5 | 00 |
| 00000E40 | CD | 3F | B7 | 01 | 01 | BB | 72 | 25 | CD | 3F | B8 | 83 | 3E | 72 | 25 | 00 |
| 00000E50 | 7C | A3 | BB | 06 | 00 | CD | 3E | 42 | BB | 2C | 00 | CD | 3E | 42 | 33 | DB |
| 00000E60 | CD | 3E | 44 | CD | 3F | BC | BB | 0A | 00 | CD | 3D | 0D | CD | 3F | 6A | CD |
| 00000E70 | 3E | 79 | BB | 06 | 00 | CD | 3E | 42 | BB | 2B | 00 | CD | 3E | 42 | 33 | DB |
| 00000E80 | CD | 3E | 44 | BB | 46 | 14 | CD | 3F | BD | 8B | 1E | 72 | 25 | CD | 3F | 69 |
| 00000E90 | CD | 3E | 79 | BB | 06 | 00 | CD | 3E | 42 | BB | 3D | 00 | CD | 3E | 42 | 33 |
| 00000EA0 | DB | CD | 3E | 44 | BB | 11 | 00 | CD | 3D | 05 | 93 | BB | E8 | 26 | CD | 3F |
| 00000EB0 | 55 | BA | 68 | 25 | CD | 3F | 61 | E8 | 4C | 4B | BB | F2 | 26 | B8 | 68 | 25 |
| 00000EC0 | CD | 3F | 62 | 75 | 03 | E9 | 26 | 00 | BB | 06 | 00 | CD | 3E | 42 | BB | 01 |
| 00000ED0 | 00 | CD | 3E | 42 | 33 | DB | CD | 3E | 44 | CD | 3F | BC | BB | 4F | 00 | BA |
| 00000EE0 | 20 | 00 | CD | 3D | 0E | CD | 3F | 6A | CD | 3E | 79 | E9 | 59 | 01 | BB | 06 |
| 00000EF0 | 00 | CD | 3E | 42 | BB | 01 | 00 | CD | 3E | 42 | 33 | DB | CD | 3E | 44 | CD |
| 00000F00 | 3F | BC | BB | 4F | 00 | CD | 3D | 0D | CD | 3F | 6A | CD | 3E | 79 | B8 | F9 |
| 00000F10 | 00 | E9 | 53 | 00 | 8B | 1E | 48 | 25 | D1 | E3 | D1 | E3 | 8B | D3 | 81 | C3 |
| 00000F20 | 82 | 1F | 81 | C2 | 7E | 1F | 87 | D3 | CD | 3F | 61 | 8B | 3E | 48 | 25 | D1 |
| 00000F30 | E7 | 8B | 9D | 38 | 18 | 89 | 9D | 3A | 18 | B8 | 01 | 00 | E9 | 1A | 00 | B8 |
| 00000F40 | FA | 00 | F7 | 2E | 4A | 25 | 97 | 03 | 3E | 48 | 25 | D1 | E7 | 8B | 9D | 5C |
| 00000F50 | 12 | 89 | 9D | 5E | 12 | A1 | 4A | 25 | 40 | A3 | 4A | 25 | 83 | 3E | 4A | 25 |
| 00000F60 | 02 | 7E | DC | A1 | 48 | 25 | 48 | A3 | 48 | 25 | 83 | 3E | 48 | 25 | 01 | 7D |
| 00000F70 | A3 | A1 | 5C | 25 | A3 | 52 | 14 | A1 | 72 | 25 | A3 | 46 | 16 | A1 | 6E | 25 |
| 00000F80 | A3 | 3A | 18 | C7 | 06 | 74 | 25 | 01 | 00 | BB | 58 | 25 | BA | 82 | 1F | CD |
| 00000F90 | 3F | 61 | C7 | 06 | 52 | 25 | 00 | 00 | BB | 07 | 00 | CD | 3E | 42 | BB | 01 |
| 00000FA0 | 00 | CD | 3E | 42 | 33 | DB | CD | 3E | 44 | B8 | 01 | 00 | E9 | 8B | 00 | A1 |
| 00000FB0 | 48 | 25 | 03 | 06 | 56 | 25 | 97 | D1 | E7 | 83 | BD | 50 | 14 | 00 | 7F | 03 |
| 00000FC0 | E9 | 84 | 00 | A1 | 48 | 25 | 03 | 06 | 56 | 25 | 97 | D1 | E7 | BB | 01 | 00 |
| 00000FD0 | 8B | 95 | 50 | 14 | CD | 3E | 26 | CD | 3F | BC | BB | 28 | 25 | CD | 3F | 6A |
| 00000FE0 | BB | D4 | 26 | CD | 3F | 6A | BB | 2C | 25 | CD | 3F | 6A | BB | 2B | 00 | CD |
| 00000FF0 | 3F | 37 | BB | AA | 26 | CD | 3F | 6A | BB | 46 | 14 | CD | 3E | 0A | A1 | 48 |
| 00001000 | 25 | 03 | 06 | 56 | 25 | 97 | D1 | E7 | 8B | 9D | 44 | 16 | CD | 3F | 69 | CD |
| 00001010 | 3E | 79 | CD | 3F | BC | BB | 9E | 26 | CD | 3F | 6A | A1 | 56 | 25 | 03 | 06 |
| 00001020 | 48 | 25 | 97 | D1 | E7 | 8B | 9D | 38 | 18 | CD | 3F | 6D | CD | 3E | 79 | A1 |
| 00001030 | 52 | 25 | 40 | A3 | 52 | 25 | A1 | 48 | 25 | 40 | A3 | 48 | 25 | 83 | 3E | 48 |
| 00001040 | 25 | 0D | 7F | 03 | E9 | 68 | FF | BB | 06 | 00 | CD | 3E | 42 | BB | 01 | 00 |
| 00001050 | CD | 3E | 42 | 33 | DB | CD | 3E | 44 | CD | 3F | BC | BB | 3E | 27 | CD | 3F |
| 00001060 | 6A | CD | 3E | 79 | BB | 05 | 00 | CD | 3E | 42 | BB | 44 | 00 | CD | 3E | 42 |
| 00001070 | 33 | DB | CD | 3E | 44 | CD | 3F | BC | BB | 50 | 27 | CD | 3F | 6A | CD | 3E |
| 00001080 | 79 | BB | 17 | 00 | CD | 3E | 33 | 33 | DB | CD | 3E | 35 | CD | 3F | BC | BB |
| 00001090 | 5F | 00 | CD | 3D | 05 | CD | 3F | 6A | CD | 3E | 79 | BB | 07 | 00 | CD | 3E |
| 000010A0 | 33 | 33 | DB | CD | 3E | 35 | BB | 07 | 00 | CD | 3E | 42 | BB | 44 | 00 | CD |
| 000010B0 | 3E | 42 | 33 | DB | CD | 3E | 44 | CD | 3F | BC | BB | 18 | 00 | CD | 3D | 05 |
| 000010C0 | CD | 3F | 6A | BB | 02 | 27 | CD | 3F | 6A | CD | 3E | 79 | BB | 08 | 00 | CD |
| 000010D0 | 3E | 42 | BB | 44 | 00 | CD | 3E | 42 | 33 | DB | CD | 3E | 44 | CD | 3F | BC |
| 000010E0 | BB | 19 | 00 | CD | 3D | 05 | CD | 3F | 6A | BB | 0C | 27 | CD | 3F | 6A | CD |
| 000010F0 | 3E | 79 | BB | 0C | 00 | CD | 3E | 42 | BB | 42 | 00 | CD | 3E | 42 | 33 | DB |

| | | | | | | | | | | | | | | | | |
|---|---|---|---|---|---|---|---|---|---|---|---|---|---|---|---|---|
| 00001100 | CD | 3E | 44 | CD | 3F | BC | BB | 11 | 00 | CD | 3D | 05 | CD | 3F | 6A | BB |
| 00001110 | C4 | 00 | CD | 3D | 05 | CD | 3F | 6A | BB | D9 | 00 | CD | 3D | 05 | CD | 3F |
| 00001120 | 6A | BB | 30 | 27 | CD | 3F | 6A | CD | 3E | 79 | C7 | 06 | 76 | 25 | 00 | 00 |
| 00001130 | E9 | BF | 28 | 83 | 3E | 56 | 25 | 00 | 75 | 03 | E9 | 43 | 24 | A1 | 56 | 25 |
| 00001140 | 05 | F3 | FF | A3 | 56 | 25 | BB | 07 | 00 | CD | 3E | 42 | BB | 01 | 00 | CD |
| 00001150 | 3E | 42 | 33 | DB | CD | 3E | 44 | B8 | 01 | 00 | E9 | 13 | 00 | CD | 3F | BC |
| 00001160 | BB | 4F | 00 | CD | 3D | 0D | CD | 3F | 6E | CD | 3E | 79 | A1 | 48 | 25 | 40 |
| 00001170 | A3 | 48 | 25 | 83 | 3E | 48 | 25 | 0D | 7E | E3 | C7 | 06 | 52 | 25 | 00 | 00 |
| 00001180 | BB | 07 | 00 | CD | 3E | 42 | BB | 01 | 00 | CD | 3E | 42 | 33 | DB | CD | 3E |
| 00001190 | 44 | B8 | 01 | 00 | E9 | 8B | 00 | A1 | 48 | 25 | 03 | 06 | 56 | 25 | 97 | D1 |
| 000011A0 | E7 | 83 | BD | 50 | 14 | 00 | 7F | 03 | E9 | 84 | 00 | A1 | 48 | 25 | 03 | 06 |
| 000011B0 | 56 | 25 | 97 | D1 | E7 | BB | 01 | 00 | 8B | 95 | 50 | 14 | CD | 3E | 26 | CD |
| 000011C0 | 3F | BC | BB | 28 | 25 | CD | 3F | 6A | BB | D4 | 26 | CD | 3F | 6A | BB | 2C |
| 000011D0 | 25 | CD | 3F | 6A | BB | 2B | 00 | CD | 3F | 37 | BB | AA | 26 | CD | 3F | 6A |
| 000011E0 | BB | 46 | 14 | CD | 3E | 0A | A1 | 48 | 25 | 03 | 06 | 56 | 25 | 97 | D1 | E7 |
| 000011F0 | 8B | 9D | 44 | 16 | CD | 3F | 69 | CD | 3E | 79 | CD | 3F | BC | BB | 9E | 26 |
| 00001200 | CD | 3F | 6A | A1 | 56 | 25 | 03 | 06 | 48 | 25 | 97 | D1 | E7 | 8B | 9D | 38 |
| 00001210 | 18 | CD | 3F | 6D | CD | 3E | 79 | A1 | 52 | 25 | 40 | A3 | 52 | 25 | A1 | 48 |
| 00001220 | 25 | 40 | A3 | 48 | 25 | 83 | 3E | 48 | 25 | 0D | 7F | 03 | E9 | 68 | FF | BB |
| 00001230 | 05 | 00 | CD | 3E | 42 | BB | 44 | 00 | CD | 3E | 42 | 33 | DB | CD | 3E | 44 |
| 00001240 | CD | 3F | BC | BB | 50 | 27 | CD | 3F | 6A | CD | 3E | 79 | BB | 17 | 00 | CD |
| 00001250 | 3E | 33 | 33 | DB | CD | 3E | 35 | CD | 3F | BC | BB | 5F | 00 | CD | 3D | 05 |
| 00001260 | CD | 3F | 6A | CD | 3E | 79 | BB | 07 | 00 | CD | 3E | 33 | 33 | DB | CD | 3E |
| 00001270 | 35 | BB | 07 | 00 | CD | 3E | 42 | BB | 44 | 00 | CD | 3E | 42 | 33 | DB | CD |
| 00001280 | 3E | 44 | CD | 3F | BC | BB | 18 | 00 | CD | 3D | 05 | CD | 3F | 6A | BB | 02 |
| 00001290 | 27 | CD | 3F | 6A | CD | 3E | 79 | BB | 08 | 00 | CD | 3E | 42 | BB | 44 | 00 |
| 000012A0 | CD | 3E | 42 | 33 | DB | CD | 3E | 44 | CD | 3F | BC | BB | 19 | 00 | CD | 3D |
| 000012B0 | 05 | CD | 3F | 6A | BB | 0C | 27 | CD | 3F | 6A | CD | 3E | 79 | BB | 0C | 00 |
| 000012C0 | CD | 3E | 42 | BB | 42 | 00 | CD | 3E | 42 | 33 | DB | CD | 3E | 44 | CD | 3F |
| 000012D0 | BC | BB | 11 | 00 | CD | 3D | 05 | CD | 3F | 6A | BB | C4 | 00 | CD | 3D | 05 |
| 000012E0 | CD | 3F | 6A | BB | D9 | 00 | CD | 3D | 05 | CD | 3F | 6A | BB | 30 | 27 | CD |
| 000012F0 | 3F | 6A | CD | 3E | 79 | E9 | 6D | 22 | 83 | 3E | 52 | 25 | 0D | BB | 00 | 00 |
| 00001300 | 7D | 01 | 4B | 8B | 3E | 56 | 25 | D1 | E7 | 83 | BD | 6C | 14 | 00 | BA | 00 |
| 00001310 | 00 | 75 | 01 | 4A | 0B | D3 | 23 | D2 | 74 | 03 | E9 | 63 | 22 | A1 | 56 | 25 |
| 00001320 | 05 | 0D | 00 | A3 | 56 | 25 | BB | 07 | 00 | CD | 3E | 42 | BB | 01 | 00 | CD |
| 00001330 | 3E | 42 | 33 | DB | CD | 3E | 44 | B8 | 01 | 00 | E9 | 13 | 00 | CD | 3F | BC |
| 00001340 | BB | 4F | 00 | CD | 3D | 0D | CD | 3F | 6E | CD | 3E | 79 | A1 | 48 | 25 | 40 |
| 00001350 | A3 | 48 | 25 | 83 | 3E | 48 | 25 | 0D | 7E | E3 | C7 | 06 | 52 | 25 | 00 | 00 |
| 00001360 | BB | 07 | 00 | CD | 3E | 42 | BB | 01 | 00 | CD | 3E | 42 | 33 | DB | CD | 3E |
| 00001370 | 44 | B8 | 01 | 00 | E9 | 8B | 00 | A1 | 48 | 25 | 03 | 06 | 56 | 25 | 97 | D1 |
| 00001380 | E7 | 83 | BD | 50 | 14 | 00 | 7F | 03 | E9 | 84 | 00 | A1 | 48 | 25 | 03 | 06 |
| 00001390 | 56 | 25 | 97 | D1 | E7 | BB | 01 | 00 | 8B | 95 | 50 | 14 | CD | 3E | 26 | CD |
| 000013A0 | 3F | BC | BB | 28 | 25 | CD | 3F | 6A | BB | D4 | 26 | CD | 3F | 6A | BB | 2C |
| 000013B0 | 25 | CD | 3F | 6A | BB | 2B | 00 | CD | 3F | 37 | BB | AA | 26 | CD | 3F | 6A |
| 000013C0 | BB | 46 | 14 | CD | 3E | 0A | A1 | 48 | 25 | 03 | 06 | 56 | 25 | 97 | D1 | E7 |
| 000013D0 | 8B | 9D | 44 | 16 | CD | 3F | 69 | CD | 3E | 79 | CD | 3F | BC | BB | 9E | 26 |
| 000013E0 | CD | 3F | 6A | A1 | 56 | 25 | 03 | 06 | 48 | 25 | 97 | D1 | E7 | 8B | 9D | 38 |
| 000013F0 | 18 | CD | 3F | 6D | CD | 3E | 79 | A1 | 52 | 25 | 40 | A3 | 52 | 25 | A1 | 48 |
| 00001400 | 25 | 40 | A3 | 48 | 25 | 83 | 3E | 48 | 25 | 0D | 7F | 03 | E9 | 68 | FF | BB |
| 00001410 | 05 | 00 | CD | 3E | 42 | BB | 44 | 00 | CD | 3E | 42 | 33 | DB | CD | 3E | 44 |
| 00001420 | CD | 3F | BC | BB | 50 | 27 | CD | 3F | 6A | CD | 3E | 79 | BB | 17 | 00 | CD |
| 00001430 | 3E | 33 | 33 | DB | CD | 3E | 35 | CD | 3F | BC | BB | 5F | 00 | CD | 3D | 05 |
| 00001440 | CD | 3F | 6A | CD | 3E | 79 | BB | 07 | 00 | CD | 3E | 33 | 33 | DB | CD | 3E |
| 00001450 | 35 | BB | 07 | 00 | CD | 3E | 42 | BB | 44 | 00 | CD | 3E | 42 | 33 | DB | CD |
| 00001460 | 3E | 44 | CD | 3F | BC | BB | 18 | 00 | CD | 3D | 05 | CD | 3F | 6A | BB | 02 |
| 00001470 | 27 | CD | 3F | 6A | CD | 3E | 79 | BB | 08 | 00 | CD | 3E | 42 | BB | 44 | 00 |
| 00001480 | CD | 3E | 42 | 33 | DB | CD | 3E | 44 | CD | 3F | BC | BB | 19 | 00 | CD | 3D |
| 00001490 | 05 | CD | 3F | 6A | BB | 0C | 27 | CD | 3F | 6A | CD | 3E | 79 | BB | 0C | 00 |
| 000014A0 | CD | 3E | 42 | BB | 42 | 00 | CD | 3E | 42 | 33 | DB | CD | 3E | 44 | CD | 3F |
| 000014B0 | BC | BB | 11 | 00 | CD | 3D | 05 | CD | 3F | 6A | BB | C4 | 00 | CD | 3D | 05 |
| 000014C0 | CD | 3F | 6A | BB | D9 | 00 | CD | 3D | 05 | CD | 3F | 6A | BB | 30 | 27 | CD |
| 000014D0 | 3F | 6A | CD | 3E | 79 | E9 | 33 | 25 | 8B | 1E | 50 | 25 | 83 | C3 | 06 | CD |
| 000014E0 | 3E | 42 | BB | 2B | 00 | CD | 3E | 42 | 33 | DB | CD | 3E | 44 | CD | 3F | BC |
| 000014F0 | BB | 0A | 00 | CD | 3D | 0D | CD | 3F | 6A | CD | 3E | 79 | 8B | 1E | 50 | 25 |
| 00001500 | 83 | C3 | 06 | CD | 3E | 42 | BB | 2B | 00 | CD | 3E | 42 | 33 | DB | CD | 3E |
| 00001510 | 44 | BB | AA | 26 | CD | 3F | B5 | 00 | CD | 3F | B7 | 01 | 01 | A1 | 50 | 25 |
| 00001520 | 03 | 06 | 56 | 25 | D1 | E0 | 05 | 44 | 16 | 93 | CD | 3F | B8 | 8B | 1E | 50 |
| 00001530 | 25 | 83 | C3 | 06 | CD | 3E | 42 | BB | 2B | 00 | CD | 3E | 42 | 33 | DB | CD |
| 00001540 | 3E | 44 | BB | 46 | 14 | CD | 3F | BD | A1 | 50 | 25 | 03 | 06 | 56 | 25 | 97 |
| 00001550 | D1 | E7 | 8B | 9D | 44 | 16 | CD | 3F | 6D | CD | 3E | 79 | BB | 05 | 00 | CD |
| 00001560 | 3E | 42 | BB | 44 | 00 | CD | 3E | 42 | 33 | DB | CD | 3E | 44 | CD | 3F | BC |
| 00001570 | BB | 50 | 27 | CD | 3F | 6A | CD | 3E | 79 | BB | 17 | 00 | CD | 3E | 33 | 33 |
| 00001580 | DB | CD | 3E | 35 | CD | 3F | BC | BB | 5F | 00 | CD | 3D | 05 | CD | 3F | 6A |
| 00001590 | CD | 3E | 79 | BB | 07 | 00 | CD | 3E | 33 | 33 | DB | CD | 3E | 35 | BB | 07 |

```
000015A0  00 CD 3E 42 BB 44 00 CD  3E 42 33 DB CD 3E 44 CD
000015B0  3F BC DB 18 00 CD 3D 05  CD 3F 6A BB 02 27 CD 3F
000015C0  6A CD 3E 79 BB 08 00 CD  3E 42 BB 44 00 CD 3E 42
000015D0  33 DB CD 3E 44 CD 3F BC  BB 19 00 CD 3D 05 CD 3F
000015E0  6A BB 0C 27 CD 3F 6A CD  3E 79 BB 09 00 CD 3E 42
000015F0  BB 44 00 CD 3E 42 33 DB  CD 3E 44 CD 3F BC BB 1A
00001600  00 CD 3D 05 CD 3F 6A BB  18 27 CD 3F 6A CD 3E 79
00001610  BB 0A 00 CD 3E 42 BB 43  00 CD 3E 42 33 DB CD 3E
00001620  44 CD 3F BC BB 11 00 CD  3D 05 CD 3F 6A BB C4 00
00001630  CD 3D 05 CD 3F 6A BB 24  27 CD 3F 6A CD 3E 79 BB
00001640  0C 00 CD 3E 42 BB 42 00  CD 3E 42 33 DB CD 3E 44
00001650  CD 3F BC BB 0E 25 CD 3F  6A BB 30 27 CD 3F 6A CD
00001660  3E 79 E9 F5 22 CD 3E 2B  8B 3E 50 25 D1 E7 8B 85
00001670  5A 14 A3 6C 25 8B 1E 50  25 83 C3 06 CD 3E 42 BB
00001680  39 00 CD 3E 42 33 DB CD  3E 44 CD 3F BC BB 5A 27
00001690  CD 3F 6A CD 3E 79 8B 1E  50 25 83 C3 06 CD 3E 42
000016A0  BB 39 00 CD 3E 42 33 DB  CD 3E 44 BB AA 26 CD 3F
000016B0  B5 00 CD 3F B7 01 01 BB  6E 25 CD 3F B8 83 3E 6E
000016C0  25 01 BB 00 00 7D 01 4B  83 3E 6E 25 08 BA 00 00
000016D0  7E 01 4A 0B D3 23 D2 75  8F B8 01 00 E9 4B 00 8B
000016E0  3E 70 25 8B DF D1 E7 8B  95 50 14 3B 16 6C 25 B9
000016F0  00 00 75 01 49 8B 16 50  25 8B C2 83 C2 05 3B DA
00001700  89 4E FA B9 00 00 74 01  49 23 4E FA 97 D1 E7 8B
00001710  9D 42 18 3B 1E 6E 25 BA  00 00 75 01 4A 23 D1 23
00001720  D2 74 03 E9 3F FF A1 70  25 40 A3 70 25 81 3E 70
00001730  25 FA 00 7E AA 8B 1E 50  25 83 C3 06 CD 3E 42 BB
00001740  39 00 CD 3E 42 33 DB CD  3E 44 CD 3F BC 8B 1E 6E
00001750  25 CD 3F 69 BB 64 27 CD  3F 6A CD 3E 79 A1 56 25
00001760  03 06 50 25 97 D1 E7 8B  1E 6E 25 89 9D 38 18 BB
00001770  05 00 CD 3E 42 BB 44 00  CD 3E 42 33 DB CD 3E 44
00001780  CD 3F BC BB 50 27 CD 3F  6A CD 3E 79 BB 17 00 CD
00001790  3E 33 33 DB CD 3E 35 CD  3F BC BB 5F 00 CD 3D 05
000017A0  CD 3F 6A CD 3E 79 BB 07  00 CD 3E 33 33 DB CD 3E
000017B0  35 BB 07 00 CD 3E 42 BB  44 00 CD 3E 42 33 DB CD
000017C0  3E 44 CD 3F BC BB 18 00  CD 3D 05 CD 3F 6A BB 02
000017D0  27 CD 3F 6A CD 3E 79 BB  08 00 CD 3E 42 BB 44 00
000017E0  CD 3E 42 33 DB CD 3E 44  CD 3F BC BB 19 00 CD 3D
000017F0  05 CD 3F 6A BB 0C 27 CD  3F 6A CD 3E 79 BB 09 00
00001800  CD 3E 42 BB 44 00 CD 3E  42 33 DB CD 3E 44 CD 3F
00001810  BC BB 1A 00 CD 3D 05 CD  3F 6A BB 18 27 CD 3F 6A
00001820  CD 3E 79 BB 0A 00 CD 3E  42 BB 43 00 CD 3E 42 33
00001830  DB CD 3E 44 CD 3F BC BB  11 00 CD 3D 05 CD 3F 6A
00001840  BB C4 00 CD 3D 05 CD 3F  6A BB 24 27 CD 3F 6A CD
00001850  3E 79 BB 0C 00 CD 3E 42  BB 42 00 CD 3E 42 33 DB
00001860  CD 3E 44 CD 3F BC BB 0E  25 CD 3F 6A BB 30 27 CD
00001870  3F 6A CD 3E 79 E9 E2 20  C7 06 74 25 00 00 C7 06
00001880  56 25 00 00 B8 01 00 E9  28 00 8B 3E 48 25 D1 E7
00001890  C7 85 50 14 00 00 8B 3E  48 25 D1 E7 C7 85 44 16
000018A0  00 00 8B 3E 48 25 D1 E7  C7 85 38 18 00 00 A1 48
000018B0  25 40 A3 48 25 81 3E 48  25 FA 00 7E CD C7 06 78
000018C0  25 00 00 C7 06 7A 25 01  00 C7 06 48 25 01 00 C7
000018D0  06 4A 25 00 00 BB 03 00  8B 16 48 25 CD 3E 26 BB
000018E0  03 00 CD 3D 2F 83 FB FF  74 03 E9 09 00 A1 4A 25
000018F0  A3 7C 25 E9 91 00 A1 4A  25 40 A3 4A 25 BB 38 25
00001900  BA 6C 27 8B CB CD 3D 09  0B DB 74 03 E9 0B 00 91
00001910  BB 72 27 CD 3F 55 92 CD  3F 61 8B 1E 4A 25 D1 E3
00001920  D1 E3 81 C3 8E 1A 8B CB  BB 38 25 BA 6C 27 8B C3
00001930  CD 3D 09 4B 93 92 89 5E  FA CD 3D 0B 8B D0 B8 7A
00001940  27 CD 3F 55 93 BB 84 27  CD 3F 55 8B C3 8B 5E FA
00001950  CD 3D 09 8B D3 8B 5E FA  CD 3F BA 2B DA 8B D3 8B
00001960  5E FA CD 3D 0C CD 3F 55  93 BB 90 27 CD 3F 55 93
00001970  BB 3C 25 CD 3F 55 8B D1  CD 3F 61 A1 48 25 05 08
00001980  00 A3 48 25 E9 4E FF C7  06 7E 25 00 00 C7 06 80
00001990  25 00 00 C7 06 82 25 00  00 BB FF FF CD 3E 32 B8
000019A0  01 00 E9 5F 00 B8 13 00  F7 2E 78 25 03 06 48 25
000019B0  3B 06 4A 25 7E 03 E9 AF  00 A1 82 25 40 A3 82 25
000019C0  8B 1E 48 25 8B D3 D1 E3  D1 E3 81 C3 FE 1D B8 13
000019D0  00 8B CA F7 2E 78 25 03  C1 D1 E0 D1 E0 05 8E 1A
000019E0  93 92 CD 3F 61 CD 3F BC  8B 1E 48 25 D1 E3 D1 E3
000019F0  81 C3 FE 1D B8 D4 26 CD  3F 55 CD 3F 6E CD 3E 79
00001A00  A1 48 25 40 A3 48 25 83  3E 48 25 13 7E 97 CD 3F
00001A10  BC BB 98 27 CD 3F 6E CD  3E 79 A1 82 25 40 A3 82
00001A20  25 8B 1E 82 25 D1 E3 D1  E3 81 C3 FE 1D 8B D3 BB
00001A30  AA 27 CD 3F 61 A1 82 25  A3 84 25 CD 3F BC BB BA
```

```
00001A40  27 CD 3F 6E CD 3E 79 A1  82 25 40 A3 82 25 8B 1E
00001A50  82 25 D1 E3 D1 E3 81 C3  FE 1D 8B D3 BB CA 27 CD
00001A60  3F 61 A1 82 25 A3 86 25  B8 13 00 F7 2E 78 25 05
00001A70  14 00 3B 06 4A 25 7C 03  E9 2D 00 CD 3F BC BB DA
00001A80  27 CD 3F 6E CD 3E 79 A1  82 25 40 A3 82 25 A1 82
00001A90  25 A3 7E 25 8B 1E 82 25  D1 E3 D1 E3 81 C3 FE 1D
00001AA0  8B D3 BB E8 27 CD 3F 61  83 3E 78 25 00 7F 03 E9
00001AB0  2D 00 CD 3F BC BB F6 27  CD 3F 6E CD 3E 79 A1 82
00001AC0  25 40 A3 82 25 A1 82 25  A3 80 25 8B 1E 82 25 D1
00001AD0  E3 D1 E3 81 C3 FE 1D 8B  D3 BB 3E 27 CD 3F 61 BB
00001AE0  05 00 CD 3E 42 BB 44 00  CD 3E 42 33 DB CD 3E 44
00001AF0  CD 3F BC BB 50 27 CD 3F  6A CD 3E 79 BB 17 00 CD
00001B00  3E 33 33 DB CD 3E 35 CD  3F BC BB 5F 00 CD 3D 05
00001B10  CD 3F 6A CD 3E 79 BB 07  00 CD 3E 33 33 DB CD 3E
00001B20  35 BB 07 00 CD 3E 42 BB  44 00 CD 3E 42 33 DB CD
00001B30  3E 44 CD 3F BC BB 18 00  CD 3D 05 CD 3F 6A BB 02
00001B40  27 CD 3F 6A CD 3E 79 BB  08 00 CD 3E 42 BB 44 00
00001B50  CD 3E 42 33 DB CD 3E 44  CD 3F BC BB 19 00 CD 3D
00001B60  05 CD 3F 6A BB 0C 27 CD  3F 6A CD 3E 79 BB 0C 00
00001B70  CD 3E 42 BB 42 00 CD 3E  42 33 DB CD 3E 44 CD 3F
00001B80  BC BB 11 00 CD 3D 05 CD  3F 6A BB C4 00 CD 3D 05
00001B90  CD 3F 6A BB D9 00 CD 3D  05 CD 3F 6A BB 30 27 CD
00001BA0  3F 6A CD 3E 79 A1 7A 25  A3 48 25 8B 1E 48 25 CD
00001BB0  3E 42 BB 01 00 CD 3E 42  33 DB CD 3E 44 BB 17 00
00001BC0  CD 3E 33 33 DB CD 3E 35  CD 3F BC BB 5F 00 CD 3D
00001BD0  05 CD 3F 6A CD 3E 79 33  DB CD 3E 33 BB 07 00 CD
00001BE0  3E 35 CD 3F BC 8B 1E 48  25 D1 E3 D1 E3 81 C3 FE
00001BF0  1D CD 3F 6A CD 3E 79 BB  07 00 CD 3E 33 33 DB CD
00001C00  3E 35 BB 19 00 CD 3E 42  BB 01 00 CD 3E 42 33 DB
00001C10  CD 3E 44 CD 3D 06 BA 68  25 CD 3F 61 BB 68 25 CD
00001C20  3F BA 0B DB 74 ED BB 0A  25 B8 68 25 CD 3F 62 BA
00001C30  00 00 74 01 4A BB FA 24  CD 3F 62 B9 00 00 74 01
00001C40  49 23 CA BB FE 24 CD 3F  62 BA 00 00 74 01 4A 23
00001C50  D1 23 D2 75 BE 8B 1E 48  25 CD 3E 42 BB 01 00 CD
00001C60  3E 42 33 DB CD 3E 44 CD  3F BC BB D4 26 CD 3F 6A
00001C70  8B 1E 48 25 D1 E3 D1 E3  81 C3 FE 1D CD 3F 6A CD
00001C80  3E 79 BB 0A 25 B8 68 25  CD 3F 62 75 03 E9 44 00
00001C90  BB FE 24 B8 68 25 CD 3F  62 74 03 E9 1C 00 A1 48
00001CA0  25 40 A3 48 25 A1 82 25  3B 06 48 25 7C 03 E9 06
00001CB0  00 C7 06 48 25 01 00 E9  F1 FE A1 48 25 48 A3 48
00001CC0  25 83 3E 48 25 00 74 03  E9 06 00 A1 82 25 A3 48
00001CD0  25 E9 D7 FE A1 48 25 3B  06 7E 25 74 03 E9 0A 00
00001CE0  A1 78 25 40 A3 78 25 E9  9D FC A1 48 25 3B 06 80
00001CF0  25 74 03 E9 0A 00 A1 78  25 48 A3 78 25 E9 87 FC
00001D00  A1 48 25 3B 06 84 25 74  03 E9 03 00 E9 A3 14 A1
00001D10  48 25 3B 06 86 25 74 03  E9 43 01 8B 1E 86 25 CD
00001D20  3E 42 BB 01 00 CD 3E 42  33 DB CD 3E 44 CD 3F BC
00001D30  BB 4F 00 BA 20 00 CD 3D  0E CD 3F 6A CD 3E 79 8B
00001D40  1E 86 25 CD 3E 42 BB 01  00 CD 3E 42 33 DB CD 3E
00001D50  44 BB 08 28 CD 3F B5 01  CD 3F B7 01 04 BB 88 25
00001D60  CD 3F B8 BB 88 25 8B D3  CD 3F BA 83 FB 01 B9 00
00001D70  00 7D 01 49 8B DA CD 3F  BA 83 FB 0D BA 00 00 7E
00001D80  01 4A 0B D1 23 D2 75 93  8B 1E 86 25 CD 3E 42 BB
00001D90  01 00 CD 3E 42 33 DB CD  3E 44 CD 3F BC BB 14 28
00001DA0  CD 3F 6A BB 88 25 CD 3F  6A BB 28 28 CD 3F 6A CD
00001DB0  3E 79 A1 7C 25 A3 8C 25  B8 01 00 E9 40 00 8B 1E
00001DC0  8E 25 D1 E3 D1 E3 81 C3  8E 1A 8B D3 CD 3F BA 83
00001DD0  C3 FA 87 D3 CD 3D 0C BA  68 25 CD 3F 61 BB 88 25
00001DE0  8B D3 CD 3F BA 87 D3 8B  CB BB 68 25 CD 3D 0B 87
00001DF0  D9 91 CD 3F 62 75 03 E9  37 00 A1 8E 25 40 A3 8E
00001E00  25 A1 8C 25 3B 06 8E 25  7D B4 8B 1E 86 25 CD 3E
00001E10  42 BB 01 00 CD 3E 42 33  DB CD 3E 44 CD 3F BC BB
00001E20  4F 00 BA 20 00 CD 3D 0E  CD 3F 6A CD 3E 79 E9 EA
00001E30  FE 8B 1E 8E 25 4B CD 3F  57 BF 40 28 CD 3F 89 BB
00001E40  1A 00 CD 3D 03 CD 3F 77  93 A3 78 25 A1 8E 25 48
00001E50  B9 13 00 99 F7 F9 42 92  A3 7A 25 E9 29 FB BB FF
00001E60  FF CD 3E 32 B8 13 00 F7  2E 78 25 03 06 48 25 D1
00001E70  E0 D1 E0 D1 E0 05 F9 FF  A3 90 25 BB 03 00 8B 16
00001E80  90 25 CD 3E 26 BB 30 25  BA 92 25 CD 3F 61 BB 34
00001E90  25 CD 3D 18 93 A3 96 25  BB 38 25 BA 98 25 CD 3F
00001EA0  61 BB 40 25 CD 3D 18 93  A3 9C 25 BB 3C 25 BA 9E
00001EB0  25 CD 3F 61 33 C0 E9 98  00 A1 A2 25 03 06 90 25
00001EC0  92 BB 03 00 CD 3E 26 83  3E A2 25 00 74 03 E9 0C
00001ED0  00 BB 44 25 CD 3D 19 BF  A4 25 CD 3F 7D 83 3E A2
00001EE0  25 01 74 03 E9 0C 00 BB  44 25 CD 3D 19 BF A8 25
```

```
00001EF0  CD 3F 7D B8 01 00 E9 4A  00 8B 1E 48 25 8B D3 D1
00001F00  E3 D1 E3 81 C3 2E 24 CD  3D 18 B8 32 00 8B CA F7
00001F10  2E A2 25 03 C1 97 D1 E7  89 9D 44 16 8B 1E 48 25
00001F20  8B D3 D1 E3 D1 E3 81 C3  66 23 CD 3D 18 B8 32 00
00001F30  8B CA F7 2E A2 25 03 C1  97 D1 E7 89 9D 50 14 A1
00001F40  48 25 40 A3 48 25 83 3E  48 25 32 7E AC A1 A2 25
00001F50  40 A3 A2 25 83 3E A2 25  04 7F 03 E9 5B FF BB 98
00001F60  25 BA 6C 27 8B CB CD 3D  09 0B DB 74 03 E9 0B 00
00001F70  91 BB 44 28 CD 3F 55 92  CD 3F 61 33 C0 E9 6F 00
00001F80  A1 A2 25 03 06 90 25 05  05 00 92 BB 03 00 CD 3E
00001F90  26 B8 01 00 E9 4A 00 8B  1E 48 25 8B D3 D1 E3 D1
00001FA0  E3 81 C3 66 23 CD 3D 18  B8 64 00 8B CA F7 2E A2
00001FB0  25 03 C1 97 D1 E7 89 9D  38 18 8B 1E 48 25 8B D3
00001FC0  D1 E3 D1 E3 81 C3 2E 24  CD 3D 18 B8 64 00 8B CA
00001FD0  F7 2E A2 25 03 C1 97 D1  E7 89 9D 9C 18 A1 48 25
00001FE0  40 A3 48 25 83 3E 48 25  32 7E AC A1 A2 25 40 A3
00001FF0  A2 25 83 3E A2 25 02 7E  87 C7 06 74 25 00 00 B8
00002000  01 00 E9 4F 00 8B 3E AC  25 D1 E7 83 BD 50 14 00
00002010  74 03 E9 17 00 8B 1E AC  25 D1 E3 D1 E3 81 C3 7E
00002020  1F 8B D3 BB AE 26 CD 3F  61 E9 24 00 8B 3E AC 25
00002030  D1 E7 BB 01 00 8B 95 50  14 CD 3E 26 8B 1E AC 25
00002040  D1 E3 D1 E3 81 C3 7E 1F  8B D3 BB 28 25 CD 3F 61
00002050  A1 AC 25 40 A3 AC 25 81  3E AC 25 FA 00 7E A6 BB
00002060  FF FF CD 3E 32 CD 3F BC  BB 4E 28 CD 3F 6A BB 23
00002070  00 CD 3F 37 BB AA 26 CD  3F 6A BB 5A 28 CD 3F 6E
00002080  CD 3E 79 CD 3F BC BB 72  28 CD 3F 6E CD 3E 79 CD
00002090  3F BC BB 82 28 CD 3F 6A  BB 3C 00 CD 3F 37 BB AA
000020A0  26 CD 3F 6A BB 98 28 CD  3F 6E CD 3E 79 CD 3F BC
000020B0  BB A6 28 CD 3F 6A BB 3C  00 CD 3F 37 BB AA 26 CD
000020C0  3F 6A BB C6 28 CD 3F 6E  CD 3E 79 CD 3F BC BB D4
000020D0  28 CD 3F 6A BB 27 00 CD  3F 37 BB AA 26 CD 3F 6A
000020E0  BB EC 28 CD 3F 6E CD 3E  79 BB 01 00 CD 3E 42 BB
000020F0  08 00 CD 3E 42 33 DB CD  3E 44 CD 3F BC BB 98 25
00002100  BA 6C 27 8B CB CD 3D 09  4B 87 D9 8B D1 CD 3D 0B
00002110  CD 3F 6A CD 3E 79 BB 01  00 CD 3E 42 BB 39 00 CD
00002120  3E 42 33 DB CD 3E 44 CD  3F BC BB 98 25 BA 6C 27
00002130  8B CB CD 3D 09 87 D9 8B  D3 CD 3F BA 2B D9 87 D3
00002140  CD 3D 0C CD 3F 6A CD 3E  79 BB 02 00 CD 3E 42 BB
00002150  0E 00 CD 3E 42 33 DB CD  3E 44 CD 3F BC BB 9E 25
00002160  CD 3F 6A CD 3E 79 BB 03  00 CD 3E 42 BB 12 00 CD
00002170  3E 42 33 DB CD 3E 44 BB  08 29 B8 92 25 CD 3F 62
00002180  74 03 E9 0F 00 CD 3F BC  BB 0E 29 CD 3F 6A CD 3E
00002190  79 E9 0C 00 CD 3F BC BB  2A 29 CD 3F 6A CD 3E 79
000021A0  BB 04 00 CD 3E 42 BB 1C  00 CD 3E 42 33 DB CD 3E
000021B0  44 BB 4A 14 CD 3F BD 8B  1E 96 25 CD 3F 69 CD 3E
000021C0  79 BB 03 00 CD 3E 42 BB  46 00 CD 3E 42 33 DB CD
000021D0  3E 44 BB 4E 14 CD 3F BD  BB A4 25 CD 3F 67 CD 3E
000021E0  79 BB 04 00 CD 3E 42 BB  46 00 CD 3E 42 33 DB CD
000021F0  3E 44 BB 4E 14 CD 3F BD  BB A8 25 CD 3F 67 CD 3E
00002200  79 BB 07 00 CD 3E 42 BB  01 00 CD 3E 42 33 DB CD
00002210  3E 44 C7 06 52 25 00 00  C7 06 56 25 00 00 B8 01
00002220  00 E9 88 00 8B 3E AE 25  D1 E7 83 BD 50 14 00 75
00002230  03 E9 74 00 8B 1E 52 25  43 83 FB 0E 75 03 E9 79
00002240  00 A1 52 25 40 A3 52 25  8B 3E AE 25 D1 E7 BB 01
00002250  00 8B 95 50 14 CD 3E 26  CD 3F BC BB 28 25 CD 3F
00002260  6A BB D4 26 CD 3F 6A BB  2C 25 CD 3F 6A BB 2B 00
00002270  CD 3F 37 BB AA 26 CD 3F  6A BB 46 14 CD 3E 0A 8B
00002280  3E AE 25 D1 E7 8B 9D 44  16 CD 3F 69 CD 3E 79 CD
00002290  3F BC BB 9E 26 CD 3F 6A  8B 3E AE 25 D1 E7 8B 9D
000022A0  38 18 CD 3F 6D CD 3E 79  A1 AE 25 40 A3 AE 25 81
000022B0  3E AE 25 FA 00 7F 03 E9  6A FF BB 06 00 CD 3E 42
000022C0  BB 01 00 CD 3E 42 33 DB  CD 3E 44 CD 3F BC BB 3E
000022D0  27 CD 3F 6A CD 3E 79 BB  14 00 CD 3E 42 BB 01 00
000022E0  CD 3E 42 33 DB CD 3E 44  CD 3F BC BB 48 29 CD 3F
000022F0  6A CD 3E 79 BB 15 00 CD  3E 42 BB 01 00 CD 3E 42
00002300  33 DB CD 3E 44 CD 3F BC  BB E8 27 CD 3F 6A CD 3E
00002310  79 BB 16 00 CD 3E 42 BB  01 00 CD 3E 42 33 DB CD
00002320  3E 44 CD 3F BC BB 56 29  CD 3F 6A CD 3E 79 BB 17
00002330  00 CD 3E 42 BB 01 00 CD  3E 42 33 DB CD 3E 44 CD
00002340  3F BC BB 66 29 CD 3F 6A  CD 3E 79 BB 05 00 CD 3E
00002350  42 BB 44 00 CD 3E 42 33  DB CD 3E 44 CD 3F BC BB
00002360  50 27 CD 3F 6A CD 3E 79  BB 17 00 CD 3E 33 33 DB
00002370  CD 3E 35 CD 3F BC BB 5F  00 CD 3D 05 CD 3F 6A CD
00002380  3E 79 BB 07 00 CD 3E 33  33 DB CD 3E 35 BB 07 00
00002390  CD 3E 42 BB 44 00 CD 3E  42 33 DB CD 3E 44 CD 3F
```

| | | | | | | | | | | | | | | | | |
|---|---|---|---|---|---|---|---|---|---|---|---|---|---|---|---|---|
| 000023A0 | BC | BB | 18 | 00 | CD | 3D | 05 | CD | 3F | 6A | BB | 02 | 27 | CD | 3F | 6A |
| 000023B0 | CD | 3E | 79 | BB | 08 | 00 | CD | 3E | 42 | BB | 44 | 00 | CD | 3E | 42 | 33 |
| 000023C0 | DB | CD | 3E | 44 | CD | 3F | BC | BB | 19 | 00 | CD | 3D | 05 | CD | 3F | 6A |
| 000023D0 | BB | 0C | 27 | CD | 3F | 6A | CD | 3E | 79 | BB | 0C | 00 | CD | 3E | 42 | BB |
| 000023E0 | 42 | 00 | CD | 3E | 42 | 33 | DB | CD | 3E | 44 | CD | 3F | BC | BB | 11 | 00 |
| 000023F0 | CD | 3D | 05 | CD | 3F | 6A | BB | C4 | 00 | CD | 3D | 05 | CD | 3F | 6A | BB |
| 00002400 | D9 | 00 | CD | 3D | 05 | CD | 3F | 6A | BB | 30 | 27 | CD | 3F | 6A | CD | 3E |
| 00002410 | 79 | BB | 01 | 00 | CD | 3E | 42 | 8B | D3 | BB | 08 | 00 | CD | 3E | 42 | 8B |
| 00002420 | DA | CD | 3E | 44 | C7 | 06 | 48 | 25 | 01 | 00 | C7 | 06 | 54 | 25 | 00 | 00 |
| 00002430 | CD | 3D | 06 | BA | 68 | 25 | CD | 3F | 61 | BB | 68 | 25 | CD | 3F | BA | 0B |
| 00002440 | DB | 74 | ED | BB | 0A | 25 | B8 | 68 | 25 | CD | 3F | 62 | 75 | 03 | E9 | 51 |
| 00002450 | 02 | BB | FE | 24 | B8 | 68 | 25 | CD | 3F | 62 | 74 | 03 | E9 | 0A | 00 | A1 |
| 00002460 | 48 | 25 | 40 | A3 | 48 | 25 | E9 | 92 | 00 | BB | FA | 24 | B8 | 68 | 25 | CD |
| 00002470 | 3F | 62 | 74 | 03 | E9 | 0A | 00 | A1 | 48 | 25 | 48 | A3 | 48 | 25 | E9 | 7A |
| 00002480 | 00 | 83 | 3E | 48 | 25 | 03 | BB | 00 | 00 | 7D | 01 | 4B | 83 | 3E | 48 | 25 |
| 00002490 | 04 | BA | 00 | 00 | 7E | 01 | 4A | 0B | D3 | 23 | D2 | 75 | 03 | E9 | 08 | 00 |
| 000024A0 | C7 | 06 | 54 | 25 | 00 | 00 | EB | 88 | BB | 06 | 25 | B8 | 68 | 25 | CD | 3F |
| 000024B0 | 62 | 74 | 03 | E9 | 0A | 00 | A1 | 54 | 25 | 40 | A3 | 54 | 25 | E9 | 2B | 00 |
| 000024C0 | BB | 02 | 25 | B8 | 68 | 25 | CD | 3F | 62 | 74 | 03 | E9 | 0A | 00 | A1 | 54 |
| 000024D0 | 25 | 48 | A3 | 54 | 25 | E9 | 03 | 00 | E9 | 55 | FF | 83 | 3E | 54 | 25 | 00 |
| 000024E0 | 7C | 03 | E9 | 06 | 00 | C7 | 06 | 54 | 25 | 01 | 00 | 83 | 3E | 54 | 25 | 01 |
| 000024F0 | 7F | 03 | E9 | 06 | 00 | C7 | 06 | 54 | 25 | 00 | 00 | BB | FE | 24 | B8 | 68 |
| 00002500 | 25 | CD | 3F | 62 | BA | 00 | 00 | 75 | 01 | 4A | 83 | 3E | 48 | 25 | 03 | BB |
| 00002510 | 00 | 00 | 75 | 01 | 4B | 23 | DA | 8B | D3 | BB | FA | 24 | CD | 3F | 62 | B9 |
| 00002520 | 00 | 00 | 75 | 01 | 49 | 83 | 3E | 48 | 25 | 05 | BB | 00 | 00 | 75 | 01 | 4B |
| 00002530 | 23 | D9 | 0B | DA | 23 | DB | 74 | 03 | E9 | 43 | 00 | BB | FE | 24 | B8 | 68 |
| 00002540 | 25 | CD | 3F | 62 | BA | 00 | 00 | 75 | 01 | 4A | 83 | 3E | 48 | 25 | 05 | BB |
| 00002550 | 00 | 00 | 75 | 01 | 4B | 23 | DA | 8B | D3 | BB | FA | 24 | CD | 3F | 62 | B9 |
| 00002560 | 00 | 00 | 75 | 01 | 49 | 83 | 3E | 48 | 25 | 02 | BB | 00 | 00 | 75 | 01 | 4B |
| 00002570 | 23 | D9 | 0B | DA | 23 | DB | 74 | 03 | E9 | 5B | 00 | E9 | 95 | 00 | BB | 09 |
| 00002580 | 00 | CD | 3E | 42 | BB | 44 | 00 | CD | 3E | 42 | 33 | DB | CD | 3E | 44 | CD |
| 00002590 | 3F | BC | BB | 1A | 00 | CD | 3D | 05 | CD | 3F | 6A | BB | 18 | 27 | CD | 3F |
| 000025A0 | 6A | CD | 3E | 79 | BB | 0A | 00 | CD | 3E | 42 | BB | 43 | 00 | CD | 3E | 42 |
| 000025B0 | 33 | DB | CD | 3E | 44 | CD | 3F | BC | BB | 11 | 00 | CD | 3D | 05 | CD | 3F |
| 000025C0 | 6A | BB | C4 | 00 | CD | 3D | 05 | CD | 3F | 6A | BB | 24 | 27 | CD | 3F | 6A |
| 000025D0 | CD | 3E | 79 | E9 | 3D | 00 | BB | 09 | 00 | CD | 3E | 42 | BB | 44 | 00 | CD |
| 000025E0 | 3E | 42 | 33 | DB | CD | 3E | 44 | CD | 3F | BC | BB | DA | 26 | CD | 3F | 6A |
| 000025F0 | CD | 3E | 79 | BB | 0A | 00 | CD | 3E | 42 | BB | 43 | 00 | CD | 3E | 42 | 33 |
| 00002600 | DB | CD | 3E | 44 | CD | 3F | BC | BB | DA | 26 | CD | 3F | 6A | CD | 3E | 79 |
| 00002610 | E9 | 00 | 00 | 8B | 1E | 48 | 25 | 43 | CD | 3F | 5E | 06 | 1D | 38 | 11 | 22 |
| 00002620 | 8D | 24 | 28 | 24 | 59 | 24 | 63 | 32 | 83 | 3E | 54 | 25 | 00 | 74 | 03 | E9 |
| 00002630 | 12 | 00 | BB | 03 | 00 | CD | 3E | 42 | BB | 01 | 00 | CD | 3E | 42 | CD | 3E |
| 00002640 | 44 | E9 | 12 | 00 | BB | 03 | 00 | CD | 3E | 42 | BB | 3C | 00 | CD | 3E | 42 |
| 00002650 | BB | 01 | 00 | CD | 3E | 44 | E9 | D7 | FD | 83 | 3E | 54 | 25 | 00 | 74 | 03 |
| 00002660 | E9 | 15 | 00 | BB | 04 | 00 | CD | 3E | 42 | BB | 1C | 00 | CD | 3E | 42 | BB |
| 00002670 | 01 | 00 | CD | 3E | 44 | E9 | 12 | 00 | BB | 04 | 00 | CD | 3E | 42 | BB | 3C |
| 00002680 | 00 | CD | 3E | 42 | BB | 01 | 00 | CD | 3E | 44 | E9 | A3 | FD | BB | 02 | 00 |
| 00002690 | CD | 3E | 42 | BB | 0E | 00 | CD | 3E | 42 | BB | 01 | 00 | CD | 3E | 44 | E9 |
| 000026A0 | 8E | FD | B8 | 05 | 00 | E9 | 2C | 00 | 83 | 3E | 4A | 25 | 06 | 75 | 03 | E9 |
| 000026B0 | 1E | 00 | 8B | 1E | 4A | 25 | CD | 3E | 42 | BB | 42 | 00 | CD | 3E | 42 | 33 |
| 000026C0 | DB | CD | 3E | 44 | CD | 3F | BC | BB | 82 | 26 | CD | 3F | 6A | CD | 3E | 79 |
| 000026D0 | A1 | 4A | 25 | 40 | A3 | 4A | 25 | 83 | 3E | 4A | 25 | 0C | 7E | CA | 8B | 1E |
| 000026E0 | 48 | 25 | CD | 3F | 5E | 05 | F0 | 24 | 2D | 27 | D5 | 2F | B5 | 28 | A6 | 2B |
| 000026F0 | C7 | 06 | 50 | 25 | 10 | 00 | BB | 01 | 00 | CD | 3E | 42 | CD | 3E | 42 | 33 |
| 00002700 | DB | CD | 3E | 44 | CD | 3F | BC | BB | 4E | 28 | CD | 3F | 6A | BB | 32 | 00 |
| 00002710 | BA | 20 | 00 | CD | 3D | 0E | CD | 3F | 6A | CD | 3E | 79 | BB | 01 | 00 | CD |
| 00002720 | 3E | 42 | BB | 08 | 00 | CD | 3E | 42 | 33 | DB | CD | 3E | 44 | 33 | DB | CD |
| 00002730 | 3E | 33 | BB | 07 | 00 | CD | 3E | 35 | CD | 3F | BC | BB | 76 | 29 | CD | 3F |
| 00002740 | 6A | CD | 3E | 79 | BB | 07 | 00 | CD | 3E | 33 | 33 | DB | CD | 3E | 35 | BB |
| 00002750 | 01 | 00 | CD | 3E | 42 | BB | 08 | 00 | CD | 3E | 42 | 33 | DB | CD | 3E | 44 |
| 00002760 | BB | AA | 26 | CD | 3F | B5 | 02 | BB | 98 | 25 | CD | 3F | 5A | BB | 98 | 25 |
| 00002770 | CD | 3F | BA | 83 | FB | 0D | 7E | 03 | E9 | 7B | FF | BB | 01 | 00 | CD | 3E |
| 00002780 | 42 | BB | 08 | 00 | CD | 3E | 42 | 33 | DB | CD | 3E | 44 | CD | 3F | BC | BB |
| 00002790 | 98 | 25 | CD | 3F | 6A | CD | 3F | BA | 83 | EB | 0D | F7 | DB | CD | 3D | 0D |
| 000027A0 | CD | 3F | 6A | BB | 23 | 00 | CD | 3F | 37 | BB | AA | 26 | CD | 3F | 6A | BB |
| 000027B0 | 5A | 28 | CD | 3F | 6A | CD | 3E | 79 | BB | 01 | 00 | CD | 3E | 42 | BB | 39 |
| 000027C0 | 00 | CD | 3E | 42 | 33 | DB | CD | 3E | 44 | 33 | DB | CD | 3E | 33 | BB | 07 |
| 000027D0 | 00 | CD | 3E | 35 | CD | 3F | BC | BB | 98 | 25 | CD | 3F | BA | 83 | EB | 0D |
| 000027E0 | F7 | DB | CD | 3D | 0D | CD | 3F | 6A | CD | 3E | 79 | BB | 01 | 00 | CD | 3E |
| 000027F0 | 42 | BB | 39 | 00 | CD | 3E | 42 | 33 | DB | CD | 3E | 44 | BB | 07 | 00 | CD |
| 00002800 | 3E | 33 | 33 | DB | CD | 3E | 35 | BB | AA | 26 | CD | 3F | B5 | 02 | BB | B0 |
| 00002810 | 25 | CD | 3F | 5A | BB | 98 | 25 | CD | 3F | BA | BA | 0D | 00 | 2B | D3 | BB |
| 00002820 | B0 | 25 | CD | 3F | BA | 3B | D3 | 7C | 8F | BB | 01 | 00 | CD | 3E | 42 | BB |
| 00002830 | 39 | 00 | CD | 3E | 42 | 33 | DB | CD | 3E | 44 | CD | 3F | BC | BB | B0 | 25 |
| 00002840 | CD | 3F | 6A | BB | 0F | 00 | CD | 3D | 0D | CD | 3F | 6E | CD | 3E | 79 | BB |

| | | | | | | | | | | | | | | | | |
|---|---|---|---|---|---|---|---|---|---|---|---|---|---|---|---|---|
| 00002850 | 6C | 27 | B8 | 98 | 25 | CD | 3F | 55 | 93 | 8B | D3 | BB | B0 | 25 | CD | 3F |
| 00002860 | 55 | CD | 3F | 61 | BB | 05 | 00 | CD | 3E | 42 | BB | 44 | 00 | CD | 3E | 42 |
| 00002870 | 33 | DB | CD | 3E | 44 | CD | 3F | BC | BB | 50 | 27 | CD | 3F | 6A | CD | 3E |
| 00002880 | 79 | BB | 17 | 00 | CD | 3E | 33 | 33 | DB | CD | 3E | 35 | CD | 3F | BC | BB |
| 00002890 | 5F | 00 | CD | 3D | 05 | CD | 3F | 6A | CD | 3E | 79 | BB | 07 | 00 | CD | 3E |
| 000028A0 | 33 | 33 | DB | CD | 3E | 35 | BB | 07 | 00 | CD | 3E | 42 | BB | 44 | 00 | CD |
| 000028B0 | 3E | 42 | 33 | DB | CD | 3E | 44 | CD | 3F | BC | BB | 18 | 00 | CD | 3D | 05 |
| 000028C0 | CD | 3F | 6A | BB | 02 | 27 | CD | 3F | 6A | CD | 3E | 79 | BB | 08 | 00 | CD |
| 000028D0 | 3E | 42 | BB | 44 | 00 | CD | 3E | 42 | 33 | DB | CD | 3E | 44 | CD | 3F | BC |
| 000028E0 | BB | 19 | 00 | CD | 3D | 05 | CD | 3F | 6A | BB | 0C | 27 | CD | 3F | 6A | CD |
| 000028F0 | 3E | 79 | BB | 0C | 00 | CD | 3E | 42 | BB | 42 | 00 | CD | 3E | 42 | 33 | DB |
| 00002900 | CD | 3E | 44 | CD | 3F | BC | BB | 11 | 00 | CD | 3D | 05 | CD | 3F | 6A | BB |
| 00002910 | C4 | 00 | CD | 3D | 05 | CD | 3F | 6A | BB | D9 | 00 | CD | 3D | 05 | CD | 3F |
| 00002920 | 6A | BB | 30 | 27 | CD | 3F | 6A | CD | 3E | 79 | E9 | E4 | FA | BB | 02 | 00 |
| 00002930 | CD | 3E | 42 | BB | 01 | 00 | CD | 3E | 42 | 33 | DB | CD | 3E | 44 | CD | 3F |
| 00002940 | BC | BB | 72 | 28 | CD | 3F | 6A | BB | 28 | 00 | CD | 3D | 0D | CD | 3F | 6A |
| 00002950 | BB | 0E | 25 | CD | 3F | 6A | BB | 92 | 26 | CD | 3F | 6A | CD | 3E | 79 | BB |
| 00002960 | 02 | 00 | CD | 3E | 42 | BB | 0E | 00 | CD | 3E | 42 | 33 | DB | CD | 3E | 44 |
| 00002970 | 33 | DB | CD | 3E | 33 | BB | 07 | 00 | CD | 3E | 35 | CD | 3F | BC | BB | 1E |
| 00002980 | 00 | CD | 3D | 0D | CD | 3F | 6A | CD | 3E | 79 | BB | 07 | 00 | CD | 3E | 33 |
| 00002990 | 33 | DB | CD | 3E | 35 | BB | 02 | 00 | CD | 3E | 42 | BB | 0E | 00 | CD | 3E |
| 000029A0 | 42 | 33 | DB | CD | 3E | 44 | BB | AA | 26 | CD | 3F | B5 | 02 | BB | 9E | 25 |
| 000029B0 | CD | 3F | 5A | BB | 9E | 25 | CD | 3F | BA | 83 | FB | 1E | 7E | 03 | E9 | 6C |
| 000029C0 | FF | BB | 02 | 00 | CD | 3E | 42 | BB | 0E | 00 | CD | 3E | 42 | 33 | DB | CD |
| 000029D0 | 3E | 44 | CD | 3F | BC | BB | 9E | 25 | CD | 3F | 6A | CD | 3F | BA | 83 | EB |
| 000029E0 | 3C | F7 | DB | CD | 3D | 0D | CD | 3F | 6E | CD | 3E | 79 | BB | 05 | 00 | CD |
| 000029F0 | 3E | 42 | BB | 44 | 00 | CD | 3E | 42 | 33 | DB | CD | 3E | 44 | CD | 3F | BC |
| 00002A00 | BB | 50 | 27 | CD | 3F | 6A | CD | 3E | 79 | BB | 17 | 00 | CD | 3E | 33 | 33 |
| 00002A10 | DB | CD | 3E | 35 | CD | 3F | BC | BB | 5F | 00 | CD | 3D | 05 | CD | 3F | 6A |
| 00002A20 | CD | 3E | 79 | BB | 07 | 00 | CD | 3E | 33 | 33 | DB | CD | 3E | 35 | BB | 07 |
| 00002A30 | 00 | CD | 3E | 42 | BB | 44 | 00 | CD | 3E | 42 | 33 | DB | CD | 3E | 44 | CD |
| 00002A40 | 3F | BC | BB | 18 | 00 | CD | 3D | 05 | CD | 3F | 6A | BB | 02 | 27 | CD | 3F |
| 00002A50 | 6A | CD | 3E | 79 | BB | 08 | 00 | CD | 3E | 42 | BB | 44 | 00 | CD | 3E | 42 |
| 00002A60 | 33 | DB | CD | 3E | 44 | CD | 3F | BC | BB | 19 | 00 | CD | 3D | 05 | CD | 3F |
| 00002A70 | 6A | BB | 0C | 27 | CD | 3F | 6A | CD | 3E | 79 | BB | 0C | 00 | CD | 3E | 42 |
| 00002A80 | BB | 42 | 00 | CD | 3E | 42 | 33 | DB | CD | 3E | 44 | CD | 3F | BC | BB | 11 |
| 00002A90 | 00 | CD | 3D | 05 | CD | 3F | 6A | BB | C4 | 00 | CD | 3D | 05 | CD | 3F | 6A |
| 00002AA0 | BB | D9 | 00 | CD | 3D | 05 | CD | 3F | 6A | BB | 30 | 27 | CD | 3F | 6A | CD |
| 00002AB0 | 3E | 79 | E9 | D8 | FB | 83 | 3E | 54 | 25 | 00 | 75 | 03 | E9 | 88 | 00 | BB |
| 00002AC0 | 04 | 00 | CD | 3E | 42 | BB | 46 | 00 | CD | 3E | 42 | 33 | DB | CD | 3E | 44 |
| 00002AD0 | CD | 3F | BC | BB | 88 | 29 | CD | 3F | 6A | CD | 3E | 79 | BB | 04 | 00 | CD |
| 00002AE0 | 3E | 42 | BB | 46 | 00 | CD | 3E | 42 | 33 | DB | CD | 3E | 44 | BB | AA | 26 |
| 00002AF0 | CD | 3F | B5 | 00 | CD | 3F | B7 | 01 | 02 | BB | A8 | 25 | CD | 3F | B8 | BE |
| 00002B00 | A8 | 25 | CD | 3F | A7 | 72 | B8 | BB | 04 | 00 | CD | 3E | 42 | BB | 46 | 00 |
| 00002B10 | CD | 3E | 42 | 33 | DB | CD | 3E | 44 | CD | 3F | BC | BB | 88 | 29 | CD | 3F |
| 00002B20 | 6A | CD | 3E | 79 | BB | 04 | 00 | CD | 3E | 42 | BB | 46 | 00 | CD | 3E | 42 |
| 00002B30 | 33 | DB | CD | 3E | 44 | BB | 4E | 14 | CD | 3F | BD | BB | A8 | 25 | CD | 3F |
| 00002B40 | 67 | CD | 3E | 79 | E9 | 10 | 01 | BB | 04 | 00 | CD | 3E | 42 | BB | 1C | 00 |
| 00002B50 | CD | 3E | 42 | 33 | DB | CD | 3E | 44 | CD | 3F | BC | BB | 07 | 00 | BA | 20 |
| 00002B60 | 00 | CD | 3D | 0E | CD | 3F | 6A | CD | 3E | 79 | BB | AE | 26 | B8 | 92 | 25 |
| 00002B70 | CD | 3F | 62 | 74 | 03 | E9 | 1C | 00 | CD | 3F | BC | BB | 16 | 25 | B8 | 96 |
| 00002B80 | 29 | CD | 3F | 55 | 93 | BB | A2 | 29 | CD | 3F | 55 | CD | 3F | 6A | CD | 3E |
| 00002B90 | 79 | E9 | 19 | 00 | CD | 3F | BC | BB | 1A | 25 | B8 | A8 | 29 | CD | 3F | 55 |
| 00002BA0 | 93 | BB | A2 | 29 | CD | 3F | 55 | CD | 3F | 6A | CD | 3E | 79 | BB | 04 | 00 |
| 00002BB0 | CD | 3E | 42 | BB | 1C | 00 | CD | 3E | 42 | 33 | DB | CD | 3E | 44 | BB | AA |
| 00002BC0 | 26 | CD | 3F | B5 | 00 | CD | 3F | B7 | 01 | 01 | BB | 96 | 25 | CD | 3F | B8 |
| 00002BD0 | BB | 04 | 00 | CD | 3E | 42 | BB | 1C | 00 | CD | 3E | 42 | 33 | DB | CD | 3E |
| 00002BE0 | 44 | CD | 3F | BC | BB | 1E | 00 | BA | 20 | 00 | CD | 3D | 0E | CD | 3F | 6A |
| 00002BF0 | CD | 3E | 79 | BB | 04 | 00 | CD | 3E | 42 | BB | 1C | 00 | CD | 3E | 42 | 33 |
| 00002C00 | DB | CD | 3E | 44 | 83 | 3E | 96 | 25 | 01 | BB | 00 | 00 | 7D | 01 | 4B | 8B |
| 00002C10 | D3 | BB | 08 | 29 | B8 | 92 | 25 | CD | 3F | 62 | B9 | 00 | 00 | 75 | 01 | 49 |
| 00002C20 | A1 | 14 | 25 | 3B | 06 | 96 | 25 | BB | 00 | 00 | 7D | 01 | 4B | 23 | D9 | 0B |
| 00002C30 | DA | A1 | 12 | 25 | 3B | 06 | 96 | 25 | BA | 00 | 00 | 7D | 01 | 4A | 0B | D3 |
| 00002C40 | 23 | D2 | 74 | 03 | E9 | 6E | FE | BB | 4A | 14 | CD | 3F | BD | 8B | 1E | 96 |
| 00002C50 | 25 | CD | 3F | 69 | CD | 3E | 79 | BB | 05 | 00 | CD | 3E | 42 | BB | 44 | 00 |
| 00002C60 | CD | 3E | 42 | 33 | DB | CD | 3E | 44 | CD | 3F | BC | BB | 50 | 27 | CD | 3F |
| 00002C70 | 6A | CD | 3E | 79 | BB | 17 | 00 | CD | 3E | 33 | 33 | DB | CD | 3E | 35 | CD |
| 00002C80 | 3F | BC | BB | 5F | 00 | CD | 3D | 05 | CD | 3F | 6A | CD | 3E | 79 | BB | 07 |
| 00002C90 | 00 | CD | 3E | 33 | 33 | DB | CD | 3E | 35 | BB | 07 | 00 | CD | 3E | 42 | BB |
| 00002CA0 | 44 | 00 | CD | 3E | 42 | 33 | DB | CD | 3E | 44 | CD | 3F | BC | BB | 18 | 00 |
| 00002CB0 | CD | 3D | 05 | CD | 3F | 6A | BB | 02 | 27 | CD | 3F | 6A | CD | 3E | 79 | BB |
| 00002CC0 | 08 | 00 | CD | 3E | 42 | BB | 44 | 00 | CD | 3E | 42 | 33 | DB | CD | 3E | 44 |
| 00002CD0 | CD | 3F | BC | BB | 19 | 00 | CD | 3D | 05 | CD | 3F | 6A | BB | 0C | 27 | CD |
| 00002CE0 | 3F | 6A | CD | 3E | 79 | BB | 09 | 00 | CD | 3E | 42 | BB | 44 | 00 | CD | 3E |
| 00002CF0 | 42 | 33 | DB | CD | 3E | 44 | CD | 3F | BC | BB | 1A | 00 | CD | 3D | 05 | CD |

```
00002D00  3F 6A BB 18 27 CD 3F 6A  CD 3E 79 BB 0A 00 CD 3E
00002D10  42 BB 43 00 CD 3E 42 33  DB CD 3E 44 CD 3F BC BB
00002D20  11 00 CD 3D 05 CD 3F 6A  BB C4 00 CD 3D 05 CD 3F
00002D30  6A BB 24 27 CD 3F 6A CD  3E 79 BB 0C 00 CD 3E 42
00002D40  BB 42 00 CD 3E 42 33 DB  CD 3E 44 CD 3F BC BB 11
00002D50  00 CD 3D 05 CD 3F 6A BB  C4 00 CD 3D 05 CD 3F 6A
00002D60  BB D9 00 CD 3D 05 CD 3F  6A BB 30 27 CD 3F 6A CD
00002D70  3E 79 83 3E 54 25 00 74  03 E9 15 00 BB 04 00 CD
00002D80  3E 42 BB 1C 00 CD 3E 42  BB 01 00 CD 3E 44 E9 12
00002D90  00 BB 04 00 CD 3E 42 BB  3C 00 CD 3E 42 BB 01 00
00002DA0  CD 3E 44 E9 8A F6 BB FF  FF CD 3E 32 CD 3F BC BB
00002DB0  B8 29 CD 3F 6E CD 3E 79  C7 06 4A 25 00 00 B8 01
00002DC0  00 E9 6F 00 8B 3E 48 25  D1 E7 83 BD 44 16 00 BB
00002DD0  00 00 7E 01 4B 83 BD 50  14 00 BA 00 00 7E 01 4A
00002DE0  23 D3 23 D2 74 03 E9 03  00 E9 43 00 A1 4A 25 40
00002DF0  A3 4A 25 8B 3E 48 25 D1  E7 8B 9D 50 14 8B 36 4A
00002E00  25 D1 E6 89 9C 50 14 8B  3E 48 25 D1 E7 8B 9D 44
00002E10  16 8B 36 4A 25 D1 E6 89  9C 44 16 8B 3E 48 25 D1
00002E20  E7 8B 9D 38 18 8B 36 4A  25 D1 E6 89 9C 38 18 A1
00002E30  48 25 40 A3 48 25 81 3E  48 25 FA 00 7E 86 81 3E
00002E40  4A 25 FA 00 75 03 E9 4E  00 A1 4A 25 40 E9 3C 00
00002E50  8B 3E 48 25 D1 E7 C7 85  38 18 00 00 8B 1E 48 25
00002E60  D1 E3 D1 E3 81 C3 7E 1F  8B D3 BB 9E 26 CD 3F 61
00002E70  8B 3E 48 25 D1 E7 C7 85  50 14 00 00 8B 3E 48 25
00002E80  D1 E7 C7 85 44 16 00 00  A1 48 25 40 A3 48 25 81
00002E90  3E 48 25 FA 00 7E B9 83  3E 74 25 00 BB 00 00 75
00002EA0  01 4B 83 3E 54 14 00 BA  00 00 75 01 4A 0B D3 23
00002EB0  D2 74 03 E9 82 01 C7 06  B4 25 00 00 B8 01 00 E9
00002EC0  38 00 8B 3E AC 25 D1 E7  83 BD 50 14 00 75 03 E9
00002ED0  33 00 A1 B4 25 40 A3 B4  25 8B 1E AC 25 D1 E3 D1
00002EE0  E3 81 C3 7E 1F 93 BB 88  29 CD 3F 55 BA 08 00 CD
00002EF0  3D 0B 92 CD 3F 61 A1 AC  25 40 A3 AC 25 81 3E AC
00002F00  25 FA 00 7E BD A1 B4 25  A3 B6 25 8B 1E B6 25 CD
00002F10  3F 57 BF CA 29 CD 3F 91  BB 1A 00 CD 3D 03 CD 3F
00002F20  77 93 A3 B6 25 83 3E B6  25 00 75 03 E9 09 01 C7
00002F30  06 B8 25 01 00 A1 B4 25  2B 06 B6 25 A3 BA 25 A1
00002F40  B8 25 A3 BC 25 A1 B6 25  03 06 BC 25 A3 BE 25 8B
00002F50  1E BC 25 8B D3 D1 E3 D1  E3 81 C3 7E 1F 8B 0E BE
00002F60  25 8B C1 D1 E1 D1 E1 81  C1 7E 1F 87 D9 91 CD 3F
00002F70  62 89 5E FA BB 00 00 76  01 4B 89 5E F8 8B 5E FA
00002F80  CD 3F 62 BB 00 00 75 01  4B 8B FA D1 E7 8B 95 38
00002F90  18 8B F1 D1 E6 3B 94 38  18 B9 00 00 7E 01 49 23
00002FA0  CB 0B 4E F8 23 C9 74 03  E9 03 00 E9 74 00 8B 36
00002FB0  BE 25 D1 E6 D1 E6 81 C6  7E 1F 8B 3E BC 25 D1 E7
00002FC0  D1 E7 81 C7 7E 1F CD 3F  14 8B 36 BE 25 D1 E6 81
00002FD0  C6 50 14 8B 3E BC 25 D1  E7 81 C7 50 14 CD 3F 13
00002FE0  8B 36 BE 25 D1 E6 81 C6  44 16 8B 3E BC 25 D1 E7
00002FF0  81 C7 44 16 CD 3F 13 8B  36 BE 25 D1 E6 81 C6 38
00003000  18 8B 3E BC 25 D1 E7 81  C7 38 18 CD 3F 13 A1 BC
00003010  25 2B 06 B6 25 A3 BC 25  83 3E BC 25 01 7C 03 E9
00003020  23 FF A1 B8 25 40 A3 B8  25 A1 BA 25 3B 06 B8 25
00003030  7D 03 E9 D6 FE E9 07 FF  33 C0 E9 DD 00 C7 06 7C
00003040  25 00 00 BB 92 25 BA 30  25 CD 3F 5B 8B 1E 96 25
00003050  CD 3D 1B BA 34 25 CD 3F  5B BB 98 25 BA 38 25 CD
00003060  3F 5B BB 9E 25 BA 3C 25  CD 3F 5B 8B 1E 9C 25 CD
00003070  3D 1B BA 40 25 CD 3F 5B  83 3E A2 25 00 74 03 E9
00003080  0C 00 BB A4 25 CD 3D 1C  BA 44 25 CD 3F 5B 83 3E
00003090  A2 25 01 74 03 E9 0C 00  BB A8 25 CD 3D 1C BA 44
000030A0  25 CD 3F 5B B8 01 00 E9  54 00 8B 1E 48 25 8B D3
000030B0  D1 E3 D1 E3 81 C3 66 23  B8 32 00 8B CA F7 2E A2
000030C0  25 03 C1 97 D1 E7 8B D3  8B 9D 50 14 CD 3D 1B CD
000030D0  3F 5B 8B 1E 48 25 8B D3  D1 E3 D1 E3 81 C3 2E 24
000030E0  B8 32 00 8B CA F7 2E A2  25 03 C1 97 D1 E7 8B D3
000030F0  8B 9D 44 16 CD 3D 1B CD  3F 5B A1 48 25 40 A3 48
00003100  25 83 3E 48 25 32 7E A2  A1 A2 25 03 06 90 25 92
00003110  BB 03 00 CD 3E 28 A1 A2  25 40 A3 A2 25 83 3E A2
00003120  25 04 7F 03 E9 16 FF 33  C0 E9 79 00 B8 01 00 E9
00003130  54 00 8B 1E 48 25 8B D3  D1 E3 D1 E3 81 C3 66 23
00003140  B8 64 00 8B CA F7 2E A2  25 03 C1 97 D1 E7 8B D3
00003150  8B 9D 38 18 CD 3D 1B CD  3F 5B 8B 1E 48 25 8B D3
00003160  D1 E3 D1 E3 81 C3 2E 24  B8 64 00 8B CA F7 2E A2
00003170  25 03 C1 97 D1 E7 8B D3  8B 9D 9C 18 CD 3D 1B CD
00003180  3F 5B A1 48 25 40 A3 48  25 83 3E 48 25 32 7E A2
00003190  A1 A2 25 03 06 90 25 05  05 00 92 BB 03 00 CD 3E
000031A0  28 A1 A2 25 40 A3 A2 25  83 3E A2 25 02 7F 03 E9
```

```
000031B0  7A FF BB CE 29 BA 68 25  CD 3F 61 E8 42 28 BB FF
000031C0  FF CD 3E 32 BB F2 26 B8  68 25 CD 3F 62 75 03 E9
000031D0  A6 E6 E9 27 D2 83 3E 54  25 00 75 03 E9 88 00 BB
000031E0  03 00 CD 3E 42 BB 46 00  CD 3E 42 33 DB CD 3E 44
000031F0  CD 3F BC BB 88 29 CD 3F  6A CD 3E 79 BB 03 00 CD
00003200  3E 42 BB 46 00 CD 3E 42  33 DB CD 3E 44 BB AA 26
00003210  CD 3F B5 00 CD 3F B7 01  02 BB A4 25 CD 3F B8 BE
00003220  A4 25 CD 3F A7 72 B8 BB  03 00 CD 3E 42 BB 46 00
00003230  CD 3E 42 33 DB CD 3E 44  CD 3F BC BB 88 29 CD 3F
00003240  6A CD 3E 79 BB 03 00 CD  3E 42 BB 46 00 CD 3E 42
00003250  33 DB CD 3E 44 BB 4E 14  CD 3F BD BB A4 25 CD 3F
00003260  67 CD 3E 79 E9 B0 00 BB  03 00 CD 3E 42 BB 01 00
00003270  CD 3E 42 33 DB CD 3E 44  CD 3F BC BB 32 00 BA 20
00003280  00 CD 3D 0E CD 3F 6A CD  3E 79 BB 03 00 CD 3E 42
00003290  BB 01 00 CD 3E 42 33 DB  CD 3E 44 BB FC 29 BA 68
000032A0  25 CD 3F 61 E8 5F 27 BB  03 00 CD 3E 42 BB 01 00
000032B0  CD 3E 42 33 DB CD 3E 44  CD 3F BC BB 18 2A CD 3F
000032C0  6A CD 3E 79 BB F2 26 B8  68 25 CD 3F 62 75 03 E9
000032D0  24 00 BB AE 26 BA 92 25  CD 3F 61 CD 3F BC BB 2E
000032E0  2A CD 3F 6A BB 0F 00 BA  20 00 CD 3D 0E CD 3F 6E
000032F0  CD 3E 79 E9 21 00 BB 08  29 BA 92 25 CD 3F 61 CD
00003300  3F BC BB 0E 29 CD 3F 6A  BB 0F 00 BA 20 00 CD 3D
00003310  0E CD 3F 6E CD 3E 79 BB  05 00 CD 3E 42 BB 44 00
00003320  CD 3E 42 33 DB CD 3E 44  CD 3F BC BB 50 27 CD 3F
00003330  6A CD 3E 79 BB 17 00 CD  3E 33 33 DB CD 3E 35 CD
00003340  3F BC BB 5F 00 CD 3D 05  CD 3F 6A CD 3E 79 BB 07
00003350  00 CD 3E 33 33 DB CD 3E  35 BB 07 00 CD 3E 42 BB
00003360  44 00 CD 3E 42 33 DB CD  3E 44 CD 3F BC BB 18 00
00003370  CD 3D 05 CD 3F 6A BB 02  27 CD 3F 6A CD 3E 79 BB
00003380  08 00 CD 3E 42 BB 44 00  CD 3E 42 33 DB CD 3E 44
00003390  CD 3F BC BB 19 00 CD 3D  05 CD 3F 6A BB 0C 27 CD
000033A0  3F 6A CD 3E 79 BB 09 00  CD 3E 42 BB 44 00 CD 3E
000033B0  42 33 DB CD 3E 44 CD 3F  BC BB 1A 00 CD 3D 05 CD
000033C0  3F 6A BB 18 27 CD 3F 6A  CD 3E 79 BB 0A 00 CD 3E
000033D0  42 BB 43 00 CD 3E 42 33  DB CD 3E 44 CD 3F BC BB
000033E0  11 00 CD 3D 05 CD 3F 6A  BB C4 00 CD 3D 05 CD 3F
000033F0  6A BB 24 27 CD 3F 6A CD  3E 79 BB 0C 00 CD 3E 42
00003400  BB 42 00 CD 3E 42 33 DB  CD 3E 44 CD 3F BC BB 11
00003410  00 CD 3D 05 CD 3F 6A BB  C4 00 CD 3D 05 CD 3F 6A
00003420  BB D9 00 CD 3D 05 CD 3F  6A BB 30 27 CD 3F 6A CD
00003430  3E 79 83 3E 54 25 00 74  03 E9 12 00 BB 03 00 CD
00003440  3E 42 BB 01 00 CD 3E 42  CD 3E 44 E9 12 00 BB 03
00003450  00 CD 3E 42 BB 3C 00 CD  3E 42 BB 01 00 CD 3E 44
00003460  E9 CD EF B8 05 00 E9 2C  00 83 3E 4A 25 06 75 03
00003470  E9 1E 00 8B 1E 4A 25 CD  3E 42 BB 42 00 CD 3E 42
00003480  33 DB CD 3E 44 CD 3F BC  BB 82 26 CD 3F 6A CD 3E
00003490  79 A1 4A 25 40 A3 4A 25  83 3E 4A 25 0C 7E CA BB
000034A0  05 00 CD 3E 42 BB 44 00  CD 3E 42 33 DB CD 3E 44
000034B0  CD 3F BC BB 50 27 CD 3F  6A CD 3E 79 BB 17 00 CD
000034C0  3E 33 33 DB CD 3E 35 CD  3F BC BB 5F 00 CD 3D 05
000034D0  CD 3F 6A CD 3E 79 BB 07  00 CD 3E 33 33 DB CD 3E
000034E0  35 BB 07 00 CD 3E 42 BB  44 00 CD 3E 42 33 DB CD
000034F0  3E 44 CD 3F BC BB 18 00  CD 3D 05 CD 3F 6A BB 02
00003500  27 CD 3F 6A CD 3E 79 BB  08 00 CD 3E 42 BB 44 00
00003510  CD 3E 42 33 DB CD 3E 44  CD 3F BC BB 19 00 CD 3D
00003520  05 CD 3F 6A BB 0C 27 CD  3F 6A CD 3E 79 BB 0C 00
00003530  CD 3E 42 BB 42 00 CD 3E  42 33 DB CD 3E 44 CD 3F
00003540  BC BB 11 00 CD 3D 05 CD  3F 6A BB C4 00 CD 3D 05
00003550  CD 3F 6A BB D9 00 CD 3D  05 CD 3F 6A BB 30 27 CD
00003560  3F 6A CD 3E 79 BB 06 00  CD 3E 42 BB 01 00 CD 3E
00003570  42 CD 3E 44 C7 06 50 25  00 00 C7 06 54 25 00 00
00003580  CD 3D 06 BA 68 25 CD 3F  61 BB 68 25 CD 3F BA 0B
00003590  DB 74 ED BB 0A 25 B8 68  25 CD 3F 62 75 03 E9 6A
000035A0  CE BB FA 24 B8 68 25 CD  3F 62 74 03 E9 0A 00 A1
000035B0  50 25 48 A3 50 25 E9 4E  00 BB FE 24 B8 68 25 CD
000035C0  3F 62 74 03 E9 0A 00 A1  50 25 40 A3 50 25 E9 36
000035D0  00 A1 52 25 3B 06 50 25  7C A6 BB 02 25 B8 68 25
000035E0  CD 3F 62 74 03 E9 0A 00  A1 54 25 48 A3 54 25 E9
000035F0  15 00 BB 06 25 B8 68 25  CD 3F 62 75 83 A1 54 25
00003600  40 A3 54 25 E9 00 00 83  3E 50 25 00 75 03 E9 52
00003610  FE BB 02 25 B8 68 25 CD  3F 62 BA 00 00 75 01 4A
00003620  BB 06 25 CD 3F 62 B9 00  00 75 01 49 0B CA 23 C9
00003630  74 03 E9 6C 03 83 3E 50  25 00 7C 03 E9 0F 00 C7
00003640  06 48 25 04 00 C7 06 54  25 00 00 E9 30 EF 8B 1E
00003650  52 25 8B D3 43 3B 1E 50  25 B9 00 00 7D 01 49 89
```

```
00003660  5E FA BB FE 24 B8 68 25  CD 3F 62 89 5E F8 BB 00
00003670  00 75 01 4B 83 3E 50 25  01 89 5E F6 BB 00 00 74
00003680  01 4B 23 5E F6 89 46 F4  A1 50 25 3B 46 FA 89 5E
00003690  F2 BB 00 00 74 01 4B 23  5E F2 0B D9 8B CB BB FA
000036A0  24 89 46 F0 8B 46 F4 CD  3F 62 89 5E EE BB 00 00
000036B0  75 01 4B 83 7E F0 00 B8  00 00 74 01 48 23 C3 3B
000036C0  56 F0 BB 00 00 74 01 4B  23 D8 0B D9 23 DB 74 03
000036D0  E9 2F 02 B8 05 00 E9 2C  00 83 3E 4A 25 06 75 03
000036E0  E9 1E 00 8B 1E 4A 25 CD  3E 42 BB 42 00 CD 3E 42
000036F0  33 DB CD 3E 44 CD 3F BC  BB 82 26 CD 3F 6A CD 3E
00003700  79 A1 4A 25 40 A3 4A 25  83 3E 4A 25 0C 7E CA A1
00003710  52 25 3B 06 50 25 BB 00  00 7D 01 4B 83 3E 50 25
00003720  00 BA 00 00 75 01 4A 0B  D3 23 D2 74 03 E9 03 00
00003730  E9 C9 00 BB 05 00 CD 3E  42 BB 44 00 CD 3E 42 33
00003740  DB CD 3E 44 CD 3F BC BB  50 27 CD 3F 6A CD 3E 79
00003750  BB 17 00 CD 3E 33 33 DB  CD 3E 35 CD 3F BC BB 5F
00003760  00 CD 3D 05 CD 3F 6A CD  3E 79 BB 07 00 CD 3E 33
00003770  33 DB CD 3E 35 BB 07 00  CD 3E 42 BB 44 00 CD 3E
00003780  42 33 DB CD 3E 44 CD 3F  BC BB 18 00 CD 3D 05 CD
00003790  3F 6A BB 02 27 CD 3F 6A  CD 3E 79 BB 08 00 CD 3E
000037A0  42 BB 44 00 CD 3E 42 33  DB CD 3E 44 CD 3F BC BB
000037B0  19 00 CD 3D 05 CD 3F 6A  BB 0C 27 CD 3F 6A CD 3E
000037C0  79 BB 0C 00 CD 3E 42 BB  42 00 CD 3E 42 33 DB CD
000037D0  3E 44 CD 3F BC BB 11 00  CD 3D 05 CD 3F 6A BB C4
000037E0  00 CD 3D 05 CD 3F 6A BB  D9 00 CD 3D 05 CD 3F 6A
000037F0  BB 30 27 CD 3F 6A CD 3E  79 E9 06 01 BB 05 00 CD
00003800  3E 42 BB 44 00 CD 3E 42  33 DB CD 3E 44 CD 3F BC
00003810  BB 50 27 CD 3F 6A CD 3E  79 BB 17 00 CD 3E 33 33
00003820  DB CD 3E 35 CD 3F BC BB  5F 00 CD 3D 05 CD 3F 6A
00003830  CD 3E 79 BB 07 00 CD 3E  33 33 DB CD 3E 35 BB 07
00003840  00 CD 3E 42 BB 44 00 CD  3E 42 33 DB CD 3E 44 CD
00003850  3F BC BB 18 00 CD 3D 05  CD 3F 6A BB 02 27 CD 3F
00003860  6A CD 3E 79 BB 08 00 CD  3E 42 BB 44 00 CD 3E 42
00003870  33 DB CD 3E 44 CD 3F BC  BB 19 00 CD 3D 05 CD 3F
00003880  6A BB 0C 27 CD 3F 6A CD  3E 79 BB 09 00 CD 3E 42
00003890  BB 44 00 CD 3E 42 33 DB  CD 3E 44 CD 3F BC BB 1A
000038A0  00 CD 3D 05 CD 3F 6A BB  18 27 CD 3F 6A CD 3E 79
000038B0  BB 0A 00 CD 3E 42 BB 43  00 CD 3E 42 33 DB CD 3E
000038C0  44 CD 3F BC BB 11 00 CD  3D 05 CD 3F 6A BB C4 00
000038D0  CD 3D 05 CD 3F 6A BB 24  27 CD 3F 6A CD 3E 79 BB
000038E0  0C 00 CD 3E 42 BB 42 00  CD 3E 42 33 DB CD 3E 44
000038F0  CD 3F BC BB 0E 25 CD 3F  6A BB 30 27 CD 3F 6A CD
00003900  3E 79 8B 1E 52 25 43 43  43 3B 1E 50 25 75 03 E9
00003910  2D 01 8B 1E 52 25 43 43  43 43 3B 1E 50 25 75 03
00003920  E9 FA 00 8B 1E 52 25 43  43 3B 1E 50 25 75 03 E9
00003930  D9 00 8B 1E 52 25 43 3B  1E 50 25 75 03 E9 B2 00
00003940  8B 1E 52 25 43 43 43 43  3B 1E 50 25 7C 03 E9 09
00003950  00 C7 06 48 25 01 00 E9  B7 EA 8B 1E 50 25 83 C3
00003960  06 CD 3E 42 B9 02 00 A1  54 25 99 F7 F9 92 BB 2B
00003970  00 F7 EB 40 93 CD 3E 42  BB 01 00 CD 3E 44 83 3E
00003980  54 25 02 7D 03 E9 F8 FB  8B 1E 50 25 83 C3 06 CD
00003990  3E 42 BB 37 00 CD 3E 42  BB 01 00 CD 3E 44 E9 DF
000039A0  FB 83 3E 54 25 F2 74 03  E9 08 00 C7 06 54 25 02
000039B0  00 EB A7 83 3E 54 25 01  BB 00 00 75 01 4B 83 3E
000039C0  54 25 00 BA 00 00 75 01  4A 0B D3 83 3E 54 25 02
000039D0  BB 00 00 75 01 4B 0B DA  23 DB 74 03 E9 7B FF 83
000039E0  3E 54 25 03 74 03 E9 09  00 C7 06 54 25 00 00 E9
000039F0  68 FF A1 52 25 40 A3 50  25 BB 14 00 CD 3E 42 BB
00003A00  01 00 CD 3E 42 CD 3E 44  E9 75 FB BB 15 00 CD 3E
00003A10  42 BB 01 00 CD 3E 42 CD  3E 44 E9 63 FB A1 52 25
00003A20  40 40 40 40 A3 50 25 C7  06 54 25 00 00 BB 17 00
00003A30  CD 3E 42 BB 01 00 CD 3E  42 CD 3E 44 E9 41 FB A1
00003A40  52 25 40 40 40 A3 50 25  BB 16 00 CD 3E 42 BB 01
00003A50  00 CD 3E 42 CD 3E 44 E9  26 FB BB FF FF CD 3E 32
00003A60  CD 3F BC BB 4C 2A CD 3F  6E CD 3E 79 BB 04 00 BA
00003A70  FF 7F CD 3D 07 BA 68 25  CD 3F 61 BB 66 2A B8 68
00003A80  25 CD 3F 62 BA 00 00 75  01 4A BB 6E 2A CD 3F 62
00003A90  B9 00 00 75 01 49 0B CA  23 C9 74 03 E9 21 00 BB
00003AA0  FF FF CD 3E 32 CD 3F BC  BB 76 2A CD 3F 6A CD 3E
00003AB0  79 CD 3D 06 93 BB AA 26  CD 3F 62 74 F4 E9 3C C9
00003AC0  BB A8 2A BA 68 25 CD 3F  61 E8 34 1F BB F2 26 B8
00003AD0  68 25 CD 3F 62 74 03 E9  32 05 C7 06 78 25 00 00
00003AE0  C7 06 48 25 01 00 C7 06  4A 25 00 00 BB 03 00 8B
00003AF0  16 48 25 CD 3E 26 BB 03  00 CD 3D 2F 83 FB FF 74
00003B00  03 E9 09 00 A1 4A 25 A3  7C 25 E9 91 00 A1 4A 25
```

| | | | | | | | | | | | | | | | | |
|---|---|---|---|---|---|---|---|---|---|---|---|---|---|---|---|---|
| 00003B10 | 40 | A3 | 4A | 25 | BB | 38 | 25 | BA | 6C | 27 | 8B | CB | CD | 3D | 09 | 0B |
| 00003B20 | DB | 74 | 03 | E9 | 0B | 00 | 91 | BB | 72 | 27 | CD | 3F | 55 | 92 | CD | 3F |
| 00003B30 | 61 | 8B | 1E | 4A | 25 | D1 | E3 | D1 | E3 | 81 | C3 | 8E | 1A | 8B | CB | BB |
| 00003B40 | 38 | 25 | BA | 6C | 27 | 8B | C3 | CD | 3D | 09 | 4B | 93 | 92 | 89 | 5E | FA |
| 00003B50 | CD | 3D | 0B | 8B | D0 | B8 | 7A | 27 | CD | 3F | 55 | 93 | BB | 84 | 27 | CD |
| 00003B60 | 3F | 55 | 8B | C3 | 8B | 5E | FA | CD | 3D | 09 | 8B | D3 | 8B | 5E | FA | CD |
| 00003B70 | 3F | BA | 2B | DA | 8B | D3 | 8B | 5E | FA | CD | 3D | 0C | CD | 3F | 55 | 93 |
| 00003B80 | BB | 90 | 27 | CD | 3F | 55 | 93 | BB | 3C | 25 | CD | 3F | 55 | 8B | D1 | CD |
| 00003B90 | 3F | 61 | A1 | 48 | 25 | 05 | 08 | 00 | A3 | 48 | 25 | E9 | 4E | FF | C7 | 06 |
| 00003BA0 | 7E | 25 | 00 | 00 | C7 | 06 | 80 | 25 | 00 | 00 | C7 | 06 | 82 | 25 | 00 | 00 |
| 00003BB0 | BB | FF | FF | CD | 3E | 32 | B8 | 01 | 00 | E9 | 5F | 00 | B8 | 14 | 00 | F7 |
| 00003BC0 | 2E | 78 | 25 | 03 | 06 | 48 | 25 | 3B | 06 | 4A | 25 | 7E | 03 | E9 | 55 | 00 |
| 00003BD0 | A1 | 82 | 25 | 40 | A3 | 82 | 25 | 8B | 1E | 48 | 25 | 8B | D3 | D1 | E3 | D1 |
| 00003BE0 | E3 | 81 | C3 | FE | 1D | B8 | 14 | 00 | 8B | CA | F7 | 2E | 78 | 25 | 03 | C1 |
| 00003BF0 | D1 | E0 | D1 | E0 | 05 | 8E | 1A | 93 | 92 | CD | 3F | 61 | CD | 3F | BC | 8B |
| 00003C00 | 1E | 48 | 25 | D1 | E3 | D1 | E3 | 81 | C3 | FE | 1D | B8 | D4 | 26 | CD | 3F |
| 00003C10 | 55 | CD | 3F | 6E | CD | 3E | 79 | A1 | 48 | 25 | 40 | A3 | 48 | 25 | 83 | 3E |
| 00003C20 | 48 | 25 | 14 | 7E | 97 | B8 | 14 | 00 | F7 | 2E | 78 | 25 | 05 | 15 | 00 | 3B |
| 00003C30 | 06 | 4A | 25 | 7C | 03 | E9 | 2D | 00 | CD | 3F | BC | BB | DA | 27 | CD | 3F |
| 00003C40 | 6E | CD | 3E | 79 | A1 | 82 | 25 | 40 | A3 | 82 | 25 | A1 | 82 | 25 | A3 | 7E |
| 00003C50 | 25 | 8B | 1E | 82 | 25 | D1 | E3 | D1 | E3 | 81 | C3 | FE | 1D | 8B | D3 | BB |
| 00003C60 | DA | 27 | CD | 3F | 61 | 83 | 3E | 78 | 25 | 00 | 7F | 03 | E9 | 2D | 00 | CD |
| 00003C70 | 3F | BC | BB | F6 | 27 | CD | 3F | 6E | CD | 3E | 79 | A1 | 82 | 25 | 40 | A3 |
| 00003C80 | 82 | 25 | A1 | 82 | 25 | A3 | 80 | 25 | 8B | 1E | 82 | 25 | D1 | E3 | D1 | E3 |
| 00003C90 | 81 | C3 | FE | 1D | 8B | D3 | BB | F6 | 27 | CD | 3F | 61 | BB | 05 | 00 | CD |
| 00003CA0 | 3E | 42 | BB | 44 | 00 | CD | 3E | 42 | 33 | DB | CD | 3E | 44 | CD | 3F | BC |
| 00003CB0 | BB | 50 | 27 | CD | 3F | 6A | CD | 3E | 79 | BB | 17 | 00 | CD | 3E | 33 | 33 |
| 00003CC0 | DB | CD | 3E | 35 | CD | 3F | BC | BB | 5F | 00 | CD | 3D | 05 | CD | 3F | 6A |
| 00003CD0 | CD | 3E | 79 | BB | 07 | 00 | CD | 3E | 33 | 33 | DB | CD | 3E | 35 | BB | 07 |
| 00003CE0 | 00 | CD | 3E | 42 | BB | 44 | 00 | CD | 3E | 42 | 33 | DB | CD | 3E | 44 | CD |
| 00003CF0 | 3F | BC | BB | 18 | 00 | CD | 3D | 05 | CD | 3F | 6A | BB | 02 | 27 | CD | 3F |
| 00003D00 | 6A | CD | 3E | 79 | BB | 08 | 00 | CD | 3E | 42 | BB | 44 | 00 | CD | 3E | 42 |
| 00003D10 | 33 | DB | CD | 3E | 44 | CD | 3F | BC | BB | 19 | 00 | CD | 3D | 05 | CD | 3F |
| 00003D20 | 6A | BB | 0C | 27 | CD | 3F | 6A | CD | 3E | 79 | BB | 0C | 00 | CD | 3E | 42 |
| 00003D30 | BB | 42 | 00 | CD | 3E | 42 | 33 | DB | CD | 3E | 44 | CD | 3F | BC | BB | 11 |
| 00003D40 | 00 | CD | 3D | 05 | CD | 3F | 6A | BB | C4 | 00 | CD | 3D | 05 | CD | 3F | 6A |
| 00003D50 | BB | D9 | 00 | CD | 3D | 05 | CD | 3F | 6A | BB | 30 | 27 | CD | 3F | 6A | CD |
| 00003D60 | 3E | 79 | C7 | 06 | 48 | 25 | 01 | 00 | 8B | 1E | 48 | 25 | CD | 3E | 42 | BB |
| 00003D70 | 01 | 00 | CD | 3E | 42 | 33 | DB | CD | 3E | 44 | BB | 17 | 00 | CD | 3E | 33 |
| 00003D80 | 33 | DB | CD | 3E | 35 | CD | 3F | BC | BB | 5F | 00 | CD | 3D | 05 | CD | 3F |
| 00003D90 | 6A | CD | 3E | 79 | 33 | DB | CD | 3E | 33 | BB | 07 | 00 | CD | 3E | 35 | CD |
| 00003DA0 | 3F | BC | 8B | 1E | 48 | 25 | D1 | E3 | D1 | E3 | 81 | C3 | FE | 1D | CD | 3F |
| 00003DB0 | 6A | CD | 3E | 79 | BB | 07 | 00 | CD | 3E | 33 | 33 | DB | CD | 3E | 35 | BB |
| 00003DC0 | 19 | 00 | CD | 3E | 42 | BB | 01 | 00 | CD | 3E | 42 | 33 | DB | CD | 3E | 44 |
| 00003DD0 | CD | 3D | 06 | BA | 68 | 25 | CD | 3F | 61 | BB | 68 | 25 | CD | 3F | BA | 0B |
| 00003DE0 | DB | 74 | ED | BB | 0A | 25 | B8 | 68 | 25 | CD | 3F | 62 | BA | 00 | 00 | 74 |
| 00003DF0 | 01 | 4A | BB | FA | 24 | CD | 3F | 62 | B9 | 00 | 00 | 74 | 01 | 49 | 23 | CA |
| 00003E00 | BB | FE | 24 | CD | 3F | 62 | BA | 00 | 00 | 74 | 01 | 4A | 23 | D1 | 23 | D2 |
| 00003E10 | 75 | BE | 8B | 1E | 48 | 25 | CD | 3E | 42 | BB | 01 | 00 | CD | 3E | 42 | 33 |
| 00003E20 | DB | CD | 3E | 44 | CD | 3F | BC | BB | D4 | 26 | CD | 3F | 6A | 8B | 1E | 48 |
| 00003E30 | 25 | D1 | E3 | D1 | E3 | 81 | C3 | FE | 1D | CD | 3F | 6A | CD | 3E | 79 | BB |
| 00003E40 | 0A | 25 | B8 | 68 | 25 | CD | 3F | 62 | 75 | 03 | E9 | 44 | 00 | BB | FE | 24 |
| 00003E50 | B8 | 68 | 25 | CD | 3F | 62 | 74 | 03 | E9 | 1C | 00 | A1 | 48 | 25 | 40 | A3 |
| 00003E60 | 48 | 25 | A1 | 82 | 25 | 3B | 06 | 48 | 25 | 7C | 03 | E9 | 06 | 00 | C7 | 06 |
| 00003E70 | 48 | 25 | 01 | 00 | E9 | F1 | FE | A1 | 48 | 25 | 48 | A3 | 48 | 25 | 83 | 3E |
| 00003E80 | 48 | 25 | 00 | 74 | 03 | E9 | 06 | 00 | A1 | 82 | 25 | A3 | 48 | 25 | E9 | D7 |
| 00003E90 | FE | A1 | 48 | 25 | 3B | 06 | 7E | 25 | 74 | 03 | E9 | 0A | 00 | A1 | 78 | 25 |
| 00003EA0 | 40 | A3 | 78 | 25 | E9 | F7 | FC | A1 | 48 | 25 | 3B | 06 | 80 | 25 | 74 | 03 |
| 00003EB0 | E9 | 0A | 00 | A1 | 78 | 25 | 48 | A3 | 78 | 25 | E9 | E1 | FC | BB | FF | FF |
| 00003EC0 | CD | 3E | 32 | B8 | 14 | 00 | F7 | 2E | 78 | 25 | 03 | 06 | 48 | 25 | D1 | E0 |
| 00003ED0 | D1 | E0 | D1 | E0 | 05 | F9 | FF | A3 | 90 | 25 | BB | A8 | 2A | BA | 68 | 25 |
| 00003EE0 | CD | 3F | 61 | E8 | 1A | 1B | BB | F2 | 26 | B8 | 68 | 25 | CD | 3F | 62 | 74 |
| 00003EF0 | 03 | E9 | 18 | 01 | C7 | 06 | 7C | 25 | 00 | 00 | BB | FF | FF | CD | 3E | 32 |
| 00003F00 | CD | 3F | BC | BB | B8 | 2A | CD | 3F | 6E | CD | 3E | 79 | BB | 04 | 00 | CD |
| 00003F10 | 3E | 21 | BB | 5A | 26 | CD | 3E | 1F | BB | 04 | 00 | BA | CA | 2A | B9 | 00 |
| 00003F20 | 01 | CD | 3E | 1E | BB | 04 | 00 | CD | 3D | 31 | BF | D8 | 2A | CD | 3F | A2 |
| 00003F30 | 73 | 03 | E9 | 0E | 00 | BB | 04 | 00 | CD | 3E | 21 | BB | CA | 2A | CD | 3E |
| 00003F40 | 24 | EB | CF | BB | 04 | 00 | CD | 3F | B3 | BB | C0 | 25 | BA | FE | 00 | CD |
| 00003F50 | 3F | B4 | BB | C4 | 25 | BA | 02 | 00 | CD | 3F | B4 | BB | 03 | 00 | CD | 3F |
| 00003F60 | B3 | BB | C8 | 25 | BA | FE | 00 | CD | 3F | B4 | BB | CC | 25 | BA | 02 | 00 |
| 00003F70 | CD | 3F | B4 | C7 | 06 | 48 | 25 | 01 | 00 | C7 | 06 | D0 | 25 | 01 | 00 | BB |
| 00003F80 | 03 | 00 | 8B | 16 | 48 | 25 | CD | 3E | 26 | BB | 03 | 00 | CD | 3D | 2F | 83 |
| 00003F90 | FB | FF | 75 | 03 | E9 | 63 | 00 | A1 | 90 | 25 | 3B | 06 | 48 | 25 | 75 | 03 |
| 00003FA0 | E9 | 4C | 00 | A1 | 48 | 25 | 8B | D8 | 05 | 07 | 00 | A3 | D2 | 25 | 93 | E9 |
| 00003FB0 | 31 | 00 | BB | 03 | 00 | 8B | 16 | 4A | 25 | CD | 3E | 26 | BB | C8 | 25 | BA |

```
00003FC0  C0 25 CD 3F 5B BB CC 25  BA C4 25 CD 3F 5B BB 04
00003FD0  00 8B 16 D0 25 CD 3E 28  A1 D0 25 40 A3 D0 25 A1
00003FE0  4A 25 40 A3 4A 25 A1 D2  25 3B 06 4A 25 7D C3 A1
00003FF0  48 25 05 08 00 A3 48 25  EB 85 CD 3E 22 BB 6E 26
00004000  CD 3E 24 BB CA 2A BA 6E  26 CD 3E 23 BB E0 2A BA
00004010  68 25 CD 3F 61 E8 E8 19  BB 06 2B B8 68 25 CD 3F
00004020  62 75 03 E9 D6 C3 E9 D7  C2 BB AE 26 BA 92 25 CD
00004030  3F 61 C7 06 74 25 01 00  B8 01 00 E9 4C 00 8B 3E
00004040  48 25 D1 E7 C7 85 38 18  00 00 8B 1E 48 25 D1 E3
00004050  D1 E3 81 C3 7E 1F 8B D3  BB 0C 2B CD 3F 61 B8 01
00004060  00 E9 18 00 B8 FA 00 F7  2E 4A 25 97 03 3E 48 25
00004070  D1 E7 C7 85 5C 12 00 00  A1 4A 25 40 A3 4A 25 83
00004080  3E 4A 25 02 7E DE A1 48  25 40 A3 48 25 81 3E 48
00004090  25 FA 00 7E A9 B8 FB 00  E9 10 00 8B 3E 48 25 D1
000040A0  E7 C7 85 38 18 00 00 A1  48 25 40 A3 48 25 81 3E
000040B0  48 25 2C 01 7E E5 BB D4  26 BA D4 25 CD 3F 61 BB
000040C0  14 2B BA 68 25 CD 3F 61  E8 35 19 BB 06 2B B8 68
000040D0  25 CD 3F 62 75 03 E9 26  06 BB 42 2B BA D4 25 CD
000040E0  3F 61 B8 01 00 E9 28 00  8B 3E 48 25 D1 E7 C7 85
000040F0  50 14 00 00 8B 3E 48 25  D1 E7 C7 85 44 16 00 00
00004100  8B 3E 48 25 D1 E7 C7 85  38 18 00 00 A1 48 25 40
00004110  A3 48 25 81 3E 48 25 FA  00 7E CD C7 06 78 25 00
00004120  00 C7 06 48 25 01 00 C7  06 4A 25 00 00 BB 03 00
00004130  8B 16 48 25 CD 3E 26 BB  03 00 CD 3D 2F 83 FB FF
00004140  74 03 E9 09 00 A1 4A 25  A3 7C 25 E9 91 00 A1 4A
00004150  25 40 A3 4A 25 BB 38 25  BA 6C 27 8B CB CD 3D 09
00004160  0B DB 74 03 E9 0B 00 91  BB 72 27 CD 3F 55 92 CD
00004170  3F 61 8B 1E 4A 25 D1 E3  D1 E3 81 C3 8E 1A 8B CB
00004180  BB 38 25 BA 6C 27 8B C3  CD 3D 09 4B 93 92 89 5E
00004190  FA CD 3D 0B 8B D0 B8 7A  27 CD 3F 55 93 BB 84 27
000041A0  CD 3F 55 8B C3 8B 5E FA  CD 3D 09 8B D3 8B 5E FA
000041B0  CD 3F BA 2B DA 8B D3 8B  5E FA CD 3D 0C CD 3F 55
000041C0  93 BB 90 27 CD 3F 55 93  BB 3C 25 CD 3F 55 8B D1
000041D0  CD 3F 61 A1 48 25 05 08  00 A3 48 25 E9 4E FF C7
000041E0  06 7E 25 00 00 C7 06 80  25 00 00 C7 06 82 25 00
000041F0  00 BB FF FF CD 3E 32 B8  01 00 E9 5F 00 B8 14 00
00004200  F7 2E 78 25 03 06 48 25  3B 06 4A 25 7E 03 E9 55
00004210  00 A1 82 25 40 A3 82 25  8B 1E 48 25 8B D3 D1 E3
00004220  D1 E3 81 C3 FE 1D B8 14  00 8B CA F7 2E 78 25 03
00004230  C1 D1 E0 D1 E0 05 8E 1A  93 92 CD 3F 61 CD 3F BC
00004240  8B 1E 48 25 D1 E3 D1 E3  81 C3 FE 1D B8 D4 26 CD
00004250  3F 55 CD 3F 6E CD 3E 79  A1 48 25 40 A3 48 25 83
00004260  3E 48 25 14 7E 97 B8 14  00 F7 2E 78 25 05 15 00
00004270  3B 06 4A 25 7C 03 E9 2D  00 CD 3F BC BB DA 27 CD
00004280  3F 6E CD 3E 79 A1 82 25  40 A3 82 25 A1 82 25 A3
00004290  7E 25 8B 1E 82 25 D1 E3  D1 E3 81 C3 FE 1D 8B D3
000042A0  BB DA 27 CD 3F 61 83 3E  78 25 00 7F 03 E9 2D 00
000042B0  CD 3F BC BB F6 27 CD 3F  6E CD 3E 79 A1 82 25 40
000042C0  A3 82 25 A1 82 25 A3 80  25 8B 1E 82 25 D1 E3 D1
000042D0  E3 81 C3 FE 1D 8B D3 BB  F6 27 CD 3F 61 BB 05 00
000042E0  CD 3E 42 BB 44 00 CD 3E  42 33 DB CD 3E 44 CD 3F
000042F0  BC BB 50 27 CD 3F 6A CD  3E 79 BB 17 00 CD 3E 33
00004300  33 DB CD 3E 35 CD 3F BC  BB 5F 00 CD 3D 05 CD 3F
00004310  6E CD 3E 79 BB 07 00 CD  3E 33 33 DB CD 3E 35 BB
00004320  07 00 CD 3E 42 BB 44 00  CD 3E 42 33 DB CD 3E 44
00004330  CD 3F BC BB 18 00 CD 3D  05 CD 3F 6A BB 02 27 CD
00004340  3F 6A CD 3E 79 BB 08 00  CD 3E 42 BB 44 00 CD 3E
00004350  42 33 DB CD 3E 44 CD 3F  BC BB 19 00 CD 3D 05 CD
00004360  3F 6A BB 0C 27 CD 3F 6A  CD 3E 79 BB 0C 00 CD 3E
00004370  42 BB 42 00 CD 3E 42 33  DB CD 3E 44 CD 3F BC BB
00004380  11 00 CD 3D 05 CD 3F 6A  BB C4 00 CD 3D 05 CD 3F
00004390  6A BB D9 00 CD 3D 05 CD  3F 6A BB 30 27 CD 3F 6A
000043A0  CD 3E 79 C7 06 48 25 01  00 8B 1E 48 25 CD 3E 42
000043B0  BB 01 00 CD 3E 42 33 DB  CD 3E 44 BB 17 00 CD 3E
000043C0  33 33 DB CD 3E 35 CD 3F  BC BB 5F 00 CD 3D 05 CD
000043D0  3F 6A CD 3E 79 33 DB CD  3E 33 BB 07 00 CD 3E 35
000043E0  CD 3F BC 8B 1E 48 25 D1  E3 D1 E3 81 C3 FE 1D CD
000043F0  3F 6A CD 3E 79 BB 07 00  CD 3E 33 33 DB CD 3E 35
00004400  BB 19 00 CD 3E 42 BB 01  00 CD 3E 42 33 DB CD 3E
00004410  44 CD 3D 06 BA 68 25 CD  3F 61 BB 68 25 CD 3F BA
00004420  0B DB 74 ED BB 0A 25 B8  68 25 CD 3F 62 BA 00 00
00004430  74 01 4A BB FA 24 CD 3F  62 B9 00 00 74 01 49 23
00004440  CA BB FE 24 CD 3F 62 BA  00 00 74 01 4A 23 D1 23
00004450  D2 75 BE 8B 1E 48 25 CD  3E 42 BB 01 00 CD 3E 42
00004460  33 DB CD 3E 44 CD 3F BC  BB D4 26 CD 3F 6A 8B 1E
```

```
00004470  48 25 D1 E3 D1 E3 81 C3  FE 1D CD 3F 6A CD 3E 79
00004480  BB 0A 25 B8 68 25 CD 3F  62 75 03 E9 44 00 BB FE
00004490  24 B8 68 25 CD 3F 62 74  03 E9 1C 00 A1 48 25 40
000044A0  A3 48 25 A1 82 25 3B 06  48 25 7C 03 E9 06 00 C7
000044B0  06 48 25 01 00 E9 F1 FE  A1 48 25 48 A3 48 25 83
000044C0  3E 48 25 00 74 03 E9 06  00 A1 82 25 A3 48 25 E9
000044D0  D7 FE A1 48 25 3B 06 7E  25 74 03 E9 0A 00 A1 78
000044E0  25 40 A3 78 25 E9 F7 FC  A1 48 25 3B 06 80 25 74
000044F0  03 E9 0A 00 A1 78 25 48  A3 78 25 E9 E1 FC BB FF
00004500  FF CD 3E 32 B8 14 00 F7  2E 78 25 03 06 48 25 D1
00004510  E0 D1 E0 D1 E0 05 F9 FF  A3 90 25 BB 03 00 8B 16
00004520  90 25 CD 3E 26 BB 30 25  BA 92 25 CD 3F 61 BB 34
00004530  25 CD 3D 18 93 A3 96 25  BB 38 25 BA 98 25 CD 3F
00004540  61 BB 40 25 CD 3D 18 93  A3 9C 25 BB 3C 25 BA 9E
00004550  25 CD 3F 61 33 C0 E9 98  00 A1 A2 25 03 06 90 25
00004560  92 BB 03 00 CD 3E 26 83  3E A2 25 00 74 03 E9 0C
00004570  00 BB 44 25 CD 3D 19 BF  A4 25 CD 3F 7D 83 3E A2
00004580  25 01 74 03 E9 0C 00 BB  44 25 CD 3D 19 BF A8 25
00004590  CD 3F 7D B8 01 00 E9 4A  00 8B 1E 48 25 8B D3 D1
000045A0  E3 D1 E3 81 C3 2E 24 CD  3D 18 B8 32 00 8B CA F7
000045B0  2E A2 25 03 C1 97 D1 E7  89 9D 44 16 8B 1E 48 25
000045C0  8B D3 D1 E3 D1 E3 81 C3  66 23 CD 3D 18 B8 32 00
000045D0  8B CA F7 2E A2 25 03 C1  97 D1 E7 89 9D 50 14 A1
000045E0  48 25 40 A3 48 25 83 3E  48 25 32 7E AC A1 A2 25
000045F0  40 A3 A2 25 83 3E A2 25  04 7F 03 E9 5B FF BB 98
00004600  25 BA 6C 27 8B CB CD 3D  09 0B DB 74 03 E9 0B 00
00004610  91 BB 44 28 CD 3F 55 92  CD 3F 61 33 C0 E9 6F 00
00004620  A1 A2 25 03 06 90 25 05  05 00 92 BB 03 00 CD 3E
00004630  26 B8 01 00 E9 4A 00 8B  1E 48 25 8B D3 D1 E3 D1
00004640  E3 81 C3 66 23 CD 3D 18  B8 64 00 8B CA F7 2E A2
00004650  25 03 C1 97 D1 E7 89 9D  38 18 8B 1E 48 25 8B D3
00004660  D1 E3 D1 E3 81 C3 2E 24  CD 3D 18 B8 64 00 8B CA
00004670  F7 2E A2 25 03 C1 97 D1  E7 89 9D 9C 18 A1 48 25
00004680  40 A3 48 25 83 3E 48 25  32 7E AC A1 A2 25 40 A3
00004690  A2 25 83 3E A2 25 02 7E  87 C7 06 74 25 00 00 B8
000046A0  01 00 E9 4F 00 8B 3E AC  25 D1 E7 83 BD 50 14 00
000046B0  74 03 E9 17 00 8B 1E AC  25 D1 E3 D1 E3 81 C3 7E
000046C0  1F 8B D3 BB AE 26 CD 3F  61 E9 24 00 8B 3E AC 25
000046D0  D1 E7 BB 01 00 8B 95 50  14 CD 3E 26 8B 1E AC 25
000046E0  D1 E3 D1 E3 81 C3 7E 1F  8B D3 BB 28 25 CD 3F 61
000046F0  A1 AC 25 40 A3 AC 25 81  3E AC 25 FA 00 7E A6 BB
00004700  FF FF CD 3E 32 CD 3F BC  BB 4E 28 CD 3F 6A BB 23
00004710  00 CD 3F 37 BB AA 26 CD  3F 6A BB 5A 28 CD 3F 6E
00004720  CD 3E 79 CD 3F BC BB 72  28 CD 3F 6E CD 3E 79 CD
00004730  3F BC BB 82 28 CD 3F 6A  BB 3C 00 CD 3F 37 BB AA
00004740  26 CD 3F 6A BB 98 28 CD  3F 6E CD 3E 79 CD 3F BC
00004750  BB A6 28 CD 3F 6A BB 3C  00 CD 3F 37 BB AA 26 CD
00004760  3F 6A BB C6 28 CD 3F 6E  CD 3E 79 CD 3F BC BB D4
00004770  28 CD 3F 6A BB 27 00 CD  3F 37 BB AA 26 CD 3F 6A
00004780  BB EC 28 CD 3F 6E CD 3E  79 C7 06 50 25 00 00 BB
00004790  01 00 CD 3E 42 CD 3E 42  33 DB CD 3E 44 CD 3F BC
000047A0  BB 4E 28 CD 3F 6A BB 32  00 BA 20 00 CD 3D 0E CD
000047B0  3F 6A CD 3E 79 BB 01 00  CD 3E 42 BB 08 00 CD 3E
000047C0  42 33 DB CD 3E 44 33 DB  CD 3E 33 BB 07 00 CD 3E
000047D0  35 CD 3F BC BB 76 29 CD  3F 6A CD 3E 79 BB 07 00
000047E0  CD 3E 33 33 DB CD 3E 35  BB 01 00 CD 3E 42 BB 08
000047F0  00 CD 3E 42 33 DB CD 3E  44 BB AA 26 CD 3F B5 02
00004800  BB 98 25 CD 3F 5A BB 98  25 CD 3F BA 83 FB 0D 7E
00004810  03 E9 7B FF BB 01 00 CD  3E 42 BB 08 00 CD 3E 42
00004820  33 DB CD 3E 44 CD 3F BC  BB 98 25 CD 3F 6A CD 3F
00004830  BA 83 EB 0D F7 DB CD 3D  0D CD 3F 6A BB 23 00 CD
00004840  3F 37 BB AA 26 CD 3F 6A  BB 5A 28 CD 3F 6A CD 3E
00004850  79 BB 01 00 CD 3E 42 BB  39 00 CD 3E 42 33 DB CD
00004860  3E 44 33 DB CD 3E 33 BB  07 00 CD 3E 35 CD 3F BC
00004870  BB 98 25 CD 3F BA 83 EB  0D F7 DB CD 3D 0D CD 3F
00004880  6A CD 3E 79 BB 01 00 CD  3E 42 BB 39 00 CD 3E 42
00004890  33 DB CD 3E 44 BB 07 00  CD 3E 33 33 DB CD 3E 35
000048A0  BB AA 26 CD 3F B5 02 BB  B0 25 CD 3F 5A BB 98 25
000048B0  CD 3F BA BA 0D 00 2B D3  BB B0 25 CD 3F BA 3B D3
000048C0  7C 8F BB 01 00 CD 3E 42  BB 39 00 CD 3E 42 33 DB
000048D0  CD 3E 44 CD 3F BC BB B0  25 CD 3F 6A BB 0F 00 CD
000048E0  3D 0D CD 3F 6E CD 3E 79  BB 6C 27 B8 98 25 CD 3F
000048F0  55 93 8B D3 BB B0 25 CD  3F 55 CD 3F 61 BB 02 00
00004900  CD 3E 42 BB 01 00 CD 3E  42 33 DB CD 3E 44 CD 3F
00004910  BC BB 72 28 CD 3F 6A BB  28 00 CD 3D 0D CD 3F 6A
```

```
00004920  BB 0E 25 CD 3F 6A BB 92  26 CD 3F 6A CD 3E 79 BB
00004930  02 00 CD 3E 42 BB 0E 00  CD 3E 42 33 DB CD 3E 44
00004940  33 DB CD 3E 33 BB 07 00  CD 3E 35 CD 3F BC BB 1E
00004950  00 CD 3D 0D CD 3F 6A CD  3E 79 BB 07 00 CD 3E 33
00004960  33 DB CD 3E 35 BB 02 00  CD 3E 42 BB 0E 00 CD 3E
00004970  42 33 DB CD 3E 44 BB AA  26 CD 3F B5 02 BB 9E 25
00004980  CD 3F 5A BB 9E 25 CD 3F  BA 83 FB 1E 7E 03 E9 6C
00004990  FF BB 02 00 CD 3E 42 BB  0E 00 CD 3E 42 33 DB CD
000049A0  3E 44 CD 3F BC BB 9E 25  CD 3F 6A CD 3F BA 83 EB
000049B0  3C F7 DB CD 3D 0D CD 3F  6E CD 3E 79 BB 03 00 CD
000049C0  3E 42 BB 01 00 CD 3E 42  33 DB CD 3E 44 CD 3F BC
000049D0  BB 32 00 BA 20 00 CD 3D  0E CD 3F 6A CD 3E 79 BB
000049E0  03 00 CD 3E 42 BB 01 00  CD 3E 42 33 DB CD 3E 44
000049F0  BB FC 29 BA 68 25 CD 3F  61 E8 0A 10 BB 03 00 CD
00004A00  3E 42 BB 01 00 CD 3E 42  33 DB CD 3E 44 CD 3F BC
00004A10  BB 18 2A CD 3F 6A CD 3E  79 BB F2 26 B8 68 25 CD
00004A20  3F 62 75 03 E9 24 00 BB  AE 26 BA 92 25 CD 3F 61
00004A30  CD 3F BC BB 2E 2A CD 3F  6A BB 0F 00 BA 20 00 CD
00004A40  3D 0E CD 3F 6E CD 3E 79  E9 21 00 BB 08 29 BA 92
00004A50  25 CD 3F 61 CD 3F BC BB  0E 29 CD 3F 6A BB 0F 00
00004A60  BA 20 00 CD 3D 0E CD 3F  6E CD 3E 79 BB 04 00 CD
00004A70  3E 42 BB 1C 00 CD 3E 42  33 DB CD 3E 44 CD 3F BC
00004A80  BB 07 00 BA 20 00 CD 3D  0E CD 3F 6A CD 3E 79 BB
00004A90  AE 26 B8 92 25 CD 3F 62  74 03 E9 1C 00 CD 3F BC
00004AA0  BB 16 25 B8 96 29 CD 3F  55 93 BB A2 29 CD 3F 55
00004AB0  CD 3F 6A CD 3E 79 E9 19  00 CD 3F BC BB 1A 25 B8
00004AC0  A8 29 CD 3F 55 93 BB A2  29 CD 3F 55 CD 3F 6A CD
00004AD0  3E 79 BB 04 00 CD 3E 42  BB 1C 00 CD 3E 42 33 DB
00004AE0  CD 3E 44 BB AA 26 CD 3F  B5 00 CD 3F B7 01 01 BB
00004AF0  96 25 CD 3F B8 BB 04 00  CD 3E 42 BB 1C 00 CD 3E
00004B00  42 33 DB CD 3E 44 CD 3F  BC BB 1E 00 BA 20 00 CD
00004B10  3D 0E CD 3F 6A CD 3E 79  BB 04 00 CD 3E 42 BB 1C
00004B20  00 CD 3E 42 33 DB CD 3E  44 83 3E 96 25 01 BB 00
00004B30  00 7D 01 4B 8B D3 BB 08  29 B8 92 25 CD 3F 62 B9
00004B40  00 00 75 01 49 A1 14 25  3B 06 96 25 BB 00 00 7D
00004B50  01 4B 23 D9 0B DA A1 12  25 3B 06 96 25 BA 00 00
00004B60  7D 01 4A 0B D3 23 D2 74  03 E9 00 FF BB 4A 14 CD
00004B70  3F BD 8B 1E 96 25 CD 3F  69 CD 3E 79 BB 42 2B B8
00004B80  D4 25 CD 3F 62 75 03 E9  17 08 BB 03 00 CD 3E 42
00004B90  BB 46 00 CD 3E 42 33 DB  CD 3E 44 CD 3F BC BB 88
00004BA0  29 CD 3F 6A CD 3E 79 BB  03 00 CD 3E 42 BB 46 00
00004BB0  CD 3E 42 33 DB CD 3E 44  BB AA 26 CD 3F B5 00 CD
00004BC0  3F B7 01 02 BB A4 25 CD  3F B8 BE A4 25 CD 3F A7
00004BD0  72 B8 BB 03 00 CD 3E 42  BB 46 00 CD 3E 42 33 DB
00004BE0  CD 3E 44 CD 3F BC BB 88  29 CD 3F 6A CD 3E 79 BB
00004BF0  03 00 CD 3E 42 BB 46 00  CD 3E 42 33 DB CD 3E 44
00004C00  BB 4E 14 CD 3F BD BB A4  25 CD 3F 67 CD 3E 79 BB
00004C10  04 00 CD 3E 42 BB 46 00  CD 3E 42 33 DB CD 3E 44
00004C20  CD 3F BC BB 88 29 CD 3F  6A CD 3E 79 BB 04 00 CD
00004C30  3E 42 BB 46 00 CD 3E 42  33 DB CD 3E 44 BB AA 26
00004C40  CD 3F B5 00 CD 3F B7 01  02 BB A8 25 CD 3F B8 BE
00004C50  A8 25 CD 3F A7 72 B8 BB  04 00 CD 3E 42 BB 46 00
00004C60  CD 3E 42 33 DB CD 3E 44  CD 3F BC BB 88 29 CD 3F
00004C70  6A CD 3E 79 BB 04 00 CD  3E 42 BB 46 00 CD 3E 42
00004C80  33 DB CD 3E 44 BB 4E 14  CD 3F BD BB A8 25 CD 3F
00004C90  67 CD 3E 79 BB 06 00 CD  3E 42 BB 01 00 CD 3E 42
00004CA0  33 DB CD 3E 44 CD 3F BC  BB 3C 00 CD 3D 0D CD 3F
00004CB0  6A BB 0E 25 CD 3F 6A BB  92 26 CD 3F 6A CD 3E 79
00004CC0  BB 06 00 CD 3E 42 BB 01  00 CD 3E 42 33 DB CD 3E
00004CD0  44 33 DB CD 3E 33 BB 07  00 CD 3E 35 CD 3F BC BB
00004CE0  9E 26 CD 3F 6A CD 3E 79  BB 06 00 CD 3E 42 BB 01
00004CF0  00 CD 3E 42 33 DB CD 3E  44 BB 07 00 CD 3E 33 33
00004D00  DB CD 3E 35 BB 06 00 CD  3E 42 BB 01 00 CD 3E 42
00004D10  33 DB CD 3E 44 33 DB CD  3E 33 BB 07 00 CD 3E 35
00004D20  CD 3F BC BB 9E 26 CD 3F  6A CD 3E 79 BB 06 00 CD
00004D30  3E 42 BB 01 00 CD 3E 42  33 DB CD 3E 44 BB 07 00
00004D40  CD 3E 33 33 DB CD 3E 35  BB AA 26 CD 3F B5 02 BB
00004D50  58 25 CD 3F 5A BB 58 25  CD 3F BA 83 FB 08 7E 03
00004D60  E9 31 FF BB 01 00 BA 01  00 CD 3E 26 BB 24 25 CD
00004D70  3D 18 93 A3 5C 25 BB 01  00 8B 16 5C 25 CD 3E 26
00004D80  BB 24 25 CD 3D 18 93 A3  5E 25 BB AE 26 B8 28 25
00004D90  CD 3F 55 BA 60 25 CD 3F  61 BB 60 25 BA AE 26 8B
00004DA0  CB CD 3D 09 4B 87 D9 8B  D1 8B C3 CD 3D 0B 92 CD
00004DB0  3F 61 BB 58 25 B8 60 25  CD 3F 62 74 03 E9 0C 00
00004DC0  BB 2C 25 BA 64 25 CD 3F  61 E9 63 00 83 3E 5E 25
```

```
00004DD0  00 BB 00 00 75 01 4B 8B  D3 BB 58 25 B8 60 25 CD
00004DE0  3F 62 B9 00 00 76 01 49  0B CA 23 C9 74 03 E9 09
00004DF0  00 A1 5E 25 A3 5C 25 E9  7C FF CD 3E 2B BB 18 00
00004E00  CD 3E 42 BB 01 00 CD 3E  42 33 DB CD 3E 44 CD 3F
00004E10  BC BB AE 26 CD 3F 6A CD  3E 79 BB B4 26 B8 58 25
00004E20  CD 3F 55 BA 68 25 CD 3F  61 E8 DA 0B E9 65 FE BB
00004E30  06 00 CD 3E 42 BB 01 00  CD 3E 42 33 DB CD 3E 44
00004E40  CD 3F BC BB 28 25 CD 3F  6A BB D4 26 CD 3F 6A BB
00004E50  2C 25 CD 3F 6E CD 3E 79  8B 3E 50 25 D1 E7 8B 85
00004E60  5A 14 A3 6C 25 8B 1E 50  25 83 C3 06 CD 3E 42 BB
00004E70  39 00 CD 3E 42 33 DB CD  3E 44 CD 3F BC BB AE 26
00004E80  CD 3F 6A CD 3E 79 8B 1E  50 25 83 C3 06 CD 3E 42
00004E90  BB 39 00 CD 3E 42 33 DB  CD 3E 44 BB AA 26 CD 3F
00004EA0  B5 00 CD 3F B7 01 01 BB  6E 25 CD 3F B8 83 3E 6E
00004EB0  25 01 BB 00 00 7D 01 4B  83 3E 6E 25 08 BA 00 00
00004EC0  7E 01 4A 0B D3 23 D2 75  8F BB 06 00 CD 3E 42 BB
00004ED0  39 00 CD 3E 42 33 DB CD  3E 44 B8 01 00 E9 2F 00
00004EE0  8B 3E 48 25 D1 E7 8B 9D  50 14 3B 1E 5C 25 BA 00
00004EF0  00 75 01 4A 8B 9D 38 18  3B 1E 6E 25 B9 00 00 75
00004F00  01 49 23 CA 23 C9 74 03  E9 89 FD A1 48 25 40 A3
00004F10  48 25 81 3E 48 25 FA 00  7E C6 CD 3F BC BB DA 26
00004F20  CD 3F 6A CD 3E 79 BB 06  00 CD 3E 42 BB 39 00 CD
00004F30  3E 42 33 DB CD 3E 44 CD  3F BC 8B 1E 6E 25 CD 3F
00004F40  69 CD 3E 79 BB 06 00 CD  3E 42 BB 2C 00 CD 3E 42
00004F50  33 DB CD 3E 44 33 DB CD  3E 33 BB 07 00 CD 3E 35
00004F60  CD 3F BC BB 9E 26 CD 3F  6A CD 3E 79 BB 07 00 CD
00004F70  3E 33 33 DB CD 3E 35 BB  06 00 CD 3E 42 BB 2C 00
00004F80  CD 3E 42 33 DB CD 3E 44  BB AA 26 CD 3F B5 00 CD
00004F90  3F B7 01 01 BB 72 25 CD  3F B8 83 3E 72 25 00 7C
00004FA0  A3 BB 06 00 CD 3E 42 BB  2C 00 CD 3E 42 33 DB CD
00004FB0  3E 44 CD 3F BC BB 0A 00  CD 3D 0D CD 3F 6A CD 3E
00004FC0  79 BB 06 00 CD 3E 42 BB  2B 00 CD 3E 42 33 DB CD
00004FD0  3E 44 BB 46 14 CD 3F BD  8B 1E 72 25 CD 3F 6D CD
00004FE0  3E 79 BB 06 00 CD 3E 42  BB 3C 00 CD 3E 42 33 DB
00004FF0  CD 3E 44 BB 11 00 CD 3D  05 93 BB E8 26 CD 3F 55
00005000  BA 68 25 CD 3F 61 E8 FD  09 BB 06 00 CD 3E 42 BB
00005010  3C 00 CD 3E 42 33 DB CD  3E 44 CD 3F BC BB 13 00
00005020  CD 3D 0D CD 3F 6A CD 3E  79 BB F2 26 B8 68 25 CD
00005030  3F 62 75 03 E9 23 00 BB  06 00 CD 3E 42 BB 01 00
00005040  CD 3E 42 33 DB CD 3E 44  CD 3F BC BB 4F 00 CD 3D
00005050  0D CD 3F 6A CD 3E 79 E9  49 01 BB 06 00 CD 3E 42
00005060  BB 01 00 CD 3E 42 33 DB  CD 3E 44 CD 3F BC BB 4F
00005070  00 CD 3D 0D CD 3F 6E CD  3E 79 B8 F9 00 E9 53 00
00005080  8B 1E 48 25 D1 E3 D1 E3  8B D3 81 C3 82 1F 81 C2
00005090  7E 1F 87 D3 CD 3F 61 8B  3E 48 25 D1 E7 8B 9D 38
000050A0  18 89 9D 3A 18 B8 01 00  E9 1A 00 B8 FA 00 F7 2E
000050B0  4A 25 97 03 3E 48 25 D1  E7 8B 9D 5C 12 89 9D 5E
000050C0  12 A1 4A 25 40 A3 4A 25  83 3E 4A 25 02 7E DC A1
000050D0  48 25 48 A3 48 25 83 3E  48 25 01 7D A3 A1 5C 25
000050E0  A3 52 14 A1 72 25 A3 46  16 A1 6E 25 A3 3A 18 C7
000050F0  06 74 25 01 00 BB 58 25  BA 82 1F CD 3F 61 C7 06
00005100  52 25 00 00 BB 07 00 CD  3E 42 BB 01 00 CD 3E 42
00005110  33 DB CD 3E 44 B8 01 00  E9 7B 00 8B 3E 48 25 D1
00005120  E7 83 BD 50 14 00 75 03  E9 78 00 8B 3E 48 25 D1
00005130  E7 BB 01 00 8B 95 50 14  CD 3E 26 CD 3F BC BB 28
00005140  25 CD 3F 6A BB D4 26 CD  3F 6A BB 2C 25 CD 3F 6A
00005150  BB 2B 00 CD 3F 37 BB AA  26 CD 3F 6A BB 46 14 CD
00005160  3E 0A 8B 3E 48 25 D1 E7  8B 9D 44 16 CD 3F 69 CD
00005170  3E 79 CD 3F BC BB 9E 26  CD 3F 6A 8B 3E 48 25 D1
00005180  E7 8B 9D 38 18 CD 3F 6D  CD 3E 79 A1 52 25 40 A3
00005190  52 25 A1 48 25 40 A3 48  25 83 3E 48 25 0D 7F 03
000051A0  E9 78 FF BB 16 00 CD 3E  42 BB 01 00 CD 3E 42 33
000051B0  DB CD 3E 44 BB 48 2B BA  68 25 CD 3F 61 E8 46 08
000051C0  BB 16 00 CD 3E 42 BB 01  00 CD 3E 42 33 DB CD 3E
000051D0  44 CD 3F BC BB 4F 00 CD  3D 0D CD 3F 6E CD 3E 79
000051E0  BB F2 26 B8 68 25 CD 3F  62 75 03 E9 A6 FA BB FF
000051F0  FF CD 3E 32 CD 3F BC BB  B8 29 CD 3F 6E CD 3E 79
00005200  83 3E 74 25 00 BB 00 00  75 01 4B 83 3E 54 14 00
00005210  BA 00 00 75 01 4A 0B D3  23 D2 74 03 E9 82 01 C7
00005220  06 B4 25 00 00 B8 01 00  E9 38 00 8B 3E AC 25 D1
00005230  E7 83 BD 50 14 00 75 03  E9 33 00 A1 B4 25 40 A3
00005240  B4 25 8B 1E AC 25 D1 E3  D1 E3 81 C3 7E 1F 93 BB
00005250  88 29 CD 3F 55 BA 08 00  CD 3D 0B 92 CD 3F 61 A1
00005260  AC 25 40 A3 AC 25 81 3E  AC 25 FA 00 7E BD A1 B4
00005270  25 A3 B6 25 8B 1E B6 25  CD 3F 57 BF CA 29 CD 3F
```

| | | | | | | | | | | | | | | | | |
|---|---|---|---|---|---|---|---|---|---|---|---|---|---|---|---|---|
| 00005280 | 91 | BB | 1A | 00 | CD | 3D | 03 | CD | 3F | 77 | 93 | A3 | B6 | 25 | 83 | 3E |
| 00005290 | B6 | 25 | 00 | 75 | 03 | E9 | 09 | 01 | C7 | 06 | B8 | 25 | 01 | 00 | A1 | B4 |
| 000052A0 | 25 | 2B | 06 | B6 | 25 | A3 | BA | 25 | A1 | B8 | 25 | A3 | BC | 25 | A1 | B6 |
| 000052B0 | 25 | 03 | 06 | BC | 25 | A3 | BE | 25 | 8B | 1E | BC | 25 | 8B | D3 | D1 | E3 |
| 000052C0 | D1 | E3 | 81 | C3 | 7E | 1F | 8B | 0E | BE | 25 | 8B | C1 | D1 | E1 | D1 | E1 |
| 000052D0 | 81 | C1 | 7E | 1F | 87 | D9 | 91 | CD | 3F | 62 | 89 | 5E | FA | BB | 00 | 00 |
| 000052E0 | 76 | 01 | 4B | 89 | 5E | F8 | 8B | 5E | FA | CD | 3F | 62 | BB | 00 | 00 | 75 |
| 000052F0 | 01 | 4B | 8B | FA | D1 | E7 | 8B | 95 | 38 | 18 | 8B | F1 | D1 | E6 | 3B | 94 |
| 00005300 | 38 | 18 | B9 | 00 | 00 | 7E | 01 | 49 | 23 | CB | 0B | 4E | F8 | 23 | C9 | 74 |
| 00005310 | 03 | E9 | 03 | 00 | E9 | 74 | 00 | 8B | 36 | BE | 25 | D1 | E6 | D1 | E6 | 81 |
| 00005320 | C6 | 7E | 1F | 8B | 3E | BC | 25 | D1 | E7 | D1 | E7 | 81 | C7 | 7E | 1F | CD |
| 00005330 | 3F | 14 | 8B | 36 | BE | 25 | D1 | E6 | 81 | C6 | 50 | 14 | 8B | 3E | BC | 25 |
| 00005340 | D1 | E7 | 81 | C7 | 50 | 14 | CD | 3F | 13 | 8B | 36 | BE | 25 | D1 | E6 | 81 |
| 00005350 | C6 | 44 | 16 | 8B | 3E | BC | 25 | D1 | E7 | 81 | C7 | 44 | 16 | CD | 3F | 13 |
| 00005360 | 8B | 36 | BE | 25 | D1 | E6 | 81 | C6 | 38 | 18 | 8B | 3E | BC | 25 | D1 | E7 |
| 00005370 | 81 | C7 | 38 | 18 | CD | 3F | 13 | A1 | BC | 25 | 2B | 06 | B6 | 25 | A3 | BC |
| 00005380 | 25 | 83 | 3E | BC | 25 | 01 | 7C | 03 | E9 | 23 | FF | A1 | B8 | 25 | 40 | A3 |
| 00005390 | B8 | 25 | A1 | BA | 25 | 3B | 06 | B8 | 25 | 7D | 03 | E9 | D6 | FE | E9 | 07 |
| 000053A0 | FF | BB | 04 | 00 | CD | 3E | 21 | BB | 78 | 2B | CD | 3E | 1F | BB | 04 | 00 |
| 000053B0 | BA | 7E | 2B | B9 | 08 | 00 | CD | 3E | 1E | BB | 04 | 00 | CD | 3F | B3 | BB |
| 000053C0 | 4C | 25 | BA | 02 | 00 | CD | 3F | B4 | BB | D8 | 25 | CD | 3F | B4 | BB | 04 |
| 000053D0 | 00 | BA | 01 | 00 | CD | 3E | 26 | BB | D8 | 25 | CD | 3D | 18 | 43 | 93 | A3 |
| 000053E0 | 9C | 25 | 8B | 1E | 9C | 25 | CD | 3D | 1B | BA | D8 | 25 | CD | 3F | 5B | BB |
| 000053F0 | 04 | 00 | BA | 01 | 00 | CD | 3E | 28 | BB | 04 | 00 | CD | 3E | 21 | BB | 03 |
| 00005400 | 00 | CD | 3D | 31 | BF | 8A | 2B | CD | 3F | 92 | BF | D8 | 2A | CD | 3F | 82 |
| 00005410 | CD | 3F | 78 | 93 | A3 | DC | 25 | 33 | C0 | E9 | DD | 00 | C7 | 06 | 7C | 25 |
| 00005420 | 00 | 00 | BB | 92 | 25 | BA | 30 | 25 | CD | 3F | 5B | 8B | 1E | 96 | 25 | CD |
| 00005430 | 3D | 1B | BA | 34 | 25 | CD | 3F | 5B | BB | 98 | 25 | BA | 38 | 25 | CD | 3F |
| 00005440 | 5B | BB | 9E | 25 | BA | 3C | 25 | CD | 3F | 5B | 8B | 1E | 9C | 25 | CD | 3D |
| 00005450 | 1B | BA | 40 | 25 | CD | 3F | 5B | 83 | 3E | A2 | 25 | 00 | 74 | 03 | E9 | 0C |
| 00005460 | 00 | BB | A4 | 25 | CD | 3D | 1C | BA | 44 | 25 | CD | 3F | 5B | 83 | 3E | A2 |
| 00005470 | 25 | 01 | 74 | 03 | E9 | 0C | 00 | BB | A8 | 25 | CD | 3D | 1C | BA | 44 | 25 |
| 00005480 | CD | 3F | 5B | B8 | 01 | 00 | E9 | 54 | 00 | 8B | 1E | 48 | 25 | 8B | D3 | D1 |
| 00005490 | E3 | D1 | E3 | 81 | C3 | 66 | 23 | B8 | 32 | 00 | 8B | CA | F7 | 2E | A2 | 25 |
| 000054A0 | 03 | C1 | 97 | D1 | E7 | 8B | D3 | 8B | 9D | 50 | 14 | CD | 3D | 1B | CD | 3F |
| 000054B0 | 5B | 8B | 1E | 48 | 25 | 8B | D3 | D1 | E3 | D1 | E3 | 81 | C3 | 2E | 24 | B8 |
| 000054C0 | 32 | 00 | 8B | CA | F7 | 2E | A2 | 25 | 03 | C1 | 97 | D1 | E7 | 8B | D3 | 8B |
| 000054D0 | 9D | 44 | 16 | CD | 3D | 1B | CD | 3F | 5B | A1 | 48 | 25 | 40 | A3 | 48 | 25 |
| 000054E0 | 83 | 3E | 48 | 25 | 32 | 7E | A2 | A1 | A2 | 25 | 03 | 06 | DC | 25 | 92 | BB |
| 000054F0 | 03 | 00 | CD | 3E | 28 | A1 | A2 | 25 | 40 | A3 | A2 | 25 | 83 | 3E | A2 | 25 |
| 00005500 | 04 | 7F | 03 | E9 | 16 | FF | 33 | C0 | E9 | 79 | 00 | B8 | 01 | 00 | E9 | 54 |
| 00005510 | 00 | 8B | 1E | 48 | 25 | 8B | D3 | D1 | E3 | D1 | E3 | 81 | C3 | 66 | 23 | B8 |
| 00005520 | 64 | 00 | 8B | CA | F7 | 2E | A2 | 25 | 03 | C1 | 97 | D1 | E7 | 8B | D3 | 8B |
| 00005530 | 9D | 38 | 18 | CD | [illegible] | 1B | CD | 3F | 5B | 8B | 1E | 48 | 25 | 8B | D3 | D1 |
| 00005540 | E3 | D1 | E3 | 81 | C3 | 2E | 24 | B8 | 64 | 00 | 8B | CA | F7 | 2E | A2 | 25 |
| 00005550 | 03 | C1 | 97 | D1 | E7 | 8B | D3 | 8B | 9D | 9C | 18 | CD | 3D | 1B | CD | 3F |
| 00005560 | 5B | A1 | 48 | 25 | 40 | A3 | 48 | 25 | 83 | 3E | 48 | 25 | 32 | 7E | A2 | A1 |
| 00005570 | A2 | 25 | 03 | 06 | DC | 25 | 05 | 05 | 00 | 92 | BB | 03 | 00 | CD | 3E | 28 |
| 00005580 | A1 | A2 | 25 | 40 | A3 | A2 | 25 | 83 | 3E | A2 | 25 | 02 | 7F | 03 | E9 | 7A |
| 00005590 | FF | BB | 92 | 2B | BA | 68 | 25 | CD | 3F | 61 | E8 | 63 | 04 | BB | F2 | 26 |
| 000055A0 | B8 | 68 | 25 | CD | 3F | 62 | 75 | 03 | E9 | 7E | EA | E9 | 4E | AE | C7 | 06 |
| 000055B0 | 50 | 25 | 10 | 00 | BB | 16 | 00 | CD | 3E | 42 | BB | 01 | 00 | CD | 3E | 42 |
| 000055C0 | 33 | DB | CD | 3E | 44 | CD | 3F | BC | BB | 3C | 00 | CD | 3D | 0D | CD | 3F |
| 000055D0 | 6A | BB | 0E | 25 | CD | 3F | 6A | BB | 92 | 26 | CD | 3F | 6A | CD | 3E | 79 |
| 000055E0 | BB | 16 | 00 | CD | 3E | 42 | BB | 01 | 00 | CD | 3E | 42 | 33 | DB | CD | 3E |
| 000055F0 | 44 | 33 | DB | CD | 3E | 33 | BB | 07 | 00 | CD | 3E | 35 | CD | 3F | BC | BB |
| 00005600 | 9E | 26 | CD | 3F | 6A | CD | 3E | 79 | BB | 07 | 00 | CD | 3E | 33 | 33 | DB |
| 00005610 | CD | 3E | 35 | BB | 16 | 00 | CD | 3E | 42 | BB | 01 | 00 | CD | 3E | 42 | 33 |
| 00005620 | DB | CD | 3E | 44 | BB | AA | 26 | CD | 3F | B5 | 02 | BB | 58 | 25 | CD | 3F |
| 00005630 | 5A | BB | 58 | 25 | CD | 3F | BA | 83 | FB | 08 | 7E | 03 | E9 | 6F | FF | BB |
| 00005640 | 16 | 00 | CD | 3E | 42 | BB | 3C | 00 | CD | 3E | 42 | 33 | DB | CD | 3E | 44 |
| 00005650 | CD | 3F | BC | BB | 13 | 00 | BA | 20 | 00 | CD | 3D | 0E | CD | 3F | 6A | CD |
| 00005660 | 3E | 79 | BB | 58 | 25 | CD | 3D | 13 | CD | 3F | AA | 75 | 03 | E9 | 62 | 00 |
| 00005670 | BB | D4 | 26 | BA | 68 | 25 | CD | 3F | 61 | B8 | 01 | 00 | E9 | 48 | 00 | BB |
| 00005680 | 58 | 25 | CD | 3D | 13 | 8B | 1E | 48 | 25 | D1 | E3 | D1 | E3 | 81 | C3 | 7E |
| 00005690 | 1F | CD | 3F | 72 | 80 | CD | 3D | 13 | CD | 3F | A6 | 80 | 75 | 03 | E9 | 31 |
| 000056A0 | 00 | BB | 58 | 25 | CD | 3D | 13 | 8B | 1E | 48 | 25 | D1 | E3 | D1 | E3 | 81 |
| 000056B0 | C3 | 7E | 1F | CD | 3F | 72 | 80 | CD | 3D | 13 | CD | 3F | A6 | 80 | 73 | 03 |
| 000056C0 | E9 | 18 | 01 | A1 | 48 | 25 | 40 | A3 | 48 | 25 | 81 | 3E | 48 | 25 | FA | 00 |
| 000056D0 | 7E | AD | BB | 01 | 00 | BA | 01 | 00 | CD | 3E | 26 | BB | 24 | 25 | CD | 3D |
| 000056E0 | 18 | 93 | A3 | 5C | 25 | BB | 01 | 00 | 8B | 16 | 5C | 25 | CD | 3E | 26 | BB |
| 000056F0 | 24 | 25 | CD | 3D | 18 | 93 | A3 | 5E | 25 | BB | AE | 26 | B8 | 28 | 25 | CD |
| 00005700 | 3F | 55 | BA | 60 | 25 | CD | 3F | 61 | BB | 60 | 25 | BA | AE | 26 | 8B | CB |
| 00005710 | CD | 3D | 09 | 4B | 87 | D9 | 8B | D1 | 8B | C3 | CD | 3D | 0B | 92 | CD | 3F |
| 00005720 | 61 | BB | 58 | 25 | B8 | 60 | 25 | CD | 3F | 62 | 74 | 03 | E9 | 0C | 00 | BB |

| | | | | | | | | | | | | | | | | |
|---|---|---|---|---|---|---|---|---|---|---|---|---|---|---|---|---|
| 00005730 | 2C | 25 | BA | 64 | 25 | CD | 3F | 61 | E9 | 63 | 00 | 83 | 3E | 5E | 25 | 00 |
| 00005740 | BB | 00 | 00 | 75 | 01 | 4B | 8B | D3 | BB | 58 | 25 | B8 | 60 | 25 | CD | 3F |
| 00005750 | 62 | B9 | 00 | 00 | 76 | 01 | 49 | 0B | CA | 23 | C9 | 74 | 03 | E9 | 09 | 00 |
| 00005760 | A1 | 5E | 25 | A3 | 5C | 25 | E9 | 7C | FF | CD | 3E | 2B | BB | 18 | 00 | CD |
| 00005770 | 3E | 42 | BB | 01 | 00 | CD | 3E | 42 | 33 | DB | CD | 3E | 44 | CD | 3F | BC |
| 00005780 | BB | AE | 26 | CD | 3F | 6A | CD | 3E | 79 | BB | B4 | 26 | B8 | 58 | 25 | CD |
| 00005790 | 3F | 55 | BA | 68 | 25 | CD | 3F | 61 | E8 | 6B | 02 | E9 | 10 | FE | A1 | 5C |
| 000057A0 | 25 | A3 | DE | 25 | BB | D4 | 26 | BA | 68 | 25 | CD | 3F | 61 | B8 | 01 | 00 |
| 000057B0 | E9 | 17 | 00 | 8B | 3E | 48 | 25 | D1 | E7 | 8B | 9D | 50 | 14 | 3B | 1E | DE |
| 000057C0 | 25 | 75 | 03 | E9 | 1E | 00 | A1 | 48 | 25 | 40 | A3 | 48 | 25 | 81 | 3E | 48 |
| 000057D0 | 25 | FA | 00 | 7E | DE | C7 | 06 | 48 | 25 | 01 | 00 | BB | 42 | 2B | BA | 68 |
| 000057E0 | 25 | CD | 3F | 61 | BB | 16 | 00 | CD | 3E | 42 | BB | 01 | 00 | CD | 3E | 42 |
| 000057F0 | 33 | DB | CD | 3E | 44 | CD | 3F | BC | BB | 56 | 29 | CD | 3F | 6A | BB | 3D |
| 00005800 | 00 | BA | 20 | 00 | CD | 3D | 0E | CD | 3F | 6A | CD | 3E | 79 | A1 | 48 | 25 |
| 00005810 | 48 | B9 | 0D | 00 | 99 | F7 | F9 | 42 | 92 | A3 | 50 | 25 | 8B | 1E | 48 | 25 |
| 00005820 | 4B | CD | 3F | 57 | BF | C8 | 2B | CD | 3F | 89 | BB | 1A | 00 | CD | 3D | 03 |
| 00005830 | CD | 3F | 91 | CD | 3F | 77 | 93 | A3 | 56 | 25 | BB | 07 | 00 | CD | 3E | 42 |
| 00005840 | BB | 01 | 00 | CD | 3E | 42 | 33 | DB | CD | 3E | 44 | B8 | 01 | 00 | E9 | 13 |
| 00005850 | 00 | CD | 3F | BC | BB | 4F | 00 | CD | 3D | 0D | CD | 3F | 6E | CD | 3E | 79 |
| 00005860 | A1 | 48 | 25 | 40 | A3 | 48 | 25 | 83 | 3E | 48 | 25 | 0D | 7E | E3 | C7 | 06 |
| 00005870 | 52 | 25 | 00 | 00 | BB | 07 | 00 | CD | 3E | 42 | BB | 01 | 00 | CD | 3E | 42 |
| 00005880 | 33 | DB | CD | 3E | 44 | B8 | 01 | 00 | E9 | 8B | 00 | A1 | 48 | 25 | 03 | 06 |
| 00005890 | 56 | 25 | 97 | D1 | E7 | 83 | BD | 50 | 14 | 00 | 7F | 03 | E9 | 84 | 00 | A1 |
| 000058A0 | 48 | 25 | 03 | 06 | 56 | 25 | 97 | D1 | E7 | BB | 01 | 00 | 8B | 95 | 50 | 14 |
| 000058B0 | CD | 3E | 26 | CD | 3F | BC | BB | 28 | 25 | CD | 3F | 6A | BB | D4 | 26 | CD |
| 000058C0 | 3F | 6A | BB | 2C | 25 | CD | 3F | 6A | BB | 2B | 00 | CD | 3F | 37 | BB | AA |
| 000058D0 | 26 | CD | 3F | 6A | BB | 46 | 14 | CD | 3E | 0A | A1 | 48 | 25 | 03 | 06 | 56 |
| 000058E0 | 25 | 97 | D1 | E7 | 8B | 9D | 44 | 16 | CD | 3F | 69 | CD | 3E | 79 | CD | 3F |
| 000058F0 | BC | BB | 9E | 26 | CD | 3F | 6A | A1 | 56 | 25 | 03 | 06 | 48 | 25 | 97 | D1 |
| 00005900 | E7 | 8B | 9D | 38 | 18 | CD | 3F | 6D | CD | 3E | 79 | A1 | 52 | 25 | 40 | A3 |
| 00005910 | 52 | 25 | A1 | 48 | 25 | 40 | A3 | 48 | 25 | 83 | 3E | 48 | 25 | 0D | 7F | 03 |
| 00005920 | E9 | 68 | FF | BB | 05 | 00 | CD | 3E | 42 | BB | 44 | 00 | CD | 3E | 42 | 33 |
| 00005930 | DB | CD | 3E | 44 | CD | 3F | BC | BB | 50 | 27 | CD | 3F | 6A | CD | 3E | 79 |
| 00005940 | BB | 17 | 00 | CD | 3E | 33 | 33 | DB | CD | 3E | 35 | CD | 3F | BC | BB | 5F |
| 00005950 | 00 | CD | 3D | 05 | CD | 3F | 6A | CD | 3E | 79 | BB | 07 | 00 | CD | 3E | 33 |
| 00005960 | 33 | DB | CD | 3E | 35 | BB | 07 | 00 | CD | 3E | 42 | BB | 44 | 00 | CD | 3E |
| 00005970 | 42 | 33 | DB | CD | 3E | 44 | CD | 3F | BC | BB | 18 | 00 | CD | 3D | 05 | CD |
| 00005980 | 3F | 6A | BB | 02 | 27 | CD | 3F | 6A | CD | 3E | 79 | BB | 08 | 00 | CD | 3E |
| 00005990 | 42 | BB | 44 | 00 | CD | 3E | 42 | 33 | DB | CD | 3E | 44 | CD | 3F | BC | BB |
| 000059A0 | 19 | 00 | CD | 3D | 05 | CD | 3F | 6A | BB | 0C | 27 | CD | 3F | 6A | CD | 3E |
| 000059B0 | 79 | BB | 0C | 00 | CD | 3E | 42 | BB | 42 | 00 | CD | 3E | 42 | 33 | DB | CD |
| 000059C0 | 3E | 44 | CD | 3F | BC | BB | 11 | 00 | CD | 3D | 05 | CD | 3F | 6A | BB | C4 |
| 000059D0 | 00 | CD | 3D | 05 | CD | 3F | 6A | BB | D9 | 00 | CD | 3D | 05 | CD | 3F | 6A |
| 000059E0 | BB | 30 | 27 | CD | 3F | 6A | CD | 3E | 79 | C7 | 06 | 54 | 25 | 00 | 00 | BB |
| 000059F0 | D4 | 26 | B8 | 68 | 25 | CD | 3F | 62 | 75 | 03 | E9 | 5D | DF | E9 | 3F | E0 |
| 00005A00 | BB | FF | FF | CD | 3E | 32 | 33 | DB | CD | 3D | 21 | 93 | A3 | E0 | 25 | CD |
| 00005A10 | 3D | 25 | 93 | A3 | E2 | 25 | BB | CC | 2B | B8 | 68 | 25 | CD | 3F | 55 | BA |
| 00005A20 | E4 | 25 | CD | 3F | 61 | CD | 3F | BC | BB | E4 | 25 | CD | 3F | 6A | CD | 3E |
| 00005A30 | 79 | 33 | DB | CD | 3D | 21 | 93 | A3 | E8 | 25 | BB | AA | 26 | CD | 3F | B5 |
| 00005A40 | 03 | CD | 3F | B7 | 01 | 04 | BB | 68 | 25 | CD | 3F | B8 | BB | F2 | 26 | B8 |
| 00005A50 | 68 | 25 | CD | 3F | 62 | BA | 00 | 00 | 75 | 01 | 4A | BB | 06 | 2B | CD | 3F |
| 00005A60 | 62 | B9 | 00 | 00 | 75 | 01 | 49 | 0B | CA | 23 | C9 | 74 | 03 | E9 | 71 | 00 |
| 00005A70 | BB | DA | 2B | B8 | 68 | 25 | CD | 3F | 62 | 74 | 03 | E9 | 0A | 00 | 92 | BB |
| 00005A80 | F2 | 26 | CD | 3F | 61 | E9 | 59 | 00 | BB | E0 | 2B | B8 | 68 | 25 | CD | 3F |
| 00005A90 | 62 | 74 | 03 | E9 | 0A | 00 | 92 | BB | 06 | 2B | CD | 3F | 61 | E9 | 41 | 00 |
| 00005AA0 | 8B | 1E | E2 | 25 | CD | 3E | 42 | 8B | 1E | E8 | 25 | CD | 3E | 42 | 33 | DB |
| 00005AB0 | CD | 3E | 44 | CD | 3E | 2B | CD | 3F | BC | BB | 68 | 25 | CD | 3F | BA | BA |
| 00005AC0 | 20 | 00 | CD | 3D | 0E | CD | 3F | 6A | CD | 3E | 79 | 8B | 1E | E2 | 25 | CD |
| 00005AD0 | 3E | 42 | 8B | 1E | E8 | 25 | CD | 3E | 42 | 33 | DB | CD | 3E | 44 | E9 | 59 |
| 00005AE0 | FF | 8B | 1E | E2 | 25 | CD | 3E | 42 | 8B | 1E | E0 | 25 | CD | 3E | 42 | 33 |
| 00005AF0 | DB | CD | 3E | 44 | CD | 3F | BC | 8B | 1E | E8 | 25 | 2B | 1E | E0 | 25 | 43 |
| 00005B00 | BA | 20 | 00 | CD | 3D | 0E | CD | 3F | 6A | CD | 3E | 79 | 8B | 1E | E2 | 25 |
| 00005B10 | CD | 3E | 42 | 8B | 1E | E0 | 25 | CD | 3E | 42 | 33 | DB | CD | 3E | 44 | C3 |
| 00005B20 | CD | 3E | 02 | 00 | 00 | 00 | 00 | 00 | 00 | 00 | 00 | 00 | 00 | 00 | 00 | 00 |
| 00005B30 | CD | 3F | FF | CB | CD | 3F | FE | CB | CD | 3F | FD | CB | CD | 3F | FC | CB |
| 00005B40 | 51 | F3 | A5 | 59 | D1 | E1 | 8E | DA | 8B | 2E | C6 | 13 | 8B | C5 | 2B | C2 |
| 00005B50 | 3D | 00 | 10 | 72 | 03 | B8 | 00 | 10 | 8B | D1 | 81 | C2 | 00 | 03 | 72 | 0C |
| 00005B60 | B1 | 04 | D3 | E0 | 0B | C0 | 74 | 28 | 3B | C2 | 73 | 24 | BA | 4A | 00 | 0E |
| 00005B70 | 1F | B4 | 09 | CD | 21 | 53 | 33 | C0 | 50 | CB | 0D | 0A | 50 | 72 | 6F | 67 |
| 00005B80 | 72 | 61 | 6D | 20 | 74 | 6F | 6F | 20 | 6C | 61 | 72 | 67 | 65 | 0D | 0A | 24 |
| 00005B90 | 5E | 5F | 1E | 17 | 8B | E2 | 57 | 56 | 8B | CA | 92 | 83 | 06 | C4 | 13 | 07 |
| 00005BA0 | FF | 2E | C4 | 13 | B0 | 04 | BF | B0 | 05 | A2 | 1F | 00 | C7 | 06 | 35 | 00 |
| 00005BB0 | 89 | 00 | C7 | 06 | 37 | 00 | 93 | 05 | CB | CB | 5F | 5E | 5B | 56 | 57 | FF |
| 00005BC0 | 36 | 00 | 00 | FF | 37 | CB | 00 | 00 | 00 | 00 | 00 | 00 | 00 | 00 | 00 | 00 |
| 00005BD0 | 06 | 00 | 04 | 26 | 23 | 23 | 2C | 23 | 23 | 23 | 02 | 00 | 0E | 26 | 23 | 23 |

| | | | | | | | | | | | | | | | | |
|---|---|---|---|---|---|---|---|---|---|---|---|---|---|---|---|---|
| 00005BE0 | 09 | 00 | 14 | 26 | 23 | 23 | 2E | 23 | 23 | 23 | 20 | 48 | 72 | 00 | 01 | 00 |
| 00005BF0 | 22 | 26 | 38 | 00 | 01 | 00 | 28 | 26 | 32 | 00 | 01 | 00 | 2E | 26 | 34 | 00 |
| 00005C00 | 01 | 00 | 34 | 26 | 36 | 00 | 02 | 00 | 3A | 26 | 33 | 32 | 01 | 00 | 40 | 26 |
| 00005C10 | 35 | 00 | 01 | 00 | 46 | 26 | 49 | DE | 0D | 00 | 4C | 26 | 44 | 3A | 50 | 52 |
| 00005C20 | 4F | 47 | 52 | 41 | 4D | 2E | 44 | 41 | 54 | 00 | 01 | 00 | 5E | 26 | 52 | 10 |
| 00005C30 | 09 | 00 | 64 | 26 | 42 | 50 | 41 | 52 | 54 | 2E | 44 | 41 | 54 | A5 | 08 | 00 |
| 00005C40 | 72 | 26 | 4B | 49 | 54 | 41 | 2E | 44 | 41 | 54 | 04 | 00 | 7E | 26 | 4D | 41 |
| 00005C50 | 49 | 4E | 0C | 00 | 86 | 26 | 20 | 20 | 20 | 20 | 20 | 20 | 20 | 20 | 20 | 20 |
| 00005C60 | 20 | 20 | 08 | 00 | 96 | 26 | 20 | 3D | 20 | 45 | 6E | 74 | 65 | 72 | 08 | 00 |
| 00005C70 | A2 | 26 | 20 | 20 | 20 | 20 | 20 | 20 | 20 | 20 | 00 | 00 | AE | 26 | 02 | 00 |
| 00005C80 | B2 | 26 | 20 | 20 | 1B | 00 | B8 | 26 | 20 | 44 | 4F | 45 | 53 | 20 | 4E | 4F |
| 00005C90 | 54 | 20 | 45 | 58 | 49 | 53 | 54 | 21 | 20 | 2D | 20 | 43 | 4F | 4E | 54 | 49 |
| 00005CA0 | 4E | 55 | 45 | 00 | 01 | 00 | D8 | 26 | 20 | 00 | 0A | 00 | DE | 26 | 20 | 20 |
| 00005CB0 | 20 | 20 | 20 | 20 | 20 | 20 | 20 | 20 | 05 | 00 | EC | 26 | 56 | 41 | 4C | 49 |
| 00005CC0 | 44 | 00 | 01 | 00 | F6 | 26 | 59 | 00 | 05 | 00 | FC | 26 | 4D | 4F | 56 | 45 |
| 00005CD0 | 20 | 00 | 05 | 00 | 06 | 27 | 20 | 3D | 20 | 55 | 70 | 00 | 07 | 00 | 10 | 27 |
| 00005CE0 | 20 | 3D | 20 | 44 | 6F | 77 | 6E | 00 | 08 | 00 | 1C | 27 | 20 | 3D | 20 | 52 |
| 00005CF0 | 69 | 67 | 68 | 74 | 07 | 00 | 28 | 27 | 20 | 3D | 20 | 4C | 65 | 66 | 74 | 00 |
| 00005D00 | 09 | 00 | 34 | 27 | 20 | 3D | 20 | 53 | 65 | 6C | 65 | 63 | 74 | 00 | 0D | 00 |
| 00005D10 | 42 | 27 | 50 | 52 | 45 | 56 | 49 | 4F | 55 | 53 | 20 | 50 | 41 | 47 | 45 | 00 |
| 00005D20 | 05 | 00 | 54 | 27 | 4D | 6F | 76 | 65 | 20 | 00 | 06 | 00 | 5E | 27 | 20 | 20 |
| 00005D30 | 20 | 20 | 20 | 20 | 03 | 00 | 68 | 27 | 20 | 20 | 20 | 00 | 01 | 00 | 70 | 27 |
| 00005D40 | 5E | C2 | 03 | 00 | 76 | 27 | 20 | 5E | 20 | 00 | 06 | 00 | 7E | 27 | 4B | 69 |
| 00005D50 | 74 | 20 | 23 | 20 | 08 | 00 | 88 | 27 | 20 | 45 | 6E | 67 | 2E | 43 | 68 | 20 |
| 00005D60 | 03 | 00 | 94 | 27 | 20 | 2D | 20 | 00 | 0D | 00 | 9C | 27 | 20 | 4E | 4F | 20 |
| 00005D70 | 53 | 45 | 4C | 45 | 43 | 54 | 49 | 4F | 4E | 00 | 0C | 00 | AE | 27 | 4E | 4F |
| 00005D80 | 20 | 53 | 45 | 4C | 45 | 43 | 54 | 49 | 4F | 4E | 0C | 00 | BE | 27 | 20 | 45 |
| 00005D90 | 6E | 74 | 65 | 72 | 20 | 4B | 69 | 74 | 20 | 23 | 0B | 00 | CE | 27 | 45 | 6E |
| 00005DA0 | 74 | 65 | 72 | 20 | 4B | 69 | 74 | 20 | 23 | 00 | 0A | 00 | DE | 27 | 20 | 4E |
| 00005DB0 | 45 | 58 | 54 | 20 | 50 | 41 | 47 | 45 | 09 | 00 | EC | 27 | 4E | 45 | 58 | 54 |
| 00005DC0 | 20 | 50 | 41 | 47 | 45 | 00 | 0E | 00 | FA | 27 | 20 | 50 | 52 | 45 | 56 | 49 |
| 00005DD0 | 4F | 55 | 53 | 20 | 50 | 41 | 47 | 45 | 07 | 00 | 0C | 28 | 20 | 4B | 69 | 74 |
| 00005DE0 | 20 | 23 | 3D | 00 | 0F | 00 | 18 | 28 | 20 | 4C | 6F | 63 | 61 | 74 | 69 | 6F |
| 00005DF0 | 6E | 20 | 4B | 69 | 74 | 20 | 23 | F1 | 13 | 00 | 2C | 28 | 20 | 20 | 20 | 20 |
| 00005E00 | 20 | 20 | 20 | 20 | 20 | 20 | 20 | 20 | 20 | 20 | 20 | 20 | 20 | 20 | 20 | 00 |
| 00005E10 | 00 | 00 | 18 | 85 | 05 | 00 | 48 | 28 | 20 | 20 | 5E | 20 | 20 | 00 | 07 | 00 |
| 00005E20 | 52 | 28 | 4B | 69 | 74 | 20 | 23 | 20 | 20 | AA | 14 | 00 | 5E | 28 | 45 | 6E |
| 00005E30 | 67 | 69 | 6E | 65 | 65 | 72 | 69 | 6E | 67 | 20 | 43 | 68 | 61 | 6E | 67 | 65 |
| 00005E40 | 20 | 23 | 0C | 00 | 76 | 28 | 44 | 65 | 73 | 63 | 72 | 69 | 70 | 74 | 69 | 6F |
| 00005E50 | 6E | 3A | 11 | 00 | 86 | 28 | 53 | 75 | 70 | 65 | 72 | 63 | 65 | 6C | 6C | 20 |
| 00005E60 | 53 | 74 | 61 | 74 | 75 | 73 | 3A | 08 | 09 | 00 | 9C | 28 | 53 | 74 | 61 | 2E |
| 00005E70 | 20 | 48 | 72 | 2E | 3D | 00 | 1B | 00 | AA | 28 | 52 | 65 | 63 | 6F | 6D | 6D |
| 00005E80 | 65 | 6E | 64 | 65 | 64 | 20 | 43 | 65 | 6C | 6C | 2F | 53 | 75 | 70 | 65 | 72 |
| 00005E90 | 63 | 65 | 6C | 6C | 3D | 32 | 09 | 00 | CA | 28 | 43 | 75 | 72 | 2E | 20 | 48 |
| 00005EA0 | 72 | 2E | 3D | 00 | 14 | 00 | D8 | 28 | 50 | 61 | 72 | 74 | 20 | 23 | 20 | 20 |
| 00005EB0 | 20 | 44 | 65 | 73 | 63 | 72 | 69 | 70 | 74 | 69 | 6F | 6E | 18 | 00 | F0 | 28 |
| 00005EC0 | 51 | 75 | 61 | 6E | 74 | 69 | 74 | 79 | 20 | 4E | 65 | 65 | 64 | 65 | 64 | 20 |
| 00005ED0 | 20 | 53 | 74 | 61 | 74 | 69 | 6F | 6E | 02 | 00 | 0C | 29 | 2A | 2A | 17 | 00 |
| 00005EE0 | 12 | 29 | 54 | 48 | 49 | 53 | 20 | 49 | 53 | 20 | 41 | 20 | 53 | 55 | 50 | 45 |
| 00005EF0 | 52 | 43 | 45 | 4C | 4C | 20 | 4B | 49 | 54 | 00 | 1A | 00 | 2E | 29 | 54 | 48 |
| 00005F00 | 49 | 53 | 20 | 49 | 53 | 20 | 20 | 41 | 20 | 53 | 49 | 4E | 47 | 4C | 45 | 20 |
| 00005F10 | 43 | 45 | 4C | 4C | 20 | 4B | 49 | 54 | 0A | 00 | 4C | 29 | 41 | 44 | 44 | 20 |
| 00005F20 | 50 | 41 | 52 | 54 | 20 | 23 | 0B | 00 | 5A | 29 | 46 | 49 | 4E | 44 | 20 | 50 |
| 00005F30 | 41 | 52 | 54 | 20 | 23 | 00 | 0B | 00 | 6A | 29 | 45 | 58 | 49 | 54 | 20 | 20 |
| 00005F40 | 20 | 20 | 20 | 20 | 20 | 00 | 0D | 00 | 7A | 29 | 20 | 20 | 20 | 20 | 20 | 20 |
| 00005F50 | 20 | 20 | 20 | 20 | 20 | 20 | 20 | 00 | 09 | 00 | 8C | 29 | 20 | 20 | 20 | 20 |
| 00005F60 | 20 | 20 | 20 | 20 | 20 | 00 | 08 | 00 | 9A | 29 | 43 | 65 | 6C | 6C | 20 | 23 |
| 00005F70 | 31 | 2D | 01 | 00 | A6 | 29 | 3F | 00 | 0C | 00 | AC | 29 | 53 | 75 | 70 | 65 |
| 00005F80 | 72 | 63 | 65 | 6C | 6C | 20 | 31 | 2D | 0E | 00 | BC | 29 | 50 | 4C | 45 | 41 |
| 00005F90 | 53 | 45 | 20 | 53 | 54 | 41 | 4E | 44 | 42 | 59 | 00 | 00 | 00 | 80 | 29 | 00 |
| 00005FA0 | D2 | 29 | 41 | 72 | 65 | 20 | 74 | 68 | 65 | 72 | 65 | 20 | 61 | 6E | 79 | 20 |
| 00005FB0 | 6D | 6F | 72 | 65 | 20 | 4B | 69 | 74 | 73 | 20 | 74 | 6F | 20 | 65 | 78 | 61 |
| 00005FC0 | 6D | 69 | 6E | 65 | 2F | 63 | 68 | 61 | 6E | 67 | 65 | 00 | 17 | 00 | 00 | 2A |
| 00005FD0 | 49 | 73 | 20 | 74 | 68 | 69 | 73 | 20 | 61 | 20 | 53 | 75 | 70 | 65 | 72 | 63 |
| 00005FE0 | 65 | 6C | 6C | 20 | 4B | 69 | 74 | 00 | 12 | 00 | 1C | 2A | 53 | 75 | 70 | 65 |
| 00005FF0 | 72 | 63 | 65 | 6C | 6C | 20 | 53 | 74 | 61 | 74 | 75 | 73 | 3A | 20 | 1A | 00 |
| 00006000 | 32 | 2A | 54 | 48 | 49 | 53 | 20 | 49 | 53 | 20 | 41 | 4E | 20 | 53 | 49 | 4E |
| 00006010 | 47 | 4C | 45 | 20 | 43 | 45 | 4C | 4C | 20 | 4B | 49 | 54 | 16 | 00 | 50 | 2A |
| 00006020 | 53 | 45 | 43 | 55 | 52 | 49 | 54 | 59 | 20 | 43 | 4F | 44 | 45 | 20 | 23 | 20 |
| 00006030 | 50 | 4C | 45 | 41 | 53 | 45 | 04 | 00 | 6A | 2A | 4B | 45 | 4E | 20 | 04 | 00 |
| 00006040 | 72 | 2A | 4B | 45 | 4E | 49 | 2E | 00 | 7A | 2A | 49 | 4E | 56 | 41 | 4C | 49 |
| 00006050 | 44 | 20 | 41 | 55 | 54 | 48 | 4F | 52 | 49 | 5A | 41 | 54 | 49 | 4F | 4E | 2E |
| 00006060 | 20 | 48 | 49 | 54 | 20 | 41 | 4E | 59 | 20 | 4B | 45 | 59 | 20 | 54 | 4F | 20 |
| 00006070 | 43 | 4F | 4E | 54 | 49 | 4E | 55 | 45 | 0C | 00 | AC | 2A | 41 | 52 | 45 | 20 |
| 00006080 | 59 | 4F | 55 | 20 | 53 | 55 | 52 | 45 | 0E | 00 | BC | 2A | 50 | 6C | 65 | 61 |

```
00006090  73 65 20 53 74 61 6E 64  62 79 09 00 CE 2A 57 4F
000060A0  52 4B 4B 2E 44 41 54 00  00 00 00 00 00 00 00 81
000060B0  21 00 E4 2A 41 52 45 20  54 48 45 52 45 20 41 4E
000060C0  59 20 4D 4F 52 45 20 4B  49 54 53 20 54 4F 20 52
000060D0  45 4D 4F 56 45 00 01 00  0A 2B 4E 00 04 00 10 2B
000060E0  20 20 20 20 2A 00 18 2B  44 6F 20 79 6F 75 20 77
000060F0  69 73 68 20 74 6F 20 75  73 65 20 61 6E 6F 74 68
00006100  65 72 20 6B 69 74 20 61  73 20 61 20 6D 61 73 74
00006110  65 72 01 00 46 2B 2A 00  2C 00 4C 2B 41 72 65 20
00006120  74 68 65 72 65 20 61 6E  79 20 6D 6F 72 65 20 70
00006130  61 72 74 73 20 74 6F 20  61 64 64 20 66 6F 72 20
00006140  74 68 69 73 20 6B 69 74  01 00 7C 2B 72 EB 07 00
00006150  82 2B 72 65 66 2E 64 61  74 00 00 00 00 00 00 00
00006160  00 79 31 00 96 2B 4B 69  74 20 73 75 63 63 65 73
00006170  73 66 75 6C 6C 79 20 61  64 64 65 64 2E 20 41 72
00006180  65 20 74 68 65 72 65 20  61 6E 79 20 6D 6F 72 65
00006190  20 74 6F 20 61 64 64 00  00 00 50 84 09 00 D0 2B
000061A0  2D 20 59 20 6F 72 20 4E  20 00 01 00 DE 2B 79 00
000061B0  01 00 E4 2B 6E 00 00 00  00 00 00 00 00 00 00 00
000061C0  FF FF 01 00 00 00 00 00  00 00 00 00 00 00 00 00
000061D0  59 1F A0 01 00 1E 51 06  3C 6D 74 03 E9 40 02 B4
000061E0  30 CD 21 3C 02 73 03 E9  3A 02 BA 33 06 8E DA 26
000061F0  8B 3E 02 00 26 8B 2E 2C  00 8E C2 57 B0 00 BA 45
00006200  03 1E 0E 1F B4 3D CD 21  1F 72 03 E9 D8 00 8E C5
00006210  33 FF B9 05 00 BE 52 03  1E 0E 1F F3 A6 1F 74 13
00006220  26 8A 05 47 0A C0 75 F8  26 80 3D 00 75 E4 1E 07
00006230  EB 57 90 1E 07 1E 8E DD  8B F7 81 3C 00 20 1F 74
00006240  48 BF CA 13 8B D7 1E 8E  DD AC 3C 3B 74 07 3C 00
00006250  74 03 AA EB F4 1F 8B D8  81 FF CA 13 74 0F 80 7D
00006260  FF 3A 74 09 80 7D FF 5C  74 03 B0 5C AA 56 BE 45
00006270  03 B9 0D 00 90 1E 0E 1F  F3 A4 1F 5E B0 00 B4 3D
00006280  CD 21 73 62 80 FB 3B 74  B8 1E 0E 1F BA 07 03 B4
00006290  09 CD 21 1F C6 06 CA 13  40 BA CA 13 B4 0A CD 21
000062A0  1E 0E 1F BA 04 03 B4 09  CD 21 1F B7 00 8A 1E CB
000062B0  13 80 BF CB 13 3A 74 0D  80 BF CB 13 5C 74 06 C6
000062C0  87 CC 13 5C 43 BA CC 13  8D BF CC 13 BE 45 03 B9
```

APPENDIX B

```
000024F0  FF 3A 74 09 80 7D FF 5C  74 03 B0 5C AA 56 BE 45
00002500  03 B9 0D 00 90 1E 0E 1F  F3 A4 1F 5E B0 00 B4 3D
00002510  CD 21 73 62 80 FB 3B 74  B8 1E 0E 1F BA 07 03 B4
00002520  09 CD 21 1F C6 06 CA 13  40 BA CA 13 B4 0A CD 21
00002530  1E 0E 1F BA 04 03 B4 09  CD 21 1F B7 00 8A 1E CB
00002540  13 80 BF CB 13 3A 74 0D  80 BF CB 13 5C 74 06 C6
00002550  87 CC 13 5C 43 BA CC 13  8D BF CC 13 BE 45 03 B9
00002560  0D 00 90 1E 0E 1F F3 A4  1F B0 00 B4 3D CD 21 73
00002570  05 EB A6 E9 2F 01 5F 8B  D8 BA B0 13 B9 1A 00 B4
00002580  3F CD 21 72 EE 81 3E B0  13 4D 5A 75 E6 8B 16 B8
00002590  13 83 C2 1F 81 E2 E0 FF  8B EA B1 04 D3 E2 33 C9
000025A0  B0 00 B4 42 CD 21 72 CB  8B 16 B4 13 4A B1 05 D3
000025B0  E2 2B D5 A1 B2 13 05 0F  00 B1 04 D3 E8 03 D0 89
000025C0  16 B4 13 2B FA 83 EF 14  8C D6 8B D4 83 C2 11 B1
000025D0  04 D3 EA 03 F2 3B FE 73  03 E9 CE 00 8B EF 1E 8E
000025E0  DF B9 FF FF 33 D2 B4 3F  CD 21 1F 72 86 8B 16 C8
000025F0  13 41 B0 00 B4 42 CD 21  72 12 3B 0E B6 13 74 23
00002600  BA B0 13 B9 04 00 B4 3F  CD 21 73 03 E9 96 00 8B
00002610  3E B0 13 A1 B2 13 03 C5  8E C0 26 01 2D FF 0E B6
00002620  13 75 E3 B4 3E CD 21 73  03 EB 7A 90 01 2E C6 13
00002630  A1 C6 13 8B 1E C4 13 8E  C0 26 80 7F 03 05 75 5F
00002640  26 80 7F 04 06 75 58 26  80 7F 05 00 72 51 5B 1E
00002650  07 8E DD B9 D8 09 33 F6  8B FE FC F3 A5 06 1F 1E
00002660  B8 8F 01 8E D8 B9 26 02  2B C8 D1 E1 D1 E1 D1 E1
00002670  B8 4A 0C 8E C0 33 F6 33  FF F3 A5 1F 8C D1 8C D8
00002680  2B C8 81 F9 00 10 76 03  B9 00 10 D1 E1 D1 E1 D1
00002690  E1 BA 8F 01 8E C2 33 F6  8B FE EA 10 00 85 01 5B
000026A0  BA BC 02 EB 12 BA E0 02  EB 0D BA A6 02 EB 08 BA
000026B0  86 02 EB 03 BA 61 02 0E  1F B4 09 CD 21 33 C0 50
000026C0  CB 0D 0A 4D 75 73 74 20  72 75 6E 20 75 6E 64 65
000026D0  72 20 44 4F 53 20 32 2E  30 30 20 6F 72 20 6C 61
000026E0  74 65 72 0D 0A 24 0D 0A  4D 75 73 74 20 6C 69 6E
000026F0  6B 20 77 69 74 68 20 42  41 53 43 4F 4D 32 30 2E
```

```
00002700  4C 49 42 0D 0A 24 0D 0A  50 72 6F 67 72 61 6D 20
00002710  74 6F 6F 20 6C 61 72 67  65 0D 0A 24 0D 0A 57 72
00002720  6F 6E 67 20 76 65 72 73  69 6F 6E 20 6F 66 20 72
00002730  75 6E 74 69 6D 65 20 6D  6F 64 75 6C 65 0D 0A 24
00002740  0D 0A 45 72 72 6F 72 20  69 6E 20 45 58 45 20 66
00002750  69 6C 65 0D 0A 24 0D 0A  43 61 6E 6E 6F 74 20 66
00002760  69 6E 64 20 0D 0A 24 0D  0A 43 61 6E 6E 6F 74 20
00002770  66 69 6E 64 20 42 41 53  52 55 4E 32 30 2E 45 58
00002780  45 0D 0A 45 6E 74 65 72  20 6E 65 77 20 70 61 74
00002790  68 20 73 70 65 63 69 66  69 63 61 74 69 6F 6E 3A
000027A0  20 24 0D 0A 24 42 41 53  52 55 4E 32 30 2E 45 58
000027B0  45 00 50 41 54 48 3D
000020D0  31 30 2C 34 2C 33 2C 31  30 2C 2D 31 2C 2D 31 2C
000020E0  2D 31 00 24 18 20 2D 31  2C 2D 31 2C 2D 31 00 25
000020F0  18 20 2D 31 2C 2D 31 2C  2D 31 00 26 18 20 2D 31
00002100  2C 2D 31 2C 2D 31 00 27  18 20 31 2C 35 2C 31 30
00002110  2C 32 2C 35 2C 38 2C 33  2C 35 2C 36 2C 34 2C 35
00002120  2C 34 2C 35 2C 35 2C 32  2C 36 2C 35 2C 32 30 2C
00002130  37 2C 35 2C 31 38 2C 38  2C 35 2C 31 36 2C 39 2C
00002140  35 2C 31 34 2C 31 30 2C  35 2C 31 32 2C 2D 31 2C
00002150  2D 31 2C 2D 31 00 28 18  20 31 2C 35 2C 39 2C 32
00002160  2C 35 2C 37 2C 33 2C 35  2C 35 2C 34 2C 35 2C 33
00002170  2C 35 2C 35 2C 31 2C 36  2C 35 2C 31 39 2C 37 2C
00002180  35 2C 31 37 2C 38 2C 35  2C 31 35 2C 39 2C 35 2C
00002190  31 33 2C 31 30 2C 35 2C  31 31 2C 2D 31 2C 2D 31
000021A0  2C 2D 31 00 29 18 20 31  2C 31 2C 31 35 2C 32 2C
000021B0  31 2C 31 34 2C 33 2C 32  2C 31 35 2C 34 2C 32 2C
000021C0  31 34 2C 35 2C 33 2C 31  35 2C 36 2C 33 2C 31 34
000021D0  2C 2D 31 2C 2D 31 2C 2D  31 00 2A 18 20 31 2C 31
000021E0  2C 31 33 2C 32 2C 31 2C  31 32 2C 33 2C 32 2C 31
000021F0  33 2C 34 2C 32 2C 31 32  2C 35 2C 33 2C 31 33 2C
00002200  36 2C 33 2C 31 32 2C 2D  31 2C 2D 31 2C 2D 31 00
00002210  2B 18 20 31 2C 31 2C 31  31 2C 32 2C 32 2C 31 31
00002220  2C 33 2C 33 2C 31 31 2C  2D 31 2C 2D 31 2C 2D 31
00002230  00 2C 18 20 2D 31 2C 2D  31 2C 2D 31 00 2D 18 20
00002240  2D 31 2C 2D 31 2C 2D 31  00 2E 18 20 31 2C 35 2C
00002250  39 2C 32 2C 35 2C 37 2C  33 2C 35 2C 35 2C 34 2C
00002260  35 2C 33 2C 35 2C 35 2C  31 2C 36 2C 35 2C 31 39
00002270  2C 37 2C 35 2C 31 37 2C  38 2C 35 2C 31 35 2C 39
00002280  2C 35 2C 31 33 2C 31 30  2C 35 2C 31 31 2C 2D 31
00002290  2C 2D 31 2C 2D 31 00 2F  18 20 31 2C 35 2C 31 30
000022A0  2C 32 2C 35 2C 38 2C 33  2C 35 2C 36 2C 34 2C 35
000022B0  2C 34 2C 35 2C 35 2C 32  2C 36 2C 35 2C 32 30 2C
000022C0  37 2C 35 2C 31 38 2C 38  2C 35 2C 31 36 2C 39 2C
000022D0  35 2C 31 34 2C 31 30 2C  35 2C 31 32 2C 2D 31 2C
000022E0  2D 31 2C 2D 31 00 30 18  20 32 2C 31 2C 36 2C 34
000022F0  2C 32 2C 36 2C 36 2C 33  2C 36 2C 2D 31 2C 2D 31
00002300  2C 2D 31 00 31 18 20 31  2C 31 2C 38 2C 33 2C 33
00002310  2C 38 2C 2D 31 2C 2D 31  2C 2D 31 00 32 18 20 31
00002320  2C 31 2C 31 30 2C 32 2C  31 2C 39 2C 35 2C 33 2C
00002330  31 30 2C 36 2C 33 2C 39  2C 2D 31 2C 2D 31 2C 2D
00002340  31 00 33 18 20 2D 31 2C  2D 31 2C 2D 31 00 34 18
00002350  20 2D 31 2C 2D 31 2C 2D  31 00 35 18 20 31 2C 33
00002360  2C 39 2C 32 2C 33 2C 31  30 2C 33 2C 33 2C 31 31
00002370  2C 34 2C 33 2C 31 32 2C  35 2C 33 2C 31 33 2C 2D
00002380  31 2C 2D 31 2C 2D 31 00  36 18 20 31 2C 33 2C 31
00002390  2C 32 2C 33 2C 32 2C 33  2C 33 2C 33 2C 2D 31 2C
000023A0  2D 31 2C 2D 31 00 37 18  20 31 2C 31 2C 31 2C 32
000023B0  2C 32 2C 31 2C 2D 31 2C  2D 31 2C 2D 31 00 38 18
000023C0  20 31 2C 32 2C 32 2C 2D  31 2C 2D 31 2C 2D 31 00
000023D0  39 18 20 2D 31 2C 2D 31  2C 2D 31 00 3A 18 20 31
000023E0  2C 32 2C 38 2C 32 2C 32  2C 39 2C 33 2C 32 2C 31
000023F0  30 2C 34 2C 32 2C 31 31  2C 35 2C 32 2C 31 32 2C
00002400  2D 31 2C 2D 31 2C 2D 31  00 3B 18 20 31 2C 32 2C
00002410  32 2C 2D 31 2C 2D 31 2C  2D 31 00 3C 18 20 31 2C
00002420  32 2C 31 2C 2D 31 2C 2D  31 2C 2D 31 00 3D 18 20
00002430  31 2C 33 2C 31 2C 32 2C  33 2C 32 2C 2D 31 2C 2D
00002440  31 2C 2D 31 00 3E 18 20  2D 31 2C 2D 31 2C 2D 31
00002450  00 FF FF 01 00 00 00 00  00 00 00 00 00 00 00 00
00002460  59 1F A0 01 00 1E 51 06  3C 6D 74 03 E9 40 02 B4
00002470  30 CD 21 3C 02 73 03 E9  3A 02 BA 5C 02 8E DA 26
00002480  8B 3E 02 00 26 8B 2E 2C  00 8E C2 57 B0 00 BA 45
00002490  03 1E 0E 1F B4 3D CD 21  1F 72 03 E9 D8 00 8E C5
000024A0  33 FF B9 05 00 BE 52 03  1E 0E 1F F3 A6 1F 74 13
000024B0  26 8A 05 47 0A C0 75 F8  26 80 3D 00 75 E4 1E 07
```

```
000024C0  EB 57 90 1E 07 1E 8E DD  8B F7 81 3C 00 20 1F 74
000024D0  48 BF CA 13 8B D7 1E 8E  DD AC 3C 3B 74 07 3C 00
000024E0  74 03 AA EB F4 1F 8B D8  81 FF CA 13 74 0F 80 7D
00001CB0  65 6E 64 65 64 3D 01 00  AA A0 29 00 09 00 B0 A0
00001CC0  53 75 70 65 72 63 65 6C  6C 00 17 00 BE A0 45 4E
00001CD0  54 45 52 20 53 55 50 45  52 43 45 4C 4C 20 23 20
00001CE0  31 20 54 4F 20 00 00 00  DA A0 07 00 DE A0 4B 69
00001CF0  74 20 23 20 20 3B 14 00  EA A0 45 6E 67 69 6E 65
00001D00  65 72 69 6E 67 20 43 68  61 6E 67 65 20 23 02 00
00001D10  02 A1 20 23 23 00 08 A1  23 20 6F 66 20 4B 69 74
00001D20  73 20 74 6F 20 41 64 64  20 28 30 3D 65 6E 64 20
00001D30  73 65 6C 65 63 74 69 6F  6E 29 3D 00 1E 00 30 A1
00001D40  50 6C 65 61 73 65 20 53  74 61 6E 64 62 79 20 2D
00001D50  20 46 69 6E 64 69 6E 67  20 50 61 72 74 73 01 00
00001D60  52 A1 2A 00 07 00 58 A1  50 61 72 74 20 23 20 3B
00001D70  01 00 64 A1 2D 4A 08 00  6A A1 20 61 74 20 57 43
00001D80  20 23 0A 00 76 A1 20 53  74 6F 63 6B 20 4C 2E 20
00001D90  10 00 84 A1 43 6F 6E 74  69 6E 75 65 20 44 69 73
00001DA0  70 6C 61 79 01 00 98 A1  4E 00 11 00 9E A1 50 61
00001DB0  72 74 73 20 4E 6F 74 20  49 6E 20 43 65 6C 6C 00
00001DC0  1E 00 B4 A1 44 6F 20 79  6F 75 20 77 69 73 68 20
00001DD0  61 20 70 72 69 6E 74 6F  75 74 20 6F 66 20 74 68
00001DE0  69 73 24 00 D6 A1 49 73  20 74 68 65 20 70 72 69
00001DF0  6E 74 65 72 20 72 65 61  64 79 20 74 6F 20 70 72
00001E00  69 6E 74 20 72 65 70 6F  72 74 15 00 FE A1 20 20
00001E10  45 6E 67 69 6E 65 65 72  69 6E 67 20 43 68 61 6E
00001E20  67 65 20 00 21 00 18 A2  44 6F 20 79 6F 75 20 77
00001E30  69 73 68 20 74 6F 20 73  65 6C 65 63 74 20 61 6E
00001E40  6F 74 68 65 72 20 6B 69  74 00 01 00 3E A2 59 00
00001E50  10 00 44 A2 43 4F 4E 54  49 4E 55 45 20 44 49 53
00001E60  50 4C 41 59 4A 00 58 A2  50 61 72 74 20 23 20 20
00001E70  20 20 20 4E 61 6D 65 20  20 20 20 20 20 20 20 20
00001E80  20 20 20 20 20 20 20 20  20 20 20 20 20 20 20 20
00001E90  20 20 20 20 51 75 61 6E  20 20 20 20 43 65 6C 6C
00001EA0  20 20 20 52 6F 77 20 20  43 6F 6C 2E 20 53 74 6F
00001EB0  63 6B 26 00 A6 A2 41 4C  4C 20 50 41 52 54 53 20
00001EC0  41 52 45 20 49 4E 20 49  4E 56 45 4E 54 4F 52 59
00001ED0  21 20 2D 20 43 6F 6E 74  69 6E 75 65 16 00 D0 A2
00001EE0  44 6F 20 79 6F 75 20 77  69 73 68 20 61 20 70 72
00001EF0  69 6E 74 6F 75 74 14 00  EA A2 49 73 20 74 68 65
00001F00  20 70 72 69 6E 74 65 72  20 72 65 61 64 79 06 00
00001F10  02 A3 44 61 74 65 3A 20  06 00 0C A3 50 61 67 65
00001F20  20 23 09 00 16 A3 2D 20  59 20 6F 72 20 4E 20 00
00001F30  01 00 24 A3 79 00 01 00  2A A3 6E 00 00 00 00 00
00001F40  C7 0D 20 31 2C 38 2C 39  2C 31 35 2C 31 36 2C 32
00001F50  32 2C 32 33 2C 32 37 2C  32 38 2C 33 32 00 1C 18
00001F60  20 31 2C 31 30 2C 34 2C  31 2C 39 2C 34 2C 31 2C
00001F70  36 2C 34 2C 31 2C 36 2C  34 2C 31 2C 34 2C 34 2C
00001F80  31 2C 33 2C 33 2C 31 2C  33 2C 33 2C 31 2C 31 35
00001F90  2C 35 2C 31 2C 31 32 2C  34 2C 31 2C 31 32 2C 34
00001FA0  2C 31 2C 36 2C 34 00 1D  18 20 31 2C 31 32 2C 34
00001FB0  2C 31 2C 36 2C 34 2C 31  2C 36 2C 33 2C 31 2C 32
00001FC0  30 2C 35 2C 31 2C 31 32  2C 34 2C 31 2C 31 32 2C
00001FD0  34 2C 31 2C 36 2C 34 2C  31 2C 36 2C 34 2C 31 2C
00001FE0  36 2C 34 2C 31 2C 36 2C  33 2C 31 2C 32 30 2C 35
00001FF0  00 1E 18 20 31 2C 37 2C  34 2C 31 2C 34 2C 34 2C
00002000  31 2C 33 2C 34 2C 31 2C  33 2C 34 2C 31 2C 32 30
00002010  2C 34 2C 31 2C 37 2C 34  2C 31 2C 32 2C 34 2C 31
00002020  2C 32 2C 34 2C 31 2C 37  2C 34 2C 31 2C 32 30 2C
00002030  34 00 1F 18 20 31 2C 35  2C 39 2C 32 2C 35 2C 37
00002040  2C 33 2C 35 2C 35 2C 34  2C 35 2C 33 2C 35 2C 35
00002050  2C 31 2C 2D 31 2C 2D 31  2C 2D 31 00 20 18 20 31
00002060  2C 35 2C 31 30 2C 32 2C  35 2C 38 2C 33 2C 35 2C
00002070  36 2C 34 2C 35 2C 34 2C  35 2C 35 2C 32 2C 2D 31
00002080  2C 2D 31 2C 2D 31 00 21  18 20 31 2C 31 2C 37 2C
00002090  32 2C 31 2C 36 2C 35 2C  33 2C 37 2C 36 2C 33 2C
000020A0  36 2C 2D 31 2C 2D 31 2C  2D 31 00 22 18 20 31 2C
000020B0  31 2C 39 2C 32 2C 31 2C  38 2C 34 2C 33 2C 39 2C
000020C0  2D 31 2C 2D 31 2C 2D 31  00 23 18 20 31 2C 31 2C
00001890  5E 9E CD 3F 69 CD 3E 79  CD 3F C0 BB 88 9F CD 3F
000018A0  6A BB 26 9E CD 3F 6E CD  3E 79 A1 BC 9E 40 A3 BC
000018B0  9E A1 5E 9E 40 A3 5E 9E  A1 CA 9E 3B 06 5E 9E 7C
000018C0  03 E9 91 FE A1 5A 9E 40  A3 5A 9E A1 C8 9E 3B 06
000018D0  5A 9E 7C 03 E9 72 FE A1  58 9E 40 A3 58 9E A1 C6
000018E0  9E 3B 06 58 9E 7C 03 E9  41 FE CD 3F C0 BB 0C 00
```

| | | | | | | | | | | | | | | | | |
|---|---|---|---|---|---|---|---|---|---|---|---|---|---|---|---|---|
| 000018F0 | CD | 3D | 05 | CD | 3F | 6E | CD | 3E | 79 | E9 | AB | EC | BB | FF | FF | CD |
| 00001900 | 3E | 32 | BB | 12 | A3 | B8 | 70 | 9E | CD | 3F | 55 | BA | 96 | 9E | CD | 3F |
| 00001910 | 61 | 33 | DB | CD | 3D | 21 | 93 | A3 | CC | 9E | CD | 3F | BC | BB | 96 | 9E |
| 00001920 | CD | 3F | 6A | CD | 3E | 79 | CD | 3D | 25 | 93 | A3 | CE | 9E | 33 | DB | CD |
| 00001930 | 3D | 21 | 93 | A3 | D0 | 9E | BB | D6 | A0 | CD | 3F | B5 | 03 | CD | 3F | B7 |
| 00001940 | 01 | 04 | BB | 70 | 9E | CD | 3F | B8 | BB | 3A | A2 | B8 | 70 | 9E | CD | 3F |
| 00001950 | 62 | BA | 00 | 00 | 75 | 01 | 4A | BB | 94 | A1 | CD | 3F | 62 | B9 | 00 | 00 |
| 00001960 | 75 | 01 | 49 | 0B | CA | 23 | C9 | 74 | 03 | E9 | 71 | 00 | BB | 20 | A3 | B8 |
| 00001970 | 70 | 9E | CD | 3F | 62 | 74 | 03 | E9 | 0A | 00 | 92 | BB | 3A | A2 | CD | 3F |
| 00001980 | 61 | E9 | 59 | 00 | BB | 26 | A3 | B8 | 70 | 9E | CD | 3F | 62 | 74 | 03 | E9 |
| 00001990 | 0A | 00 | 92 | BB | 94 | A1 | CD | 3F | 61 | E9 | 41 | 00 | 8B | 1E | CE | 9E |
| 000019A0 | CD | 3E | 42 | 8B | 1E | D0 | 9E | CD | 3E | 42 | 33 | DB | CD | 3E | 44 | CD |
| 000019B0 | 3F | BC | BB | 70 | 9E | CD | 3F | BA | BA | 20 | 00 | CD | 3D | 0E | CD | 3F |
| 000019C0 | 6A | CD | 3E | 79 | CD | 3E | 2B | 8B | 1E | CE | 9E | CD | 3E | 42 | 8B | 1E |
| 000019D0 | D0 | 9E | CD | 3E | 42 | 33 | DB | CD | 3E | 44 | E9 | 59 | FF | 8B | 1E | CE |
| 000019E0 | 9E | CD | 3E | 42 | 8B | 1E | CC | 9E | CD | 3E | 42 | 33 | DB | CD | 3E | 44 |
| 000019F0 | CD | 3F | BC | 8B | 1E | D0 | 9E | 2B | 1E | CC | 9E | 43 | BA | 20 | 00 | CD |
| 00001A00 | 3D | 0E | CD | 3F | 6A | CD | 3E | 79 | 8B | 1E | CE | 9E | CD | 3E | 42 | 8B |
| 00001A10 | 1E | CC | 9E | CD | 3E | 42 | 33 | DB | CD | 3E | 44 | C3 | 90 | 90 | 90 | 90 |
| 00001A20 | 90 | 90 | 90 | 90 | 90 | 90 | 90 | 90 | 90 | 90 | 90 | 90 | 90 | 90 | 90 | 90 |
| 00001A30 | 90 | 90 | 90 | 90 | 90 | 90 | 90 | 90 | 90 | 90 | 90 | 90 | 90 | 90 | 90 | CD |
| 00001A40 | 3E | 02 | 00 | 00 | 00 | 00 | 00 | 00 | 00 | 00 | 00 | 00 | 00 | 00 | 00 | 00 |
| 00001A50 | CD | 3F | FF | CB | CD | 3F | FE | CB | CD | 3F | FD | CB | CD | 3F | FC | CB |
| 00001A60 | 51 | F3 | A5 | 59 | D1 | E1 | 8E | DA | 8B | 2E | C6 | 13 | 8B | C5 | 2B | C2 |
| 00001A70 | 3D | 00 | 10 | 72 | 03 | B8 | 00 | 10 | 8B | D1 | 81 | C2 | 00 | 03 | 72 | 0C |
| 00001A80 | B1 | 04 | D3 | E0 | 0B | C0 | 74 | 28 | 3B | C2 | 73 | 24 | BA | 4A | 00 | 0E |
| 00001A90 | 1F | B4 | 09 | CD | 21 | 53 | 33 | C0 | 50 | CB | 0D | 0A | 50 | 72 | 6F | 67 |
| 00001AA0 | 72 | 61 | 6D | 20 | 74 | 6F | 6F | 20 | 6C | 61 | 72 | 67 | 65 | 0D | 0A | 24 |
| 00001AB0 | 5E | 5F | 1E | 17 | 8B | E2 | 57 | 56 | 8B | CA | 92 | 83 | 06 | C4 | 13 | 07 |
| 00001AC0 | FF | 2E | C4 | 13 | B0 | 04 | BF | B0 | 05 | A2 | 1F | 00 | C7 | 06 | 35 | 00 |
| 00001AD0 | 89 | 00 | C7 | 06 | 37 | 00 | 85 | 01 | CB | CB | 5F | 5E | 5B | 56 | 57 | FF |
| 00001AE0 | 36 | 00 | 00 | FF | 37 | CB | 00 | 00 | 00 | 00 | 00 | 00 | 00 | 00 | 00 | 00 |
| 00001AF0 | 0E | 00 | E4 | 9E | 50 | 6C | 65 | 61 | 73 | 65 | 20 | 53 | 74 | 61 | 6E | 64 |
| 00001B00 | 62 | 79 | 01 | 00 | F6 | 9E | 38 | 00 | 01 | 00 | FC | 9E | 32 | 00 | 06 | 00 |
| 00001B10 | 02 | 9F | 20 | 20 | 23 | 23 | 20 | 20 | 0A | 00 | 0C | 9F | 20 | 20 | 23 | 23 |
| 00001B20 | 2C | 23 | 23 | 23 | 20 | 20 | 02 | 00 | 1A | 9F | 33 | 32 | 01 | 00 | 20 | 9F |
| 00001B30 | 35 | 00 | 01 | 00 | 26 | 9F | 52 | F7 | 09 | 00 | 2C | 9F | 42 | 50 | 41 | 52 |
| 00001B40 | 54 | 2E | 44 | 41 | 54 | 96 | 09 | 00 | 3A | 9F | 57 | 41 | 4C | 4C | 43 | 2E |
| 00001B50 | 44 | 41 | 54 | 00 | 00 | 00 | 00 | 80 | 08 | 00 | 4C | 9F | 4B | 49 | 54 | 41 |
| 00001B60 | 2E | 44 | 41 | 54 | 04 | 00 | 58 | 9F | 4D | 41 | 49 | 4E | 01 | 00 | 60 | 9F |
| 00001B70 | 5E | 8B | 03 | 00 | 66 | 9F | 20 | 5E | 20 | 00 | 06 | 00 | 6E | 9F | 4B | 69 |
| 00001B80 | 74 | 20 | 23 | 20 | 08 | 00 | 78 | 9F | 20 | 45 | 6E | 67 | 2E | 43 | 68 | 20 |
| 00001B90 | 03 | 00 | 84 | 9F | 20 | 2D | 20 | 00 | 01 | 00 | 8C | 9F | 20 | 00 | 0D | 00 |
| 00001BA0 | 92 | 9F | 20 | 4E | 4F | 20 | 53 | 45 | 4C | 45 | 43 | 54 | 49 | 4F | 4E | 00 |
| 00001BB0 | 0C | 00 | A4 | 9F | 4E | 4F | 20 | 53 | 45 | 4C | 45 | 43 | 54 | 49 | 4F | 4E |
| 00001BC0 | 0C | 00 | B4 | 9F | 20 | 45 | 6E | 74 | 65 | 72 | 20 | 4B | 69 | 74 | 20 | 23 |
| 00001BD0 | 0B | 00 | C4 | 9F | 45 | 6E | 74 | 65 | 72 | 20 | 4B | 69 | 74 | 20 | 23 | 00 |
| 00001BE0 | 0A | 00 | D4 | 9F | 20 | 4E | 45 | 58 | 54 | 20 | 50 | 41 | 47 | 45 | 09 | 00 |
| 00001BF0 | E2 | 9F | 4E | 45 | 58 | 54 | 20 | 50 | 41 | 47 | 45 | 00 | 0E | 00 | F0 | 9F |
| 00001C00 | 20 | 50 | 52 | 45 | 56 | 49 | 4F | 55 | 53 | 20 | 50 | 41 | 47 | 45 | 0D | 00 |
| 00001C10 | 02 | A0 | 50 | 52 | 45 | 56 | 49 | 4F | 55 | 53 | 20 | 50 | 41 | 47 | 45 | 00 |
| 00001C20 | 05 | 00 | 14 | A0 | 4D | 6F | 76 | 65 | 20 | 00 | 05 | 00 | 1E | A0 | 20 | 3D |
| 00001C30 | 20 | 55 | 70 | 00 | 07 | 00 | 28 | A0 | 20 | 3D | 20 | 44 | 6F | 77 | 6E | 00 |
| 00001C40 | 09 | 00 | 34 | A0 | 20 | 3D | 20 | 53 | 65 | 6C | 65 | 63 | 74 | 00 | 07 | 00 |
| 00001C50 | 42 | A0 | 20 | 4B | 69 | 74 | 20 | 23 | 3D | 00 | 0F | 00 | 4E | A0 | 20 | 4C |
| 00001C60 | 6F | 63 | 61 | 74 | 69 | 6F | 6E | 20 | 4B | 69 | 74 | 20 | 23 | 78 | 13 | 00 |
| 00001C70 | 62 | A0 | 20 | 20 | 20 | 20 | 20 | 20 | 20 | 20 | 20 | 20 | 20 | 20 | 20 | 20 |
| 00001C80 | 20 | 20 | 20 | 20 | 20 | 00 | 00 | 00 | 18 | 85 | 05 | 00 | 7E | A0 | 20 | 20 |
| 00001C90 | 5E | 20 | 20 | 00 | 0B | 00 | 88 | A0 | 53 | 75 | 70 | 65 | 72 | 63 | 65 | 6C |
| 00001CA0 | 6C | 20 | 23 | 00 | 0E | 00 | 98 | A0 | 20 | 28 | 52 | 65 | 63 | 6F | 6D | 6D |
| 00001470 | CD | 3F | C0 | BB | 88 | 9F | CD | 3F | 6E | CD | 3E | 79 | B8 | 01 | 00 | E9 |
| 00001480 | 28 | 00 | 8B | 1E | 2A | 9E | D1 | E3 | D1 | E3 | 81 | C3 | 72 | 9D | 8B | D3 |
| 00001490 | CD | 3F | BA | 83 | FB | 0A | 7F | 03 | E9 | 0B | 00 | CD | 3F | C0 | 8B | DA |
| 000014A0 | CD | 3F | 6E | CD | 3E | 79 | A1 | 2A | 9E | 40 | A3 | 2A | 9E | 83 | 3E | 2A |
| 000014B0 | 9E | 1E | 7E | CE | CD | 3F | C0 | BB | 0C | 00 | CD | 3D | 05 | CD | 3F | 6E |
| 000014C0 | CD | 3E | 79 | BB | 14 | A2 | BA | 70 | 9E | CD | 3F | 61 | BB | 17 | 00 | CD |
| 000014D0 | 3E | 42 | BB | 01 | 00 | CD | 3E | 42 | 33 | DB | CD | 3E | 44 | E8 | 1C | 04 |
| 000014E0 | BB | 3A | A2 | B8 | 70 | 9E | CD | 3F | 62 | 75 | 03 | E9 | C8 | F0 | BB | FF |
| 000014F0 | FF | CD | 3E | 32 | BB | 1C | 18 | CD | 3F | 34 | C7 | 06 | BC | 9E | 63 | 00 |
| 00001500 | C7 | 06 | BE | 9E | 00 | 00 | A1 | A2 | 9E | A3 | C0 | 9E | A1 | A0 | 9E | E9 |
| 00001510 | 8B | 01 | BB | 50 | 9E | CD | 3F | 0F | BB | 52 | 9E | CD | 3F | 0F | BB | 54 |
| 00001520 | 9E | CD | 3F | 0F | A1 | 54 | 9E | A3 | C2 | 9E | B8 | 01 | 00 | E9 | 5A | 01 |
| 00001530 | A1 | 52 | 9E | A3 | C4 | 9E | A1 | 50 | 9E | E9 | 3B | 01 | 8B | 3E | 5A | 9E |
| 00001540 | D1 | E7 | D1 | E7 | D1 | E7 | D1 | E7 | D1 | E7 | 03 | 3E | 5E | 9E | D1 | E7 |
| 00001550 | D1 | E7 | D1 | E7 | D1 | E7 | D1 | E7 | 03 | 3E | 58 | 9E | D1 | E7 | 83 | BD |

```
00001560  44 12 00 7C 03 E9 0B 01  8B 3E 5A 9E D1 E7 D1 E7
00001570  D1 E7 D1 E7 D1 E7 03 3E  5E 9E D1 E7 D1 E7 D1 E7
00001580  D1 E7 D1 E7 03 3E 58 9E  D1 E7 BB 01 00 8B 95 44
00001590  3A CD 3E 26 83 3E BC 9E  15 7D 03 E9 53 00 C7 06
000015A0  BE 9E 00 00 83 3E BC 9E  5A 7E 03 E9 2B 00 BB 40
000015B0  A2 BA 70 9E CD 3F 61 BB  18 00 CD 3E 42 BB 01 00
000015C0  CD 3E 42 33 DB CD 3E 44  E8 37 03 BB 94 A1 B8 70
000015D0  9E CD 3F 62 75 03 E9 D3  00 C7 06 BC 9E 00 00 BB
000015E0  FF FF CD 3E 32 CD 3F BC  BB 54 A2 CD 3F 6E CD 3E
000015F0  79 CD 3F BC BB 1E 9E CD  3F 6A BB 80 9F CD 3F 6A
00001600  BB 22 9E CD 3F 6A BB FA  9D CD 3E 0A 8B 3E 5A 9E
00001610  8B DF D1 E7 D1 E7 D1 E7  D1 E7 D1 E7 03 3E 5E 9E
00001620  D1 E7 D1 E7 D1 E7 D1 E7  D1 E7 03 3E 58 9E D1 E7
00001630  8B 95 44 12 F7 DA 87 DA  CD 3F 69 CD 3E 79 BB F6
00001640  9D CD 3F BD 8B 1E 58 9E  CD 3F 69 8B DA CD 3F 69
00001650  8B 1E 5E 9E CD 3F 69 CD  3E 79 CD 3F BC BB 88 9F
00001660  CD 3F 6A BB 26 9E CD 3F  6E CD 3E 79 A1 BC 9E 40
00001670  A3 BC 9E A1 5E 9E 40 A3  5E 9E A1 C4 9E 3B 06 5E
00001680  9E 7C 03 E9 B6 FE A1 5A  9E 40 A3 5A 9E A1 C2 9E
00001690  3B 06 5A 9E 7C 03 E9 97  FE A1 58 9E 40 A3 58 9E
000016A0  A1 C0 9E 3B 06 58 9E 7C  03 E9 66 FE 83 3E BC 9E
000016B0  63 74 03 E9 15 00 BB FF  FF CD 3E 32 BB A2 A2 BA
000016C0  70 9E CD 3F 61 E8 34 02  E9 2E 02 BB CC A2 BA 70
000016D0  9E CD 3F 61 BB 18 00 CD  3E 42 BB 01 00 CD 3E 42
000016E0  33 DB CD 3E 44 E8 1A 02  BB 94 A1 B8 70 9E CD 3F
000016F0  62 75 03 E9 03 02 BB E6  A2 BA 70 9E CD 3F 61 E8
00001700  00 02 BB 94 A1 B8 70 9E  CD 3F 62 74 BE BB 1C 18
00001710  CD 3F 34 C7 06 BC 9E 63  00 C7 06 BE 9E 00 00 A1
00001720  A2 9E A3 C6 9E A1 A0 9E  E9 B0 01 BB 50 9E CD 3F
00001730  0F BB 52 9E CD 3F 0F BB  54 9E CD 3F 0F A1 54 9E
00001740  A3 C8 9E B8 01 00 E9 7F  01 A1 52 9E A3 CA 9E A1
00001750  50 9E E9 60 01 8B 3E 5A  9E D1 E7 D1 E7 D1 E7 D1
00001760  E7 D1 E7 03 3E 5E 9E D1  E7 D1 E7 D1 E7 D1 E7 D1
00001770  E7 03 3E 58 9E D1 E7 83  BD 44 12 00 7C 03 E9 30
00001780  01 8B 3E 5A 9E D1 E7 D1  E7 D1 E7 D1 E7 D1 E7 03
00001790  3E 5E 9E D1 E7 D1 E7 D1  E7 D1 E7 D1 E7 03 3E 58
000017A0  9E D1 E7 BB 01 00 8B 95  44 3A CD 3E 26 83 3E BC
000017B0  9E 33 7D 03 E9 78 00 A1  BE 9E 40 A3 BE 9E 83 3E
000017C0  BC 9E 5A 7E 03 E9 0F 00  CD 3F C0 BB 0C 00 CD 3D
000017D0  05 CD 3F 6E CD 3E 79 C7  06 BC 9E 00 00 CD 3F C0
000017E0  BB 3C 00 CD 3F 37 BB D6  A0 CD 3F 6A BB FE A2 CD
000017F0  3F 6A CD 3D 23 CD 3F 6E  CD 3E 79 CD 3F C0 BB 3C
00001800  00 CD 3F 37 BB D6 A0 CD  3F 6A BB 08 A3 CD 3F 6A
00001810  8B 1E BE 9E CD 3F 69 BB  0A 00 CD 3D 05 CD 3F 6E
00001820  CD 3E 79 CD 3F C0 BB 54  A2 CD 3F 6E CD 3E 79 CD
00001830  3F C0 BB 1E 9E CD 3F 6A  BB 80 9F CD 3F 6A BB 22
00001840  9E CD 3F 6A BB FA 9D CD  3E 0A 8B 3E 5A 9E 8B DF
00001850  D1 E7 D1 E7 D1 E7 D1 E7  D1 E7 03 3E 5E 9E D1 E7
00001860  D1 E7 D1 E7 D1 E7 D1 E7  03 3E 58 9E D1 E7 8B 95
00001870  44 12 F7 DA 87 DA CD 3F  69 CD 3E 79 BB F6 9D CD
00001880  3F C1 8B 1E 58 9E CD 3F  69 8B DA CD 3F 69 8B 1E
00001050  7C 00 A1 52 9E A3 B0 9E  A1 50 9E E9 60 00 8B 3E
00001060  5A 9E D1 E7 D1 E7 D1 E7  D1 E7 D1 E7 03 3E 5E 9E
00001070  D1 E7 D1 E7 D1 E7 D1 E7  D1 E7 03 3E A8 9E D1 E7
00001080  8B 9D 44 3A 8B 36 2A 9E  D1 E6 3B 9C 44 14 BA 00
00001090  00 74 01 4A 3B 9C 44 14  B9 00 00 75 01 49 8B 9D
000010A0  44 62 3B 9C 2C 18 B8 00  00 74 01 48 23 C1 0B C2
000010B0  23 C0 74 03 E9 03 00 E9  26 00 A1 5E 9E 40 A3 5E
000010C0  9E A1 B0 9E 3B 06 5E 9E  7D 94 A1 5A 9E 40 A3 5A
000010D0  9E A1 AE 9E 3B 06 5A 9E  7C 03 E9 75 FF E9 6B 01
000010E0  83 3E A8 9E 08 BB 00 00  74 01 4B 83 3E A8 9E 0F
000010F0  BA 00 00 74 01 4A 23 D3  83 3E A8 9E 16 BB 00 00
00001100  74 01 4B 23 DA 83 3E A8  9E 1B BA 00 00 74 01 4A
00001110  23 D3 83 3E A8 9E 20 BB  00 00 74 01 4B 23 DA 23
00001120  DB 75 03 E9 0D 00 83 3E  5A 9E 04 75 03 E9 BC 01
00001130  E9 C3 00 BB 1F 18 CD 3F  34 83 3E A8 9E 20 74 03
00001140  E9 06 00 C7 06 B2 9E 1B  00 83 3E A8 9E 1B 74 03
00001150  E9 06 00 C7 06 B2 9E 16  00 83 3E A8 9E 16 74 03
00001160  E9 06 00 C7 06 B2 9E 0F  00 83 3E A8 9E 0F 74 03
00001170  E9 06 00 C7 06 B2 9E 08  00 83 3E A8 9E 08 74 03
00001180  E9 06 00 C7 06 B2 9E 00  00 A1 A8 9E 48 A3 B4 9E
00001190  B8 01 00 E9 54 00 BB B6  9E CD 3F 0F BB B8 9E CD
000011A0  3F 0F BB BA 9E CD 3F 0F  83 3E B6 9E FF 75 03 E9
000011B0  34 00 A1 5A 9E 3B 06 B8  9E BB 00 00 75 01 4B A1
000011C0  5E 9E 3B 06 BA 9E BA 00  00 75 01 4A 23 D3 A1 B2
```

```
000011D0  9E 3B 06 7A 9E BB 00 00  7D 01 4B 23 DA 23 DB 74
000011E0  03 E9 08 01 EB B0 A1 7A  9E 40 A3 7A 9E A1 B4 9E
000011F0  3B 06 7A 9E 7D A0 8B 1E  A8 9E D1 E3 D1 E3 81 C3
00001200  82 92 93 BB 4E A1 CD 3F  62 74 03 E9 DE 00 8B 3E
00001210  2A 9E D1 E7 8B 85 38 16  F7 2E 9E 9E 8B 3E 5A 9E
00001220  D1 E7 D1 E7 D1 E7 D1 E7  D1 E7 03 3E 5E 9E D1 E7
00001230  D1 E7 D1 E7 D1 E7 D1 E7  03 3E A8 9E D1 E7 8B 9D
00001240  44 12 2B D8 89 9D 44 12  E9 A1 00 A1 A8 9E 40 A3
00001250  A8 9E A1 A6 9E 3B 06 A8  9E 7C 03 E9 B4 FD 8B 3E
00001260  2A 9E D1 E7 BB 01 00 8B  95 44 14 CD 3E 26 B8 01
00001270  00 E9 1B 00 8B 1E 2C 9E  D1 E3 D1 E3 81 C3 72 9D
00001280  CD 3F BA 83 FB 0A 7D 03  E9 11 00 A1 2C 9E 40 A3
00001290  2C 9E 83 3E 2C 9E 1E 7E  DB E9 62 00 8B 1E 2C 9E
000012A0  D1 E3 D1 E3 81 C3 72 9D  8B D3 BB 1E 9E B8 54 A1
000012B0  CD 3F 55 93 BB 60 A1 CD  3F 55 93 BB 22 9E CD 3F
000012C0  55 93 BB 66 A1 CD 3F 55  8B 3E 2A 9E D1 E7 8B CB
000012D0  8B 9D 2C 18 CD 3D 10 91  CD 3F 55 93 BB 72 A1 CD
000012E0  3F 55 93 BB 26 9E CD 3F  55 CD 3F 61 A1 2A 9E 40
000012F0  A3 2A 9E 81 3E 2A 9E FA  00 7F 03 E9 F8 FC BB 76
00001300  9D CD 3F BA 83 FB 0A 7D  03 E9 B7 01 C7 06 BC 9E
00001310  63 00 B8 01 00 E9 8E 00  8B 1E 2A 9E D1 E3 D1 E3
00001320  81 C3 72 9D CD 3F BA 83  FB 0A 7D 03 E9 84 00 83
00001330  3E BC 9E 14 7D 03 E9 4D  00 83 3E BC 9E 1E 7E 03
00001340  E9 2B 00 BB 17 00 CD 3E  42 BB 01 00 CD 3E 42 33
00001350  DB CD 3E 44 BB 80 A1 BA  70 9E CD 3F 61 E8 A2 05
00001360  BB 94 A1 B8 70 9E CD 3F  62 75 03 E9 45 00 BB FF
00001370  FF CD 3E 32 CD 3F BC BB  9A A1 CD 3F 6E CD 3E 79
00001380  C7 06 BC 9E 00 00 A1 BC  9E 40 A3 BC 9E CD 3F BC
00001390  8B 1E 2A 9E D1 E3 D1 E3  81 C3 72 9D CD 3F 6E CD
000013A0  3E 79 A1 2A 9E 40 A3 2A  9E 83 3E 2A 9E 1E 7F 03
000013B0  E9 65 FF BB 17 00 CD 3E  42 BB 01 00 CD 3E 42 33
000013C0  DB CD 3E 44 BB B0 A1 BA  70 9E CD 3F 61 E8 32 05
000013D0  BB 94 A1 B8 70 9E CD 3F  62 75 03 E9 E5 00 BB 17
000013E0  00 CD 3E 42 BB 01 00 CD  3E 42 33 DB CD 3E 44 BB
000013F0  D2 A1 BA 70 9E CD 3F 61  E8 07 05 BB 94 A1 B8 70
00001400  9E CD 3F 62 75 03 E9 BA  00 CD 3F C0 BB 9A A1 CD
00001410  3F 6E CD 3E 79 CD 3F C0  BB 6A 9F CD 3F 6A BB 84
00001420  9E BA 5C 9F 8B CB CD 3D  09 4B 87 D9 87 D1 8B C3
00001430  CD 3D 0B CD 3F 6A BB FA  A1 CD 3F 6A 93 8B D1 8B
00001440  C3 CD 3D 09 93 8B D3 CD  3F BA 2B D8 87 D3 CD 3D
00001450  0C CD 3F 6E CD 3E 79 CD  3F C0 BB 9A 9E CD 3F 6A
00001460  BB FE A0 CD 3F 6A 8B 1E  58 9E CD 3F 6D CD 3E 79
00000C30  D1 E3 81 C3 E2 9B CD 3D  18 B8 32 00 8B CA F7 2E
00000C40  8E 9E 03 C1 97 D1 E7 89  9D 44 14 A1 2A 9E 40 A3
00000C50  2A 9E 83 3E 2A 9E 32 7E  AC A1 8E 9E 40 A3 8E 9E
00000C60  83 3E 8E 9E 04 7E 8A BB  84 9E BA 5C 9F 8B CB CD
00000C70  3D 09 0B DB 74 03 E9 0B  00 91 BB 7A A0 CD 3F 55
00000C80  92 CD 3F 61 33 C0 E9 6F  00 A1 8E 9E 03 06 7C 9E
00000C90  05 05 00 92 BB 03 00 CD  3E 26 B8 01 00 E9 4A 00
00000CA0  8B 1E 2A 9E 8B D3 D1 E3  D1 E3 81 C3 E2 9B CD 3D
00000CB0  18 B8 64 00 8B CA F7 2E  8E 9E 03 C1 97 D1 E7 89
00000CC0  9D 2C 18 8B 1E 2A 9E 8B  D3 D1 E3 D1 E3 81 C3 AA
00000CD0  9C CD 3D 18 B8 64 00 8B  CA F7 2E 8E 9E 03 C1 97
00000CE0  D1 E7 89 9D 90 18 A1 2A  9E 40 A3 2A 9E 83 3E 2A
00000CF0  9E 32 7E AC A1 8E 9E 40  A3 8E 9E 83 3E 8E 9E 02
00000D00  7E 87 C7 06 90 9E 01 00  C7 06 92 9E 00 00 C7 06
00000D10  94 9E 00 00 BB FF FF CD  3E 32 CD 3F BC BB 84 A0
00000D20  CD 3F 6A CD 3E 79 BB 01  00 CD 3E 42 BB 32 00 CD
00000D30  3E 42 33 DB CD 3E 44 CD  3F BC BB 94 A0 CD 3F 6A
00000D40  8B 1E 82 9E CD 3F 69 BB  A6 A0 CD 3F 6A CD 3E 79
00000D50  BB AC A0 BA 96 9E CD 3F  61 BB 96 9E BA 9A 9E CD
00000D60  3F 61 BB 01 00 CD 3E 42  BB 19 00 CD 3E 42 33 DB
00000D70  CD 3E 44 33 DB CD 3E 33  BB 07 00 CD 3E 35 CD 3F
00000D80  BC BB 0E 9E B8 BA A0 CD  3F 55 CD 3F 6A CD 3E 79
00000D90  BB 01 00 CD 3E 42 BB 0D  00 CD 3E 42 33 DB CD 3E
00000DA0  44 BB 07 00 CD 3E 33 33  DB CD 3E 35 BB D6 A0 CD
00000DB0  3F B5 00 CD 3F B7 01 01  BB 58 9E CD 3F B8 83 3E
00000DC0  58 9E 01 BB 00 00 7D 01  4B A1 08 9E 3B 06 58 9E
00000DD0  BA 00 00 7D 01 4A 0B D3  23 D2 75 86 BB 01 00 CD
00000DE0  3E 42 BB 0D 00 CD 3E 42  33 DB CD 3E 44 CD 3F BC
00000DF0  BB 3C 00 CD 3D 0D CD 3F  6A CD 3E 79 83 3E 58 9E
00000E00  01 74 03 E9 09 00 C7 06  90 9E 08 00 E9 19 00 83
00000E10  3E 58 9E 03 7F 03 E9 09  00 C7 06 90 9E 05 00 E9
00000E20  06 00 C7 06 90 9E 07 00  C7 06 92 9E 00 00 C7 06
00000E30  94 9E 00 00 83 3E 58 9E  02 BB 00 00 75 01 4B 83
```

```
00000E40  3E 58 9E 03 BA 00 00 75  01 4A 0B D3 23 D2 75 03
00000E50  E9 09 00 C7 06 94 9E 06  00 E9 2E 00 83 3E 58 9E
00000E60  04 BB 00 00 75 01 4B 83  3E 58 9E 05 BA 00 00 75
00000E70  01 4A 0B D3 23 D2 75 03  E9 09 00 C7 06 94 9E 05
00000E80  00 E9 06 00 C7 06 94 9E  08 00 BB FF FF CD 3E 32
00000E90  CD 3F BC BB DA A0 CD 3F  6A BB 23 00 CD 3F 37 BB
00000EA0  D6 A0 CD 3F 6A BB E6 A0  CD 3F 6A CD 3E 79 BB 01
00000EB0  00 CD 3E 42 BB 08 00 CD  3E 42 33 DB CD 3E 44 CD
00000EC0  3F BC BB 84 9E BA 5C 9F  8B CB CD 3D 09 4B 87 D9
00000ED0  8B D1 CD 3D 0B CD 3F 6A  CD 3E 79 BB 01 00 CD 3E
00000EE0  42 BB 39 00 CD 3E 42 33  DB CD 3E 44 CD 3F BC BB
00000EF0  84 9E BA 5C 9F 8B CB CD  3D 09 87 D9 8B D3 CD 3F
00000F00  BA 2B D9 87 D3 CD 3D 0C  CD 3F 6A CD 3E 79 BB 02
00000F10  00 CD 3E 42 BB 01 00 CD  3E 42 33 DB CD 3E 44 CD
00000F20  3F BC BB 8A 9E CD 3F 6E  CD 3E 79 CD 3F BC BB 9A
00000F30  9E CD 3F 6A BB FE A0 CD  3F 6A 8B 1E 58 9E CD 3F
00000F40  6D CD 3E 79 BB 07 00 CD  3E 42 BB 01 00 CD 3E 42
00000F50  33 DB CD 3E 44 BB 04 A1  CD 3F B5 00 CD 3F B7 01
00000F60  01 BB 9E 9E CD 3F B8 83  3E 9E 9E 00 7D 03 E9 19
00000F70  FF 83 3E 9E 9E 00 75 03  E9 83 03 BB FF FF CD 3E
00000F80  32 CD 3F BC BB 2C A1 CD  3F 6E CD 3E 79 A1 58 9E
00000F90  A3 A0 9E A1 58 9E A3 A2  9E BB C7 0D CD 3F 34 A1
00000FA0  58 9E A3 A4 9E B8 01 00  E9 10 00 BB A0 9E CD 3F
00000FB0  0F BB A2 9E CD 3F 0F A1  2A 9E 40 A3 2A 9E A1 A4
00000FC0  9E 3B 06 2A 9E 7D E4 90  B8 01 00 E9 18 00 8B 1E
00000FD0  2A 9E D1 E3 D1 E3 81 C3  82 92 8B D3 BB 4E A1 CD
00000FE0  3F 61 A1 2A 9E 40 A3 2A  9E 83 3E 2A 9E 20 7E DE
00000FF0  B8 01 00 E9 FA 02 8B 3E  2A 9E D1 E7 83 BD 44 14
00001000  00 75 03 E9 F8 02 A1 A2  9E A3 A6 9E A1 A0 9E E9
00001010  3D 02 BB 1C 18 CD 3F 34  A1 A8 9E A3 AA 9E B8 01
00001020  00 E9 16 00 BB 50 9E CD  3F 0F BB 52 9E CD 3F 0F
00001030  BB 54 9E CD 3F 0F A1 AC  9E 40 A3 AC 9E A1 AA 9E
00001040  3B 06 AC 9E 7D DE A1 54  9E A3 AE 9E B8 01 00 E9
00000810  61 BB 05 00 CD 3E 42 BB  44 00 CD 3E 42 33 DB CD
00000820  3E 44 CD 3F BC BB 10 A0  CD 3F 6A CD 3E 79 BB 17
00000830  00 CD 3E 33 33 DB CD 3E  35 CD 3F BC BB 10 00 CD
00000840  3D 05 CD 3F 6A CD 3E 79  BB 07 00 CD 3E 33 33 DB
00000850  CD 3E 35 BB 07 00 CD 3E  42 BB 44 00 CD 3E 42 33
00000860  DB CD 3E 44 CD 3F BC BB  18 00 CD 3D 05 CD 3F 6A
00000870  BB 1A A0 CD 3F 6A CD 3E  79 BB 08 00 CD 3E 42 BB
00000880  44 00 CD 3E 42 33 DB CD  3E 44 CD 3F BC BB 19 00
00000890  CD 3D 05 CD 3F 6A BB 24  A0 CD 3F 6A CD 3E 79 BB
000008A0  0C 00 CD 3E 42 BB 42 00  CD 3E 42 33 DB CD 3E 44
000008B0  CD 3F BC BB 11 00 CD 3D  05 CD 3F 6A BB C4 00 CD
000008C0  3D 05 CD 3F 6A BB D9 00  CD 3D 05 CD 3F 6A BB 30
000008D0  A0 CD 3F 6A CD 3E 79 A1  62 9E A3 2A 9E C7 06 62
000008E0  9E 01 00 8B 1E 2A 9E CD  3E 42 BB 01 00 CD 3E 42
000008F0  33 DB CD 3E 44 BB 17 00  CD 3E 33 33 DB CD 3E 35
00000900  CD 3F BC BB 10 00 CD 3D  05 CD 3F 6A CD 3E 79 33
00000910  DB CD 3E 33 BB 07 00 CD  3E 35 CD 3F BC 8B 1E 2A
00000920  9E D1 E3 D1 E3 81 C3 62  94 CD 3F 6A CD 3E 79 BB
00000930  07 00 CD 3E 33 33 DB CD  3E 35 BB 19 00 CD 3E 42
00000940  BB 01 00 CD 3E 42 33 DB  CD 3E 44 CD 3D 06 BA 70
00000950  9E CD 3F 61 BB 70 9E CD  3F BA 0B DB 74 ED BB FE
00000960  9D B8 70 9E CD 3F 62 BA  00 00 74 01 4A BB EE 9D
00000970  CD 3F 62 B9 00 00 74 01  49 23 CA BB F2 9D CD 3F
00000980  62 BA 00 00 74 01 4A 23  D1 23 D2 75 BE 8B 1E 2A
00000990  9E CD 3E 42 BB 01 00 CD  3E 42 33 DB CD 3E 44 CD
000009A0  3F BC BB 88 9F CD 3F 6A  8B 1E 2A 9E D1 E3 D1 E3
000009B0  81 C3 62 94 CD 3F 6A CD  3E 79 BB FE 9D B8 70 9E
000009C0  CD 3F 62 75 03 E9 44 00  BB F2 9D B8 70 9E CD 3F
000009D0  62 74 03 E9 1C 00 A1 2A  9E 40 A3 2A 9E A1 6A 9E
000009E0  3B 06 2A 9E 7C 03 E9 06  00 C7 06 2A 9E 01 00 E9
000009F0  F1 FE A1 2A 9E 48 A3 2A  9E 83 3E 2A 9E 00 74 03
00000A00  E9 06 00 A1 6A 9E A3 2A  9E E9 D7 FE A1 2A 9E 3B
00000A10  06 66 9E 74 03 E9 0A 00  A1 60 9E 40 A3 60 9E E9
00000A20  97 FC A1 2A 9E 3B 06 68  9E 74 03 E9 0A 00 A1 60
00000A30  9E 48 A3 60 9E E9 81 FC  A1 2A 9E 3B 06 6C 9E 74
00000A40  03 E9 03 00 E9 B7 08 A1  2A 9E 3B 06 6E 9E 74 03
00000A50  E9 43 01 8B 1E 6E 9E CD  3E 42 BB 01 00 CD 3E 42
00000A60  33 DB CD 3E 44 CD 3F BC  BB 4F 00 BA 20 00 CD 3D
00000A70  0E CD 3F 6A CD 3E 79 8B  1E 6E 9E CD 3E 42 BB 01
00000A80  00 CD 3E 42 33 DB CD 3E  44 BB 3E A0 CD 3F B5 01
00000A90  CD 3F B7 01 04 BB 74 9E  CD 3F B8 BB 74 9E 8B D3
```

```
00000AA0  CD 3F BA 83 FB 01 B9 00  00 7D 01 49 8B DA CD 3F
00000AB0  BA 83 FB 0D BA 00 00 7E  01 4A 0B D1 23 D2 75 93
00000AC0  8B 1E 6E 9E CD 3E 42 BB  01 00 CD 3E 42 33 DB CD
00000AD0  3E 44 CD 3F BC BB 4A A0  CD 3F 6A BB 74 9E CD 3F
00000AE0  6A BB 5E A0 CD 3F 6A CD  3E 79 A1 64 9E A3 78 9E
00000AF0  B8 01 00 E9 40 00 8B 1E  7A 9E D1 E3 D1 E3 81 C3
00000B00  82 92 8B D3 CD 3F BA 83  C3 FA 87 D3 CD 3D 0C BA
00000B10  70 9E CD 3F 61 BB 74 9E  8B D3 CD 3F BA 87 D3 8B
00000B20  CB BB 70 9E CD 3D 0B 87  D9 91 CD 3F 62 75 03 E9
00000B30  37 00 A1 7A 9E 40 A3 7A  9E A1 78 9E 3B 06 7A 9E
00000B40  7D B4 8B 1E 6E 9E CD 3E  42 BB 01 00 CD 3E 42 33
00000B50  DB CD 3E 44 CD 3F BC BB  4F 00 BA 20 00 CD 3D 0E
00000B60  CD 3F 6A CD 3E 79 E9 7A  FD 8B 1E 7A 9E 4B CD 3F
00000B70  57 BF 76 A0 CD 3F 89 BB  1A 00 CD 3D 03 CD 3F 77
00000B80  93 A3 60 9E A1 7A 9E 48  B9 13 00 99 F7 F9 42 92
00000B90  A3 62 9E E9 23 FB BB FF  FF CD 3E 32 B8 13 00 F7
00000BA0  2E 60 9E 03 06 2A 9E D1  E0 D1 E0 D1 E0 05 F9 FF
00000BB0  A3 7C 9E BB 03 00 8B 16  7C 9E CD 3E 26 BB 36 9E
00000BC0  BA 7E 9E CD 3F 61 BB 3A  9E CD 3D 18 93 A3 82 9E
00000BD0  BB 3E 9E BA 84 9E CD 3F  61 BB 46 9E CD 3D 18 93
00000BE0  A3 88 9E BB 42 9E BA 8A  9E CD 3F 61 33 C0 E9 6C
00000BF0  00 A1 8E 9E 03 06 7C 9E  92 BB 03 00 CD 3E 26 B8
00000C00  01 00 E9 4A 00 8B 1E 2A  9E 8B D3 D1 E3 D1 E3 81
00000C10  C3 AA 9C CD 3D 18 B8 32  00 8B CA F7 2E 8E 9E 03
00000C20  C1 97 D1 E7 89 9D 38 16  8B 1E 2A 9E 8B D3 D1 E3
000003F0  0E 00 CD 3F B4 BB 42 9E  BA 1E 00 CD 3F B4 8B D1
00000400  BB 46 9E CD 3F B4 BB 4A  9E BA 04 00 CD 3F B4 33
00000410  C0 E9 51 00 33 C0 E9 3E  00 BB 03 00 CD 3F B3 8B
00000420  1E 2A 9E 8B D3 D1 E3 D1  E3 8B 0E 2C 9E 8B C1 D1
00000430  E1 03 CB 83 C1 38 87 D1  BB 2E 9E CD 3F B4 BB 32
00000440  00 F7 EB 03 C1 D1 E0 D1  E0 05 E6 9B 93 BA 02 00
00000450  CD 3F B4 A1 2C 9E 40 A3  2C 9E 83 3E 2C 9E 01 7E
00000460  B8 A1 2A 9E 40 A3 2A 9E  83 3E 2A 9E 31 7E A5 BB
00000470  1C 18 CD 3F 34 A1 06 9E  A3 4E 9E B8 01 00 E9 0E
00000480  01 BB 50 9E CD 3F 0F BB  52 9E CD 3F 0F BB 54 9E
00000490  CD 3F 0F A1 54 9E A3 56  9E B8 01 00 E9 DD 00 B8
000004A0  05 00 F7 2E 58 9E 03 06  5A 9E 05 FB FF 92 BB 02
000004B0  00 CD 3E 26 A1 52 9E A3  5C 9E A1 50 9E E9 A9 00
000004C0  8B 1E 5E 9E 8B D3 D1 E3  D1 E3 81 C3 E2 99 CD 3D
000004D0  18 8B 0E 5A 9E D1 E1 D1  E1 D1 E1 D1 E1 D1 E1 03
000004E0  CA 8B F9 D1 E7 D1 E7 D1  E7 D1 E7 D1 E7 03 3E 58
000004F0  9E D1 E7 89 9D 44 12 8B  1E 5E 9E 8B D3 D1 E3 D1
00000500  E3 81 C3 62 99 CD 3D 18  8B 0E 5A 9E D1 E1 D1 E1
00000510  D1 E1 D1 E1 D1 E1 03 CA  8B F9 D1 E7 D1 E7 D1 E7
00000520  D1 E7 D1 E7 03 3E 58 9E  D1 E7 89 9D 44 3A 8B 1E
00000530  5E 9E 8B D3 D1 E3 D1 E3  81 C3 62 9B CD 3D 18 8B
00000540  0E 5A 9E D1 E1 D1 E1 D1  E1 D1 E1 D1 E1 03 CA 8B
00000550  F9 D1 E7 D1 E7 D1 E7 D1  E7 D1 E7 03 3E 58 9E D1
00000560  E7 89 9D 44 62 A1 5E 9E  40 A3 5E 9E A1 5C 9E 3B
00000570  06 5E 9E 7C 03 E9 48 FF  A1 5A 9E 40 A3 5A 9E A1
00000580  56 9E 3B 06 5A 9E 7C 03  E9 14 FF A1 58 9E 40 A3
00000590  58 9E A1 4E 9E 3B 06 58  9E 7C 03 E9 E3 FE BB 02
000005A0  00 CD 3E 21 E9 0F 00 BB  FF FF CD 3E 32 CD 3E 22
000005B0  BB 54 9F CD 3E 0E B8 01  00 E9 28 00 8B 3E 2A 9E
000005C0  D1 E7 C7 85 44 14 00 00  8B 3E 2A 9E D1 E7 C7 85
000005D0  38 16 00 00 8B 3E 2A 9E  D1 E7 C7 85 2C 18 00 00
000005E0  A1 2A 9E 40 A3 2A 9E 81  3E 2A 9E FA 00 7E CD C7
000005F0  06 60 9E 00 00 C7 06 62  9E 01 00 C7 06 2A 9E 01
00000600  00 C7 06 2C 9E 00 00 BB  03 00 8B 16 2A 9E CD 3E
00000610  26 BB 03 00 CD 3D 2F 83  FB FF 74 03 E9 09 00 A1
00000620  2C 9E A3 64 9E E9 91 00  A1 2C 9E 40 A3 2C 9E BB
00000630  3E 9E BA 5C 9F 8B CB CD  3D 09 0B DB 74 03 E9 0B
00000640  00 91 BB 62 9F CD 3F 55  92 CD 3F 61 8B 1E 2C 9E
00000650  D1 E3 D1 E3 81 C3 82 92  8B CB BB 3E 9E BA 5C 9F
00000660  8B C3 CD 3D 09 4B 93 92  89 5E FA CD 3D 0B 8B D0
00000670  B8 6A 9F CD 3F 55 93 BB  74 9F CD 3F 55 8B C3 8B
00000680  5E FA CD 3D 09 8B D3 8B  5E FA CD 3F BA 2B DA 8B
00000690  D3 8B 5E FA CD 3D 0C CD  3F 55 93 BB 80 9F CD 3F
000006A0  55 93 BB 42 9E CD 3F 55  8B D1 CD 3F 61 A1 2A 9E
000006B0  05 08 00 A3 2A 9E E9 4E  FF C7 06 66 9E 00 00 C7
000006C0  06 68 9E 00 00 C7 06 6A  9E 00 00 BB FF FF CD 3E
000006D0  32 B8 01 00 E9 5F 00 B8  13 00 F7 2E 60 9E 03 06
000006E0  2A 9E 3B 06 2C 9E 7E 03  E9 55 00 A1 6A 9E 40 A3
000006F0  6A 9E 8B 1E 2A 9E 8B D3  D1 E3 D1 E3 81 C3 62 94
00000700  B8 13 00 8B CA F7 2E 60  9E 03 C1 D1 E0 D1 E0 05
```

| | | | | | | | | | | | | | | | | |
|---|---|---|---|---|---|---|---|---|---|---|---|---|---|---|---|---|
| 00000710 | 82 | 92 | 93 | 92 | CD | 3F | 61 | CD | 3F | BC | 8B | 1E | 2A | 9E | D1 | E3 |
| 00000720 | D1 | E3 | 81 | C3 | 62 | 94 | B8 | 88 | 9F | CD | 3F | 55 | CD | 3F | 6E | CD |
| 00000730 | 3E | 79 | A1 | 2A | 9E | 40 | A3 | 2A | 9E | 83 | 3E | 2A | 9E | 13 | 7E | 97 |
| 00000740 | CD | 3F | BC | BB | 8E | 9F | CD | 3F | 6E | CD | 3E | 79 | A1 | 6A | 9E | 40 |
| 00000750 | A3 | 6A | 9E | 8B | 1E | 6A | 9E | D1 | E3 | D1 | E3 | 81 | C3 | 62 | 94 | 8B |
| 00000760 | D3 | BB | A0 | 9F | CD | 3F | 61 | A1 | 6A | 9E | A3 | 6C | 9E | CD | 3F | BC |
| 00000770 | BB | B0 | 9F | CD | 3F | 6E | CD | 3E | 79 | A1 | 6A | 9E | 40 | A3 | 6A | 9E |
| 00000780 | 8B | 1E | 6A | 9E | D1 | E3 | D1 | E3 | 81 | C3 | 62 | 94 | 8B | D3 | BB | C0 |
| 00000790 | 9F | CD | 3F | 61 | A1 | 6A | 9E | A3 | 6E | 9E | B8 | 13 | 00 | F7 | 2E | 60 |
| 000007A0 | 9E | 05 | 14 | 00 | 3B | 06 | 2C | 9E | 7C | 03 | E9 | 2D | 00 | CD | 3F | BC |
| 000007B0 | BB | D0 | 9F | CD | 3F | 6E | CD | 3E | 79 | A1 | 6A | 9E | 40 | A3 | 6A | 9E |
| 000007C0 | A1 | 6A | 9E | A3 | 66 | 9E | 8B | 1E | 6A | 9E | D1 | E3 | D1 | E3 | 81 | C3 |
| 000007D0 | 62 | 94 | 8B | D3 | BB | DE | 9F | CD | 3F | 61 | 83 | 3E | 60 | 9E | 00 | 7F |
| 000007E0 | 03 | E9 | 2D | 00 | CD | 3F | BC | BB | EC | 9F | CD | 3F | 6E | CD | 3E | 79 |
| 000007F0 | A1 | 6A | 9E | 40 | A3 | 6A | 9E | A1 | 6A | 9E | A3 | 68 | 9E | 8B | 1E | 6A |
| 00000800 | 9E | D1 | E3 | D1 | E3 | 81 | C3 | 62 | 94 | 8B | D3 | BB | FE | 9F | CD | 3F |
| 00000000 | 4D | 5A | B7 | 01 | 14 | 00 | 0C | 00 | 20 | 00 | A6 | 0A | FF | FF | E1 | 0C |
| 00000010 | 00 | 02 | FE | 1E | 30 | 00 | 00 | 00 | 1E | 00 | 00 | 00 | 01 | 00 | 12 | 00 |
| 00000020 | 00 | 00 | 14 | 00 | 00 | 00 | 16 | 00 | 00 | 00 | 33 | 00 | 00 | 00 | 38 | 00 |
| 00000030 | 00 | 00 | 86 | 00 | 85 | 01 | 1B | 00 | 26 | 02 | 01 | 02 | 26 | 02 | 06 | 02 |
| 00000040 | 26 | 02 | 11 | 02 | 26 | 02 | 32 | 02 | 26 | 02 | 3D | 02 | 26 | 02 | 00 | 00 |
| 00000050 | 00 | 00 | 00 | 00 | 00 | 00 | 00 | 00 | 00 | 00 | 00 | 00 | 00 | 00 | 00 | 00 |
| 00000060 | 00 | 00 | 00 | 00 | 00 | 00 | 00 | 00 | 00 | 00 | 00 | 00 | 00 | 00 | 00 | 00 |
| 00000070 | 00 | 00 | 00 | 00 | 00 | 00 | 00 | 00 | 00 | 00 | 00 | 00 | 00 | 00 | 00 | 00 |
| 00000080 | 00 | 00 | 00 | 00 | 00 | 00 | 00 | 00 | 00 | 00 | 00 | 00 | 00 | 00 | 00 | 00 |
| 00000090 | 00 | 00 | 00 | 00 | 00 | 00 | 00 | 00 | 00 | 00 | 00 | 00 | 00 | 00 | 00 | 00 |
| 000000A0 | 00 | 00 | 00 | 00 | 00 | 00 | 00 | 00 | 00 | 00 | 00 | 00 | 00 | 00 | 00 | 00 |
| 000000B0 | 00 | 00 | 00 | 00 | 00 | 00 | 00 | 00 | 00 | 00 | 00 | 00 | 00 | 00 | 00 | 00 |
| 000000C0 | 00 | 00 | 00 | 00 | 00 | 00 | 00 | 00 | 00 | 00 | 00 | 00 | 00 | 00 | 00 | 00 |
| 000000D0 | 00 | 00 | 00 | 00 | 00 | 00 | 00 | 00 | 00 | 00 | 00 | 00 | 00 | 00 | 00 | 00 |
| 000000E0 | 00 | 00 | 00 | 00 | 00 | 00 | 00 | 00 | 00 | 00 | 00 | 00 | 00 | 00 | 00 | 00 |
| 000000F0 | 00 | 00 | 00 | 00 | 00 | 00 | 00 | 00 | 00 | 00 | 00 | 00 | 00 | 00 | 00 | 00 |
| 00000100 | 00 | 00 | 00 | 00 | 00 | 00 | 00 | 00 | 00 | 00 | 00 | 00 | 00 | 00 | 00 | 00 |
| 00000110 | 00 | 00 | 00 | 00 | 00 | 00 | 00 | 00 | 00 | 00 | 00 | 00 | 00 | 00 | 00 | 00 |
| 00000120 | 00 | 00 | 00 | 00 | 00 | 00 | 00 | 00 | 00 | 00 | 00 | 00 | 00 | 00 | 00 | 00 |
| 00000130 | 00 | 00 | 00 | 00 | 00 | 00 | 00 | 00 | 00 | 00 | 00 | 00 | 00 | 00 | 00 | 00 |
| 00000140 | 00 | 00 | 00 | 00 | 00 | 00 | 00 | 00 | 00 | 00 | 00 | 00 | 00 | 00 | 00 | 00 |
| 00000150 | 00 | 00 | 00 | 00 | 00 | 00 | 00 | 00 | 00 | 00 | 00 | 00 | 00 | 00 | 00 | 00 |
| 00000160 | 00 | 00 | 00 | 00 | 00 | 00 | 00 | 00 | 00 | 00 | 00 | 00 | 00 | 00 | 00 | 00 |
| 00000170 | 00 | 00 | 00 | 00 | 00 | 00 | 00 | 00 | 00 | 00 | 00 | 00 | 00 | 00 | 00 | 00 |
| 00000180 | 00 | 00 | 00 | 00 | 00 | 00 | 00 | 00 | 00 | 00 | 00 | 00 | 00 | 00 | 00 | 00 |
| 00000190 | 00 | 00 | 00 | 00 | 00 | 00 | 00 | 00 | 00 | 00 | 00 | 00 | 00 | 00 | 00 | 00 |
| 000001A0 | 00 | 00 | 00 | 00 | 00 | 00 | 00 | 00 | 00 | 00 | 00 | 00 | 00 | 00 | 00 | 00 |
| 000001B0 | 00 | 00 | 00 | 00 | 00 | 00 | 00 | 00 | 00 | 00 | 00 | 00 | 00 | 00 | 00 | 00 |
| 000001C0 | 00 | 00 | 00 | 00 | 00 | 00 | 00 | 00 | 00 | 00 | 00 | 00 | 00 | 00 | 00 | 00 |
| 000001D0 | 00 | 00 | 00 | 00 | 00 | 00 | 00 | 00 | 00 | 00 | 00 | 00 | 00 | 00 | 00 | 00 |
| 000001E0 | 00 | 00 | 00 | 00 | 00 | 00 | 00 | 00 | 00 | 00 | 00 | 00 | 00 | 00 | 00 | 00 |
| 000001F0 | 00 | 00 | 00 | 00 | 00 | 00 | 00 | 00 | 00 | 00 | 00 | 00 | 00 | 00 | 00 | 00 |
| 00000200 | 62 | 6D | 54 | 52 | 49 | 41 | 4C | 20 | 20 | 20 | 00 | 00 | 32 | A3 | 40 | 14 |
| 00000210 | D2 | 9E | 8F | 01 | 26 | 02 | 5C | 02 | 40 | 14 | 00 | 00 | 40 | 14 | 40 | 14 |
| 00000220 | E0 | 9E | 06 | 00 | 00 | 00 | 00 | 00 | 00 | 00 | 00 | 00 | FF | FF | 80 | 00 |
| 00000230 | 9A | 00 | 00 | 26 | 02 | 9A | 77 | 00 | 85 | 01 | BB | FF | FF | CD | 3E | 32 |
| 00000240 | CD | 3F | BC | BB | E0 | 9E | CD | 3F | 6E | CD | 3E | 79 | 33 | DB | CD | 3E |
| 00000250 | 3C | BB | F2 | 9E | BA | EE | 9D | CD | 3F | 61 | BB | F8 | 9E | BA | F2 | 9D |
| 00000260 | CD | 3F | 61 | BB | FE | 9E | BA | F6 | 9D | CD | 3F | 61 | BB | 08 | 9F | BA |
| 00000270 | FA | 9D | CD | 3F | 61 | BB | 0D | 00 | CD | 3D | 05 | BA | FE | 9D | CD | 3F |
| 00000280 | 61 | BB | 11 | 00 | CD | 3D | 05 | 8B | D3 | BB | C4 | 00 | CD | 3D | 05 | 92 |
| 00000290 | CD | 3F | 55 | 8B | D3 | BB | D9 | 00 | CD | 3D | 05 | 92 | CD | 3F | 55 | BA |
| 000002A0 | 02 | 9E | CD | 3F | 61 | CD | 3E | 22 | C7 | 06 | 06 | 9E | 20 | 00 | C7 | 06 |
| 000002B0 | 08 | 9E | 05 | 00 | BB | 16 | 9F | BA | 0A | 9E | CD | 3F | 61 | BB | 1C | 9F |
| 000002C0 | BA | 0E | 9E | CD | 3F | 61 | BB | 20 | 00 | 8B | D3 | CD | 3D | 0E | BA | 12 |
| 000002D0 | 9E | CD | 3F | 61 | BB | 22 | 9F | CD | 3E | 1F | BB | 01 | 00 | BA | 28 | 9F |
| 000002E0 | B9 | 30 | 00 | CD | 3E | 1E | BB | 01 | 00 | CD | 3F | B3 | BB | 16 | 9E | BA |
| 000002F0 | 02 | 00 | CD | 3F | B4 | BB | 1A | 9E | CD | 3F | B4 | BB | 1E | 9E | BA | 08 |
| 00000300 | 00 | CD | 3F | B4 | BB | 22 | 9E | BA | 1E | 00 | CD | 3F | B4 | BB | 26 | 9E |
| 00000310 | BA | 03 | 00 | CD | 3F | B4 | BB | 02 | 00 | CD | 3E | 21 | BB | 22 | 9F | CD |
| 00000320 | 3E | 1F | BB | 02 | 00 | BA | 36 | 9F | B9 | 40 | 01 | CD | 3E | 1E | 33 | C0 |
| 00000330 | E9 | 7D | 00 | 33 | C0 | E9 | 6A | 00 | BB | 02 | 00 | CD | 3F | B3 | B8 | 0A |
| 00000340 | 00 | F7 | 2E | 2A | 9E | 8B | 1E | 2C | 9E | 8B | D3 | D1 | E3 | 03 | D8 | CD |
| 00000350 | 3F | 57 | BF | 44 | 9F | CD | 3F | 91 | BB | 1A | 00 | CD | 3F | 71 | 80 | CD |
| 00000360 | 3D | 03 | CD | 3F | 77 | 87 | D3 | 8B | CB | BB | 2E | 9E | CD | 3F | B4 | BB |
| 00000370 | D2 | 9E | CD | 3D | 03 | CD | 3F | 77 | 8B | D3 | BB | 32 | 9E | CD | 3F | B4 |
| 00000380 | D1 | E1 | D1 | E1 | D1 | E1 | D1 | E1 | D1 | E1 | 03 | 0E | 2A | 9E | D1 | E1 |
| 00000390 | D1 | E1 | 81 | C1 | 66 | 99 | 8B | D9 | BA | 02 | 00 | CD | 3F | B4 | A1 | 2C |
| 000003A0 | 9E | 40 | A3 | 2C | 9E | 83 | 3E | 2C | 9E | 04 | 7E | 8C | A1 | 2A | 9E | 40 |

```
000003B0  A3 2A 9E 83 3E 2A 9E 1F  7F 03 E9 76 FF BB 03 00
000003C0  CD 3E 21 BB 22 9F CD 3E  1F BB 03 00 BA 48 9F B9
000003D0  00 01 CD 3E 1E BB 03 00  CD 3F B3 BB 36 9E BA 02
000003E0  00 CD 3F B4 BB 3A 9E CD  3F B4 BB 3E 9E 8B CA BA
00004A10  A1 C6 13 8B 1E C4 13 8E  C0 26 80 7F 03 05 75 5F
00004A20  26 80 7F 04 06 75 58 26  80 7F 05 00 72 51 5B 1E
00004A30  07 8E DD B9 D8 09 33 F6  8B FE FC F3 A5 06 1F 1E
00004A40  B8 75 03 8E D8 B9 64 04  2B C8 D1 E1 D1 E1 D1 E1
00004A50  B8 D7 0B 8E C0 33 F6 33  FF F3 A5 1F 8C D1 8C D8
00004A60  2B C8 81 F9 00 10 76 03  B9 00 10 D1 E1 D1 E1 D1
00004A70  E1 BA 75 03 8E C2 33 F6  8B FE EA 10 00 6B 03 5B
00004A80  BA BC 02 EB 12 BA E0 02  EB 0D BA A6 02 EB 08 BA
00004A90  86 02 EB 03 BA 61 02 0E  1F B4 09 CD 21 33 C0 50
00004AA0  CB 0D 0A 4D 75 73 74 20  72 75 6E 20 75 6E 64 65
00004AB0  72 20 44 4F 53 20 32 2E  30 30 20 6F 72 20 6C 61
00004AC0  74 65 72 0D 0A 24 0D 0A  4D 75 73 74 20 6C 69 6E
00004AD0  6B 20 77 69 74 68 20 42  41 53 43 4F 4D 32 30 2E
00004AE0  4C 49 42 0D 0A 24 0D 0A  50 72 6F 67 72 61 6D 20
00004AF0  74 6F 6F 20 6C 61 72 67  65 0D 0A 24 0D 0A 57 72
00004B00  6F 6E 67 20 76 65 72 73  69 6F 6E 20 6F 66 20 72
00004B10  75 6E 74 69 6D 65 20 6D  6F 64 75 6C 65 0D 0A 24
00004B20  0D 0A 45 72 72 6F 72 20  69 6E 20 45 58 45 20 66
00004B30  69 6C 65 0D 0A 24 0D 0A  43 61 6E 6E 6F 74 20 66
00004B40  69 6E 64 20 0D 0A 24 0D  0A 43 61 6E 6E 6F 74 20
00004B50  66 69 6E 64 20 42 41 53  52 55 4E 32 30 2E 45 58
00004B60  45 0D 0A 45 6E 74 65 72  20 6E 65 77 20 70 61 74
00004B70  68 20 73 70 65 63 69 66  69 63 61 74 69 6F 6E 3A
00004B80  20 24 0D 0A 24 42 41 53  52 55 4E 32 30 2E 45 58
00004B90  45 00 50 41 54 48 3D
000045F0  35 2C 39 2C 32 2C 35 2C  37 2C 33 2C 35 2C 35 2C
00004600  34 2C 35 2C 33 2C 35 2C  35 2C 31 2C 36 2C 35 2C
00004610  31 39 2C 37 2C 35 2C 31  37 2C 38 2C 35 2C 31 35
00004620  2C 39 2C 35 2C 31 33 2C  31 30 2C 35 2C 31 31 2C
00004630  2D 31 2C 2D 31 2C 2D 31  00 85 36 20 31 2C 35 2C
00004640  31 30 2C 32 2C 35 2C 38  2C 33 2C 35 2C 36 2C 34
00004650  2C 35 2C 34 2C 35 2C 35  2C 32 2C 36 2C 35 2C 32
00004660  30 2C 37 2C 35 2C 31 38  2C 38 2C 35 2C 31 36 2C
00004670  39 2C 35 2C 31 34 2C 31  30 2C 35 2C 31 32 2C 2D
00004680  31 2C 2D 31 2C 2D 31 00  86 36 20 32 2C 31 2C 36
00004690  2C 34 2C 32 2C 36 2C 36  2C 33 2C 36 2C 2D 31 2C
000046A0  2D 31 2C 2D 31 00 87 36  20 31 2C 31 2C 38 2C 33
000046B0  2C 33 2C 38 2C 2D 31 2C  2D 31 2C 2D 31 00 88 36
000046C0  20 31 2C 31 2C 31 30 2C  32 2C 31 2C 39 2C 35 2C
000046D0  33 2C 31 30 2C 36 2C 33  2C 39 2C 2D 31 2C 2D 31
000046E0  2C 2D 31 00 89 36 20 2D  31 2C 2D 31 2C 2D 31 00
000046F0  8A 36 20 2D 31 2C 2D 31  2C 2D 31 00 8B 36 20 31
00004700  2C 33 2C 39 2C 32 2C 33  2C 31 30 2C 33 2C 33 2C
00004710  31 31 2C 34 2C 33 2C 31  32 2C 35 2C 33 2C 31 33
00004720  2C 2D 31 2C 2D 31 2C 2D  31 00 8C 36 20 31 2C 33
00004730  2C 31 2C 32 2C 33 2C 32  2C 33 2C 33 2C 33 2C 2D
00004740  31 2C 2D 31 2C 2D 31 00  8D 36 20 31 2C 31 2C 31
00004750  2C 32 2C 32 2C 31 2C 2D  31 2C 2D 31 2C 2D 31 00
00004760  8E 36 20 31 2C 32 2C 32  2C 2D 31 2C 2D 31 2C 2D
00004770  31 00 8F 36 20 2D 31 2C  2D 31 2C 2D 31 00 90 36
00004780  20 31 2C 32 2C 38 2C 32  2C 32 2C 39 2C 33 2C 32
00004790  2C 31 30 2C 34 2C 32 2C  31 31 2C 35 2C 32 2C 31
000047A0  32 2C 2D 31 2C 2D 31 2C  2D 31 00 91 36 20 31 2C
000047B0  32 2C 32 2C 2D 31 2C 2D  31 2C 2D 31 00 92 36 20
000047C0  31 2C 32 2C 31 2C 2D 31  2C 2D 31 2C 2D 31 00 93
000047D0  36 20 31 2C 33 2C 31 2C  32 2C 33 2C 32 2C 2D 31
000047E0  2C 2D 31 2C 2D 31 00 94  36 20 2D 31 2C 2D 31 2C
000047F0  2D 31 00 A4 36 20 4A 61  6E 2E 2C 46 65 62 2E 2C
00004800  4D 61 72 63 68 2C 41 70  72 69 6C 2C 4D 61 79 2C
00004810  4A 75 6E 65 2C 4A 75 6C  79 2C 41 75 67 2E 2C 53
00004820  65 70 74 2E 2C 4F 63 74  2E 2C 4E 6F 76 2E 2C 44
00004830  65 63 2E 00 FF FF 01 00  00 00 00 00 00 00 00 00
00004840  59 1F A0 01 00 1E 51 06  3C 6D 74 03 E9 40 02 B4
00004850  30 CD 21 3C 02 73 03 E9  3A 02 BA 9A 04 8E DA 26
00004860  8B 3E 02 00 26 8B 2E 2C  00 8E C2 57 B0 00 BA 45
00004870  03 1E 0E 1F B4 3D CD 21  1F 72 03 E9 D8 00 8E C5
00004880  33 FF B9 05 00 BE 52 03  1E 0E 1F F3 A6 1F 74 13
00004890  26 8A 05 47 0A C0 75 F8  26 80 3D 00 75 E4 1E 07
000048A0  EB 57 90 1E 07 1E 8E DD  8B F7 81 3C 00 20 1F 74
000048B0  48 BF CA 13 8B D7 1E 8E  DD AC 3C 3B 74 07 3C 00
000048C0  74 03 AA EB F4 1F 8B D8  81 FF CA 13 74 0F 80 7D
```

```
000048D0  FF 3A 74 09 80 7D FF 5C  74 03 B0 5C AA 56 BE 45
000048E0  03 B9 0D 00 90 1E 0E 1F  F3 A4 1F 5E B0 00 B4 3D
000048F0  CD 21 73 62 80 FB 3B 74  B8 1E 0E 1F BA 07 03 B4
00004900  09 CD 21 1F C6 06 CA 13  40 BA CA 13 B4 0A CD 21
00004910  1E 0E 1F BA 04 03 B4 09  CD 21 1F B7 00 8A 1E CB
00004920  13 80 BF CB 13 3A 74 0D  80 BF CB 13 5C 74 06 C6
00004930  87 CC 13 5C 43 BA CC 13  8D BF CC 13 BE 45 03 B9
00004940  0D 00 90 1E 0E 1F F3 A4  1F B0 00 B4 3D CD 21 73
00004950  05 EB A6 E9 2F 01 5F 8B  D8 BA B0 13 B9 1A 00 B4
00004960  3F CD 21 72 EE 81 3E B0  13 4D 5A 75 E6 8B 16 B8
00004970  13 83 C2 1F 81 E2 E0 FF  8B EA B1 04 D3 E2 33 C9
00004980  B0 00 B4 42 CD 21 72 CB  8B 16 B4 13 4A B1 05 D3
00004990  E2 2B D5 A1 B2 13 05 0F  00 B1 04 D3 E8 03 D0 89
000049A0  16 B4 13 2B FA 83 EF 14  8C D6 8B D4 83 C2 11 B1
000049B0  04 D3 EA 03 F2 3B FE 73  03 E9 CE 00 8B EF 1E 8E
000049C0  DF B9 FF FF 33 D2 B4 3F  CD 21 1F 72 86 8B 16 C8
000049D0  13 41 B0 00 B4 42 CD 21  72 12 3B 0E B6 13 74 23
000049E0  BA B0 13 B9 04 00 B4 3F  CD 21 73 03 E9 96 00 8B
000049F0  3E B0 13 A1 B2 13 03 C5  8E C0 26 01 2D FF 0E B6
00004A00  13 75 E3 B4 3E CD 21 73  03 EB 7A 90 01 2E C6 13
000041D0  52 7C 2D 2D 2D 2D 2D 2D  2D 20 20 53 75 70 65 72
000041E0  63 65 6C 6C 20 23 20 20  2D 2D 2D 2D 2D 2D 2D 00
000041F0  14 00 74 7C 50 61 72 74  20 23 20 20 20 44 65 73
00004200  63 72 69 70 74 69 6F 6E  15 00 8C 7C 4E 65 65 64
00004210  65 64 20 53 74 61 74 69  6F 6E 20 20 20 20 20 20
00004220  20 00 04 00 A6 7C 20 20  20 20 08 00 AE 7C 20 43
00004230  65 6C 6C 20 23 20 0F 00  BA 7C 50 41 52 54 20 20
00004240  20 20 4E 45 45 44 20 57  43 00 07 00 CE 7C 20 20
00004250  20 20 20 20 20 00 06 00  DA 7C 20 20 20 20 20 20
00004260  06 00 E4 7C 20 2D 2D 2D  2D 2D 10 00 EE 7C 4D 41
00004270  58 20 4B 49 54 53 20 20  20 20 20 20 20 20 0A 00
00004280  02 7D 4D 41 58 20 4B 49  54 53 3D 20 22 00 10 7D
00004290  44 4F 20 59 4F 55 20 57  49 53 48 20 41 20 50 52
000042A0  49 4E 54 4F 55 54 20 4F  46 20 54 48 49 53 20 4B
000042B0  49 54 27 00 36 7D 44 4F  20 59 4F 55 20 57 49 53
000042C0  48 20 54 4F 20 50 52 49  4E 54 20 41 4E 4F 54 48
000042D0  45 52 20 4B 49 54 20 52  45 50 4F 52 54 00 09 00
000042E0  62 7D 2D 20 59 20 6F 72  20 4E 20 00 01 00 70 7D
000042F0  79 00 01 00 76 7D 6E 00  04 00 7C 7D 4D 41 49 4E
00004300  72 36 20 31 2C 31 30 2C  34 2C 31 2C 39 2C 34 2C
00004310  31 2C 36 2C 34 2C 31 2C  36 2C 34 2C 31 2C 34 2C
00004320  34 2C 31 2C 33 2C 33 2C  31 2C 33 2C 33 2C 31 2C
00004330  31 35 2C 35 2C 31 2C 31  32 2C 34 2C 31 2C 31 32
00004340  2C 34 2C 31 2C 36 2C 34  00 73 36 20 31 2C 31 32
00004350  2C 34 2C 31 2C 36 2C 34  2C 31 2C 36 2C 33 2C 31
00004360  2C 32 30 2C 35 2C 31 2C  31 32 2C 34 2C 31 2C 31
00004370  32 2C 34 2C 31 2C 36 2C  34 2C 31 2C 36 2C 34 2C
00004380  31 2C 36 2C 34 2C 31 2C  36 2C 33 2C 31 2C 32 30
00004390  2C 35 00 74 36 20 31 2C  37 2C 34 2C 31 2C 34 2C
000043A0  34 2C 31 2C 33 2C 34 2C  31 2C 33 2C 34 2C 31 2C
000043B0  32 30 2C 34 2C 31 2C 37  2C 34 2C 31 2C 32 2C 34
000043C0  2C 31 2C 32 2C 34 2C 31  2C 37 2C 34 2C 31 2C 32
000043D0  30 2C 34 00 75 36 20 31  2C 35 2C 39 2C 32 2C 35
000043E0  2C 37 2C 33 2C 35 2C 35  2C 34 2C 35 2C 33 2C 35
000043F0  2C 35 2C 31 2C 2D 31 2C  2D 31 2C 2D 31 00 76 36
00004400  20 31 2C 35 2C 31 30 2C  32 2C 35 2C 38 2C 33 2C
00004410  35 2C 36 2C 34 2C 35 2C  34 2C 35 2C 35 2C 32 2C
00004420  2D 31 2C 2D 31 2C 2D 31  00 77 36 20 31 2C 31 2C
00004430  37 2C 32 2C 31 2C 36 2C  35 2C 33 2C 37 2C 36 2C
00004440  33 2C 36 2C 2D 31 2C 2D  31 2C 2D 31 00 78 36 20
00004450  31 2C 31 2C 39 2C 32 2C  31 2C 38 2C 34 2C 33 2C
00004460  39 2C 2D 31 2C 2D 31 2C  2D 31 00 79 36 20 31 2C
00004470  31 2C 31 30 2C 34 2C 33  2C 31 30 2C 2D 31 2C 2D
00004480  31 2C 2D 31 00 7A 36 20  2D 31 2C 2D 31 2C 2D 31
00004490  00 7B 36 20 2D 31 2C 2D  31 2C 2D 31 00 7C 36 20
000044A0  2D 31 2C 2D 31 2C 2D 31  00 7D 36 20 31 ?C 35 2C
000044B0  31 30 2C 32 2C 35 2C 38  2C 33 2C 35 2C 36 2C 34
000044C0  2C 35 2C 34 2C 35 2C 35  2C 32 2C 36 2C 35 2C 32
000044D0  30 2C 37 2C 35 2C 31 38  2C 38 2C 35 2C 31 36 2C
000044E0  39 2C 35 2C 31 34 2C 31  30 2C 35 2C 31 32 2C 2D
000044F0  31 2C 2D 31 2C 2D 31 00  7E 36 20 31 2C 35 2C 39
00004500  2C 32 2C 35 2C 37 2C 33  2C 35 2C 35 2C 34 2C 35
00004510  2C 33 2C 35 2C 35 2C 31  2C 36 2C 35 2C 31 39 2C
00004520  37 2C 35 2C 31 37 2C 38  2C 35 2C 31 35 2C 39 2C
00004530  35 2C 31 33 2C 31 30 2C  35 2C 31 31 2C 2D 31 2C
```

| | | | | | | | | | | | | | | | | |
|---|---|---|---|---|---|---|---|---|---|---|---|---|---|---|---|---|
| 00004540 | 2D | 31 | 2C | 2D | 31 | 00 | 7F | 36 | 20 | 31 | 2C | 31 | 2C | 31 | 35 | 2C |
| 00004550 | 32 | 2C | 31 | 2C | 31 | 34 | 2C | 33 | 2C | 32 | 2C | 31 | 35 | 2C | 34 | 2C |
| 00004560 | 32 | 2C | 31 | 34 | 2C | 35 | 2C | 33 | 2C | 31 | 35 | 2C | 36 | 2C | 33 | 2C |
| 00004570 | 31 | 34 | 2C | 2D | 31 | 2C | 2D | 31 | 2C | 2D | 31 | 00 | 80 | 36 | 20 | 31 |
| 00004580 | 2C | 31 | 2C | 31 | 33 | 2C | 32 | 2C | 31 | 2C | 31 | 32 | 2C | 33 | 2C | 32 |
| 00004590 | 2C | 31 | 33 | 2C | 34 | 2C | 32 | 2C | 31 | 32 | 2C | 35 | 2C | 33 | 2C | 31 |
| 000045A0 | 33 | 2C | 36 | 2C | 33 | 2C | 31 | 32 | 2C | 2D | 31 | 2C | 2D | 31 | 2C | 2D |
| 000045B0 | 31 | 00 | 81 | 36 | 20 | 31 | 2C | 31 | 2C | 31 | 31 | 2C | 32 | 2C | 32 | 2C |
| 000045C0 | 31 | 31 | 2C | 33 | 2C | 33 | 2C | 31 | 31 | 2C | 2D | 31 | 2C | 2D | 31 | 2C |
| 000045D0 | 2D | 31 | 00 | 82 | 36 | 20 | 2D | 31 | 2C | 2D | 31 | 2C | 2D | 31 | 00 | 83 |
| 000045E0 | 36 | 20 | 2D | 31 | 2C | 2D | 31 | 2C | 2D | 31 | 00 | 84 | 36 | 20 | 31 | 2C |
| 00003DB0 | 4C | 4F | 57 | 20 | 53 | 54 | 4F | 43 | 4B | 20 | 52 | 45 | 50 | 4F | 52 | 54 |
| 00003DC0 | 03 | 00 | 44 | 78 | 20 | 2D | 20 | 00 | 07 | 00 | 4C | 78 | 20 | 50 | 61 | 72 |
| 00003DD0 | 74 | 20 | 23 | 0C | 34 | 00 | 58 | 78 | 43 | 65 | 6C | 6C | 20 | 20 | 52 | 6F |
| 00003DE0 | 77 | 20 | 20 | 43 | 6F | 6C | 2E | 20 | 20 | 20 | 20 | 20 | 57 | 43 | 20 | 20 |
| 00003DF0 | 53 | 4C | 20 | 20 | 54 | 6F | 20 | 53 | 74 | 6F | 63 | 6B | 20 | 20 | 20 | 20 |
| 00003E00 | 20 | 20 | 4C | 6F | 77 | 20 | 20 | 54 | 6F | 74 | 61 | 6C | 15 | 00 | 90 | 78 |
| 00003E10 | 50 | 41 | 52 | 54 | 20 | 49 | 4E | 56 | 45 | 4E | 54 | 4F | 52 | 59 | 20 | 52 |
| 00003E20 | 45 | 50 | 4F | 52 | 54 | 00 | 18 | 00 | AA | 78 | 20 | 50 | 61 | 72 | 74 | 20 |
| 00003E30 | 23 | 20 | 20 | 20 | 20 | 20 | 20 | 44 | 65 | 73 | 63 | 72 | 69 | 70 | 74 | 69 |
| 00003E40 | 6F | 6E | 34 | 00 | C6 | 78 | 43 | 65 | 6C | 6C | 20 | 20 | 52 | 6F | 77 | 20 |
| 00003E50 | 20 | 43 | 6F | 6C | 2E | 20 | 20 | 20 | 20 | 57 | 43 | 20 | 20 | 53 | 4C | 20 |
| 00003E60 | 20 | 20 | 54 | 6F | 20 | 53 | 74 | 6F | 63 | 6B | 20 | 20 | 20 | 20 | 20 | 20 |
| 00003E70 | 4C | 6F | 77 | 20 | 20 | 54 | 6F | 74 | 61 | 6C | 01 | 00 | FE | 78 | 2A | 00 |
| 00003E80 | 0E | 00 | 04 | 79 | 20 | 2D | 20 | 53 | 55 | 42 | 41 | 53 | 53 | 45 | 4D | 42 |
| 00003E90 | 4C | 45 | 11 | 00 | 16 | 79 | 20 | 2A | 2A | 2A | 4E | 45 | 45 | 44 | 20 | 53 |
| 00003EA0 | 54 | 4F | 43 | 4B | 2A | 2A | 2A | 00 | 18 | 00 | 2C | 79 | 45 | 4E | 44 | 20 |
| 00003EB0 | 4F | 46 | 20 | 52 | 45 | 50 | 4F | 52 | 54 | 20 | 2D | 20 | 43 | 4F | 4E | 54 |
| 00003EC0 | 49 | 4E | 55 | 45 | 23 | 00 | 48 | 79 | 44 | 6F | 20 | 79 | 6F | 75 | 20 | 77 |
| 00003ED0 | 69 | 73 | 68 | 20 | 74 | 6F | 20 | 70 | 72 | 69 | 6E | 74 | 6F | 75 | 74 | 20 |
| 00003EE0 | 74 | 68 | 69 | 73 | 20 | 72 | 65 | 70 | 6F | 72 | 74 | 00 | 0F | 00 | 70 | 79 |
| 00003EF0 | 50 | 52 | 49 | 4E | 54 | 49 | 4E | 47 | 20 | 52 | 45 | 50 | 4F | 52 | 54 | 00 |
| 00003F00 | 24 | 00 | 84 | 79 | 44 | 6F | 20 | 79 | 6F | 75 | 20 | 77 | 69 | 73 | 68 | 20 |
| 00003F10 | 74 | 6F | 20 | 73 | 65 | 65 | 20 | 61 | 6E | 6F | 74 | 68 | 65 | 72 | 20 | 73 |
| 00003F20 | 75 | 70 | 65 | 72 | 63 | 65 | 6C | 6C | 0D | 00 | AC | 79 | 4F | 6E | 6C | 79 |
| 00003F30 | 20 | 4F | 6E | 65 | 20 | 43 | 65 | 6C | 6C | 00 | 07 | 00 | BE | 79 | 43 | 65 |
| 00003F40 | 6C | 6C | 20 | 23 | 3D | 00 | 2A | 00 | CA | 79 | 50 | 52 | 49 | 4E | 54 | 49 |
| 00003F50 | 4E | 47 | 20 | 43 | 45 | 4C | 4C | 20 | 41 | 53 | 53 | 49 | 47 | 4E | 4D | 45 |
| 00003F60 | 4E | 54 | 20 | 52 | 45 | 50 | 4F | 52 | 54 | 20 | 46 | 4F | 52 | 20 | 43 | 45 |
| 00003F70 | 4C | 4C | 20 | 23 | 15 | 00 | F8 | 79 | 20 | 20 | 20 | 20 | 20 | 20 | 20 | 20 |
| 00003F80 | 20 | 20 | 20 | 20 | 20 | 20 | 20 | 43 | 45 | 4C | 4C | 20 | 23 | 00 | 3F | 00 |
| 00003F90 | 12 | 7A | 20 | 43 | 65 | 6C | 6C | 20 | 20 | 52 | 6F | 77 | 20 | 20 | 43 | 6F |
| 00003FA0 | 6C | 2E | 20 | 20 | 20 | 57 | 43 | 20 | 20 | 53 | 4C | 20 | 20 | 20 | 20 | 20 |
| 00003FB0 | 20 | 4C | 6F | 77 | 20 | 20 | 54 | 6F | 74 | 61 | 6C | 20 | 20 | 20 | 50 | 61 |
| 00003FC0 | 72 | 74 | 20 | 23 | 20 | 20 | 20 | 4E | 65 | 65 | 64 | 20 | 53 | 74 | 6F | 63 |
| 00003FD0 | 6B | 00 | 05 | 00 | 56 | 7A | 20 | 20 | 20 | 20 | 20 | 00 | 13 | 00 | 60 | 7A |
| 00003FE0 | 20 | 20 | 20 | 20 | 20 | 20 | 2A | 2A | 2A | 20 | 45 | 4D | 50 | 54 | 59 | 20 |
| 00003FF0 | 2A | 2A | 2A | 00 | 15 | 00 | 78 | 7A | 43 | 4F | 4E | 54 | 49 | 4E | 55 | 45 |
| 00004000 | 20 | 54 | 4F | 20 | 4E | 45 | 58 | 54 | 20 | 43 | 45 | 4C | 4C | 00 | 20 | 00 |
| 00004010 | 92 | 7A | 44 | 4F | 20 | 59 | 4F | 55 | 20 | 57 | 49 | 53 | 48 | 20 | 54 | 4F |
| 00004020 | 20 | 50 | 52 | 49 | 4E | 54 | 20 | 54 | 48 | 49 | 53 | 20 | 52 | 45 | 50 | 4F |
| 00004030 | 52 | 54 | 29 | 00 | B6 | 7A | 44 | 4F | 20 | 59 | 4F | 55 | 20 | 57 | 49 | 53 |
| 00004040 | 48 | 20 | 54 | 4F | 20 | 50 | 52 | 49 | 4E | 54 | 2F | 45 | 58 | 41 | 4D | 49 |
| 00004050 | 4E | 45 | 20 | 41 | 4E | 4F | 54 | 48 | 45 | 52 | 20 | 43 | 45 | 4C | 4C | 00 |
| 00004060 | 01 | 00 | E4 | 7A | 5E | 5D | 03 | 00 | EA | 7A | 20 | 5E | 20 | 00 | 06 | 00 |
| 00004070 | F2 | 7A | 4B | 69 | 74 | 20 | 23 | 20 | 08 | 00 | FC | 7A | 20 | 45 | 6E | 67 |
| 00004080 | 2E | 43 | 68 | 20 | 0A | 00 | 08 | 7B | 20 | 4E | 45 | 58 | 54 | 20 | 50 | 41 |
| 00004090 | 47 | 45 | 0E | 00 | 16 | 7B | 20 | 50 | 52 | 45 | 56 | 49 | 4F | 55 | 53 | 20 |
| 000040A0 | 50 | 41 | 47 | 45 | 05 | 00 | 28 | 7B | 4D | 6F | 76 | 65 | 20 | 00 | 05 | 00 |
| 000040B0 | 32 | 7B | 20 | 3D | 20 | 55 | 70 | 00 | 07 | 00 | 3C | 7B | 20 | 3D | 20 | 44 |
| 000040C0 | 6F | 77 | 6E | 00 | 09 | 00 | 48 | 7B | 20 | 3D | 20 | 53 | 65 | 6C | 65 | 63 |
| 000040D0 | 74 | 00 | 05 | 00 | 56 | 7B | 20 | 20 | 5E | 20 | 20 | 00 | 1D | 00 | 60 | 7B |
| 000040E0 | 50 | 52 | 49 | 4E | 54 | 49 | 4E | 47 | 20 | 4B | 49 | 54 | 20 | 52 | 45 | 50 |
| 000040F0 | 4F | 52 | 54 | 20 | 46 | 4F | 52 | 20 | 4B | 49 | 54 | 20 | 23 | C7 | 1A | 00 |
| 00004100 | 82 | 7B | 20 | 20 | 2D | 20 | 20 | 45 | 6E | 67 | 69 | 6E | 65 | 65 | 72 | 69 |
| 00004110 | 6E | 67 | 20 | 43 | 68 | 61 | 6E | 67 | 65 | 20 | 23 | 20 | 1D | 00 | A0 | 7B |
| 00004120 | 52 | 65 | 63 | 6F | 6D | 6D | 65 | 6E | 64 | 65 | 64 | 20 | 43 | 65 | 6C | 6C |
| 00004130 | 2F | 53 | 75 | 70 | 65 | 72 | 63 | 65 | 6C | 6C | 20 | 23 | 3D | 00 | 02 | 00 |
| 00004140 | C2 | 7B | 2A | 2A | 17 | 00 | C8 | 7B | 54 | 48 | 49 | 53 | 20 | 49 | 53 | 20 |
| 00004150 | 41 | 20 | 53 | 55 | 50 | 45 | 52 | 43 | 45 | 4C | 4C | 20 | 4B | 49 | 54 | 00 |
| 00004160 | 19 | 00 | E4 | 7B | 54 | 48 | 49 | 53 | 20 | 49 | 53 | 20 | 41 | 20 | 53 | 49 |
| 00004170 | 4E | 47 | 4C | 45 | 20 | 43 | 45 | 4C | 4C | 20 | 4B | 49 | 54 | 00 | 11 | 00 |
| 00004180 | 02 | 7C | 43 | 75 | 72 | 72 | 65 | 6E | 74 | 20 | 48 | 72 | 20 | 78 | 20 | 31 |
| 00004190 | 30 | 30 | 3D | 00 | 12 | 00 | 18 | 7C | 53 | 74 | 61 | 6E | 64 | 61 | 72 | 64 |
| 000041A0 | 20 | 48 | 72 | 20 | 78 | 20 | 31 | 30 | 30 | 3D | 0D | 00 | 2E | 7C | 4D | 61 |
| 000041B0 | 78 | 20 | 23 | 20 | 6F | 66 | 20 | 4B | 69 | 74 | 73 | 00 | 0D | 00 | 40 | 7C |
| 000041C0 | 51 | 75 | 61 | 6E | 74 | 69 | 74 | 79 | 20 | 57 | 6F | 72 | 6B | C4 | 1D | 00 |

| | | | | | | | | | | | | | | | | |
|---|---|---|---|---|---|---|---|---|---|---|---|---|---|---|---|---|
| 00003990 | 23 | 23 | 0B | 00 | 16 | 74 | 23 | 23 | 23 | 2E | 23 | 23 | 23 | 20 | 48 | 72 |
| 000039A0 | 2E | 00 | 01 | 00 | 26 | 74 | 38 | 00 | 01 | 00 | 2C | 74 | 32 | 00 | 01 | 00 |
| 000039B0 | 32 | 74 | 49 | 57 | 0D | 00 | 38 | 74 | 44 | 3A | 50 | 52 | 4F | 47 | 52 | 41 |
| 000039C0 | 4D | 2E | 44 | 41 | 54 | 11 | 01 | 00 | 4A | 74 | 52 | 89 | 09 | 00 | 50 | 74 |
| 000039D0 | 42 | 50 | 41 | 52 | 54 | 2E | 44 | 41 | 54 | 32 | 09 | 00 | 5E | 74 | 57 | 41 |
| 000039E0 | 4C | 4C | 43 | 2E | 44 | 41 | 54 | DE | 00 | 00 | 00 | 80 | 01 | 00 | 70 | 74 |
| 000039F0 | 72 | 0E | 08 | 00 | 76 | 74 | 4B | 49 | 54 | 41 | 2E | 44 | 41 | 54 | 01 | 00 |
| 00003A00 | 82 | 74 | 2D | 00 | 01 | 00 | 88 | 74 | 2C | 00 | 2B | 00 | 8E | 74 | 44 | 6F |
| 00003A10 | 20 | 79 | 6F | 75 | 20 | 77 | 69 | 73 | 68 | 20 | 74 | 6F | 20 | 73 | 65 | 65 |
| 00003A20 | 20 | 74 | 68 | 65 | 20 | 72 | 65 | 70 | 6F | 72 | 74 | 20 | 6F | 6E | 20 | 74 |
| 00003A30 | 68 | 65 | 20 | 73 | 63 | 72 | 65 | 65 | 6E | 00 | 01 | 00 | BE | 74 | 59 | 00 |
| 00003A40 | 24 | 00 | C4 | 74 | 49 | 73 | 20 | 74 | 68 | 65 | 20 | 70 | 72 | 69 | 6E | 74 |
| 00003A50 | 65 | 72 | 20 | 72 | 65 | 61 | 64 | 79 | 20 | 74 | 6F | 20 | 70 | 72 | 69 | 6E |
| 00003A60 | 74 | 20 | 72 | 65 | 70 | 6F | 72 | 74 | 01 | 00 | EC | 74 | 4E | 00 | 22 | 00 |
| 00003A70 | F2 | 74 | 44 | 6F | 20 | 79 | 6F | 75 | 20 | 77 | 69 | 73 | 68 | 20 | 74 | 68 |
| 00003A80 | 65 | 20 | 27 | 44 | 65 | 61 | 64 | 20 | 57 | 6F | 6F | 64 | 27 | 20 | 52 | 65 |
| 00003A90 | 70 | 6F | 72 | 74 | 0C | 00 | 18 | 75 | 53 | 75 | 70 | 65 | 72 | 63 | 65 | 6C |
| 00003AA0 | 6C | 20 | 23 | 20 | 16 | 00 | 28 | 75 | 45 | 4E | 54 | 45 | 52 | 20 | 53 | 55 |
| 00003AB0 | 50 | 45 | 52 | 43 | 45 | 4C | 4C | 20 | 23 | 20 | 31 | 20 | 54 | 4F | 00 | 00 |
| 00003AC0 | 42 | 75 | 0E | 00 | 46 | 75 | 50 | 6C | 65 | 61 | 73 | 65 | 20 | 53 | 74 | 61 |
| 00003AD0 | 6E | 64 | 62 | 79 | 0F | 00 | 58 | 75 | 50 | 72 | 69 | 6E | 74 | 69 | 6E | 67 |
| 00003AE0 | 20 | 52 | 65 | 70 | 6F | 72 | 74 | 00 | 06 | 00 | 6C | 75 | 50 | 61 | 67 | 65 |
| 00003AF0 | 20 | 23 | 06 | 00 | 76 | 75 | 44 | 61 | 74 | 65 | 3A | 20 | 16 | 00 | 80 | 75 |
| 00003B00 | 43 | 45 | 4C | 4C | 20 | 41 | 53 | 53 | 49 | 47 | 4E | 4D | 45 | 4E | 54 | 20 |
| 00003B10 | 52 | 45 | 50 | 4F | 52 | 54 | 0B | 00 | 9A | 75 | 53 | 75 | 70 | 65 | 72 | 63 |
| 00003B20 | 65 | 6C | 6C | 20 | 23 | 00 | 01 | 00 | AA | 75 | 20 | 00 | 29 | 00 | B0 | 75 |
| 00003B30 | 42 | 69 | 6E | 73 | 20 | 6E | 6F | 74 | 20 | 41 | 73 | 73 | 69 | 67 | 6E | 65 |
| 00003B40 | 64 | 20 | 74 | 6F | 20 | 61 | 6E | 79 | 20 | 4B | 69 | 74 | 20 | 20 | 2D | 20 |
| 00003B50 | 53 | 75 | 70 | 65 | 72 | 63 | 65 | 6C | 6C | 00 | 43 | 00 | DE | 75 | 20 | 43 |
| 00003B60 | 65 | 6C | 6C | 20 | 20 | 52 | 6F | 77 | 20 | 20 | 43 | 6F | 6C | 2E | 20 | 20 |
| 00003B70 | 20 | 57 | 43 | 20 | 20 | 53 | 4C | 20 | 20 | 20 | 20 | 20 | 20 | 4C | 6F | 77 |
| 00003B80 | 20 | 20 | 54 | 6F | 74 | 61 | 6C | 20 | 20 | 20 | 50 | 61 | 72 | 74 | 20 | 23 |
| 00003B90 | 20 | 20 | 20 | 20 | 20 | 20 | 44 | 65 | 73 | 63 | 72 | 69 | 70 | 74 | 69 | 6F |
| 00003BA0 | 6E | E9 | 0C | 00 | 26 | 76 | 20 | 20 | 4E | 65 | 65 | 64 | 20 | 53 | 74 | 6F |
| 00003BB0 | 63 | 6B | 10 | 00 | 36 | 76 | 43 | 4F | 4E | 54 | 49 | 4E | 55 | 45 | 20 | 44 |
| 00003BC0 | 49 | 53 | 50 | 4C | 41 | 59 | 1C | 00 | 4A | 76 | 42 | 69 | 6E | 73 | 20 | 6E |
| 00003BD0 | 6F | 74 | 20 | 41 | 73 | 73 | 69 | 67 | 6E | 65 | 64 | 20 | 74 | 6F | 20 | 61 |
| 00003BE0 | 6E | 79 | 20 | 4B | 69 | 74 | 40 | 00 | 6A | 76 | 20 | 43 | 65 | 6C | 6C | 20 |
| 00003BF0 | 20 | 52 | 6F | 77 | 20 | 20 | 43 | 6F | 6C | 2E | 20 | 20 | 20 | 57 | 43 | 20 |
| 00003C00 | 20 | 53 | 4C | 20 | 20 | 20 | 20 | 20 | 20 | 4C | 6F | 77 | 20 | 20 | 54 | 6F |
| 00003C10 | 74 | 61 | 6C | 20 | 20 | 20 | 50 | 61 | 72 | 74 | 20 | 23 | 20 | 20 | 20 | 20 |
| 00003C20 | 4E | 65 | 65 | 64 | 20 | 53 | 74 | 6F | 63 | 6B | 00 | 00 | 00 | 00 | 70 | 23 |
| 00003C30 | 74 | 94 | 03 | 00 | B6 | 76 | 20 | 20 | 20 | D3 | 02 | 00 | BE | 76 | 20 | 20 |
| 00003C40 | 1E | 00 | C4 | 76 | 44 | 6F | 20 | 79 | 6F | 75 | 20 | 77 | 69 | 73 | 68 | 20 |
| 00003C50 | 61 | 20 | 70 | 72 | 69 | 6E | 74 | 6F | 75 | 74 | 20 | 6F | 66 | 20 | 74 | 68 |
| 00003C60 | 69 | 73 | 0C | 00 | E6 | 76 | 20 | 2D | 20 | 4C | 6F | 77 | 20 | 53 | 74 | 6F |
| 00003C70 | 63 | 6B | 22 | 00 | F6 | 7o | 44 | 6F | 20 | 79 | 6F | 75 | 20 | 77 | 69 | 73 |
| 00003C80 | 68 | 20 | 74 | 6F | 20 | 73 | 65 | 65 | 20 | 6F | 6E | 6C | 79 | 20 | 6F | 6E |
| 00003C90 | 65 | 20 | 70 | 61 | 72 | 74 | 20 | 23 | 0E | 00 | 1C | 77 | 20 | 3D | 45 | 6E |
| 00003CA0 | 74 | 65 | 72 | 20 | 50 | 61 | 72 | 74 | 20 | 23 | 08 | 00 | 2E | 77 | 20 | 20 |
| 00003CB0 | 20 | 20 | 20 | 20 | 20 | 20 | 1B | 00 | 3A | 77 | 20 | 44 | 4F | 45 | 53 | 20 |
| 00003CC0 | 4E | 4F | 54 | 20 | 45 | 58 | 49 | 53 | 54 | 21 | 20 | 2D | 20 | 43 | 4F | 4E |
| 00003CD0 | 54 | 49 | 4E | 55 | 45 | 00 | 2B | 00 | 5A | 77 | 44 | 6F | 20 | 79 | 6F | 75 |
| 00003CE0 | 20 | 77 | 69 | 73 | 68 | 20 | 6C | 69 | 73 | 74 | 20 | 6F | 6E | 6C | 79 | 20 |
| 00003CF0 | 74 | 68 | 65 | 20 | 70 | 61 | 72 | 74 | 73 | 20 | 66 | 6F | 72 | 20 | 6F | 6E |
| 00003D00 | 65 | 20 | 6B | 69 | 74 | 00 | 2C | 00 | 8A | 77 | 44 | 6F | 20 | 79 | 6F | 75 |
| 00003D10 | 20 | 77 | 69 | 73 | 68 | 20 | 74 | 6F | 20 | 73 | 65 | 65 | 20 | 74 | 68 | 69 |
| 00003D20 | 73 | 20 | 72 | 65 | 70 | 6F | 72 | 74 | 20 | 6F | 6E | 20 | 74 | 68 | 65 | 20 |
| 00003D30 | 73 | 63 | 72 | 65 | 65 | 6E | 25 | 00 | BA | 77 | 44 | 6F | 20 | 79 | 6F | 75 |
| 00003D40 | 20 | 77 | 69 | 73 | 68 | 20 | 74 | 6F | 20 | 70 | 72 | 69 | 6E | 74 | 20 | 6F |
| 00003D50 | 6E | 6C | 79 | 20 | 31 | 20 | 73 | 75 | 70 | 65 | 72 | 63 | 65 | 6C | 6C | 00 |
| 00003D60 | 0D | 00 | E4 | 77 | 53 | 75 | 70 | 65 | 72 | 63 | 65 | 6C | 6C | 20 | 23 | 31 |
| 00003D70 | 2D | 00 | 1E | 00 | F6 | 77 | 50 | 52 | 49 | 4E | 54 | 49 | 4E | 47 | 20 | 50 |
| 00003D80 | 41 | 52 | 54 | 20 | 49 | 4E | 56 | 45 | 4E | 54 | 4F | 52 | 59 | 20 | 52 | 45 |
| 00003D90 | 50 | 4F | 52 | 54 | 28 | 00 | 18 | 78 | 50 | 52 | 49 | 4E | 54 | 49 | 4E | 47 |
| 00003DA0 | 20 | 50 | 41 | 52 | 54 | 20 | 49 | 4E | 56 | 45 | 4E | 54 | 4F | 52 | 59 | 20 |
| 00003570 | 3E | 79 | A1 | 90 | 73 | A3 | A2 | 73 | B8 | 01 | 00 | E9 | 1F | 00 | 8B | 3E |
| 00003580 | C8 | 72 | D1 | E7 | 8B | 9D | 60 | 14 | 3B | 9D | A0 | 14 | 7F | 03 | E9 | 08 |
| 00003590 | 00 | 8B | 9D | A0 | 14 | 89 | 9D | 60 | 14 | A1 | C8 | 72 | 40 | A3 | C8 | 72 |
| 000035A0 | A1 | A2 | 73 | 3B | 06 | C8 | 72 | 7D | D5 | A1 | C6 | 72 | 40 | A3 | C6 | 72 |
| 000035B0 | 81 | 3E | C6 | 72 | FA | 00 | 7F | 03 | E9 | EE | F6 | BB | E8 | 74 | B8 | 06 |
| 000035C0 | 73 | CD | 3F | 62 | 75 | 03 | E9 | 55 | 00 | CD | 3F | BC | BB | 11 | 00 | CD |
| 000035D0 | 3F | 37 | BB | 3E | 75 | CD | 3F | 6A | CD | 3E | 79 | A1 | 90 | 73 | A3 | A4 |
| 000035E0 | 73 | B8 | 01 | 00 | E9 | 10 | 00 | CD | 3F | BC | BB | E0 | 7C | CD | 3F | 6A |

```
000035F0  CD 3E 79 A1 C8 72 40 A3  C8 72 A1 A4 73 3B 06 C8
00003600  72 7D E4 CD 3F BC BB 3E  75 CD 3F 6E CD 3E 79 CD
00003610  3F BC BB EA 7C CD 3F 6A  CD 3E 79 E9 36 00 CD 3F
00003620  C0 BB 3E 00 CD 3F 37 BB  3E 75 CD 3F 6A BB 1E 00
00003630  BA 2D 00 CD 3D 0E CD 3F  6E CD 3E 79 CD 3F C0 BB
00003640  34 00 CD 3F 37 BB 3E 75  CD 3F 6A BB FE 7C CD 3F
00003650  6A CD 3E 79 A1 90 73 A3  A6 73 B8 01 00 E9 41 00
00003660  BB E8 74 B8 06 73 CD 3F  62 74 03 E9 19 00 BB 4E
00003670  14 CD 3F C1 8B 3E C8 72  D1 E7 8B 9D 60 14 CD 3F
00003680  69 CD 3E 79 E9 16 00 BB  5A 14 CD 3F BD 8B 3E C8
00003690  72 D1 E7 8B 9D 60 14 CD  3F 69 CD 3E 79 A1 C8 72
000036A0  40 A3 C8 72 A1 A6 73 3B  06 C8 72 7D B3 BB BA 74
000036B0  B8 06 73 CD 3F 62 75 03  E9 24 00 CD 3F C0 BB A6
000036C0  75 CD 3F 6E CD 3E 79 CD  3F C0 BB 0C 00 CD 3D 05
000036D0  CD 3F 6E CD 3E 79 BB FF  FF CD 3E 32 E9 43 00 BB
000036E0  17 00 CD 3E 42 BB 01 00  CD 3E 42 33 DB CD 3E 44
000036F0  BB 0C 7D BA 02 73 CD 3F  61 E8 5A 00 BB E8 74 B8
00003700  02 73 CD 3F 62 75 03 E9  18 00 BB E8 74 BA 06 73
00003710  CD 3F 61 C7 06 FE 72 63  00 C7 06 FC 72 00 00 E9
00003720  FA F3 BB 17 00 CD 3E 42  BB 01 00 CD 3E 42 33 DB
00003730  CD 3E 44 BB 32 7D BA 02  73 CD 3F 61 E8 17 00 BB
00003740  BA 74 B8 02 73 CD 3F 62  75 03 E9 57 ED E9 45 01
00003750  BB FF FF CD 3E 32 BB 5E  7D B8 02 73 CD 3F 55 BA
00003760  A8 73 CD 3F 61 33 DB CD  3D 21 93 A3 AC 73 CD 3F
00003770  BC BB A8 73 CD 3F 6A CD  3E 79 33 DB CD 3D 21 93
00003780  A3 AE 73 CD 3D 25 93 A3  B0 73 BB 3E 75 CD 3F B5
00003790  03 CD 3F B7 01 04 BB 02  73 CD 3F B8 BB BA 74 B8
000037A0  02 73 CD 3F 62 BA 00 00  75 01 4A BB E8 74 CD 3F
000037B0  62 B9 00 00 75 01 49 0B  CA 23 C9 74 03 E9 71 00
000037C0  BB 6C 7D B8 02 73 CD 3F  62 74 03 E9 0A 00 92 BB
000037D0  BA 74 CD 3F 61 E9 59 00  BB 72 7D B8 02 73 CD 3F
000037E0  62 74 03 E9 0A 00 92 BB  E8 74 CD 3F 61 E9 41 00
000037F0  8B 1E B0 73 CD 3E 42 8B  1E AE 73 CD 3E 42 33 DB
00003800  CD 3E 44 CD 3E 2B CD 3F  BC BB 02 73 CD 3F BA BA
00003810  20 00 CD 3D 0E CD 3F 6A  CD 3E 79 8B 1E B0 73 CD
00003820  3E 42 8B 1E AE 73 CD 3E  42 33 DB CD 3E 44 E9 59
00003830  FF 8B 1E B0 73 CD 3E 42  8B 1E AC 73 CD 3E 42 33
00003840  DB CD 3E 44 CD 3F BC 8B  1E AE 73 2B 1E AC 73 43
00003850  BA 20 00 CD 3D 0E CD 3F  6A CD 3E 79 8B 1E B0 73
00003860  CD 3E 42 8B 1E AC 73 CD  3E 42 8B 1E B2 73 CD 3E
00003870  44 C3 90 90 90 90 90 90  90 90 90 90 90 90 90 90
00003880  90 90 90 90 90 90 90 90  90 90 90 90 90 90 90 90
00003890  90 90 90 90 90 BB FF FF  CD 3E 32 CD 3E 22 BB 78
000038A0  7D CD 3E 0E 90 CD 3E 02  00 00 00 00 00 00 00 00
000038B0  CD 3F FF CB CD 3F FE CB  CD 3F FD CB CD 3F FC CB
000038C0  51 F3 A5 59 D1 E1 8E DA  8B 2E C6 13 8B C5 2B C2
000038D0  3D 00 10 72 03 B8 00 10  8B D1 81 C2 00 03 72 0C
000038E0  B1 04 D3 E0 0B C0 74 28  3B C2 73 24 BA 4A 00 0E
000038F0  1F B4 09 CD 21 53 33 C0  50 CB 0D 0A 50 72 6F 67
00003900  72 61 6D 20 74 6F 6F 20  6C 61 72 67 65 0D 0A 24
00003910  5E 5F 1E 17 8B E2 57 56  8B CA 92 83 06 C4 13 07
00003920  FF 2E C4 13 B0 04 BF B0  05 A2 1F 00 C7 06 35 00
00003930  89 00 C7 06 37 00 6B 03  CB CB 5F 5E 5B 56 57 FF
00003940  36 00 00 FF 37 CB 00 00  00 00 00 00 00 00 00 00
00003950  05 00 D4 73 6C 70 74 31  3A 9E 06 00 DE 73 23 23
00003960  2C 23 23 23 06 00 E8 73  20 20 23 23 20 20 07 00
00003970  F2 73 23 23 2C 23 23 23  20 00 02 00 FE 73 23 23
00003980  03 00 04 74 23 23 23 00  06 00 0C 74 20 23 23 23
00003150  A1 D4 72 A3 98 73 B8 01  00 E9 16 00 BB 1C 73 CD
00003160  3F 0F BB 1E 73 CD 3F 0F  BB 20 73 CD 3F 0F A1 22
00003170  73 40 A3 22 73 A1 98 73  3B 06 22 73 7D DE A1 D4
00003180  72 A3 00 73 BB BE 7B B8  7C 73 CD 3F 62 74 03 E9
00003190  91 00 83 3E D4 72 09 7C  03 E9 09 00 C7 06 00 73
000031A0  01 00 E9 7E 00 83 3E D4  72 08 BB 00 00 7E 01 4B
000031B0  83 3E D4 72 10 BA 00 00  7D 01 4A 23 D3 23 D2 75
000031C0  03 E9 09 00 C7 06 00 73  02 00 E9 56 00 83 3E D4
000031D0  72 0F BB 00 00 7E 01 4B  83 3E D4 72 17 BA 00 00
000031E0  7D 01 4A 23 D3 23 D2 75  03 E9 09 00 C7 06 00 73
000031F0  03 00 E9 2E 00 83 3E D4  72 16 BB 00 00 7E 01 4B
00003200  83 3E D4 72 1C BA 00 00  7D 01 4A 23 D3 23 D2 75
00003210  03 E9 09 00 C7 06 00 73  04 00 E9 06 00 C7 06 00
00003220  73 05 00 C7 06 9A 73 00  00 A1 20 73 A3 9C 73 B8
00003230  01 00 E9 A6 00 A1 1E 73  A3 9E 73 A1 1C 73 E9 87
00003240  00 B8 05 00 F7 2E D8 72  97 03 3E D6 72 D1 E7 D1
```

| | | |
|---|---|---|
| 00003250 | E7 D1 E7 D1 E7 D1 E7 03 | 3E D4 72 D1 E7 83 BD AA |
| 00003260 | 19 00 BB 00 00 75 01 4B | 8B 36 C6 72 D1 E6 8B 94 |
| 00003270 | E0 14 3B 95 AA 19 B9 00 | 00 74 01 49 0B CB 8B 9D |
| 00003280 | AA 41 3B 9C C8 18 BA 00 | 00 74 01 4A 0B D1 23 D2 |
| 00003290 | 74 03 E9 2F 00 B8 05 00 | F7 2E D4 72 03 06 D6 72 |
| 000032A0 | 05 FB FF 92 BB 02 00 CD | 3E 26 8B 1E D8 72 D1 E3 |
| 000032B0 | D1 E3 81 C3 08 6F CD 3D | 18 03 1E 9A 73 93 A3 9A |
| 000032C0 | 73 E9 29 00 A1 D8 72 40 | A3 D8 72 A1 9E 73 3B 06 |
| 000032D0 | D8 72 7C 03 E9 6A FF A1 | D6 72 40 A3 D6 72 A1 9C |
| 000032E0 | 73 3B 06 D6 72 7C 03 E9 | 4B FF E9 84 01 83 3E D4 |
| 000032F0 | 72 08 BB 00 00 74 01 4B | 83 3E D4 72 0F BA 00 00 |
| 00003300 | 74 01 4A 23 D3 83 3E D4 | 72 16 BB 00 00 74 01 4B |
| 00003310 | 23 DA 83 3E 28 73 1B BA | 00 00 74 01 4A 23 D3 83 |
| 00003320 | 3E 28 73 20 BB 00 00 74 | 01 4B 23 DA 83 3E D6 72 |
| 00003330 | 04 BA 00 00 75 01 4A 23 | D3 23 D2 74 03 E9 03 00 |
| 00003340 | E9 0F 00 8B 3E 00 73 D1 | E7 C7 85 A0 14 0F 27 E9 |
| 00003350 | D0 00 BB A6 75 BA 60 73 | CD 3F 61 83 3E D4 72 08 |
| 00003360 | BB 00 00 74 01 4B 83 3E | D4 72 0F BA 00 00 74 01 |
| 00003370 | 4A 23 D3 83 3E D4 72 16 | BB 00 00 74 01 4B 23 DA |
| 00003380 | 83 3E D4 72 1B BA 00 00 | 74 01 4A 23 D3 83 3E D4 |
| 00003390 | 72 20 BB 00 00 74 01 4B | 23 DA 23 DB 74 03 E9 67 |
| 000033A0 | 00 BB 75 36 CD 3F 34 B8 | 01 00 E9 45 00 BB 64 73 |
| 000033B0 | CD 3F 0F BB 66 73 CD 3F | 0F BB 68 73 CD 3F 0F 83 |
| 000033C0 | 3E 64 73 FF 75 03 E9 25 | 00 A1 D6 72 3B 06 66 73 |
| 000033D0 | BB 00 00 75 01 4B A1 D8 | 72 3B 06 68 73 BA 00 00 |
| 000033E0 | 75 01 4A 23 D3 23 D2 74 | 03 E9 13 00 EB BF A1 6A |
| 000033F0 | 73 40 A3 6A 73 83 3E 6A | 73 05 7E B1 E9 09 00 BB |
| 00003400 | FA 78 BA 60 73 CD 3F 61 | BB FA 78 B8 60 73 CD 3F |
| 00003410 | 62 74 03 E9 0C 00 8B 3E | 00 73 D1 E7 C7 85 A0 14 |
| 00003420 | 0F 27 8B 3E 00 73 D1 E7 | 81 BD A0 14 0F 27 75 03 |
| 00003430 | E9 3E 00 8B 9D A0 14 CD | 3F 57 8B 1E 9A 73 CD 3F |
| 00003440 | 71 80 CD 3F 57 8B 36 C6 | 72 D1 E6 8B 9C D4 16 CD |
| 00003450 | 3F 71 81 CD 3F 57 8B DF | CD 3F 8D 81 8B D3 BB 1A |
| 00003460 | 00 CD 3D 03 CD 3F 85 80 | CD 3F 77 8B FA 89 9D A0 |
| 00003470 | 14 A1 D4 72 40 A3 D4 72 | A1 96 73 3B 06 D4 72 7C |
| 00003480 | 03 E9 C6 FC BB E8 74 B8 | 06 73 CD 3F 62 74 03 E9 |
| 00003490 | 0F 00 CD 3F C0 BB 52 7A | CD 3F 6A CD 3E 79 E9 0C |
| 000034A0 | 00 CD 3F BC BB A6 75 CD | 3F 6A CD 3E 79 A1 90 73 |
| 000034B0 | A3 A0 73 B8 01 00 E9 81 | 00 BB BA 74 B8 06 73 CD |
| 000034C0 | 3F 62 75 03 E9 39 00 8B | 3E C8 72 D1 E7 81 BD A0 |
| 000034D0 | 14 0F 27 74 03 E9 0F 00 | CD 3F C0 BB CA 7C CD 3F |
| 000034E0 | 6A CD 3E 79 E9 16 00 BB | 4E 14 CD 3F C1 8B 3E C8 |
| 000034F0 | 72 D1 E7 8B 9D A0 14 CD | 3F 69 CD 3E 79 E9 36 00 |
| 00003500 | 8B 3E C8 72 D1 E7 81 BD | A0 14 0F 27 74 03 E9 0F |
| 00003510 | 00 CD 3F BC BB D6 7C CD | 3F 6A CD 3E 79 E9 16 00 |
| 00003520 | BB 5A 14 CD 3F BD 8B 3E | C8 72 D1 E7 8B 9D A0 14 |
| 00003530 | CD 3F 69 CD 3E 79 A1 C8 | 72 40 A3 C8 72 A1 A0 73 |
| 00003540 | 3B 06 C8 72 7C 03 E9 70 | FF BB E8 74 B8 06 73 CD |
| 00003550 | 3F 62 74 03 E9 0F 00 CD | 3F C0 BB A6 75 CD 3F 6E |
| 00003560 | CD 3E 79 E9 0C 00 CD 3F | BC BB 3E 75 CD 3F 6E CD |
| 00002D30 | 03 E9 A0 02 83 3E FE 72 | 3C 7C 03 E9 0F 00 CD 3F |
| 00002D40 | C0 BB 0C 00 CD 3D 05 CD | 3F 6E CD 3E 79 A1 FC 72 |
| 00002D50 | 40 A3 FC 72 CD 3F C0 BB | 50 00 CD 3F 37 BB 3E 75 |
| 00002D60 | CD 3F 6A BB 68 75 CD 3F | 6A 8B 1E FC 72 CD 3F 6D |
| 00002D70 | CD 3E 79 CD 3F C0 BB 50 | 00 CD 3F 37 BB 3E 75 CD |
| 00002D80 | 3F 6A BB 72 75 CD 3F 6A | BB F2 72 CD 3F 6E CD 3E |
| 00002D90 | 79 CD 3F C0 BB EE 7A CD | 3F 6A BB 82 73 BA E0 7A |
| 00002DA0 | 8B CB CD 3D 09 4B 87 D9 | 87 D1 8B C3 CD 3D 0B CD |
| 00002DB0 | 3F 6A BB 7E 7B CD 3F 6A | 93 8B D1 8B C3 CD 3D 09 |
| 00002DC0 | 93 8B D3 CD 3F BA 2B D8 | 87 D3 CD 3D 0C CD 3F 6E |
| 00002DD0 | CD 3E 79 CD 3F C0 BB A6 | 75 CD 3F 6E CD 3E 79 CD |
| 00002DE0 | 3F C0 BB 05 00 CD 3F 37 | BB 3E 75 CD 3F 6A BB 5C |
| 00002DF0 | 73 CD 3F 6E CD 3E 79 C7 | 06 FE 72 00 00 CD 3F C0 |
| 00002E00 | BB 9C 7B CD 3F 6A BB 52 | 14 CD 3E 0A 8B 1E 80 73 |
| 00002E10 | CD 3F 6D CD 3E 79 BB BE | 7B B8 7C 73 CD 3F 62 74 |
| 00002E20 | 03 E9 E5 00 CD 3F C0 BB | C4 7B CD 3F 6E CD 3E 79 |
| 00002E30 | CD 3F C0 BB FE 7B CD 3F | 6A BB 5E 14 CD 3E 0A BB |
| 00002E40 | 86 73 CD 3F 6B CD 3E 79 | CD 3F C0 BB 14 7C CD 3F |
| 00002E50 | 6A BB 5E 14 CD 3E 0A BB | 8A 73 CD 3F 6B CD 3E 79 |
| 00002E60 | CD 3F C0 BB 49 00 CD 3F | 37 BB 3E 75 CD 3F 6A BB |
| 00002E70 | 2A 7C CD 3F 6E CD 3E 79 | CD 3F C0 BB 2C 00 CD 3F |
| 00002E80 | 37 BB 3E 75 CD 3F 6A 8B | D3 BB 3C 7C CD 3F 6A BB |
| 00002E90 | 41 00 CD 3F 37 8B DA CD | 3F 6A BB 4E 7C CD 3F 6E |
| 00002EA0 | CD 3E 79 CD 3F C0 BB 70 | 7C CD 3F 6A BB 2D 00 CD |

| | | | | | | | | | | | | | | | | |
|---|---|---|---|---|---|---|---|---|---|---|---|---|---|---|---|---|
| 00002EB0 | 3F | 37 | BB | 3E | 75 | CD | 3F | 6A | BB | 88 | 7C | CD | 3F | 6A | CD | 3E |
| 00002EC0 | 79 | B8 | 01 | 00 | E9 | 17 | 00 | CD | 3F | C0 | 8B | 1E | C8 | 72 | CD | 3F |
| 00002ED0 | 69 | BB | A2 | 7C | CD | 3F | 6A | CD | 3E | 79 | A1 | C8 | 72 | 40 | A3 | C8 |
| 00002EE0 | 72 | 83 | 3E | C8 | 72 | 05 | 7E | DF | CD | 3F | C0 | BB | A6 | 75 | CD | 3F |
| 00002EF0 | 6E | CD | 3E | 79 | CD | 3F | C0 | BB | 64 | 00 | BA | 2D | 00 | CD | 3D | 0E |
| 00002F00 | CD | 3F | 6E | CD | 3E | 79 | E9 | 73 | 01 | CD | 3F | C0 | BB | E0 | 7B | CD |
| 00002F10 | 3F | 6E | CD | 3E | 79 | CD | 3F | C0 | BB | 57 | 00 | CD | 3F | 37 | BB | 3E |
| 00002F20 | 75 | CD | 3F | 6A | BB | 2A | 7C | CD | 3F | 6E | CD | 3E | 79 | CD | 3F | C0 |
| 00002F30 | BB | 2C | 00 | CD | 3F | 37 | BB | 3E | 75 | CD | 3F | 6A | 8B | D3 | BB | 3C |
| 00002F40 | 7C | CD | 3F | 6A | BB | 41 | 00 | CD | 3F | 37 | 8B | DA | CD | 3F | 6A | BB |
| 00002F50 | 19 | 00 | BA | 2D | 00 | 8B | CB | CD | 3D | 0E | CD | 3F | 6A | BB | AA | 7C |
| 00002F60 | CD | 3F | 6A | 8B | D9 | CD | 3D | 0E | CD | 3F | 6E | CD | 3E | 79 | CD | 3F |
| 00002F70 | C0 | BB | 70 | 7C | CD | 3F | 6A | BB | 2D | 00 | CD | 3F | 37 | BB | 3E | 75 |
| 00002F80 | CD | 3F | 6A | BB | 88 | 7C | CD | 3F | 6A | CD | 3E | 79 | B8 | 01 | 00 | E9 |
| 00002F90 | 17 | 00 | CD | 3F | C0 | 8B | 1E | C8 | 72 | CD | 3F | 69 | BB | A2 | 7C | CD |
| 00002FA0 | 3F | 6A | CD | 3E | 79 | A1 | C8 | 72 | 40 | A3 | C8 | 72 | 83 | 3E | C8 | 72 |
| 00002FB0 | 0A | 7E | DF | CD | 3F | C0 | BB | A6 | 75 | CD | 3F | 6E | CD | 3E | 79 | CD |
| 00002FC0 | 3F | C0 | BB | 82 | 00 | BA | 2D | 00 | CD | 3D | 0E | CD | 3F | 6E | CD | 3E |
| 00002FD0 | 79 | E9 | A8 | 00 | 83 | 3E | FE | 72 | 32 | 7E | 03 | E9 | 2B | 00 | BB | 17 |
| 00002FE0 | 00 | CD | 3E | 42 | BB | 01 | 00 | CD | 3E | 42 | 33 | DB | CD | 3E | 44 | BB |
| 00002FF0 | 32 | 76 | BA | 02 | 73 | CD | 3F | 61 | E8 | 5B | 07 | BB | E8 | 74 | B8 | 02 |
| 00003000 | 73 | CD | 3F | 62 | 75 | 03 | E9 | 19 | 07 | BB | FF | FF | CD | 3E | 32 | CD |
| 00003010 | 3F | BC | BB | B6 | 7C | CD | 3F | 6A | CD | 3E | 79 | A1 | 90 | 73 | A3 | 94 |
| 00003020 | 73 | B8 | 01 | 00 | E9 | 25 | 00 | CD | 3F | BC | B8 | 06 | 00 | F7 | 2E | C8 |
| 00003030 | 72 | 05 | 0D | 00 | 93 | CD | 3F | 37 | BB | 3E | 75 | CD | 3F | 6A | 8B | 1E |
| 00003040 | C8 | 72 | CD | 3F | 69 | CD | 3E | 79 | A1 | C8 | 72 | 40 | A3 | C8 | 72 | A1 |
| 00003050 | 94 | 73 | 3B | 06 | C8 | 72 | 7D | CF | CD | 3F | BC | BB | 3E | 75 | CD | 3F |
| 00003060 | 6E | CD | 3E | 79 | CD | 3F | BC | BB | 4F | 00 | BA | 2D | 00 | CD | 3D | 0E |
| 00003070 | CD | 3F | 6A | CD | 3E | 79 | C7 | 06 | FE | 72 | 00 | 00 | A1 | FE | 72 | 40 |
| 00003080 | A3 | FE | 72 | 8B | 3E | C6 | 72 | D1 | E7 | BB | 01 | 00 | 8B | 95 | E0 | 14 |
| 00003090 | CD | 3E | 26 | BB | E8 | 74 | B8 | 06 | 73 | CD | 3F | 62 | 75 | 03 | E9 | 47 |
| 000030A0 | 00 | CD | 3F | BC | BB | BA | 72 | CD | 3F | 6A | BB | A6 | 75 | CD | 3F | 6A |
| 000030B0 | BB | 56 | 14 | CD | 3E | 0A | 8B | 3E | C6 | 72 | D1 | E7 | 8B | 9D | D4 | 16 |
| 000030C0 | CD | 3F | 69 | CD | 3E | 79 | CD | 3F | BC | BB | A6 | 75 | CD | 3F | 6A | BB |
| 000030D0 | 52 | 14 | CD | 3E | 0A | 8B | 3E | C6 | 72 | D1 | E7 | 8B | 9D | C8 | 18 | CD |
| 000030E0 | 3F | 69 | CD | 3E | 79 | E9 | 56 | 00 | CD | 3F | C0 | BB | BA | 72 | CD | 3F |
| 000030F0 | 6A | BB | A6 | 75 | CD | 3F | 6A | BB | BE | 72 | CD | 3F | 6A | BB | 2B | 00 |
| 00003100 | CD | 3F | 37 | BB | 3E | 75 | CD | 3F | 6A | BB | 46 | 14 | CD | 3E | 0A | 8B |
| 00003110 | 3E | C6 | 72 | D1 | E7 | 8B | 9D | D4 | 16 | CD | 3F | 69 | CD | 3E | 79 | CD |
| 00003120 | 3F | C0 | BB | BA | 76 | CD | 3F | 6A | BB | 4A | 14 | CD | 3E | 0A | 8B | 3E |
| 00003130 | C6 | 72 | D1 | E7 | 8B | 9D | C8 | 18 | CD | 3F | 69 | CD | 3E | 79 | A1 | AC |
| 00003140 | 72 | A3 | 96 | 73 | B8 | 01 | 00 | E9 | 2B | 03 | BB | 72 | 36 | CD | 3F | 34 |
| 00002910 | 3F | 61 | BB | E6 | 72 | BA | 5C | 73 | CD | 3F | 61 | 33 | C0 | E9 | 98 | 00 |
| 00002920 | A1 | 14 | 73 | 03 | 06 | 12 | 73 | 92 | BB | 03 | 00 | CD | 3E | 26 | 83 | 3E |
| 00002930 | 14 | 73 | 00 | 74 | 03 | E9 | 0C | 00 | BB | EE | 72 | CD | 3D | 19 | BF | 86 |
| 00002940 | 73 | CD | 3F | 7D | 83 | 3E | 14 | 73 | 01 | 74 | 03 | E9 | 0C | 00 | BB | EE |
| 00002950 | 72 | CD | 3D | 19 | BF | 8A | 73 | CD | 3F | 7D | B8 | 01 | 00 | E9 | 4A | 00 |
| 00002960 | 8B | 1E | C6 | 72 | 8B | D3 | D1 | E3 | D1 | E3 | 81 | C3 | D0 | 71 | CD | 3D |
| 00002970 | 18 | B8 | 32 | 00 | 8B | CA | F7 | 2E | 14 | 73 | 03 | C1 | 97 | D1 | E7 | 89 |
| 00002980 | 9D | D4 | 16 | 8B | 1E | C6 | 72 | 8B | D3 | D1 | E3 | D1 | E3 | 81 | C3 | 08 |
| 00002990 | 71 | CD | 3D | 18 | B8 | 32 | 00 | 8B | CA | F7 | 2E | 14 | 73 | 03 | C1 | 97 |
| 000029A0 | D1 | E7 | 89 | 9D | E0 | 14 | A1 | C6 | 72 | 40 | A3 | C6 | 72 | 83 | 3E | C6 |
| 000029B0 | 72 | 32 | 7E | AC | A1 | 14 | 73 | 40 | A3 | 14 | 73 | 83 | 3E | 14 | 73 | 04 |
| 000029C0 | 7F | 03 | E9 | 5B | FF | BB | 82 | 73 | BA | E0 | 7A | 8B | CB | CD | 3D | 09 |
| 000029D0 | 0B | DB | 74 | 03 | E9 | 0B | 00 | 91 | BB | 52 | 7B | CD | 3F | 55 | 92 | CD |
| 000029E0 | 3F | 61 | 33 | C0 | E9 | 6F | 00 | A1 | 14 | 73 | 03 | 06 | 12 | 73 | 05 | 05 |
| 000029F0 | 00 | 92 | BB | 03 | 00 | CD | 3E | 26 | B8 | 01 | 00 | E9 | 4A | 00 | 8B | 1E |
| 00002A00 | C6 | 72 | 8B | D3 | D1 | E3 | D1 | E3 | 81 | C3 | 08 | 71 | CD | 3D | 18 | B8 |
| 00002A10 | 64 | 00 | 8B | CA | F7 | 2E | 14 | 73 | 03 | C1 | 97 | D1 | E7 | 89 | 9D | C8 |
| 00002A20 | 18 | 8B | 1E | C6 | 72 | 8B | D3 | D1 | E3 | D1 | E3 | 81 | C3 | D0 | 71 | CD |
| 00002A30 | 3D | 18 | B8 | 64 | 00 | 8B | CA | F7 | 2E | 14 | 73 | 03 | C1 | 97 | D1 | E7 |
| 00002A40 | 89 | 9D | 2C | 19 | A1 | C6 | 72 | 40 | A3 | C6 | 72 | 83 | 3E | C6 | 72 | 32 |
| 00002A50 | 7E | AC | A1 | 14 | 73 | 40 | A3 | 14 | 73 | 83 | 3E | 14 | 73 | 02 | 7E | 87 |
| 00002A60 | 83 | 3E | B0 | 72 | 0B | BB | 00 | 00 | 75 | 01 | 4B | 83 | 3E | B0 | 72 | 0C |
| 00002A70 | BA | 00 | 00 | 75 | 01 | 4A | 0B | D3 | 23 | D2 | 74 | 03 | E9 | 0D | E6 | BB |
| 00002A80 | A4 | 36 | CD | 3F | 34 | CD | 3D | 23 | BA | F2 | 72 | CD | 3F | 61 | BB | F2 |
| 00002A90 | 72 | CD | 3D | 13 | CD | 3F | 78 | 93 | A3 | 8E | 73 | B8 | 01 | 00 | E9 | 0A |
| 00002AA0 | 00 | BB | F8 | 72 | CD | 3F | 10 | A1 | C6 | 72 | 40 | A3 | C6 | 72 | A1 | 8E |
| 00002AB0 | 73 | 3B | 06 | C6 | 72 | 7D | EA | BB | F2 | 72 | BA | 7E | 74 | 8B | CB | CD |
| 00002AC0 | 3D | 09 | 87 | D9 | CD | 3F | BA | 2B | D9 | 93 | A3 | C6 | 72 | BB | F2 | 72 |
| 00002AD0 | 8B | 16 | C6 | 72 | 8B | CB | CD | 3D | 0C | 8B | D1 | CD | 3F | 61 | BB | F2 |
| 00002AE0 | 72 | CD | 3D | 13 | 8B | D3 | BB | 16 | 00 | CD | 3D | 12 | B8 | F8 | 72 | CD |
| 00002AF0 | 3F | 55 | 93 | BB | 84 | 74 | CD | 3F | 55 | 87 | DA | 8B | CA | BA | 04 | 00 |
| 00002B00 | 8B | C3 | CD | 3D | 0C | 91 | CD | 3F | 55 | 8B | D1 | CD | 3F | 61 | BB | BA |

| | | | | | | | | | | | | | | | | |
|---|---|---|---|---|---|---|---|---|---|---|---|---|---|---|---|---|
| 00002B10 | 74 | B8 | 06 | 73 | CD | 3F | 62 | 75 | 03 | E9 | 65 | 00 | BB | C0 | 74 | BA |
| 00002B20 | 02 | 73 | CD | 3F | 61 | E8 | 28 | 0C | BB | E8 | 74 | B8 | 02 | 73 | CD | 3F |
| 00002B30 | 62 | 75 | 03 | E9 | 5F | 0D | BB | FF | FF | CD | 3E | 32 | CD | 3F | BC | BB |
| 00002B40 | 5C | 7B | CD | 3F | 6A | BB | 82 | 73 | BA | E0 | 7A | 8B | CB | CD | 3D | 09 |
| 00002B50 | 4B | 87 | D9 | 87 | D1 | 8B | C3 | CD | 3D | 0B | CD | 3F | 6A | BB | 7E | 7B |
| 00002B60 | CD | 3F | 6A | 93 | 8B | D1 | 8B | C3 | CD | 3D | 09 | 93 | 8B | D3 | CD | 3F |
| 00002B70 | BA | 2B | D8 | 87 | D3 | CD | 3D | 0C | CD | 3F | 6E | CD | 3E | 79 | E9 | D9 |
| 00002B80 | 00 | BB | FF | FF | CD | 3E | 32 | CD | 3F | BC | BB | EE | 7A | CD | 3F | 6A |
| 00002B90 | BB | 82 | 73 | BA | E0 | 7A | 8B | CB | CD | 3D | 09 | 4B | 87 | D9 | 87 | D1 |
| 00002BA0 | 8B | C3 | CD | 3D | 0B | CD | 3F | 6A | BB | 7E | 7B | CD | 3F | 6A | 93 | 8B |
| 00002BB0 | D1 | 8B | C3 | CD | 3D | 09 | 93 | 8B | D3 | CD | 3F | BA | 2B | D8 | 87 | D3 |
| 00002BC0 | CD | 3D | 0C | CD | 3F | 6E | CD | 3E | 79 | CD | 3F | BC | BB | A6 | 75 | CD |
| 00002BD0 | 3F | 6E | CD | 3E | 79 | CD | 3F | BC | BB | 05 | 00 | CD | 3F | 37 | BB | 3E |
| 00002BE0 | 75 | CD | 3F | 6A | BB | 5C | 73 | CD | 3F | 6E | CD | 3E | 79 | CD | 3F | BC |
| 00002BF0 | BB | 9C | 7B | CD | 3F | 6A | BB | 52 | 14 | CD | 3E | 0A | 8B | 1E | 80 | 73 |
| 00002C00 | CD | 3F | 6D | CD | 3E | 79 | BB | BE | 7B | B8 | 7C | 73 | CD | 3F | 62 | 74 |
| 00002C10 | 03 | E9 | 0F | 00 | CD | 3F | BC | BB | C4 | 7B | CD | 3F | 6E | CD | 3E | 79 |
| 00002C20 | E9 | 0C | 00 | CD | 3F | BC | BB | E0 | 7B | CD | 3F | 6E | CD | 3E | 79 | BB |
| 00002C30 | 17 | 00 | CD | 3E | 42 | BB | 01 | 00 | CD | 3E | 42 | 33 | DB | CD | 3E | 44 |
| 00002C40 | BB | 32 | 76 | BA | 02 | 73 | CD | 3F | 61 | E8 | 0A | 0B | BB | E8 | 74 | B8 |
| 00002C50 | 02 | 73 | CD | 3F | 62 | 75 | 03 | E9 | C8 | 0A | BB | BE | 7B | B8 | 7C | 73 |
| 00002C60 | CD | 3F | 62 | 74 | 03 | E9 | 09 | 00 | A1 | AE | 72 | A3 | 90 | 73 | E9 | 06 |
| 00002C70 | 00 | A1 | AC | 72 | A3 | 90 | 73 | B8 | 01 | 00 | E9 | 10 | 00 | 8B | 3E | C6 |
| 00002C80 | 72 | D1 | E7 | C7 | 85 | 60 | 14 | 00 | 7D | A1 | C6 | 72 | 40 | A3 | C6 | 72 |
| 00002C90 | 83 | 3E | C6 | 72 | 20 | 7E | E6 | C7 | 06 | FC | 72 | 00 | 00 | C7 | 06 | FE |
| 00002CA0 | 72 | 63 | 00 | B8 | 01 | 00 | E9 | 04 | 09 | A1 | AC | 72 | A3 | 92 | 73 | B8 |
| 00002CB0 | 01 | 00 | E9 | 10 | 00 | 8B | 3E | C8 | 72 | D1 | E7 | C7 | 85 | A0 | 14 | 00 |
| 00002CC0 | 00 | A1 | C8 | 72 | 40 | A3 | C8 | 72 | A1 | 92 | 73 | 3B | 06 | C8 | 72 | 7D |
| 00002CD0 | E4 | 8B | 3E | C6 | 72 | D1 | E7 | 83 | BD | E0 | 14 | 00 | 75 | 03 | E9 | C8 |
| 00002CE0 | 08 | 83 | 3E | FE | 72 | 31 | BB | 00 | 00 | 7D | 01 | 4B | 8B | D3 | BB | E8 |
| 00002CF0 | 74 | B8 | 06 | 73 | CD | 3F | 62 | B9 | 00 | 00 | 75 | 01 | 49 | 23 | CA | 83 |
| 00002D00 | 3E | FE | 72 | 14 | BB | 00 | 00 | 7D | 01 | 4B | 8B | D3 | BB | BA | 74 | CD |
| 00002D10 | 3F | 62 | 89 | 46 | FA | B8 | 00 | 00 | 75 | 01 | 48 | 23 | C2 | 0B | C1 | 23 |
| 00002D20 | C0 | 74 | 03 | E9 | 56 | 03 | BB | BA | 74 | B8 | 06 | 73 | CD | 3F | 62 | 75 |
| 000024F0 | 7E | CD | C7 | 06 | 74 | 73 | 00 | 00 | C7 | 06 | C6 | 72 | 01 | 00 | C7 | 06 |
| 00002500 | C8 | 72 | 00 | 00 | BB | 03 | 00 | 8B | 16 | C6 | 72 | CD | 3E | 26 | BB | 03 |
| 00002510 | 00 | CD | 3D | 2F | 83 | FB | FF | 74 | 03 | E9 | 03 | 00 | E9 | 91 | 00 | A1 |
| 00002520 | C8 | 72 | 40 | A3 | C8 | 72 | BB | E2 | 72 | BA | E0 | 7A | 8B | CB | CD | 3D |
| 00002530 | 09 | 0B | DB | 74 | 03 | E9 | 0B | 00 | 91 | BB | E6 | 7A | CD | 3F | 55 | 92 |
| 00002540 | CD | 3F | 61 | 8B | 1E | C8 | 72 | D1 | E3 | D1 | E3 | 81 | C3 | 28 | 6B | 8B |
| 00002550 | CB | BB | E2 | 72 | BA | E0 | 7A | 8B | C3 | CD | 3D | 09 | 4B | 93 | 92 | 89 |
| 00002560 | 5E | FA | CD | 3D | 0B | 8B | D0 | B8 | EE | 7A | CD | 3F | 55 | 93 | BB | F8 |
| 00002570 | 7A | CD | 3F | 55 | 8B | C3 | 8B | 5E | FA | CD | 3D | 09 | 8B | D3 | 8B | 5E |
| 00002580 | FA | CD | 3F | BA | 2B | DA | 8B | D3 | 8B | 5E | FA | CD | 3D | 0C | CD | 3F |
| 00002590 | 55 | 93 | BB | 40 | 78 | CD | 3F | 55 | 93 | BB | E6 | 72 | CD | 3F | 55 | 8B |
| 000025A0 | D1 | CD | 3F | 61 | A1 | C6 | 72 | 05 | 08 | 00 | A3 | C6 | 72 | E9 | 54 | FF |
| 000025B0 | C7 | 06 | 76 | 73 | 00 | 00 | C7 | 06 | 78 | 73 | 00 | 00 | C7 | 06 | 7A | 73 |
| 000025C0 | 00 | 00 | BB | FF | FF | CD | 3E | 32 | B8 | 01 | 00 | E9 | 5F | 00 | B8 | 14 |
| 000025D0 | 00 | F7 | 2E | 74 | 73 | 03 | 06 | C6 | 72 | 3B | 06 | C8 | 72 | 7E | 03 | E9 |
| 000025E0 | 55 | 00 | A1 | 7A | 73 | 40 | A3 | 7A | 73 | 8B | 1E | C6 | 72 | 8B | D3 | D1 |
| 000025F0 | E3 | D1 | E3 | 81 | C3 | 08 | 6D | B8 | 14 | 00 | 8B | CA | F7 | 2E | 74 | 73 |
| 00002600 | 03 | C1 | D1 | E0 | D1 | E0 | 05 | 28 | 6B | 93 | 92 | CD | 3F | 61 | CD | 3F |
| 00002610 | BC | 8B | 1E | C6 | 72 | D1 | E3 | D1 | E3 | 81 | C3 | 08 | 6D | B8 | A6 | 75 |
| 00002620 | CD | 3F | 55 | CD | 3F | 6E | CD | 3E | 79 | A1 | C6 | 72 | 40 | A3 | C6 | 72 |
| 00002630 | 83 | 3E | C6 | 72 | 14 | 7E | 97 | B8 | 14 | 00 | F7 | 2E | 74 | 73 | 05 | 15 |
| 00002640 | 00 | 3B | 06 | C8 | 72 | 7C | 03 | E9 | 2D | 00 | CD | 3F | BC | BB | 04 | 7B |
| 00002650 | CD | 3F | 6E | CD | 3E | 79 | A1 | 7A | 73 | 40 | A3 | 7A | 73 | A1 | 7A | 73 |
| 00002660 | A3 | 76 | 73 | 8B | 1E | 7A | 73 | D1 | E3 | D1 | E3 | 81 | C3 | 08 | 6D | 8B |
| 00002670 | D3 | BB | 04 | 7B | CD | 3F | 61 | 83 | 3E | 74 | 73 | 00 | 7F | 03 | E9 | 2D |
| 00002680 | 00 | CD | 3F | BC | BB | 12 | 7B | CD | 3F | 6E | CD | 3E | 79 | A1 | 7A | 73 |
| 00002690 | 40 | A3 | 7A | 73 | A1 | 7A | 73 | A3 | 78 | 73 | 8B | 1E | 7A | 73 | D1 | E3 |
| 000026A0 | D1 | E3 | 81 | C3 | 08 | 6D | 8B | D3 | BB | 12 | 7B | CD | 3F | 61 | BB | 05 |
| 000026B0 | 00 | CD | 3E | 42 | BB | 44 | 00 | CD | 3E | 42 | 33 | DB | CD | 3E | 44 | CD |
| 000026C0 | 3F | BC | BB | 24 | 7B | CD | 3F | 6A | CD | 3E | 79 | BB | 17 | 00 | CD | 3E |
| 000026D0 | 33 | 33 | DB | CD | 3E | 35 | CD | 3F | BC | BB | 10 | 00 | CD | 3D | 05 | CD |
| 000026E0 | 3F | 6A | CD | 3E | 79 | BB | 07 | 00 | CD | 3E | 33 | 33 | DB | CD | 3E | 35 |
| 000026F0 | BB | 07 | 00 | CD | 3E | 42 | BB | 44 | 00 | CD | 3E | 42 | 33 | DB | CD | 3E |
| 00002700 | 44 | CD | 3F | BC | BB | 18 | 00 | CD | 3D | 05 | CD | 3F | 6A | BB | 2E | 7B |
| 00002710 | CD | 3F | 6A | CD | 3E | 79 | BB | 08 | 00 | CD | 3E | 42 | BB | 44 | 00 | CD |
| 00002720 | 3E | 42 | 33 | DB | CD | 3E | 44 | CD | 3F | BC | BB | 19 | 00 | CD | 3D | 05 |
| 00002730 | CD | 3F | 6A | BB | 38 | 7B | CD | 3F | 6A | CD | 3E | 79 | BB | 0C | 00 | CD |
| 00002740 | 3E | 42 | BB | 42 | 00 | CD | 3E | 42 | 33 | DB | CD | 3E | 44 | CD | 3F | BC |
| 00002750 | BB | 11 | 00 | CD | 3D | 05 | CD | 3F | 6A | BB | C4 | 00 | CD | 3D | 05 | CD |
| 00002760 | 3F | 6A | BB | D9 | 00 | CD | 3D | 05 | CD | 3F | 6A | BB | 44 | 7B | CD | 3F |

```
00002770  6A CD 3E 79 C7 06 C6 72  01 00 8B 1E C6 72 CD 3E
00002780  42 BB 01 00 CD 3E 42 33  DB CD 3E 44 BB 17 00 CD
00002790  3E 33 33 DB CD 3E 35 CD  3F BC BB 10 00 CD 3D 05
000027A0  CD 3F 6A CD 3E 79 33 DB  CD 3E 33 BB 07 00 CD 3E
000027B0  35 CD 3F BC 8B 1E C6 72  D1 E3 D1 E3 81 C3 08 6D
000027C0  CD 3F 6A CD 3E 79 BB 07  00 CD 3E 33 33 DB CD 3E
000027D0  35 BB 19 00 CD 3E 42 BB  01 00 CD 3E 42 33 DB CD
000027E0  3E 44 CD 3D 06 BA 02 73  CD 3F 61 BB 02 73 CD 3F
000027F0  BA 0B DB 74 ED BB A4 72  B8 02 73 CD 3F 62 BA 00
00002800  00 74 01 4A BB 9C 72 CD  3F 62 B9 00 00 74 01 49
00002810  23 CA BB A0 72 CD 3F 62  BA 00 00 74 01 4A 23 D1
00002820  23 D2 75 BE 8B 1E C6 72  CD 3E 42 BB 01 00 CD 3E
00002830  42 33 DB CD 3E 44 CD 3F  BC BB A6 75 CD 3F 6A 8B
00002840  1E C6 72 D1 E3 D1 E3 81  C3 08 6D CD 3F 6A CD 3E
00002850  79 BB A4 72 B8 02 73 CD  3F 62 75 03 E9 44 00 BB
00002860  A0 72 B8 02 73 CD 3F 62  74 03 E9 1C 00 A1 C6 72
00002870  40 A3 C6 72 A1 7A 73 3B  06 C6 72 7C 03 E9 06 00
00002880  C7 06 C6 72 01 00 E9 F1  FE A1 C6 72 48 A3 C6 72
00002890  83 3E C6 72 00 74 03 E9  06 00 A1 7A 73 A3 C6 72
000028A0  E9 D7 FE A1 C6 72 3B 06  76 73 74 03 E9 0A 00 A1
000028B0  74 73 40 A3 74 73 E9 F7  FC A1 C6 72 3B 06 78 73
000028C0  74 03 E9 0A 00 A1 74 73  48 A3 74 73 E9 E1 FC BB
000028D0  FF FF CD 3E 32 B8 14 00  F7 2E 74 73 03 06 C6 72
000028E0  D1 E0 D1 E0 D1 E0 05 F9  FF A3 12 73 BB 03 00 8B
000028F0  16 12 73 CD 3E 26 BB DA  72 BA 7C 73 CD 3F 61 BB
00002900  DE 72 CD 3D 18 93 A3 80  73 BB E2 72 BA 82 73 CD
000020D0  D3 83 3E D4 72 16 BB 00  00 74 01 4B 23 DA 83 3E
000020E0  D4 72 1B BA 00 00 74 01  4A 23 D3 83 3E D4 72 20
000020F0  BB 00 00 74 01 4B 23 DA  23 DB 74 03 E9 67 00 BB
00002100  75 36 CD 3F 34 B8 01 00  E9 45 00 BB 64 73 CD 3F
00002110  0F BB 66 73 CD 3F 0F BB  68 73 CD 3F 0F 83 3E 64
00002120  73 FF 75 03 E9 25 00 A1  D6 72 3B 06 66 73 BB 00
00002130  00 75 01 4B A1 D8 72 3B  06 68 73 BA 00 00 75 01
00002140  4A 23 D3 23 D2 74 03 E9  13 00 EB BF A1 6A 73 40
00002150  A3 6A 73 83 3E 6A 73 05  7E B1 E9 09 00 BB FA 78
00002160  BA 60 73 CD 3F 61 BB E8  74 B8 06 73 CD 3F 62 74
00002170  03 E9 2C 00 BB 4E 14 CD  3F C1 8B 1E D8 72 D1 E3
00002180  D1 E3 8B D3 81 C3 88 6F  CD 3D 18 CD 3F 69 81 C2
00002190  08 6F 8B DA CD 3D 18 CD  3F 69 CD 3E 79 E9 29 00
000021A0  BB 4E 14 CD 3F BD 8B 1E  D8 72 D1 E3 D1 E3 8B D3
000021B0  81 C3 88 6F CD 3D 18 CD  3F 69 81 C2 08 6F 8B DA
000021C0  CD 3D 18 CD 3F 69 CD 3E  79 BB BA 74 B8 06 73 CD
000021D0  3F 62 75 03 E9 4D 00 CD  3F C0 BB B2 76 CD 3F 6A
000021E0  BB BA 72 CD 3F 6A BB A6  75 CD 3F 6A 8B D3 BB BE
000021F0  72 CD 3F 6A 8B DA CD 3F  6A BB 4E 14 CD 3E 0A 8B
00002200  1E D8 72 D1 E3 D1 E3 8B  D3 81 C3 08 6F CD 3D 18
00002210  81 C2 08 70 87 DA CD 3D  18 2B DA CD 3F 69 CD 3E
00002220  79 E9 3D 00 CD 3F BC BB  B2 76 CD 3F 6A BB BA 72
00002230  CD 3F 6A BB A6 75 CD 3F  6A BB 4E 14 CD 3E 0A 8B
00002240  1E D8 72 D1 E3 D1 E3 8B  D3 81 C3 08 6F CD 3D 18
00002250  81 C2 08 70 87 DA CD 3D  18 2B DA CD 3F 69 CD 3E
00002260  79 BB FA 78 B8 60 73 CD  3F 62 74 03 E9 2C 00 BB
00002270  E8 74 B8 06 73 CD 3F 62  74 03 E9 0F 00 CD 3F C0
00002280  BB 00 79 CD 3F 6E CD 3E  79 E9 0C 00 CD 3F BC BB
00002290  00 79 CD 3F 6E CD 3E 79  E9 73 00 8B 1E D8 72 D1
000022A0  E3 D1 E3 8B D3 81 C3 08  6F CD 3D 18 81 C2 88 6F
000022B0  87 DA CD 3D 18 3B D3 7E  03 E9 29 00 BB E8 74 B8
000022C0  06 73 CD 3F 62 74 03 E9  0F 00 CD 3F C0 BB 12 79
000022D0  CD 3F 6A CD 3E 79 E9 0C  00 CD 3F BC BB 12 79 CD
000022E0  3F 6A CD 3E 79 BB E8 74  B8 06 73 CD 3F 62 74 03
000022F0  E9 0F 00 CD 3F C0 BB A6  75 CD 3F 6E CD 3E 79 E9
00002300  0C 00 CD 3F BC BB 3E 75  CD 3F 6E CD 3E 79 A1 FE
00002310  72 40 A3 FE 72 A1 D8 72  40 A3 D8 72 A1 72 73 3B
00002320  06 D8 72 7C 03 E9 32 FA  A1 D6 72 40 A3 D6 72 A1
00002330  70 73 3B 06 D6 72 7C 03  E9 FE F9 BB E8 74 B8 06
00002340  73 CD 3F 62 74 03 E9 0F  00 CD 3F C0 BB 0C 00 CD
00002350  3D 05 CD 3F 6E CD 3E 79  C7 06 FE 72 63 00 83 3E
00002360  00 73 00 74 03 E9 52 00  BB E8 74 B8 06 73 CD 3F
00002370  62 75 03 E9 31 00 BB 74  7A BA 02 73 CD 3F 61 BB
00002380  17 00 CD 3E 42 BB 01 00  CD 3E 42 33 DB CD 3E 44
00002390  E8 C3 13 BB E8 74 B8 02  73 CD 3F 62 75 03 E9 19
000023A0  00 BB FF FF CD 3E 32 A1  D4 72 40 A3 D4 72 A1 6C
000023B0  73 3B 06 D4 72 7C 03 E9  16 F9 BB E8 74 B8 06 73
000023C0  CD 3F 62 75 03 E9 53 00  BB 8E 7A BA 02 73 CD 3F
```

```
000023D0  61 BB 17 00 CD 3E 42 BB  01 00 CD 3E 42 33 DB CD
000023E0  3E 44 E8 71 13 BB E8 74  B8 02 73 CD 3F 62 75 03
000023F0  E9 28 00 BB E8 74 BA 06  73 CD 3F 61 BB FF FF CD
00002400  3E 32 C7 06 FE 72 63 00  C7 06 FC 72 00 00 83 3E
00002410  00 73 00 7E 03 E9 B8 F8  E9 A9 F8 83 3E 00 73 00
00002420  75 03 E9 70 14 BB 17 00  CD 3E 42 BB 01 00 CD 3E
00002430  42 33 DB CD 3E 44 BB B2  7A BA 02 73 CD 3F 61 E8
00002440  14 13 BB E8 74 B8 02 73  CD 3F 62 75 03 E9 45 14
00002450  BB FF FF CD 3E 32 BB BA  74 B8 06 73 CD 3F 62 75
00002460  03 E9 45 F8 BB 8A 74 BA  02 73 CD 3F 61 E8 E0 12
00002470  BB 02 73 BA 06 73 CD 3F  61 BB BA 74 B8 06 73 CD
00002480  3F 62 75 03 E9 22 F8 BB  C0 74 BA 02 73 CD 3F 61
00002490  E8 BD 12 BB E8 74 B8 02  73 CD 3F 62 75 03 E9 19
000024A0  FF E9 05 F8 BB 86 77 BA  02 73 CD 3F 61 E8 A0 12
000024B0  BB 02 73 BA 06 73 CD 3F  61 B8 01 00 E9 28 00 8B
000024C0  3E C6 72 D1 E7 C7 85 E0  14 00 00 8B 3E C6 72 D1
000024D0  E7 C7 85 D4 16 00 00 8B  3E C6 72 D1 E7 C7 85 C8
000024E0  18 00 00 A1 C6 72 40 A3  C6 72 81 3E C6 72 FA 00
00001CB0  BA 79 CD 3F B5 00 CD 3F  B7 01 01 BB 00 73 CD 3F
00001CC0  B8 E9 0C 00 A1 AC 72 A3  6C 73 B8 01 00 E9 DB 06
00001CD0  83 3E 00 73 00 7F 03 E9  06 00 A1 00 73 A3 D4 72
00001CE0  BB FF FF CD 3E 32 CD 3F  BC BB C6 79 CD 3F 6A 8B
00001CF0  1E D4 72 CD 3F 6D CD 3E  79 BB 72 36 CD 3F 34 A1
00001D00  D4 72 A3 6E 73 B8 01 00  E9 16 00 BB 1C 73 CD 3F
00001D10  0F BB 1E 73 CD 3F 0F BB  20 73 CD 3F 0F A1 22 73
00001D20  40 A3 22 73 A1 6E 73 3B  06 22 73 7D DE A1 20 73
00001D30  A3 70 73 B8 01 00 E9 F3  05 B8 05 00 F7 2E D4 72
00001D40  03 06 D6 72 05 FB FF 92  BB 02 00 CD 3E 26 A1 1E
00001D50  73 A3 72 73 A1 1C 73 E9  BF 05 8B 1E D8 72 D1 E3
00001D60  D1 E3 81 C3 88 6E 8B D3  CD 3D 18 0B DB 7F 03 E9
00001D70  0D 00 8B DA CD 3D 18 8B  D3 BB 01 00 CD 3E 26 83
00001D80  3E FE 72 38 BB 00 00 7D  01 4B 8B D3 BB E8 74 B8
00001D90  06 73 CD 3F 62 B9 00 00  75 01 49 23 CA 83 3E FE
00001DA0  72 14 BB 00 00 7D 01 4B  8B D3 BB BA 74 CD 3F 62
00001DB0  89 46 FA B8 00 00 75 01  48 23 C2 0B C1 23 C0 74
00001DC0  03 E9 43 01 83 3E FE 72  3C BB 00 00 7D 01 4B 8B
00001DD0  D3 BB E8 74 B8 06 73 CD  3F 62 B9 00 00 75 01 49
00001DE0  23 CA 23 C9 75 03 E9 0F  00 CD 3F C0 BB 0C 00 CD
00001DF0  3D 05 CD 3F 6E CD 3E 79  BB BA 74 B8 06 73 CD 3F
00001E00  62 75 03 E9 A1 00 A1 FC  72 40 A3 FC 72 CD 3F C0
00001E10  BB 50 00 CD 3F 37 BB 3E  75 CD 3F 6A BB 68 75 CD
00001E20  3F 6A 8B 1E FC 72 CD 3F  6D CD 3E 79 CD 3F C0 BB
00001E30  50 00 CD 3F 37 BB 3E 75  CD 3F 6A BB 72 75 CD 3F
00001E40  6A BB F2 72 CD 3F 6E CD  3E 79 CD 3F C0 BB 14 00
00001E50  CD 3F 37 BB 3E 75 CD 3F  6A BB 7C 75 CD 3F 6E CD
00001E60  3E 79 CD 3F C0 BB A6 75  CD 3F 6E CD 3E 79 CD 3F
00001E70  C0 BB DA 75 CD 3F 6A BB  10 00 CD 3F 35 BB 3E 75
00001E80  CD 3F 6A BB 22 76 CD 3F  6E CD 3E 79 CD 3F C0 BB
00001E90  72 00 BA 2D 00 CD 3D 0E  CD 3F 6E CD 3E 79 C7 06
00001EA0  FE 72 06 00 E9 60 00 83  3E FE 72 1E 7E 03 E9 2B
00001EB0  00 BB 32 76 BA 02 73 CD  3F 61 BB 17 00 CD 3E 42
00001EC0  BB 01 00 CD 3E 42 33 DB  CD 3E 44 E8 88 18 BB E8
00001ED0  74 B8 02 73 CD 3F 62 75  03 E9 DE 04 BB FF FF CD
00001EE0  3E 32 CD 3F BC BB F4 79  CD 3F 6A 8B 1E D4 72 CD
00001EF0  3F 6D CD 3E 79 CD 3F BC  BB 0E 7A CD 3F 6E CD 3E
00001F00  79 C7 06 FE 72 01 00 BB  E8 74 B8 06 73 CD 3F 62
00001F10  74 03 E9 2F 00 BB 4A 14  CD 3F C1 8B 1E D4 72 CD
00001F20  3F 69 8B 1E D6 72 CD 3F  69 8B 1E D8 72 CD 3F 69
00001F30  D1 E3 D1 E3 81 C3 88 70  CD 3D 18 CD 3F 69 CD 3E
00001F40  79 E9 2C 00 BB 4A 14 CD  3F BD 8B 1E D4 72 CD 3F
00001F50  69 8B 1E D6 72 CD 3F 69  8B 1E D8 72 CD 3F 69 D1
00001F60  E3 D1 E3 81 C3 88 70 CD  3D 18 CD 3F 69 CD 3E 79
00001F70  8B 1E D8 72 D1 E3 D1 E3  81 C3 88 6E CD 3D 18 0B
00001F80  DB 7E 03 E9 2C 00 BB E8  74 B8 06 73 CD 3F 62 74
00001F90  03 E9 0F 00 CD 3F C0 BB  52 7A CD 3F 6A CD 3E 79
00001FA0  E9 0C 00 CD 3F BC BB 52  7A CD 3F 6A CD 3E 79 E9
00001FB0  43 00 BB E8 74 B8 06 73  CD 3F 62 74 03 E9 1C 00
00001FC0  CD 3F C0 BB A6 75 CD 3F  6A 8B D3 BB C2 72 CD 3F
00001FD0  6A 8B DA CD 3F 6A CD 3E  79 E9 19 00 CD 3F BC BB
00001FE0  A6 75 CD 3F 6A 8B D3 BB  C2 72 CD 3F 6A 8B DA CD
00001FF0  3F 6A CD 3E 79 8B 1E D8  72 D1 E3 D1 E3 81 C3 88
00002000  6E CD 3D 18 0B DB 74 03  E9 2C 00 BB E8 74 B8 06
00002010  73 CD 3F 62 74 03 E9 0F  00 CD 3F C0 BB 5C 7A CD
00002020  3F 6E CD 3E 79 E9 0C 00  CD 3F BC BB 5C 7A CD 3F
```

| | | | | | | | | | | | | | | | | |
|---|---|---|---|---|---|---|---|---|---|---|---|---|---|---|---|---|
| 00002030 | 6E | CD | 3E | 79 | E9 | D7 | 02 | 8B | 1E | D8 | 72 | D1 | E3 | D1 | E3 | 81 |
| 00002040 | C3 | 88 | 6E | CD | 3D | 18 | 8B | D3 | BB | 01 | 00 | CD | 3E | 26 | 83 | 3E |
| 00002050 | D4 | 72 | 08 | BB | 00 | 00 | 74 | 01 | 4B | 83 | 3E | D4 | 72 | 0F | BA | 00 |
| 00002060 | 00 | 74 | 01 | 4A | 23 | D3 | 83 | 3E | D4 | 72 | 16 | BB | 00 | 00 | 74 | 01 |
| 00002070 | 4B | 23 | DA | 83 | 3E | D4 | 72 | 1B | BA | 00 | 00 | 74 | 01 | 4A | 23 | D3 |
| 00002080 | 83 | 3E | D4 | 72 | 20 | BB | 00 | 00 | 74 | 01 | 4B | 23 | DA | 83 | 3E | D6 |
| 00002090 | 72 | 04 | BA | 00 | 00 | 75 | 01 | 4A | 23 | D3 | 23 | D2 | 75 | 03 | E9 | 0C |
| 000020A0 | 00 | BB | FA | 78 | BA | 60 | 73 | CD | 3F | 61 | E9 | B9 | 00 | E9 | 00 | 00 |
| 000020B0 | BB | A6 | 75 | BA | 60 | 73 | CD | 3F | 61 | 83 | 3E | D4 | 72 | 08 | BB | 00 |
| 000020C0 | 00 | 74 | 01 | 4B | 83 | 3E | D4 | 72 | 0F | BA | 00 | 00 | 74 | 01 | 4A | 23 |
| 00001890 | 00 | 00 | 75 | 01 | 4A | 23 | D3 | BB | FA | 78 | B8 | 60 | 73 | CD | 3F | 62 |
| 000018A0 | B9 | 00 | 00 | 75 | 01 | 49 | 0B | CA | 23 | C9 | 75 | 03 | E9 | 0F | 00 | CD |
| 000018B0 | 3F | BC | BB | 00 | 79 | CD | 3F | 6E | CD | 3E | 79 | E9 | 27 | 00 | A1 | 26 |
| 000018C0 | 1B | 3B | 06 | 24 | 1B | 7D | 03 | E9 | 0F | 00 | CD | 3F | BC | BB | 12 | 79 |
| 000018D0 | CD | 3F | 6E | CD | 3E | 79 | E9 | 0C | 00 | CD | 3F | BC | BB | A6 | 75 | CD |
| 000018E0 | 3F | 6E | CD | 3E | 79 | E9 | 1D | 01 | CD | 3F | C0 | BB | 2A | 00 | CD | 3F |
| 000018F0 | 37 | BB | 3E | 75 | CD | 3F | 6A | BB | 4A | 14 | CD | 3E | 0A | 8B | 1E | D4 |
| 00001900 | 72 | CD | 3F | 69 | 8B | 1E | D6 | 72 | CD | 3F | 69 | 8B | 1E | D8 | 72 | CD |
| 00001910 | 3F | 69 | 8B | 1E | 2A | 1B | CD | 3F | 69 | CD | 3E | 79 | CD | 3F | C0 | BB |
| 00001920 | A6 | 75 | CD | 3F | 6A | BB | C2 | 72 | CD | 3F | 6A | CD | 3E | 79 | CD | 3F |
| 00001930 | C0 | BB | BA | 76 | CD | 3F | 6A | BB | 4E | 14 | CD | 3E | 0A | 8B | 1E | 28 |
| 00001940 | 1B | 2B | 1E | 24 | 1B | CD | 3F | 69 | CD | 3E | 79 | CD | 3F | C0 | BB | A6 |
| 00001950 | 75 | CD | 3F | 6A | BB | 4E | 14 | CD | 3E | 0A | 8B | 1E | 26 | 1B | CD | [illegible] |
| 00001960 | 69 | 8B | 1E | 24 | 1B | CD | 3F | 69 | CD | 3E | 79 | 83 | 3E | D4 | 72 | 08 |
| 00001970 | BB | 00 | 00 | 74 | 01 | 4B | 83 | 3E | D4 | 72 | 0F | BA | 00 | 00 | 74 | 01 |
| 00001980 | 4A | 23 | D3 | 83 | 3E | D4 | 72 | 16 | BB | 00 | 00 | 74 | 01 | 4B | 23 | DA |
| 00001990 | 83 | 3E | D4 | 72 | 1B | BA | 00 | 00 | 74 | 01 | 4A | 23 | D3 | 83 | 3E | D4 |
| 000019A0 | 72 | 20 | BB | 00 | 00 | 74 | 01 | 4B | 23 | DA | 83 | 3E | D6 | 72 | 04 | BA |
| 000019B0 | 00 | 00 | 75 | 01 | 4A | 23 | D3 | BB | FA | 78 | B8 | 60 | 73 | CD | 3F | 62 |
| 000019C0 | B9 | 00 | 00 | 75 | 01 | 49 | 0B | CA | 23 | C9 | 75 | 03 | E9 | 0F | 00 | CD |
| 000019D0 | 3F | C0 | BB | 00 | 79 | CD | 3F | 6E | CD | 3E | 79 | E9 | 27 | 00 | A1 | 26 |
| 000019E0 | 1B | 3B | 06 | 24 | 1B | 7D | 03 | E9 | 0F | 00 | CD | 3F | C0 | BB | 12 | 79 |
| 000019F0 | CD | 3F | 6E | CD | 3E | 79 | E9 | 0C | 00 | CD | 3F | C0 | BB | A6 | 75 | CD |
| 00001A00 | 3F | 6E | CD | 3E | 79 | A1 | D8 | 72 | 40 | A3 | D8 | 72 | A1 | 5A | 73 | 3B |
| 00001A10 | 06 | D8 | 72 | 7C | 03 | E9 | FE | F8 | A1 | D6 | 72 | 40 | A3 | D6 | 72 | A1 |
| 00001A20 | 58 | 73 | 3B | 06 | D6 | 72 | 7C | 03 | E9 | DF | F8 | A1 | D4 | 72 | 40 | A3 |
| 00001A30 | D4 | 72 | A1 | 54 | 73 | 3B | 06 | D4 | 72 | 7C | 03 | E9 | 8C | F8 | BB | A6 |
| 00001A40 | 75 | B8 | 3C | 73 | CD | 3F | 62 | BA | 00 | 00 | 75 | 01 | 4A | 93 | CD | 3F |
| 00001A50 | BA | 0B | DB | B9 | 00 | 00 | 75 | 01 | 49 | 0B | CA | 23 | C9 | 74 | 03 | E9 |
| 00001A60 | 20 | 00 | BB | 28 | 79 | BA | 02 | 73 | CD | 3F | 61 | BB | 14 | 00 | CD | 3E |
| 00001A70 | 42 | BB | 01 | 00 | CD | 3E | 42 | 33 | DB | CD | 3E | 44 | E8 | D7 | 1C | E9 |
| 00001A80 | 13 | 1E | 83 | 3E | 4E | 73 | 00 | BB | 00 | 00 | 75 | 01 | 4B | 83 | 3E | 32 |
| 00001A90 | 73 | 00 | BA | 00 | 00 | 75 | 01 | 4A | 23 | D3 | 23 | D2 | 74 | 03 | E9 | 03 |
| 00001AA0 | 00 | E9 | 78 | 00 | BB | E8 | 74 | B8 | 06 | 73 | CD | 3F | 62 | 74 | 03 | E9 |
| 00001AB0 | 1B | 00 | CD | 3F | C0 | BB | BA | 72 | CD | 3F | 6A | BB | A6 | 75 | CD | 3F |
| 00001AC0 | 6A | BB | BE | 72 | CD | 3F | 6E | CD | 3E | 79 | E9 | 0C | 00 | CD | 3F | BC |
| 00001AD0 | BB | BA | 72 | CD | 3F | 6E | CD | 3E | 79 | BB | E8 | 74 | B8 | 06 | 73 | CD |
| 00001AE0 | 3F | 62 | 74 | 03 | E9 | 12 | 00 | CD | 3F | C0 | BB | 68 | 00 | BA | 2D | 00 |
| 00001AF0 | CD | 3D | 0E | CD | 3F | 6E | CD | 3E | 79 | BB | E8 | 74 | B8 | 06 | 73 | CD |
| 00001B00 | 3F | 62 | 74 | 03 | E9 | 0B | 00 | A1 | FE | 72 | 40 | 40 | A3 | FE | 72 | E9 |
| 00001B10 | 07 | 00 | A1 | FE | 72 | 40 | A3 | FE | 72 | E9 | 31 | 00 | 83 | 3E | 4E | 73 |
| 00001B20 | 01 | 74 | 03 | E9 | 27 | 00 | BB | BA | 74 | B8 | 06 | 73 | CD | 3F | 62 | 75 |
| 00001B30 | 03 | E9 | 19 | 00 | CD | 3F | C0 | BB | 68 | 00 | BA | 2D | 00 | CD | 3D | 0E |
| 00001B40 | CD | 3F | 6E | CD | 3E | 79 | A1 | FE | 72 | 40 | A3 | FE | 72 | BB | BA | 74 |
| 00001B50 | B8 | 38 | 73 | CD | 3F | 62 | 75 | 03 | E9 | 0D | 00 | 83 | 3E | 12 | 73 | 00 |
| 00001B60 | 7E | 03 | E9 | CD | F6 | E9 | 38 | 00 | A1 | 46 | 73 | 40 | A3 | 46 | 73 | 81 |
| 00001B70 | 3E | 46 | 73 | FB | 00 | 75 | 03 | E9 | 26 | 00 | 8B | 3E | 46 | 73 | D1 | E7 |
| 00001B80 | 83 | BD | E0 | 14 | 00 | 74 | E1 | 8B | 3E | 46 | 73 | D1 | E7 | 8B | 85 | E0 |
| 00001B90 | 14 | A3 | 12 | 73 | A1 | 12 | 73 | 3B | 06 | 4C | 73 | 74 | CB | E9 | 92 | F6 |
| 00001BA0 | BB | E8 | 74 | B8 | 06 | 73 | CD | 3F | 62 | 74 | 03 | E9 | 0F | 00 | CD | 3F |
| 00001BB0 | C0 | BB | 0C | 00 | CD | 3D | 05 | CD | 3F | 6E | CD | 3E | 79 | BB | E8 | 74 |
| 00001BC0 | B8 | 06 | 73 | CD | 3F | 62 | 75 | 03 | E9 | 55 | 00 | BB | 17 | 00 | CD | 3E |
| 00001BD0 | 42 | BB | 01 | 00 | CD | 3E | 42 | 33 | DB | CD | 3E | 44 | BB | 44 | 79 | BA |
| 00001BE0 | 02 | 73 | CD | 3F | 61 | E8 | 6E | 1B | BB | E8 | 74 | B8 | 02 | 73 | CD | 3F |
| 00001BF0 | 62 | 75 | 03 | E9 | 2A | 00 | BB | E8 | 74 | BA | 06 | 73 | CD | 3F | 61 | C7 |
| 00001C00 | 06 | FE | 72 | 3C | 00 | C7 | 06 | FC | 72 | 00 | 00 | BB | FF | FF | CD | 3E |
| 00001C10 | 32 | CD | 3F | BC | BB | 6C | 79 | CD | 3F | 6E | CD | 3E | 79 | E9 | EB | F5 |
| 00001C20 | 83 | 3E | 4A | 73 | 00 | BB | 00 | 00 | 75 | 01 | 4B | 8B | D3 | BB | A6 | 75 |
| 00001C30 | B8 | 3C | 73 | CD | 3F | 62 | B9 | 00 | 00 | 74 | 01 | 49 | 0B | CA | 23 | C9 |
| 00001C40 | 74 | 03 | E9 | 50 | 1C | BB | 80 | 79 | BA | 02 | 73 | CD | 3F | 61 | E8 | FF |
| 00001C50 | 1A | BB | E8 | 74 | B8 | 02 | 73 | CD | 3F | 62 | 75 | 03 | E9 | 36 | 1C | BB |
| 00001C60 | 8A | 74 | BA | 02 | 73 | CD | 3F | 61 | E8 | E5 | 1A | BB | 02 | 73 | BA | 06 |
| 00001C70 | 73 | CD | 3F | 61 | BB | FF | FF | CD | 3E | 32 | E9 | E1 | F4 | BB | A8 | 79 |
| 00001C80 | BA | 02 | 73 | CD | 3F | 61 | E8 | C7 | 1A | BB | FF | FF | CD | 3E | 32 | C7 |

```
00001C90  06 FC 72 00 00 C7 06 FE  72 63 00 BB E8 74 B8 02
00001CA0  73 CD 3F 62 75 03 E9 1B  00 BB FF FF CD 3E 32 BB
00001470  73 CD 3F 69 BB 40 78 CD  3F 6A BB 5C 73 CD 3F 6E
00001480  CD 3E 79 CD 3F BC BB 48  78 CD 3F 6A BB 0A 00 CD
00001490  3F 37 BB 3E 75 CD 3F 6A  BB 54 78 CD 3F 6E CD 3E
000014A0  79 CD 3F BC BB 4A 00 BA  2D 00 CD 3D 0E CD 3F 6E
000014B0  CD 3E 79 E9 0C 01 83 3E  FE 72 3C 7C 03 E9 0F 00
000014C0  CD 3F C0 BB 0C 00 CD 3D  05 CD 3F 6E CD 3E 79 A1
000014D0  FC 72 40 A3 FC 72 CD 3F  C0 BB 50 00 CD 3F 37 BB
000014E0  3E 75 CD 3F 6A BB 68 75  CD 3F 6A 8B 1E FC 72 CD
000014F0  3F 6D CD 3E 79 CD 3F C0  BB 50 00 CD 3F 37 BB 3E
00001500  75 CD 3F 6A BB 72 75 CD  3F 6A BB F2 72 CD 3F 6E
00001510  CD 3E 79 CD 3F C0 BB 14  00 CD 3F 37 BB 3E 75 CD
00001520  3F 6A BB 8C 78 CD 3F 6A  BB 34 73 CD 3F 6E CD 3E
00001530  79 83 3E 4A 73 00 75 03  E9 45 00 CD 3F C0 BB 16
00001540  00 CD 3F 37 BB 3E 75 CD  3F 6A BB 96 75 CD 3F 6A
00001550  8B 1E 4A 73 CD 3F 6D CD  3E 79 BB BA 74 B8 38 73
00001560  CD 3F 62 74 03 E9 18 00  CD 3F C0 BB 16 00 CD 3F
00001570  37 BB 3E 75 CD 3F 6A BB  5C 73 CD 3F 6E CD 3E 79
00001580  CD 3F C0 BB A6 75 CD 3F  6E CD 3E 79 CD 3F C0 BB
00001590  A6 78 CD 3F 6A BB 2B 00  CD 3F 37 BB 3E 75 CD 3F
000015A0  6A BB C2 78 CD 3F 6E CD  3E 79 CD 3F C0 BB 68 00
000015B0  BA 2D 00 CD 3D 0E CD 3F  6E CD 3E 79 C7 06 FE 72
000015C0  06 00 B8 05 00 F7 2E D8  72 97 03 3E D6 72 D1 E7
000015D0  D1 E7 D1 E7 D1 E7 D1 E7  03 3E D4 72 D1 E7 83 BD
000015E0  AA 19 00 BB 00 00 75 01  4B A1 4C 73 3B 85 AA 19
000015F0  BA 00 00 74 01 4A 0B D3  23 D2 74 03 E9 06 04 BB
00001600  A6 75 BA 60 73 CD 3F 61  83 3E D4 72 08 BB 00 00
00001610  74 01 4B 83 3E D4 72 0F  BA 00 00 74 01 4A 23 D3
00001620  83 3E D4 72 16 BB 00 00  74 01 4B 23 DA 83 3E D4
00001630  72 1A BA 00 00 74 01 4A  23 D3 83 3E D4 72 1E BB
00001640  00 00 74 01 4B 23 DA 23  DB 74 03 E9 67 00 BB 75
00001650  36 CD 3F 34 B8 01 00 E9  45 00 BB 64 73 CD 3F 0F
00001660  BB 66 73 CD 3F 0F BB 68  73 CD 3F 0F 83 3E 64 73
00001670  FF 75 03 E9 25 00 A1 D6  72 3B 06 66 73 BB 00 00
00001680  75 01 4B A1 D8 72 3B 06  68 73 BA 00 00 75 01 4A
00001690  23 D3 23 D2 74 03 E9 13  00 EB BF A1 6A 73 40 A3
000016A0  6A 73 83 3E 6A 73 05 7E  B1 E9 09 00 BB FA 78 BA
000016B0  60 73 CD 3F 61 83 3E 32  73 01 74 03 E9 73 00 A1
000016C0  26 1B 3B 06 24 1B BB 00  00 7D 01 4B 83 3E D4 72
000016D0  08 BA 00 00 74 01 4A 83  3E D4 72 0F B9 00 00 74
000016E0  01 49 23 CA 83 3E D4 72  16 BA 00 00 74 01 4A 23
000016F0  D1 83 3E D4 72 1B B9 00  00 74 01 49 23 CA 83 3E
00001700  D4 72 20 BA 00 00 74 01  4A 23 D1 83 3E D6 72 04
00001710  B9 00 00 75 01 49 23 CA  0B CB BB FA 78 B8 60 73
00001720  CD 3F 62 BA 00 00 75 01  4A 0B D1 23 D2 74 03 E9
00001730  D3 02 A1 FE 72 40 A3 FE  72 83 3E 4E 73 00 74 03
00001740  E9 5E 00 BB A6 75 B8 3C  73 CD 3F 62 BA 00 00 75
00001750  01 4A 8B CB BB E8 74 B8  06 73 CD 3F 62 89 46 FA
00001760  B8 00 00 75 01 48 23 C2  23 C0 75 03 E9 1A 00 CD
00001770  3F C0 BB BA 72 CD 3F 6A  8B D9 CD 3F 6A BB BE 72
00001780  CD 3F 6A CD 3E 79 E9 12  00 CD 3F BC BB BA 72 CD
00001790  3F 6A BB A6 75 CD 3F 6A  CD 3E 79 C7 06 4E 73 01
000017A0  00 BB A6 75 B8 3C 73 CD  3F 62 BA 00 00 75 01 4A
000017B0  BB E8 74 B8 06 73 CD 3F  62 B9 00 00 75 01 49 23
000017C0  CA 23 C9 74 03 E9 20 01  CD 3F BC BB 0A 00 CD 3F
000017D0  37 BB 3E 75 CD 3F 6A BB  4A 14 CD 3E 0A 8B 1E D4
000017E0  72 CD 3F 69 8B 1E D6 72  CD 3F 69 8B 1E D8 72 CD
000017F0  3F 69 8B 1E 2A 1B CD 3F  69 CD 3E 79 CD 3F BC BB
00001800  A6 75 CD 3F 6A BB C2 72  CD 3F 6A CD 3E 79 CD 3F
00001810  BC BB BA 76 CD 3F 6A BB  4E 14 CD 3E 0A 8B 1E 28
00001820  1B 2B 1E 24 1B CD 3F 69  CD 3E 79 CD 3F BC BB A6
00001830  75 CD 3F 6A BB 4E 14 CD  3E 0A 8B 1E 26 1B CD 3F
00001840  69 8B 1E 24 1B CD 3F 69  CD 3E 79 83 3E D4 72 08
00001850  BB 00 00 74 01 4B 83 3E  D4 72 0F BA 00 00 74 01
00001860  4A 23 D3 83 3E D4 72 16  BB 00 00 74 01 4B 23 DA
00001870  83 3E D4 72 1B BA 00 00  74 01 4A 23 D3 83 3E D4
00001880  72 20 BB 00 00 74 01 4B  23 DA 83 3E D6 72 04 BA
00001050  E8 74 B8 02 73 CD 3F 62  75 03 E9 38 28 E9 A2 FE
00001060  BB 56 77 BA 02 73 CD 3F  61 E8 E4 26 BB 02 73 BA
00001070  38 73 CD 3F 61 C7 06 46  73 00 00 BB BA 74 B8 02
00001080  73 CD 3F 62 75 03 E9 30  14 E9 00 00 BB 86 77 BA
00001090  02 73 CD 3F 61 E8 B8 26  BB 02 73 BA 06 73 CD 3F
000010A0  61 BB A6 75 B8 3C 73 CD  3F 62 74 03 E9 09 01 BB
```

```
000010B0  A4 36 CD 3F 34 CD 3D 23  BA F2 72 CD 3F 61 BB F2
000010C0  72 CD 3D 13 CD 3F 78 93  A3 48 73 B8 01 00 E9 0A
000010D0  00 BB F8 72 CD 3F 10 A1  C6 72 40 A3 C6 72 A1 48
000010E0  73 3B 06 C6 72 7D EA BB  F2 72 BA 7E 74 8B CB CD
000010F0  3D 09 87 D9 CD 3F BA 2B  D9 93 A3 C6 72 BB F2 72
00001100  8B 16 C6 72 8B CB CD 3D  0C 8B D1 CD 3F 61 BB F2
00001110  72 CD 3D 13 8B D3 BB 16  00 CD 3D 12 B8 F8 72 CD
00001120  3F 55 93 BB 84 74 CD 3F  55 87 DA 8B CA BA 04 00
00001130  8B C3 CD 3D 0C 91 CD 3F  55 8B D1 CD 3F 61 BB B6
00001140  77 BA 02 73 CD 3F 61 C7  06 4A 73 00 00 E8 00 26
00001150  BB E8 74 B8 02 73 CD 3F  62 75 03 E9 5A 00 BB FF
00001160  FF CD 3E 32 CD 3F BC BB  E0 77 CD 3F 6A 8B 1E AE
00001170  72 CD 3F 69 CD 3E 79 BB  01 00 CD 3E 42 BB 14 00
00001180  CD 3E 42 33 DB CD 3E 44  BB 3E 75 CD 3F B5 00 CD
00001190  3F B7 01 01 BB 4A 73 CD  3F B8 83 3E 4A 73 01 BB
000011A0  00 00 7D 01 4B A1 AE 72  3B 06 4A 73 BA 00 00 7D
000011B0  01 4A 0B D3 23 D2 75 86  BB FF FF CD 3E 32 83 3E
000011C0  32 73 00 74 03 E9 1D 00  BB A6 75 B8 3C 73 CD 3F
000011D0  62 75 03 E9 1B 00 CD 3F  BC BB F2 77 CD 3F 6E CD
000011E0  3E 79 E9 0C 00 CD 3F BC  BB 14 78 CD 3F 6E CD 3E
000011F0  79 C7 06 FC 72 00 00 C7  06 FE 72 3C 00 BB A6 75
00001200  B8 3C 73 CD 3F 62 74 03  E9 27 00 C7 06 46 73 00
00001210  00 BB BA 74 B8 38 73 CD  3F 62 75 03 E9 49 09 BB
00001220  01 00 BA 01 00 CD 3E 26  BB B6 72 CD 3D 18 93 A3
00001230  12 73 A1 12 73 A3 4C 73  C7 06 4E 73 00 00 BB 01
00001240  00 8B 16 12 73 CD 3E 26  BB B6 72 CD 3D 18 93 A3
00001250  12 73 8B 1E 4A 73 43 CD  3F 5E 06 67 10 76 10 85
00001260  10 94 10 A3 10 B2 10 C7  06 50 73 01 00 C7 06 52
00001270  73 20 00 E9 48 00 C7 06  50 73 01 00 C7 06 52 73
00001280  08 00 E9 39 00 C7 06 50  73 09 00 C7 06 52 73 0F
00001290  00 E9 2A 00 C7 06 50 73  17 00 C7 06 52 73 1B 00
000012A0  E9 1B 00 C7 06 50 73 10  00 C7 06 52 73 16 00 E9
000012B0  0C 00 C7 06 50 73 1C 00  C7 06 52 73 20 00 A1 52
000012C0  73 A3 54 73 A1 50 73 E9  65 07 BB 72 36 CD 3F 34
000012D0  A1 D4 72 A3 56 73 B8 01  00 E9 16 00 BB 1C 73 CD
000012E0  3F 0F BB 1E 73 CD 3F 0F  BB 20 73 CD 3F 0F A1 22
000012F0  73 40 A3 22 73 A1 56 73  3B 06 22 73 7D DE A1 20
00001300  73 A3 58 73 B8 01 00 E9  12 07 A1 1E 73 A3 5A 73
00001310  A1 1C 73 E9 F3 06 B8 05  00 F7 2E D8 72 97 03 3E
00001320  D6 72 D1 E7 D1 E7 D1 E7  D1 E7 D1 E7 03 3E D4 72
00001330  D1 E7 83 BD AA 19 00 BB  00 00 75 01 4B A1 4C 73
00001340  3B 85 AA 19 BA 00 00 74  01 4A 0B D3 23 D2 74 03
00001350  E9 50 00 B8 05 00 F7 2E  D4 72 03 06 D6 72 05 FB
00001360  FF 92 BB 02 00 CD 3E 26  B8 01 00 E9 2B 00 8B 1E
00001370  C6 72 8B D3 D1 E3 D1 E3  D1 E3 D1 E3 D1 E3 03 1E
00001380  D8 72 D1 E3 D1 E3 81 C3  08 6E CD 3D 18 8B FA D1
00001390  E7 89 9D 20 1B A1 C6 72  40 A3 C6 72 83 3E C6 72
000013A0  05 7E CB 83 3E FE 72 38  BB 00 00 7D 01 4B 8B D3
000013B0  BB E8 74 B8 06 73 CD 3F  62 B9 00 00 75 01 49 23
000013C0  CA 83 3E FE 72 14 BB 00  00 7D 01 4B 8B D3 BB BA
000013D0  74 CD 3F 62 89 46 FA B8  00 00 75 01 48 23 C2 0B
000013E0  C1 23 C0 74 03 E9 DA 01  BB E8 74 B8 06 73 CD 3F
000013F0  62 75 03 E9 C0 00 83 3E  FE 72 1E 7E 03 E9 2B 00
00001400  BB 17 00 CD 3E 42 BB 01  00 CD 3E 42 33 DB CD 3E
00001410  44 BB 32 76 BA 02 73 CD  3F 61 E8 39 23 BB E8 74
00001420  B8 02 73 CD 3F 62 75 03  E9 92 07 BB FF FF CD 3E
00001430  32 C7 06 FE 72 01 00 BB  E8 74 B8 38 73 CD 3F 62
00001440  74 03 E9 09 00 BB 3E 75  BA 5C 73 CD 3F 61 83 3E
00001450  4A 73 00 7F 03 E9 2B 00  CD 3F BC BB 16 00 CD 3F
00001460  37 BB 3E 75 CD 3F 6A BB  96 75 CD 3F 6A 8B 1E 4A
00000C30  1E D8 72 D1 E3 D1 E3 81  C3 88 6E CD 3D 18 8B D3
00000C40  BB 01 00 CD 3E 26 BB BA  72 CD 3D 13 BF AA 76 CD
00000C50  3F A2 72 03 E9 6E 01 BB  BA 74 B8 06 73 CD 3F 62
00000C60  75 03 E9 B2 00 BB 4A 14  CD 3F C1 8B 1E D4 72 CD
00000C70  3F 69 8B 1E D6 72 CD 3F  69 8B 1E D8 72 CD 3F 69
00000C80  D1 E3 D1 E3 81 C3 88 70  CD 3D 18 CD 3F 69 CD 3E
00000C90  79 CD 3F C0 BB A6 75 CD  3F 6A 8B D3 BB C2 72 CD
00000CA0  3F 6A 8B DA CD 3F 6A BB  4E 14 CD 3E 0A 8B 1E D8
00000CB0  72 D1 E3 D1 E3 8B D3 81  C3 88 6F CD 3D 18 CD 3F
00000CC0  69 81 C2 08 6F 8B DA CD  3D 18 CD 3F 69 CD 3E 79
00000CD0  CD 3F C0 BB B2 76 CD 3F  6A 8B D3 BB BA 72 CD 3F
00000CE0  6A BB BA 76 CD 3F 6A BB  BE 72 CD 3F 6A 8B DA CD
00000CF0  3F 6A 8B 1E D8 72 D1 E3  D1 E3 8B D3 81 C3 08 6F
00000D00  CD 3D 18 81 C2 08 70 87  DA CD 3D 18 2B DA CD 3F
```

```
00000D10  6D CD 3E 79 E9 A7 00 BB  4A 14 CD 3F BD 8B 1E D4
00000D20  72 CD 3F 69 8B 1E D6 72  CD 3F 69 8B 1E D8 72 CD
00000D30  3F 69 D1 E3 D1 E3 81 C3  88 70 CD 3D 18 CD 3F 69
00000D40  CD 3E 79 CD 3F BC BB A6  75 CD 3F 6A BB C2 72 CD
00000D50  3F 6A CD 3E 79 CD 3F BC  BB A6 75 CD 3F 6A BB 4E
00000D60  14 CD 3E 0A 8B 1E D8 72  D1 E3 D1 E3 8B D3 81 C3
00000D70  88 6F CD 3D 18 CD 3F 69  81 C2 08 6F 8B DA CD 3D
00000D80  18 CD 3F 69 CD 3E 79 CD  3F BC BB B2 76 CD 3F 6A
00000D90  BB BA 72 CD 3F 6A BB BA  76 CD 3F 6A 8B 1E D8 72
00000DA0  D1 E3 D1 E3 8B D3 81 C3  08 6F CD 3D 18 81 C2 08
00000DB0  70 87 DA CD 3D 18 2B DA  CD 3F 6D CD 3E 79 A1 FE
00000DC0  72 40 A3 FE 72 A1 D8 72  40 A3 D8 72 A1 30 73 3B
00000DD0  06 D8 72 7C 03 E9 9D FC  A1 D6 72 40 A3 D6 72 A1
00000DE0  2E 73 3B 06 D6 72 7C 03  E9 7E FC A1 D4 72 40 A3
00000DF0  D4 72 A1 2A 73 3B 06 D4  72 7C 03 E9 2B FC BB E8
00000E00  74 B8 06 73 CD 3F 62 74  03 E9 0F 00 CD 3F C0 BB
00000E10  0C 00 CD 3D 05 CD 3F 6E  CD 3E 79 BB E8 74 B8 06
00000E20  73 CD 3F 62 75 03 E9 6C  2A BB C0 76 BA 02 73 CD
00000E30  3F 61 BB 17 00 CD 3E 42  BB 01 00 CD 3E 42 33 DB
00000E40  CD 3E 44 E8 10 29 BB E8  74 B8 02 73 CD 3F 62 75
00000E50  03 E9 41 2A C7 06 FE 72  63 00 C7 06 FC 72 00 00
00000E60  BB C0 74 BA 02 73 CD 3F  61 BB 17 00 CD 3E 42 BB
00000E70  01 00 CD 3E 42 33 DB CD  3E 44 E8 D9 28 BB E8 74
00000E80  B8 02 73 CD 3F 62 75 03  E9 0A 2A BB E8 74 BA 06
00000E90  73 CD 3F 61 E9 61 FB C7  06 32 73 01 00 BB E2 76
00000EA0  BA 34 73 CD 3F 61 BB E8  74 BA 38 73 CD 3F 61 BB
00000EB0  A6 75 BA 3C 73 CD 3F 61  E9 A5 01 C7 06 32 73 00
00000EC0  00 BB A6 75 BA 34 73 CD  3F 61 BB A6 75 BA 3C 73
00000ED0  CD 3F 61 BB E8 74 BA 38  73 CD 3F 61 BB F2 76 BA
00000EE0  02 73 CD 3F 61 E8 68 28  BB BA 74 B8 02 73 CD 3F
00000EF0  62 75 03 E9 0C 00 BB A6  75 BA 02 73 CD 3F 61 E9
00000F00  5E 01 BB FF FF CD 3E 32  BB E8 74 BA 38 73 CD 3F
00000F10  61 BB BA 74 BA 06 73 CD  3F 61 CD 3F BC BB 3C 00
00000F20  CD 3D 0D CD 3F 6A BB A8  72 CD 3F 6A BB 18 77 CD
00000F30  3F 6A CD 3E 79 BB 01 00  CD 3E 42 CD 3E 42 33 DB
00000F40  CD 3E 44 33 DB CD 3E 33  BB 07 00 CD 3E 35 CD 3F
00000F50  BC BB 2A 77 CD 3F 6A CD  3E 79 BB 01 00 CD 3E 42
00000F60  CD 3E 42 33 DB CD 3E 44  BB 07 00 CD 3E 33 33 DB
00000F70  CD 3E 35 BB 3E 75 CD 3F  B5 02 BB 3C 73 CD 3F 5A
00000F80  BB 3C 73 CD 3F BA 83 FB  08 7E 03 E9 74 FF BB 01
00000F90  00 BA 01 00 CD 3E 26 BB  B6 72 CD 3D 18 93 A3 12
00000FA0  73 BB 01 00 8B 16 12 73  CD 3E 26 BB B6 72 CD 3D
00000FB0  18 93 A3 40 73 BB BA 76  B8 BA 72 CD 3F 55 BA 42
00000FC0  73 CD 3F 61 BB 42 73 BA  BA 76 8B CB CD 3D 09 4B
00000FD0  87 D9 8B D1 8B C3 CD 3D  0B 92 CD 3F 61 BB 3C 73
00000FE0  B8 42 73 CD 3F 62 74 03  E9 03 00 E9 B3 00 83 3E
00000FF0  40 73 00 BB 00 00 75 01  4B 8B D3 BB 3C 73 B8 42
00001000  73 CD 3F 62 B9 00 00 76  01 49 0B CA 23 C9 74 03
00001010  E9 08 00 A1 40 73 A3 12  73 EB 86 CD 3E 2B 8B 1E
00001020  D6 72 CD 3E 42 8B 1E D8  72 CD 3E 42 33 DB CD 3E
00001030  44 CD 3F BC BB BA 76 CD  3F 6A CD 3E 79 BB 36 77
00001040  B8 3C 73 CD 3F 55 BA 02  73 CD 3F 61 E8 07 27 BB
00000810  40 A3 14 73 83 3E 14 73  04 7E AD 33 C0 E9 6F 00
00000820  A1 14 73 03 06 12 73 05  05 00 92 BB 03 00 CD 3E
00000830  26 B8 01 00 E9 4A 00 8B  1E C6 72 8B D3 D1 E3 D1
00000840  E3 81 C3 08 71 CD 3D 18  B8 64 00 8B CA F7 2E 14
00000850  73 03 C1 97 D1 E7 89 9D  C8 18 8B 1E C6 72 8B D3
00000860  D1 E3 D1 E3 81 C3 D0 71  CD 3D 18 B8 64 00 8B CA
00000870  F7 2E 14 73 03 C1 97 D1  E7 89 9D 2C 19 A1 C6 72
00000880  40 A3 C6 72 83 3E C6 72  32 7E AC A1 14 73 40 A3
00000890  14 73 83 3E 14 73 02 7E  87 B8 01 00 E9 1F 01 8B
000008A0  3E 16 73 D1 E7 83 BD E0  14 00 75 03 E9 1D 01 A1
000008B0  0C 73 03 06 D4 72 48 A3  18 73 A1 D4 72 E9 EB 00
000008C0  BB 72 36 CD 3F 34 A1 00  73 A3 1A 73 B8 01 00 E9
000008D0  16 00 BB 1C 73 CD 3F 0F  BB 1E 73 CD 3F 0F BB 20
000008E0  73 CD 3F 0F A1 22 73 40  A3 22 73 A1 1A 73 3B 06
000008F0  22 73 7D DE A1 20 73 A3  24 73 B8 01 00 E9 98 00
00000900  A1 1E 73 A3 26 73 A1 1C  73 E9 79 00 B8 05 00 F7
00000910  2E D8 72 97 03 3E D6 72  D1 E7 D1 E7 D1 E7 D1 E7
00000920  D1 E7 03 3E 00 73 D1 E7  8B 9D AA 19 23 DB 7D 02
00000930  F7 DB 8B 36 16 73 D1 E6  3B 9C E0 14 BA 00 00 75
00000940  01 4A 8B 9D AA 41 3B 9C  C8 18 B9 00 00 75 01 49
00000950  23 CA 23 C9 74 03 E9 0[illegible]  00 E9 25 00 B8 05 00 F7
00000960  2E D8 72 97 03 3E D6 72  D1 E7 D1 E7 D1 E7 D1 E7
```

```
00000970  D1 E7 03 3E 00 73 D1 E7  C7 85 AA 19 00 00 E9 39
00000980  00 A1 D8 72 40 A3 D8 72  A1 26 73 3B 06 D8 72 7C
00000990  03 E9 78 FF A1 D6 72 40  A3 D6 72 A1 24 73 3B 06
000009A0  D6 72 7C 03 E9 59 FF A1  00 73 40 A3 00 73 A1 18
000009B0  73 3B 06 00 73 7C 03 E9  06 FF A1 16 73 40 A3 16
000009C0  73 81 3E 16 73 FA 00 7F  03 E9 D3 FE C7 06 10 73
000009D0  01 00 A1 0E 73 40 A3 0E  73 E9 BE FD 83 3E 10 73
000009E0  00 75 03 E9 35 04 C7 06  FC 72 00 00 C7 06 FE 72
000009F0  63 00 A1 D4 72 A3 28 73  BB FF FF CD 3E 32 BB E8
00000A00  74 B8 06 73 CD 3F 62 74  03 E9 0C 00 CD 3F BC BB
00000A10  54 75 CD 3F 6E CD 3E 79  A1 0C 73 03 06 28 73 48
00000A20  A3 2A 73 A1 28 73 E9 C6  03 BB 72 36 CD 3F 34 A1
00000A30  D4 72 A3 2C 73 B8 01 00  E9 16 00 BB 1C 73 CD 3F
00000A40  0F BB 1E 73 CD 3F 0F BB  20 73 CD 3F 0F A1 22 73
00000A50  40 A3 22 73 A1 2C 73 3B  06 22 73 7D DE A1 20 73
00000A60  A3 2E 73 B8 01 00 E9 73  03 A1 1E 73 A3 30 73 A1
00000A70  1C 73 E9 54 03 BB BA 74  B8 06 73 CD 3F 62 75 03
00000A80  E9 02 01 83 3E FE 72 35  7F 03 E9 67 01 83 3E FE
00000A90  72 3C 7C 03 E9 0F 00 CD  3F C0 BB 0C 00 CD 3D 05
00000AA0  CD 3F 6E CD 3E 79 A1 FC  72 40 A3 FC 72 CD 3F C0
00000AB0  BB 50 00 CD 3F 37 BB 3E  75 CD 3F 6A BB 68 75 CD
00000AC0  3F 6A 8B 1E FC 72 CD 3F  6D CD 3E 79 CD 3F C0 BB
00000AD0  50 00 CD 3F 37 BB 3E 75  CD 3F 6A BB 72 75 CD 3F
00000AE0  6A BB F2 72 CD 3F 6E CD  3E 79 CD 3F C0 BB 14 00
00000AF0  CD 3F 37 BB 3E 75 CD 3F  6A BB 7C 75 CD 3F 6E CD
00000B00  3E 79 CD 3F C0 BB 19 00  CD 3F 37 BB 3E 75 CD 3F
00000B10  6A BB 96 75 CD 3F 6A 8B  1E 0A 73 CD 3F 6D CD 3E
00000B20  79 CD 3F C0 BB A6 75 CD  3F 6E CD 3E 79 CD 3F C0
00000B30  BB 14 00 CD 3F 37 BB 3E  75 CD 3F 6A BB AC 75 CD
00000B40  3F 6A 8B 1E 0A 73 CD 3F  6D CD 3E 79 CD 3F C0 BB
00000B50  DA 75 CD 3F 6A BB 10 00  CD 3F 35 BB 3E 75 CD 3F
00000B60  6A BB 22 76 CD 3F 6E CD  3E 79 CD 3F C0 BB 68 00
00000B70  BA 2D 00 CD 3D 0E CD 3F  6E CD 3E 79 C7 06 FE 72
00000B80  06 00 E9 6F 00 83 3E FE  72 14 7D 03 E9 65 00 83
00000B90  3E FE 72 1E 7E 03 E9 2B  00 BB 17 00 CD 3E 42 BB
00000BA0  01 00 CD 3E 42 33 DB CD  3E 44 BB 32 76 BA 02 73
00000BB0  CD 3F 61 E8 A0 2B BB E8  74 B8 02 73 CD 3F 62 75
00000BC0  03 E9 57 02 BB FF FF CD  3E 32 CD 3F BC BB 14 00
00000BD0  CD 3F 37 BB 3E 75 CD 3F  6A BB 46 76 CD 3F 6E CD
00000BE0  3E 79 CD 3F BC BB 66 76  CD 3F 6E CD 3E 79 C7 06
00000BF0  FE 72 00 00 B8 05 00 F7  2E D8 72 97 03 3E D6 72
00000C00  D1 E7 D1 E7 D1 E7 D1 E7  D1 E7 03 3E D4 72 D1 E7
00000C10  83 BD AA 19 00 75 03 E9  AB 01 B8 05 00 F7 2E D4
00000C20  72 03 06 D6 72 05 FB FF  92 BB 02 00 CD 3E 26 8B
000003F0  76 FF A1 AC 72 A3 D2 72  B8 01 00 E9 A2 00 B8 01
00000400  00 E9 8B 00 B8 05 00 F7  2E D4 72 03 06 D6 72 05
00000410  FB FF 92 BB 02 00 CD 3E  26 B8 01 00 E9 62 00 8B
00000420  1E D8 72 8B D3 D1 E3 D1  E3 81 C3 88 6E CD 3D 18
00000430  B8 05 00 F7 EA 97 03 3E  D6 72 D1 E7 D1 E7 D1 E7
00000440  D1 E7 D1 E7 03 3E D4 72  D1 E7 89 9D AA 19 8B 1E
00000450  D8 72 8B D3 D1 E3 D1 E3  81 C3 88 70 CD 3D 18 B8
00000460  05 00 F7 EA 97 03 3E D6  72 D1 E7 D1 E7 D1 E7 D1
00000470  E7 D1 E7 03 3E D4 72 D1  E7 89 9D AA 41 A1 D8 72
00000480  40 A3 D8 72 83 3E D8 72  20 7E 94 A1 D6 72 40 A3
00000490  D6 72 83 3E D6 72 05 7F  03 E9 68 FF A1 D4 72 40
000004A0  A3 D4 72 A1 D2 72 3B 06  D4 72 7C 03 E9 4F FF BB
000004B0  03 00 CD 3E 21 BB 6C 74  CD 3E 1F BB 03 00 BA 72
000004C0  74 B9 00 01 CD 3E 1E BB  03 00 CD 3F B3 BB DA 72
000004D0  BA 02 00 CD 3F B4 BB DE  72 CD 3F B4 BB E2 72 8B
000004E0  CA BA 0E 00 CD 3F B4 BB  E6 72 BA 1E 00 CD 3F B4
000004F0  8B D1 BB EA 72 CD 3F B4  BB EE 72 BA 04 00 CD 3F
00000500  B4 33 C0 E9 51 00 33 C0  E9 3E 00 BB 03 00 CD 3F
00000510  B3 8B 1E C6 72 8B D3 D1  E3 D1 E3 8B 0E C8 72 8B
00000520  C1 D1 E1 03 CB 83 C1 38  87 D1 BB CA 72 CD 3F B4
00000530  BB 32 00 F7 EB 03 C1 D1  E0 D1 E0 05 0C 71 93 BA
00000540  02 00 CD 3F B4 A1 C8 72  40 A3 C8 72 83 3E C8 72
00000550  01 7E B8 A1 C6 72 40 A3  C6 72 83 3E C6 72 31 7E
00000560  A5 8B 1E B0 72 83 C3 F6  CD 3F 5E 04 BB 0C 97 0C
00000570  74 03 A4 22 BB A4 36 CD  3F 34 CD 3D 23 BA F2 72
00000580  CD 3F 61 BB F2 72 CD 3D  13 CD 3F 78 93 A3 F6 72
00000590  B8 01 00 E9 0A 00 BB F8  72 CD 3F 10 A1 C6 72 40
000005A0  A3 C6 72 A1 F6 72 3B 06  C6 72 7D EA BB F2 72 BA
000005B0  7E 74 8B CB CD 3D 09 87  D9 CD 3F BA 2B D9 93 A3
000005C0  C6 72 BB F2 72 8B 16 C6  72 8B CB CD 3D 0C 8B D1
```

| | | | | | | | | | | | | | | | | |
|---|---|---|---|---|---|---|---|---|---|---|---|---|---|---|---|---|
| 000005D0 | CD | 3F | 61 | BB | F2 | 72 | CD | 3D | 13 | 8B | D3 | BB | 16 | 00 | CD | 3D |
| 000005E0 | 12 | B8 | F8 | 72 | CD | 3F | 55 | 93 | BB | 84 | 74 | CD | 3F | 55 | 87 | DA |
| 000005F0 | 8B | CA | BA | 04 | 00 | 8B | C3 | CD | 3D | 0C | 91 | CD | 3F | 55 | 8B | D1 |
| 00000600 | CD | 3F | 61 | C7 | 06 | FC | 72 | 00 | 00 | C7 | 06 | FE | 72 | 3C | 00 | C7 |
| 00000610 | 06 | 00 | 73 | 00 | 00 | BB | 8A | 74 | BA | 02 | 73 | CD | 3F | 61 | E8 | 2F |
| 00000620 | 31 | BB | 02 | 73 | BA | 06 | 73 | CD | 3F | 61 | BB | BA | 74 | B8 | 06 | 73 |
| 00000630 | CD | 3F | 62 | 75 | 03 | E9 | 1A | 00 | BB | C0 | 74 | BA | 02 | 73 | CD | 3F |
| 00000640 | 61 | E8 | 0C | 31 | BB | E8 | 74 | B8 | 02 | 73 | CD | 3F | 62 | 75 | 03 | E9 |
| 00000650 | 68 | 1D | BB | EE | 74 | BA | 02 | 73 | CD | 3F | 61 | E8 | F2 | 30 | BB | E8 |
| 00000660 | 74 | B8 | 02 | 73 | CD | 3F | 62 | 75 | 03 | E9 | 11 | 16 | BB | FF | FF | CD |
| 00000670 | 3E | 32 | CD | 3F | BC | BB | 14 | 75 | CD | 3F | 6A | CD | 3E | 79 | BB | 01 |
| 00000680 | 00 | CD | 3E | 42 | BB | 14 | 00 | CD | 3E | 42 | 33 | DB | CD | 3E | 44 | 33 |
| 00000690 | DB | CD | 3E | 33 | BB | 07 | 00 | CD | 3E | 35 | CD | 3F | BC | BB | 24 | 75 |
| 000006A0 | CD | 3F | 6A | 8B | 1E | AE | 72 | CD | 3F | 69 | CD | 3E | 79 | BB | 01 | 00 |
| 000006B0 | CD | 3E | 42 | BB | 0D | 00 | CD | 3E | 42 | 33 | DB | CD | 3E | 44 | BB | 07 |
| 000006C0 | 00 | CD | 3E | 33 | 33 | DB | CD | 3E | 35 | BB | 3E | 75 | CD | 3F | B5 | 00 |
| 000006D0 | CD | 3F | B7 | 01 | 01 | BB | D4 | 72 | CD | 3F | B8 | A1 | D4 | 72 | A3 | 0A |
| 000006E0 | 73 | 83 | 3E | D4 | 72 | 01 | BB | 00 | 00 | 7D | 01 | 4B | A1 | AE | 72 | 3B |
| 000006F0 | 06 | D4 | 72 | BA | 00 | 00 | 7D | 01 | 4A | 0B | D3 | 23 | D2 | 74 | 03 | E9 |
| 00000700 | 7C | FF | BB | 01 | 00 | CD | 3E | 42 | BB | 08 | 00 | CD | 3E | 42 | 33 | DB |
| 00000710 | CD | 3E | 44 | CD | 3F | BC | BB | 3C | 00 | CD | 3D | 0D | CD | 3F | 6A | CD |
| 00000720 | 3E | 79 | BB | FF | FF | CD | 3E | 32 | CD | 3F | BC | BB | 42 | 75 | CD | 3F |
| 00000730 | 6E | CD | 3E | 79 | 8B | 1E | D4 | 72 | CD | 3F | 5E | 05 | 46 | 05 | 55 | 05 |
| 00000740 | 64 | 05 | 73 | 05 | 82 | 05 | C7 | 06 | D4 | 72 | 01 | 00 | C7 | 06 | 0C | 73 |
| 00000750 | 08 | 00 | E9 | 39 | 00 | C7 | 06 | D4 | 72 | 09 | 00 | C7 | 06 | 0C | 73 | 07 |
| 00000760 | 00 | E9 | 2A | 00 | C7 | 06 | D4 | 72 | 10 | 00 | C7 | 06 | 0C | 73 | 07 | 00 |
| 00000770 | E9 | 1B | 00 | C7 | 06 | D4 | 72 | 18 | 00 | C7 | 06 | 0C | 73 | 05 | 00 | E9 |
| 00000780 | 0C | 00 | C7 | 06 | D4 | 72 | 1C | 00 | C7 | 06 | 0C | 73 | 05 | 00 | C7 | 06 |
| 00000790 | 0E | 73 | 01 | 00 | C7 | 06 | 10 | 73 | 00 | 00 | 8B | 1E | 0E | 73 | D1 | E3 |
| 000007A0 | D1 | E3 | D1 | E3 | 83 | C3 | F9 | 93 | A3 | 12 | 73 | BB | 03 | 00 | 8B | 16 |
| 000007B0 | 12 | 73 | CD | 3E | 26 | BB | 03 | 00 | CD | 3D | 2F | 83 | FB | FF | 75 | 03 |
| 000007C0 | E9 | 19 | 02 | 33 | C0 | E9 | 49 | 00 | A1 | 14 | 73 | 03 | 06 | 12 | 73 | 92 |
| 000007D0 | BB | 03 | 00 | CD | 3E | 26 | B8 | 01 | 00 | E9 | 27 | 00 | 8B | 1E | C6 | 72 |
| 000007E0 | 8B | D3 | D1 | E3 | D1 | E3 | 81 | C3 | 08 | 71 | CD | 3D | 18 | B8 | 32 | 00 |
| 000007F0 | 8B | CA | F7 | 2E | 14 | 73 | 03 | C1 | 97 | D1 | E7 | 89 | 9D | E0 | 14 | A1 |
| 00000800 | C6 | 72 | 40 | A3 | C6 | 72 | 83 | 3E | C6 | 72 | 32 | 7E | CF | A1 | 14 | 73 |
| 00000000 | 4D | 5A | C7 | 00 | 2D | 00 | 0C | 00 | 20 | 00 | B6 | 04 | FF | FF | 02 | 0A |
| 00000010 | 00 | 02 | 1B | F0 | 30 | 00 | 00 | 00 | 1E | 00 | 00 | 00 | 01 | 00 | 12 | 00 |
| 00000020 | 00 | 00 | 14 | 00 | 00 | 00 | 16 | 00 | 00 | 00 | 33 | 00 | 00 | 00 | 38 | 00 |
| 00000030 | 00 | 00 | 86 | 00 | 1B | 04 | 1B | 00 | 37 | 05 | 01 | 02 | 37 | 05 | 06 | 02 |
| 00000040 | 37 | 05 | 11 | 02 | 37 | 05 | 32 | 02 | 37 | 05 | 3D | 02 | 37 | 05 | 00 | 00 |
| 00000050 | 00 | 00 | 00 | 00 | 00 | 00 | 00 | 00 | 00 | 00 | 00 | 00 | 00 | 00 | 00 | 00 |
| 00000060 | 00 | 00 | 00 | 00 | 00 | 00 | 00 | 00 | 00 | 00 | 00 | 00 | 00 | 00 | 00 | 00 |
| 00000070 | 00 | 00 | 00 | 00 | 00 | 00 | 00 | 00 | 00 | 00 | 00 | 00 | 00 | 00 | 00 | 00 |
| 00000080 | 00 | 00 | 00 | 00 | 00 | 00 | 00 | 00 | 00 | 00 | 00 | 00 | 00 | 00 | 00 | 00 |
| 00000090 | 00 | 00 | 00 | 00 | 00 | 00 | 00 | 00 | 00 | 00 | 00 | 00 | 00 | 00 | 00 | 00 |
| 000000A0 | 00 | 00 | 00 | 00 | 00 | 00 | 00 | 00 | 00 | 00 | 00 | 00 | 00 | 00 | 00 | 00 |
| 000000B0 | 00 | 00 | 00 | 00 | 00 | 00 | 00 | 00 | 00 | 00 | 00 | 00 | 00 | 00 | 00 | 00 |
| 000000C0 | 00 | 00 | 00 | 00 | 00 | 00 | 00 | 00 | 00 | 00 | 00 | 00 | 00 | 00 | 00 | 00 |
| 000000D0 | 00 | 00 | 00 | 00 | 00 | 00 | 00 | 00 | 00 | 00 | 00 | 00 | 00 | 00 | 00 | 00 |
| 000000E0 | 00 | 00 | 00 | 00 | 00 | 00 | 00 | 00 | 00 | 00 | 00 | 00 | 00 | 00 | 00 | 00 |
| 000000F0 | 00 | 00 | 00 | 00 | 00 | 00 | 00 | 00 | 00 | 00 | 00 | 00 | 00 | 00 | 00 | 00 |
| 00000100 | 00 | 00 | 00 | 00 | 00 | 00 | 00 | 00 | 00 | 00 | 00 | 00 | 00 | 00 | 00 | 00 |
| 00000110 | 00 | 00 | 00 | 00 | 00 | 00 | 00 | 00 | 00 | 00 | 00 | 00 | 00 | 00 | 00 | 00 |
| 00000120 | 00 | 00 | 00 | 00 | 00 | 00 | 00 | 00 | 00 | 00 | 00 | 00 | 00 | 00 | 00 | 00 |
| 00000130 | 00 | 00 | 00 | 00 | 00 | 00 | 00 | 00 | 00 | 00 | 00 | 00 | 00 | 00 | 00 | 00 |
| 00000140 | 00 | 00 | 00 | 00 | 00 | 00 | 00 | 00 | 00 | 00 | 00 | 00 | 00 | 00 | 00 | 00 |
| 00000150 | 00 | 00 | 00 | 00 | 00 | 00 | 00 | 00 | 00 | 00 | 00 | 00 | 00 | 00 | 00 | 00 |
| 00000160 | 00 | 00 | 00 | 00 | 00 | 00 | 00 | 00 | 00 | 00 | 00 | 00 | 00 | 00 | 00 | 00 |
| 00000170 | 00 | 00 | 00 | 00 | 00 | 00 | 00 | 00 | 00 | 00 | 00 | 00 | 00 | 00 | 00 | 00 |
| 00000180 | 00 | 00 | 00 | 00 | 00 | 00 | 00 | 00 | 00 | 00 | 00 | 00 | 00 | 00 | 00 | 00 |
| 00000190 | 00 | 00 | 00 | 00 | 00 | 00 | 00 | 00 | 00 | 00 | 00 | 00 | 00 | 00 | 00 | 00 |
| 000001A0 | 00 | 00 | 00 | 00 | 00 | 00 | 00 | 00 | 00 | 00 | 00 | 00 | 00 | 00 | 00 | 00 |
| 000001B0 | 00 | 00 | 00 | 00 | 00 | 00 | 00 | 00 | 00 | 00 | 00 | 00 | 00 | 00 | 00 | 00 |
| 000001C0 | 00 | 00 | 00 | 00 | 00 | 00 | 00 | 00 | 00 | 00 | 00 | 00 | 00 | 00 | 00 | 00 |
| 000001D0 | 00 | 00 | 00 | 00 | 00 | 00 | 00 | 00 | 00 | 00 | 00 | 00 | 00 | 00 | 00 | 00 |
| 000001E0 | 00 | 00 | 00 | 00 | 00 | 00 | 00 | 00 | 00 | 00 | 00 | 00 | 00 | 00 | 00 | 00 |
| 000001F0 | 00 | 00 | 00 | 00 | 00 | 00 | 00 | 00 | 00 | 00 | 00 | 00 | 00 | 00 | 00 | 00 |
| 00000200 | 62 | 6D | 53 | 43 | 48 | 45 | 44 | 20 | 20 | 20 | 00 | 00 | 12 | 44 | 40 | 14 |
| 00000210 | 20 | 38 | 25 | 04 | 37 | 05 | 6D | 05 | 40 | 14 | 00 | 00 | 40 | 14 | 40 | 14 |
| 00000220 | 30 | 38 | 08 | 00 | 00 | 00 | 00 | 00 | 00 | 00 | 00 | 00 | FF | FF | 80 | 00 |
| 00000230 | 9A | 00 | 00 | 37 | 05 | 9A | 77 | 00 | 1B | 04 | BB | FF | FF | CD | 3E | 32 |
| 00000240 | 33 | DB | CD | 3E | 3C | BB | 30 | 38 | BA | 90 | 36 | CD | 3F | 61 | BB | 36 |
| 00000250 | 38 | BA | 94 | 36 | CD | 3F | 61 | BB | 0D | 00 | CD | 3D | 05 | BA | 98 | 36 |

```
00000260  CD 3F 61 BB 11 00 CD 3D  05 8B D3 BB C4 00 CD 3D
00000270  05 92 CD 3F 55 8B D3 BB  D9 00 CD 3D 05 92 CD 3F
00000280  55 BA 9C 3F CD 3F 61 CD  3E 22 C7 06 A0 36 20 00
00000290  C7 06 A2 36 05 00 BB 3C  38 BA A4 36 CD 3F 61 BB
000002A0  42 38 BA A8 36 CD 3F 61  BB 48 38 BA AC 36 CD 3F
000002B0  61 BB 20 00 8B D3 CD 3D  0E BA B0 36 CD 3F 61 BB
000002C0  4E 38 CD 3E 1F BB 01 00  BA 54 38 33 C9 CD 3E 1E
000002D0  BB 01 00 CD 3F B6 CD 3F  B7 01 01 BB B4 36 CD 3F
000002E0  B8 CD 3E 22 BB 01 00 CD  3E 21 BB 66 38 CD 3E 1F
000002F0  BB 01 00 BA 6C 38 B9 30  00 CD 3E 1E BB 01 00 CD
00000300  3F B3 BB B6 36 BA 02 00  CD 3F B4 BB BA 36 CD 3F
00000310  B4 BB BE 36 BA 08 00 CD  3F B4 BB C2 36 BA 1E 00
00000320  CD 3F B4 BB C6 36 BA 03  00 CD 3F B4 BB 02 00 CD
00000330  3E 21 BB 66 38 CD 3E 1F  BB 02 00 BA 7A 38 B9 40
00000340  01 CD 3E 1E 33 C0 E9 7D  00 33 C0 E9 6A 00 BB 02
00000350  00 CD 3F B3 B8 0A 00 F7  2E CA 36 8B 1E CC 36 8B
00000360  D3 D1 E3 03 D8 CD 3F 57  BF 88 38 CD 3F 91 BB 1A
00000370  00 CD 3F 71 80 CD 3D 03  CD 3F 77 87 D3 8B CB BB
00000380  CE 36 CD 3F B4 BB 20 38  CD 3D 03 CD 3F 77 8B D3
00000390  BB D2 36 CD 3F B4 D1 E1  D1 E1 D1 E1 D1 E1 D1 E1
000003A0  03 0E CA 36 D1 E1 D1 E1  81 C1 E0 31 8B D9 BA 02
000003B0  00 CD 3F B4 A1 CC 36 40  A3 CC 36 83 3E CC 36 04
000003C0  7E 8C A1 CA 36 40 A3 CA  36 83 3E CA 36 1F 7F 03
000003D0  E9 76 FF BB 03 00 CD 3E  21 BB 66 38 CD 3E 1F BB
000003E0  03 00 BA 8C 38 B9 00 01  CD 3E 1E BB 03 00 CD 3F
00005670  0D 00 90 1E 0E 1F F3 A4  1F B0 00 B4 3D CD 21 73
00005680  05 EB A6 E9 2F 01 5F 8B  D8 BA B0 13 B9 1A 00 B4
00005690  3F CD 21 72 EE 81 3E B0  13 4D 5A 75 E6 8B 16 B8
000056A0  13 83 C2 1F 81 E2 E0 FF  8B EA B1 04 D3 E2 33 C9
000056B0  B0 00 B4 42 CD 21 72 CB  8B 16 B4 13 4A B1 05 D3
000056C0  E2 2B D5 A1 B2 13 05 0F  00 B1 04 D3 E8 03 D0 89
000056D0  16 B4 13 2B FA 83 EF 14  8C D6 8B D4 83 C2 11 B1
000056E0  04 D3 EA 03 F2 3B FE 73  03 E9 CE 00 8B EF 1E 8E
000056F0  DF B9 FF FF 33 D2 B4 3F  CD 21 1F 72 86 8B 16 C8
00005700  13 41 B0 00 B4 42 CD 21  72 12 3B 0E B6 13 74 23
00005710  BA B0 13 B9 04 00 B4 3F  CD 21 73 03 E9 96 00 8B
00005720  3E B0 13 A1 B2 13 03 C5  8E C0 26 01 2D FF 0E B6
00005730  13 75 E3 B4 3E CD 21 73  03 EB 7A 90 01 2E C6 13
00005740  A1 C6 13 8B 1E C4 13 8E  C0 26 80 7F 03 05 75 5F
00005750  26 80 7F 04 06 75 58 26  80 7F 05 00 72 51 5B 1E
00005760  07 8E DD B9 D8 09 33 F6  8B FE FC F3 A5 06 1F 1E
00005770  B8 25 04 8E D8 B9 37 05  2B C8 D1 E1 D1 E1 D1 E1
00005780  B8 F0 08 8E C0 33 F6 33  FF F3 A5 1F 8C D1 8C D8
00005790  2B C8 81 F9 00 10 76 03  B9 00 10 D1 E1 D1 E1 D1
000057A0  E1 BA 25 04 8E C2 33 F6  8B FE EA 10 00 1B 04 5B
000057B0  BA BC 02 EB 12 BA E0 02  EB 0D BA A6 02 EB 08 BA
000057C0  86 02 EB 03 BA 61 02 0E  1F B4 09 CD 21 33 C0 50
000057D0  CB 0D 0A 4D 75 73 74 20  72 75 6E 20 75 6E 64 65
000057E0  72 20 44 4F 53 20 32 2E  30 30 20 6F 72 20 6C 61
000057F0  74 65 72 0D 0A 24 0D 0A  4D 75 73 74 20 6C 69 6E
00005800  6B 20 77 69 74 68 20 42  41 53 43 4F 4D 32 30 2E
00005810  4C 49 42 0D 0A 24 0D 0A  50 72 6F 67 72 61 6D 20
00005820  74 6F 6F 20 6C 61 72 67  65 0D 0A 24 0D 0A 57 72
00005830  6F 6E 67 20 76 65 72 73  69 6F 6E 20 6F 66 20 72
00005840  75 6E 74 69 6D 65 20 6D  6F 64 75 6C 65 0D 0A 24
00005850  0D 0A 45 72 72 6F 72 20  69 6E 20 45 58 45 20 66
00005860  69 6C 65 0D 0A 24 0D 0A  43 61 6E 6E 6F 74 20 66
00005870  69 6E 64 20 0D 0A 24 0D  0A 43 61 6E 6E 6F 74 20
00005880  66 69 6E 64 20 42 41 53  52 55 4E 32 30 2E 45 58
00005890  45 0D 0A 45 6E 74 65 72  20 6E 65 77 20 70 61 74
000058A0  68 20 73 70 65 63 69 66  69 63 61 74 69 6F 6E 3A
000058B0  20 24 0D 0A 24 42 41 53  52 55 4E 32 30 2E 45 58
000058C0  45 00 50 41 54 48 3D
00005250  38 2C 35 2C 31 36 2C 39  2C 35 2C 31 34 2C 31 30
00005260  2C 35 2C 31 32 2C 2D 31  2C 2D 31 2C 2D 31 00 92
00005270  41 20 31 2C 35 2C 39 2C  32 2C 35 2C 37 2C 33 2C
00005280  35 2C 35 2C 34 2C 35 2C  33 2C 35 2C 35 2C 31 2C
00005290  36 2C 35 2C 31 39 2C 37  2C 35 2C 31 37 2C 38 2C
000052A0  35 2C 31 35 2C 39 2C 35  2C 31 33 2C 31 30 2C 35
000052B0  2C 31 31 2C 2D 31 2C 2D  31 2C 2D 31 00 93 41 20
000052C0  31 2C 31 2C 31 35 2C 32  2C 31 2C 31 34 2C 33 2C
000052D0  32 2C 31 35 2C 34 2C 32  2C 31 34 2C 35 2C 33 2C
000052E0  31 35 2C 36 2C 33 2C 31  34 2C 2D 31 2C 2D 31 2C
000052F0  2D 31 00 94 41 20 31 2C  31 2C 31 33 2C 32 2C 31
```

```
00005300  2C 31 32 2C 33 2C 32 2C  31 33 2C 34 2C 32 2C 31
00005310  32 2C 35 2C 33 2C 31 33  2C 36 2C 33 2C 31 32 2C
00005320  2D 31 2C 2D 31 2C 2D 31  00 95 41 20 31 2C 31 2C
00005330  31 31 2C 32 2C 32 2C 31  31 2C 33 2C 33 2C 31 31
00005340  2C 2D 31 2C 2D 31 2C 2D  31 00 96 41 20 2D 31 2C
00005350  2D 31 2C 2D 31 00 97 41  20 2D 31 2C 2D 31 2C 2D
00005360  31 00 98 41 20 31 2C 35  2C 39 2C 32 2C 35 2C 37
00005370  2C 33 2C 35 2C 35 2C 34  2C 35 2C 33 2C 35 2C 35
00005380  2C 31 2C 36 2C 35 2C 31  39 2C 37 2C 35 2C 31 37
00005390  2C 38 2C 35 2C 31 35 2C  39 2C 35 2C 31 33 2C 31
000053A0  30 2C 35 2C 31 31 2C 2D  31 2C 2D 31 2C 2D 31 00
000053B0  99 41 20 31 2C 35 2C 31  30 2C 32 2C 35 2C 38 2C
000053C0  33 2C 35 2C 36 2C 34 2C  35 2C 34 2C 35 2C 35 2C
000053D0  32 2C 36 2C 35 2C 32 30  2C 37 2C 35 2C 31 38 2C
000053E0  38 2C 35 2C 31 36 2C 39  2C 35 2C 31 34 2C 31 30
000053F0  2C 35 2C 31 32 2C 2D 31  2C 2D 31 2C 2D 31 00 9A
00005400  41 20 32 2C 31 2C 36 2C  34 2C 32 2C 36 2C 36 2C
00005410  33 2C 36 2C 2D 31 2C 2D  31 2C 2D 31 00 9B 41 20
00005420  31 2C 31 2C 38 2C 33 2C  33 2C 38 2C 2D 31 2C 2D
00005430  31 2C 2D 31 00 9C 41 20  31 2C 31 2C 31 30 2C 32
00005440  2C 31 2C 39 2C 35 2C 33  2C 31 30 2C 36 2C 33 2C
00005450  39 2C 2D 31 2C 2D 31 2C  2D 31 00 9D 41 20 2D 31
00005460  2C 2D 31 2C 2D 31 00 9E  41 20 2D 31 2C 2D 31 2C
00005470  2D 31 00 9F 41 20 31 2C  33 2C 39 2C 32 2C 33 2C
00005480  31 30 2C 33 2C 33 2C 31  31 2C 34 2C 33 2C 31 32
00005490  2C 35 2C 33 2C 31 33 2C  2D 31 2C 2D 31 2C 2D 31
000054A0  00 A0 41 20 31 2C 33 2C  31 2C 32 2C 33 2C 32 2C
000054B0  33 2C 33 2C 33 2C 2D 31  2C 2D 31 2C 2D 31 00 A1
000054C0  41 20 31 2C 31 2C 31 2C  32 2C 32 2C 31 2C 2D 31
000054D0  2C 2D 31 2C 2D 31 00 A2  41 20 31 2C 32 2C 32 2C
000054E0  2D 31 2C 2D 31 2C 2D 31  00 A3 41 20 2D 31 2C 2D
000054F0  31 2C 2D 31 00 A4 41 20  31 2C 32 2C 38 2C 32 2C
00005500  32 2C 39 2C 33 2C 32 2C  31 30 2C 34 2C 32 2C 31
00005510  31 2C 35 2C 32 2C 31 32  2C 2D 31 2C 2D 31 2C 2D
00005520  31 00 A5 41 20 31 2C 32  2C 32 2C 2D 31 2C 2D 31
00005530  2C 2D 31 00 A6 41 20 31  2C 32 2C 31 2C 2D 31 2C
00005540  2D 31 2C 2D 31 00 A7 41  20 31 2C 33 2C 31 2C 32
00005550  2C 33 2C 32 2C 2D 31 2C  2D 31 2C 2D 31 00 A8 41
00005560  20 2D 31 2C 2D 31 2C 2D  31 00 FF FF 01 00 00 00
00005570  59 1F A0 01 00 1E 51 06  3C 6D 74 03 E9 40 02 B4
00005580  30 CD 21 3C 02 73 03 E9  3A 02 BA 6D 05 8E DA 26
00005590  8B 3E 02 00 26 8B 2E 2C  00 8E C2 57 B0 00 BA 45
000055A0  03 1E 0E 1F B4 3D CD 21  1F 72 03 E9 D8 00 8E C5
000055B0  33 FF B9 05 00 BE 52 03  1E 0E 1F F3 A6 1F 74 13
000055C0  26 8A 05 47 0A C0 75 F8  26 80 3D 00 75 E4 1E 07
000055D0  EB 57 90 1E 07 1E 8E DD  8B F7 81 3C 00 20 1F 74
000055E0  48 BF CA 13 8B D7 1E 8E  DD AC 3C 3B 74 07 3C 00
000055F0  74 03 AA EB F4 1F 8B D8  81 FF CA 13 74 0F 80 7D
00005600  FF 3A 74 09 80 7D FF 5C  74 03 B0 5C AA 56 BE 45
00005610  03 B9 0D 00 90 1E 0E 1F  F3 A4 1F 5E B0 00 B4 3D
00005620  CD 21 73 62 80 FB 3B 74  B8 1E 0E 1F BA 07 03 B4
00005630  09 CD 21 1F C6 06 CA 13  40 BA CA 13 B4 0A CD 21
00005640  1E 0E 1F BA 04 03 B4 09  CD 21 1F B7 00 8A 1E CB
00005650  13 80 BF CB 13 3A 74 0D  80 BF CB 13 5C 74 06 C6
00005660  87 CC 13 5C 43 BA CC 13  8D BF CC 13 BE 45 03 B9
00004E30  68 20 74 6F 20 63 61 6E  63 65 6C 20 6F 6E 6C 79
00004E40  20 6F 6E 65 20 63 65 6C  6C 20 61 74 20 61 20 74
00004E50  69 6D 65 00 30 00 38 42  44 6F 20 79 6F 75 20 77
00004E60  69 73 68 20 74 6F 20 63  61 6E 63 65 6C 20 6F 6E
00004E70  6C 79 20 6F 6E 65 20 6F  66 20 74 68 65 20 73 75
00004E80  70 65 72 63 65 6C 6C 73  0F 00 6C 42 53 75 70 65
00004E90  72 63 65 6C 6C 20 23 31  2D 35 3D 00 33 00 80 42
00004EA0  44 6F 20 79 6F 75 20 77  69 73 68 20 74 6F 20 63
00004EB0  61 6E 63 65 6C 20 6F 6E  6C 79 20 6F 6E 65 20 6B
00004EC0  69 74 20 77 69 74 68 69  6E 20 73 75 70 65 72 63
00004ED0  65 6C 6C 00 0A 00 B8 42  4B 69 74 20 23 31 2D 31
00004EE0  30 3D 07 00 C6 42 43 65  6C 6C 20 23 20 00 0D 00
00004EF0  D2 42 43 65 6C 6C 73 20  69 6E 20 55 73 65 3D 00
00004F00  01 00 E4 42 2C 00 3A 00  EA 42 54 48 49 53 20 43
00004F10  45 4C 4C 20 4E 4F 54 20  41 43 54 49 56 45 21 20
00004F20  2D 20 44 6F 20 79 6F 75  20 77 69 73 68 20 74 6F
00004F30  20 73 65 6C 65 63 74 20  61 6E 6F 74 68 65 72 20
00004F40  63 65 6C 6C 1F 00 28 43  23 20 4F 46 20 4B 49 54
00004F50  53 20 54 4F 20 42 45 20  42 55 49 4C 54 20 49 4E
```

```
00004F60  20 43 45 4C 4C 20 23 00  0B 00 4C 43 4B 69 74 20
00004F70  4F 72 64 65 72 20 23 0B  03 00 5C 43 20 20 20 1E
00004F80  14 00 64 43 51 75 61 6E  69 74 79 20 74 6F 20 62
00004F90  65 20 62 75 69 6C 74 3D  08 00 7C 43 20 2D 43 41
00004FA0  4E 43 45 4C 24 00 88 43  44 6F 20 79 6F 75 20 77
00004FB0  69 73 68 20 74 6F 20 63  61 6E 63 65 6C 20 61 6C
00004FC0  6C 20 74 68 65 73 65 20  6B 69 74 73 16 00 B0 43
00004FD0  4B 69 74 20 4F 72 64 65  72 20 23 20 74 6F 20 43
00004FE0  61 6E 63 65 6C 3D 21 00  CA 43 41 52 45 20 54 48
00004FF0  45 52 45 20 41 4E 59 20  4D 4F 52 45 20 4B 49 54
00005000  53 20 54 4F 20 43 41 4E  43 45 4C 00 09 00 F0 43
00005010  2D 20 59 20 6F 72 20 4E  20 00 01 00 FE 43 79 00
00005020  01 00 04 44 6E 00 00 00  00 00 00 00 00 00 00 00
00005030  3C 0D 20 31 2C 31 36 30  2C 31 36 31 2C 33 30 30
00005040  2C 33 30 31 2C 34 34 30  2C 34 34 31 2C 35 34 30
00005050  2C 35 34 31 2C 36 34 30  00 44 10 20 31 2C 38 2C
00005060  39 2C 31 35 2C 31 36 2C  32 32 2C 32 33 2C 32 37
00005070  2C 32 38 2C 33 32 00 86  41 20 31 2C 31 30 2C 34
00005080  2C 31 2C 39 2C 34 2C 31  2C 36 2C 34 2C 31 2C 36
00005090  2C 34 2C 31 2C 34 2C 34  2C 31 2C 33 2C 33 2C 31
000050A0  2C 33 2C 33 2C 31 2C 31  35 2C 35 2C 31 2C 31 32
000050B0  2C 34 2C 31 2C 31 32 2C  34 2C 31 2C 36 2C 34 00
000050C0  87 41 20 31 2C 31 32 2C  34 2C 31 2C 36 2C 34 2C
000050D0  31 2C 36 2C 33 2C 31 2C  32 30 2C 35 2C 31 2C 31
000050E0  32 2C 34 2C 31 2C 31 32  2C 34 2C 31 2C 36 2C 34
000050F0  2C 31 2C 36 2C 34 2C 31  2C 36 2C 34 2C 31 2C 36
00005100  2C 33 2C 31 2C 32 30 2C  35 00 88 41 20 31 2C 37
00005110  2C 34 2C 31 2C 34 2C 34  2C 31 2C 33 2C 34 2C 31
00005120  2C 33 2C 34 2C 31 2C 32  30 2C 34 2C 31 2C 37 2C
00005130  34 2C 31 2C 32 2C 34 2C  31 2C 32 2C 34 2C 31 2C
00005140  37 2C 34 2C 31 2C 32 30  2C 34 00 89 41 20 31 2C
00005150  35 2C 39 2C 32 2C 35 2C  37 2C 33 2C 35 2C 35 2C
00005160  34 2C 35 2C 33 2C 35 2C  35 2C 31 2C 2D 31 2C 2D
00005170  31 2C 2D 31 00 8A 41 20  31 2C 35 2C 31 30 2C 32
00005180  2C 35 2C 38 2C 33 2C 35  2C 36 2C 34 2C 35 2C 34
00005190  2C 35 2C 35 2C 32 2C 2D  31 2C 2D 31 2C 2D 31 00
000051A0  8B 41 20 31 2C 31 2C 37  2C 32 2C 31 2C 36 2C 35
000051B0  2C 33 2C 37 2C 36 2C 33  2C 36 2C 2D 31 2C 2D 31
000051C0  2C 2D 31 00 8C 41 20 31  2C 31 2C 39 2C 32 2C 31
000051D0  2C 38 2C 34 2C 33 2C 39  2C 2D 31 2C 2D 31 2C 2D
000051E0  31 00 8D 41 20 31 2C 31  2C 31 30 2C 34 2C 33 2C
000051F0  31 30 2C 2D 31 2C 2D 31  2C 2D 31 00 8E 41 20 2D
00005200  31 2C 2D 31 2C 2D 31 00  8F 41 20 2D 31 2C 2D 31
00005210  2C 2D 31 00 90 41 20 2D  31 2C 2D 31 2C 2D 31 00
00005220  91 41 20 31 2C 35 2C 31  30 2C 32 2C 35 2C 38 2C
00005230  33 2C 35 2C 36 2C 34 2C  35 2C 34 2C 35 2C 35 2C
00005240  32 2C 36 2C 35 2C 32 30  2C 37 2C 35 2C 31 38 2C
00004A10  00 4C 6A 8F 29 00 F8 3D  49 73 20 74 68 65 20 70
00004A20  72 69 6E 74 65 72 20 72  65 61 64 79 20 74 6F 20
00004A30  70 72 69 6E 74 20 74 68  69 73 20 72 65 70 6F 72
00004A40  74 00 15 00 26 3E 31 30  20 4C 6F 77 65 73 74 20
00004A50  50 61 72 74 20 43 6F 75  6E 74 73 00 1F 00 40 3E
00004A60  54 68 65 72 65 20 61 72  65 20 65 6E 6F 75 67 68
00004A70  20 70 61 72 74 73 20 74  6F 20 62 75 69 6C 64 A5
00004A80  13 00 64 3E 20 6B 69 74  73 20 6F 6E 65 20 61 74
00004A90  20 61 20 74 69 6D 65 00  2B 00 7C 3E 44 6F 20 79
00004AA0  6F 75 20 77 69 73 68 20  74 6F 20 63 6F 6E 74 69
00004AB0  6E 75 65 20 73 63 68 65  64 75 6C 69 6E 67 20 74
00004AC0  68 69 73 20 6B 69 74 00  42 00 AC 3E 54 68 69 73
00004AD0  20 4B 69 74 20 69 73 20  61 6C 72 65 61 64 79 20
00004AE0  73 63 68 65 64 75 6C 65  64 21 20 2D 20 44 6F 20
00004AF0  79 6F 75 20 77 69 73 68  20 74 6F 20 61 64 64 2F
00004B00  73 75 62 74 72 61 63 74  20 74 6F 20 69 74 27 00
00004B10  F2 3E 23 20 6F 66 20 4B  69 74 73 20 74 6F 20 41
00004B20  64 64 2F 53 75 62 74 72  61 63 74 20 74 6F 20 49
00004B30  6E 76 65 6E 74 6F 72 79  3D 00 11 00 1E 3F 23 20
00004B40  6F 66 20 4B 69 74 73 20  4E 65 65 64 65 64 3D 00
00004B50  40 00 34 3F 20 4B 69 74  73 20 67 6F 69 6E 67 20
00004B60  74 6F 20 4C 65 66 74 20  4C 69 6E 65 20 3C 4C 3E
00004B70  20 6F 72 20 52 69 67 68  74 20 4C 69 6E 65 20 3C
00004B80  52 3E 20 6F 72 20 42 6F  74 68 20 4C 69 6E 65 73
00004B90  20 3C 42 3E 01 00 78 3F  4C 8F 01 00 7E 3F 42 00
00004BA0  1C 00 84 3F 41 52 45 20  54 48 45 52 45 20 41 4E
00004BB0  59 20 4D 4F 52 45 20 4B  49 54 53 20 46 4F 52 20
```

```
00004BC0  05 00 A4 3F 23 20 6F 66  20 84 0B 00 AE 3F 27 73
00004BD0  20 74 6F 20 62 75 69 6C  64 00 23 00 BE 3F 62 65
00004BE0  66 6F 72 65 20 4E 65 78  74 20 4B 69 74 20 69 73
00004BF0  20 74 6F 20 62 65 20 64  69 73 70 6C 61 79 65 64
00004C00  3D 00 0E 00 E6 3F 50 4C  45 41 53 45 20 53 54 41
00004C10  4E 44 42 59 16 00 F8 3F  53 65 6E 64 69 6E 67 20
00004C20  64 61 74 61 20 74 6F 20  63 65 6C 6C 20 23 01 00
00004C30  12 40 23 00 00 00 48 87  01 00 1C 40 72 17 0E 00
00004C40  22 40 64 3A 66 69 6C 65  6F 70 65 6E 2E 64 61 74
00004C50  0C 00 34 40 44 65 73 63  72 69 70 74 69 6F 6E 3A
00004C60  08 00 44 40 20 3D 20 45  6E 74 65 72 08 00 50 40
00004C70  20 20 20 20 20 20 20 20  1A 00 5C 40 20 44 4F 45
00004C80  53 20 4E 4F 54 20 45 58  49 53 54 20 49 4E 20 46
00004C90  49 4C 45 53 21 21 08 00  7A 40 43 4F 4E 54 49 4E
00004CA0  55 45 07 00 86 40 42 69  6E 20 23 20 59 AA 04 00
00004CB0  92 40 20 2D 20 58 05 00  9A 40 20 2D 20 57 43 C5
00004CC0  12 00 A4 40 20 2D 20 53  74 6F 63 6B 20 4C 6F 63
00004CD0  61 74 69 6F 6E 20 0C 00  BA 40 48 69 67 68 20 53
00004CE0  74 6F 63 6B 3D 20 0E 00  CA 40 50 72 65 73 65 6E
00004CF0  74 20 53 74 6F 63 6B 3D  0B 00 DC 40 20 20 4C 6F
00004D00  77 20 53 74 6F 63 6B 00  10 00 EC 40 20 20 2D 20
00004D10  4C 4F 57 20 53 54 4F 43  4B 21 21 21 17 00 00 41
00004D20  49 53 20 54 48 49 53 20  54 48 45 20 43 4F 52 52
00004D30  45 43 54 20 42 49 4E 00  28 00 1C 41 54 48 49 53
00004D40  20 50 41 52 54 20 23 20  44 4F 45 53 20 4E 4F 54
00004D50  20 45 58 49 53 54 20 46  4F 52 20 54 48 49 53 20
00004D60  43 45 4C 4C 32 00 48 41  44 6F 20 79 6F 75 20 77
00004D70  69 73 68 20 74 6F 20 63  6F 6E 74 69 6E 75 65 20
00004D80  75 70 64 61 74 69 6E 67  20 74 68 65 20 62 69 6E
00004D90  20 69 6E 76 65 6E 74 6F  72 79 23 00 7E 41 23 20
00004DA0  4F 46 20 50 41 52 54 53  20 41 44 44 45 44 2F 53
00004DB0  55 42 54 52 41 43 54 45  44 20 54 4F 20 42 49 4E
00004DC0  3D 00 05 00 A6 41 20 20  20 20 20 00 09 00 B0 41
00004DD0  20 20 20 20 20 20 20 20  20 00 27 00 BE 41 4E 6F
00004DE0  20 43 65 6C 6C 73 20 61  72 65 20 69 6E 20 75 73
00004DF0  65 20 61 74 20 74 68 65  20 70 72 65 73 65 6E 74
00004E00  20 74 69 6D 65 00 17 00  EA 41 48 69 74 20 61 6E
00004E10  79 20 4B 65 79 20 74 6F  20 63 6F 6E 74 69 6E 75
00004E20  65 00 2D 00 06 42 44 6F  20 79 6F 75 20 77 69 73
000045F0  0F 00 D4 39 20 4C 6F 63  61 74 69 6F 6E 20 4B 69
00004600  74 20 23 29 13 00 E8 39  20 20 20 20 20 20 20 20
00004610  20 20 20 20 20 20 20 20  20 20 20 00 00 00 18 85
00004620  05 00 04 3A 20 20 5E 20  20 00 04 00 18 00 0A 00
00004630  12 3A 44 3A 57 4F 52 4B  2E 44 44 54 02 00 20 3A
00004640  2A 2A 0B 00 26 3A 53 75  70 65 72 63 65 6C 6C 20
00004650  23 00 0E 00 36 3A 20 28  52 65 63 6F 6D 6D 65 6E
00004660  64 65 64 3D 01 00 48 3A  29 00 09 00 4E 3A 53 75
00004670  70 65 72 63 65 6C 6C 00  17 00 5C 3A 45 4E 54 45
00004680  52 20 53 55 50 45 52 43  45 4C 4C 20 23 20 31 20
00004690  54 4F 20 00 00 00 78 3A  04 00 7C 3A 43 65 6C 6C
000046A0  07 00 84 3A 43 65 6C 6C  20 23 3D 00 12 00 90 3A
000046B0  45 4E 54 45 52 20 43 45  4C 4C 20 23 20 31 20 54
000046C0  4F 20 08 00 A6 3A 20 28  30 3D 45 6E 64 29 0D 00
000046D0  B2 3A 64 3A 44 49 53 50  4C 41 59 2E 44 41 54 00
000046E0  01 00 C4 3A 2A 00 2B 00  CA 3A 43 45 4C 4C 20 41
000046F0  43 54 49 56 45 21 20 2D  20 44 6F 20 79 6F 75 20
00004700  77 69 73 68 20 74 6F 20  75 73 65 20 74 68 69 73
00004710  20 63 65 6C 6C 00 01 00  FA 3A 59 00 07 00 00 3B
00004720  4B 69 74 20 23 20 20 B6  14 00 0C 3B 45 6E 67 69
00004730  6E 65 65 72 69 6E 67 20  43 68 61 6E 67 65 20 23
00004740  02 00 24 3B 20 23 0F 00  2A 3B 49 73 20 74 68 69
00004750  73 20 63 6F 72 72 65 63  74 00 38 00 3E 3B 44 6F
00004760  20 79 6F 75 20 77 69 73  68 20 74 6F 20 61 64 64
00004770  2F 73 75 62 74 72 61 63  74 20 69 6E 76 65 6E 74
00004780  6F 72 79 20 74 6F 20 61  6C 6C 20 77 6F 72 6B 63
00004790  65 6E 74 65 72 73 2B 00  7A 3B 44 6F 20 79 6F 75
000047A0  20 77 69 73 68 20 74 6F  20 73 63 68 65 64 75 6C
000047B0  65 20 61 6C 6C 20 74 68  65 20 77 6F 72 6B 63 65
000047C0  6E 74 65 72 73 00 01 00  AA 3B 3D 00 08 00 B0 3B
000047D0  53 63 68 65 64 75 6C 65  2D 00 BC 3B 57 6F 72 6B
000047E0  63 65 6E 74 65 72 20 23  20 4E 4F 54 20 74 6F 20
000047F0  43 68 61 6E 67 65 20 49  6E 76 65 6E 74 6F 72 79
00004800  20 28 30 3D 65 6E 64 29  3D 00 25 00 EE 3B 57 6F
00004810  72 6B 63 65 6E 74 65 72  20 23 20 4E 4F 54 20 74
```

| | | | | | | | | | | | | | | | | |
|---|---|---|---|---|---|---|---|---|---|---|---|---|---|---|---|---|
| 00004820 | 6F | 20 | 73 | 63 | 68 | 65 | 64 | 75 | 6C | 65 | 20 | 28 | 30 | 3D | 65 | 6E |
| 00004830 | 64 | 29 | 3D | 00 | 01 | 00 | 18 | 3C | 3F | BF | 01 | 00 | 1E | 3C | 26 | 00 |
| 00004840 | 39 | 00 | 24 | 3C | 4E | 4F | 20 | 4F | 54 | 48 | 45 | 52 | 20 | 4B | 49 | 54 |
| 00004850 | 53 | 20 | 43 | 41 | 4E | 20 | 42 | 45 | 20 | 53 | 43 | 48 | 45 | 44 | 55 | 4C |
| 00004860 | 45 | 44 | 20 | 55 | 4E | 54 | 49 | 4C | 20 | 41 | 4C | 4C | 20 | 4B | 49 | 54 |
| 00004870 | 53 | 20 | 41 | 52 | 45 | 20 | 50 | 49 | 43 | 4B | 45 | 44 | 2E | AB | 17 | 00 |
| 00004880 | 62 | 3C | 48 | 49 | 54 | 20 | 41 | 4E | 59 | 20 | 4B | 45 | 59 | 20 | 54 | 4F |
| 00004890 | 20 | 43 | 4F | 4E | 54 | 49 | 4E | 55 | 45 | 00 | 05 | 00 | 7E | 3C | 32 | 39 |
| 000048A0 | 39 | 39 | 39 | 00 | 05 | 00 | 88 | 3C | 30 | 30 | 30 | 30 | 30 | 00 | 07 | 00 |
| 000048B0 | 92 | 3C | 50 | 61 | 72 | 74 | 20 | 23 | 20 | 32 | 01 | 00 | 9E | 3C | 2D | 41 |
| 000048C0 | 08 | 00 | A4 | 3C | 20 | 61 | 74 | 20 | 57 | 43 | 20 | 23 | 0A | 00 | B0 | 3C |
| 000048D0 | 20 | 53 | 74 | 6F | 63 | 6B | 20 | 4C | 2E | 20 | 08 | 00 | BE | 3C | 3D | 50 |
| 000048E0 | 61 | 72 | 74 | 20 | 23 | 20 | 05 | 00 | CA | 3C | 20 | 61 | 74 | 20 | 43 | 64 |
| 000048F0 | 02 | 00 | D4 | 3C | 2D | 59 | 02 | 00 | DA | 3C | 2D | 58 | 07 | 00 | E0 | 3C |
| 00004900 | 2D | 53 | 74 | 2E | 4C | 2E | 20 | 00 | 10 | 00 | EC | 3C | 43 | 6F | 6E | 74 |
| 00004910 | 69 | 6E | 75 | 65 | 20 | 44 | 69 | 73 | 70 | 6C | 61 | 79 | 11 | 00 | 00 | 3D |
| 00004920 | 50 | 61 | 72 | 74 | 73 | 20 | 4E | 6F | 74 | 20 | 49 | 6E | 20 | 43 | 65 | 6C |
| 00004930 | 6C | 00 | 1E | 00 | 16 | 3D | 44 | 6F | 20 | 79 | 6F | 75 | 20 | 77 | 69 | 73 |
| 00004940 | 68 | 20 | 61 | 20 | 70 | 72 | 69 | 6E | 74 | 6F | 75 | 74 | 20 | 6F | 66 | 20 |
| 00004950 | 74 | 68 | 69 | 73 | 24 | 00 | 38 | 3D | 49 | 73 | 20 | 74 | 68 | 65 | 20 | 70 |
| 00004960 | 72 | 69 | 6E | 74 | 65 | 72 | 20 | 72 | 65 | 61 | 64 | 79 | 20 | 74 | 6F | 20 |
| 00004970 | 70 | 72 | 69 | 6E | 74 | 20 | 72 | 65 | 70 | 6F | 72 | 74 | 15 | 00 | 60 | 3D |
| 00004980 | 20 | 20 | 45 | 6E | 67 | 69 | 6E | 65 | 65 | 72 | 69 | 6E | 67 | 20 | 43 | 68 |
| 00004990 | 61 | 6E | 67 | 65 | 20 | 00 | 21 | 00 | 7A | 3D | 44 | 6F | 20 | 79 | 6F | 75 |
| 000049A0 | 20 | 77 | 69 | 73 | 68 | 20 | 74 | 6F | 20 | 73 | 65 | 6C | 65 | 63 | 74 | 20 |
| 000049B0 | 61 | 6E | 6F | 74 | 68 | 65 | 72 | 20 | 6B | 69 | 74 | 00 | 00 | 00 | 46 | 87 |
| 000049C0 | 1F | 00 | A4 | 3D | 54 | 48 | 45 | 52 | 45 | 20 | 41 | 52 | 45 | 20 | 45 | 4E |
| 000049D0 | 4F | 55 | 47 | 48 | 20 | 50 | 41 | 52 | 54 | 53 | 20 | 54 | 4F | 20 | 42 | 55 |
| 000049E0 | 49 | 4C | 44 | 4C | 13 | 00 | C8 | 3D | 20 | 4B | 49 | 54 | 53 | 20 | 4F | 4E |
| 000049F0 | 45 | 20 | 41 | 54 | 20 | 41 | 20 | 54 | 49 | 4D | 45 | 00 | 0C | 00 | E0 | 3D |
| 00004A00 | 4C | 6F | 77 | 65 | 73 | 74 | 20 | 49 | 74 | 65 | 6D | 73 | 00 | 00 | 00 | 00 |
| 000041D0 | 3B | 06 | 3C | 37 | 7C | 03 | E9 | FC | F7 | BB | 04 | 00 | CD | 3E | 21 | BB |
| 000041E0 | 18 | 40 | CD | 3E | 1F | BB | 04 | 00 | BA | 1E | 40 | B9 | 20 | 00 | CD | 3E |
| 000041F0 | 1E | BB | 04 | 00 | CD | 3F | B3 | BB | D4 | 37 | BA | 20 | 00 | CD | 3F | B4 |
| 00004200 | BB | 04 | 00 | BA | 01 | 00 | CD | 3E | 26 | BB | D4 | 37 | BA | 4E | 37 | CD |
| 00004210 | 3F | 61 | B8 | 01 | 00 | E9 | 29 | 00 | BB | B0 | 36 | 8B | 16 | CA | 36 | B9 |
| 00004220 | 01 | 00 | CD | 3D | 0A | 93 | BB | C0 | 3A | CD | 3F | 62 | 74 | 03 | E9 | 0C |
| 00004230 | 00 | 87 | CA | 92 | BB | 48 | 38 | BA | 4E | 37 | CD | 3F | 5C | A1 | CA | 36 |
| 00004240 | 40 | A3 | CA | 36 | 83 | 3E | CA | 36 | 20 | 7E | CD | BB | 4E | 37 | BA | D4 |
| 00004250 | 37 | CD | 3F | 5B | BB | 04 | 00 | BA | 01 | 00 | CD | 3E | 28 | BB | 04 | 00 |
| 00004260 | CD | 3E | 21 | E9 | 2C | C2 | BB | FF | FF | CD | 3E | 32 | BB | EC | 43 | B8 |
| 00004270 | FE | 36 | CD | 3F | 55 | BA | 38 | 37 | CD | 3F | 61 | 33 | DB | CD | 3D | 21 |
| 00004280 | 93 | A3 | 1A | 38 | CD | 3F | BC | BB | 38 | 37 | CD | 3F | 6A | CD | 3E | 79 |
| 00004290 | CD | 3D | 25 | 93 | A3 | 1C | 38 | 33 | DB | CD | 3D | 21 | 93 | A3 | 1E | 38 |
| 000042A0 | BB | 74 | 3A | CD | 3F | B5 | 03 | CD | 3F | B7 | 01 | 04 | BB | FE | 36 | CD |
| 000042B0 | 3F | B8 | BB | F6 | 3A | B8 | FE | 36 | CD | 3F | 62 | BA | 00 | 00 | 75 | 01 |
| 000042C0 | 4A | BB | A0 | 38 | CD | 3F | 62 | B9 | 00 | 00 | 75 | 01 | 49 | 0B | CA | 23 |
| 000042D0 | C9 | 74 | 03 | E9 | 71 | 00 | BB | FA | 43 | B8 | FE | 36 | CD | 3F | 62 | 74 |
| 000042E0 | 03 | E9 | 0A | 00 | 92 | BB | F6 | 3A | CD | 3F | 61 | E9 | 59 | 00 | BB | 00 |
| 000042F0 | 44 | B8 | FE | 36 | CD | 3F | 62 | 74 | 03 | E9 | 0A | 00 | 92 | BB | A0 | 38 |
| 00004300 | CD | 3F | 61 | E9 | 41 | 00 | 8B | 1E | 1C | 38 | CD | 3E | 42 | 8B | 1E | 1E |
| 00004310 | 38 | CD | 3E | 42 | 33 | DB | CD | 3E | 44 | CD | 3F | BC | BB | FE | 36 | CD |
| 00004320 | 3F | BA | BA | 20 | 00 | CD | 3D | 0E | CD | 3F | 6A | CD | 3E | 79 | CD | 3E |
| 00004330 | 2B | 8B | 1E | 1C | 38 | CD | 3E | 42 | 8B | 1E | 1E | 38 | CD | 3E | 42 | 33 |
| 00004340 | DB | CD | 3E | 44 | E9 | 59 | FF | 8B | 1E | 1C | 38 | CD | 3E | 42 | 8B | 1E |
| 00004350 | 1A | 38 | CD | 3E | 42 | 33 | DB | CD | 3E | 44 | CD | 3F | BC | 8B | 1E | 1E |
| 00004360 | 38 | 2B | 1E | 1A | 38 | 43 | BA | 20 | 00 | CD | 3D | 0E | CD | 3F | 6A | CD |
| 00004370 | 3E | 79 | 8B | 1E | 1C | 38 | CD | 3E | 42 | 8B | 1E | 1A | 38 | CD | 3E | 42 |
| 00004380 | 33 | DB | CD | 3E | 44 | C3 | 90 | 90 | 90 | 90 | 90 | 90 | 90 | 90 | 90 | 90 |
| 00004390 | 90 | 90 | 90 | 90 | 90 | 90 | 90 | 90 | 90 | 90 | 90 | 90 | 90 | 90 | 90 | 90 |
| 000043A0 | 90 | 90 | 90 | 90 | 90 | 90 | 90 | 90 | 90 | CD | 3E | 02 | 00 | 00 | 00 | 00 |
| 000043B0 | CD | 3F | FF | CB | CD | 3F | FE | CB | CD | 3F | FD | CB | CD | 3F | FC | CB |
| 000043C0 | 51 | F3 | A5 | 59 | D1 | E1 | 8E | DA | 8B | 2E | C6 | 13 | 8B | C5 | 2B | C2 |
| 000043D0 | 3D | 00 | 10 | 72 | 03 | B8 | 00 | 10 | 8B | D1 | 81 | C2 | 00 | 03 | 72 | 0C |
| 000043E0 | B1 | 04 | D3 | E0 | 0B | C0 | 74 | 28 | 3B | C2 | 73 | 24 | BA | 4A | 00 | 0E |
| 000043F0 | 1F | B4 | 09 | CD | 21 | 53 | 33 | C0 | 50 | CB | 0D | 0A | 50 | 72 | 6F | 67 |
| 00004400 | 72 | 61 | 6D | 20 | 74 | 6F | 6F | 20 | 6C | 61 | 72 | 67 | 65 | 0D | 0A | 24 |
| 00004410 | 5E | 5F | 1E | 17 | 8B | E2 | 57 | 56 | 8B | CA | 92 | 83 | 06 | C4 | 13 | 07 |
| 00004420 | FF | 2E | C4 | 13 | B0 | 04 | BF | B0 | 05 | A2 | 1F | 00 | C7 | 06 | 35 | 00 |
| 00004430 | 89 | 00 | C7 | 06 | 37 | 00 | 1B | 04 | CB | CB | 5F | 5E | 5B | 56 | 57 | FF |
| 00004440 | 36 | 00 | 00 | FF | 37 | CB | 00 | 00 | 00 | 00 | 00 | 00 | 00 | 00 | 00 | 00 |
| 00004450 | 01 | 00 | 34 | 38 | 38 | 00 | 01 | 00 | 3A | 38 | 32 | 00 | 02 | 00 | 40 | 38 |
| 00004460 | 33 | 32 | 01 | 00 | 46 | 23 | 35 | 00 | 01 | 00 | 4C | 38 | 20 | 00 | 01 | 00 |
| 00004470 | 52 | 38 | 49 | 91 | 0D | 00 | 58 | 38 | 44 | 3A | 50 | 52 | 4F | 47 | 52 | 41 |

```
00004480  4D 2E 44 41 54 00 01 00  6A 38 52 C3 09 00 70 38
00004490  42 50 41 52 54 2E 44 41  54 19 09 00 7E 38 57 41
000044A0  4C 4C 43 2E 44 41 54 00  00 00 00 80 08 00 90 38
000044B0  4B 49 54 41 2E 44 41 54  04 00 9C 38 4D 41 49 4E
000044C0  01 00 A4 38 4E 00 02 00  AA 38 20 20 37 00 B0 38
000044D0  44 6F 20 79 6F 75 20 77  69 73 68 20 74 6F 20 61
000044E0  64 64 20 6F 72 20 73 75  62 74 72 61 63 74 20 69
000044F0  6E 76 65 6E 74 6F 72 79  20 62 79 20 6B 69 74 20
00004500  71 75 61 6E 69 74 79 00  01 00 EC 38 5E 00 03 00
00004510  F2 38 20 5E 20 00 06 00  FA 38 4B 69 74 20 23 20
00004520  08 00 04 39 20 45 6E 67  2E 43 68 20 03 00 10 39
00004530  20 2D 20 57 0D 00 18 39  20 4E 4F 20 53 45 4C 45
00004540  43 54 49 4F 4E 00 0C 00  2A 39 4E 4F 20 53 45 4C
00004550  45 43 54 49 4F 4E 0C 00  3A 39 20 45 6E 74 65 72
00004560  20 4B 69 74 20 23 0B 00  4A 39 45 6E 74 65 72 20
00004570  4B 69 74 20 23 00 0A 00  5A 39 20 4E 45 58 54 20
00004580  50 41 47 45 09 00 68 39  4E 45 58 54 20 50 41 47
00004590  45 00 0E 00 76 39 20 50  52 45 56 49 4F 55 53 20
000045A0  50 41 47 45 0D 00 88 39  50 52 45 56 49 4F 55 53
000045B0  20 50 41 47 45 00 05 00  9A 39 4D 6F 76 65 20 00
000045C0  05 00 A4 39 20 3D 20 55  70 00 07 00 AE 39 20 3D
000045D0  20 44 6F 77 6E 00 09 00  BA 39 20 3D 20 53 65 6C
000045E0  65 63 74 00 07 00 C8 39  20 4B 69 74 20 23 3D 00
00003DB0  38 BB 00 00 75 01 4B 23  D9 0B DA 23 DB 75 03 E9
00003DC0  0E 00 D1 E0 D1 E0 05 42  17 92 BB 0E 40 CD 3F 61
00003DD0  A1 CA 36 40 A3 CA 36 83  3E CA 36 0A 7E 9C E9 77
00003DE0  00 BB AC 43 CD 3F B5 00  CD 3F B7 01 01 BB CA 36
00003DF0  CD 3F B8 83 3E CA 36 01  BB 00 00 7D 01 4B 83 3E
00003E00  CA 36 0A BA 00 00 7E 01  4A 0B D3 8B 1E CA 36 D1
00003E10  E3 D1 E3 81 C3 42 17 93  BB C0 3A CD 3F 62 B9 00
00003E20  00 74 01 49 0B CA 23 C9  75 B7 8B 1E CA 36 D1 E3
00003E30  D1 E3 81 C3 42 17 8B D3  BB 0E 40 CD 3F 61 BB C6
00003E40  43 BA FE 36 CD 3F 61 E8  22 04 BB F6 3A B8 FE 36
00003E50  CD 3F 62 75 03 E9 E5 FE  BB FF FF CD 3E 32 CD 3F
00003E60  BC BB E2 3F CD 3F 6E CD  3E 79 B8 01 00 E9 3B 03
00003E70  BB 86 41 CD 3F 34 A1 3C  37 A3 12 38 B8 01 00 E9
00003E80  16 00 BB 8C 37 CD 3F 0F  BB 8E 37 CD 3F 0F BB 90
00003E90  37 CD 3F 0F A1 92 37 40  A3 92 37 A1 12 38 3B 06
00003EA0  92 37 7D DE 8B 1E CA 36  D1 E3 D1 E3 81 C3 42 17
00003EB0  93 BB 0E 40 CD 3F 62 74  03 E9 EB 02 C7 06 30 37
00003EC0  00 00 B8 14 00 F7 2E 3C  37 03 06 30 37 8B 1E CA
00003ED0  36 D1 E3 03 D8 83 C3 EB  8B D3 BB 04 00 CD 3E 26
00003EE0  83 3E 30 37 00 74 03 E9  0A 00 BB 52 37 CD 3D 18
00003EF0  93 A3 14 38 A1 90 37 A3  16 38 B8 01 00 E9 13 02
00003F00  B8 01 00 E9 FC 01 B8 14  00 F7 2E 30 37 03 06 9A
00003F10  37 3B 06 8C 37 BB 00 00  7D 01 4B 3B 06 8E 37 BA
00003F20  00 00 7E 01 4A 0B D3 23  D2 74 03 E9 D0 01 8B 1E
00003F30  96 37 D1 E3 D1 E3 D1 E3  D1 E3 D1 E3 03 1E 9A 37
00003F40  D1 E3 D1 E3 81 C3 42 14  CD 3D 18 0B DB 75 03 E9
00003F50  AC 01 83 3E 3C 37 08 BB  00 00 74 01 4B 83 3E 3C
00003F60  37 0F BA 00 00 74 01 4A  23 D3 83 3E 3C 37 16 BB
00003F70  00 00 74 01 4B 23 DA 83  3E 3C 37 1B BA 00 00 74
00003F80  01 4A 23 D3 83 3E 3C 37  20 BB 00 00 74 01 4B 23
00003F90  DA 23 DB 75 03 E9 0D 00  83 3E 96 37 04 75 03 E9
00003FA0  38 01 E9 C3 00 BB 89 41  CD 3F 34 83 3E 88 37 20
00003FB0  74 03 E9 06 00 C7 06 A0  37 1B 00 83 3E 88 37 1B
00003FC0  74 03 E9 06 00 C7 06 A0  37 16 00 83 3E 88 37 16
00003FD0  74 03 E9 06 00 C7 06 A0  37 0F 00 83 3E 88 37 0F
00003FE0  74 03 E9 06 00 C7 06 A0  37 08 00 83 3E 88 37 08
00003FF0  74 03 E9 06 00 C7 06 A0  37 00 00 A1 3C 37 48 A3
00004000  18 38 B8 01 00 E9 54 00  BB A4 37 CD 3F 0F BB A6
00004010  37 CD 3F 0F BB A8 37 CD  3F 0F 83 3E A4 37 FF 75
00004020  03 E9 34 00 A1 96 37 3B  06 A6 37 BB 00 00 75 01
00004030  4B A1 9A 37 3B 06 A8 37  BA 00 00 75 01 4A 23 D3
00004040  A1 A0 37 3B 06 18 37 BB  00 00 7D 01 4B 23 DA 23
00004050  DB 74 03 E9 84 00 EB B0  A1 18 37 40 A3 18 37 A1
00004060  18 38 3B 06 18 37 7D A0  B8 05 00 F7 2E 3C 37 03
00004070  06 96 37 05 FB FF 92 BB  02 00 CD 3E 26 B8 14 00
00004080  F7 2E 30 37 03 06 9A 37  D1 E0 D1 E0 05 5C 32 93
00004090  8B D3 CD 3D 18 8B 0E 96  37 D1 E1 D1 E1 D1 E1 D1
000040A0  E1 D1 E1 03 0E 9A 37 D1  E1 D1 E1 81 C1 42 14 87
000040B0  D9 CD 3D 18 93 8B DA F7  2E 14 38 03 C1 93 CD 3D
000040C0  1B 92 CD 3F 5B B8 05 00  F7 2E 3C 37 03 06 96 37
000040D0  05 FB FF 92 BB 02 00 CD  3E 28 8B 1E 96 37 D1 E3
```

| | | | | | | | | | | | | | | | | |
|---|---|---|---|---|---|---|---|---|---|---|---|---|---|---|---|---|
| 000040E0 | D1 | E3 | D1 | E3 | D1 | E3 | D1 | E3 | 03 | 1E | 9A | 37 | D1 | E3 | D1 | E3 |
| 000040F0 | 81 | C3 | 42 | 14 | 8B | D3 | 33 | DB | CD | 3D | 1B | CD | 3F | 5B | A1 | 9A |
| 00004100 | 37 | 40 | A3 | 9A | 37 | 83 | 3E | 9A | 37 | 14 | 7F | 03 | E9 | F7 | FD | A1 |
| 00004110 | 96 | 37 | 40 | A3 | 96 | 37 | A1 | 16 | 38 | 3B | 06 | 96 | 37 | 7C | 03 | E9 |
| 00004120 | DE | FD | 33 | DB | CD | 3D | 1B | BA | 52 | 37 | CD | 3F | 5B | BB | 48 | 38 |
| 00004130 | BA | 70 | 37 | CD | 3F | 5B | BB | 0E | 40 | BA | 4E | 37 | CD | 3F | 5B | BB |
| 00004140 | C0 | 3A | BA | B0 | 36 | 8B | 0E | 3C | 37 | B8 | 01 | 00 | CD | 3F | 5C | B8 |
| 00004150 | 14 | 00 | F7 | 2E | 3C | 37 | 03 | 06 | 30 | 37 | 8B | 1E | CA | 36 | D1 | E3 |
| 00004160 | 03 | D8 | 83 | C3 | EB | 8B | D3 | BB | 04 | 00 | CD | 3E | 28 | 83 | 3E | 30 |
| 00004170 | 37 | 00 | 74 | 03 | E9 | 13 | 00 | 83 | 3E | 8E | 37 | 15 | 7D | 03 | E9 | 09 |
| 00004180 | 00 | C7 | 06 | 30 | 37 | 01 | 00 | E9 | 38 | FD | 83 | 3E | 30 | 37 | 00 | 74 |
| 00004190 | 03 | E9 | 13 | 00 | 83 | 3E | 8E | 37 | 14 | 7F | 03 | E9 | 09 | 00 | C7 | 06 |
| 000041A0 | 30 | 37 | 01 | 00 | E9 | 1B | FD | A1 | CA | 36 | 40 | A3 | CA | 36 | 83 | 3E |
| 000041B0 | CA | 36 | 0A | 7F | 03 | E9 | B8 | FC | BB | C0 | 3A | B8 | FC | 37 | CD | 3F |
| 000041C0 | 62 | 74 | 03 | E9 | 13 | 00 | A1 | 3C | 37 | 40 | A3 | 3C | 37 | A1 | 0E | 38 |
| 00003990 | 3F | B5 | 00 | CD | 3F | B7 | 01 | 01 | BB | 0C | 38 | CD | 3F | B8 | BB | FF |
| 000039A0 | FF | CD | 3E | 32 | 83 | 3E | 0C | 38 | 01 | BB | 00 | 00 | 7D | 01 | 4B | 83 |
| 000039B0 | 3E | 0C | 38 | 0A | BA | 00 | 00 | 7E | 01 | 4A | 0B | D3 | 23 | D2 | 75 | CC |
| 000039C0 | BB | F6 | 3A | BA | 04 | 38 | CD | 3F | 61 | A1 | 0A | 38 | A3 | 0E | 38 | A1 |
| 000039D0 | 08 | 38 | E9 | F5 | 07 | E9 | 3B | 01 | BB | FF | FF | CD | 3E | 32 | CD | 3F |
| 000039E0 | BC | BB | C2 | 42 | CD | 3F | 6E | CD | 3E | 79 | CD | 3F | BC | BB | 48 | 38 |
| 000039F0 | CD | 3F | 6E | CD | 3E | 79 | CD | 3F | BC | BB | 48 | 38 | CD | 3F | 6E | CD |
| 00003A00 | 3E | 79 | CD | 3F | BC | BB | CE | 42 | CD | 3F | 6A | CD | 3E | 79 | A1 | A0 |
| 00003A10 | 36 | A3 | 10 | 38 | B8 | 01 | 00 | E9 | 2F | 00 | 8B | 1E | CA | 36 | 8B | D3 |
| 00003A20 | D1 | E3 | D1 | E3 | 81 | C3 | 42 | 17 | 93 | BB | C0 | 3A | CD | 3F | 62 | 74 |
| 00003A30 | 03 | E9 | 11 | 00 | CD | 3F | BC | 8B | DA | CD | 3F | 69 | BB | E0 | 42 | CD |
| 00003A40 | 3F | 6A | CD | 3E | 79 | A1 | CA | 36 | 40 | A3 | CA | 36 | A1 | 10 | 38 | 3B |
| 00003A50 | 06 | CA | 36 | 7D | C5 | CD | 3F | BC | BB | 48 | 38 | CD | 3F | 6E | CD | 3E |
| 00003A60 | 79 | BB | 01 | 00 | CD | 3E | 42 | BB | 14 | 00 | CD | 3E | 42 | 33 | DB | CD |
| 00003A70 | 3E | 44 | 33 | DB | CD | 3E | 33 | BB | 07 | 00 | CD | 3E | 35 | CD | 3F | BC |
| 00003A80 | BB | A4 | 36 | B8 | 8C | 3A | CD | 3F | 55 | CD | 3F | 6A | CD | 3E | 79 | BB |
| 00003A90 | 01 | 00 | CD | 3E | 42 | BB | 08 | 00 | CD | 3E | 42 | 33 | DB | CD | 3E | 44 |
| 00003AA0 | BB | 07 | 00 | CD | 3E | 33 | 33 | DB | CD | 3E | 35 | BR | 74 | 3A | CD | 3F |
| 00003AB0 | B5 | 00 | CD | 3F | B7 | 01 | 01 | BB | 3C | 37 | CD | 3F | B8 | 83 | 3E | 3C |
| 00003AC0 | 37 | 01 | BB | 00 | 00 | 7D | 01 | 4B | A1 | A0 | 36 | 3B | 06 | 3C | 37 | BA |
| 00003AD0 | 00 | 00 | 7D | 01 | 4A | 0B | D3 | 23 | D2 | 75 | 86 | BB | 01 | 00 | CD | 3E |
| 00003AE0 | 42 | BB | 08 | 00 | CD | 3E | 42 | 33 | DB | CD | 3E | 44 | CD | 3F | BC | BB |
| 00003AF0 | 3C | 00 | CD | 3D | 0D | CD | 3F | 6A | CD | 3E | 79 | 8B | 1E | 3C | 37 | D1 |
| 00003B00 | E3 | D1 | E3 | 81 | C3 | 42 | 17 | 93 | BB | C0 | 3A | CD | 3F | 62 | 74 | 03 |
| 00003B10 | E9 | 41 | 01 | BB | 04 | 00 | CD | 3E | 21 | BB | 66 | 38 | CD | 3E | 1F | BB |
| 00003B20 | 04 | 00 | BA | AE | 3A | B9 | 00 | 01 | CD | 3E | 1E | BB | 04 | 00 | CD | 3F |
| 00003B30 | B3 | BB | 4E | 37 | BA | 01 | 00 | CD | 3F | B4 | BB | 52 | 37 | BA | 02 | 00 |
| 00003B40 | CD | 3F | B4 | B8 | 01 | 00 | E9 | 5A | 00 | B8 | 01 | 00 | E9 | 46 | 00 | BB |
| 00003B50 | 04 | 00 | CD | 3F | B3 | B8 | 28 | 00 | F7 | 2E | C2 | 37 | 8B | 1E | C4 | 37 |
| 00003B60 | 8B | D3 | D1 | E3 | 03 | D8 | 83 | C3 | D9 | 87 | D3 | 8B | CB | BB | CE | 36 |
| 00003B70 | CD | 3F | B4 | 8B | 1E | C2 | 37 | D1 | E3 | D1 | E3 | D1 | E3 | D1 | E3 | D1 |
| 00003B80 | E3 | 03 | D9 | D1 | E3 | D1 | E3 | 81 | C3 | 42 | 14 | BA | 02 | 00 | CD | 3F |
| 00003B90 | B4 | A1 | C4 | 37 | 40 | A3 | C4 | 37 | 83 | 3E | C4 | 37 | 14 | 7E | B0 | A1 |
| 00003BA0 | C2 | 37 | 40 | A3 | C2 | 37 | 83 | 3E | C2 | 37 | 05 | 7E | 9C | BB | 04 | 00 |
| 00003BB0 | CD | 3F | B3 | BB | CE | 36 | BA | E9 | 00 | CD | 3F | B4 | BB | 68 | 37 | BA |
| 00003BC0 | 02 | 00 | CD | 3F | B4 | BB | 6C | 37 | BA | 14 | 00 | CD | 3F | B4 | BB | 70 |
| 00003BD0 | 37 | BA | 01 | 00 | CD | 3F | B4 | BB | 48 | 38 | BA | FE | 36 | CD | 3F | 61 |
| 00003BE0 | 33 | C0 | E9 | 46 | 00 | B8 | 14 | 00 | F7 | 2E | 3C | 37 | 8B | 1E | F0 | 36 |
| 00003BF0 | D1 | E3 | 03 | D8 | 83 | C3 | ED | 8B | D3 | BB | 04 | 00 | CD | 3E | 26 | 8B |
| 00003C00 | 1E | F0 | 36 | D1 | E3 | D1 | E3 | 81 | C3 | 46 | 17 | 8B | D3 | BB | 4E | 37 |
| 00003C10 | CD | 3F | 61 | BB | C0 | 3A | B8 | 4E | 37 | CD | 3F | 62 | 74 | 03 | E9 | 06 |
| 00003C20 | 00 | BA | FE | 36 | CD | 3F | 61 | A1 | F0 | 36 | 40 | A3 | F0 | 36 | 83 | 3E |
| 00003C30 | F0 | 36 | 09 | 7E | B0 | BB | C0 | 3A | B8 | FE | 36 | CD | 3F | 62 | 74 | 03 |
| 00003C40 | E9 | 75 | 05 | BB | C0 | 3A | B8 | FC | 37 | CD | 3F | 62 | 75 | 03 | E9 | 23 |
| 00003C50 | 01 | E9 | 33 | 00 | BB | 04 | 00 | CD | 3E | 21 | BB | 07 | 00 | CD | 3D | 05 |
| 00003C60 | 93 | BB | E6 | 42 | CD | 3F | 55 | BA | FE | 36 | CD | 3F | 61 | E8 | F6 | 05 |
| 00003C70 | BB | A0 | 38 | B8 | FE | 36 | CD | 3F | 62 | 75 | 03 | E9 | E5 | 05 | BB | FF |
| 00003C80 | FF | CD | 3E | 32 | E9 | C4 | FB | BB | FF | FF | CD | 3E | 32 | CD | 3F | BC |
| 00003C90 | 8B | 1E | 3C | 37 | CD | 3D | 10 | B8 | 24 | 43 | CD | 3F | 55 | CD | 3F | 6E |
| 00003CA0 | CD | 3E | 79 | B8 | 01 | 00 | E9 | 98 | 00 | B8 | 14 | 00 | F7 | 2E | 3C | 37 |
| 00003CB0 | 8B | 1E | CA | 36 | D1 | E3 | 03 | D8 | 83 | C3 | EB | 8B | D3 | BB | 04 | 00 |
| 00003CC0 | CD | 3E | 26 | BB | 52 | 37 | CD | 3D | 18 | 0B | DB | 7F | 03 | E9 | 6D | 00 |
| 00003CD0 | CD | 3F | BC | BB | 48 | 43 | CD | 3F | 6A | 8B | 1E | CA | 36 | CD | 3F | 69 |
| 00003CE0 | BB | 58 | 43 | CD | 3F | 6A | BB | 6C | 37 | CD | 3F | 6A | BB | 32 | 00 | CD |
| 00003CF0 | 3F | 37 | BB | 74 | 3A | CD | 3F | 6A | BB | 60 | 43 | CD | 3F | 6A | BB | 52 |
| 00003D00 | 37 | CD | 3D | 18 | CD | 3F | 69 | CD | 3E | 79 | 8B | 1E | CA | 36 | D1 | E3 |
| 00003D10 | D1 | E3 | 81 | C3 | 42 | 17 | 93 | BB | 0E | 40 | CD | 3F | 62 | 74 | 03 | E9 |
| 00003D20 | 0F | 00 | CD | 3F | BC | BB | 78 | 43 | CD | 3F | 6E | CD | 3E | 79 | E9 | 0C |
| 00003D30 | 00 | CD | 3F | BC | BB | 48 | 38 | CD | 3F | 6E | CD | 3E | 79 | A1 | CA | 36 |

```
00003D40  40 A3 CA 36 83 3E CA 36  0A 7F 03 E9 5B FF CD 3F
00003D50  BC BB 48 38 CD 3F 6E CD  3E 79 BB 84 43 BA FE 36
00003D60  CD 3F 61 E8 06 05 BB A0  38 B8 FE 36 CD 3F 62 75
00003D70  03 E9 6D 00 B8 01 00 E9  5A 00 8B 1E CA 36 D1 E3
00003D80  D1 E3 81 C3 42 17 93 BB  C0 3A CD 3F 62 74 03 E9
00003D90  3E 00 BB F6 3A B8 04 38  CD 3F 62 BA 00 00 74 01
00003DA0  4A CD 3F 62 B9 00 00 75  01 49 A1 CA 36 3B 06 0C
00003570  BB 18 37 CD 3F 0F BB A4  37 CD 3F 0F BB A6 37 CD
00003580  3F 0F A1 96 37 3B 06 A4  37 BB 00 00 75 01 4B A1
00003590  9A 37 3B 06 A6 37 BA 00  00 75 01 4A 23 D3 23 D2
000035A0  74 03 E9 1C 00 83 3E 18  37 FF 75 C4 A1 F6 37 40
000035B0  A3 F6 37 A1 3C 37 3B 06  F6 37 75 03 E9 39 00 EB
000035C0  AF B8 05 00 F7 2E F6 37  48 A3 CA 36 BB 02 00 8B
000035D0  16 CA 36 CD 3E 26 8B 1E  18 37 D1 E3 D1 E3 81 C3
000035E0  5C 32 8B D3 8B 1E 88 22  CD 3D 1B CD 3F 5B BB 02
000035F0  00 8B 16 CA 36 CD 3E 28  E9 62 D6 BB 04 00 CD 3E
00003600  21 BB 66 38 CD 3E 1F BB  04 00 BA AE 3A B9 00 01
00003610  CD 3E 1E BB 04 00 CD 3F  B3 BB 4E 37 BA 01 00 CD
00003620  3F B4 BB 52 37 BA 02 00  CD 3F B4 B8 01 00 E9 5A
00003630  00 B8 01 00 E9 46 00 BB  04 00 CD 3F B3 B8 28 00
00003640  F7 2E C2 37 8B 1E C4 37  8B D3 D1 E3 03 D8 83 C3
00003650  D9 87 D3 8B CB BB CE 36  CD 3F B4 8B 1E C2 37 D1
00003660  E3 D1 E3 D1 E3 D1 E3 D1  E3 03 D9 D1 E3 D1 E3 81
00003670  C3 42 14 BA 02 00 CD 3F  B4 A1 C4 37 40 A3 C4 37
00003680  83 3E C4 37 14 7E B0 A1  C2 37 40 A3 C2 37 83 3E
00003690  C2 37 05 7E 9C BB 04 00  CD 3F B3 BB CE 36 BA E9
000036A0  00 CD 3F B4 BB 68 37 BA  02 00 CD 3F B4 BB 6C 37
000036B0  BA 14 00 CD 3F B4 BB 70  37 BA 01 00 CD 3F B4 C7
000036C0  06 02 37 00 00 A1 A0 36  A3 F8 37 B8 01 00 E9 2E
000036D0  01 8B 1E CC 36 D1 E3 D1  E3 81 C3 42 17 8B D3 BB
000036E0  48 38 CD 3F 61 33 C0 E9  04 01 B8 0A 00 F7 2E CC
000036F0  36 03 06 0C 37 05 F7 FF  A3 FA 37 8B 1E FA 37 D1
00003700  E3 D1 E3 81 C3 F4 28 8B  D3 BB 48 38 CD 3F 61 B8
00003710  14 00 F7 2E CC 36 8B 1E  0C 37 D1 E3 03 D8 83 C3
00003720  ED 8B D3 BB 04 00 CD 3E  26 BB C0 3A B8 4E 37 CD
00003730  3F 62 74 03 E9 B3 00 C7  06 02 37 01 00 8B 1E CC
00003740  36 D1 E3 D1 E3 81 C3 42  17 8B D3 BB C0 3A CD 3F
00003750  61 8B 1E FA 37 D1 E3 D1  E3 81 C3 F4 28 8B D3 BB
00003760  6C 37 B8 70 37 CD 3F 55  8B CB BB 52 37 CD 3D 18
00003770  CD 3D 10 B8 A2 41 CD 3F  55 8B C2 BA 05 00 CD 3D
00003780  0C 91 CD 3F 55 8B D1 CD  3F 61 B8 14 00 F7 2E CC
00003790  36 8B 1E 0C 37 D1 E3 03  D8 83 C3 EE 8B D3 BB 04
000037A0  00 CD 3E 26 8B 1E FA 37  D1 E3 D1 E3 81 C3 F4 28
000037B0  93 BB AC 41 CD 3F 55 8B  D3 BB 52 37 CD 3D 18 CD
000037C0  3D 10 8B C8 B8 A2 41 CD  3F 55 8B C2 BA 05 00 CD
000037D0  3D 0C CD 3F 55 93 BB FE  36 CD 3F 55 8B D1 CD 3F
000037E0  61 BB 48 38 BA FE 36 CD  3F 61 A1 0C 37 40 A3 0C
000037F0  37 83 3E 0C 37 09 7F 03  E9 EF FE A1 CC 36 40 A3
00003800  CC 36 A1 F8 37 3B 06 CC  36 7C 03 E9 C3 FE BB 04
00003810  00 CD 3E 21 83 3E 02 37  00 74 03 E9 2D 00 BB FF
00003820  FF CD 3E 32 CD 3F BC BB  BA 41 CD 3F 6E CD 3E 79
00003830  CD 3F BC BB E6 41 CD 3F  6E CD 3E 79 CD 3D 06 93
00003840  BB 74 3A CD 3F 62 74 F4  E9 18 0A BB F6 3A BA FC
00003850  37 CD 3F 61 BB A0 38 BA  00 38 CD 3F 61 BB A0 38
00003860  BA 04 38 CD 3F 61 BB 02  42 BA FE 36 CD 3F 61 E8
00003870  F4 09 BB F6 3A B8 FE 36  CD 3F 62 75 03 E9 58 01
00003880  BB C0 3A BA FC 37 CD 3F  61 BB 34 42 BA FE 36 CD
00003890  3F 61 E8 D1 09 C7 06 08  38 01 00 A1 A0 36 A3 0A
000038A0  38 BB A0 38 B8 FE 36 CD  3F 62 75 03 E9 1A 01 BB
000038B0  FF FF CD 3E 32 BB 68 42  CD 3F B5 00 CD 3F B7 01
000038C0  01 BB 3C 37 CD 3F B8 BB  FF FF CD 3E 32 83 3E 3C
000038D0  37 01 BB 00 00 7D 01 4B  A1 A2 36 3B 06 3C 37 BA
000038E0  00 00 7D 01 4A 0B D3 23  D2 75 CA 83 3E 3C 37 01
000038F0  74 03 E9 0C 00 C7 06 0A  38 08 00 C7 06 08 38 01
00003900  00 83 3E 3C 37 02 74 03  E9 0C 00 C7 06 0A 38 0F
00003910  00 C7 06 08 38 09 00 83  3E 3C 37 03 74 03 E9 0C
00003920  00 C7 06 0A 38 16 00 C7  06 08 38 10 00 83 3E 3C
00003930  37 04 74 03 E9 0C 00 C7  06 0A 38 1B 00 C7 06 08
00003940  38 17 00 83 3E 3C 37 05  74 03 E9 0C 00 C7 06 0A
00003950  38 20 00 C7 06 08 38 1C  00 BB F6 3A BA 00 38 CD
00003960  3F 61 8B 1E 3C 37 CD 3D  10 B8 7C 42 CD 3F 55 BA
00003970  FE 36 CD 3F 61 E8 EE 08  BB A0 38 B8 FE 36 CD 3F
00003980  62 75 03 E9 43 00 BB FF  FF CD 3E 32 BB B4 42 CD
```

| | | | | | | | | | | | | | | | | |
|---|---|---|---|---|---|---|---|---|---|---|---|---|---|---|---|---|
| 00003150 | CD | 3D | 18 | 93 | A3 | 86 | 22 | 8B | 1E | 9A | 37 | D1 | E3 | D1 | E3 | 81 |
| 00003160 | C3 | 5C | 32 | CD | 3D | 18 | 93 | A3 | 88 | 22 | 8B | 1E | 9A | 37 | D1 | E3 |
| 00003170 | D1 | E3 | 81 | C3 | DC | 32 | CD | 3D | 18 | 93 | A3 | 8A | 22 | 8B | 1E | 9A |
| 00003180 | 37 | D1 | E3 | D1 | E3 | 81 | C3 | 5C | 33 | CD | 3D | 18 | 93 | A3 | 8C | 22 |
| 00003190 | 8B | 1E | 9A | 37 | D1 | E3 | D1 | E3 | 81 | C3 | DC | 33 | CD | 3D | 18 | 93 |
| 000031A0 | A3 | 8E | 22 | A1 | 1A | 37 | 3B | 06 | 86 | 22 | 74 | 03 | E9 | FA | 00 | BB |
| 000031B0 | FF | FF | CD | 3E | 32 | CD | 3F | BC | BB | 82 | 40 | CD | 3F | 6A | 8B | 1E |
| 000031C0 | 96 | 37 | CD | 3F | 69 | BB | 8E | 40 | CD | 3F | 6A | 8B | 1E | 9A | 37 | CD |
| 000031D0 | 3F | 69 | 8B | D3 | BB | 96 | 40 | CD | 3F | 6A | D1 | E2 | D1 | E2 | 81 | C2 |
| 000031E0 | DC | 33 | 8B | DA | CD | 3D | 18 | CD | 3F | 69 | BB | 74 | 3A | CD | 3F | 6A |
| 000031F0 | BB | A0 | 40 | CD | 3F | 6A | BB | E6 | 37 | CD | 3F | 6E | CD | 3E | 79 | CD |
| 00003200 | 3F | BC | BB | D8 | 37 | CD | 3F | 6A | BB | 0C | 39 | CD | 3F | 6A | BB | E2 |
| 00003210 | 37 | CD | 3F | 6E | CD | 3E | 79 | CD | 3F | BC | BB | B6 | 40 | CD | 3F | 6A |
| 00003220 | 8B | 1E | 8C | 22 | CD | 3F | 6D | CD | 3E | 79 | CD | 3F | BC | BB | 48 | 38 |
| 00003230 | CD | 3F | 6E | CD | 3E | 79 | CD | 3F | BC | BB | C6 | 40 | CD | 3F | 6A | 8B |
| 00003240 | 1E | 88 | 22 | CD | 3F | 69 | BB | D8 | 40 | CD | 3F | 6A | 8B | 1E | 8A | 22 |
| 00003250 | CD | 3F | 69 | CD | 3E | 79 | A1 | 88 | 22 | 3B | 06 | 8A | 22 | 7F | 03 | E9 |
| 00003260 | 0F | 00 | CD | 3F | BC | BB | 48 | 38 | CD | 3F | 6E | CD | 3E | 79 | E9 | 0C |
| 00003270 | 00 | CD | 3F | BC | BB | E8 | 40 | CD | 3F | 6E | CD | 3E | 79 | CD | 3F | BC |
| 00003280 | BB | 48 | 38 | CD | 3F | 6E | CD | 3E | 79 | BB | FC | 40 | BA | FE | 36 | CD |
| 00003290 | 3F | 61 | E8 | D7 | 0F | BB | F6 | 3A | B8 | FE | 36 | CD | 3F | 62 | 75 | 03 |
| 000032A0 | E9 | 5E | 00 | BB | FF | FF | CD | 3E | 32 | A1 | 9A | 37 | 40 | A3 | 9A | 37 |
| 000032B0 | A1 | EE | 37 | 3B | 06 | 9A | 37 | 7C | 03 | E9 | 88 | FE | A1 | 96 | 37 | 40 |
| 000032C0 | A3 | 96 | 37 | A1 | EC | 37 | 3B | 06 | 96 | 37 | 7C | 03 | E9 | 54 | FE | CD |
| 000032D0 | 3E | 2B | BB | FF | FF | CD | 3E | 32 | CD | 3F | BC | BB | 18 | 41 | CD | 3F |
| 000032E0 | 6E | CD | 3E | 79 | BB | 44 | 41 | BA | FE | 36 | CD | 3F | 61 | E8 | 7C | 0F |
| 000032F0 | BB | F6 | 3A | B8 | FE | 36 | CD | 3F | 62 | 75 | 03 | E9 | 5F | D9 | E9 | 91 |
| 00003300 | D1 | BB | 0A | 00 | CD | 3E | 42 | BB | 01 | 00 | CD | 3E | 42 | 33 | DB | CD |
| 00003310 | 3E | 44 | CD | 3F | BC | BB | 4F | 00 | CD | 3D | 0D | CD | 3F | 6A | CD | 3E |
| 00003320 | 79 | BB | 0A | 00 | CD | 3E | 42 | BB | 32 | 00 | CD | 3E | 42 | 33 | DB | CD |
| 00003330 | 3E | 44 | CD | 3F | BC | BB | 9C | 36 | CD | 3F | 6A | BB | 40 | 40 | CD | 3F |
| 00003340 | 6A | CD | 3E | 79 | BB | 0A | 00 | CD | 3E | 42 | BB | 01 | 00 | CD | 3E | 42 |
| 00003350 | 33 | DB | CD | 3E | 44 | BB | 7A | 41 | CD | 3F | B5 | 00 | CD | 3F | B7 | 01 |
| 00003360 | 01 | BB | F0 | 37 | CD | 3F | B8 | A1 | 88 | 22 | 03 | 06 | F0 | 37 | 0B | C0 |
| 00003370 | 7C | 8F | A1 | F0 | 37 | 03 | 06 | 88 | 22 | A3 | 88 | 22 | B8 | 05 | 00 | F7 |
| 00003380 | 2E | 3C | 37 | 03 | 06 | 96 | 37 | 05 | FB | FF | A3 | CA | 36 | BB | 02 | 00 |
| 00003390 | 8B | 16 | CA | 36 | CD | 3E | 26 | 8B | 1E | 9A | 37 | D1 | E3 | D1 | E3 | 81 |
| 000033A0 | C3 | 5C | 32 | 8B | D3 | 8B | 1E | 88 | 22 | CD | 3D | 1B | CD | 3F | 5B | BB |
| 000033B0 | 02 | 00 | 8B | 16 | CA | 36 | CD | 3E | 28 | 83 | 3E | 3C | 37 | 06 | BB | 00 |
| 000033C0 | 00 | 75 | 01 | 4B | 83 | 3E | 3C | 37 | 07 | BA | 00 | 00 | 75 | 01 | 4A | 0B |
| 000033D0 | D3 | 83 | 3E | 3C | 37 | 0E | BB | 00 | 00 | 75 | 01 | 4B | 0B | DA | 83 | 3E |
| 000033E0 | 3C | 37 | 15 | BA | 00 | 00 | 75 | 01 | 4A | 0B | D3 | 83 | 3E | 3C | 37 | 08 |
| 000033F0 | BB | 00 | 00 | 74 | 01 | 4B | 83 | 3E | 3C | 37 | 0F | B9 | 00 | 00 | 74 | 01 |
| 00003400 | 49 | 23 | CB | 83 | 3E | 3C | 37 | 16 | BB | 00 | 00 | 74 | 01 | 4B | 23 | D9 |
| 00003410 | 83 | 3E | 3C | 37 | 1B | B9 | 00 | 00 | 74 | 01 | 49 | 23 | CB | 83 | 3E | 3C |
| 00003420 | 37 | 20 | BB | 00 | 00 | 74 | 01 | 4B | 23 | D9 | 83 | 3E | 96 | 37 | 04 | B9 |
| 00003430 | 00 | 00 | 74 | 01 | 49 | 23 | CB | 0B | CA | 23 | C9 | 74 | 03 | E9 | B8 | 01 |
| 00003440 | BB | 89 | 41 | CD | 3F | 34 | 83 | 3E | 3C | 37 | 01 | 75 | 03 | E9 | 7C | 00 |
| 00003450 | A1 | 3C | 37 | 48 | A3 | F2 | 37 | B8 | 01 | 00 | E9 | 1D | 00 | BB | 18 | 37 |
| 00003460 | CD | 3F | 0F | BB | A4 | 37 | CD | 3F | 0F | BB | A6 | 37 | CD | 3F | 0F | 83 |
| 00003470 | 3E | 18 | 37 | FF | 75 | E7 | A1 | CA | 36 | 40 | A3 | CA | 36 | A1 | F2 | 37 |
| 00003480 | 3B | 06 | CA | 36 | 7D | D7 | 83 | 3E | 3C | 37 | 08 | BB | 00 | 00 | 75 | 01 |
| 00003490 | 4B | 83 | 3E | 3C | 37 | 0F | BA | 00 | 00 | 75 | 01 | 4A | 0B | D3 | 83 | 3E |
| 000034A0 | 3C | 37 | 16 | BB | 00 | 00 | 75 | 01 | 4B | 0B | DA | 83 | 3E | 3C | 37 | 1B |
| 000034B0 | BA | 00 | 00 | 75 | 01 | 4A | 0B | D3 | 83 | 3E | 3C | 37 | 20 | BB | 00 | 00 |
| 000034C0 | 75 | 01 | 4B | 0B | DA | 23 | DB | 74 | 03 | E9 | 2C | 01 | BB | 18 | 37 | CD |
| 000034D0 | 3F | 0F | BB | A4 | 37 | CD | 3F | 0F | BB | A6 | 37 | CD | 3F | 0F | 83 | 3E |
| 000034E0 | 18 | 37 | FF | 75 | 03 | E9 | 10 | 01 | A1 | 18 | 37 | 3B | 06 | 9A | 37 | 75 |
| 000034F0 | DB | A1 | 18 | 37 | 3B | 06 | 9A | 37 | 75 | D2 | A1 | A6 | 37 | A3 | A8 | 37 |
| 00003500 | 83 | 3E | 3C | 37 | 20 | 7C | 03 | E9 | 06 | 00 | C7 | 06 | F4 | 37 | 20 | 00 |
| 00003510 | 83 | 3E | 3C | 37 | 1B | 7C | 03 | E9 | 06 | 00 | C7 | 06 | F4 | 37 | 1B | 00 |
| 00003520 | 83 | 3E | 3C | 37 | 16 | 7C | 03 | E9 | 06 | 00 | C7 | 06 | F4 | 37 | 16 | 00 |
| 00003530 | 83 | 3E | 3C | 37 | 0F | 7C | 03 | E9 | 06 | 00 | C7 | 06 | F4 | 37 | 0F | 00 |
| 00003540 | 83 | 3E | 3C | 37 | 08 | 7C | 03 | E9 | 06 | 00 | C7 | 06 | F4 | 37 | 08 | 00 |
| 00003550 | B8 | 05 | 00 | F7 | 2E | F4 | 37 | 03 | 06 | A4 | 37 | 05 | FB | FF | A3 | CA |
| 00003560 | 36 | C7 | 06 | 8C | 22 | 00 | 00 | E9 | 62 | 00 | C7 | 06 | F6 | 37 | 01 | 00 |
| 00002D30 | 38 | BA | 70 | 37 | CD | 3F | 5B | 8B | 1E | F0 | 36 | D1 | E3 | D1 | E3 | 81 |
| 00002D40 | C3 | 90 | 23 | BA | 6C | 37 | CD | 3F | 5B | 8B | 3E | F0 | 36 | D1 | E7 | 8B |
| 00002D50 | 9D | CE | 23 | CD | 3D | 1B | BA | 52 | 37 | CD | 3F | 5B | B8 | 01 | 00 | E9 |
| 00002D60 | 6E | 00 | B8 | 01 | 00 | E9 | 5A | 00 | B8 | 05 | 00 | F7 | 2E | F0 | 36 | 8B |
| 00002D70 | 1E | 88 | 37 | 2B | 1E | 58 | 37 | 93 | BA | 0F | 00 | F7 | EA | 03 | C3 | 03 |
| 00002D80 | 06 | 96 | 37 | 05 | FB | FF | 92 | BB | 05 | 00 | CD | 3E | 26 | 8B | 1E | 96 |
| 00002D90 | 37 | D1 | E3 | D1 | E3 | D1 | E3 | D1 | E3 | D1 | E3 | 03 | 1E | 9A | 37 | D1 |
| 00002DA0 | E3 | D1 | E3 | 81 | C3 | 42 | 14 | 8B | 16 | 9A | 37 | D1 | E2 | D1 | E2 | 81 |

| | | | | | | | | | | | | | | | | |
|---|---|---|---|---|---|---|---|---|---|---|---|---|---|---|---|---|
| 00002DB0 | C2 | 92 | 14 | 87 | DA | CD | 3D | 18 | CD | 3D | 1B | CD | 3F | 5B | A1 | 96 |
| 00002DC0 | 37 | 40 | A3 | 96 | 37 | 83 | 3E | 96 | 37 | 05 | 7E | 9C | A1 | 9A | 37 | 40 |
| 00002DD0 | A3 | 9A | 37 | 83 | 3E | 9A | 37 | 0C | 7E | 88 | B8 | 13 | 00 | E9 | 5D | 00 |
| 00002DE0 | B8 | 01 | 00 | E9 | 49 | 00 | 8B | 1E | 96 | 37 | 8B | D3 | D1 | E3 | D1 | E3 |
| 00002DF0 | D1 | E3 | D1 | E3 | D1 | E3 | 03 | 1E | 9A | 37 | D1 | E3 | D1 | E3 | 81 | C3 |
| 00002E00 | 42 | 14 | B8 | 0A | 00 | 8B | CA | F7 | 2E | F0 | 36 | 8B | D0 | B8 | 05 | 00 |
| 00002E10 | 89 | 56 | FA | F7 | 2E | 9A | 37 | 03 | 46 | FA | 03 | C1 | 97 | D1 | E7 | 8B |
| 00002E20 | D3 | 8B | 9D | F8 | 21 | CD | 3D | 1B | CD | 3F | 5B | A1 | 96 | 37 | 40 | A3 |
| 00002E30 | 96 | 37 | 83 | 3E | 96 | 37 | 05 | 7E | AD | A1 | 9A | 37 | 40 | A3 | 9A | 37 |
| 00002E40 | 83 | 3E | 9A | 37 | 14 | 7E | 99 | B8 | 14 | 00 | F7 | 2E | 88 | 37 | 8B | 1E |
| 00002E50 | F0 | 36 | D1 | E3 | 03 | D8 | 83 | C3 | EC | 8B | D3 | BB | 04 | 00 | CD | 3E |
| 00002E60 | 28 | A1 | F0 | 36 | 40 | A3 | F0 | 36 | 83 | 3E | F0 | 36 | 0A | 7F | 03 | E9 |
| 00002E70 | 79 | FE | A1 | 88 | 37 | 40 | A3 | 88 | 37 | A1 | C6 | 37 | 3B | 06 | 88 | 37 |
| 00002E80 | 7C | 03 | E9 | 0D | F9 | BB | 04 | 00 | CD | 3E | 21 | BB | 05 | 00 | CD | 3E |
| 00002E90 | 21 | BB | 18 | 40 | CD | 3E | 1F | BB | 04 | 00 | BA | 1E | 40 | B9 | 20 | 00 |
| 00002EA0 | CD | 3E | 1E | BB | 04 | 00 | CD | 3F | B3 | BB | D4 | 37 | BA | 20 | 00 | CD |
| 00002EB0 | 3F | B4 | BB | 04 | 00 | BA | 01 | 00 | CD | 3E | 26 | BB | D4 | 37 | BA | 4E |
| 00002EC0 | 37 | CD | 3F | 61 | B8 | 01 | 00 | E9 | 29 | 00 | BB | B0 | 36 | 8B | 16 | CA |
| 00002ED0 | 36 | B9 | 01 | 00 | CD | 3D | 0A | 93 | BB | C0 | 3A | CD | 3F | 62 | 74 | 03 |
| 00002EE0 | E9 | 0C | 00 | 87 | CA | 92 | BB | 48 | 38 | BA | 4E | 37 | CD | 3F | 5C | A1 |
| 00002EF0 | CA | 36 | 40 | A3 | CA | 36 | 83 | 3E | CA | 36 | 20 | 7E | CD | BB | 4E | 37 |
| 00002F00 | BA | D4 | 37 | CD | 3F | 5B | BB | 04 | 00 | BA | 01 | 00 | CD | 3E | 28 | BB |
| 00002F10 | 04 | 00 | CD | 3E | 21 | E9 | 7A | D5 | BB | FF | FF | CD | 3E | 32 | CD | 3F |
| 00002F20 | BC | BB | 8E | 3C | CD | 3F | 6E | CD | 3E | 79 | CD | 3F | BC | BB | 48 | 38 |
| 00002F30 | CD | 3F | 6E | CD | 3E | 79 | CD | 3F | BC | BB | 30 | 40 | CD | 3F | 6E | CD |
| 00002F40 | 3E | 79 | BB | 05 | 00 | CD | 3E | 42 | BB | 32 | 00 | CD | 3E | 42 | 33 | DB |
| 00002F50 | CD | 3E | 44 | CD | 3F | BC | BB | 9C | 36 | CD | 3F | 6A | BB | 40 | 40 | CD |
| 00002F60 | 3F | 6A | CD | 3E | 79 | BB | 01 | 00 | CD | 3E | 42 | BB | 08 | 00 | CD | 3E |
| 00002F70 | 42 | 33 | DB | CD | 3E | 44 | 33 | DB | CD | 3E | 33 | BB | 07 | 00 | CD | 3E |
| 00002F80 | 35 | CD | 3F | BC | BB | 4C | 40 | CD | 3F | 6A | CD | 3E | 79 | BB | 01 | 00 |
| 00002F90 | CD | 3E | 42 | BB | 08 | 00 | CD | 3E | 42 | 33 | DB | CD | 3E | 44 | BB | 07 |
| 00002FA0 | 00 | CD | 3E | 33 | 33 | DB | CD | 3E | 35 | BB | 74 | 3A | CD | 3F | B5 | 02 |
| 00002FB0 | BB | D8 | 37 | CD | 3F | 5A | BB | D8 | 37 | CD | 3F | BA | 83 | FB | 08 | 7E |
| 00002FC0 | 03 | E9 | 54 | FF | BB | 05 | 00 | CD | 3E | 42 | BB | 32 | 00 | CD | 3E | 44 |
| 00002FD0 | CD | 3F | BC | BB | 14 | 00 | CD | 3D | 0D | CD | 3F | 6A | CD | 3E | 79 | BB |
| 00002FE0 | 01 | 00 | CD | 3E | 42 | BB | 08 | 00 | CD | 3E | 42 | 33 | DB | CD | 3E | 44 |
| 00002FF0 | CD | 3F | BC | BB | D8 | 37 | CD | 3F | 6A | BB | 4C | 40 | CD | 3F | 6A | CD |
| 00003000 | 3E | 79 | BB | FF | FF | CD | 3E | 32 | BB | 01 | 00 | BA | 01 | 00 | CD | 3E |
| 00003010 | 26 | BB | BA | 36 | CD | 3D | 18 | 93 | A3 | 1A | 37 | BB | 01 | 00 | 8B | 16 |
| 00003020 | 1A | 37 | CD | 3E | 26 | BB | BA | 36 | CD | 3D | 18 | 93 | A3 | DC | 37 | BB |
| 00003030 | A6 | 38 | B8 | BE | 36 | CD | 3F | 55 | BA | DE | 37 | CD | 3F | 61 | BB | DE |
| 00003040 | 37 | BA | A6 | 38 | 8B | CB | CD | 3D | 09 | 4B | 87 | D9 | 8B | D1 | 8B | C3 |
| 00003050 | CD | 3D | 0B | 92 | CD | 3F | 61 | BB | D8 | 37 | B8 | DE | 37 | CD | 3F | 62 |
| 00003060 | 74 | 03 | E9 | 15 | 00 | BB | C2 | 36 | BA | E2 | 37 | CD | 3F | 61 | BB | C6 |
| 00003070 | 36 | BA | E6 | 37 | CD | 3F | 61 | E9 | 69 | 00 | 83 | 3E | DC | 37 | 00 | BB |
| 00003080 | 00 | 00 | 75 | 01 | 4B | 8B | D3 | BB | D8 | 37 | B8 | DE | 37 | CD | 3F | 62 |
| 00003090 | B9 | 00 | 00 | 76 | 01 | 49 | 0B | CA | 23 | C9 | 74 | 03 | E9 | 0C | 00 | A1 |
| 000030A0 | DC | 37 | A3 | 1A | 37 | E9 | 73 | FF | E9 | 38 | 00 | BB | FF | FF | CD | 3E |
| 000030B0 | 32 | CD | 3E | 2B | CD | 3F | BC | BB | D8 | 37 | CD | 3F | 6A | BB | 58 | 40 |
| 000030C0 | CD | 3F | 6E | CD | 3E | 79 | BB | 76 | 40 | BA | FE | 36 | CD | 3F | 61 | E8 |
| 000030D0 | 9A | 11 | BB | F6 | 3A | B8 | FE | 36 | CD | 3F | 62 | 75 | 03 | E9 | 38 | FE |
| 000030E0 | E9 | AF | D3 | BB | 86 | 41 | CD | 3F | 34 | A1 | 3C | 37 | A3 | EA | 37 | B8 |
| 000030F0 | 01 | 00 | E9 | 16 | 00 | BB | 8C | 37 | CD | 3F | 0F | BB | 8E | 37 | CD | 3F |
| 00003100 | 0F | BB | 90 | 37 | CD | 3F | 0F | A1 | 92 | 37 | 40 | A3 | 92 | 37 | A1 | EA |
| 00003110 | 37 | 3B | 06 | 92 | 37 | 7D | DE | A1 | 90 | 37 | A3 | EC | 37 | B8 | 01 | 00 |
| 00003120 | E9 | 9D | 01 | B8 | 05 | 00 | F7 | 2E | 3C | 37 | 03 | 06 | 96 | 37 | 05 | FB |
| 00003130 | FF | 92 | BB | 02 | 00 | CD | 3E | 26 | A1 | 8E | 37 | A3 | EE | 37 | A1 | 8C |
| 00003140 | 37 | E9 | 69 | 01 | 8B | 1E | 9A | 37 | D1 | E3 | D1 | E3 | 81 | C3 | DC | 31 |
| 00002910 | 1B | BA | 52 | 37 | CD | 3F | 5B | 8B | 3E | F0 | 36 | D1 | E7 | 8B | 9D | E2 |
| 00002920 | 23 | 2B | 9D | BA | 23 | CD | 3D | 1B | BA | 68 | 37 | CD | 3F | 5B | 8B | 3E |
| 00002930 | F0 | 36 | D1 | E7 | 8B | 9D | 8E | 22 | CD | 3D | 1B | BA | 64 | 37 | CD | 3F |
| 00002940 | 5B | 8B | 36 | F0 | 36 | D1 | E6 | D1 | E6 | 81 | C6 | A0 | 22 | BF | 14 | 40 |
| 00002950 | CD | 3F | 87 | BB | 1A | 00 | CD | 3D | 1C | BA | 60 | 37 | CD | 3F | 5B | BB |
| 00002960 | C0 | 3A | BA | B0 | 36 | 8B | 0E | 88 | 37 | B8 | 01 | 00 | CD | 3F | 5C | BB |
| 00002970 | 48 | 38 | BA | CC | 37 | CD | 3F | 61 | B8 | 01 | 00 | E9 | 1B | 03 | B8 | 01 |
| 00002980 | 00 | E9 | 04 | 03 | B8 | 05 | 00 | F7 | 2E | F0 | 36 | 8B | 1E | 88 | 37 | 2B |
| 00002990 | 1E | 58 | 37 | 93 | BA | 0F | 00 | F7 | EA | 03 | C3 | 03 | 06 | 96 | 37 | 05 |
| 000029A0 | FB | FF | 92 | BB | 05 | 00 | CD | 3E | 26 | 8B | 1E | 96 | 37 | D1 | E3 | D1 |
| 000029B0 | E3 | D1 | E3 | D1 | E3 | D1 | E3 | 03 | 1E | 9A | 37 | D1 | E3 | D1 | E3 | 81 |
| 000029C0 | C3 | 42 | 14 | 8B | 16 | 9A | 37 | D1 | E2 | D1 | E2 | 81 | C2 | 42 | 14 | 87 |
| 000029D0 | DA | CD | 3D | 18 | CD | 3D | 1B | CD | 3F | 5B | 8B | 1E | 9A | 37 | D1 | E3 |
| 000029E0 | D1 | E3 | 81 | C3 | 42 | 14 | CD | 3D | 18 | 83 | FB | 01 | 7D | 03 | E9 | 93 |
| 000029F0 | 02 | BB | C0 | 3A | BA | CC | 37 | CD | 3F | 61 | 83 | 3E | 88 | 37 | 08 | BB |
| 00002A00 | 00 | 00 | 75 | 01 | 4B | 83 | 3E | 88 | 37 | 0F | BA | 00 | 00 | 75 | 01 | 4A |

```
00002A10  0B D3 83 3E 88 37 16 BB  00 00 75 01 4B 0B DA 83
00002A20  3E 88 37 1B BA 00 00 75  01 4A 0B D3 83 3E 88 37
00002A30  20 BB 00 00 75 01 4B 0B  DA 23 DB 74 03 E9 38 01
00002A40  83 3E 96 37 04 74 03 E9  3A 02 BB 89 41 CD 3F 34
00002A50  83 3E 88 37 01 75 03 E9  36 00 A1 88 37 48 A3 D0
00002A60  37 B8 01 00 E9 1D 00 BB  18 37 CD 3F 0F BB A4 37
00002A70  CD 3F 0F BB A6 37 CD 3F  0F 83 3E 18 37 FF 75 E7
00002A80  A1 CA 36 40 A3 CA 36 A1  D0 37 3B 06 CA 36 7D D7
00002A90  BB 18 37 CD 3F 0F BB A4  37 CD 3F 0F BB A6 37 CD
00002AA0  3F 0F 83 3E 18 37 FF 75  03 E9 D8 01 A1 9A 37 3B
00002AB0  06 18 37 75 DB A1 C8 37  40 A3 C8 37 83 3E C8 37
00002AC0  0A 7E 03 E9 BE 01 B8 0A  00 F7 2E F0 36 97 03 3E
00002AD0  C8 37 D1 E7 C7 85 B6 22  00 7D 83 3E 88 37 1B 7C
00002AE0  03 E9 14 00 B8 0A 00 F7  2E F0 36 97 03 3E C8 37
00002AF0  D1 E7 C7 85 B6 22 78 69  83 3E 88 37 16 7C 03 E9
00002B00  14 00 B8 0A 00 F7 2E F0  36 97 03 3E C8 37 D1 E7
00002B10  C7 85 B6 22 F0 55 83 3E  88 37 0F 7C 03 E9 14 00
00002B20  B8 0A 00 F7 2E F0 36 97  03 3E C8 37 D1 E7 C7 85
00002B30  B6 22 98 3A 83 3E 88 37  08 7C 03 E9 14 00 B8 0A
00002B40  00 F7 2E F0 36 97 03 3E  C8 37 D1 E7 C7 85 B6 22
00002B50  40 1F B8 0A 00 F7 2E F0  36 97 03 3E C8 37 D1 E7
00002B60  8B 9D B6 22 B8 64 00 F7  2E A4 37 03 C3 03 06 A6
00002B70  37 89 85 B6 22 E9 0C 01  83 3E 88 37 08 74 03 E9
00002B80  0C 00 BB 89 41 CD 3F 34  C7 06 CA 36 07 00 83 3E
00002B90  88 37 0F 74 03 E9 0C 00  BB 91 41 CD 3F 34 C7 06
00002BA0  CA 36 06 00 83 3E 88 37  16 74 03 E9 0C 00 BB 98
00002BB0  41 CD 3F 34 C7 06 CA 36  06 00 83 3E 88 37 1B 74
00002BC0  03 E9 0C 00 BB 9F 41 CD  3F 34 C7 06 CA 36 04 00
00002BD0  83 3E 88 37 20 74 03 E9  0C 00 BB A4 41 CD 3F 34
00002BE0  C7 06 CA 36 04 00 A1 88  37 8B D8 48 A3 D2 37 2B
00002BF0  1E CA 36 93 E9 7E 00 BB  18 37 CD 3F 0F BB A4 37
00002C00  CD 3F 0F BB A6 37 CD 3F  0F 83 3E 18 37 FF 75 03
00002C10  E9 5E 00 A1 96 37 3B 06  A4 37 BB 00 00 74 01 4B
00002C20  A1 9A 37 3B 06 A6 37 BA  00 00 74 01 4A 0B D3 23
00002C30  D2 75 C4 A1 C8 37 40 A3  C8 37 83 3E C8 37 0A 7E
00002C40  03 E9 40 00 B8 E8 03 F7  2E 88 37 8B D8 B8 64 00
00002C50  F7 2E 96 37 03 C3 03 06  9A 37 8B D8 B8 0A 00 F7
00002C60  2E F0 36 97 03 3E C8 37  D1 E7 89 9D B6 22 E9 13
00002C70  00 A1 3C 37 40 A3 3C 37  A1 D2 37 3B 06 3C 37 7C
00002C80  03 E9 73 FF A1 96 37 40  A3 96 37 83 3E 96 37 05
00002C90  7F 03 E9 EF FC A1 9A 37  40 A3 9A 37 83 3E 9A 37
00002CA0  14 7F 03 E9 D8 FC BB 48  38 B8 CC 37 CD 3F 62 74
00002CB0  03 E9 06 00 BA 4E 37 CD  3F 5B B8 14 00 F7 2E 88
00002CC0  37 8B 1E F0 36 D1 E3 03  D8 83 C3 EB 8B D3 BB 04
00002CD0  00 CD 3E 28 A1 F0 36 40  A3 F0 36 83 3E F0 36 0A
00002CE0  7F 03 E9 04 FB B8 01 00  E9 7A 01 83 3E 48 37 00
00002CF0  BB 00 00 75 01 4B 83 3E  48 37 01 BA 00 00 75 01
00002D00  4A A1 C0 37 3B 06 F0 36  B9 00 00 75 01 49 23 CA
00002D10  0B CB 23 C9 74 03 E9 03  00 E9 45 01 8B 1E F0 36
00002D20  D1 E3 D1 E3 81 C3 42 17  BA 4E 37 CD 3F 5B BB 48
000024F0  3D 18 2B 1E AA 37 CD 3D  1B CD 3F 5B B8 05 00 F7
00002500  2E 88 37 03 06 96 37 05  FB FF 92 BB 02 00 CD 3E
00002510  28 A1 CA 36 40 A3 CA 36  81 3E CA 36 FA 00 7F 03
00002520  E9 61 FD 83 3E B4 36 02  BB 00 00 75 01 4B 83 3E
00002530  EE 36 01 BA 00 00 75 01  4A 23 D3 23 D2 74 03 E9
00002540  D3 09 BB A0 38 BA FE 36  CD 3F 61 BB F6 3A B8 F6
00002550  36 CD 3F 62 75 03 E9 26  01 83 3E F0 36 0A BB 00
00002560  00 75 01 4B 83 3E 48 37  01 BA 00 00 75 01 4A 0B
00002570  D3 23 D2 74 03 E9 62 00  BB 4A 37 B8 80 3F CD 3F
00002580  55 93 BB 20 3B CD 3F 55  8B D3 8B 1E 3C 37 CD 3D
00002590  10 92 CD 3F 55 BA FE 36  CD 3F 61 E8 C8 1C BB A0
000025A0  38 B8 FE 36 CD 3F 62 BA  00 00 75 01 4A 83 3E F0
000025B0  36 01 BB 00 00 7E 01 4B  23 DA 8B D3 BB F6 3A CD
000025C0  3F 62 B9 00 00 75 01 49  0B CA 23 C9 74 03 E9 09
000025D0  00 A1 BC 23 A3 D0 23 E9  8D 00 BB FF FF CD 3E 32
000025E0  CD 3F BC BB A0 3F CD 3F  6A BB A6 38 B8 24 37 8B
000025F0  D3 CD 3F 55 CD 3D 09 87  DA CD 3F 55 CD 3D 0B CD
00002600  3F 6A BB AA 3F CD 3F 6E  CD 3E 79 BB BA 3F CD 3F
00002610  B5 00 CD 3F B7 01 01 8B  1E F0 36 D1 E3 81 C3 CE
00002620  23 CD 3F B8 8B 3E F0 36  D1 E7 83 BD CE 23 01 BB
00002630  00 00 7D 01 4B 8B 95 BA  23 3B 95 CE 23 B9 00 00
00002640  7D 01 49 0B CB 8B DA 93  99 F7 BD CE 23 0B D2 BB
00002650  00 00 74 01 4B 0B D9 23  DB 74 03 E9 03 00 E9 06
00002660  00 CD 3E 2B E9 73 FF BB  F6 3A B8 FE 36 CD 3F 62
```

| | | | | | | | | | | | | | | | | |
|---|---|---|---|---|---|---|---|---|---|---|---|---|---|---|---|---|
| 00002670 | 74 | 03 | E9 | 0A | 00 | A1 | F0 | 36 | 40 | A3 | F0 | 36 | E9 | 73 | DE | A1 |
| 00002680 | F0 | 36 | A3 | C0 | 37 | BB | FF | FF | CD | 3E | 32 | CD | 3F | BC | BB | E2 |
| 00002690 | 3F | CD | 3F | 6E | CD | 3E | 79 | BB | 20 | 00 | 8B | D3 | CD | 3D | 0E | BA |
| 000026A0 | B0 | 36 | CD | 3F | 61 | BB | 48 | 38 | B8 | AC | 36 | CD | 3F | 62 | 75 | 03 |
| 000026B0 | E9 | D2 | 07 | BB | 04 | 00 | CD | 3E | 21 | BB | 66 | 38 | CD | 3E | 1F | BB |
| 000026C0 | 04 | 00 | BA | AE | 3A | B9 | 00 | 01 | CD | 3E | 1E | BB | 04 | 00 | CD | 3F |
| 000026D0 | B3 | BB | 4E | 37 | BA | 01 | 00 | CD | 3F | B4 | BB | 52 | 37 | BA | 02 | 00 |
| 000026E0 | CD | 3F | B4 | B8 | 01 | 00 | E9 | 5A | 00 | B8 | 01 | 00 | E9 | 46 | 00 | BB |
| 000026F0 | 04 | 00 | CD | 3F | B3 | B8 | 28 | 00 | F7 | 2E | C2 | 37 | 8B | 1E | C4 | 37 |
| 00002700 | 8B | D3 | D1 | E3 | 03 | D8 | 83 | C3 | D9 | 87 | D3 | 8B | CB | BB | CE | 36 |
| 00002710 | CD | 3F | B4 | 8B | 1E | C2 | 37 | D1 | E3 | D1 | E3 | D1 | E3 | D1 | E3 | D1 |
| 00002720 | E3 | 03 | D9 | D1 | E3 | D1 | E3 | 81 | C3 | 42 | 14 | BA | 02 | 00 | CD | 3F |
| 00002730 | B4 | A1 | C4 | 37 | 40 | A3 | C4 | 37 | 83 | 3E | C4 | 37 | 14 | 7E | B0 | A1 |
| 00002740 | C2 | 37 | 40 | A3 | C2 | 37 | 83 | 3E | C2 | 37 | 05 | 7E | 9C | BB | 04 | 00 |
| 00002750 | CD | 3F | B3 | BB | CE | 36 | BA | E3 | 00 | CD | 3F | B4 | BB | 60 | 37 | BA |
| 00002760 | 04 | 00 | CD | 3F | B4 | BB | 64 | 37 | BA | 02 | 00 | CD | 3F | B4 | BB | 68 |
| 00002770 | 37 | CD | 3F | B4 | BB | 6C | 37 | BA | 14 | 00 | CD | 3F | B4 | BB | 70 | 37 |
| 00002780 | BA | 01 | 00 | CD | 3F | B4 | A1 | 5A | 37 | A3 | C6 | 37 | A1 | 58 | 37 | E9 |
| 00002790 | E4 | 06 | BB | 03 | 00 | CD | 3E | 42 | BB | 01 | 00 | CD | 3E | 42 | 33 | DB |
| 000027A0 | CD | 3E | 44 | CD | 3F | BC | BB | F4 | 3F | CD | 3F | 6A | 8B | 1E | 88 | 37 |
| 000027B0 | CD | 3F | 6D | CD | 3E | 79 | 8B | 1E | 88 | 37 | D1 | E3 | D1 | E3 | 81 | C3 |
| 000027C0 | F4 | 23 | 93 | BB | C0 | 3A | CD | 3F | 62 | BA | 00 | 00 | 74 | 01 | 4A | 83 |
| 000027D0 | 3E | 32 | 37 | 00 | BB | 00 | 00 | 7E | 01 | 4B | 23 | DA | 23 | DB | 74 | 03 |
| 000027E0 | E9 | 8F | 06 | B8 | 01 | 00 | E9 | EF | 04 | B8 | 01 | 00 | E9 | 18 | 00 | B8 |
| 000027F0 | 0A | 00 | F7 | 2E | F0 | 36 | 97 | 03 | 3E | CA | 36 | D1 | E7 | C7 | 85 | B6 |
| 00002800 | 22 | 00 | 00 | A1 | CA | 36 | 40 | A3 | CA | 36 | 83 | 3E | CA | 36 | 0A | 7E |
| 00002810 | DE | C7 | 06 | C8 | 37 | 00 | 00 | BB | A0 | 38 | B8 | F6 | 36 | CD | 3F | 62 |
| 00002820 | 75 | 03 | E9 | 81 | 00 | B8 | 14 | 00 | F7 | 2E | 88 | 37 | 8B | 1E | B2 | 37 |
| 00002830 | D1 | E3 | 03 | D8 | 83 | C3 | EB | 8B | D3 | BB | 04 | 00 | CD | 3E | 26 | BB |
| 00002840 | 52 | 37 | CD | 3D | 18 | 8B | 3E | B2 | 37 | D1 | E7 | 03 | 9D | BA | 23 | 93 |
| 00002850 | A3 | CA | 37 | 83 | 3E | CA | 37 | 00 | 7E | 03 | E9 | 0F | 00 | BB | 0E | 40 |
| 00002860 | BA | 4E | 37 | CD | 3F | 5B | C7 | 06 | CA | 37 | 00 | 00 | 8B | 1E | CA | 37 |
| 00002870 | CD | 3D | 1B | BA | 52 | 37 | CD | 3F | 5B | B8 | 14 | 00 | F7 | 2E | 88 | 37 |
| 00002880 | 8B | 1E | B2 | 37 | D1 | E3 | 03 | D8 | 83 | C3 | EB | 8B | D3 | BB | 04 | 00 |
| 00002890 | CD | 3E | 28 | BB | C0 | 3A | BA | B0 | 36 | 8B | 0E | 88 | 37 | B8 | 01 | 00 |
| 000028A0 | CD | 3F | 5C | E9 | CC | 05 | 83 | 3E | 48 | 37 | 00 | BB | 00 | 00 | 75 | 01 |
| 000028B0 | 4B | 83 | 3E | 48 | 37 | 01 | BA | 00 | 00 | 75 | 01 | 4A | A1 | C0 | 37 | 3B |
| 000028C0 | 06 | F0 | 36 | B9 | 00 | 00 | 75 | 01 | 49 | 23 | CA | 0B | CB | 23 | C9 | 74 |
| 000028D0 | 03 | E9 | 03 | 00 | E9 | FD | 03 | 8B | 1E | F0 | 36 | D1 | E3 | D1 | E3 | 81 |
| 000028E0 | C3 | 42 | 17 | BA | 4E | 37 | CD | 3F | 5B | BB | 48 | 38 | BA | 70 | 37 | CD |
| 000028F0 | 3F | 5B | 8B | 1E | F0 | 36 | D1 | E3 | D1 | E3 | 81 | C3 | 90 | 23 | BA | 6C |
| 00002900 | 37 | CD | 3F | 5B | 8B | 3E | F0 | 36 | D1 | E7 | 8B | 9D | BA | 23 | CD | 3D |
| 000020D0 | BB | 00 | 00 | 7D | 01 | 4B | 0B | C0 | BA | 00 | 00 | 7E | 01 | 4A | 23 | D3 |
| 000020E0 | 23 | D2 | 75 | 03 | E9 | 03 | 00 | A3 | AA | 37 | 83 | 3E | AA | 37 | 01 | BB |
| 000020F0 | 00 | 00 | 7D | 01 | 4B | 8B | D3 | BB | A0 | 38 | B8 | F6 | 36 | CD | 3F | 62 |
| 00002100 | B9 | 00 | 00 | 75 | 01 | 49 | 23 | CA | A1 | 84 | 37 | 3B | 06 | AA | 37 | BB |
| 00002110 | 00 | 00 | 7D | 01 | 4B | 8B | D3 | BB | 48 | 38 | B8 | F2 | 36 | CD | 3F | 62 |
| 00002120 | 89 | 56 | FA | BA | 00 | 00 | 75 | 01 | 4A | 23 | 56 | FA | 0B | D1 | 8B | D8 |
| 00002130 | A1 | 82 | 37 | 3B | 06 | AA | 37 | B9 | 00 | 00 | 7D | 01 | 49 | 93 | BB | C0 |
| 00002140 | 3A | CD | 3F | 62 | 89 | 46 | F8 | B8 | 00 | 00 | 75 | 01 | 48 | 23 | C1 | 0B |
| 00002150 | C2 | 23 | C0 | 74 | 03 | E9 | 6E | FE | C7 | 06 | B6 | 37 | 01 | 00 | BB | 48 |
| 00002160 | 38 | B8 | F2 | 36 | CD | 3F | 62 | 75 | 03 | E9 | 0F | 00 | A1 | AA | 37 | A3 |
| 00002170 | 84 | 37 | A1 | AA | 37 | A3 | B6 | 37 | E9 | 06 | 00 | A1 | AA | 37 | A3 | 84 |
| 00002180 | 37 | 8B | 3E | F0 | 36 | D1 | E7 | 8B | 1E | 84 | 37 | 89 | 9D | BA | 23 | 8B |
| 00002190 | 3E | F0 | 36 | D1 | E7 | 8B | 1E | B4 | 37 | 89 | 9D | E2 | 23 | 8B | 1E | F0 |
| 000021A0 | 36 | D1 | E3 | D1 | E3 | 81 | C3 | 90 | 23 | 8B | D3 | BB | 24 | 37 | CD | 3F |
| 000021B0 | 61 | 8B | 3E | F0 | 36 | D1 | E7 | 8B | 1E | 22 | 37 | 89 | 9D | 8E | 22 | 8B |
| 000021C0 | 3E | F0 | 36 | D1 | E7 | D1 | E7 | 81 | C7 | A0 | 22 | BE | 2A | 37 | CD | 3F |
| 000021D0 | 7B | 83 | 3E | 5A | 37 | 1B | BB | 00 | 00 | 74 | 01 | 4B | 83 | 3E | 5A | 37 |
| 000021E0 | 20 | BA | 00 | 00 | 74 | 01 | 4A | 23 | D3 | 83 | 3E | B4 | 36 | 02 | BB | 00 |
| 000021F0 | 00 | 75 | 01 | 4B | 0B | DA | 23 | DB | 74 | 03 | E9 | 6D | 00 | BB | FF | FF |
| 00002200 | CD | 3E | 32 | BB | 30 | 3F | CD | 3F | B5 | 00 | CD | 3F | B7 | 01 | 04 | BB |
| 00002210 | B8 | 37 | CD | 3F | B8 | BB | 74 | 3F | B8 | B8 | 37 | CD | 3F | 62 | BA | 00 |
| 00002220 | 00 | 74 | 01 | 4A | BB | 66 | 38 | CD | 3F | 62 | B9 | 00 | 00 | 74 | 01 | 49 |
| 00002230 | 23 | CA | BB | 7A | 3F | CD | 3F | 62 | BA | 00 | 00 | 74 | 01 | 4A | 23 | D1 |
| 00002240 | 23 | D2 | 75 | B9 | 8B | 1E | F0 | 36 | D1 | E3 | D1 | E3 | 81 | C3 | 90 | 23 |
| 00002250 | BA | 13 | 00 | 8B | CB | CD | 3D | 0B | 93 | BB | B8 | 37 | CD | 3F | 55 | 8B |
| 00002260 | D1 | CD | 3F | 61 | BB | FF | FF | CD | 3E | 32 | 8B | 1E | F0 | 36 | D1 | E3 |
| 00002270 | D1 | E3 | 81 | C3 | 42 | 17 | 8B | D3 | BB | C0 | 3A | CD | 3F | 61 | B8 | 01 |
| 00002280 | 00 | E9 | 91 | 02 | 8B | 3E | CA | 36 | D1 | E7 | 83 | BD | 44 | 1C | 00 | 75 |
| 00002290 | 03 | E9 | 8F | 02 | A1 | 84 | 37 | F7 | 2E | B6 | 37 | 8B | 3E | CA | 36 | D1 |
| 000022A0 | E7 | F7 | AD | 38 | 1E | A3 | AA | 37 | 8B | 1E | CA | 36 | D1 | E3 | D1 | E3 |
| 000022B0 | 81 | C3 | F4 | 2D | CD | 3F | BA | 93 | A3 | BC | 37 | 8B | 16 | BC | 37 | 4A |
| 000022C0 | 4A | 4A | 4A | 8B | 1E | CA | 36 | D1 | E3 | D1 | E3 | 81 | C3 | F4 | 2D | CD |

```
000022D0  3D 0B CD 3D 13 CD 3F 78  93 A3 96 37 8B 1E CA 36
000022E0  D1 E3 D1 E3 81 C3 F4 2D  BA 02 00 CD 3D 0C CD 3D
000022F0  13 CD 3F 78 93 A3 88 37  8B 16 BC 37 4A 4A 4A 8B
00002300  1E CA 36 D1 E3 D1 E3 81  C3 F4 2D B9 02 00 CD 3D
00002310  0A CD 3D 13 CD 3F 78 93  A3 9A 37 83 3E 96 37 00
00002320  BB 00 00 75 01 4B 83 3E  88 37 00 BA 00 00 75 01
00002330  4A 0B D3 83 3E 9A 37 00  BB 00 00 75 01 4B 0B DA
00002340  23 DB 74 03 E9 CA 01 8B  1E 88 37 D1 E3 D1 E3 81
00002350  C3 F4 23 93 BB C0 3A CD  3F 62 74 03 E9 B2 01 B8
00002360  05 00 F7 2E F0 36 8B 1E  88 37 2B 1E 58 37 93 BA
00002370  0F 00 F7 EA 03 C3 03 06  96 37 05 FB FF A3 30 37
00002380  BB 05 00 8B 16 30 37 CD  3E 26 8B 1E 9A 37 D1 E3
00002390  D1 E3 81 C3 42 14 8B 3E  CA 36 D1 E7 8B 85 38 1E
000023A0  F7 2E B6 37 93 CD 3D 1B  92 CD 3F 5B BB 05 00 8B
000023B0  16 30 37 CD 3E 28 83 3E  88 37 08 BB 00 00 74 01
000023C0  4B 83 3E 88 37 0F BA 00  00 74 01 4A 23 D3 83 3E
000023D0  88 37 16 BB 00 00 74 01  4B 23 DA 83 3E 88 37 1B
000023E0  BA 00 00 74 01 4A 23 D3  83 3E 88 37 20 BB 00 00
000023F0  74 01 4B 23 DA 23 DB 75  03 E9 0D 00 83 3E 96 37
00002400  04 75 03 E9 0B 01 E9 C3  00 BB 89 41 CD 3F 34 83
00002410  3E 88 37 20 74 03 E9 06  00 C7 06 A0 37 1B 00 83
00002420  3E 88 37 1B 74 03 E9 06  00 C7 06 A0 37 16 00 83
00002430  3E 88 37 16 74 03 E9 06  00 C7 06 A0 37 0F 00 83
00002440  3E 88 37 0F 74 03 E9 06  00 C7 06 A0 37 08 00 83
00002450  3E 88 37 08 74 03 E9 06  00 C7 06 A0 37 00 00 A1
00002460  88 37 48 A3 BE 37 B8 01  00 E9 54 00 BB A4 37 CD
00002470  3F 0F BB A6 37 CD 3F 0F  BB A8 37 CD 3F 0F 83 3E
00002480  A4 37 FF 75 03 E9 34 00  A1 96 37 3B 06 A6 37 BB
00002490  00 00 75 01 4B A1 9A 37  3B 06 A8 37 BA 00 00 75
000024A0  01 4A 23 D3 A1 A0 37 3B  06 18 37 BB 00 00 7D 01
000024B0  4B 23 DA 23 DB 74 03 E9  57 00 EB B0 A1 18 37 40
000024C0  A3 18 37 A1 BE 37 3B 06  18 37 7D A0 B8 05 00 F7
000024D0  2E 88 37 03 06 96 37 05  FB FF 92 BB 02 00 CD 3E
000024E0  26 8B 1E 9A 37 D1 E3 D1  E3 81 C3 5C 32 8B D3 CD
00001CB0  87 D3 CD 3D 0C CD 3F 6E  CD 3E 79 CD 3F C0 BB 4A
00001CC0  37 CD 3F 6A BB 20 3B CD  3F 6A 8B 1E 3C 37 CD 3F
00001CD0  6D CD 3E 79 CD 3F C0 BB  48 38 CD 3F 6E CD 3E 79
00001CE0  B8 01 00 E9 28 00 8B 1E  CA 36 D1 E3 D1 E3 81 C3
00001CF0  14 36 8B D3 CD 3F BA 83  FB 0A 7F 03 E9 0B 00 CD
00001D00  3F C0 8B DA CD 3F 6E CD  3E 79 A1 CA 36 40 A3 CA
00001D10  36 83 3E CA 36 1E 7E CE  CD 3F C0 BB 0C 00 CD 3D
00001D20  05 CD 3F 6E CD 3E 79 BB  76 3D BA FE 36 CD 3F 61
00001D30  BB 17 00 CD 3E 42 BB 01  00 CD 3E 42 33 DB CD 3E
00001D40  44 E8 28 25 BB F6 3A B8  FE 36 CD 3F 62 75 03 E9
00001D50  4F E7 83 3E F0 36 01 BB  00 00 75 01 4B 8B D3 BB
00001D60  48 38 B8 AC 36 CD 3F 62  B9 00 00 75 01 49 0B CA
00001D70  23 C9 74 03 E9 9E 11 A1  F0 36 48 A3 F0 36 E9 FE
00001D80  08 83 3E B4 36 02 BB 00  00 75 01 4B 83 3E EE 36
00001D90  01 BA 00 00 75 01 4A 23  D3 23 D2 74 03 E9 26 02
00001DA0  8B 1E 82 37 CD 3F 57 BE  9C 3D CD 3F 8B BB 1A 00
00001DB0  CD 3D 03 CD 3F 77 93 A3  82 37 8B 1E 82 37 CD 3F
00001DC0  57 BE 9C 3D CD 3F 8B BB  1A 00 CD 3D 03 CD 3F 77
00001DD0  93 A3 82 37 A1 82 37 3B  06 84 37 7F 03 E9 06 00
00001DE0  A1 84 37 A3 82 37 BB FF  FF CD 3E 32 CD 3F BC BB
00001DF0  A0 3D CD 3F 6A 8B 1E 84  37 CD 3F 69 BB C4 3D CD
00001E00  3F 6E CD 3E 79 CD 3F BC  BB 48 38 CD 3F 6E CD 3E
00001E10  79 CD 3F BC BB DC 3D CD  3F 6E CD 3E 79 B8 01 00
00001E20  E9 33 00 8B 1E CA 36 D1  E3 D1 E3 81 C3 EC 35 CD
00001E30  3D 13 BF EC 3D CD 3F A2  76 03 E9 15 00 CD 3F BC
00001E40  8B 1E CA 36 D1 E3 D1 E3  81 C3 EC 35 CD 3F 6E CD
00001E50  3E 79 A1 CA 36 40 A3 CA  36 83 3E CA 36 0A 7E C3
00001E60  BB 17 00 CD 3E 42 BB 01  00 CD 3E 42 33 DB CD 3E
00001E70  44 BB 12 3D BA FE 36 CD  3F 61 E8 EF 23 BB A0 38
00001E80  B8 FE 36 CD 3F 62 75 03  E9 FE 00 BB 17 00 CD 3E
00001E90  42 BB 01 00 CD 3E 42 33  DB CD 3E 44 BB F4 3D BA
00001EA0  FE 36 CD 3F 61 E8 C4 23  BB A0 38 B8 FE 36 CD 3F
00001EB0  62 75 03 E9 D3 00 CD 3F  C0 BB 22 3E CD 3F 6E CD
00001EC0  3E 79 CD 3F C0 BB F6 38  CD 3F 6A BB 1E 37 BA E8
00001ED0  38 8B CB CD 3D 09 4B 87  D9 87 D1 8B C3 CD 3D 0B
00001EE0  CD 3F 6A BB 5C 3D CD 3F  6A 93 8B D1 8B C3 CD 3D
00001EF0  09 93 8B D3 CD 3F BA 2B  D8 87 D3 CD 3D 0C CD 3F
00001F00  6E CD 3E 79 CD 3F C0 BB  4A 37 CD 3F 6A BB 20 3B
00001F10  CD 3F 6A 8B 1E 3C 37 CD  3F 6D CD 3E 79 CD 3F C0
00001F20  BB 3C 3E CD 3F 6A 8B 1E  84 37 CD 3F 69 BB 60 3E
```

```
00001F30  CD 3F 6E CD 3E 79 CD 3F  C0 BB 48 38 CD 3F 6E CD
00001F40  3E 79 B8 01 00 E9 28 00  8B 1E CA 36 D1 E3 D1 E3
00001F50  81 C3 EC 35 8B D3 CD 3F  BA 83 FB 0A 7F 03 E9 0B
00001F60  00 CD 3F C0 8B DA CD 3F  6E CD 3E 79 A1 CA 36 40
00001F70  A3 CA 36 83 3E CA 36 0A  7E CE CD 3F C0 BB 0C 00
00001F80  CD 3D 05 CD 3F 6E CD 3E  79 BB 17 00 CD 3E 42 BB
00001F90  01 00 CD 3E 42 33 DB CD  3E 44 BB 78 3E BA FE 36
00001FA0  CD 3F 61 E8 C6 22 BB A0  38 B8 FE 36 CD 3F 62 75
00001FB0  03 E9 73 FD BB 48 38 BA  F2 36 CD 3F 61 BB F6 3A
00001FC0  BA AC 36 CD 3F 61 BB FF  FF CD 3E 32 83 3E B4 36
00001FD0  02 75 03 E9 59 00 B8 01  00 E9 49 00 8B 3E CC 36
00001FE0  D1 E7 8B 9D 8E 22 3B 1E  22 37 74 03 E9 32 00 BB
00001FF0  A8 3E BA FE 36 CD 3F 61  E8 6B 22 BB A0 38 B8 FE
00002000  36 CD 3F 62 75 03 E9 18  00 BB FE 36 BA F6 36 CD
00002010  3F 61 A1 CC 36 A3 B2 37  A1 CC 36 A3 F0 36 E9 0E
00002020  00 A1 CC 36 40 A3 CC 36  83 3E CC 36 0A 7E AD BB
00002030  FF FF CD 3E 32 83 3E B4  36 02 BB 00 00 75 01 4B
00002040  83 3E EE 36 01 BA 00 00  75 01 4A 23 D3 23 D2 75
00002050  03 E9 15 00 BB EE 3E CD  3F B5 00 CD 3F B7 01 01
00002060  BB AA 37 CD 3F B8 E9 12  00 BB 1A 3F CD 3F B5 00
00002070  CD 3F B7 01 01 BB AA 37  CD 3F B8 BB FF FF CD 3E
00002080  32 83 3E AA 37 00 74 AD  83 3E B4 36 02 BB 00 00
00002090  75 01 4B 83 3E EE 36 01  BA 00 00 75 01 4A 23 D3
000020A0  23 D2 74 03 E9 03 00 E9  0B 00 A1 AA 37 F7 D8 A3
000020B0  AA 37 E9 A3 00 A1 AA 37  A3 B4 37 BB C0 3A B8 F2
000020C0  36 CD 3F 62 75 03 E9 21  00 A1 84 37 3B 06 AA 37
00001890  3A CD 3F 62 74 03 E9 B7  02 8B 1E 9A 37 D1 E3 D1
000018A0  E3 81 C3 5C 32 CD 3D 18  CD 3F 57 8B 3E CA 36 D1
000018B0  E7 8B 9D 38 1E CD 3F 71  80 CD 3F 57 CD 3F 8D 80
000018C0  BB 1A 00 CD 3D 03 CD 3F  77 93 A3 AA 37 BB F6 3A
000018D0  BA 9C 37 CD 3F 61 A1 84  37 3B 06 AA 37 7F 03 E9
000018E0  06 00 A1 AA 37 A3 84 37  8B 3E CA 36 D1 E7 8B 9D
000018F0  38 1E 3B 1E 82 37 7F 03  E9 04 00 93 A3 82 37 8B
00001900  1E CA 36 D1 E3 D1 E3 81  C3 F4 2D B8 64 00 F7 2E
00001910  9A 37 03 06 88 37 05 10  27 93 CD 3D 10 92 CD 3F
00001920  61 8B 1E 96 37 CD 3D 10  BA FE 36 CD 3F 61 BB FE
00001930  36 BA 01 00 8B CB CD 3D  0C 8B D1 CD 3F 61 8B 1E
00001940  CA 36 D1 E3 D1 E3 81 C3  F4 2D BA 04 00 8B CB CD
00001950  3D 0C 8B D1 CD 3F 61 8B  1E CA 36 D1 E3 D1 E3 81
00001960  C3 F4 2D B8 FE 36 8B D3  CD 3F 55 CD 3F 61 E9 A4
00001970  00 A1 88 37 40 A3 88 37  A1 86 37 3B 06 88 37 7C
00001980  03 E9 04 FD 8B 3E CA 36  D1 E7 BB 01 00 8B 95 44
00001990  1C CD 3E 26 B8 01 00 E9  1B 00 8B 1E CC 36 D1 E3
000019A0  D1 E3 81 C3 14 36 CD 3F  BA 83 FB 0A 7D 03 E9 11
000019B0  00 A1 CC 36 40 A3 CC 36  83 3E CC 36 1E 7E DB E9
000019C0  A0 01 8B 1E CC 36 D1 E3  D1 E3 81 C3 14 36 8B D3
000019D0  BB BE 36 B8 8E 3C CD 3F  55 93 BB 9A 3C CD 3F 55
000019E0  93 BB C2 36 CD 3F 55 93  BB A0 3C CD 3F 55 8B 3E
000019F0  CA 36 D1 E7 8B CB 8B 9D  2C 20 CD 3D 10 91 CD 3F
00001A00  55 93 BB AC 3C CD 3F 55  93 BB C6 36 CD 3F 55 CD
00001A10  3F 61 E9 3B 01 8B 3E CA  36 D1 E7 83 BD 44 1C 00
00001A20  BB 00 00 75 01 4B 83 3E  B4 36 01 BA 00 00 74 01
00001A30  4A 0B D3 BB A0 38 B8 9C  37 CD 3F 62 B9 00 00 75
00001A40  01 49 0B CA 23 C9 74 03  E9 05 01 B8 01 00 E9 27
00001A50  00 8B 1E AA 37 CD 3F 56  8B 1E CC 36 D1 E3 D1 E3
00001A60  81 C3 EC 35 CD 3F 72 80  CD 3D 13 CD 3F A6 80 73
00001A70  03 E9 11 00 A1 CC 36 40  A3 CC 36 83 3E CC 36 0A
00001A80  7E CF E9 CB 00 83 3E CC  36 0A 75 03 E9 33 00 A1
00001A90  CC 36 A3 AC 37 B8 09 00  E9 1B 00 8B 1E AE 37 D1
00001AA0  E3 D1 E3 8B D3 81 C3 F0  35 81 C2 EC 35 87 D3 CD
00001AB0  3F 61 A1 AE 37 48 A3 AE  37 A1 AC 37 3B 06 AE 37
00001AC0  7E D9 8B 3E CA 36 D1 E7  BB 01 00 8B 95 44 1C CD
00001AD0  3E 26 8B 1E CC 36 D1 E3  D1 E3 81 C3 EC 35 8B D3
00001AE0  8B 1E AA 37 CD 3D 10 93  BB BA 3C CD 3F 55 93 BB
00001AF0  BE 36 CD 3F 55 93 BB 9A  3C CD 3F 55 93 BB C2 36
00001B00  CD 3F 55 93 BB C6 3C CD  3F 55 8B CB 8B 1E 88 37
00001B10  CD 3D 10 91 CD 3F 55 93  BB D0 3C CD 3F 55 8B CB
00001B20  8B 1E 96 37 CD 3D 10 91  CD 3F 55 93 BB D6 3C CD
00001B30  3F 55 8B CB 8B 1E 9A 37  CD 3D 10 91 CD 3F 55 93
00001B40  BB DC 3C CD 3F 55 93 BB  C6 36 CD 3F 55 CD 3F 61
00001B50  A1 CA 36 40 A3 CA 36 81  3E CA 36 FA 00 7F 03 E9
00001B60  F6 FA BB 18 36 CD 3F BA  83 FB 0A 7D 03 E9 11 02
00001B70  C7 06 B0 37 63 00 B8 01  00 E9 8E 00 8B 1E CA 36
00001B80  D1 E3 D1 E3 81 C3 14 36  CD 3F BA 83 FB 0A 7D 03
```

| | | | | | | | | | | | | | | | | |
|---|---|---|---|---|---|---|---|---|---|---|---|---|---|---|---|---|
| 00001B90 | E9 | 84 | 00 | 83 | 3E | B0 | 37 | 14 | 7D | 03 | E9 | 4D | 00 | 83 | 3E | B0 |
| 00001BA0 | 37 | 1E | 7E | 03 | E9 | 2B | 00 | BB | 17 | 00 | CD | 3E | 42 | BB | 01 | 00 |
| 00001BB0 | CD | 3E | 42 | 33 | DB | CD | 3E | 44 | BB | E8 | 3C | BA | FE | 36 | CD | 3F |
| 00001BC0 | 61 | E8 | A8 | 26 | BB | A0 | 38 | B8 | FE | 36 | CD | 3F | 62 | 75 | 03 | E9 |
| 00001BD0 | 45 | 00 | BB | FF | FF | CD | 3E | 32 | CD | 3F | BC | BB | FC | 3C | CD | 3F |
| 00001BE0 | 6E | CD | 3E | 79 | C7 | 06 | B0 | 37 | 00 | 00 | A1 | B0 | 37 | 40 | A3 | B0 |
| 00001BF0 | 37 | CD | 3F | BC | 8B | 1E | CA | 36 | D1 | E3 | D1 | E3 | 81 | C3 | 14 | 36 |
| 00001C00 | CD | 3F | 6E | CD | 3E | 79 | A1 | CA | 36 | 40 | A3 | CA | 36 | 83 | 3E | CA |
| 00001C10 | 36 | 1E | 7F | 03 | E9 | 65 | FF | BB | 17 | 00 | CD | 3E | 42 | BB | 01 | 00 |
| 00001C20 | CD | 3E | 42 | 33 | DB | CD | 3E | 44 | BB | 12 | 3D | BA | FE | 36 | CD | 3F |
| 00001C30 | 61 | E8 | 38 | 26 | BB | A0 | 38 | B8 | FE | 36 | CD | 3F | 62 | 75 | 03 | E9 |
| 00001C40 | E5 | 00 | BB | 17 | 00 | CD | 3E | 42 | BB | 01 | 00 | CD | 3E | 42 | 33 | DB |
| 00001C50 | CD | 3E | 44 | BB | 34 | 3D | BA | FE | 36 | CD | 3F | 61 | E8 | 0D | 26 | BB |
| 00001C60 | A0 | 38 | B8 | FE | 36 | CD | 3F | 62 | 75 | 03 | E9 | BA | 00 | CD | 3F | C0 |
| 00001C70 | BB | FC | 3C | CD | 3F | 6E | CD | 3E | 79 | CD | 3F | C0 | BB | F6 | 38 | CD |
| 00001C80 | 3F | 6A | BB | 1E | 37 | BA | E8 | 38 | 8B | CB | CD | 3D | 09 | 4B | 87 | D9 |
| 00001C90 | 87 | D1 | 8B | C3 | CD | 3D | 0B | CD | 3F | 6A | BB | 5C | 3D | CD | 3F | 6A |
| 00001CA0 | 93 | 8B | D1 | 8B | C3 | CD | 3D | 09 | 93 | 8B | D3 | CD | 3F | BA | 2B | D8 |
| 00001470 | D1 | E3 | 81 | C3 | 46 | 17 | 8B | D3 | BB | 4E | 37 | CD | 3F | 61 | 8B | 1E |
| 00001480 | CA | 36 | D1 | E3 | D1 | E3 | 81 | C3 | 94 | 23 | 8B | D3 | BB | 6C | 37 | CD |
| 00001490 | 3F | 61 | BB | 52 | 37 | CD | 3D | 18 | 8B | 3E | CA | 36 | D1 | E7 | 89 | 9D |
| 000014A0 | BC | 23 | BB | 64 | 37 | CD | 3D | 18 | 8B | 3E | CA | 36 | D1 | E7 | 89 | 9D |
| 000014B0 | 90 | 22 | 8B | 3E | CA | 36 | D1 | E7 | D1 | E7 | 81 | C7 | A4 | 22 | BB | 60 |
| 000014C0 | 37 | CD | 3D | 19 | CD | 3F | 7D | B8 | 14 | 00 | F7 | 2E | 58 | 37 | 8B | 1E |
| 000014D0 | CA | 36 | D1 | E3 | 03 | D8 | 83 | C3 | EE | 8B | D3 | BB | 04 | 00 | CD | 3E |
| 000014E0 | 26 | BB | 52 | 37 | CD | 3D | 18 | 8B | 3E | CA | 36 | D1 | E7 | 89 | 9D | D0 |
| 000014F0 | 23 | A1 | CA | 36 | 40 | A3 | CA | 36 | 83 | 3E | CA | 36 | 09 | 7F | 03 | E9 |
| 00001500 | 32 | FF | C7 | 06 | F0 | 36 | 00 | 00 | B8 | 0A | 00 | E9 | 76 | 00 | A1 | 5A |
| 00001510 | 37 | A3 | 76 | 37 | A1 | 58 | 37 | 40 | E9 | 53 | 00 | B8 | 14 | 00 | F7 | 2E |
| 00001520 | CC | 36 | 8B | 1E | CA | 36 | D1 | E3 | 03 | D8 | 83 | C3 | EB | 8B | D3 | BB |
| 00001530 | 04 | 00 | CD | 3E | 26 | BB | C0 | 3A | B8 | 4E | 37 | CD | 3F | 62 | BA | 00 |
| 00001540 | 00 | 74 | 01 | 4A | BB | 14 | 3C | CD | 3F | 62 | B9 | 00 | 00 | 74 | 01 | 49 |
| 00001550 | 23 | CA | BB | 1A | 3C | CD | 3F | 62 | BA | 00 | 00 | 74 | 01 | 4A | 23 | D1 |
| 00001560 | 23 | D2 | 74 | 03 | E9 | 03 | 00 | E9 | 24 | 00 | A1 | CC | 36 | 40 | A3 | CC |
| 00001570 | 36 | A1 | 76 | 37 | 3B | 06 | CC | 36 | 7D | A1 | A1 | CA | 36 | A3 | F0 | 36 |
| 00001580 | A1 | CA | 36 | 48 | A3 | CA | 36 | 83 | 3E | CA | 36 | 01 | 7D | 80 | BB | 04 |
| 00001590 | 00 | CD | 3E | 21 | 83 | 3E | F0 | 36 | 00 | 7E | 03 | E9 | 62 | 00 | BB | FF |
| 000015A0 | FF | CD | 3E | 32 | CD | 3F | BC | 8B | 1E | 78 | 37 | CD | 3F | 69 | 8B | 1E |
| 000015B0 | 7A | 37 | CD | 3F | 69 | 8B | 1E | 7C | 37 | CD | 3F | 69 | 8B | 1E | 7E | 37 |
| 000015C0 | CD | 3F | 69 | BB | 0A | 00 | CD | 3F | 69 | 8B | 1E | 80 | 37 | CD | 3F | 69 |
| 000015D0 | BB | 74 | 3A | CD | 3F | 6E | CD | 3E | 79 | CD | 3F | BC | BB | 20 | 3C | CD |
| 000015E0 | 3F | 6E | CD | 3E | 79 | CD | 3F | BC | BB | 5E | 3C | CD | 3F | 6A | CD | 3E |
| 000015F0 | 79 | CD | 3D | 06 | 93 | BB | 74 | 3A | CD | 3F | 62 | 74 | F4 | E9 | 15 | 19 |
| 00001600 | C7 | 06 | 82 | 37 | 01 | 00 | C7 | 06 | 84 | 37 | 2F | 75 | B8 | 01 | 00 | E9 |
| 00001610 | 36 | 00 | 83 | 3E | CA | 36 | 0B | 7C | 03 | E9 | 14 | 00 | 8B | 1E | CA | 36 |
| 00001620 | D1 | E3 | D1 | E3 | 81 | C3 | EC | 35 | 8B | D3 | BB | 7A | 3C | CD | 3F | 61 |
| 00001630 | 8B | 1E | CA | 36 | D1 | E3 | D1 | E3 | 81 | C3 | 14 | 36 | 8B | D3 | BB | 74 |
| 00001640 | 3A | CD | 3F | 61 | A1 | CA | 36 | 40 | A3 | CA | 36 | 83 | 3E | CA | 36 | 1E |
| 00001650 | 7E | C0 | B8 | 01 | 00 | E9 | FC | 04 | 8B | 1E | CA | 36 | D1 | E3 | D1 | E3 |
| 00001660 | 81 | C3 | F4 | 2D | 8B | D3 | BB | 84 | 3C | CD | 3F | 61 | 8B | 3E | CA | 36 |
| 00001670 | D1 | E7 | 83 | BD | 44 | 1C | 00 | 75 | 03 | E9 | 99 | 03 | A1 | 5A | 37 | A3 |
| 00001680 | 86 | 37 | A1 | 58 | 37 | E9 | ED | 02 | BB | 86 | 41 | CD | 3F | 34 | A1 | 88 |
| 00001690 | 37 | A3 | 8A | 37 | B8 | 01 | 00 | E9 | 16 | 00 | BB | 8C | 37 | CD | 3F | 0F |
| 000016A0 | BB | 8E | 37 | CD | 3F | 0F | BB | 90 | 37 | CD | 3F | 0F | A1 | 92 | 37 | 40 |
| 000016B0 | A3 | 92 | 37 | A1 | 8A | 37 | 3B | 06 | 92 | 37 | 7D | DE | A1 | 90 | 37 | A3 |
| 000016C0 | 94 | 37 | B8 | 01 | 00 | E9 | 88 | 00 | B8 | 05 | 00 | F7 | 2E | 88 | 37 | 03 |
| 000016D0 | 06 | 96 | 37 | 05 | FB | FF | 92 | BB | 02 | 00 | CD | 3E | 26 | A1 | 8E | 37 |
| 000016E0 | A3 | 98 | 37 | A1 | 8C | 37 | E9 | 57 | 00 | 8B | 1E | 9A | 37 | D1 | E3 | D1 |
| 000016F0 | E3 | 8B | D3 | 81 | C3 | DC | 31 | 8B | CB | CD | 3D | 18 | 8B | 3E | CA | 36 |
| 00001700 | D1 | E7 | 3B | 9D | 44 | 1C | B8 | 00 | 00 | 74 | 01 | 48 | 8B | D9 | CD | 3D |
| 00001710 | 18 | 3B | 9D | 44 | 1C | B9 | 00 | 00 | 75 | 01 | 49 | 81 | C2 | DC | 33 | 8B |
| 00001720 | DA | CD | 3D | 18 | 3B | 9D | 2C | 20 | BA | 00 | 00 | 74 | 01 | 4A | 23 | D1 |
| 00001730 | 0B | D0 | 23 | D2 | 74 | 03 | E9 | 03 | 00 | E9 | 26 | 00 | A1 | 9A | 37 | 40 |
| 00001740 | A3 | 9A | 37 | A1 | 98 | 37 | 3B | 06 | 9A | 37 | 7D | 9D | A1 | 96 | 37 | 40 |
| 00001750 | A3 | 96 | 37 | A1 | 94 | 37 | 3B | 06 | 96 | 37 | 7C | 03 | E9 | 69 | FF | E9 |
| 00001760 | 0F | 02 | BB | A0 | 38 | BA | 9C | 37 | CD | 3F | 61 | 83 | 3E | 88 | 37 | 08 |
| 00001770 | BB | 00 | 00 | 74 | 01 | 4B | 83 | 3E | 88 | 37 | 0F | BA | 00 | 00 | 74 | 01 |
| 00001780 | 4A | 23 | D3 | 83 | 3E | 88 | 37 | 16 | BB | 00 | 00 | 74 | 01 | 4B | 23 | DA |
| 00001790 | 83 | 3E | 88 | 37 | 1B | BA | 00 | 00 | 74 | 01 | 4A | 23 | D3 | 83 | 3E | 88 |
| 000017A0 | 37 | 20 | BB | 00 | 00 | 74 | 01 | 4B | 23 | DA | 23 | DB | 75 | 03 | E9 | 0D |
| 000017B0 | 00 | 83 | 3E | 96 | 37 | 04 | 75 | 03 | E9 | 44 | 01 | E9 | C3 | 00 | BB | 89 |
| 000017C0 | 41 | CD | 3F | 34 | 83 | 3E | 88 | 37 | 20 | 74 | 03 | E9 | 06 | 00 | C7 | 06 |
| 000017D0 | A0 | 37 | 1B | 00 | 83 | 3E | 88 | 37 | 1B | 74 | 03 | E9 | 06 | 00 | C7 | 06 |
| 000017E0 | A0 | 37 | 16 | 00 | 83 | 3E | 88 | 37 | 16 | 74 | 03 | E9 | 06 | 00 | C7 | 06 |

```
000017F0  A0 37 0F 00 83 3E 88 37  0F 74 03 E9 06 00 C7 06
00001800  A0 37 08 00 83 3E 88 37  08 74 03 E9 06 00 C7 06
00001810  A0 37 00 00 A1 88 37 48  A3 A2 37 B8 01 00 E9 54
00001820  00 BB A4 37 CD 3F 0F BB  A6 37 CD 3F 0F BB A8 37
00001830  CD 3F 0F 83 3E A4 37 FF  75 03 E9 34 00 A1 96 37
00001840  3B 06 A6 37 BB 00 00 75  01 4B A1 9A 37 3B 06 A8
00001850  37 BA 00 00 75 01 4A 23  D3 A1 A0 37 3B 06 18 37
00001860  BB 00 00 7D 01 4B 23 DA  23 DB 74 03 E9 90 00 EB
00001870  B0 A1 18 37 40 A3 18 37  A1 A2 37 3B 06 18 37 7D
00001880  A0 8B 1E 88 37 D1 E3 D1  E3 81 C3 F4 23 93 BB C0
00001050  CD 3F 61 83 3E B4 36 02  74 03 E9 0D 00 83 3E EE
00001060  36 01 75 03 E9 B4 00 E9  AE 1E BB 04 00 CD 3E 21
00001070  BB 66 38 CD 3E 1F BB 04  00 BA AE 3A B9 00 01 CD
00001080  3E 1E BB 04 00 CD 3F B3  BB 4E 37 BA 01 00 CD 3F
00001090  B4 BB 52 37 BA 02 00 CD  3F B4 A1 42 37 A3 56 37
000010A0  A1 40 37 E9 63 00 BB 04  00 8B 16 CA 36 CD 3E 26
000010B0  BB C0 3A B8 4E 37 CD 3F  62 74 03 E9 46 00 BB 04
000010C0  00 CD 3E 21 C7 06 48 37  01 00 BB 07 00 CD 3D 05
000010D0  93 BB C6 3A CD 3F 55 BA  FE 36 CD 3F 61 E8 86 31
000010E0  BB FF FF CD 3E 32 BB F6  3A B8 FE 36 CD 3F 62 74
000010F0  03 E9 0D 00 83 3E B4 36  01 75 03 E9 1D 00 E9 14
00001100  00 E9 11 1E A1 CA 36 40  40 A3 CA 36 A1 56 37 3B
00001110  06 CA 36 7D 91 BB 04 00  CD 3E 21 BB FF FF CD 3E
00001120  32 CD 3F BC BB FC 3A CD  3F 6A BB 23 00 CD 3F 37
00001130  BB 74 3A CD 3F 6A BB 08  3B CD 3F 6A CD 3E 79 BB
00001140  01 00 CD 3E 42 BB 08 00  CD 3E 42 33 DB CD 3E 44
00001150  CD 3F BC BB 1E 37 BA E8  38 8B CB CD 3D 09 4B 87
00001160  D9 8B D1 CD 3D 0B CD 3F  6A CD 3E 79 BB 01 00 CD
00001170  3E 42 BB 39 00 CD 3E 42  33 DB CD 3E 44 CD 3F BC
00001180  BB 1E 37 BA E8 38 8B CB  CD 3D 09 87 D9 8B D3 CD
00001190  3F BA 2B D9 87 D3 CD 3D  0C CD 3F 6A CD 3E 79 BB
000011A0  02 00 CD 3E 42 BB 01 00  CD 3E 42 33 DB CD 3E 44
000011B0  CD 3F BC BB 24 37 CD 3F  6E CD 3E 79 CD 3F BC BB
000011C0  4A 37 CD 3F 6A BB 20 3B  CD 3F 6A 8B 1E 3C 37 CD
000011D0  3F 6D CD 3E 79 BB 07 00  CD 3E 42 BB 01 00 CD 3E
000011E0  42 33 DB CD 3E 44 BB 26  3B BA FE 36 CD 3F 61 E8
000011F0  7A 30 BB A0 38 B8 FE 36  CD 3F 62 75 03 E9 15 1D
00001200  A1 3C 37 A3 58 37 A1 3C  37 A3 5A 37 83 3E 32 37
00001210  01 75 03 E9 8E 01 BB 44  10 CD 3F 34 A1 3C 37 A3
00001220  5C 37 B8 01 00 E9 10 00  BB 58 37 CD 3F 0F BB 5A
00001230  37 CD 3F 0F A1 CA 36 40  A3 CA 36 A1 5C 37 3B 06
00001240  CA 36 7D E4 90 B8 01 00  E9 18 00 8B 1E CA 36 D1
00001250  E3 D1 E3 81 C3 F4 23 8B  D3 BB C0 3A CD 3F 61 A1
00001260  CA 36 40 A3 CA 36 83 3E  CA 36 20 7E DE 83 3E B4
00001270  36 02 BB 00 00 75 01 4B  83 3E EE 36 01 BA 00 00
00001280  75 01 4A 23 D3 23 D2 75  03 E9 0C 00 BB 3A 3B BA
00001290  FE 36 CD 3F 61 E9 09 00  BB 76 3B BA FE 36 CD 3F
000012A0  61 E8 C2 2F BB F6 3A B8  FE 36 CD 3F 62 75 03 E9
000012B0  F2 00 BB FF FF CD 3E 32  A1 5A 37 A3 5E 37 A1 58
000012C0  37 E9 4A 00 CD 3F BC 8B  1E CA 36 CD 3F 65 BB A6
000012D0  3B CD 3F 6A CD 3E 79 8B  1E CA 36 D1 E3 D1 E3 81
000012E0  C3 F4 23 93 BB C0 3A CD  3F 62 74 03 E9 0F 00 CD
000012F0  3F BC BB AC 3B CD 3F 6E  CD 3E 79 E9 0C 00 CD 3F
00001300  BC BB 48 38 CD 3F 6E CD  3E 79 A1 CA 36 40 A3 CA
00001310  36 A1 5E 37 3B 06 CA 36  7D AA 83 3E B4 36 02 BB
00001320  00 00 75 01 4B 83 3E EE  36 01 BA 00 00 75 01 4A
00001330  23 D3 23 D2 75 03 E9 15  00 BB B8 3B CD 3F B5 00
00001340  CD 3F B7 01 01 BB CA 36  CD 3F B8 E9 12 00 BB EA
00001350  3B CD 3F B5 00 CD 3F B7  01 01 BB CA 36 CD 3F B8
00001360  83 3E CA 36 01 7D 03 E9  3A 00 A1 58 37 3B 06 CA
00001370  36 BB 00 00 7E 01 4B A1  5A 37 3B 06 CA 36 BA 00
00001380  00 7D 01 4A 0B D3 23 D2  74 03 E9 25 FF 8B 1E CA
00001390  36 D1 E3 D1 E3 81 C3 F4  23 8B D3 BB 48 38 CD 3F
000013A0  61 E9 0E FF BB FF FF CD  3E 32 83 3E 48 37 00 75
000013B0  03 E9 4C 02 BB 04 00 CD  3E 21 BB 66 38 CD 3E 1F
000013C0  BB 04 00 BA AE 3A B9 00  01 CD 3E 1E BB 04 00 CD
000013D0  3F B3 BB 4E 37 BA 01 00  CD 3F B4 BB 52 37 BA 02
000013E0  00 CD 3F B4 BB 04 00 CD  3F B3 BB CE 36 BA E3 00
000013F0  CD 3F B4 BB 60 37 BA 04  00 CD 3F B4 BB 64 37 BA
00001400  02 00 CD 3F B4 BB 68 37  CD 3F B4 BB 6C 37 BA 14
00001410  00 CD 3F B4 BB 70 37 BA  01 00 CD 3F B4 C7 06 2E
00001420  37 00 00 C7 06 74 37 00  00 C7 06 18 37 00 00 33
00001430  C0 E9 C1 00 B8 14 00 F7  2E 58 37 8B 1E CA 36 D1
00001440  E3 03 D8 83 C3 ED 8B D3  BB 04 00 CD 3E 26 BB C0
```

```
00001450  3A B8 4E 37 CD 3F 62 74  03 E9 95 00 A1 2E 37 40
00001460  A3 2E 37 A1 CA 36 40 A3  74 37 8B 1E CA 36 D1 E3
00000C30  28 37 03 C1 97 D1 E7 89  9D 90 20 A1 CA 36 40 A3
00000C40  CA 36 83 3E CA 36 32 7E  AC A1 28 37 40 A3 28 37
00000C50  83 3E 28 37 02 7E 87 C7  06 2E 37 00 00 83 3E F0
00000C60  36 01 74 03 E9 B4 04 B8  01 00 E9 62 00 8B 1E 30
00000C70  37 D1 E3 D1 E3 81 C3 42  17 8B D3 BB 48 38 CD 3F
00000C80  61 8B 3E 30 37 D1 E7 C7  85 BA 23 00 00 8B 3E 30
00000C90  37 D1 E7 C7 85 E2 23 00  00 8B 3E 30 37 D1 E7 C7
00000CA0  85 8E 22 00 00 8B 3E 30  37 D1 E7 D1 E7 81 C7 A0
00000CB0  22 BE 0A 3A CD 3F 7B 8B  1E 30 37 D1 E3 D1 E3 81
00000CC0  C3 90 23 8B D3 BB 48 38  CD 3F 61 A1 30 37 40 A3
00000CD0  30 37 83 3E 30 37 0A 7E  94 BB 05 00 CD 3E 21 BB
00000CE0  66 38 CD 3E 1F BB 05 00  BA 0E 3A B9 40 00 CD 3E
00000CF0  1E 33 C0 E9 40 00 BB 05  00 CD 3F B3 8B 16 CA 36
00000D00  8B DA D1 E2 8B CB BB CE  36 CD 3F B4 D1 E1 D1 E1
00000D10  81 C1 46 14 8B D9 BA 02  00 CD 3F B4 8B 1E CA 36
00000D20  D1 E3 D1 E3 81 C3 46 14  8B D3 33 DB CD 3D 1B CD
00000D30  3F 5B A1 CA 36 40 A3 CA  36 83 3E CA 36 1F 7E B6
00000D40  B8 01 00 E9 0E 00 BB 05  00 8B 16 CA 36 CD 3E 28
00000D50  A1 CA 36 40 A3 CA 36 81  3E CA 36 F4 01 7E E7 C7
00000D60  06 32 37 01 00 C7 06 34  37 00 00 C7 06 36 37 00
00000D70  00 83 3E B4 36 02 BB 00  00 75 01 4B 83 3E EE 36
00000D80  00 BA 00 00 75 01 4A 23  D3 BB 1C 3A B8 FA 36 CD
00000D90  3F 62 B9 00 00 74 01 49  0B CA 23 C9 74 03 E9 9F
00000DA0  01 BB FF FF CD 3E 32 CD  3F BC BB 22 3A CD 3F 6A
00000DB0  CD 3E 79 BB 01 00 CD 3E  42 BB 32 00 CD 3E 42 33
00000DC0  DB CD 3E 44 CD 3F BC BB  32 3A CD 3F 6A 8B 1E 1C
00000DD0  37 CD 3F 69 BB 44 3A CD  3F 6A CD 3E 79 BB 4A 3A
00000DE0  BA 38 37 CD 3F 61 BB 01  00 CD 3E 42 BB 19 00 CD
00000DF0  3E 42 33 DB CD 3E 44 33  DB CD 3E 33 BB 07 00 CD
00000E00  3E 35 CD 3F BC BB A8 36  B8 58 3A CD 3F 55 CD 3F
00000E10  6A CD 3E 79 BB 01 00 CD  3E 42 BB 0D 00 CD 3E 42
00000E20  33 DB CD 3E 44 BB 07 00  CD 3E 33 33 DB CD 3E 35
00000E30  BB 74 3A CD 3F B5 00 CD  3F B7 01 01 BB 3C 37 CD
00000E40  3F B8 83 3E 3C 37 01 BB  00 00 7D 01 4B A1 A2 36
00000E50  3B 06 3C 37 BA 00 00 7D  01 4A 0B D3 23 D2 75 86
00000E60  BB 01 00 CD 3E 42 BB 0D  00 CD 3E 42 33 DB CD 3E
00000E70  44 CD 3F BC BB 3C 00 CD  3D 0D CD 3F 6A CD 3E 79
00000E80  83 3E 3C 37 01 74 03 E9  09 00 C7 06 32 37 08 00
00000E90  E9 19 00 83 3E 3C 37 03  7F 03 E9 09 00 C7 06 32
00000EA0  37 05 00 E9 06 00 C7 06  32 37 07 00 C7 06 34 37
00000EB0  00 00 C7 06 36 37 00 00  83 3E 3C 37 02 BB 00 00
00000EC0  75 01 4B 83 3E 3C 37 03  BA 00 00 75 01 4A 0B D3
00000ED0  23 D2 75 03 E9 09 00 C7  06 36 37 06 00 E9 2E 00
00000EE0  83 3E 3C 37 04 BB 00 00  75 01 4B 83 3E 3C 37 05
00000EF0  BA 00 00 75 01 4A 0B D3  23 D2 75 03 E9 09 [illegible] C7
00000F00  06 36 37 05 00 E9 06 00  C7 06 36 37 08 00 BB 3C
00000F10  0D CD 3F 34 A1 3C 37 A3  3E 37 B8 01 00 E9 10 00
00000F20  BB 40 37 CD 3F 0F BB 42  37 CD 3F 0F A1 CA 36 40
00000F30  A3 CA 36 A1 3E 37 3B 06  CA 36 7D E4 90 E9 F5 00
00000F40  BB 78 3A BA 38 37 CD 3F  61 BB FF FF CD 3E 32 CD
00000F50  3F BC BB 80 3A CD 3F 6A  CD 3E 79 BB 01 00 CD 3E
00000F60  42 BB 14 00 CD 3E 42 33  DB CD 3E 44 33 DB CD 3E
00000F70  33 BB 07 00 CD 3E 35 CD  3F BC BB A4 36 B8 8C 3A
00000F80  CD 3F 55 CD 3F 6A CD 3E  79 83 3E B4 36 02 74 03
00000F90  E9 0C 00 CD 3F BC BB A2  3A CD 3F 6A CD 3E 79 BB
00000FA0  01 00 CD 3E 42 BB 08 00  CD 3E 42 33 DB CD 3E 44
00000FB0  BB 07 00 CD 3E 33 33 DB  CD 3E 35 BB 74 3A CD 3F
00000FC0  B5 00 CD 3F B7 01 01 BB  3C 37 CD 3F B8 83 3E 3C
00000FD0  37 00 BB 00 00 75 01 4B  83 3E B4 36 02 BA 00 00
00000FE0  75 01 4A 23 D3 23 D2 74  03 E9 29 1F 83 3E 3C 37
00000FF0  01 BB 00 00 7D 01 4B A1  A0 36 3B 06 3C 37 BA 00
00001000  00 7D 01 4A 0B D3 23 D2  74 03 E9 4E FF BB 01 00
00001010  CD 3E 42 BB 08 00 CD 3E  42 33 DB CD 3E 44 B8 14
00001020  00 F7 2E 3C 37 A3 42 37  B8 14 00 F7 2E 3C 37 05
00001030  ED FF A3 40 37 BB 38 37  BA 44 37 CD 3F 61 C7 06
00001040  48 37 00 00 BB FF FF CD  3E 32 BB 38 37 BA 4A 37
00000810  CD 3E 79 A1 04 37 A3 CA  36 C7 06 04 37 01 00 8B
00000820  1E CA 36 CD 3E 42 BB 01  00 CD 3E 42 33 DB CD 3E
00000830  44 BB 17 00 CD 3E 33 33  DB CD 3E 35 CD 3F BC BB
00000840  10 00 CD 3D 05 CD 3F 6A  CD 3E 79 33 DB CD 3E 33
00000850  BB 07 00 CD 3E 35 CD 3F  BC 8B 1E CA 36 D1 E3 D1
00000860  E3 81 C3 F4 28 CD 3F 6A  CD 3E 79 BB 07 00 CD 3E
```

| | | | | | | | | | | | | | | | | |
|---|---|---|---|---|---|---|---|---|---|---|---|---|---|---|---|---|
| 00000870 | 33 | 33 | DB | CD | 3E | 35 | BB | 19 | 00 | CD | 3E | 42 | BB | 01 | 00 | CD |
| 00000880 | 3E | 42 | 33 | DB | CD | 3E | 44 | CD | 3D | 06 | BA | FE | 36 | CD | 3F | 61 |
| 00000890 | BB | FE | 36 | CD | 3F | BA | 0B | DB | 74 | ED | BB | 98 | 36 | B8 | FE | 36 |
| 000008A0 | CD | 3F | 62 | BA | 00 | 00 | 74 | 01 | 4A | BB | 90 | 36 | CD | 3F | 62 | B9 |
| 000008B0 | 00 | 00 | 74 | 01 | 49 | 23 | CA | BB | 94 | 36 | CD | 3F | 62 | BA | 00 | 00 |
| 000008C0 | 74 | 01 | 4A | 23 | D1 | 23 | D2 | 75 | BE | 8B | 1E | CA | 36 | CD | 3E | 42 |
| 000008D0 | BB | 01 | 00 | CD | 3E | 42 | 33 | DB | CD | 3E | 44 | CD | 3F | BC | BB | 48 |
| 000008E0 | 38 | CD | 3F | 6A | 8B | 1E | CA | 36 | D1 | E3 | D1 | E3 | 81 | C3 | F4 | 28 |
| 000008F0 | CD | 3F | 6A | CD | 3E | 79 | BB | 98 | 36 | B8 | FE | 36 | CD | 3F | 62 | 75 |
| 00000900 | 03 | E9 | 44 | 00 | BB | 94 | 36 | B8 | FE | 36 | CD | 3F | 62 | 74 | 03 | E9 |
| 00000910 | 1C | 00 | A1 | CA | 36 | 40 | A3 | CA | 36 | A1 | 0C | 37 | 3B | 06 | CA | 36 |
| 00000920 | 7C | 03 | E9 | 06 | 00 | C7 | 06 | CA | 36 | 01 | 00 | E9 | F1 | FE | A1 | CA |
| 00000930 | 36 | 48 | A3 | CA | 36 | 83 | 3E | CA | 36 | 00 | 74 | 03 | E9 | 06 | 00 | A1 |
| 00000940 | 0C | 37 | A3 | CA | 36 | E9 | D7 | FE | A1 | CA | 36 | 3B | 06 | 08 | 37 | 74 |
| 00000950 | 03 | E9 | 0A | 00 | A1 | 02 | 37 | 40 | A3 | 02 | 37 | E9 | 97 | FC | A1 | CA |
| 00000960 | 36 | 3B | 06 | 0A | 37 | 74 | 03 | E9 | 0A | 00 | A1 | 02 | 37 | 48 | A3 | 02 |
| 00000970 | 37 | E9 | 81 | FC | A1 | CA | 36 | 3B | 06 | 0E | 37 | 74 | 03 | E9 | 03 | 00 |
| 00000980 | E9 | 0F | FB | A1 | CA | 36 | 3B | 06 | 10 | 37 | 74 | 03 | E9 | 43 | 01 | 8B |
| 00000990 | 1E | 10 | 37 | CD | 3E | 42 | BB | 01 | 00 | CD | 3E | 42 | 33 | DB | CD | 3E |
| 000009A0 | 44 | CD | 3F | BC | BB | 4F | 00 | BA | 20 | 00 | CD | 3D | 0E | CD | 3F | 6A |
| 000009B0 | CD | 3E | 79 | 8B | 1E | 10 | 37 | CD | 3E | 42 | BB | 01 | 00 | CD | 3E | 42 |
| 000009C0 | 33 | DB | CD | 3E | 44 | BB | C4 | 39 | CD | 3F | B5 | 01 | CD | 3F | B7 | 01 |
| 000009D0 | 04 | BB | 12 | 37 | CD | 3F | B8 | BB | 12 | 37 | 8B | D3 | CD | 3F | BA | 83 |
| 000009E0 | FB | 01 | B9 | 00 | 00 | 7D | 01 | 49 | 8B | DA | CD | 3F | BA | 83 | FB | 0D |
| 000009F0 | BA | 00 | 00 | 7E | 01 | 4A | 0B | D1 | 23 | D2 | 75 | 93 | 8B | 1E | 10 | 37 |
| 00000A00 | CD | 3E | 42 | BB | 01 | 00 | CD | 3E | 42 | 33 | DB | CD | 3E | 44 | CD | 3F |
| 00000A10 | BC | BB | D0 | 39 | CD | 3F | 6A | BB | 12 | 37 | CD | 3F | 6A | BB | E4 | 39 |
| 00000A20 | CD | 3F | 6A | CD | 3E | 79 | A1 | 06 | 37 | A3 | 16 | 37 | B8 | 01 | 00 | E9 |
| 00000A30 | 40 | 00 | 8B | 1E | 18 | 37 | D1 | E3 | D1 | E3 | 81 | C3 | F4 | 23 | 8B | D3 |
| 00000A40 | CD | 3F | BA | 83 | C3 | FA | 87 | D3 | CD | 3D | 0C | BA | FE | 36 | CD | 3F |
| 00000A50 | 61 | BB | 12 | 37 | 8B | D3 | CD | 3F | BA | 87 | D3 | 8B | CB | BB | FE | 36 |
| 00000A60 | CD | 3D | 0B | 87 | D9 | 91 | CD | 3F | 62 | 75 | 03 | E9 | 37 | 00 | A1 | 18 |
| 00000A70 | 37 | 40 | A3 | 18 | 37 | A1 | 16 | 37 | 3B | 06 | 18 | 37 | 7D | B4 | 8B | 1E |
| 00000A80 | 10 | 37 | CD | 3E | 42 | BB | 01 | 00 | CD | 3E | 42 | 33 | DB | CD | 3E | 44 |
| 00000A90 | CD | 3F | BC | BB | 4F | 00 | BA | 20 | 00 | CD | 3D | 0E | CD | 3F | 6A | CD |
| 00000AA0 | 3E | 79 | E9 | 7A | FD | 8B | 1E | 18 | 37 | 4B | CD | 3F | 57 | BF | FC | 39 |
| 00000AB0 | CD | 3F | 89 | BB | 1A | 00 | CD | 3D | 03 | CD | 3F | 77 | 93 | A3 | 02 | 37 |
| 00000AC0 | A1 | 18 | 37 | 48 | B9 | 13 | 00 | 99 | F7 | F9 | 12 | 92 | A3 | 04 | 37 | E9 |
| 00000AD0 | 23 | FB | BB | FF | FF | CD | 3E | 32 | B8 | 13 | 00 | F7 | 2E | 02 | 37 | 03 |
| 00000AE0 | 06 | CA | 36 | D1 | E0 | D1 | E0 | D1 | E0 | 05 | F9 | FF | A3 | 1A | 37 | BB |
| 00000AF0 | 03 | 00 | 8B | 16 | 1A | 37 | CD | 3E | 26 | BB | D6 | 36 | BA | FA | 36 | CD |
| 00000B00 | 3F | 61 | BB | DA | 36 | CD | 3D | 18 | 93 | A3 | 1C | 37 | BB | DE | 36 | BA |
| 00000B10 | 1E | 37 | CD | 3F | 61 | BB | E6 | 36 | CD | 3D | 18 | 93 | A3 | 22 | 37 | BB |
| 00000B20 | E2 | 36 | BA | 24 | 37 | CD | 3F | 61 | 33 | C0 | E9 | 82 | 00 | A1 | 28 | 37 |
| 00000B30 | 03 | 06 | 1A | 37 | 92 | BB | 03 | 00 | CD | 3E | 26 | 83 | 3E | 28 | 37 | 01 |
| 00000B40 | 74 | 03 | E9 | 0C | 00 | BB | EA | 36 | CD | 3D | 19 | BF | 2A | 37 | CD | 3F |
| 00000B50 | 7D | B8 | 01 | 00 | E9 | 4A | 00 | 8B | 1E | CA | 36 | 8B | D3 | D1 | E3 | D1 |
| 00000B60 | E3 | 81 | C3 | 24 | 35 | CD | 3D | 18 | B8 | 32 | 00 | 8B | CA | F7 | 2E | 28 |
| 00000B70 | 37 | 03 | C1 | 97 | D1 | E7 | 89 | 9D | 38 | 1E | 8B | 1E | CA | 36 | 8B | D3 |
| 00000B80 | D1 | E3 | D1 | E3 | 81 | C3 | 5C | 34 | CD | 3D | 18 | B8 | 32 | 00 | 8B | CA |
| 00000B90 | F7 | 2E | 28 | 37 | 03 | C1 | 97 | D1 | E7 | 89 | 9D | 44 | 1C | A1 | CA | 36 |
| 00000BA0 | 40 | A3 | CA | 36 | 83 | 3E | CA | 36 | 32 | 7E | AC | A1 | 28 | 37 | 40 | A3 |
| 00000BB0 | 28 | 37 | 83 | 3E | 28 | 37 | 04 | 7F | 03 | E9 | 71 | FF | BB | 1E | 37 | BA |
| 00000BC0 | E8 | 38 | 8B | CB | CD | 3D | 09 | 0B | DB | 74 | 03 | E9 | 0B | 00 | 91 | BB |
| 00000BD0 | 00 | 3A | CD | 3F | 55 | 92 | CD | 3F | 61 | 33 | C0 | E9 | 6F | 00 | A1 | 28 |
| 00000BE0 | 37 | 03 | 06 | 1A | 37 | 05 | 05 | 00 | 92 | BB | 03 | 00 | CD | 3E | 26 | B8 |
| 00000BF0 | 01 | 00 | E9 | 4A | 00 | 8B | 1E | CA | 36 | 8B | D3 | D1 | E3 | D1 | E3 | 81 |
| 00000C00 | C3 | 5C | 34 | CD | 3D | 18 | B8 | 64 | 00 | 8B | CA | F7 | 2E | 28 | 37 | 03 |
| 00000C10 | C1 | 97 | D1 | E7 | 89 | 9D | 2C | 20 | 8B | 1E | CA | 36 | 8B | D3 | D1 | E3 |
| 00000C20 | D1 | E3 | 81 | C3 | 24 | 35 | CD | 3D | 18 | B8 | 64 | 00 | 8B | CA | F7 | 2E |
| 000003F0 | B3 | BB | D6 | 36 | BA | 02 | 00 | CD | 3F | B4 | BB | DA | 36 | CD | 3F | B4 |
| 00000400 | BB | DE | 36 | 8B | CA | BA | 0E | 00 | CD | 3F | B4 | BB | E2 | 36 | BA | 1E |
| 00000410 | 00 | CD | 3F | B4 | 8B | D1 | BB | E6 | 36 | CD | 3F | B4 | BB | EA | 36 | BA |
| 00000420 | 04 | 00 | CD | 3F | B4 | 33 | C0 | E9 | 51 | 00 | 33 | C0 | E9 | 3E | 00 | BB |
| 00000430 | 03 | 00 | CD | 3F | B3 | 8B | 1E | CA | 36 | 8B | D3 | D1 | E3 | D1 | E3 | 8B |
| 00000440 | 0E | CC | 36 | 8B | C1 | D1 | E1 | 03 | CB | 83 | C1 | 38 | 87 | D1 | BB | CE |
| 00000450 | 36 | CD | 3F | B4 | BB | 32 | 00 | F7 | EB | 03 | C1 | D1 | E0 | D1 | E0 | 05 |
| 00000460 | 60 | 34 | 93 | BA | 02 | 00 | CD | 3F | B4 | A1 | CC | 36 | 40 | A3 | CC | 36 |
| 00000470 | 83 | 3E | CC | 36 | 01 | 7E | B8 | A1 | CA | 36 | 40 | A3 | CA | 36 | 83 | 3E |
| 00000480 | CA | 36 | 31 | 7E | A5 | 83 | 3E | B4 | 36 | 10 | 75 | 03 | E9 | 6C | 31 | E9 |
| 00000490 | 0F | 00 | BB | FF | FF | CD | 3E | 32 | CD | 3E | 22 | BB | 98 | 38 | CD | 3E |
| 000004A0 | 0E | C7 | 06 | EE | 36 | 00 | 00 | C7 | 06 | F0 | 36 | 01 | 00 | BB | 48 | 38 |
| 000004B0 | BA | F2 | 36 | CD | 3F | 61 | BB | A0 | 38 | BA | F6 | 36 | CD | 3F | 61 | 83 |
| 000004C0 | 3E | B4 | 36 | 01 | 75 | 03 | E9 | 29 | 00 | BB | A6 | 38 | BA | FA | 36 | CD |

| | | | | | | | | | | | | | | | | |
|---|---|---|---|---|---|---|---|---|---|---|---|---|---|---|---|---|
| 000004D0 | 3F | 61 | BB | AC | 38 | BA | FE | 36 | CD | 3F | 61 | E8 | 88 | 3D | BB | A0 |
| 000004E0 | 38 | B8 | FE | 36 | CD | 3F | 62 | 75 | 03 | E9 | 71 | 07 | C7 | 06 | EE | 36 |
| 000004F0 | 01 | 00 | B8 | 01 | 00 | E9 | 28 | 00 | 8B | 3E | CA | 36 | D1 | E7 | C7 | 85 |
| 00000500 | 44 | 1C | 00 | 00 | 8B | 3E | CA | 36 | D1 | E7 | C7 | 85 | 38 | 1E | 00 | 00 |
| 00000510 | 8B | 3E | CA | 36 | D1 | E7 | C7 | 85 | 2C | 20 | 00 | 00 | A1 | CA | 36 | 40 |
| 00000520 | A3 | CA | 36 | 81 | 3E | CA | 36 | FA | 00 | 7E | CD | C7 | 06 | 02 | 37 | 00 |
| 00000530 | 00 | C7 | 06 | 04 | 37 | 01 | 00 | C7 | 06 | CA | 36 | 01 | 00 | C7 | 06 | CC |
| 00000540 | 36 | 00 | 00 | BB | 03 | 00 | 8B | 16 | CA | 36 | CD | 3E | 26 | BB | 03 | 00 |
| 00000550 | CD | 3D | 2F | 83 | FB | FF | 74 | 03 | E9 | 09 | 00 | A1 | CC | 36 | A3 | 06 |
| 00000560 | 37 | E9 | 91 | 00 | A1 | CC | 36 | 40 | A3 | CC | 36 | BB | DE | 36 | BA | E8 |
| 00000570 | 38 | 8B | CB | CD | 3D | 09 | 0B | DB | 74 | 03 | E9 | 0B | 00 | 91 | BB | EE |
| 00000580 | 38 | CD | 3F | 55 | 92 | CD | 3F | 61 | 8B | 1E | CC | 36 | D1 | E3 | D1 | E3 |
| 00000590 | 81 | C3 | F4 | 23 | 8B | CB | BB | DE | 36 | BA | E8 | 38 | 8B | C3 | CD | 3D |
| 000005A0 | 09 | 4B | 93 | 92 | 89 | 5E | FA | CD | 3D | 0B | 8B | D0 | B8 | F6 | 38 | CD |
| 000005B0 | 3F | 55 | 93 | BB | 00 | 39 | CD | 3F | 55 | 8B | C3 | 8B | 5E | FA | CD | 3D |
| 000005C0 | 09 | 8B | D3 | 8B | 5E | FA | CD | 3F | BA | 2B | DA | 8B | D3 | 8B | 5E | FA |
| 000005D0 | CD | 3D | 0C | CD | 3F | 55 | 93 | BB | 0C | 39 | CD | 3F | 55 | 93 | BB | E2 |
| 000005E0 | 36 | CD | 3F | 55 | 8B | D1 | CD | 3F | 61 | A1 | CA | 36 | 05 | 08 | 00 | A3 |
| 000005F0 | CA | 36 | E9 | 4E | FF | C7 | 06 | 08 | 37 | 00 | 00 | C7 | 06 | 0A | 37 | 00 |
| 00000600 | 00 | C7 | 06 | 0C | 37 | 00 | 00 | BB | FF | FF | CD | 3E | 32 | B8 | 01 | 00 |
| 00000610 | E9 | 5F | 00 | B8 | 13 | 00 | F7 | 2E | 02 | 37 | 03 | 06 | CA | 36 | 3B | 06 |
| 00000620 | CC | 36 | 7E | 03 | E9 | 55 | 00 | A1 | 0C | 37 | 40 | A3 | 0C | 37 | 8B | 1E |
| 00000630 | CA | 36 | 8B | D3 | D1 | E3 | D1 | E3 | 81 | C3 | F4 | 28 | B8 | 13 | 00 | 8B |
| 00000640 | CA | F7 | 2E | 02 | 37 | 03 | C1 | D1 | E0 | D1 | E0 | 05 | F4 | 23 | 93 | 92 |
| 00000650 | CD | 3F | 61 | CD | 3F | BC | 8B | 1E | CA | 36 | D1 | E3 | D1 | E3 | 81 | C3 |
| 00000660 | F4 | 28 | B8 | 48 | 38 | CD | 3F | 55 | CD | 3F | 6E | CD | 3E | 79 | A1 | CA |
| 00000670 | 36 | 40 | A3 | CA | 36 | 83 | 3E | CA | 36 | 13 | 7E | 97 | CD | 3F | BC | BB |
| 00000680 | 14 | 39 | CD | 3F | 6E | CD | 3E | 79 | A1 | 0C | 37 | 40 | A3 | 0C | 37 | 8B |
| 00000690 | 1E | 0C | 37 | D1 | E3 | D1 | E3 | 81 | C3 | F4 | 28 | 8B | D3 | BB | 26 | 39 |
| 000006A0 | CD | 3F | 61 | A1 | 0C | 37 | A3 | 0E | 37 | CD | 3F | BC | BB | 36 | 39 | CD |
| 000006B0 | 3F | 6E | CD | 3E | 79 | A1 | 0C | 37 | 40 | A3 | 0C | 37 | 8B | 1E | 0C | 37 |
| 000006C0 | D1 | E3 | D1 | E3 | 81 | C3 | F4 | 28 | 8B | D3 | BB | 46 | 39 | CD | 3F | 61 |
| 000006D0 | A1 | 0C | 37 | A3 | 10 | 37 | B8 | 13 | 00 | F7 | 2E | 02 | 37 | 05 | 14 | 00 |
| 000006E0 | 3B | 06 | CC | 36 | 7C | 03 | E9 | 2D | 00 | CD | 3F | BC | BB | 56 | 39 | CD |
| 000006F0 | 3F | 6E | CD | 3E | 79 | A1 | 0C | 37 | 40 | A3 | 0C | 37 | A1 | 0C | 37 | A3 |
| 00000700 | 08 | 37 | 8B | 1E | 0C | 37 | D1 | E3 | D1 | E3 | 81 | C3 | F4 | 28 | 8B | D3 |
| 00000710 | BB | 64 | 39 | CD | 3F | 61 | 83 | 3E | 02 | 37 | 00 | 7F | 03 | E9 | 2D | 00 |
| 00000720 | CD | 3F | BC | BB | 72 | 39 | CD | 3F | 6E | CD | 3E | 79 | A1 | 0C | 37 | 40 |
| 00000730 | A3 | 0C | 37 | A1 | 0C | 37 | A3 | 0A | 37 | 8B | 1E | 0C | 37 | D1 | E3 | D1 |
| 00000740 | E3 | 81 | C3 | F4 | 28 | 8B | D3 | BB | 84 | 39 | CD | 3F | 61 | BB | 05 | 00 |
| 00000750 | CD | 3E | 42 | BB | 44 | 00 | CD | 3E | 42 | 33 | DB | CD | 3E | 44 | CD | 3F |
| 00000760 | BC | BB | 96 | 39 | CD | 3F | 6A | CD | 3E | 79 | BB | 17 | 00 | CD | 3E | 33 |
| 00000770 | 33 | DB | CD | 3E | 35 | CD | 3F | BC | BB | 10 | 00 | CD | 3D | 05 | CD | 3F |
| 00000780 | 6A | CD | 3E | 79 | BB | 07 | 00 | CD | 3E | 33 | 33 | DB | CD | 3E | 35 | BB |
| 00000790 | 07 | 00 | CD | 3E | 42 | BB | 44 | 00 | CD | 3E | 42 | 33 | DB | CD | 3E | 44 |
| 000007A0 | CD | 3F | BC | BB | 18 | 00 | CD | 3D | 05 | CD | 3F | 6A | BB | A0 | 39 | CD |
| 000007B0 | 3F | 6A | CD | 3E | 79 | BB | 08 | 00 | CD | 3E | 42 | BB | 44 | 00 | CD | 3E |
| 000007C0 | 42 | 33 | DB | CD | 3E | 44 | CD | 3F | BC | BB | 19 | 00 | CD | 3D | 05 | CD |
| 000007D0 | 3F | 6A | BB | AA | 39 | CD | 3F | 6A | CD | 3E | 79 | BB | 0C | 00 | CD | 3E |
| 000007E0 | 42 | BB | 42 | 00 | CD | 3E | 42 | 33 | DB | CD | 3E | 44 | CD | 3F | BC | BB |
| 000007F0 | 11 | 00 | CD | 3D | 05 | CD | 3F | 6A | BB | C4 | 00 | CD | 3D | 05 | CD | 3F |
| 00000800 | 6A | BB | D9 | 00 | CD | 3D | 05 | CD | 3F | 6A | BB | B6 | 39 | CD | 3F | 6A |
| 00000000 | 4D | 5A | 97 | 01 | 26 | 00 | 0C | 00 | 20 | 00 | 4D | 08 | FF | FF | C6 | 0C |
| 00000010 | 00 | 02 | AC | 6C | 30 | 00 | 00 | 00 | 1E | 00 | 00 | 00 | 01 | 00 | 12 | 00 |
| 00000020 | 00 | 00 | 14 | 00 | 00 | 00 | 16 | 00 | 00 | 00 | 33 | 00 | 00 | 00 | 38 | 00 |
| 00000030 | 00 | 00 | 86 | 00 | 6B | 03 | 1B | 00 | 64 | 04 | 01 | 02 | 64 | 04 | 06 | 02 |
| 00000040 | 64 | 04 | 11 | 02 | 64 | 04 | 32 | 02 | 64 | 04 | 3D | 02 | 64 | 04 | 00 | 00 |
| 00000050 | 00 | 00 | 00 | 00 | 00 | 00 | 00 | 00 | 00 | 00 | 00 | 00 | 00 | 00 | 00 | 00 |
| 00000060 | 00 | 00 | 00 | 00 | 00 | 00 | 00 | 00 | 00 | 00 | 00 | 00 | 00 | 00 | 00 | 00 |
| 00000070 | 00 | 00 | 00 | 00 | 00 | 00 | 00 | 00 | 00 | 00 | 00 | 00 | 00 | 00 | 00 | 00 |
| 00000080 | 00 | 00 | 00 | 00 | 00 | 00 | 00 | 00 | 00 | 00 | 00 | 00 | 00 | 00 | 00 | 00 |
| 00000090 | 00 | 00 | 00 | 00 | 00 | 00 | 00 | 00 | 00 | 00 | 00 | 00 | 00 | 00 | 00 | 00 |
| 000000A0 | 00 | 00 | 00 | 00 | 00 | 00 | 00 | 00 | 00 | 00 | 00 | 00 | 00 | 00 | 00 | 00 |
| 000000B0 | 00 | 00 | 00 | 00 | 00 | 00 | 00 | 00 | 00 | 00 | 00 | 00 | 00 | 00 | 00 | 00 |
| 000000C0 | 00 | 00 | 00 | 00 | 00 | 00 | 00 | 00 | 00 | 00 | 00 | 00 | 00 | 00 | 00 | 00 |
| 000000D0 | 00 | 00 | 00 | 00 | 00 | 00 | 00 | 00 | 00 | 00 | 00 | 00 | 00 | 00 | 00 | 00 |
| 000000E0 | 00 | 00 | 00 | 00 | 00 | 00 | 00 | 00 | 00 | 00 | 00 | 00 | 00 | 00 | 00 | 00 |
| 000000F0 | 00 | 00 | 00 | 00 | 00 | 00 | 00 | 00 | 00 | 00 | 00 | 00 | 00 | 00 | 00 | 00 |
| 00000100 | 00 | 00 | 00 | 00 | 00 | 00 | 00 | 00 | 00 | 00 | 00 | 00 | 00 | 00 | 00 | 00 |
| 00000110 | 00 | 00 | 00 | 00 | 00 | 00 | 00 | 00 | 00 | 00 | 00 | 00 | 00 | 00 | 00 | 00 |
| 00000120 | 00 | 00 | 00 | 00 | 00 | 00 | 00 | 00 | 00 | 00 | 00 | 00 | 00 | 00 | 00 | 00 |
| 00000130 | 00 | 00 | 00 | 00 | 00 | 00 | 00 | 00 | 00 | 00 | 00 | 00 | 00 | 00 | 00 | 00 |
| 00000140 | 00 | 00 | 00 | 00 | 00 | 00 | 00 | 00 | 00 | 00 | 00 | 00 | 00 | 00 | 00 | 00 |
| 00000150 | 00 | 00 | 00 | 00 | 00 | 00 | 00 | 00 | 00 | 00 | 00 | 00 | 00 | 00 | 00 | 00 |
| 00000160 | 00 | 00 | 00 | 00 | 00 | 00 | 00 | 00 | 00 | 00 | 00 | 00 | 00 | 00 | 00 | 00 |
| 00000170 | 00 | 00 | 00 | 00 | 00 | 00 | 00 | 00 | 00 | 00 | 00 | 00 | 00 | 00 | 00 | 00 |
| 00000180 | 00 | 00 | 00 | 00 | 00 | 00 | 00 | 00 | 00 | 00 | 00 | 00 | 00 | 00 | 00 | 00 |

```
00000190  00 00 00 00 00 00 00 00  00 00 00 00 00 00 00 00
000001A0  00 00 00 00 00 00 00 00  00 00 00 00 00 00 00 00
000001B0  00 00 00 00 00 00 00 00  00 00 00 00 00 00 00 00
000001C0  00 00 00 00 00 00 00 00  00 00 00 00 00 00 00 00
000001D0  00 00 00 00 00 00 00 00  00 00 00 00 00 00 00 00
000001E0  00 00 00 00 00 00 00 00  00 00 00 00 00 00 00 00
000001F0  00 00 00 00 00 00 00 00  00 00 00 00 00 00 00 00
00000200  62 6D 52 45 50 4F 52 54  20 20 00 00 82 7D 40 14
00000210  B4 73 75 03 64 04 9A 04  40 14 00 00 40 14 40 14
00000220  D0 73 06 00 00 00 00 00  00 00 00 00 FF FF 80 00
00000230  9A 00 00 64 04 9A 77 00  6B 03 BB D0 73 BA E6 00
00000240  CD 3E 2A BB FF FF CD 3E  32 33 DB CD 3E 3C BB DA
00000250  73 BA 46 14 CD 3F 61 BB  E4 73 BA 4A 14 CD 3F 61
00000260  BB EE 73 BA 4E 14 CD 3F  61 BB FA 73 BA 52 14 CD
00000270  3F 61 BB 00 74 BA 56 14  CD 3F 61 BB 08 74 BA 5A
00000280  14 CD 3F 61 BB 12 74 BA  5E 14 CD 3F 61 BB 22 74
00000290  BA 9C 72 CD 3F 61 BB 28  74 BA A0 72 CD 3F 61 BB
000002A0  0D 00 CD 3D 05 BA A4 72  CD 3F 61 BB 11 00 CD 3D
000002B0  05 8B D3 BB C4 00 CD 3D  05 92 CD 3F 55 8B D3 BB
000002C0  D9 00 CD 3D 05 92 CD 3F  55 BA A8 72 CD 3F 61 CD
000002D0  3E 22 C7 06 AC 72 20 00  C7 06 AE 72 05 00 BB 2E
000002E0  74 CD 3E 1F BB 01 00 BA  34 74 33 C9 CD 3E 1E BB
000002F0  01 00 CD 3F B6 CD 3F B7  01 01 BB B0 72 CD 3F B8
00000300  CD 3E 22 BB 01 00 CD 3E  21 BB 46 74 CD 3E 1F BB
00000310  01 00 BA 4C 74 B9 30 00  CD 3E 1E BB 01 00 CD 3F
00000320  B3 BB B2 72 BA 02 00 CD  3F B4 BB B6 72 CD 3F B4
00000330  BB BA 72 BA 08 00 CD 3F  B4 BB BE 72 BA 1E 00 CD
00000340  3F B4 BB C2 72 BA 03 00  CD 3F B4 BB 02 00 CD 3E
00000350  21 BB 46 74 CD 3E 1F BB  02 00 BA 5A 74 B9 40 01
00000360  CD 3E 1E 33 C0 E9 7D 00  33 C0 E9 6A 00 BB 02 00
00000370  CD 3F B3 B8 0A 00 F7 2E  C6 72 8B 1E C8 72 8B D3
00000380  D1 E3 03 D8 CD 3F 57 BF  68 74 CD 3F 91 BB 1A 00
00000390  CD 3F 71 80 CD 3D 03 CD  3F 77 87 D3 8B CB BB CA
000003A0  72 CD 3F B4 BB B4 73 CD  3D 03 CD 3F 77 8B D3 BB
000003B0  CE 72 CD 3F B4 D1 E1 D1  E1 D1 E1 D1 E1 D1 E1 03
000003C0  0E C6 72 D1 E1 D1 E1 81  C1 8C 6E 8B D9 BA 02 00
000003D0  CD 3F B4 A1 C8 72 40 A3  C8 72 83 3E C8 72 04 7E
000003E0  8C A1 C6 72 40 A3 C6 72  83 3E C6 72 1F 7F 03 E9
000062D0  0D 00 90 1E 0E 1F F3 A4  1F B0 00 B4 3D CD 21 73
000062E0  05 EB A6 E9 2F 01 5F 8B  D8 BA B0 13 B9 1A 00 B4
000062F0  3F CD 21 72 EE 81 3E B0  13 4D 5A 75 E6 8B 16 B8
00006300  13 83 C2 1F 81 E2 E0 FF  8B EA B1 04 D3 E2 33 C9
00006310  B0 00 B4 42 CD 21 72 CB  8B 16 B4 13 4A B1 05 D3
00006320  E2 2B D5 A1 B2 13 05 0F  00 B1 04 D3 E8 03 D0 89
00006330  16 B4 13 2B FA 83 EF 14  8C D6 8B D4 83 C2 11 B1
00006340  04 D3 EA 03 F2 3B FE 73  03 E9 CE 00 8B EF 1E 8E
00006350  DF B9 FF FF 33 D2 B4 3F  CD 21 1F 72 86 8B 16 C8
00006360  13 41 B0 00 B4 42 CD 21  72 12 3B 0E B6 13 74 23
00006370  BA B0 13 B9 04 00 B4 3F  CD 21 73 03 E9 96 00 8B
00006380  3E B0 13 A1 B2 13 03 C5  8E C0 26 01 2D FF 0E B6
00006390  13 75 E3 B4 3E CD 21 73  03 EB 7A 90 01 2E C6 13
000063A0  A1 C6 13 8B 1E C4 13 8E  C0 26 80 7F 03 05 75 5F
000063B0  26 80 7F 04 06 75 58 26  80 7F 05 00 72 51 5B 1E
000063C0  07 8E DD B9 D8 09 33 F6  8B FE FC F3 A5 06 1F 1E
000063D0  B8 9D 05 8E D8 B9 FD 05  2B C8 D1 E1 D1 E1 D1 E1
000063E0  B8 93 08 8E C0 33 F6 33  FF F3 A5 1F 8C D1 8C D8
000063F0  2B C8 81 F9 00 10 76 03  B9 00 10 D1 E1 D1 E1 D1
00006400  E1 BA 9D 05 8E C2 33 F6  8B FE EA 10 00 93 05 5B
00006410  BA BC 02 EB 12 BA E0 02  EB 0D BA A6 02 EB 08 BA
00006420  86 02 EB 03 BA 61 02 0E  1F B4 09 CD 21 33 C0 50
00006430  CB 0D 0A 4D 75 73 74 20  72 75 6E 20 75 6E 64 65
00006440  72 20 44 4F 53 20 32 2E  30 30 20 6F 72 20 6C 61
00006450  74 65 72 0D 0A 24 0D 0A  4D 75 73 74 20 6C 69 6E
00006460  6B 20 77 69 74 68 20 42  41 53 43 4F 4D 32 30 2E
00006470  4C 49 42 0D 0A 24 0D 0A  50 72 6F 67 72 61 6D 20
00006480  74 6F 6F 20 6C 61 72 67  65 0D 0A 24 0D 0A 57 72
00006490  6F 6E 67 20 76 65 72 73  69 6F 6E 20 6F 66 20 72
000064A0  75 6E 74 69 6D 65 20 6D  6F 64 75 6C 65 0D 0A 24
000064B0  0D 0A 45 72 72 6F 72 20  69 6E 20 45 58 45 20 66
000064C0  69 6C 65 0D 0A 24 0D 0A  43 61 6E 6E 6F 74 20 66
000064D0  69 6E 64 20 0D 0A 24 0D  0A 43 61 6E 6E 6F 74 20
000064E0  66 69 6E 64 20 42 41 53  52 55 4E 32 30 2E 45 58
000064F0  45 0D 0A 45 6E 74 65 72  20 6E 65 77 20 70 61 74
00006500  68 20 73 70 65 63 69 66  69 63 61 74 69 6F 6E 3A
00006510  20 24 0D 0A 24 42 41 53  52 55 4E 32 30 2E 45 58
00006520  45 00 50 41 54 48 3D
```

What is claimed is:

1. A system for assembling selected multiple component assemblies, comprising:

a) at least one component selection cell having a plurality of component bins, each containing a quantity of components for use in constructing selected assemblies;

b) a pushbutton switch display associated with each of at least some of the component bins for indicating required component quantities for selected assembly models including a push activated switch integral with a back light for illuminating a pushbutton having a predetermined number affixed thereto wherein the backlight is cleared by the push activated switch;

c) a numeric display associated with each other component bin for display of component quantities required for the selected assembly model including means associated with each numeric display for clearing the respective numeric display;

d) means for generating a control signal in response to clearing of all pushbutton switch backlights and all numerical displays of a cell for a selected assembly model to indicate formation of a kit of parts for the selected assembly model; and e) control means for controlling the numeric displays responsive to entry of a selected assembly model number and for entry of a schedule of selected assemblies to be successively assembled whereby the control means inhibits activation of the numeric and pushbutton switch displays for succeeding assemblies until the generation of the control signal.

2. The system of claim 1 wherein the control means further comprises means for maintaining an inventory of the components contained in the bins and for updating the inventory in response to the control signal.

3. The system of claim 2 wherein the control means further comprises means for determining how many of the selected assembly models can be constructed based upon the inventory.

4. The system of claim 1 wherein the control means further comprises means for providing an indication to an operator when the quantity of components falls below a preselected threshold.

5. The system of claim 2 further comprising a set of flow racks for storage of kits of parts and a pushbutton switch including an integral backlight associated with each flow rack for designating one of the flow racks for storage of the kits of parts for the selected assembly model wherein the control means further comprises means for clearing the pushbutton switch backlight in response to a predetermined number kits of parts being stored in the designated flow rack.

6. The system of claim 2 further comprising a set of flow racks for storage of kits of parts and a numeric display associated with each flow rack for designating one of the flow racks for storage of the kits of parts for the selected assembly model and for indicating the number of kits of parts remaining to be stored, and wherein the control means further comprises means for decrementing the numeric display and means for clearing the numeric display in response to a predetermined number of kits of parts being stored in the designated flow rack.

7. The system of claim 2 wherein the control means comprises means including a monitor for simulating assembly model selection without activating the display means.

8. The system of claim 1 further comprising alphanumeric display means associated with each component selection cell for displaying a selected assembly model description and wherein the control means comprises model description and wherein the control means comprises means for clearing each alphanumeric display in response to the control signal.

9. The system of claim 1 comprising a plurality of component selection cells configured in a hierarchy of at least two levels.

10. A method for assembling multiple component assemblies comprising the steps of:

a) automatically generating numbers of parts required for construction of a selected assembly model;

b) automatically controlling numeric displays and backlight pushbutton switches located in proximity to each of a plurality of parts bins containing parts to display a parts quantity number to indicate the quantity of the parts required from the respective bin for construction of the selected assembly models;

c) selecting parts from the bin in response to the displayed number for each respective bin to form kits of parts;

d) clearing the numeric quantity displays and backlight pushbutton displays after selecting the displayed number of parts from the bin;

e) transporting the kits of parts to a selected position on an assembly line;

f) assembling the parts from the kits of parts to form the desired assembly.

11. The method of claim 10 further comprising the step of displaying an assembly model identification for the selected model number.

12. The method of claim 11 further comprising the step of generating a control signal in response to clearing of all of the respective numeric displays and backlight pushbutton switches for the selected assembly model and automatically clearing the assembly model identification in response to the control signal.

13. A system for assembling multiple component assemblies, comprising:

a) at least one component selection cell having an alphanumeric display to display a selected assembly model description and having a plurality of component bins, each containing a quantity of components for use in constructing selected assemblies and having a set of flow racks for storage of kits of components for use in constructing a selected assembly;

b) bin display means associated with each component bin for display of component quantities required for the selected assembly model;

c) means associated with each bin display means for clearing the respective display and for generating a control signal in response to clearing of all bin displays of a cell for a selected assembly model; and d) control means for controlling the alphanumeric displays and bin display means responsive to entry of a selected assembly model number and for clearing the alphanumeric display in response to the control signal;

e) flow rack display means associated with each flow rack to designate one of the flow racks for use for storage of kits of components; and f) means for clearing the flow rack display means in response to a predetermined number of kits of components being stored in the designated flow rack.

14. The system of claim 13 wherein the control means further comprises means for maintaining an inventory of the components contained in the bins and for updating the inventory in response to the control signal.

15. The system of claim 14 wherein the control means further comprises means for determining how many of the selected assembly models can be constructed based upon the inventory.

16. The system of claim 14 wherein the control means further comprises means for providing an indication to an operator when the quantity of components falls below a preselected threshold.

17. The system of claim 14 wherein the control means comprises means for cancellation of a selected assembly model.

18. A method for preparing multiple component assemblies for assembly comprising the steps of:

a) automatically controlling bin quantity displays located in proximity to each of a plurality of parts bins containing parts to indicate a quantity of the parts required from the bin for construction of a selected assembly model;

b) selecting parts from the bins in response to the indicated quantity for each respective bin to form kits of parts;

c) automatically controlling flow rack displays located in proximity to each flow rack in a set of flow racks to designate one of the flow racks for storage of formed kits of parts;

d) storing formed kits of parts in a flow rack in response to the flow rack display designation;

e) clearing the bin quantity displays after selecting the indicated number of parts from the bin; and f) clearing the flow rack display after a predetermined number of kits of parts have been stored in the designated flow rack and initiating formation of a different kit of parts for storage in a different flow rack.

19. The method of claim 18 further comprising the step of displaying an assembly model identification for the selected model.

20. The method of claim 19 further comprising the step of generating a control signal in response to clearing of all of the respective bin displays for the selected assembly model and automatically clearing the assembly model identification in response to the control signal.

* * * * *

UNITED STATES PATENT AND TRADEMARK OFFICE
CERTIFICATE OF CORRECTION

PATENT NO. : 5,029,095

DATED : July 2, 1991

INVENTOR(S) : Kenik et al.

It is certified that error appears in the above-identified patent and that said Letters Patent is hereby corrected as shown below:

Column 2, line 59, delete "e", and insert --embodiment--.

Column 8, line 66, delete "Ored", and insert --ORed--.

Column 9, line 46, delete "of", and insert --off--.

Column 11, line 4, delete initialiZation", and insert --initialization--.

Column 11, line 6, delete "opera&or:", and insert --operator--.

Column 13, line 16, delete "a:.e", and insert --operator--.

UNITED STATES PATENT AND TRADEMARK OFFICE

CERTIFICATE OF CORRECTION

PATENT NO. : 5,029,095

DATED : July 2, 1991

INVENTOR(S) : Kenik et al.

It is certified that error appears in the above-identified patent and that said Letters Patent is hereby corrected as shown below:

Claim 8, line 5 and 6, delete the second "model description and wherein the control means comprises".

Signed and Sealed this

Sixteenth Day of March, 1993

Attest:

STEPHEN G. KUNIN

Attesting Officer

Acting Commissioner of Patents and Trademarks